United States Patent
Yu et al.

(10) Patent No.: US 12,277,366 B2
(45) Date of Patent: Apr. 15, 2025

(54) AUDIO CONTROL METHOD, SYSTEM, AND ELECTRONIC DEVICE

(71) Applicant: Huawei Technologies Co., Ltd., Shenzhen (CN)

(72) Inventors: Yanhui Yu, Shenzhen (CN); Xue Sun, Shanghai (CN); Weilu Li, Shanghai (CN); Bangguo Rao, Shanghai (CN); Zhou Zhu, Shanghai (CN); Yangming Chen, Moscow (RU); Xin Li, Shanghai (CN); Xuejiang Cai, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 287 days.

(21) Appl. No.: 18/013,904

(22) PCT Filed: Jul. 1, 2021

(86) PCT No.: PCT/CN2021/104105
§ 371 (c)(1),
(2) Date: Dec. 30, 2022

(87) PCT Pub. No.: WO2022/002218
PCT Pub. Date: Jan. 6, 2022

(65) Prior Publication Data
US 2023/0297324 A1    Sep. 21, 2023

(30) Foreign Application Priority Data

Jul. 2, 2020  (CN) ......................... 202010628962.7
Jul. 20, 2020  (CN) ......................... 202010700459.8
(Continued)

(51) Int. Cl.
*G06F 3/16*    (2006.01)

(52) U.S. Cl.
CPC .............. *G06F 3/165* (2013.01); *G06F 3/162* (2013.01)

(58) Field of Classification Search
CPC .................................. G06F 3/165; G06F 3/162
See application file for complete search history.

(56) References Cited

U.S. PATENT DOCUMENTS 9,916,839 B1 *  3/2018  Scalise .................... G10L 15/22
2011/0196520 A1   8/2011  Peterson et al.
(Continued)

FOREIGN PATENT DOCUMENTS

CN    102857729 A    1/2013
CN    102981796 A    3/2013
(Continued)

*Primary Examiner* — Fan S Tsang
*Assistant Examiner* — David Siegel
(74) *Attorney, Agent, or Firm* — SLATER MATSIL, LLP

(57) ABSTRACT

An audio control method, a system, and device, the method including displaying, by a first device, in response to a first user operation, a candidate device list, obtaining, in response the user selecting a second device from the candidate device list, an audio capability parameter of the second device indicating a hardware capability and a software capability for playing audio, determining a first audio play policy based on the audio capability parameter of the second device, obtaining second audio data by the first device by performing first processing on first audio data from a first audio application according to the first audio play policy, and sending, by the first device, the second audio data to the second device, so that second device plays the second audio data or processes the second audio data and plays processed second audio data.

20 Claims, 165 Drawing Sheets

(30) Foreign Application Priority Data

| | | |
|---|---|---|
| Jul. 20, 2020 | (CN) | 202010701720.6 |
| Jul. 23, 2020 | (CN) | 202010718939.7 |
| Aug. 4, 2020 | (CN) | 202010774729.X |
| Aug. 21, 2020 | (CN) | 202010847900.5 |
| Sep. 29, 2020 | (CN) | 202011058010.2 |
| Oct. 23, 2020 | (CN) | 202011149031.5 |
| Dec. 23, 2020 | (CN) | 202011546105.9 |

(56) References Cited

U.S. PATENT DOCUMENTS

| | | | |
|---|---|---|---|
| 2014/0098247 A1* | 4/2014 | Rao | H04L 67/125 |
| | | | 455/420 |
| 2016/0065159 A1 | 3/2016 | Yu | |
| 2017/0048619 A1 | 2/2017 | Bang et al. | |
| 2017/0168772 A1 | 6/2017 | Lim | |
| 2018/0098151 A1 | 4/2018 | Penke et al. | |
| 2019/0171762 A1* | 6/2019 | Luke | G06F 3/165 |

FOREIGN PATENT DOCUMENTS

| | | |
|---|---|---|
| CN | 103235736 A | 8/2013 |
| CN | 104010210 A | 8/2014 |
| CN | 104023261 A | 9/2014 |
| CN | 103079257 B | 5/2015 |
| CN | 104917671 A | 9/2015 |
| CN | 106686519 A | 5/2017 |
| CN | 107481709 A | 12/2017 |
| CN | 111078448 A | 4/2020 |
| WO | 2017215654 A1 | 12/2017 |

* cited by examiner

AUDIO CONTROL METHOD, SYSTEM, AND ELECTRONIC DEVICE

CROSS REFERENCE TO RELATED APPLICATIONS

This application is a National Stage of International Application No. PCT/CN2021/104105, filed on Jul. 1, 2021, which claims priority to Chinese Patent Application No. 202010628962.7, filed on Jul. 2, 2020, and Chinese Patent Application No. 202011149031.5, filed on Oct. 23, 2020, and Chinese Patent Application No. 202011058010.2, filed on Sep. 29, 2020, and Chinese Patent Application No. 202010847900.5, filed on Aug. 21, 2020, and Chinese Patent Application No. 202010718939.7, filed on Jul. 23, 2020, and Chinese Patent Application No. 202010700459.8, filed on Jul. 20, 2020, and Chinese Patent Application No. 202010774729.X, filed on Aug. 4, 2020, and Chinese Patent Application No. 202010701720.6, filed on Jul. 20, 2020, and Chinese Patent Application No. 202011546105.9, filed on Dec. 23, 2020, all of which are hereby incorporated by reference in their entireties.

TECHNICAL FIELD

This application relates to the terminal field, and in particular, to an audio control method, a system, and an electronic device.

BACKGROUND

An intelligent terminal such as a mobile phone generally has audio input and output functions. For example, the mobile phone may play audio by using a speaker (speaker) of the mobile phone, and may record audio by using a microphone (mic) of the mobile phone. For another example, the mobile phone may output audio by using an audio output device such as a wired headset, a Bluetooth headset, or a Bluetooth sound box.

Due to rapid development of intelligent terminal technologies in recent years, a user or a home usually has a plurality of terminal devices. For example, user's home may have an interconnection system including several terminals such as a mobile phone, a television, a sound box, and a PC. In this interconnection system, the user more urgently needs to deliver audio of a terminal to one or more other terminals for play. Therefore, how to flexibly play and control audio data of a terminal by one or more other terminals becomes a problem that needs to be urgently resolved.

SUMMARY

This application provides an audio control method, a system, and an electronic device, to flexibly switch audio of a terminal to one or more other terminals for play. This improves user audio experience.

To achieve the foregoing objective, this application uses the following technical solutions.

According to a first aspect, this application provides an audio control method, including: In response to a first operation entered by a user, a first device may display a candidate device list, where the candidate device list includes at least one candidate device having an audio output function. If the first device detects that the user selects a second device from the candidate device list, it indicates that the user wants to switch an audio function of the first device to the second device for implementation. In this case, the first device is a master device, and the second device is a slave device (the second device may be an electronic device having an operating system, such as a sound box, a television, or a mobile phone). Further, the first device may obtain an audio capability parameter of the second device, where the audio capability parameter is used to indicate a hardware capability of the second device for playing audio and a software capability of the second device for playing audio. In this way, the first device may determine a first audio play policy based on the audio capability parameter of the second device, and then perform first processing on first audio data from a first audio application according to the first audio play policy, to obtain second audio data. Further, the first device may send the second audio data to the second device for play.

It can be learned that, when performing audio switching, the first device may obtain the audio capability parameter of the slave device (that is, the second device). Because the audio capability parameter can reflect the software processing capability and the hardware processing capability of the second device for playing audio, the first device can determine, based on the audio capability parameter of the second device, the first audio play policy that matches the audio capability of the second device. The software processing capability of the second device for playing audio is mainly determined by a software feature (for example, a sound effect processing algorithm), and the hardware processing capability of the second device for playing audio is mainly determined by a hardware feature (for example, a component of a speaker). Details are described in a specific implementation.

In addition, the first processing may include sound effect processing, mixing performed based on a quantity of sound channels, and the like. The following provides detailed descriptions with reference to possible implementations.

In this way, after processing the first audio data from the first audio application according to the first audio play policy, the first device may send the second audio data obtained after the processing to the second device, so that the slave device can play the audio data of the first device that matches the audio capability of the slave device. For example, when playing the received second audio data, the second device may directly play the second audio data, or may process the second audio data and then play processed second audio data. In this way, the first device may flexibly switch an audio play function of the first device to one or more other slave devices, and control audio play of the slave devices based on audio capabilities of the slave devices. This provides good user audio experience. In addition, the first device may also use audio processing capabilities of the slave devices to collaborate with the master device to complete audio data processing and play.

In a possible implementation, the audio capability parameter may specifically include a sound effect parameter, and the sound effect parameter is used to indicate whether the second device enables a sound effect mode. In this case, that the first device determines a first audio play policy based on the audio capability parameter of the second device includes: If the second device enables the sound effect mode, the first device may set, in the first audio play policy, that sound effect processing is not performed on the first audio data; or if the second device does not enable the sound effect mode, the first device may set, in the first audio play policy, that sound effect processing is performed on the first audio data.

Correspondingly, if it is set in the first audio play policy that sound effect processing is performed on the first audio data, the first processing performed by the first device on the first audio data may specifically include sound effect processing, for example, adding a heavy bass sound effect. If it is set in the first audio play policy that sound effect processing is not performed on the first audio data, the first device does not need to perform sound effect processing on the first audio data, and the second device may subsequently perform sound effect processing on received audio data. In this way, sound effect superposition caused because both the first device and the second device perform sound effect processing on audio data can be avoided, and a sound effect loss caused because neither of the first device and the second device performs sound effect processing on audio data can also be avoided. This improves user audio experience, and also improves efficiency of processing audio data by a device.

In a possible implementation, the audio capability parameter may specifically include a sound effect parameter, and the sound effect parameter is used to indicate a sound effect mode supported by the second device, for example, a Dolby sound effect or a Histen sound effect. In addition, the first audio application sets a sound effect mode of audio play to a first sound effect mode. In this case, that the first device determines a first audio play policy based on the audio capability parameter of the second device includes: If the first sound effect mode is the sound effect mode supported by the second device, it indicates that the second device is capable of completing a first sound effect, and therefore the first device may set, in the first audio play policy, that sound effect processing is not performed on the first audio data; or if the first sound effect mode is not the sound effect mode supported by the second device, it indicates that the second device is incapable of completing a first sound effect, and therefore the first device may set, in the first audio play policy, that sound effect processing is performed on the first audio data in the first sound effect mode.

Alternatively, if the first sound effect mode is a sound effect mode supported by both the first device and the second device, the first device may set, in the first audio play policy by default, that the first device or the second device performs sound effect processing.

If it is set in the first audio play policy that sound effect processing is performed on the first audio data in the first sound effect mode, the first processing performed by the first device on the first audio data may be specifically adding the first sound effect to the first audio data; or if it is set in the first audio play policy that sound effect processing is not performed on the first audio data in the first sound effect mode, the first device does not need to add the first sound effect to the first audio data, and the second device may subsequently add the first sound effect to received audio data.

In a possible implementation, the audio capability parameter may specifically include a target sampling rate, and the target sampling rate is a sampling rate supported by the second device (for example, 48 kHz or 96 kHz). In this case, that the first device determines a first audio play policy based on the audio capability parameter of the second device includes: The first device sets, in the first audio play policy, that sampling is performed on the first audio data at the target sampling rate.

Correspondingly, the first processing performed by the first device on the first audio data may be specifically performing re-sampling at the target sampling rate. For example, 96 kHz first audio data is down-sampled into 48 kHz second audio data. For another example, 48 kHz first audio data is up-sampled into 96 kHz second audio data.

In a possible implementation, the audio capability parameter may specifically include a target quantity of sound channels, and the target quantity of sound channels is a quantity of sound channels supported by the second device (for example, dual channels or four channels). That the first device determines a first audio play policy based on the audio capability parameter of the second device includes: The first device sets, in the first audio play policy, that the first audio data is mixed based on the target quantity of sound channels.

Correspondingly, the first processing performed by the first device on the first audio data may be specifically performing mixing based on the target quantity of sound channels. For example, eight-channel first audio data is down-mixed into four-channel second audio data. For another example, dual-channel first audio data is up-mixed into eight-channel second audio data.

In a possible implementation, the audio capability parameter may specifically include a latency parameter, and the latency parameter is used to indicate whether the second device supports a low-latency audio processing capability. In this case, that the first device determines a first audio play policy based on the audio capability parameter of the second device includes: If the second device supports the low-latency audio processing capability, the first device may set, in the first audio play policy, that the first audio data is processed in a low-latency mode; or if the second device does not support the low-latency audio processing capability, the first device may set, in the first audio play policy, that the first audio data is processed in a non-low-latency mode. Compared with the non-low-latency mode, in the low-latency mode, the first device may set duration of each frame of audio data to a small value. This shortens a latency of processing a frame of audio data by the second device.

In a possible implementation, the audio capability parameter may include a latency parameter, and the latency parameter is used to indicate an audio play latency of the second device, that is, a time required by the second device to process one frame of audio data, for example, 10 ms or 5 ms. In this case, that the first device determines a first audio play policy based on the audio capability parameter of the second device includes: If the audio play latency of the second device is less than a preset value, it indicates that the second device supports a low-latency audio processing capability, and therefore the first device may set, in the first audio play policy, that the first audio data is processed in a low-latency mode; or if the audio play latency of the second device is greater than or equal to the preset value, the second device does not support a low-latency audio processing capability, and therefore the first device sets, in the first audio play policy, that the first audio data is processed in a non-low-latency mode.

Correspondingly, if the low-latency mode is set in the first audio play policy, the first processing performed by the first device on the first audio data may be specifically dividing the first audio data into frames of audio data based on first duration; or if the non-low-latency mode is set in the first audio play policy, the first processing performed by the first device on the first audio data may be specifically dividing the first audio data into frames of audio data based on second duration, where the second duration is greater than the first duration.

In a possible implementation, a first preset application, for example, a DV app, is installed at an application layer of the first device. That the first device obtains an audio capability parameter of the second device includes: The first device obtains the audio capability parameter of the second device from the second device by running the first preset application, that is, obtains the audio capability of the slave device by using the installed DV app. Correspondingly, an application adapted to the first preset application may be installed in the second device, to provide the audio capability parameter of the second device for the first device and receive the second audio data. An operating system of the second device does not need to be changed, the first device and the second device may be provided by different vendors, and the second device only needs to install the corresponding application to collaborate with the first device to execute this solution. Therefore, this solution can adapt to devices provided by various vendors, and can be widely applied.

In a possible implementation, after the first device obtains the audio capability parameter of the second device, the method further includes: The first preset application (for example, the DV app) may create a corresponding hardware abstraction module (for example, a DMSDP audio HAL) at an HAL based on the audio capability parameter of the second device. In this case, that the first device sends the second audio data to the second device includes: The first device invokes the DMSDP audio HAL to send the second audio data to the second device. In other words, when performing audio switching, the first device may dynamically create a corresponding DMSDP audio HAL based on an audio capability parameter of a slave device, to send audio data to the slave device by using the DMSDP audio HAL.

In a possible implementation, an application framework layer of the first device includes an audio policy module (for example, AudioPolicy). In this case, that the first device determines a first audio play policy based on the audio capability parameter of the second device includes: The first preset application sends the audio capability parameter of the second device to the audio policy module, so that the audio policy module determines the first audio play policy based on the audio capability parameter of the second device.

In a possible implementation, the application framework layer of the first device includes an audio processor (for example, AudioFlinger). In this case, that the first device performs first processing on first audio data from a first audio application according to the first audio play policy, to obtain second audio data includes: The audio processor may receive the first audio data from the first audio application. In addition, the audio processor may obtain the first audio play policy from the audio policy module. Further, the audio processor may perform the first processing on the first audio data according to the first audio play policy, to output the second audio data obtained after the processing.

It should be noted that content included in the first processing depends on specific content of the first audio play policy. For example, if the first audio play policy requires the first device to add the first sound effect, the first processing may include a sound effect processing process of adding the first sound effect. For another example, if the first audio play policy requires the first device to perform sampling at a 48 kHz sampling rate, a sampling processing process is performed at the 48 kHz sampling rate. In some cases, the first audio play policy may alternatively be empty, that is, the first device does not need to perform any processing on the first audio data from the first audio app. In this case, the first device does not need to perform the first processing on the first audio data, but may directly send the first audio data to the second device.

In a possible implementation, the method may further include: When the audio capability parameter of the second device is updated, for example, the sound effect mode of the second device is adjusted from the Dolby sound effect to the heavy bass sound effect, the first preset application may obtain an updated audio capability parameter of the second device. In addition, the first preset application may send the updated audio capability parameter to the audio policy module, so that the audio policy module updates the first audio play policy to a second audio play policy based on the updated audio capability parameter. Further, the audio policy module may output the second audio play policy to the audio processor, so that the audio processor performs second processing on received audio data according to the second audio play policy obtained after the updating. Similar to the first processing, content included in the second processing depends on specific content of the second audio play policy.

In addition, after the first preset application obtains the updated audio capability parameter of the second device, the first preset application may further update the DMSDP audio HAL based on the updated audio capability parameter, so that an updated DMSDP audio HAL can send audio data obtained after the second processing to the second device.

In other words, when the audio capability of the slave device (that is, the second device) connected to the first device changes, the first device may dynamically update an audio play policy for processing audio data, and may further dynamically update a corresponding DMSDP audio HAL, that is, keep timely matching between a DMSDP audio HAL, an audio play policy, and a capability of the slave device, so that the first device can perform audio switching with the second device based on an updated audio capability of the second device.

In a possible implementation, after the first device sends the second audio data to the second device, the method further includes: The first device may receive a second operation that the user sets volume, for example, an operation of tapping a volume button "+" or a volume button "−". In response to the second operation, the audio policy module may set a volume level in the first audio play policy, for example, set volume from 100 to 120, where an audio play policy obtained after the setting is a third audio play policy. Further, the audio policy module may output the third audio play policy to the audio processor, so that the audio processor modifies a gain of received audio data based on the volume level that is set in the third audio play policy, to adjust volume of audio data subsequently played by the second device.

In other words, when volume of audio data changes, the first device may also dynamically update an audio play policy for processing audio data, that is, re-customize an audio play policy that matches the audio capability of the second device.

In a possible implementation, a second audio application is installed at the application layer of the first device. After the first device sends the second audio data to the second device, the method further includes: The audio processor receives audio data from the second audio application. When the audio data of the second audio application and audio data of the first audio application are of different types, the audio policy module may update the first audio play policy to a fourth audio play policy. Further, the audio policy module outputs the fourth audio play policy to the audio processor, so that the audio processor performs third processing on the received audio data according to the fourth audio play policy. The audio processor sends audio data obtained after the third processing to the second device by using the hardware abstraction module. Similar to the first processing, specific content of the third processing depends on specific content of the fourth audio play policy.

In other words, during audio switching, if audio data that is output by the first device changes, the first device may also dynamically update an audio play policy for processing audio data, so that the audio data received by the second device matches the audio capability of the second device.

In a possible implementation, after the first device sends the second audio data to the second device, the method further includes: The first device receives a third operation that the user selects a third device to play audio, that is, the user changes the slave device of the first device from the second device to the third device. In response to the third operation, the first preset application may obtain an audio capability parameter of the third device from the third device. The first preset application sends the audio capability parameter of the third device to the audio policy module, so that the audio policy module updates the first audio play policy to a fifth audio play policy based on the audio capability parameter of the third device. The audio policy module outputs the fifth audio play policy to the audio processor, so that the audio processor performs fourth processing on received audio data according to the fifth audio play policy. Similar to the first processing, specific content of the fourth processing depends on specific content of the fifth audio play policy.

In addition, after the first preset application obtains the audio capability parameter of the third device from the third device, the first preset application may further update the DMSDP audio HAL based on the audio capability parameter of the third device, so that an updated DMSDP audio HAL sends audio data obtained after the fourth processing to the third device.

In other words, when the slave device connected to the first device changes, the first device may dynamically update an audio play policy for processing audio data, and may further dynamically update a corresponding DMSDP audio HAL, that is, keep timely matching between a DMSDP audio HAL, an audio play policy, and a capability of the slave device, so that the first device can perform audio switching with a new slave device (that is, the third device) based on an audio capability of the third device.

In another possible implementation, a second preset application may be installed at an application layer of the first device, and the second preset application may be the same as or different from a first preset application. That the first device sends the second audio data to the second device includes: The first device sends the second audio data to the second preset application, so that the second preset application sends the second audio data to the second device. In this case, the first preset application does not need to create a corresponding DMSDP audio HAL at an HAL.

In a possible implementation, before the first device displays the candidate device list, the method further includes: The first device displays an application interface of the first audio application, where an audio switching button may be disposed on the application interface. In this case, the first operation is an operation that the user taps the audio switching button. In other words, in a running process of an audio application, the user may enter an audio switching function from an audio switching button disposed in the audio application.

In a possible implementation, before the first device displays the candidate device list, the method further includes: The first device displays a control center, where an audio switching button may be disposed in the control center. In this case, the first operation is an operation that the user taps the audio switching button. In other words, the user may enter an audio switching function from the audio switching button in the control center.

In a possible implementation, the audio capability parameter of the second device may include a recording parameter, and the recording parameter is used to indicate an audio input capability of the second device, that is, a recording capability. Similar to the foregoing audio play process, the method further includes: The first device determines an audio recording policy based on the recording parameter. After receiving first recording data recorded by the second device, the first device processes the first recording data according to the audio recording policy, to obtain second recording data. Further, the first device may report the second recording data to an audio application that enables a recording function. In other words, in addition to distributing an audio output function to the slave device for implementation, the first device may also distribute an audio input function to the slave device for implementation.

According to a second aspect, this application provides an audio control method, including: In response to a first operation entered by a user, a first device displays a candidate device list, where the candidate device list includes at least one candidate device having an audio output function. In response to an operation that the user selects a second device from the candidate device list, the first device obtains an audio capability parameter of the second device, where the audio capability parameter is used to indicate a hardware capability of the second device for playing audio and a software capability of the second device for playing audio. The first device may determine, based on the audio capability parameter of the second device, that audio data from a first audio application does not need to be processed. For example, because the audio capability parameter of the second device indicates that the second device has a capability such as sampling or sound effect processing, the first device may determine that the first device does not need to perform processing such as sampling or sound effect adding on the audio data from the first audio application, but the second device processes the audio data from the first audio application. In this case, the first device may directly send the audio data of the first audio application to the second device. After receiving the audio data sent by the first device, the second device may perform corresponding processing (for example, sampling or sound effect adding) on the audio data based on an audio capability of the second device, and then play processed audio data. Certainly, after receiving the audio data sent by the first device, the second device may alternatively directly play the audio data. This is not limited in this embodiment of this application.

For example, if the audio capability parameter of the second device indicates that the second device enables a Dolby sound effect, the first device may determine that the first device does not need to perform Dolby sound effect processing on the audio data. After receiving the audio data sent by the first device, the second device may perform Dolby sound effect processing on the audio data. For another example, if the audio capability parameter of the second device indicates that the second device has a mixing capability, the first device may determine that the first device does not need to mix the audio data. After receiving the audio data sent by the first device, the second device may mix the audio data. In this way, when performing audio switching, the first device may fully use an audio processing capability of a slave device to collaborate with the slave device to complete an audio data processing process more efficiently and flexibly.

In other words, the foregoing processing means a processing operation related to the audio capability parameter of the second device. The first device may still perform conventional processing such as parsing, encoding, decoding, encapsulation, or decapsulation on to-be-sent audio data. These processing operations are generally not directly associated with the audio capability parameter of the second device.

Alternatively, in addition to sending the audio data of the first audio application to the second device, the first device may further send, to the second device, an audio policy used by the second device to process the audio data. For example, if the first device does not enable a sound effect mode, but the second device enables a sound effect mode, the first device may set, in the audio policy, that the second device performs sound effect processing on received audio data. In this case, after receiving the audio policy and the audio data of the first audio application, the second device may perform sound effect processing on the audio data according to the audio policy. This reduces running load of the first device.

According to a third aspect, this application provides an audio control method, including: In response to a first operation entered by a user, a first device displays a candidate device list, where the candidate device list includes at least one candidate device having an audio output function. In response to an operation that the user selects a second device and a third device from the candidate device list, the first device separately obtains an audio capability parameter of the second device and an audio capability parameter of the third device. In this case, slave devices of the first device include two devices: the second device and the third device, the audio capability parameter of the second device is used to indicate a hardware capability of the second device for playing audio and a software capability of the second device for playing audio, and the audio capability parameter of the third device is used to indicate a hardware capability of the third device for playing audio and a software capability of the third device for playing audio. Further, the first device may determine a multi-device audio play policy based on the audio capability parameter of the second device and the audio capability parameter of the third device. In addition, the first device may perform first processing on first audio data from a first audio application according to the multi-device audio play policy, to obtain second audio data corresponding to the second device and third audio data corresponding to the third device. Further, the first device may send the second audio data to the second device for play, and send the third audio data to the third device for play.

Similar to the first aspect or the second aspect in which the first device switches audio data to the second device for play, after the first device sends the second audio data to the second device, the second device may directly play the second audio data, or may process the second audio data and then play processed second audio data. Likewise, after the first device sends the third audio data to the third device, the third device may directly play the third audio data, or may process the third audio data and then play processed third audio data. In this way, the first device may simultaneously switch an audio play function of the first device to a plurality of slave devices, so as to implement a cross-device distributed audio capability.

In a possible implementation, when the audio capability parameter of the second device is different from the audio capability parameter of the third device, the multi-device audio play policy includes a first policy and a second policy. That the first device performs first processing on first audio data from a first audio application according to the multi-device audio play policy, to obtain second audio data corresponding to the second device and third audio data corresponding to the third device includes: The first device replicates the first audio data to obtain first data and second data (the first data is the same as the first audio data, and the second data is the same as the first audio data). Further, the first device may process the first data stream according to the first policy, to obtain the second audio data. In addition, the first device may process the second data stream according to the second policy, to obtain the third audio data.

For example, a first preset application (for example, a DV app) is installed at an application layer of the first device. After the first device separately obtains the audio capability parameter of the second device and the audio capability parameter of the third device, because the audio capability parameter of the second device is different from the audio capability parameter of the third device, the first preset application may create a first hardware abstraction module at an HAL based on the audio capability parameter of the second device, and create a second hardware abstraction module at the HAL based on the audio capability parameter of the third device. In this case, the first device may send the second audio data to the second device by using the first hardware abstraction module, and the first device may send the third audio data to the third device by using the second hardware abstraction module.

In a possible implementation, when the audio capability parameter of the second device is the same as the audio capability parameter of the third device, that the first device performs first processing on first audio data from a first audio application according to the multi-device audio play policy, to obtain second audio data corresponding to the second device and third audio data corresponding to the third device includes: The first device performs the first processing on the first audio data according to the multi-device audio play policy, to obtain the second audio data. The first device replicates the second audio data to obtain the third audio data.

For example, when the audio capability parameter of the second device is the same as the audio capability parameter of the third device, the first preset application installed in the first device may create a hardware abstraction module at an HAL based on the audio capability parameter of the second device (or the audio capability parameter of the third device). In this case, only one hardware abstraction module needs to be created, the first device may send the second audio data to the second device by using the hardware abstraction module, and the first device may send the third audio data to the third device by using the hardware abstraction module. In other words, the hardware abstraction module created by the first preset application at the HAL corresponds to the audio capability parameters obtained by the first device, and each hardware abstraction module corresponds to a group of uniquely determined audio capability parameters.

According to a fourth aspect, this application provides an audio control method, including: In response to a first operation entered by a user, a first device displays a candidate device list, where the candidate device list includes at least one candidate device having an audio input function. In response to an operation that the user selects a second device (the second device is a sound box, a television, or a mobile phone) from the candidate device list, the first device obtains an audio capability parameter of the second device, where the audio capability parameter is used to indicate a hardware capability of the second device for recording audio and a software capability of the second device for recording audio.

The first device may determine a first audio recording policy based on the audio capability parameter of the second device. Subsequently, when the first device receives first recording data sent by the second device, the first device may perform first processing on the first recording data according to the first audio recording policy, to obtain second recording data.

It can be learned that, similar to the audio control method according to the first aspect, in the audio control method according to the fourth aspect, the first device (that is, a master device) may determine the corresponding first audio recording policy based on a capability related to an audio output function in the audio capability parameter of the second device (that is, a slave device). In this way, the first device may flexibly switch an audio input function of the first device to the slave device according to the first audio recording policy for implementation, and can also use an audio recording capability of the slave device to collaborate with the master device to complete audio data recording.

In addition, content included in the first processing depends on specific content of the first audio recording policy. For example, if the first audio recording policy requires the first device to perform echo cancellation by using a 3A algorithm, the first processing may include a processing process of performing echo cancellation by using the 3A algorithm. In some cases, the first audio recording policy may alternatively be empty, that is, the first device does not need to perform any processing on the first recording data sent by the second device. In this case, the first device does not need to perform the first processing on the first recording data.

In a possible implementation, after the first device obtains the audio capability parameter of the second device, the method further includes: When the audio capability parameter of the second device is updated, the first device may obtain an updated audio capability parameter of the second device. Further, the first device may update the first audio recording policy to a second audio recording policy based on the updated audio capability parameter. Subsequently, when the first device receives third recording data sent by the second device, the first device may perform second processing on the third recording data according to the second audio recording policy, to obtain fourth recording data.

In other words, when an audio recording capability of a slave device (that is, the second device) connected to the first device changes, the first device may dynamically update an audio recording policy for processing recording data. In this way, processing (that is, the second processing) performed by the first device on subsequently received recording data is also correspondingly adjusted, so that the first device can perform audio switching with the second device based on an updated audio recording capability of the second device. Similar to the first processing, content included in the second processing depends on specific content of the second audio play policy.

In a possible implementation, after the first device obtains the audio capability parameter of the second device, the method further includes: The first device may receive a second operation that the user selects a third device to record audio, that is, the user changes an audio input device of the first device from the second device to the third device. In response to the second operation, the first device may obtain an audio capability parameter of the third device from the third device. Further, the first device may determine a third audio recording policy based on the audio capability parameter of the third device. Subsequently, when the first device receives fifth recording data sent by the third device, the first device performs third processing on the fifth recording data according to the third audio recording policy, to obtain sixth recording data.

In other words, when an audio output device connected to the first device changes, the first device may dynamically update an audio play policy for processing recording data. In this way, processing (that is, the third processing) performed by the first device on subsequently received recording data is also correspondingly adjusted, so that the first device can perform audio switching with the third device based on an audio recording capability of the third device. Similar to the first processing, content included in the third processing depends on specific content of the third audio play policy.

In a possible implementation, after the first device obtains the audio capability parameter of the second device, the method further includes: The first device creates a corresponding hardware abstraction module at an HAL based on the audio capability parameter of the second device. In this case, that the first device receives first recording data sent by the second device includes: The first device receives, by using the hardware abstraction module, the first recording data sent by the second device. In other words, when performing audio switching, the first device may dynamically create a corresponding DMSDP audio HAL based on an audio capability parameter of a slave device, to receive, by using the DMSDP audio HAL, recording data sent by the slave device.

Similar to the foregoing audio play process, when the audio capability parameter of the second device is updated or an audio capability parameter of a new slave device is obtained, the first device may further update the foregoing DMSDP audio HAL based on a latest audio capability parameter, so that an updated DMSDP audio HAL can receive data from or send data to a current slave device.

Certainly, similar to the foregoing audio play process, the first device may also include a first preset application (for example, a DV app), an audio policy module (for example, AudioPolicy), an audio processor (for example, AudioFlinger), and the like. These function modules in an audio recording process are similar to those in the foregoing audio play process. Therefore, details are not described herein again.

According to a fifth aspect, this application provides an audio control method, including: A second device sends a first audio capability parameter to a first device, where the first audio capability parameter is used to indicate a hardware capability of the second device for playing audio and a software capability of the second device for playing audio, and the second device is a sound box, a television, or a mobile phone. Subsequently, the second device may receive first audio data sent by the first device, where the first audio data is obtained after the first device performs processing based on the first audio capability parameter. Further, the second device may play the first audio data, or the second device may process the first audio data and then play processed first audio data.

In a possible implementation, a preset application is installed at an application layer of the second device. That a second device sends a first audio capability parameter to a first device includes: The second device sends the first audio capability parameter to the first device by running the preset application. That the second device receives first audio data sent by the first device includes: The second device receives, by running the preset application, the first audio data sent by the first device.

In other words, for the second device (that is, a slave device of the first device), the second device only needs to install the foregoing preset application (which may be referred to as a proxy app), so that the second device can report an audio capability parameter of the second device to the first device by using the proxy app, and obtain, from the first device for play, audio data that matches an audio capability of the second device. An operating system of the second device does not need to be changed, the first device and the second device may be provided by different vendors, and the second device only needs to install the corresponding application to collaborate with the first device to execute this solution. Therefore, this solution can adapt to devices provided by various vendors, and can be widely applied.

In a possible implementation, after the second device plays the first audio data, or the second device processes the first audio data and then plays processed first audio data, the method further includes: The second device sets a third device as an audio output device (the third device is different from the second device, and the third device is different from the first device). The second device sends a second audio capability parameter to the first device, where the second audio capability parameter is used to indicate a hardware capability of the third device for playing audio and a software capability of the third device for playing audio. The second device receives second audio data sent by the first device, where the second audio data is obtained after the first device performs processing based on the second audio capability parameter. The second device plays the second audio data, or the second device processes the second audio data and then plays processed second audio data.

In other words, when the second device is connected to another audio output device (for example, the third device), the second device may serve as a master device of the third device, and re-report an audio capability parameter (that is, the second audio capability parameter) of the second device, where the second audio capability parameter reflects an audio capability of the third device, so that the first device can process audio data based on a new audio capability parameter, so as to implement an audio switching function.

In a possible implementation, after the second device plays the first audio data, or the second device processes the first audio data and then plays processed first audio data, the method further includes: When an audio capability of the second device changes, the second device updates the first audio capability parameter to a third audio capability parameter. The second device sends the third audio capability parameter to the first device. The second device receives third audio data sent by the first device, where the third audio data is obtained after the first device performs processing based on the third audio capability parameter. The second device plays the third audio data, or the second device processes the third audio data and then plays processed third audio data.

In other words, when the audio capability of the second device changes, the second device may re-report an audio capability parameter (that is, the third audio capability parameter) of the second device, so that the first device can process audio data based on a new audio capability parameter, so as to implement an audio switching function.

In a possible implementation, the first audio capability parameter may further indicate a hardware capability of the second device for recording audio and a software capability of the second device for recording audio. In other words, the first audio capability parameter may further include a parameter that can reflect a recording capability of the second device, for example, an echo cancellation algorithm used by the second device. Therefore, after the second device sends the first audio capability parameter to the first device, the method further includes: The second device starts to record audio to obtain recording data. The second device sends the recording data to the first device, so that the first device processes the recording data based on the first audio capability parameter.

In a possible implementation, the method further includes: The second device receives an audio policy sent by the first device, where the audio policy is determined by the first device based on the first audio capability parameter, and the audio policy may include an audio play policy and/or an audio recording policy. In this case, the second device may process the first audio data according to the audio play policy, and play processed first audio data. In other words, the first device serving as a master device may indicate, based on an audio capability parameter of the second device, specific processing that needs to be performed by the second device during audio switching, so as to fully use the audio capability of the second device. This provides better user audio experience.

According to a sixth aspect, this application provides an audio control method, including: A second device sends a first audio capability parameter to a first device, where the first audio capability parameter is used to indicate a hardware capability of the second device for recording data and a software capability of the second device for recording data, and the second device may be a sound box, a television, or a mobile phone. Further, the second device may invoke a microphone to start audio recording, to obtain first recording data. The second device sends the first recording data to the first device, so that the first device processes the first recording data based on the first audio capability parameter.

In a possible implementation, a preset application is installed at an application layer of the second device. That a second device sends a first audio capability parameter to a first device includes: The second device sends the first audio capability parameter to the first device by running the preset application. That the second device sends the first recording data to the first device includes: The second device sends the first recording data to the first device by running the preset application.

In other words, for the second device (that is, a slave device of the first device), the second device only needs to install the foregoing preset application (which may be referred to as a proxy app), so that the second device can report an audio capability parameter related to an audio recording capability of the second device to the first device by using the proxy app, and send recorded recording data to the first device. An operating system of the second device does not need to be changed, the first device and the second device may be provided by different vendors, and the second device only needs to install the corresponding application to collaborate with the first device to execute this solution. Therefore, this solution can adapt to devices provided by various vendors, and can be widely applied.

In a possible implementation, after the second device sends the first recording data to the first device, the method further includes: The second device sets a third device as an audio input device (the third device is different from the second device, and the third device is different from the first device). The second device sends a second audio capability parameter to the first device, where the second audio capability parameter is used to indicate a hardware capability of the third device for recording audio and a software capability of the third device for recording audio. The second device sends second recording data recorded by the third device to the first device, so that the first device processes the second recording data based on the second audio capability parameter.

In other words, when the second device is connected to another audio input device (for example, the third device), the second device may serve as a master device of the third device, and re-report an audio capability parameter (that is, the second audio capability parameter) of the second device to the first device, where the second audio capability parameter reflects an audio recording capability of the third device, so that the first device can process recording data based on a new audio capability parameter, so as to implement an audio switching function.

In a possible implementation, after the second device sends the first recording data to the first device, the method further includes: When an audio recording capability of the second device changes, the second device updates the first audio capability parameter to a third audio capability parameter. The second device sends the third audio capability parameter to the first device. The second device sends recorded third recording data to the first device, so that the first device processes the third recording data based on the third audio capability parameter.

In other words, when the audio recording capability of the second device changes, the second device may re-report an audio capability parameter (that is, the third audio capability parameter) of the second device, so that the first device can process, based on a new audio capability parameter, recording data reported by the second device, so as to implement an audio switching function.

In a possible implementation, the method further includes: The second device receives an audio recording policy sent by the first device, where the audio recording policy is determined by the first device based on the first audio capability parameter. In this case, the second device may record audio according to the audio play policy, to obtain the first recording data. In other words, the first device serving as a master device may indicate, based on an audio capability parameter of the second device, specific processing that needs to be performed by the second device during recording, so as to fully use an audio capability of the second device. This provides better user audio experience.

According to a seventh aspect, this application provides an audio control method, including: After a first device establishes a network connection to a second device, the first device may obtain a device selection policy corresponding to the second device by using the second device as a slave device. Subsequently, when the first device obtains to-be-played first audio data (the first audio data is of a first type), the first device may determine, based on the first type and the device selection policy, whether the first audio data is allowed to be played by the second device, that is, determine whether an audio output device corresponding to the first audio data is the second device. The first device may send, if the first audio data is allowed to be played by the second device, the first audio data to the second device for play.

It can be learned that, when the first device (that is, a master device) outputs audio data to the second device (that is, a slave device) for audio switching, the first device may send, according to the corresponding device selection policy, audio data of a specific type to the second device for play, so as to filter out, for a user, some audio data that is not suitable to be played by the second device, so that different audio output devices can pertinently play corresponding audio to the user, and audio data is more adaptable to an audio output device. This improves user audio experience.

In a possible design method, the device selection policy may specifically include a type of audio data that is allowed to be played by the second device and a type of audio data that is not allowed to be played by the second device. In this case, that the first device determines, based on the first type and the device selection policy, whether the first audio data is allowed to be played by the second device includes: The first device queries, in the device selection policy, whether the second device is allowed to play audio data of the first type. If the second device is allowed to play the audio data of the first type, the first device determines that the first audio data is allowed to be played by the second device; or if the second device is not allowed to play the audio data of the first type, the first device determines that the first audio data is not allowed to be played by the second device.

In this way, when switching audio to the second device, the first device may project, according to the device selection policy, a plurality of types of audio data that are allowed to be played by the second device to the second device for play, but a plurality of types of audio data that are not allowed to be played by the second device in the device selection policy are not projected to the second device for play, so as to filter out, for the user, some audio data that is not suitable to be played by the second device.

In a possible design method, the device selection policy may specifically include an application from which audio data that is allowed to be played by the second device comes and a type of the audio data that is allowed to be played by the second device, and/or an application from which audio data that is not allowed to be played by the second device comes and a type of the audio data that is not allowed to be played by the second device. In other words, whether audio data is allowed to be played by the second device may be set in the device selection policy by using an application as a dimension.

In this case, that the first device determines, based on the first type and the device selection policy, whether the first audio data is allowed to be played by the second device includes: The first device determines that the first audio data comes from a first application. Further, the first device may query, in the device selection policy, whether the second device is allowed to play audio data of the first type from the first application. If the second device is allowed to play the audio data of the first type from the first application, the first device determines that the first audio data is allowed to be played by the second device; or if the second device is not allowed to play the audio data of the first type from the first application, the first device determines that the first audio data is not allowed to be played by the second device.

In this way, when the first device switches audio to the second device, the first device may output, according to a device selection policy, audio data of different types generated by one application to a corresponding audio output device for play, so that different audio output devices can pertinently play audio data of a specific type in a specific application. This improves user audio experience.

In a possible design method, the device selection policy further includes audio output devices corresponding to audio data of different types. Generally, an audio output device corresponding to audio data that is allowed to be played by the second device is the second device, and an audio output device corresponding to audio data that is not allowed to be played by the second device may be another electronic device such as the first device.

Therefore, if the first device determines, according to the device selection policy, that the first audio data is not allowed to be played by the second device, the first device may query, in the device selection policy based on the first type of the first audio data, that a specific audio output device corresponding to the first audio data is a third device (the third device is different from the second device). Further, the first device may send the to-be-played first audio data to the third device for play. In this way, the first audio data that is not suitable to be played by the second device may be split into the third device for play. This avoids omission of audio data to be played by the first device.

In a possible design method, the third device may be an audio output device that accesses the first device most recently other than the second device. In other words, when the first audio data is not suitable to be played by the second device, the first device may select an audio output device for the first audio data according to a last-access-last-priority principle.

In a possible design method, the device selection policy may specifically include a correspondence between audio data of different types and different audio output devices. For example, an audio output device corresponding to audio data of a MUSIC type is a television, a sound box, or a mobile phone. In this case, that the first device determines, based on the first type and the device selection policy, whether the first audio data is allowed to be played by the second device includes: The first device may query, in the device selection policy, whether an audio output device corresponding to audio data of the first type includes the second device. If the audio output device corresponding to the audio data of the first type includes the second device, the first device determines that the first audio data is allowed to be played by the second device; or if the audio output device corresponding to the audio data of the first type does not include the second device, the first device determines that the first audio data is not allowed to be played by the second device.

In a possible design method, the device selection policy may specifically include a correspondence between different applications, audio data of different types, and different audio output devices. For example, an audio output device corresponding to audio data that is of a MUSIC type and that is generated in WeChat is a television, a sound box, or a mobile phone. In this case, that the first device determines, based on the first type and the device selection policy, whether the first audio data is allowed to be played by the second device includes: The first device determines that the first audio data comes from a first application. Further, the first device may query, in the device selection policy, whether an audio output device corresponding to the first type and the first application includes the second device. If the audio output device corresponding to the first type and the first application includes the second device, the first device determines that the first audio data is allowed to be played by the second device; or if the audio output device corresponding to the first type and the first application does not include the second device, the first device determines that the first audio data is not allowed to be played by the second device.

For example, when the second device is an electronic device of a sound box type, it may be set in the device selection policy that the second device is allowed to play audio data of a MUSIC type, and the second device is not allowed to play audio data of a NOTIFICATION type. In this way, the first device may project the audio data of the MUSIC type to a sound box for play, but does not project the audio data of the NOTIFICATION type to the sound box for play, so that disturbance of a notification tone in the first device is avoided when the user plays audio by using the sound box.

For example, when the second device is an electronic device of a vehicle-mounted device type, it may be set in the device selection policy that the second device is allowed to play audio data of a navigation type, and the second device is not allowed to play audio data of a NOTIFICATION type. In this way, the first device may project the audio data of the navigation type to a vehicle-mounted device for play, but does not project the audio data of the NOTIFICATION type to the vehicle-mounted device for play, so that disturbance of a notification tone in the first device is avoided when the user plays audio by using the vehicle-mounted device.

For example, when the second device is an electronic device of a large-screen device type, it may be set in the device selection policy that the second device is allowed to play audio data from the first application, and the second device is not allowed to play audio data from a second application. In this way, the first device may project the audio data of the first application to a large-screen device for play, but does not project the audio data of the second application to the large-screen device for play, so that disturbance of audio generated by an application in the first device is avoided when the user plays audio by using the large-screen device.

For example, regardless of whether the second device is an electronic device of a sound box type, a vehicle-mounted device type, a large-screen device type, or another type, the first device may be specifically an electronic device having strong computing and processing capabilities, such as a mobile phone, a tablet, or a laptop.

In a possible design method, a preset application, for example, a DV app, is installed at an application layer of the first device, and an application framework layer of the first device includes an audio policy module, for example, AudioPolicy. That the first device obtains a device selection policy corresponding to the second device includes: After the first device establishes the network connection to the second device, the preset application may determine a device type of the second device. Further, the preset application may obtain the corresponding device selection policy based on the device type of the second device; and deliver the device selection policy to the audio policy module. In other words, the first device may pre-store device selection policies corresponding to a plurality of audio output devices, and the first device may dynamically deliver a corresponding device selection policy to AudioPolicy based on a device type of a currently connected second device, to adjust an audio output device corresponding to audio data in time according to the device selection policy.

In a possible design method, the application framework layer of the first device further includes an audio processor, for example, AudioFlinger. That the first device determines, based on the first type and the device selection policy, whether the first audio data is allowed to be played by the second device includes: After receiving the first audio data, the audio processor may send a query request to the audio policy module, where the query request includes an identifier of the first type. Therefore, in response to the query request, the audio policy module may determine, according to the device selection policy, whether the first audio data of the first type is allowed to be played by the second device.

In a possible design method, after the first device establishes the network connection to the second device, the method further includes: The first device creates, at a hardware abstraction layer HAL, a first hardware abstraction module corresponding to the second device, for example, a DMSDP audio HAL. That the first device sends, if the first audio data is allowed to be played by the second device, the first audio data to the second device for play includes: The audio processor receives a first indication sent by the audio policy module, where the first indication indicates that the audio output device corresponding to the first audio data is the second device. In response to the first indication, the audio processor may invoke the first hardware abstraction module to send the first audio data to the second device.

In a possible design method, the HAL further includes a second hardware abstraction module corresponding to the third device, for example, a primary HAL or an A2dp HAL. The method further includes: The audio processor receives a second indication sent by the audio policy module, where the second indication indicates that the audio output device corresponding to the first audio data is the third device, that is, the first audio data is not allowed to be played by the second device. Therefore, in response to the second indication, the audio processor may invoke the second hardware abstraction module to send the second audio data to the third device.

In a possible design method, after the first device obtains the device selection policy corresponding to the second device, the method further includes: The first device displays a setting interface for an audio output device. The first device receives setting performed by a user on the device selection policy on the setting interface that corresponds to the second device. In response to the user setting, the first device updates the device selection policy. In this way, the user may set or modify, on the setting interface according to a user requirement, an audio type that is allowed to be played by each audio output device, that is, set a device selection policy corresponding to each audio output device, so that audio data of various types can be distributed by the first device to corresponding audio output devices according to the user setting for play.

In a possible design method, the method further includes: When the second device plays the first audio data, the first device obtains to-be-played second audio data (the second audio data is of a second type), that is, to-be-played audio data includes both the first audio data and the second audio data. Further, the first device may determine, based on the second type and the device selection policy, whether the second audio data is allowed to be played by the second device. If the second audio data is allowed to be played by the second device, the first device may mix the first audio data and the second audio data, and then send mixed audio data to the second device for play; or the first device may send the first audio data and the second audio data that are not mixed to the second device for play. This is not limited in this embodiment of this application.

In a possible design method, the method further includes: After the first device stops sending the first audio data to the second device, the first device obtains to-be-played second audio data (the second audio data is of a second type), that is, to-be-played audio data changes from the first audio data to the second audio data. Further, similar to the first audio data, the first device may determine, based on the second type and the device selection policy, whether the second audio data is allowed to be played by the second device. If the second audio data is allowed to be played by the second device, the first device sends the second audio data to the second device for play. In this way, when playing audio data of different types, the first device may dynamically determine an audio output device corresponding to each channel of audio data according to a device selection policy, so that each channel of audio data can be played by a most appropriate audio output device.

Certainly, if a slave device connected to the first device is updated from the second device to the third device, similar to a process in which the first device switches audio data to the second device for play, the first device may further select, according to a device selection policy corresponding to the third device (that is, a new slave device), an appropriate audio output device to play to-be-played audio data at this time.

According to an eighth aspect, this application provides an audio control method, including: After a first device establishes a network connection to a second device, the first device may obtain a mixing policy corresponding to the second device by using the second device as a slave device. Subsequently, when the first device obtains to-be-played first audio data (the first audio data is of a first type) and second audio data (the second audio data is of a second type), it indicates that a plurality of channels of audio data currently need to be simultaneously played. In this case, the first device may determine, based on the first type, the second type, and the mixing policy, whether the first audio data and the second audio data need to be mixed. If the first audio data and the second audio data do not need to be mixed, the first device may send the first audio data and the second audio data that are not mixed to the second device for play. Correspondingly, if the first audio data and the second audio data need to be mixed, the first device may mix the first audio data and the second audio data into third audio data. In this case, an audio feature (for example, loudness or frequency) of the first audio data and/or an audio feature of the second audio data change/changes in the mixed third audio data. Further, the first device may send the mixed third audio data to the second device for play.

It can be learned that, when the first device (that is, a master device) outputs a plurality of channels of audio data to the second device (that is, a slave device) to perform audio switching, the first device may send some audio data not mixed according to the corresponding mixing policy in the plurality of channels of audio data to the second device. In this way, the first audio data and the second audio data that are obtained by the second device from the first device are not mixed. Therefore, the first audio data and the second audio data can truly reflect the audio features of the first audio data and the second audio data, distortion caused by mixing performed by the first device does not occur in the to-be-played first audio data and second audio data that are obtained by the second device, and distortion that occurs when the second device plays the first audio data and the second audio data is also accordingly reduced. This reduces distortion of a plurality of channels of audio data during cross-device play, and improves audio output quality in an audio switching scenario.

In a possible implementation, the mixing policy may specifically include a type of audio data that needs to be mixed and/or a type of audio data that does not need to be mixed.

That the first device determines, based on the first type, the second type, and the mixing policy, whether the first audio data and the second audio data need to be mixed includes: The first device queries, in the mixing policy, whether audio data of the first type needs to be mixed and whether audio data of the second type needs to be mixed. If at least one of the audio data of the first type and the audio data of the second type does not need to be mixed, the first device may determine that the first audio data and the second audio data do not need to be mixed; or if each of the audio data of the first type and the audio data of the second type needs to be mixed, the first device may determine that the first audio data and the second audio data need to be mixed.

In a possible implementation, the mixing policy may specifically include a type of audio data that needs to be mixed and an application from which the audio data that needs to be mixed comes, and/or a type of audio data that does not need to be mixed and an application from which the audio data that does not need to be mixed comes.

That the first device determines, based on the first type, the second type, and the mixing policy, whether the first audio data and the second audio data need to be mixed includes: The first device determines that the first audio data comes from a first application and the second audio data comes from a second application. Further, the first device may query, in the mixing policy, whether audio data of the first type from the first application needs to be mixed and whether audio data of the second type from the second application needs to be performed. If at least one of the audio data of the first type from the first application and the audio data of the second type from the second application does not need to be mixed, the first device may determine that the first audio data and the second audio data do not need to be mixed; or if each of the audio data of the first type from the first application and the audio data of the second type from the second application needs to be mixed, the first device may determine that the first audio data and the second audio data need to be mixed.

In a possible implementation, the mixing policy may specifically include a correspondence between audio data of different types and audio output devices that are not allowed to perform mixing. For example, an audio output device that is not allowed to perform mixing and that corresponds to audio data of a MUSIC type includes a mobile phone, a sound box, and a television.

That the first device determines, based on the first type, the second type, and the mixing policy, whether the first audio data and the second audio data need to be mixed includes: The first device queries, in the mixing policy, whether a first audio output device corresponding to audio data of the first type includes the second device. In addition, the first device queries, in the mixing policy, whether a second audio output device corresponding to audio data of the second type includes the second device. If the first audio output device includes the second device and/or the second audio output device includes the second device, that is, at least one of the first audio data and the second audio data does not need to be mixed, the first device may determine that the first audio data and the second audio data do not need to be mixed; or if the first audio output device does not include the second device and the second audio output device does not include the second device, that is, each of the first audio data and the second audio data needs to be mixed, the first device may determine that the first audio data and the second audio data need to be mixed.

In other words, the first device may query, in the mixing policy based on types of a plurality of channels of current audio data and a type of a current slave device (that is, the second device), whether the second device is allowed to mix each channel of audio data. If one channel of audio data is not allowed to be mixed, the first device may independently transmit the channel of audio data to the second device. This reduces distortion of audio data caused by mixing.

It can be understood that a correspondence between audio data of different types and audio output devices that are allowed to perform mixing may also be set in the mixing policy. For example, an audio output device that is allowed to perform mixing and that corresponds to audio data of a NOTIFICATION type includes a headset and a television.

In this case, corresponding to the foregoing method, the first device may query, in the mixing policy, whether a first audio output device corresponding to audio data of the first type includes the second device. In addition, the first device queries, in the mixing policy, whether a second audio output device corresponding to audio data of the second type includes the second device. If the first audio output device includes the second device and the second audio output device includes the second device, it indicates that each of the first audio data and the second audio data needs to be mixed, and therefore the first device may determine that the first audio data and the second audio data need to be mixed; or if the first audio output device does not include the second device and/or the second audio output device does not include the second device, it indicates that at least one of the first audio data and the second audio data does not need to be mixed, and therefore the first device may determine that the first audio data and the second audio data do not need to be mixed.

In a possible implementation, the mixing policy may specifically include a correspondence between audio data of different types, different applications, and audio output devices that are not allowed to perform mixing. For example, an audio output device that is not allowed to perform mixing and that corresponds to audio data of a MUSIC type from WeChat includes a mobile phone, a sound box, and a television.

That the first device determines, based on the first type, the second type, and the mixing policy, whether the first audio data and the second audio data need to be mixed includes: The first device determines that the first audio data comes from a first application and the second audio data comes from a second application. In addition, the first device queries, in the mixing policy, whether a first audio output device corresponding to the first application and the first type includes the second device. Further, the first device may query, in the mixing policy, whether a second audio output device corresponding to the second application and the second type includes the second device. If the first audio output device includes the second device and/or the second audio output device includes the second device, that is, at least one of the first audio data and the second audio data does not need to be mixed, the first device may determine that the first audio data and the second audio data do not need to be mixed; or if the first audio output device does not include the second device and the second audio output device does not include the second device, that is, each of the first audio data and the second audio data needs to be mixed, the first device may determine that the first audio data and the second audio data need to be mixed.

Similarly, a correspondence between audio data of different types, different applications, and audio output devices that are allowed to perform mixing may also be set in the mixing policy. For example, an audio output device that is allowed to perform mixing and that corresponds to audio data of a NOTIFICATION type from Videos includes a headset and a television.

In this case, corresponding to the foregoing method, the first device may query, in the mixing policy, whether a first audio output device corresponding to the first type and the first application includes the second device. In addition, the first device queries, in the mixing policy, whether a second audio output device corresponding to the second type and the second application includes the second device. If the first audio output device includes the second device and the second audio output device includes the second device, it indicates that each of the first audio data and the second audio data needs to be mixed, and therefore the first device may determine that the first audio data and the second audio data need to be mixed; or if the first audio output device does not include the second device and/or the second audio output device does not include the second device, it indicates that at least one of the first audio data and the second audio data does not need to be mixed, and therefore the first device may determine that the first audio data and the second audio data do not need to be mixed.

For example, when the second device is an electronic device of a sound box type, it may be set in the mixing policy that no mixing needs to be performed when audio data of a MUSIC type is sent to the second device. In this way, the first device may not mix the audio data of the MUSIC type with other audio data, but independently project the audio data of the MUSIC type to the second device for play, so that audio distortion is reduced when the second device plays the audio data of the MUSIC type.

For example, when the second device is an electronic device of a vehicle-mounted device type, it may be set in the mixing policy that no mixing needs to be performed when audio data of a navigation type is sent to the second device. In this way, the first device may not mix the audio data of the navigation type with other audio data, but independently project the audio data of the navigation type to the second device for play, so that audio distortion is reduced when the second device plays the audio data of the navigation type.

For example, when the second device is an electronic device of a large-screen device type, it may be set in the mixing policy that mixing needs to be performed when audio data of a NOTIFICATION type is sent to the second device. In other words, when a plurality of channels of audio data including the audio data of the NOTIFICATION type need to be sent to the second device, because a user does not pay much attention to a notification tone in a large-screen device, the first device may mix the audio data of the NOTIFICATION type with other audio data, and then send mixed audio data to the second device for play.

It can be learned that, when the master device needs to output a plurality of channels of audio data to a slave device, the master device may select not to mix some audio data in the plurality of channels of audio data according to a mixing policy corresponding to a current slave device, and independently transmit the audio data to the slave device for play. This avoids distortion of audio data of a type caused by mixing, and improves audio output quality in an audio switching scenario.

In a possible implementation, that the first device sends the first audio data and the second audio data to the second device includes: The first device packs the first audio data to obtain at least one first data packet. The first device packs the second audio data to obtain at least one second data packet. The first device sends the first data packet and the second data packet to the second device.

For example, the first data packet includes a first identifier, and the first identifier is used to indicate the first audio data; and the second data packet includes a second identifier, and the second identifier is used to indicate the second audio data. Subsequently, the second device may restore, based on the first identifier in the first data packet and the second identifier in the second data packet, the corresponding first audio data and second audio data that are not mixed.

For example, the first data packet includes first feature information, and the first feature information is used to indicate the audio feature of the first audio data; and the second data packet includes second feature information, and the second feature information is used to indicate the audio feature of the second audio data.

For example, the first feature information may include at least one of an application to which the first audio data belongs, a type of the first audio data, a volume level of the first audio data, a play format of the first audio data, and audio track information of the first audio data; and the second feature information may include at least one of an application to which the second audio data belongs, a type of the second audio data, a volume level of the second audio data, a play format of the second audio data, and audio track information of the second audio data.

The feature information can reflect an actual audio feature of the audio data. Therefore, the second device that receives the data packets can truly restore the audio data and a related feature of the audio data by parsing the feature information in the data packets, and then play the corresponding audio data based on the feature information of the audio data, so that distortion of the audio data is reduced in an audio switching process.

For example, regardless of whether the second device is an electronic device of a sound box type, a vehicle-mounted device type, a large-screen device type, or another type, the first device may be specifically an electronic device having strong computing and processing capabilities, such as a mobile phone, a tablet, or a laptop.

In a possible implementation, after the first device establishes the network connection to the second device, the method further includes: The first device obtains a device selection policy corresponding to the second device. After the first device obtains the to-be-played first audio data and second audio data, the method further includes: The first device determines, based on the first type, the second type, and the device selection policy, that audio output devices corresponding to the first audio data and the second audio data each are the second device. In other words, when there are a plurality of channels of audio data to be played by the first device, the first device may first determine an audio output device corresponding to each channel of audio data in the plurality of channels of audio data. If a plurality of channels of audio data correspond to a same audio output device, the first device may further determine, according to the mixing policy, whether to mix the plurality of channels of audio data.

In a possible implementation, a preset application, for example, a DV app, is installed at an application layer of the first device, and an application framework layer of the first device includes an audio policy module, for example, AudioPolicy. That the first device obtains a mixing policy corresponding to the second device includes: The preset application determines a device type of the second device. The preset application obtains the corresponding mixing policy based on the device type of the second device. The preset application delivers the mixing policy to the audio policy module. In other words, the first device may pre-store mixing policies corresponding to a plurality of audio output devices, and the first device may dynamically deliver a corresponding mixing policy to AudioPolicy based on a device type of a currently connected second device, to adjust, in time according to the mixing policy, whether to mix audio data.

In a possible implementation, the application framework layer of the first device further includes an audio processor, for example, AudioFlinger. That the first device obtains to-be-played first audio data and second audio data includes: After the audio processor obtains the first audio data and the second audio data from the application layer, the audio processor may send a query request to the audio policy module, where the query request includes an identifier of the first type and an identifier of the second type. Therefore, in response to the query request, the audio policy module may determine, according to the mixing policy, whether the first audio data of the first type and the second audio data of the second type need to be mixed.

In a possible implementation, after the first device establishes the network connection to the second device, the method further includes: The first device creates, at a hardware abstraction layer HAL, a hardware abstraction module corresponding to the second device, for example, a DMSDP audio HAL. If the first audio data and the second audio data do not need to be mixed, the method further includes: The audio processor may receive a first indication sent by the audio policy module, where the first indication indicates not to mix the first audio data and the second audio data. Therefore, in response to the first indication, the audio processor may encapsulate the first audio data into at least one first data packet, and store the first data packet in a buffer (buffer) of the audio processor. In addition, in response to the first indication, the audio processor may encapsulate the second audio data into at least one second data packet, and store the second data packet in the buffer of the audio processor. Further, the audio processor sends the first data packet and the second data packet in the buffer of the audio processor to the hardware abstraction module.

In this case, that the first device sends the first audio data and the second audio data to the second device includes: The hardware abstraction module may send the first data packet and the second data packet in the buffer of the audio processor to the second device, so that the second device restores the first audio data and the second audio data by parsing the first data packet and the second data packet. In this case, the first device does not need to parse the first data packet and the second data packet. Alternatively, the hardware abstraction module may first parse the first data packet and the second data packet to restore the corresponding first audio data and second audio data, and then send the first audio data and the second audio data to the second device. In this case, the second device does not need to parse the audio data sent by the first device.

In a possible implementation, after the first device obtains the mixing policy corresponding to the second device, the method further includes: The first device displays a setting interface for an audio output device. The first device receives setting performed by a user on the mixing policy on the setting interface that corresponds to the second device. In response to the user setting, the first device updates the mixing policy. In this way, the user may set or modify, on the setting interface according to a user requirement, an audio type that needs or does not need to be mixed when audio data is sent to each audio output device, that is, set a mixing policy corresponding to each audio output device, so as to determine, according to the user setting, whether to mix audio data of various types during switching on the slave device.

In a possible implementation, the method further includes: When the first device obtains the first audio data and the second audio data, the first device may further obtain to-be-played third audio data (the third audio data is of a third type), that is, to-be-played audio data includes three channels of audio data. Further, the first device may determine, based on the first type, the second type, the third type, and the mixing policy, that the first audio data does not need to be mixed but the second audio data and the third audio data need to be mixed. Therefore, the first device may independently send the first audio data that is not mixed to the second device, and the first device mixes the second audio data and the third audio data, and then sends mixed audio data to the second device.

Certainly, the first device may alternatively determine, according to the mixing policy, that none of the first audio data, the second audio data, and the third audio data needs to be mixed, or each of the first audio data, the second audio data, and the third audio data needs to be performed. This is not limited in this embodiment of this application.

In addition, if a slave device connected to the first device is updated from the second device to a third device, similar to a process in which the first device switches a plurality of channels of audio data to the second device for play, the first device may further determine, according to a mixing policy corresponding to the third device (that is, a new slave device), whether a plurality of channels of to-be-played audio data need to be mixed at this time.

According to a ninth aspect, this application provides an audio control method, including: A second device establishes a network connection to a first device. The second device obtains first audio data and second audio data that are not mixed from the first device, where the first audio data is of a first type, and the second audio data is of a second type. The second device plays the first audio data and the second audio data.

In a possible implementation, that the second device obtains first audio data and second audio data that are not mixed from the first device includes: The second device obtains a first data packet corresponding to the first audio data and a second data packet corresponding to the second audio data from the first device. The second device restores the first audio data and the second audio data by parsing the first data packet and the second data packet.

In a possible implementation, the first data packet includes a first identifier, and the first identifier is used to indicate the first audio data; and the second data packet includes a second identifier, and the second identifier is used to indicate the second audio data. That the second device restores the first audio data and the second audio data by parsing the first data packet and the second data packet includes: By parsing the first data packet and the second data packet, the second device restores audio data in a data packet carrying the first identifier to the first audio data, and restores audio data in a data packet carrying the second identifier to the second audio data.

In a possible implementation, the first data packet includes first feature information, and the first feature information is used to indicate an audio feature of the first audio data; and the second data packet includes second feature information, and the second feature information is used to indicate an audio feature of the second audio data. That the second device plays the first audio data and the second audio data includes: The second device plays the first audio data based on the first feature information, and the second device plays the second audio data based on the second feature information.

According to a tenth aspect, this application provides a multi-audio task play method, including: An electronic device displays a first window and a second window on a display interface, where a first application runs in the first window, and a second application runs in the second window. In this case, the electronic device enters a split-screen mode. Further, the electronic device may receive a first operation entered by a user. In response to the first operation, the electronic device may establish an association relationship between the first window and a first audio output device, that is, the user may manually set an audio output device associated with the first window as the first audio output device. Likewise, if the electronic device receives a second operation entered by the user, the electronic device may establish an association relationship between the second window and a second audio output device, that is, the user may manually set an audio output device associated with the second window as the second audio output device. In this way, when the electronic device obtains first audio data from the first application, the electronic device may send, based on the association relationship between the first window and the first audio output device, the first audio data to the first audio output device for play. Similarly, when the electronic device obtains second audio data from the second application, the electronic device may send, based on the association relationship between the second window and the second audio output device, the second audio data to the second audio output device for play.

In other words, when a plurality of windows run on the electronic device, audio data that is output by an audio task in each window may be played by using an audio output device associated with the window. In a multi-window and multi-audio task concurrency scenario, the electronic device may send, to a corresponding audio output device for play, audio data that is output by a related audio task in each window. In this way, a plurality of channels of concurrent audio data of the electronic device do not interfere with each other, the plurality of channels of audio data may be played to different users by using different audio output devices, and each user may listen to corresponding audio data by using an audio output device associated with a related window, without being affected by audio data from another window. This improves user audio experience.

In a possible implementation, after the electronic device displays the first window and the second window on the display interface, the method further includes: The electronic device may display a first dialog box in the first window, where the first dialog box includes at least one first candidate device having an audio play function. For example, the electronic device may display, in the first dialog box, an audio output device that is located in a same Wi-Fi network as the electronic device. The first operation is an operation that the user selects the first audio output device from the at least one first candidate device. Likewise, the electronic device may display a second dialog box in the second window, where the second dialog box includes at least one second candidate device having an audio play function. For example, the electronic device may display, in the second dialog box, an audio output device that is connected to the electronic device and that has an audio play function. The second operation is an operation that the user selects the second audio output device from the at least one second candidate device.

In a possible implementation, that the electronic device establishes an association relationship between the first window and a first audio output device specifically includes: The electronic device may record first audio configuration information of the first window, where the first audio configuration information includes the association relationship between the first window and the first audio output device. Likewise, that the electronic device establishes an association relationship between the second window and a second audio output device specifically includes: The electronic device may record second audio configuration information of the second window, where the second audio configuration information includes the association relationship between the second window and the second audio output device.

In a possible implementation, the method further includes: When the first application runs in the first window, the electronic device may record a first correspondence between the first window and the first application, that is, application information of the first window, to indicate an application running in the first window. Likewise, when the second application runs in the second window, the electronic device may record a second correspondence between the second window and the second application, that is, application information of the second window, to indicate an application running in the second window.

For example, that the electronic device records a first correspondence between the first window and the first application specifically includes: The first application may apply for obtaining a first audio focus of the first window. When the first application obtains the first audio focus, the electronic device may record the first correspondence between the first window and the first application. Likewise, that the electronic device records a second correspondence between the second window and the second application specifically includes: The second application applies for obtaining a second audio focus of the second window. When the second application obtains the second audio focus, the electronic device may record the second correspondence between the second window and the second application.

In other words, the electronic device may set one audio focus (Audio Focus) for each window in the split-screen mode. When an application in each window needs to play an audio task, the application first needs to obtain an audio focus of the window, and the electronic device may maintain an audio focus application corresponding to each window, to determine, when obtaining to-be-played audio data, a window corresponding to an audio focus application from which the audio data comes.

In a possible implementation, before the electronic device sends the first audio data to the first audio output device for play, the method further includes: The electronic device determines that the first audio data comes from the first application. Further, the electronic device may determine, based on the first correspondence, the first window corresponding to the first audio data. Further, the electronic device may determine, based on the first audio configuration information, that an audio output device corresponding to the first audio data is the first audio output device associated with the first window.

Similarly, before the electronic device sends the second audio data to the second audio output device for play, the method further includes: The electronic device determines that the second audio data comes from the second application. Further, the electronic device determines, based on the second correspondence, the second window corresponding to the second audio data. Further, the electronic device may determine, based on the second audio configuration information, that an audio output device corresponding to the second audio data is the second audio output device associated with the second window.

In a possible implementation, the first audio configuration information may further include a type of audio data that is allowed to be played by the first audio output device, and/or volume of the audio data that is allowed to be played by the first audio output device; and the second audio configuration information may further include a type of audio data that is allowed to be played by the second audio output device, and/or volume of the audio data that is allowed to be played by the second audio output device. In this way, the electronic device may output, based on the first audio configuration information and the second audio configuration information, audio data of a specific type to a corresponding audio output device for play, and control volume of the corresponding audio data.

In a possible implementation, if the first audio configuration information includes the volume of the audio data that is allowed to be played by the first audio output device, after the electronic device displays the first window and the second window on the display interface, the method further includes: The electronic device displays a first volume adjustment bar in the first window. If it is detected that the user enters a first volume adjustment operation on the first volume adjustment bar, the electronic device may adjust volume of audio data of a first type in the first audio configuration information, to control volume of audio that is output by the first audio output device, where the first type is a type of audio data being played in the first window or a preset audio data type.

In a possible implementation, if the second audio configuration information includes the volume of the audio data that is allowed to be played by the second audio output device, after the electronic device displays the first window and the second window on the display interface, the method further includes: The electronic device displays a second volume adjustment bar in the second window. If it is detected that the user enters a second volume adjustment operation on the second volume adjustment bar, the electronic device may adjust volume of audio data of a second type in the second audio configuration information, to control volume of audio that is output by the second audio output device, where the second type is a type of audio data being played in the second window or a preset audio data type.

In a possible implementation, after the electronic device establishes the association relationship between the first window and the first audio output device, the method further includes: In response to a third operation entered by the user, the electronic device updates the first audio configuration information, where updated first audio configuration information includes an association relationship between the first window and a third audio output device.

In a possible implementation, after the electronic device establishes the association relationship between the second window and the second audio output device, the method further includes: In response to a fourth operation entered by the user, the electronic device updates the second audio configuration information, where updated second audio configuration information includes an association relationship between the second window and a fourth audio output device.

In other words, the user may manually update an audio output device associated with each window, to set the audio output device of each window at a granularity of a window according to a user requirement, so that audio data in each window can be distributed to a corresponding audio output device according to the user setting for play.

In a possible implementation, an application framework layer of the electronic device includes an audio policy module (for example, AudioPolicy) and an audio processor (for example, AudioFlinger). The method further includes: When the audio processor receives the first audio data, the audio processor sends a first query request to the audio policy module. In response to the first query request, the audio policy module may determine that the audio output device corresponding to the first audio data is the first audio output device. Similarly, when the audio processor receives the second audio data, the audio processor sends a second query request to the audio policy module. In response to the second query request, the audio policy module may determine that the audio output device corresponding to the second audio data is the second audio output device.

In a possible implementation, the application framework layer of the electronic device includes a window manager, and the window manager may be configured to send the first correspondence between the first window and the first application, the second correspondence between the second window and the second application, the first audio configuration information of the first window, and the second audio configuration information of the second window to the audio policy module. In this way, the audio policy module may determine the audio output devices corresponding to the first audio data and the second audio data based on these parameters.

In addition, when a correspondence between a window and an application is updated or a correspondence between a window and an audio output device is updated, the window manager may send updated application information and audio configuration information to the audio policy module, so that the audio policy module determines an audio output device corresponding to each window based on latest application information and audio configuration information.

In a possible implementation, an HAL of the electronic device includes a first audio abstraction module corresponding to the first audio output device and a second audio abstraction module corresponding to the second audio output device. That the electronic device sends the first audio data to the first audio output device includes: The audio processor sends the first audio data to the first audio output device by using the first audio abstraction module. That the electronic device sends the second audio data to the second audio output device includes: The audio processor sends the second audio data to the second audio output device by using the second audio abstraction module.

For example, the first audio output device may be a sound box, the first audio abstraction module may be a DMSDP audio HAL, and AudioFlinger may send, by using the DMSDP audio HAL, the first audio data to the sound box for play. For another example, the second audio output device may be a Bluetooth headset, the second audio abstraction module may be an A2dp HAL, and AudioFlinger may send, by using the A2dp HAL, the second audio data to the Bluetooth headset for play.

In a possible implementation, the HAL of the electronic device includes a display abstraction module (for example, a display HAL). The method further includes: The display abstraction module obtains first display data corresponding to the first window and second display data corresponding to the second window. Further, the display abstraction module may synthesize the first display data and the second display data into third display data corresponding to the display interface.

For example, if a display output device of the electronic device is a display of the electronic device, after the display abstraction module synthesizes the first display data and the second display data into the third display data, the method further includes: The display abstraction module sends the third display data to the display of the electronic device for display.

For example, if a display output device of the electronic device is a first display device (for example, a television), after the display abstraction module synthesizes the first display data and the second display data into the to-be-displayed third display data, the method further includes:

The display abstraction module sends the third display data to the first display device for display.

In other words, during projection in the split-screen mode, a master device may separately control a distribution process of display data and a distribution process of audio data, and the master device distributes audio data in different windows to corresponding audio output devices for play.

Alternatively, in addition to sending the third display data to the first display device for display, when the display output device of the electronic device is the first display device, that the electronic device sends, based on the association relationship between the first window and the first audio output device, the first audio data to the first audio output device for play specifically includes: The electronic device sends the first audio data and the association relationship between the first window and the first audio output device to the first display device, so that the first display device can send, based on the association relationship between the first window and the first audio output device, the first audio data to the first audio output device for play. Likewise, that the electronic device sends, based on the association relationship between the second window and the second audio output device, the second audio data to the second audio output device for play specifically includes: The electronic device sends the second audio data and the association relationship between the second window and the second audio output device to the first display device, so that the first display device can send, based on the association relationship between the second window and the second audio output device, the second audio data to the second audio output device for play.

In other words, during projection in the split-screen mode, the master device may send both display data and audio data generated in each window to a slave device. In addition, the master device may send both application information and audio configuration information of each window to the slave device, so that the slave device can distribute, based on the application information and the audio configuration information, audio data in different windows of the master device to corresponding audio output devices for play. This implements an isolation effect of preventing pieces of audio data in a plurality of windows from interfering with each other.

In a possible implementation, the HAL of the electronic device may include a display abstraction module (for example, a display HAL). If a display output device corresponding to the first window is a first display device, and a display output device corresponding to the second window is a second display device, the method further includes: The display abstraction module may obtain first display data corresponding to the first window, and send the first display data to the first display device for display. In addition, the display abstraction module may obtain second display data corresponding to the second window, and send the second display data to the second display device for display. In other words, in the split-screen mode, the electronic device may send display data in different windows to different display output devices (including a mobile phone) for display, so as to implement a projection function at a granularity of a window. In this case, pieces of display data in the display output devices do not interfere with each other, and pieces of audio data in the display output devices do not interfere with each other either. This improves user audio experience.

According to an eleventh aspect, this application provides a screen recording method, including: In response to an operation that a user enables a screen recording function in a first device, the first device may display a screen recording device list, where the screen recording device list includes one or more electronic devices that access a same communications network (for example, a same Wi-Fi network) as the first device. If it is detected that the user selects a second device from the screen recording device list, the first device may send a screen recording instruction to the second device, so that the second device can perform a screen recording operation in response to the screen recording instruction. In addition, the first device may perform a screen recording operation to obtain first screen data of the first device; and the first device may obtain second screen data obtained after the second device performs the screen recording operation. In this way, the first device generates a current screen recording file based on the first screen data and the second screen data.

In other words, during screen recording, the user may select to simultaneously record screen data of a plurality of devices such as the first device and the second device in the first device. The first device may generate the current screen recording file based on the screen data recorded by the two devices. The screen recording file can restore audio and an image of the first device, and can also restore audio and an image of the second device, so as to more comprehensively record and restore service scenarios implemented on the first device and the second device. This improves user experience in a distributed system.

In a possible implementation, the first screen data may include first display data and first audio data. The first display data includes display data played by the first device (for example, display data played on a display of the first device) and/or display data collected by the first device (for example, display data collected by a camera of the first device); and the first audio data includes audio data played by the first device (for example, audio data played by a speaker or an earpiece of the first device) and/or audio data collected by the first device (for example, audio data collected by a microphone or a headset of the first device).

In other words, when the first device performs screen recording, there may be a plurality of sources of recorded display data, and there may also be a plurality of sources of recorded audio data. This is not limited in this embodiment of this application.

In a possible implementation, before the first device performs the screen recording operation to obtain the first screen data of the first device, the method further includes: The first device obtains a first screen recording parameter used by the first device to perform the screen recording operation, where the first screen recording parameter includes a display recording parameter and an audio recording parameter. The display recording parameter may include a parameter that needs to be used to record display data, for example, a resolution or a DPI used for screen recording. For another example, the display recording parameter may further indicate a specific source of currently recorded display data, which is, for example, display data collected by the camera or display data played on the display. Similarly, the audio recording parameter may include a parameter that needs to be used by the first device to record audio data, for example, a sampling rate and a sound effect setting of the audio data. For another example, the audio recording parameter may further indicate a specific source of currently recorded audio data, which is, for example, audio data played by the speaker or audio data collected by the microphone.

In this case, that the first device performs a screen recording operation to obtain first screen data of the first device specifically includes: The first device performs recording based on the display recording parameter to obtain the first display data. The first device performs recording based on the audio recording parameter to obtain the first audio data.

Certainly, the first screen recording parameter may alternatively include only a display recording parameter or an audio recording parameter. For example, when the first screen recording parameter includes only the display recording parameter, the first device may perform recording based on the display recording parameter to obtain first display data. In this case, the first display data is the first screen data recorded by the first device. For another example, when the first screen recording parameter includes only the display audio parameter, the first device may perform recording based on the audio recording parameter to obtain first audio data. In this case, the first audio data is the first screen data recorded by the first device.

In a possible implementation, before the first device sends the screen recording instruction to the second device, the method further includes: The first device obtains a second screen recording parameter used by the second device to perform the screen recording operation. Similar to the first screen recording parameter, the second screen recording parameter includes a display recording parameter (for example, a resolution or a DPI) and an audio recording parameter (for example, a sampling rate). That the first device sends a screen recording instruction to the second device includes: The first device may add the second screen recording parameter to the screen recording instruction, and send the screen recording instruction to the second device. In this way, the second device may perform the screen recording operation based on the second screen recording parameter carried in the screen recording instruction, to obtain the second screen data.

In a possible implementation, that the first device obtains the first screen recording parameter and the second screen recording parameter specifically includes: The first device may obtain a first screen recording capability parameter of the first device, where the first screen recording capability parameter is used to reflect a screen recording capability of the first device. In addition, the first device may obtain a second screen recording capability parameter of the second device, where the second screen recording capability parameter is used to reflect a screen recording capability of the second device. The first device may determine, based on the first screen recording capability parameter and the second screen recording capability parameter, the first screen recording parameter corresponding to the first device and the second screen recording parameter corresponding to the second device.

In other words, during multi-device screen recording synchronization, the first device serving as a master device may determine, based on the screen recording capabilities of the first device and the second device, a screen recording parameter currently used by a mobile phone to synchronize screen recording with a slave device. Generally, parameters for processing display data and audio data in the first screen recording parameter and the second screen recording parameter are the same. For example, parameters such as resolutions, DPIs, or sampling rates in the first screen recording parameter and the second screen recording parameter are the same. In this way, the first screen data recorded by the first device by using the first screen recording parameter and the second screen data recorded by the second device by using the second screen recording parameter can be made into a unified screen recording file.

However, screen data sources that are set in the first screen recording parameter and the second screen recording parameter may be different. For example, it may be set in the first screen recording parameter that the first device records display data from the display, and it may be set in the second screen recording parameter that the second device records collected display data from the camera.

In a possible implementation, when a resolution of the first device in the first screen recording capability parameter is greater than a resolution of the second device in the second screen recording capability parameter, a resolution in each of the first screen recording parameter and the second screen recording parameter is a resolution of the second device, that is, a smaller resolution is selected as the resolution in each of the first screen recording parameter and the second screen recording parameter, so as to ensure that both the first device and the second device are capable of performing screen recording based on a resolution in a corresponding screen recording parameter.

Alternatively, when a DPI of the first device in the first screen recording capability parameter is greater than a DPI of the second device in the second screen recording capability parameter, a DPI in each of the first screen recording parameter and the second screen recording parameter is a DPI of the second device, that is, a smaller DPI is selected as the DPI in each of the first screen recording parameter and the second screen recording parameter, so as to ensure that both the first device and the second device are capable of performing screen recording based on a DPI in a corresponding screen recording parameter.

Alternatively, when a sampling rate of the first device in the first screen recording capability parameter is greater than a sampling rate of the second device in the second screen recording capability parameter, a sampling rate in each of the first screen recording parameter and the second screen recording parameter is a sampling rate of the second device, that is, a smaller sampling rate is selected as the sampling rate in each of the first screen recording parameter and the second screen recording parameter, so as to ensure that both the first device and the second device are capable of performing screen recording at a sampling rate in a corresponding screen recording parameter.

Certainly, the first device may alternatively determine, based on a factor such as a current network bandwidth, a service scenario, or a user habit, the first screen recording parameter corresponding to the first device and the second screen recording parameter corresponding to the second device. This is not limited in this application.

In a possible implementation, similar to the first screen data, the second screen data recorded by the second device may include second display data and second audio data. The second display data includes display data played by the second device (for example, display data played on a display of the second device) and/or display data collected by the second device (for example, display data collected by a camera of the second device); and the second audio data includes audio data played by the second device (for example, audio data played by a speaker or an earpiece of the second device) and/or audio data collected by the second device (for example, audio data collected by a microphone or a headset of the second device).

In a possible implementation, that the first device generates a screen recording file based on the first screen data and the second screen data includes: The first device synthesizes the first display data and the second display data into third display data. Further, the first device makes the third display data, the first audio data, and the second audio data into the current screen recording file. In other words, the first device may make the first screen data and the second screen data into one screen recording file, where an image in the screen recording file includes the first display data and the second display data.

Alternatively, the first device may make the first screen data and the second screen data into two screen recording files, for example, a first file and a second file. That the first device generates a screen recording file based on the first screen data and the second screen data includes: The first device makes the first display data and the first audio data into the first file. The first device makes the second display data and the second audio data into the second file.

In a possible implementation, before the first device displays the screen recording device list, the method further includes: The first device detects N electronic devices that access a same communications network as the first device, where N is an integer greater than 0. Further, the first device may determine an electronic device having a screen recording function in the N electronic devices. In this way, the first device may display the determined electronic device having a screen recording function in the screen recording device list for user selection.

In a possible implementation, an application layer of the first device includes a screen recording application, an application framework layer of the first device includes a screen recorder, and an HAL of the first device includes a preset hardware abstraction module. That the first device performs a screen recording operation to obtain first screen data of the first device specifically includes: The screen recording application invokes the screen recorder to perform the screen recording operation, to obtain the first screen data of the first device. That the first device obtains second screen data obtained after the second device performs the screen recording operation specifically includes: The screen recorder obtains, by using the hardware abstraction module, the second screen data obtained after the second device performs the screen recording operation.

In other words, the screen recorder in the first device may not only record the first screen data of the first device, but also indicate a slave device (that is, the second device) of the first device to record the second screen data of the second device. Further, the screen recorder may generate the corresponding screen recording file based on the first screen data and the second screen data. This implements a function of screen recording synchronization between the first device and the second device.

According to a twelfth aspect, this application provides a screen recording method, including: In response to an operation that a user enables a screen recording function in a first device, the first device may display a screen recording device list, where the screen recording device list includes one or more electronic devices that access a same communications network (for example, a same Wi-Fi network) as the first device. If it is detected that the user selects a second device from the screen recording device list, it indicates that the user needs to synchronously perform screen recording on the first device and the second device. In this case, a screen recording application in the first device may obtain a screen recording capability parameter of the second device from the second device, and the screen recording application may obtain a screen recording capability parameter of the first device. Further, the screen recording application determines, based on the screen recording capability parameters of the first device and the second device, a first screen recording parameter used by the first device for current screen recording and a second screen recording parameter used by the second device for screen recording; and the screen recording application may add the second screen recording parameter to a screen recording instruction, and send the screen recording instruction to the second device, to trigger the second device to perform a screen recording operation based on the second screen recording parameter. In addition, the screen recording application may invoke a screen recorder at an application framework layer to perform a screen recording operation based on the determined first screen recording parameter. For example, the screen recorder may obtain, from a display module in real time, display data (that is, first display data) played on a display, and the screen recorder may invoke AudioRecord to obtain, from AudioFlinger in real time, audio data (that is, first audio data) played by a speaker of the first device. In this way, the screen recorder may obtain, in real time, first screen data (the first screen data includes the first display data and the first audio data) recorded by the first device. Alternatively, the first display data may be display data that is collected by a camera and that is obtained by the screen recorder from a camera module, and the first audio data may be audio data that is collected by a microphone of the first device and that is obtained by the screen recorder from AudioFlinger. This is not limited in this application. In addition to obtaining the first screen data recorded by the first device, the screen recorder may further receive second screen data recorded by the second device. Further, the screen recorder may report the first screen data and the second screen data to the screen recording application, and the screen recording application makes a corresponding screen recording file based on the first screen data and the second screen data. The screen recording file can restore audio and an image of the first device by using the first screen data, and can also restore audio and an image of the second device by using the second screen data, so as to more comprehensively record and restore service scenarios implemented on the first device and the second device.

According to a thirteenth aspect, this application provides an audio latency update method, including: After a first device establishes a network connection to a second device, if the second device is set as an audio output device of the first device, the first device may dynamically obtain a first latency, a second latency, and a third latency, where the first latency is a latency generated when audio data is processed in the first device, the second latency is a latency generated when audio data is transmitted between the first device and the second device, and the third latency is a latency generated when audio data is played by the second device. In this way, the first device may dynamically determine a current audio latency based on the first latency, the second latency, and the third latency. For example, audio latency=first latency+second latency+third latency. For another example, audio latency L=k1*first latency+k2*second latency+k3*third latency, where k1+k2+k3=1.

In other words, when the first device needs to project the audio data to the second device for play, the first device may dynamically calculate the current audio latency based on the first latency, the second latency, and the third latency. Subsequently, an audio latency obtained by a related application or a player each time is also a latest audio latency calculated by the first device, and the audio latency can accurately reflect a latency value of current audio data. Therefore, when the related application or the player performs synchronization such as audio-to-video synchronization based on the audio latency, a more accurate synchronization effect can be achieved, so that user experience is improved.

In a possible implementation, after the first device establishes the network connection to the second device, the method further includes: The first device obtains an audio capability parameter of the second device, where the audio capability parameter is used to indicate a hardware capability of the second device for playing audio and a software capability of the second device for playing audio. In this case, that the first device obtains a third latency includes: The first device obtains the third latency from the audio capability parameter. In other words, the second device may calculate an audio latency of the second device (that is, the third latency), add the third latency to the audio capability parameter, and report the audio capability parameter to the first device, so that the first device obtains the third latency from the audio capability parameter of the second device.

In a possible implementation, after the first device obtains the audio capability parameter of the second device, the method further includes: The first device determines an audio policy (for example, a process in which the first device performs audio data processing, for example, determines whether to add a sound effect or whether to perform re-sampling) based on the audio capability parameter. That the first device obtains a first latency includes: The first device determines the first latency according to the audio policy.

For example, the audio policy includes N audio data processing processes, where N is an integer greater than 0. That the first device determines the first latency according to the audio policy includes: The first device determines a time consumed for each of the N processing processes. Further, the first device may obtain the first latency through calculation based on the time consumed for each processing process. For example, the first device may obtain the first latency by adding the time consumed for each of the N processing processes, that is, a time consumed for audio data processing in the first device.

In a possible implementation, if the second device is set as an audio output device of the first device, the audio capability parameter of the second device may be dynamically updated, for example, an audio capability such as a sound effect mode of the second device may be updated. In this case, the first device may further obtain an updated audio capability parameter of the second device. In addition, the first device may update the audio policy based on the updated audio capability parameter. When the audio capability parameter is updated, the first device may be triggered to update the third latency based on the updated audio capability parameter. When the audio policy is updated, the first device may be triggered to update the first latency according to an updated audio policy. In other words, the first latency and the third latency may be dynamically updated, so as to ensure that the first device can obtain a latest audio latency.

In a possible implementation, an HAL of the first device may include a first hardware abstraction module configured to transmit audio data, for example, a Wi-Fi HAL. In this case, after the first device establishes the network connection to the second device, the method further includes: The first device creates a second hardware abstraction module corresponding to the second device such as a DMSDP audio HAL at the HAL. That the first device obtains a second latency includes: The second hardware abstraction module may obtain the second latency from the first hardware abstraction module, that is, a time consumed for audio data transmission between the first device and the second device.

For example, a specific method in which the first hardware abstraction module obtains the second latency may include: The first hardware abstraction module sends a test data packet to the second device. The first hardware abstraction module receives a response data packet sent by the second device in response to the test data packet. Further, the first hardware abstraction module may calculate and store the second latency based on a time interval elapsed since the sending the test data packet until the receiving the response data packet.

It can be understood that the first hardware abstraction module may periodically calculate and store the second latency according to the foregoing method. When the second latency is updated, the first hardware abstraction module may indicate the second hardware abstraction module to obtain a latest second latency. Alternatively, the second hardware abstraction module may periodically obtain the stored latest second latency from the first hardware abstraction module.

In other words, the first latency, the second latency, or the third latency may be dynamically updated. Therefore, when at least one of the first latency, the second latency, or the third latency is updated, the first device may recalculate the current audio latency. Alternatively, the first device may periodically obtain a latest first latency, a latest second latency, and a latest third latency, to periodically calculate a currently latest audio latency.

In a possible implementation, display data that is output by the first device is displayed on a display of the first device. In this scenario, the first device projects the audio data to the second device for play, and reserves the display data in the first device for play. In this case, after the first device determines the current audio latency, the method further includes: A first application running on the first device obtains the audio latency. For example, the first application may invoke a getLatency( ) interface to query AudioService for the current audio latency.

When the first application is a video application, the first application may synchronize audio data and display data of the first application based on the audio latency, that is, perform audio-to-video synchronization, so that a video image seen by a user is synchronized with video sound heard by the user; when the first application is a music application, the first application may synchronize audio data and lyric data of the first application based on the audio latency, so that lyrics seen by a user is synchronized with song sound heard by the user; or when the first application is a Karaoke application, the first application may synchronize audio data and accompaniment music of the first application based on the audio latency, so that audio data recorded by a user is synchronized with the accompaniment music. Certainly, another application may also obtain the current audio latency to perform audio-related synchronization. This is not limited in this embodiment of this application.

In a possible implementation, display data that is output by the first device is displayed on a display of a third device. In this scenario, the first device projects the audio data to the second device for play, and projects the display data to the third device for play. In this case, in addition to determining the current audio latency, the first device may further determine a current display latency. Because the display data is quickly processed in the first device and the third device, a latency generated by the display data in each of the first device and the third device may be ignored. In this case, the display latency may include a latency generated when the display data is transmitted between the first device and the third device. Further, the first device may determine a current synchronization latency based on the obtained audio latency and display latency. Subsequently, a second application running on the first device may synchronize audio data and display data of the second application based on the current synchronization latency. This improves an audio-to-video synchronization effect.

For example, the synchronization latency may be a difference between the audio latency and the display latency, so as to reflect a time difference between audio data and display data that correspond to a same moment and that are played.

In a possible implementation, if a fourth device is set as an audio output device of the first device, and the fourth device is connected to the second device, it indicates that when the first device is connected to the second device, the second device uses the fourth device as an audio output device to play audio, that is, the first device, the second device, and the fourth device are in a cascading relationship. In this case, the first device may obtain the first latency and the second latency according to the foregoing method. A difference is that the first device further needs to obtain a fourth latency, where the fourth latency includes a latency generated when audio data is processed in the second device, a latency generated when audio data is transmitted between the second device and the fourth device, and a latency generated when audio data is played by the fourth device. Further, the first device may obtain a current audio latency through calculation based on the first latency, the second latency, and the fourth latency. For example, the audio latency is a sum of the first latency, the second latency, and the fourth latency.

The fourth latency may be added by the second device to the audio capability parameter and then reported to the first device.

According to a fourteenth aspect, this application provides an audio latency update method, including: A first device establishes a network connection to a second device. If the second device is set as an audio output device and a display output device of the first device, it indicates that the first device projects both audio data and display data to the second device for play. In this scenario, latencies caused by transmission of the audio data and the display data between the first device and the second device are basically the same. Therefore, the first device may obtain a first latency and a second latency, where the first latency is a latency generated when the audio data is processed in the first device, and the second latency is a latency generated when the audio data is played by the second device. Further, the first device may determine a current synchronization latency based on the first latency and the second latency. Similarly, the current synchronization latency is also dynamically updated with the first latency and the second latency. For example, the synchronization latency is a sum of the first latency and the second latency.

Subsequently, after the first device determines the current synchronization latency based on the first latency and the second latency, the method may further include: A first application running on the first device obtains the synchronization latency. Further, the first application may synchronize audio data and display data of the first application based on the obtained synchronization latency.

Because the first device may dynamically calculate a latest synchronization latency, a synchronization latency obtained by an application each time is also the latest calculated synchronization latency, and the synchronization latency can accurately reflect a time difference between current audio data and display data. Therefore, when the application performs synchronization such as audio-to-video synchronization based on the foregoing synchronization latency, audio and an image played by the second device can better achieve an audio-to-video synchronization effect. This improves audio-to-video synchronization user experience.

According to a fifteenth aspect, this application provides an audio/video file play method, including: A first device receives a first operation entered by a user, where the first operation is used to project, to a second device for play, a first file played by the first device (the first file may be an audio file or a video file). When playing the first file, the first device may obtain a data packet in the first file (the first file includes N data packets, where N>0). After receiving the first operation, if the first device receives a first data packet in the first file, the first device may extract a first audio parameter and first audio data from the first data packet, where the first audio data is encoded audio data, and the first audio parameter is an encoding parameter used for encoding the first audio data. Further, the first device may send the first audio parameter to the second device, so that the second device can determine, based on the first audio parameter, whether the second device has a capability of decoding the first audio data. If the second device has the capability of decoding the first audio data, the first device does not need to perform operations such as decoding and re-decoding on the first audio data. Correspondingly, the first device may directly send the first audio data to the second device, and the second device decodes the first audio data and then plays decoded first audio data.

In this way, when the first device projects an audio/video file to the second device, the first device does not need to perform processing such as decoding and re-encoding on encoded audio data in a data packet, but directly sends the encoded audio data in the audio/video file to the second device, so that the second device decodes the audio data and then plays decoded audio data by using a decoding capability of the second device. This shortens a latency of an entire audio/video file projection process, and improves user experience in a cross-device audio/video file play scenario.

In addition, because the audio data sent by the first device to the second device is data that is not decoded in the video file, distortion caused by decoding performed by the first device does not occur in the audio data received by the second device. This implements lossless audio/video file transmission between the first device and the second device, and improves audio/video file fidelity in the cross-device audio/video file play scenario.

In a possible implementation, the first data packet includes a head (head) and a data (data) part. That the first device extracts a first audio parameter and first audio data from the first data packet specifically includes: The first device extracts the first audio parameter from the head of the first data packet. The first device extracts the first audio data from the data part of the first data packet, that is, encoded audio data.

In a possible implementation, the first audio parameter may include at least one of an encoding format (for example, an AAC format), an encoding specification (for example, AAC-LC), a version (for example, a version 1), a sampling rate, or a quantity of sound channels used for encoding the first audio data. Certainly, the first audio parameter may further include another parameter used for encoding the first audio data. This is not limited in this embodiment of this application.

In a possible implementation, if the first file is a video file, the first data packet in the first file further includes first display data in addition to the first audio data, and the first display data is also encoded data. Therefore, after the first device obtains the first data packet in the first file, the method further includes: The first device extracts a first display parameter and the first display data from the first data packet, where the first display parameter is an encoding parameter used for encoding the first display data. Further, the first device may send the first display parameter to the second device, so that the second device determines, based on the first display parameter, whether the second device has a capability of decoding the first display data. If the second device has the capability of decoding the first display data, the first device does not need to perform operations such as decoding and re-decoding on the first display data. Correspondingly, the first device may directly send the first display data to the second device, so that the second device decodes the first display data and then plays decoded first display data.

In this way, when the first device projects a video file to the second device, the first device does not need to perform processing such as decoding and re-encoding on encoded display data in a data packet, but directly sends the encoded display data in the video file to the second device, so that the second device decodes the display data and then plays decoded display data by using a decoding capability of the second device. This shortens a latency of an entire video file projection process, and improves user experience in a cross-device video file play scenario.

In addition, because the display data sent by the first device to the second device is data that is not decoded in the video file, distortion caused by decoding performed by the first device does not occur in the display data received by the second device. This implements lossless video file transmission between the first device and the second device, and improves video file fidelity in the cross-device video file play scenario.

It should be noted that the first device may extract the first audio data, the first display data, the first audio parameter, and the first display parameter from the first data packet at a time. In addition, the first device may simultaneously send the extracted first audio parameter and first display parameter to the second device, or the first device may separately send the first audio parameter and the first display parameter to the second device. This is not limited in this embodiment of this application.

Similar to the extracting the first audio data and the first audio parameter, that the first device extracts a first display parameter and the first display data from the first data packet specifically includes: The first device may extract the first display parameter from the head of the first data packet. The first device may extract the first display data from the data part of the first data packet.

For example, the first display parameter may include at least one of an encoding format (for example, an H.264 format), an encoding specification, a version, or a resolution used for encoding the first display data. Certainly, the first display parameter may further include another parameter used for encoding the first display data. This is not limited in this embodiment of this application.

In a possible implementation, the first device is provided with a first application (for example, a DV app), a second application (for example, Videos), and a first audio/video player (for example, Nuplayer), the first application is configured to communicate with the second device, and the second application is configured to send a data packet in the to-be-played first file to the first audio/video player. After the first device receives the first operation entered by the user, the method further includes: In response to the first operation, the first device may establish a network connection to the second device by running the first application. Further, the first application may send a first broadcast message to the second application, to indicate the second application to project the first file to the second device for play. Therefore, in response to the first broadcast message, the second application may send a first notification message to the first audio/video player, to indicate the first audio/video player to start to project an audio/video file to the second device. Otherwise, the second application may play the first file in the first device according to an existing audio/video play method.

In a possible implementation, the first device further includes a multimedia extractor (for example, MediaExtractor). After the first audio/video player receives the first notification message, if the first audio/video player obtains the first data packet in the first file, a first multimedia extractor may invoke a multimedia extractor to parse the first data packet, to obtain the first audio parameter. In addition, the first multimedia extractor may invoke the multimedia extractor to decapsulate the first data packet, to obtain the first audio data.

In a possible implementation, because audio parameters used to encode audio data in data packets in a same audio/video file are generally unified, if the second device has a capability of decoding the first audio data, it indicates that the second device has a capability of decoding other audio data in the first file. Therefore, after the first device sends the first audio data to the second device, the method further includes: The first audio/video player may obtain a second data packet (that is, a data packet subsequent to the first data packet) of the first file from the second application. Further, the first audio/video player may extract second audio data from the second data packet, and send the second audio data to the second device, so that the second device decodes the second audio data and then plays decoded second audio data. In this case, the first audio/video player does not need to extract an audio parameter from the second data packet, and does not need to send the extracted audio parameter to the second device to trigger the second device to determine whether the second device has a capability of decoding the second audio data. This shortens a latency of projecting the first file to the second device for play.

Certainly, if the second data packet includes second display data, the first audio/video player may further extract the second display data from the second data packet, and send the second display data to the second device, so that the second device decodes the second display data and then plays decoded second display data.

In a possible implementation, after the first device sends the first audio data to the second device, the method further includes: In response to a second operation entered by the user, the first application establishes a network connection to a third device. The first application sends a second broadcast message to the second application, where the second broadcast message is used to indicate the second application to project the first file to the third device for play. In other words, the user switches a slave device connected to the first device from the second device to the third device by performing the second operation. In this case, the first file needs to be continuously played by the third device. Therefore, after receiving the second broadcast message, the first audio/video player may start to project the first file to the third device.

For example, a process of projecting the first file to the third device is similar to the foregoing process of projecting the first file to the second device. For example, the first audio/video player may obtain a third data packet in the first file from the second application. Further, the first audio/video player may extract a second audio parameter and third audio data from the third data packet. Likewise, the third audio data is encoded audio data, and the second audio parameter is an encoding parameter used for encoding the third audio data. Because the first device does not learn whether the third device has a capability of decoding audio data in the first file, the first audio/video player may send the extracted second audio parameter to the third device, so that the third device determines, based on the second audio parameter, whether the third device has a capability of decoding the third audio data. If the third device has the capability of decoding the third audio data, the first audio/video player may directly send the third audio data to the third device, so that the third device decodes the third audio data and then plays decoded third audio data.

Likewise, if the third data packet includes third display data, the first audio/video player may further extract the third display data and a display parameter from the third data packet, and send the display parameter in the third data packet to the third device to trigger the third device to determine whether the third device has a capability of decoding the third display data. If the third device has the capability of decoding the third display data, the first audio/video player may directly send the third display data to the third device, so that the third device decodes the third display data and then plays decoded third display data.

Subsequently, after obtaining another data packet in the first file, the first audio/video player may extract display data and/or audio data from the data packet, and send the extracted display data and/or audio data to the third device, so that the third device decodes the received display data and/or audio data by using a decoding capability of the third device, and then plays decoded data.

In a possible implementation, after the first device sends the first audio data to the second device, the method further includes: In response to a third operation entered by the user, the second application switches the currently played first file to a second file (the second file is an audio file or a video file). The second application creates a second audio/video player (for example, new Nuplayer), where the second audio/video player is configured to receive a data packet from the second file. In other words, the user switches the first file that is being played by the first device to the second file by performing the third operation. In this case, the second file needs to be projected to the second device for play. Therefore, the second application may send a third notification message to the second audio/video player. After receiving the third broadcast message, the second audio/video player may start to project the second file to the second device.

For example, a process of projecting the second file to the second device is similar to the foregoing process of projecting the first file to the second device. For example, the second audio/video player may obtain a data packet in the second file from the second application, for example, a fourth data packet. Further, the second audio/video player may extract a third audio parameter and fourth audio data from the fourth data packet, where the fourth audio data is encoded audio data, and the third audio parameter is an encoding parameter used for encoding the fourth audio data. Because the first device does not learn whether the second device has a capability of decoding audio data in the second file, the second audio/video player may send the third audio parameter to the second device, so that the second device determines, based on the third audio parameter, whether the second device has a capability of decoding the fourth audio data. If the second device has the capability of decoding the fourth audio data, the second audio/video player sends the fourth audio data to the second device, so that the second device decodes the fourth audio data and then plays decoded fourth audio data.

Likewise, if the fourth data packet includes fourth display data, the second audio/video player may further extract the fourth display data and a display parameter from the fourth data packet, and send the display parameter in the fourth data packet to the second device to trigger the second device to determine whether the second device has a capability of decoding the fourth display data. If the fourth device has the capability of decoding the fourth display data, the second audio/video player may directly send the fourth display data to the second device, so that the second device decodes the fourth display data and then plays decoded fourth display data.

Subsequently, after obtaining another data packet in the second file, the second audio/video player may extract display data and/or audio data from the data packet, and send the extracted display data and/or audio data to the second device, so that the second device decodes the received display data and/or audio data by using a decoding capability of the third device, and then plays decoded data.

In a possible implementation, after the first device sends the first audio data to the second device, the method further includes: The first device runs a third application. The first device plays an audio file or a video file from the third application. In other words, when the first device projects an audio/video file to the second device, the first device may further run another application (for example, the third application), and play display data and/or audio data in the another application, so that the user can use an application function provided by the another application in the first device while playing the audio/video file across devices.

According to a sixteenth aspect, this application provides an audio/video file play method, including: A second device receives a first audio parameter sent by a first device, where the first audio parameter is an encoding parameter used for encoding first audio data in a first data packet, and the first data packet is a data packet in a first file. Further, the second device may determine, based on the first audio parameter, whether the second device has a capability of decoding the first audio data. If the second device has the capability of decoding the first audio data, the second device may send a first response message to the first device, to trigger the first device to send the first audio data that is not decoded to the second device. After receiving the first audio data sent by the first device, the second device may decode the first audio data to obtain decoded second audio data. Further, the second device plays the second audio data, so as to implement a cross-device play function for the first file.

In other words, if the second device has an audio decoding capability for the first file played by the first device, the first device may directly send audio data that is not decoded in the first file to the second device, and the second device decodes the received audio data and then plays decoded audio data. This simplifies a process of processing audio data between the first device and the second device during audio/video file projection, and shortens a time consumed for audio/video file projection between the first device and the second device.

In a possible implementation, that the second device decodes the first audio data to obtain decoded second audio data specifically includes: The second device may decode the first audio data by using a first decoding parameter, to obtain the decoded second audio data, where the first decoding parameter corresponds to the first audio parameter. For example, if a format used to encode the first audio data in the first audio parameter is an AAC format, a format used to decode the first audio data in the corresponding first decoding parameter is also an AAC format.

In a possible implementation, the first data packet may further include first display data. In this case, the second device may further receive a first display parameter sent by the first device, where the first display parameter is an encoding parameter used for encoding the first display data. In addition, the second device may determine, based on the first display parameter, whether the second device has a capability of decoding the first display data. If the second device has the capability of decoding the first display data, the first response message sent by the second device to the first device may be further used to indicate the first device to send the first display data to the second device. Subsequently, after receiving the first display data that is not decoded and that is sent by the first device, the second device may decode the first display data by using the decoding capability of the second device, to obtain decoded second display data. Further, the second device may play the second display data.

In other words, if the second device has an image decoding capability for the first file played by the first device, the first device may directly send display data that is not decoded in the first file to the second device, and the second device decodes the received display data and then plays decoded display data. This simplifies a process of processing display data between the first device and the second device during video file projection, and shortens a time consumed for video file projection between the first device and the second device.

In a possible implementation, that the second device decodes the first display data to obtain decoded second display data includes: The second device decodes the first display data by using a second decoding parameter, to obtain the decoded second display data, where the second decoding parameter corresponds to the first display parameter. For example, if a format used to encode the first display data in the first display parameter is an H.265 format, a format used to decode the first display data in the corresponding second decoding parameter is also an H.265 format.

In a possible implementation, because parameters used to encode audio data and display data in data packets in a same audio/video file are generally unified, if the second device has a capability of decoding the first audio data and the first display data, it indicates that the second device has a capability of decoding other audio data and display data in the first file. Therefore, if the second device subsequently receives third audio data in the first file, the second device may directly decode the third audio data and then play decoded third audio data. Similarly, if the second device subsequently receives third display data in the first file, the second device may directly decode the third display data and then play decoded third display data.

In a possible implementation, after the second device determines, based on the first audio parameter, whether the second device has the capability of decoding the first audio data, the method further includes: If the second device has the capability of decoding the first audio data, the second device creates an audio decoder (audio decoder) based on the first audio parameter, where the audio decoder is configured to decode audio data in the first file. After the second device determines, based on the first display parameter, whether the second device has the capability of decoding the first display data, the method further includes: If the second device has the capability of decoding the first display data, the second device creates a video decoder (video decoder) based on the first display parameter, where the video decoder is configured to decode display data in the first file. In other words, after determining that the second device has a capability of decoding audio/video data in the first file, the second device may pre-create a corresponding audio decoder and video decoder. In this way, when the second device receives audio data/display data that is not decoded and that is sent by the first device, the second device may perform decoding by using the created audio decoder/video decoder. This further shortens a time consumed for audio/video file projection between the first device and the second device.

According to a seventeenth aspect, this application provides a device recommendation method, including: A first device may receive a first operation that a user enables a first service. In response to the first operation, the first device may obtain a device parameter associated with the first service from each of N (N is an integer greater than 0) electronic devices that are located in a same communications network as the first device. Further, the first device may predict, based on the obtained device parameter, service quality of executing the first service by each of the N electronic devices. Subsequently, the first device may display a device list based on the service quality of executing the first service by each of the N electronic devices, where the device list includes a device identifier of at least one of the N electronic devices, so as to recommend a specific device suitable for executing the first service to the user.

For example, the first service may be a service related to an audio function, for example, an audio play service or an audio recording service. Alternatively, the first service may be a service related to a display function, for example, a video play service, a video call service, or a game service. Alternatively, the first service may be a service related to a camera function, for example, a video call service or a video recording service.

For example, the device parameter may include one or more of an audio parameter related to the audio function, a display parameter related to the display function, and a camera parameter related to the camera function.

In other words, before executing a service as a master device, the first device may obtain related device parameters of slave devices (for example, the foregoing N electronic devices), to predict service quality of executing the service by each slave device. In this way, the first device may recommend, based on the predicted service quality of executing the service by each slave device, a specific device for executing the service to the user by displaying a device list. This improves service quality when a plurality of devices collaboratively work in a distributed scenario, and improves user experience.

In a possible implementation, the N electronic devices may include a second device, and a device parameter obtained by the first device from the second device may include M (M is an integer greater than 0) parameters. In this case, that the first device predicts, based on the device parameter, service quality of executing the first service by the second device includes: The first device determines M scores that are in a one-to-one correspondence with the M parameter. Further, the first device may calculate, based on the M scores, a service quality score of executing the first service by the second device, where a higher service quality score indicates higher service quality of the first service.

For example, the first device may score the M parameters of the second device one by one, to obtain the corresponding M scores. Further, the first device may perform weighted averaging on the M scores based on a preset weight, to obtain the service quality score of executing the first service by the second device. Certainly, a service quality score of executing the first service by another device in the N electronic devices may also be calculated according to the foregoing method. This is not limited in this application.

In a possible implementation, the N electronic devices may further include a third device. When the service quality score of executing the first service by the second device is higher than a service quality score of executing the first service by the third device, the second device ranks before the third device in the device list. In other words, the first device may recommend a device for executing a related service to the user in the displayed device list by using a device ranking sequence.

In a possible implementation, when the service quality score of executing the first service by the second device is higher than a service quality score of executing the first service by another electronic device in the N electronic devices, it indicates that the second device is a device that is most suitable for executing the first service in the N electronic devices. In this case, the second device may be marked as a recommended device in the device list, so as to prompt the user to use the recommended device to execute the first service.

In a possible implementation, the M parameters may include a first parameter corresponding to a first function, for example, a display parameter corresponding to a display function. Therefore, when a score of a first parameter of the second device is higher than a score of a first parameter of another electronic device in the N electronic devices, it indicates that service quality is high when the second device performs the first function of the first service. In this case, the first device may display first prompt information in the device list, where the first prompt information is used to recommend the user using the second device to implement the first function. In other words, the first device may recommend a device having a prominent function of executing the first service to the user.

In a possible implementation, the M parameters include a first parameter corresponding to a first function, for example, a display parameter corresponding to a display function. Therefore, when a score of a first parameter of the second device is lower than a score of a first parameter of another electronic device in the N electronic devices, it indicates that service quality is low when the second device performs the first function of the first service. In this case, the first device may display second prompt information in the device list, where the second prompt information includes a reason that the user is not recommended using the second device to implement the first function. In other words, the first device may prompt the user with a specific reason that a device is not recommended executing the first service.

In a possible implementation, the N electronic devices include the second device. After the first device displays the device list based on the service quality of executing the first service by each of the N electronic devices, the method further includes: The first device receives a second operation that the user selects the second device in the device list. Therefore, in response to the second operation, the first device may switch the first service to the second device for execution. In this way, the user may switch the first service to the second device based on the device recommended by the first device in the device list, so as to implement a distributed service scenario in which a plurality of devices collaboratively work.

In a possible implementation, after the first device switches the first service to the second device for execution, the method further includes: The first device may obtain a device parameter associated with the first service from each of current slave devices (for example, the N electronic devices that are located in the same communications network as the mobile phone) again. Likewise, the first device may predict, based on the obtained device parameter, service quality of executing the first service by each of the N current electronic devices. When the second device is not an electronic device that executes the first service with highest service quality in the N electronic devices, it indicates that the first service is currently not suitable to be executed by the second device. In this case, the first device may display a first prompt message, where the first prompt message is used to prompt the user to use a recommended device to execute the first service, and the recommended device is one or more of the N electronic devices.

In other words, the first device serving as a master device may obtain a related device parameter of each slave device in real time in a process of executing a service in collaboration with another device (for example, the second device), to predict service quality of executing the service by each slave device. In this way, the first device may recommend, based on the predicted service quality of executing the service by each slave device, a recommended device for executing the service to the user by displaying a prompt message. This improves service quality when a plurality of devices collaboratively work in a distributed scenario, and improves user experience.

In a possible implementation, that the first device predicts, based on the device parameter, service quality of executing the first service by each of the N electronic devices includes: The first device may calculate, based on the device parameter obtained from each electronic device, a service quality score of executing the first service by each electronic device. For example, the first device may score each parameter in the device parameter corresponding to each electronic device, perform weighted averaging on all the scores, and then calculate a service quality score of executing the first service by a corresponding electronic device.

In a possible implementation, the N electronic devices include the third device. When the service quality score of executing the first service by the third device is higher than a service quality score of executing the first service by another electronic device in the N electronic devices, the recommended device is the third device; or when a service quality score of executing a first subtask in the first service by the third device is higher than a service quality score of executing the first subtask in the first service by another electronic device in the N electronic devices, the recommended device is the third device. In other words, when a device other than the second device in the N electronic devices executes the first service or a subtask in the first service with high service quality, the first device may determine the device as the recommended device, to recommend the user using the recommended device to execute the first service.

In a possible implementation, the first service may include a first subtask and a second subtask. For example, a projection service may include an audio play task and a display task. The N electronic devices may include the third device and a fourth device. When a service quality score of executing the first subtask by the third device is higher than a service quality score of executing the first subtask by another electronic device in the N electronic devices, and a service quality score of executing the second subtask by the fourth device is higher than a service quality score of executing the second subtask by another electronic device in the N electronic devices, the recommended device is a device including the third device and the fourth device. In other words, when a plurality of devices collaborate to execute the first service, high service quality may be obtained, and the first device may recommend, in a form of a device group, the user using the plurality of devices to jointly execute the first service.

In a possible implementation, the method further includes: The first device predicts a service quality score of executing the first service by the first device. When the service quality score of executing the first service by the first device is higher than the service quality score of executing the first service by each of the N electronic devices, the recommended device may be the first device. In other words, the master device (that is, the first device) may also be used as a candidate device of the recommended device. When service quality of executing a target service (for example, the first service) by the first device is high, the user may also be prompted to use the first device to execute the first service.

In a possible implementation, the first prompt message may include a device identifier of the recommended device. After the first device displays the first prompt message, the method further includes: The first device receives a third operation that the user selects the recommended device in the first prompt message. In response to the third operation, the first device switches the first service to the recommended device for execution. In this way, the user may quickly switch, by using the device identifier of the recommended device in the first prompt message, the first service to the recommended device with high service quality for execution.

In a possible implementation, when the second device is not an electronic device that executes the first service with highest service quality in the N electronic devices, the method further includes: The first device may notify the second device of the recommended device, so that the second device displays a second prompt message, where the second prompt message is used to prompt the user to use the recommended device to execute the first service. Likewise, the user may quickly switch, in the second device by using the second prompt message, the first service to the recommended device with high service quality for execution.

In a possible implementation, the device parameter may include one or more of an audio parameter, a display parameter, a camera parameter, or a latency. The audio parameter may include one or more of a sound effect algorithm, a quantity of sound channels, a sampling rate, a mixing policy, an audio data encoding/decoding algorithm, a quantity of microphones and models of the microphones, a quantity of horns and models of the horns, and the like that are supported by the slave device. The display parameter may include one or more of a resolution, a frame rate, a display data encoding/decoding algorithm, and the like that are supported by the slave device. The camera parameter may include one or more of an image processing algorithm, a quantity of cameras, resolutions of the cameras, FOVs of the cameras, and the like that are supported by the slave device.

According to an eighteenth aspect, this application provides an ultrasonic positioning method, including: When a first device detects an operation that a user enables a projection function (which may also be referred to as a function such as content continuity or cross-device resumable play), the first device may detect K (K is an integer greater than 1) electronic devices that access a same communications network as the first device. For example, the K electronic devices may be electronic devices that log in to a same account as the first device. Further, the first device may perform ultrasonic positioning on a second device in the K electronic devices, to obtain a positioning result of the second device (that is, a first positioning result). In addition, the first device may perform ultrasonic positioning on a third device in the K electronic devices, to obtain a positioning result of the third device (that is, a second positioning result). In this way, the first device may display an identifier of the second device and an identifier of the third device on an interaction interface, where a location of the identifier of the second device on the interaction interface is related to the first positioning result, and a location of the identifier of the third device on the interaction interface is related to the second positioning result.

In other words, when the user triggers the projection function of the first device, the first device may serve as a master device to perform ultrasonic positioning on the second device and the third device, to obtain the positioning results of the second device and the third device. Therefore, the first device may display the identifiers of the second device and the third device on the interaction interface based on the obtained positioning results, so that the user can intuitively view a currently detected location relationship between the second device and the third device on the interaction interface. In this way, the user can conveniently and accurately select, on the interaction interface based on the location relationship, a device that currently performs projection with the first device. This improves user experience in a projection scenario.

The interaction interface may be all interfaces displayed on a display of the first device, or may be some interfaces displayed on the display of the first device. For example, the first device may display, in a display area 1 of the display, specific content (for example, a video or an image) to be projected, and the first device may display the identifiers of the second device and the third device in a display area 2 of the display. In this case, the display area 2 is the foregoing interaction interface.

In a possible implementation, that the first device performs ultrasonic positioning on a second device includes: The first device may send a first positioning instruction to the second device, where the first positioning instruction is used to trigger the second device to transmit a first ultrasonic signal. When the second device transmits the first ultrasonic signal, the first device may collect the first ultrasonic signal by using N (N is an integer greater than 1) ultrasonic receivers of the first device. Further, the first device may perform positioning on the second device based on a time at which the second ultrasonic signal arrives at each of the N ultrasonic receivers.

For example, the first device may perform, by using a time of arrival (Time of Arrival, TOA) or time difference of arrival (Time Difference Of Arrival, TDOA) algorithm, positioning on the second device based on the time at which the second ultrasonic signal arrives at each of the N ultrasonic receivers.

The N ultrasonic receivers of the first device may be specifically N microphones in a microphone array in the first device. In this case, the first device does not need to additionally add an ultrasonic receiver to adapt to the ultrasonic positioning method provided in this embodiment of this application. This reduces implementation costs and difficulty of indoor positioning.

Certainly, the first device may also perform ultrasonic positioning on the third device according to the foregoing method. This is not limited in this application.

Alternatively, in another possible implementation, that the first device performs ultrasonic positioning on a third device specifically includes: The first device sends a second positioning instruction to the third device, where the second positioning instruction is used to trigger the third device to transmit a second ultrasonic signal. When the third device transmits the second ultrasonic signal, the first device may obtain first ultrasonic data, where the first ultrasonic data includes a time at which the second ultrasonic signal arrives at each of the N ultrasonic receivers in the first device. In addition, the first device may obtain second ultrasonic data, where the second ultrasonic data includes a time at which the second ultrasonic signal arrives at each of M (M is an integer greater than 1) ultrasonic receivers in the second device. The first device performs positioning on the third device based on the first ultrasonic data and the second ultrasonic data.

In other words, the first device serving as a master device may simultaneously enable, in a multi-device collaboration manner by using an existing ultrasonic positioning capability of the second device, ultrasonic receivers of the first device and the second device to receive ultrasonic signals sent by the to-be-positioned third device, so as to perform positioning on the third device based on more received ultrasonic signals. This improves positioning accuracy of the third device, simplifies an operation process of indoor positioning, and reduces implementation costs of indoor positioning.

In a possible implementation, before the first device sends the second positioning instruction to the third device, the method further includes: The first device determines the second device as a collaboration device in the K electronic devices, where the collaboration device is configured to collaborate with the first device to perform ultrasonic positioning. The first device sends a first collaborative positioning instruction to the second device, where the first collaborative positioning instruction is used to trigger the second device to use the M ultrasonic receivers to detect the second ultrasonic signal. The second device may enable the M ultrasonic receivers of the second device in response to the first collaborative positioning instruction, detect the second ultrasonic signal by using the M ultrasonic receivers, and send detected M channels of second ultrasonic signals to the first device as the second ultrasonic data.

In this way, in a positioning scenario, a quantity of microphones for actually collecting an ultrasonic signal transmitted by the to-be-positioned third device increases, and the microphones for collecting an ultrasonic signal are at different locations of the first device and the second device, so that the first device can perform positioning on the third device based on more quantities of ultrasonic signals in more directions. This improves device positioning accuracy.

In a possible implementation, that the first device determines the second device as a collaboration device in the K electronic devices includes: When the second device is an electronic device having a strongest positioning capability in the K electronic devices, the first device determines the second device as the collaboration device. For example, a larger quantity of microphones disposed on an electronic device may indicate a stronger positioning capability of the electronic device. Alternatively, a larger distance between microphones disposed on an electronic device may indicate a stronger positioning capability of the electronic device. Alternatively, higher performance of a hardware parameter such as a processor of an electronic device may indicate a stronger positioning capability of the electronic device. The second device having a high positioning capability collaborates with the first device to perform positioning on the third device. This can improve positioning accuracy of the third device.

In a possible implementation, that the first device performs positioning on the third device based on the first ultrasonic data and the second ultrasonic data includes: When the first device has obtained the positioning result of the second device, M microphones on the second device may be used as microphones of the first device, which is equivalent to that some microphones (for example, the foregoing N microphones) of the first device are disposed on the local device, and the other microphones (for example, the foregoing M microphones) of the first device are disposed on the second device. Further, the first device may perform positioning on the third device based on the obtained first ultrasonic data and second ultrasonic data by using a preset positioning algorithm.

In a possible implementation, the N ultrasonic receivers may be N microphones in a microphone array in the first device; and/or the M ultrasonic receivers may be M microphones in a microphone array in the second device. In this case, that the first device obtains first ultrasonic data includes: The first device detects the second ultrasonic signal by using the N microphones, to obtain N channels of second ultrasonic signals (that is, the first ultrasonic data). Likewise, the second device may detect the second ultrasonic signal by using the M microphones, to obtain M channels of second ultrasonic signals (that is, the second ultrasonic data). In addition, the second device may send the second ultrasonic data to the first device.

In this case, that the first device performs positioning on the third device based on the first ultrasonic data and the second ultrasonic data may include: The first device combines the N channels of second ultrasonic signals and the M channels of second ultrasonic signals into multichannel ultrasonic data, where the multichannel ultrasonic data may include: a waveform of each of the N channels of second ultrasonic signals and a time at which each channel of ultrasonic signal arrives at a corresponding microphone, and a waveform of each of the M channels of second ultrasonic signals and a time at which each channel of ultrasonic signal arrives at a corresponding microphone. Further, the first device may perform positioning on the third device based on the multichannel ultrasonic data by using a preset positioning algorithm.

Alternatively, that the first device performs ultrasonic positioning on a third device may include: The first device sends a second positioning instruction to the third device, where the second positioning instruction is used to trigger the third device to transmit a second ultrasonic signal. When the third device transmits the second ultrasonic signal, the first device may determine a first ultrasonic positioning result based on a time at which the second ultrasonic signal arrives at each of the N ultrasonic receivers in the first device. In addition, the second device may determine a second ultrasonic positioning result based on a time at which the second ultrasonic signal arrives at each of M ultrasonic receivers in the second device. In other words, the first device and the second device may simultaneously perform ultrasonic positioning on the third device. Further, the second device may send the obtained second ultrasonic positioning result to the first device, and the first device corrects, based on the second ultrasonic positioning result, the first ultrasonic positioning result calculated by the first device, and outputs a final positioning result of the third device.

Because the finally output positioning result of the third device is obtained by the first device based on the first ultrasonic positioning result and the second ultrasonic positioning result. This can improve positioning accuracy of the third device.

For example, the N ultrasonic receivers may be N microphones in a microphone array in the first device. In this case, that the first device obtains a first ultrasonic positioning result includes: The first device detects the second ultrasonic signal by using the N microphones. The first device performs positioning on the third device based on a time at which each of the N microphones detects the second ultrasonic signal, to obtain the first ultrasonic positioning result.

Similarly, the M ultrasonic receivers may be M microphones in a microphone array in the second device. In this case, the second device may detect the second ultrasonic signal by using the M microphones, and perform positioning on the third device based on a time at which each of the M microphones detects the second ultrasonic signal, to obtain the second ultrasonic positioning result. Further, the second device may send the second ultrasonic positioning result to the first device.

In a possible implementation, the K electronic devices further include a fourth device. Therefore, in addition to performing ultrasonic positioning on the second device and the third device according to the foregoing method, the first device may further perform ultrasonic positioning on the fourth device according to the foregoing method, to obtain a third positioning result of the fourth device. Further, the first device may display the identifier of the second device, the identifier of the third device, and an identifier of the fourth device on the interaction interface, where the location of the identifier of the second device on the interaction interface is related to the first positioning result, the location of the identifier of the third device on the interaction interface is related to the second positioning result, and a location of the identifier of the fourth device on the interaction interface is related to the third positioning result.

In this way, the user can intuitively view a currently detected location relationship between the second device, the third device, and the fourth device on the interaction interface. Subsequently, the user can conveniently and accurately select, on the interaction interface based on the location relationship, a device that currently performs projection with the first device. This improves user experience in a projection scenario.

In a possible implementation, a process in which the first device performs ultrasonic positioning on the fourth device is similar to a process in which the first device performs ultrasonic positioning on the third device. For example, the first device may send a third positioning instruction to the fourth device, where the third positioning instruction is used to trigger the fourth device to transmit a third ultrasonic signal. When the fourth device transmits the third ultrasonic signal, the first device may obtain third ultrasonic data, where the third ultrasonic data includes a time at which the third ultrasonic signal arrives at each of the N ultrasonic receivers in the first device. In addition, the first device may obtain fourth ultrasonic data, where the fourth ultrasonic data includes a time at which the third ultrasonic signal arrives at each of the M ultrasonic receivers in the second device. Further, the first device may perform positioning on the fourth device based on the third ultrasonic data and the fourth ultrasonic data.

In a possible implementation, in a process in which the first device performs ultrasonic positioning on the fourth device, the first device may further determine both the second device and the third device as collaboration devices, which collaborate with the first device to perform ultrasonic positioning on the fourth device. For example, when the fourth device transmits the third ultrasonic signal, the third device may also serve as the collaboration device to detect the third ultrasonic signal by using Z ultrasonic receivers of the third device, and the third device may send the detected Z third ultrasonic signals to the first device as fifth ultrasonic data. In this way, the first device may perform positioning on the fourth device based on the obtained third ultrasonic data, fourth ultrasonic data, and fifth ultrasonic data, to perform positioning on the fourth device by using more ultrasonic signals. This improves positioning accuracy of the fourth device.

For example, when the first device sends the third positioning instruction to the fourth device, the first device may further send a second collaborative positioning instruction to the second device and the third device (that is, two collaboration devices), where the second collaborative positioning instruction is used to trigger the second device to detect the third ultrasonic signal by using the M ultrasonic receivers, and the second collaborative positioning instruction is used to trigger the third device to detect the third ultrasonic signal by using the Z ultrasonic receivers.

Certainly, if the K electronic devices further include another electronic device such as the fifth device, the first device may still perform ultrasonic positioning on the another electronic device according to the foregoing method. This is not limited in this embodiment of this application.

In a possible implementation, after the first device displays the identifier of the second device and the identifier of the third device on the interaction interface, the method further includes: In response to an operation that the user selects the identifier of the second device, the first device may project, to the second device for play, content played by the first device; or in response to an operation that the user selects the identifier of the third device, the first device may project, to the third device for play, content played by the first device. In other words, the user may select, on the interaction interface based on the displayed location relationship between the electronic devices, a device that needs to perform projection with the first device.

An operation performed by the user on a device on the interaction interface may be specifically an operation such as tapping, sliding, an air gesture, or an operation of inputting a corresponding voice instruction. This is not limited in this application.

According to a nineteenth aspect, this application provides an ultrasonic positioning method, including: A second device may serve as a to-be-positioned electronic device to receive a positioning instruction sent by a first device. In response to the positioning instruction, the second device may transmit a first ultrasonic signal by using an ultrasonic generator (for example, a speaker) of the second device. Subsequently, the first device may perform ultrasonic positioning on the second device based on a time at which the first ultrasonic signal arrives at each ultrasonic receiver in the first device, to obtain a positioning result of the second device.

According to a twentieth aspect, this application provides an ultrasonic positioning method, including: A second device may serve as a collaboration device of a first device to receive a collaborative positioning instruction sent by the first device. In response to the collaborative positioning instruction, the second device may enable M ultrasonic receivers (for example, M microphones, where M is an integer greater than 1) of the second device to detect an ultrasonic signal transmitted by a to-be-positioned electronic device (for example, a third device). The second device may send detected M channels of ultrasonic signals (that is, the second ultrasonic data in the first aspect) to the first device, and the first device performs ultrasonic positioning on the third device based on the second ultrasonic data. Alternatively, the second device may perform positioning on the third device based on a time at which the M channels of ultrasonic signals arrive at each of the M microphones, and send an obtained ultrasonic positioning result (the second ultrasonic positioning result in the first aspect) to the first device, and the first device performs positioning on the third device based on the second ultrasonic positioning result.

According to a twenty-first aspect, this application provides an electronic device (for example, the foregoing first device), including a display, a communications module, one or more processors, one or more memories, and one or more computer programs. The processor is coupled to the communications module, the display, and the memory. The one or more computer programs are stored in the memory. When the first device runs, the processor executes the one or more computer programs stored in the memory, so that the first device performs the method according to any one of the first aspect to the twentieth aspect.

According to a twenty-second aspect, this application provides an electronic device (for example, the foregoing second device), including a communications module, one or more processors, one or more memories, and one or more computer programs. The processor is coupled to the communications module and the memory. The one or more computer programs are stored in the memory. When the second device runs, the processor executes the one or more computer programs stored in the memory, so that the second device performs the method according to any one of the first aspect to the twentieth aspect.

According to a twenty-third aspect, this application provides an audio system, including the first device and the second device. The first device and the second device may perform interaction to perform the method according to any one of the first aspect to the twentieth aspect.

According to a twenty-fourth aspect, this application provides a computer-readable storage medium, including computer instructions. When the computer instructions are run on the first device or the second device, the first device or the second device is enabled to perform the method according to any one of the first aspect to the twentieth aspect.

According to a twenty-fifth aspect, this application provides a computer program product. When the computer program product runs on the first device or the second device, the first device or the second device is enabled to perform the method according to any one of the first aspect to the twentieth aspect.

It can be understood that the electronic device, the audio system, the computer-readable storage medium, and the computer program product provided in the foregoing aspects are all applied to the corresponding methods provided above. Therefore, for beneficial effects that can be achieved by the electronic device, the audio system, the computer-readable storage medium, and the computer program product, refer to the beneficial effects in the corresponding methods provided above. Details are not described herein again.

BRIEF DESCRIPTION OF THE DRAWINGS

FIG. 117 is a schematic diagram 111 of an audio application scenario according to an embodiment of this application;

FIG. 118 is a schematic diagram 112 of an audio application scenario according to an embodiment of this application;

FIG. 119 is a schematic diagram 113 of an audio application scenario according to an embodiment of this application;

FIG. 120 is a schematic diagram 114 of an audio application scenario according to an embodiment of this application;

FIG. 121 is a schematic diagram 115 of an audio application scenario according to an embodiment of this application;

FIG. 122 is a schematic interaction diagram of a device recommendation method according to an embodiment of this application;

FIG. 123 is a schematic diagram 116 of an audio application scenario according to an embodiment of this application;

FIG. 124 is a schematic diagram 117 of an audio application scenario according to an embodiment of this application;

FIG. 125 is a schematic diagram 118 of an audio application scenario according to an embodiment of this application;

FIG. 126 is a schematic diagram 119 of an audio application scenario according to an embodiment of this application;

FIG. 127 is a schematic diagram 120 of an audio application scenario according to an embodiment of this application;

FIG. 128 is a schematic diagram 121 of an audio application scenario according to an embodiment of this application;

Figure 129:
Figure 130:
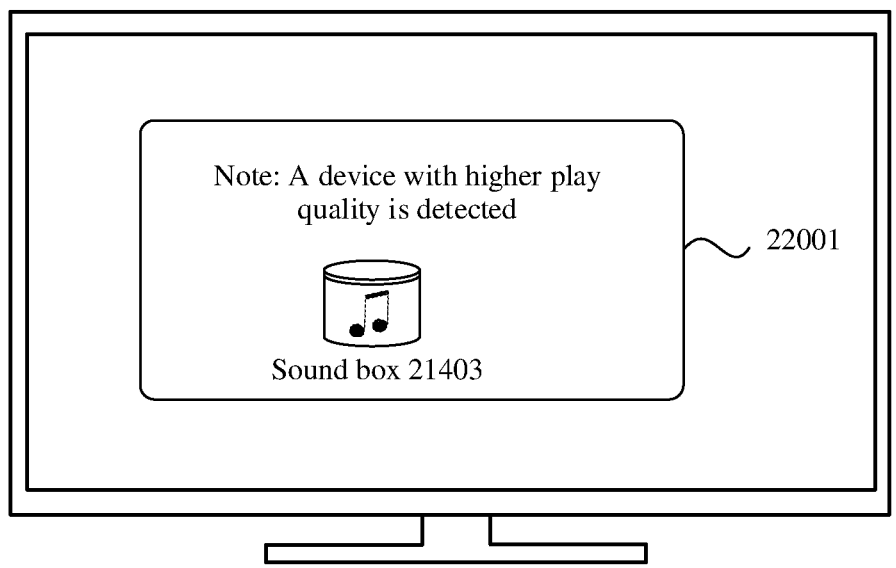
Figure 131:
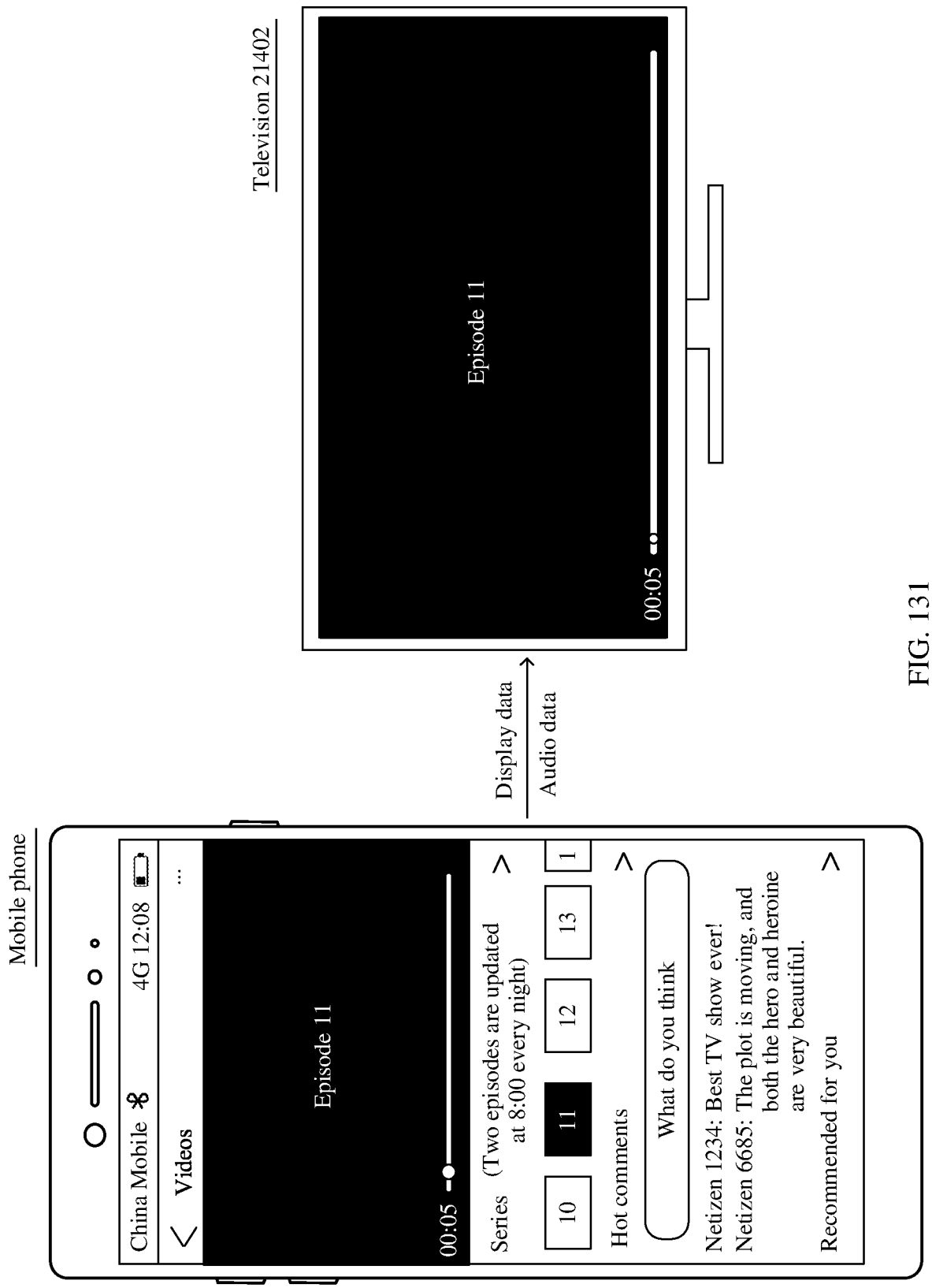
Figure 132:
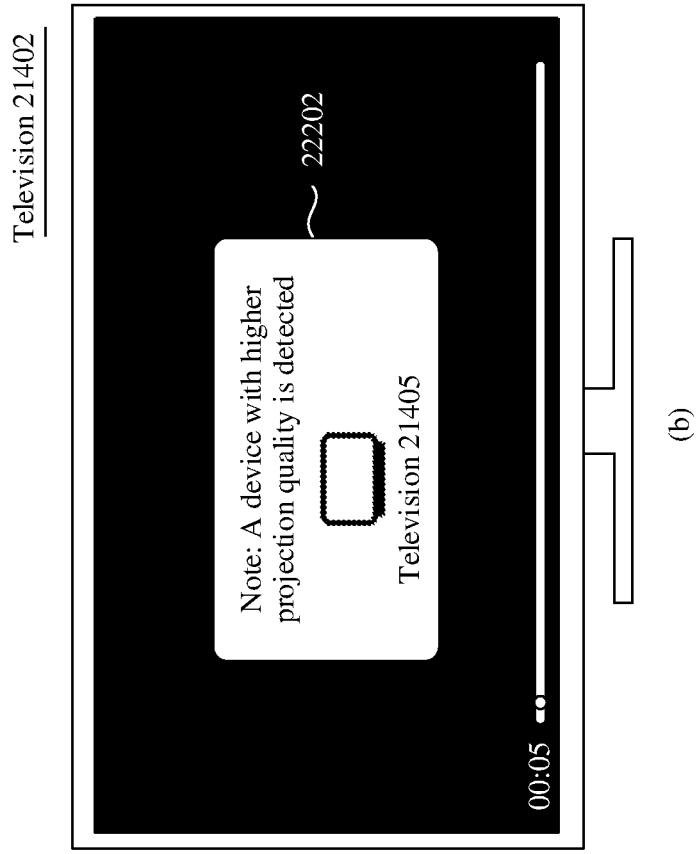
Figure 132:
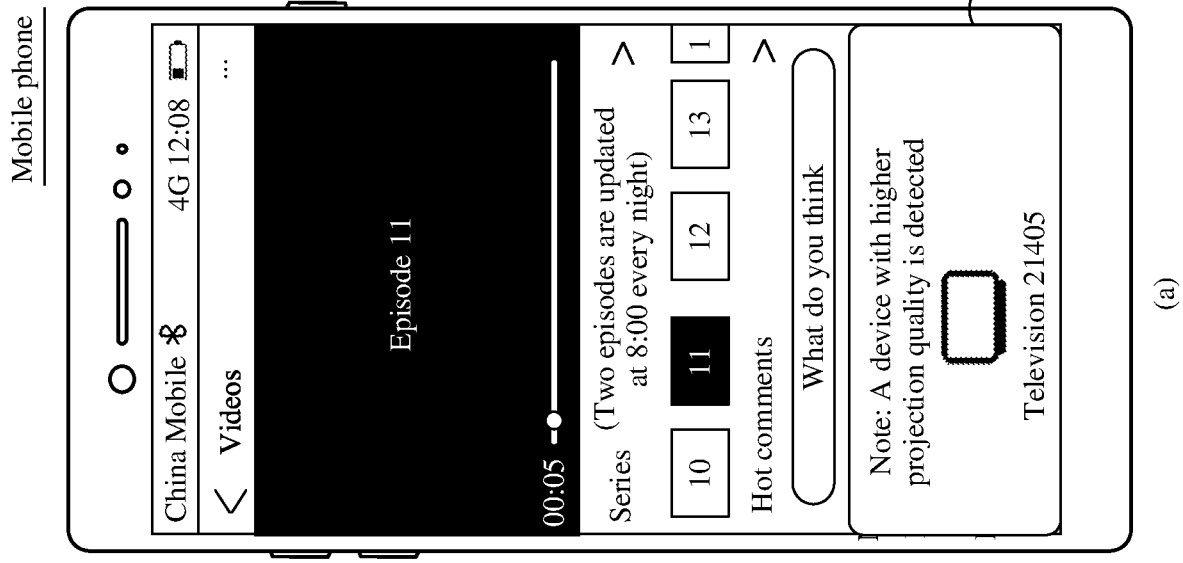
Figure 133:
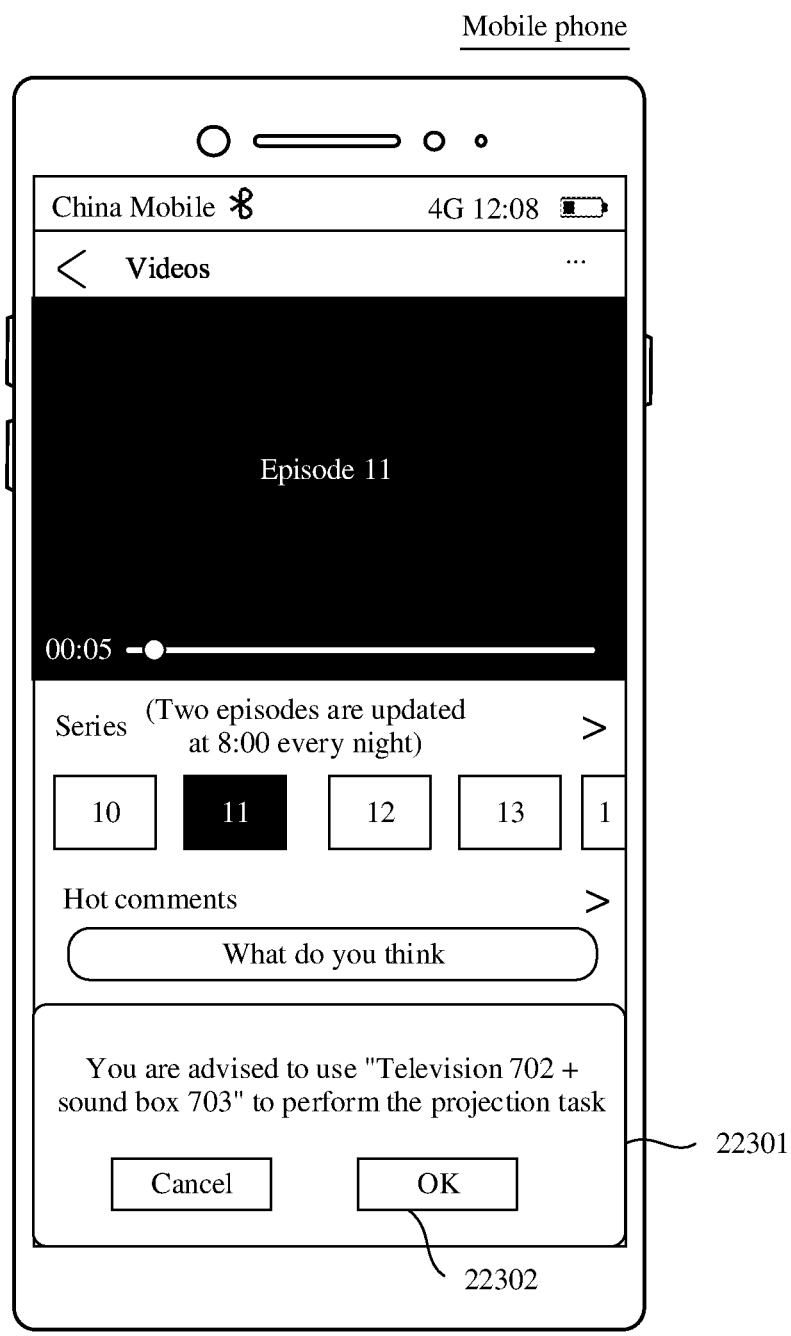
Figure 134:
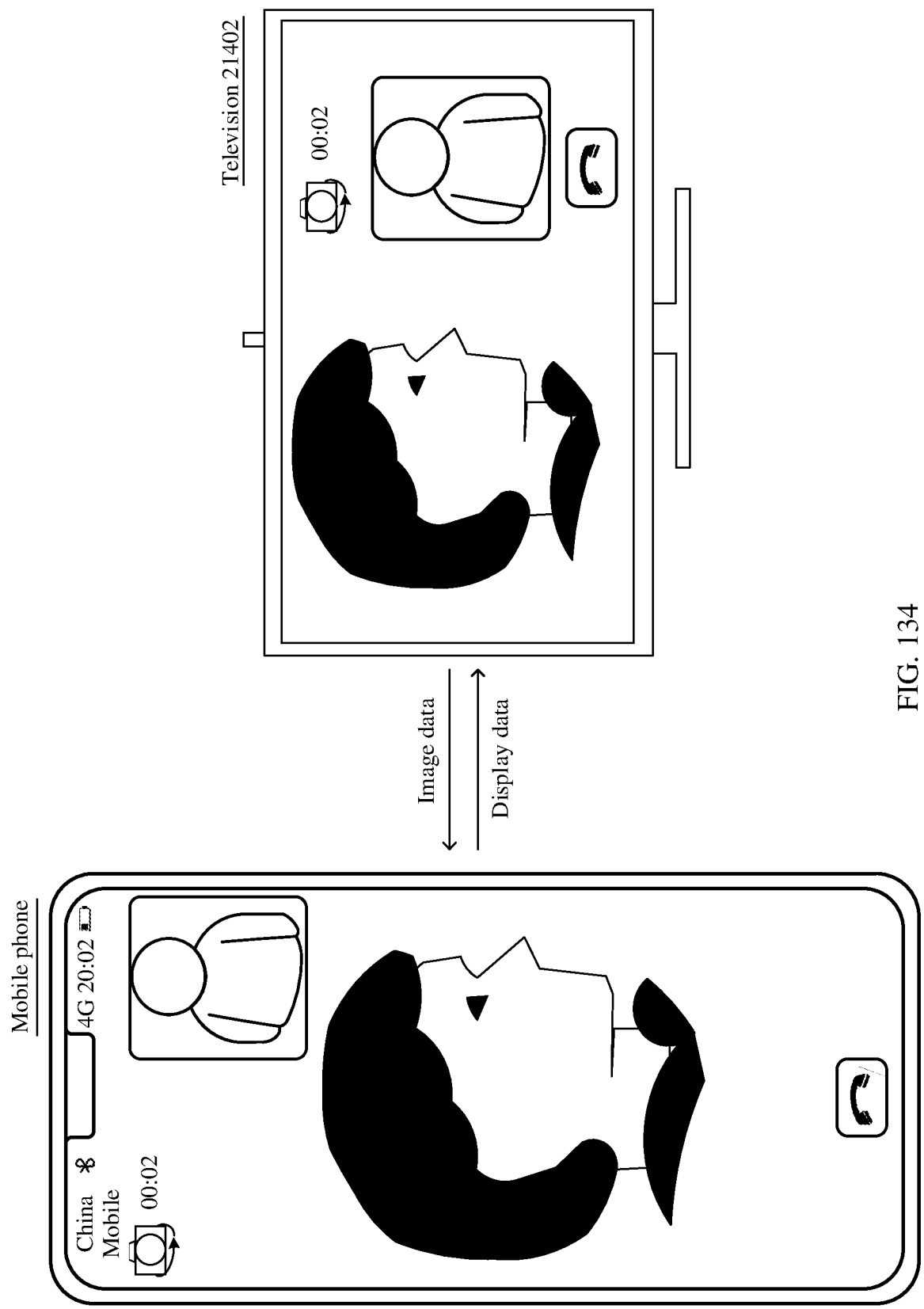
Figure 135:
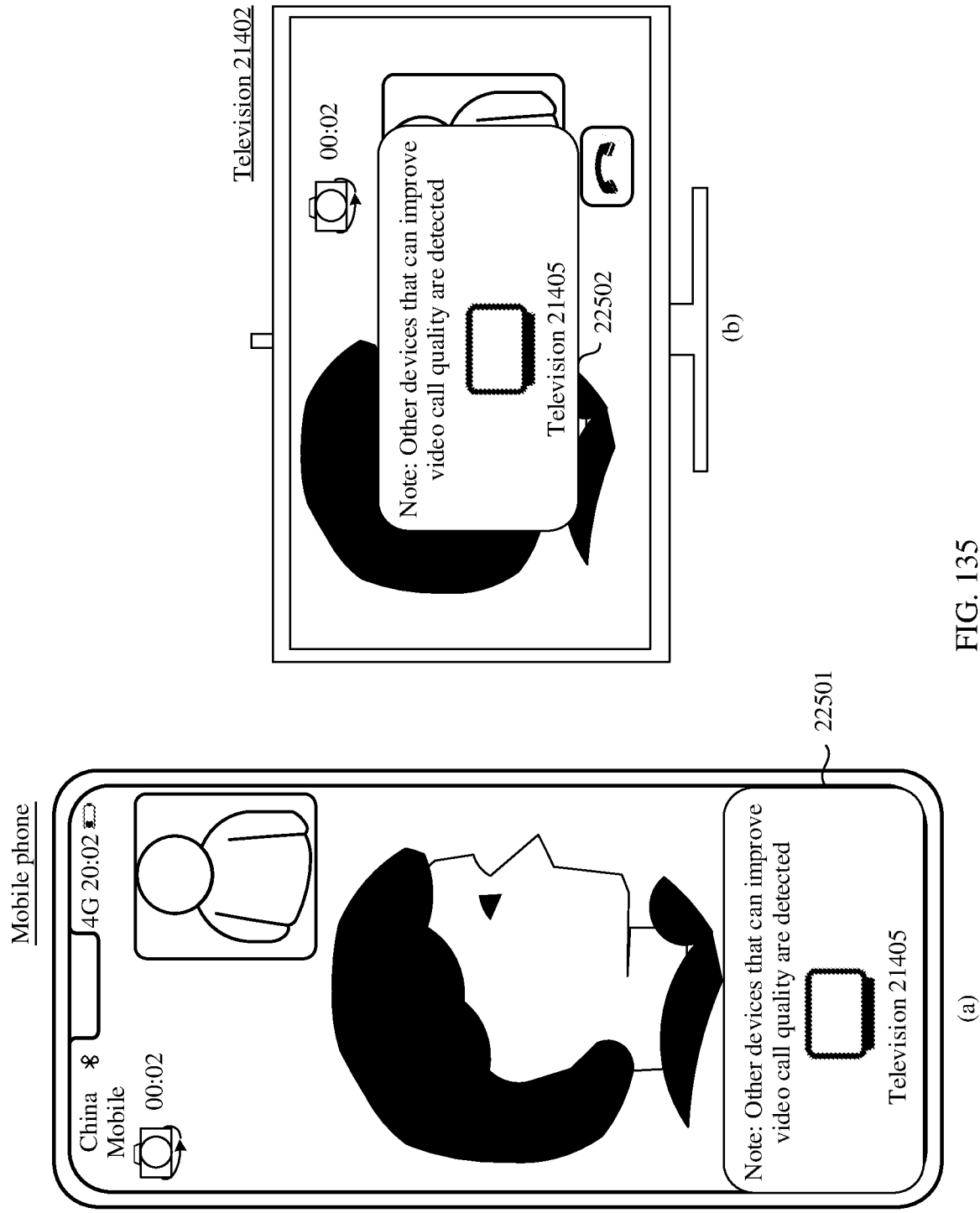
Figure 136:
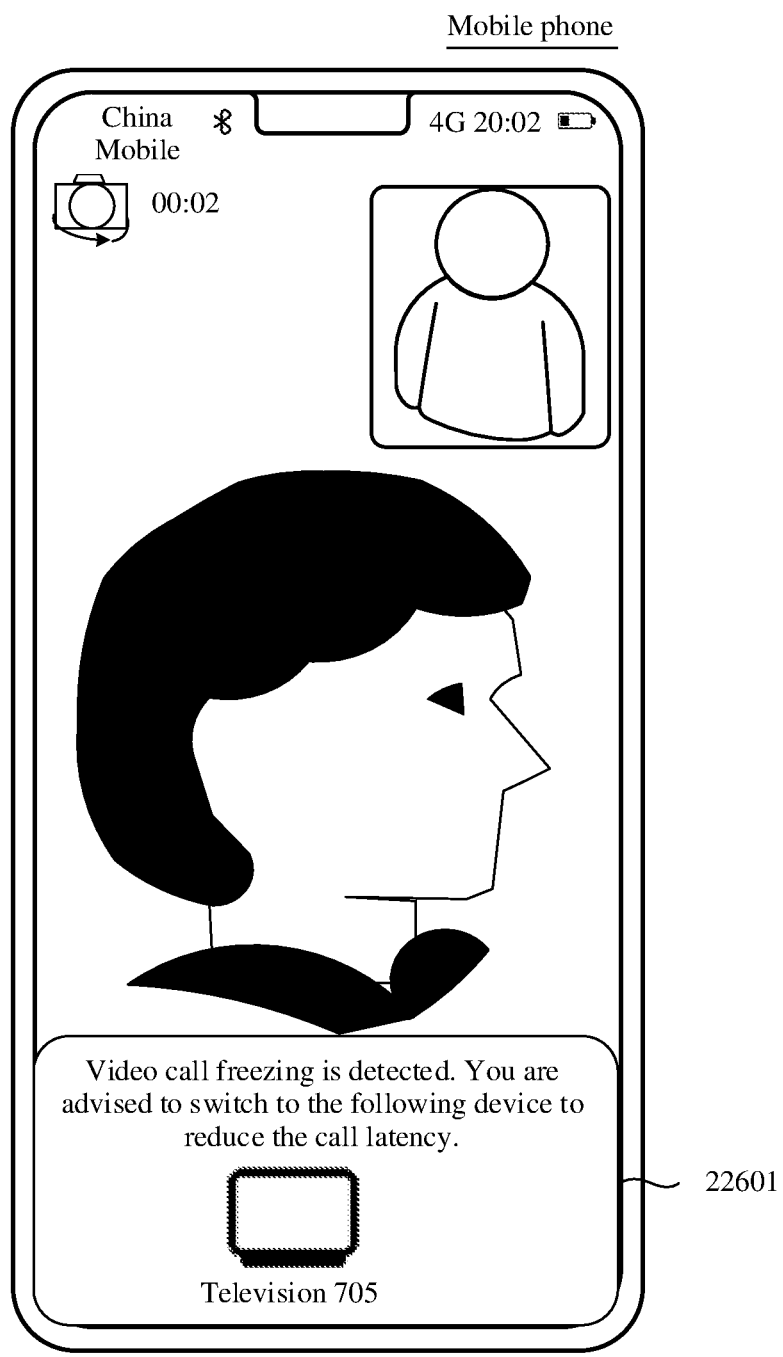
Figure 137A:
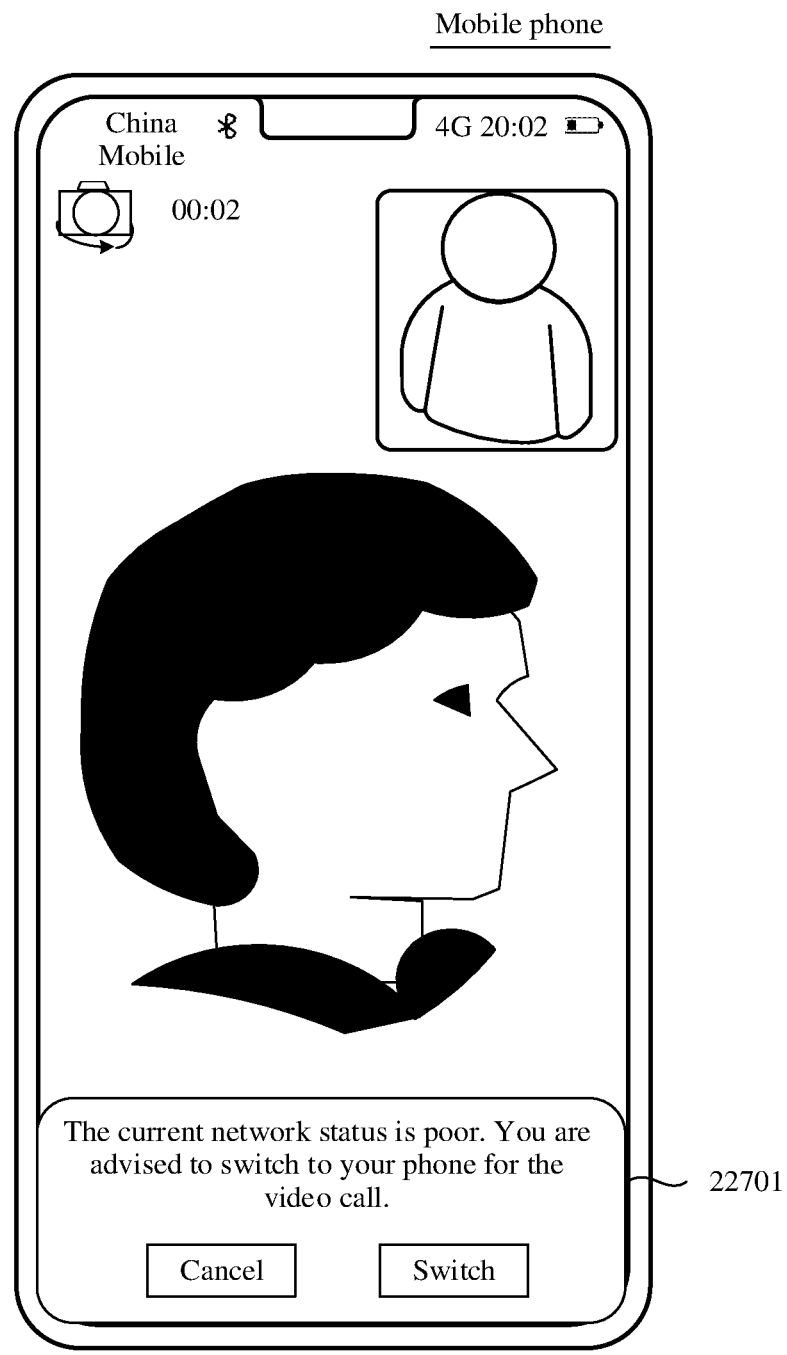
Figure 137B:
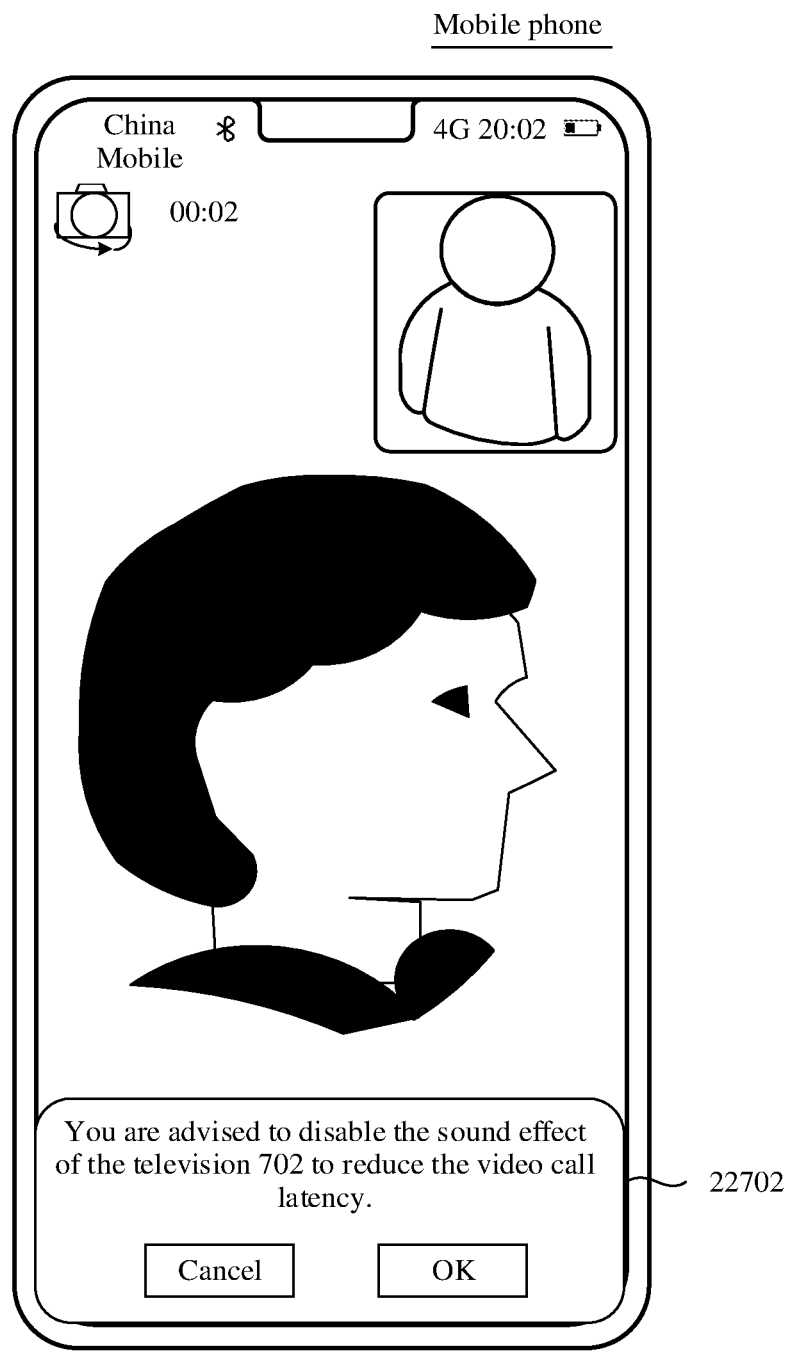
Figure 138A:
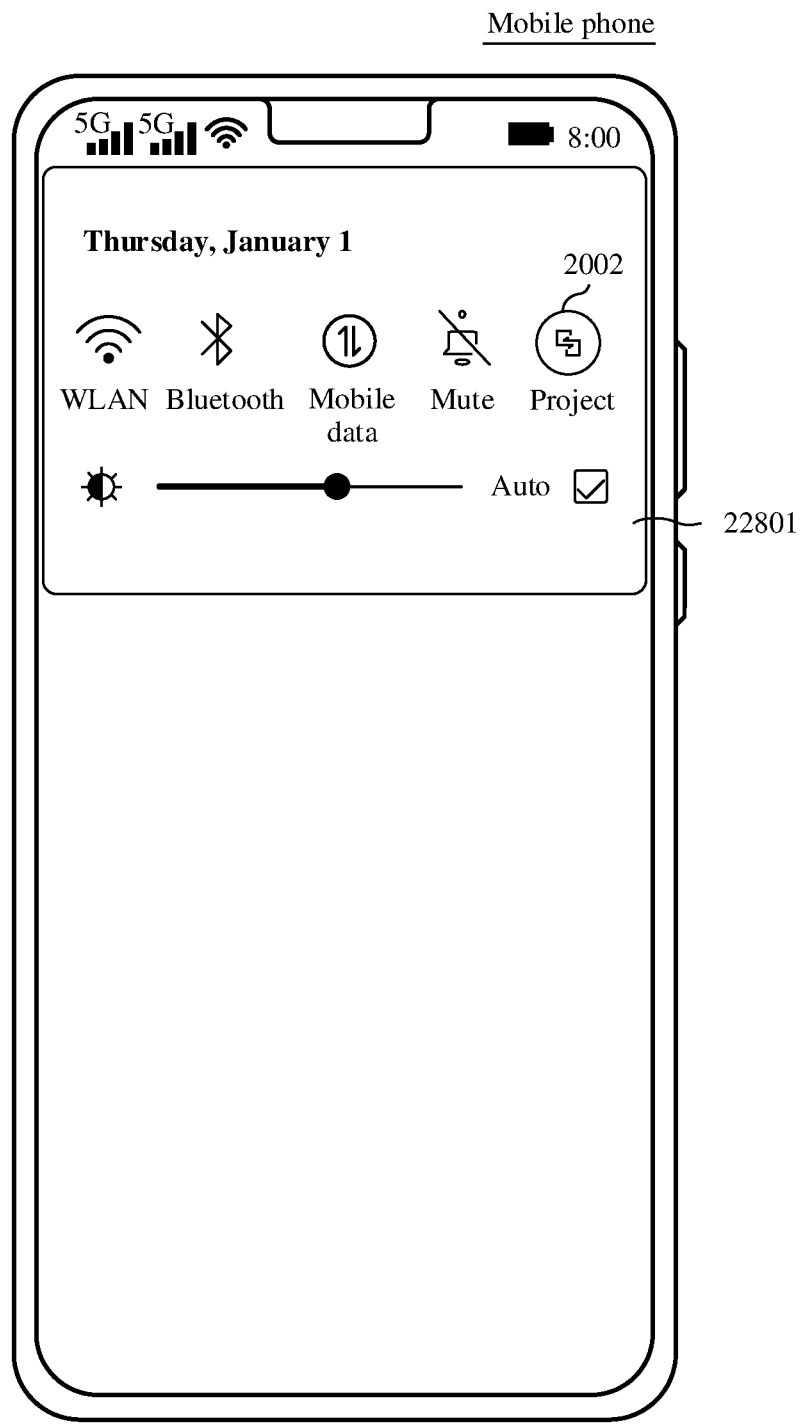
Figure 138B:
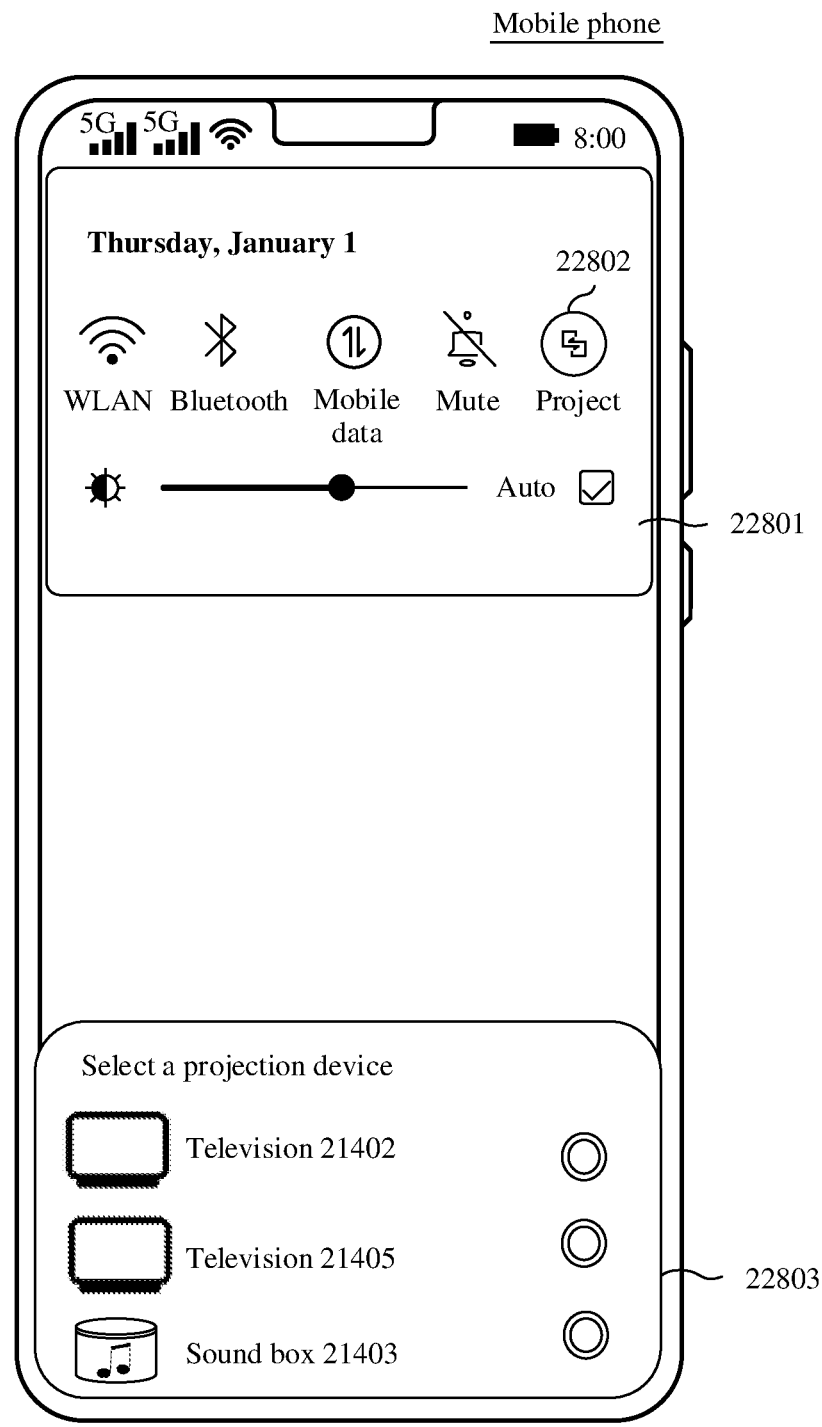
Figure 139:
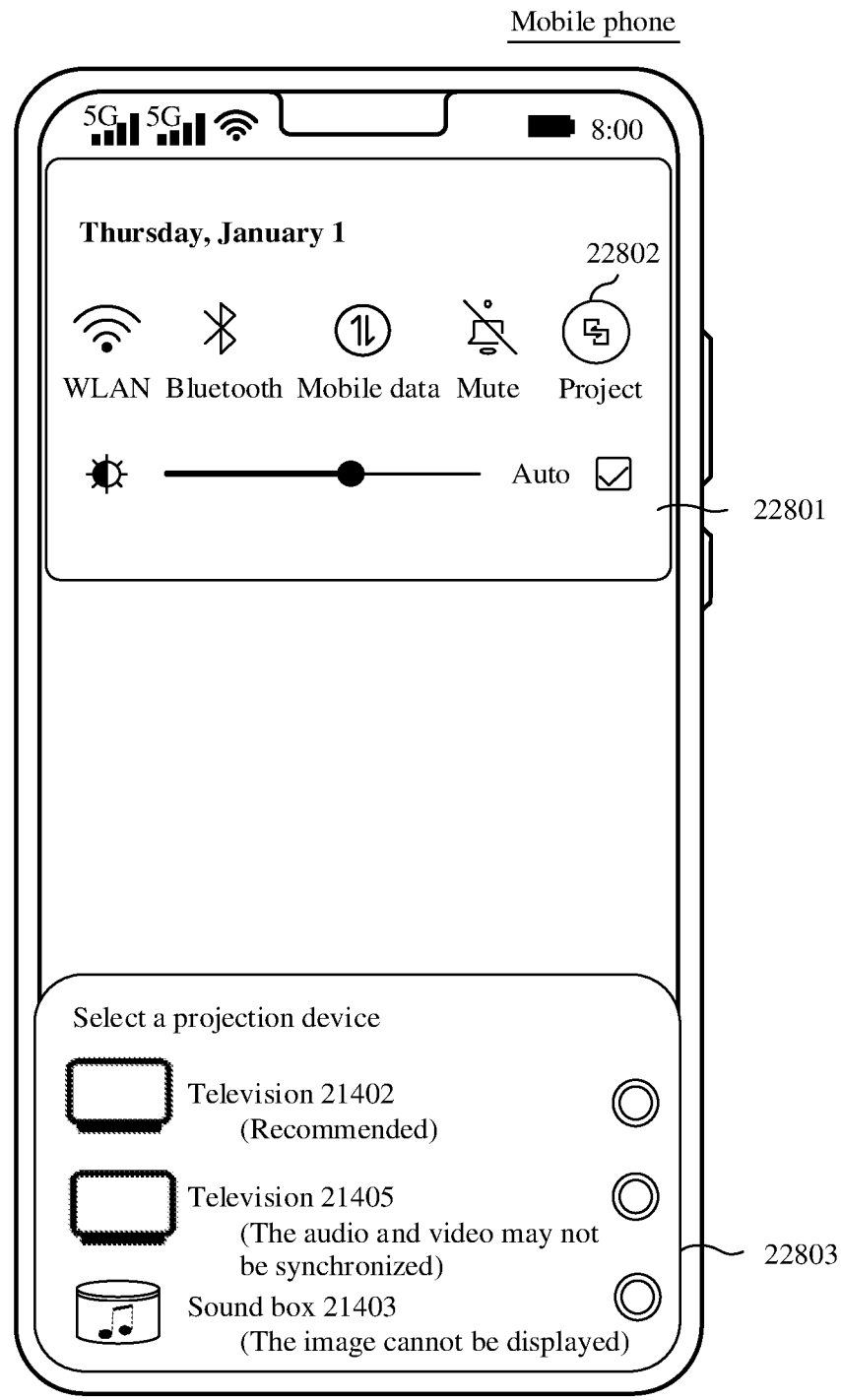
Figure 140:
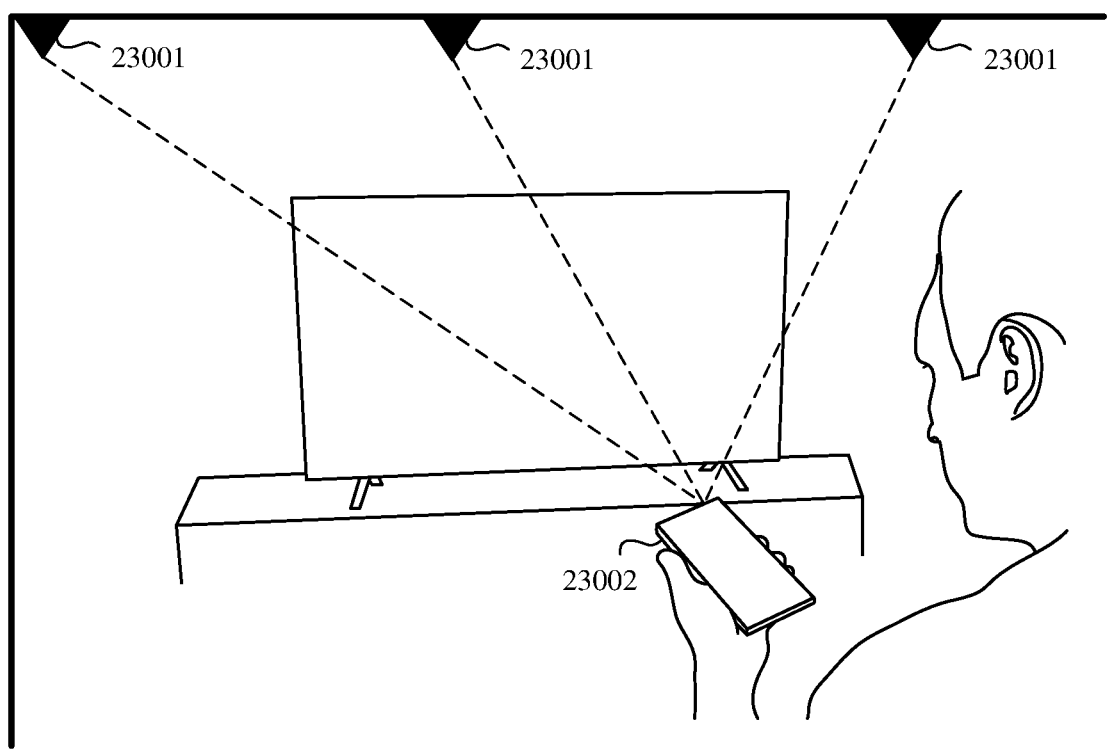
Figure 141:
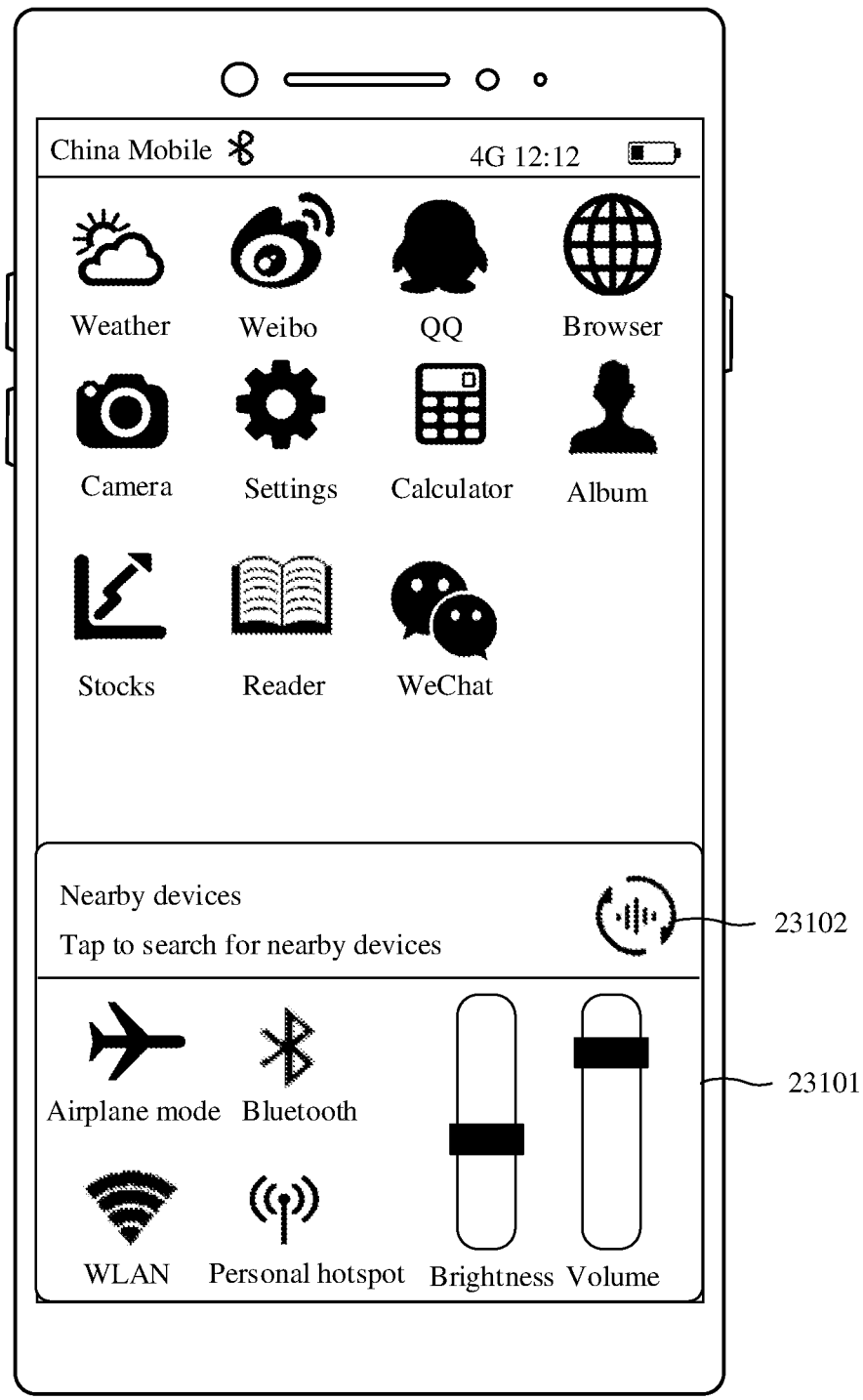
Figure 142:
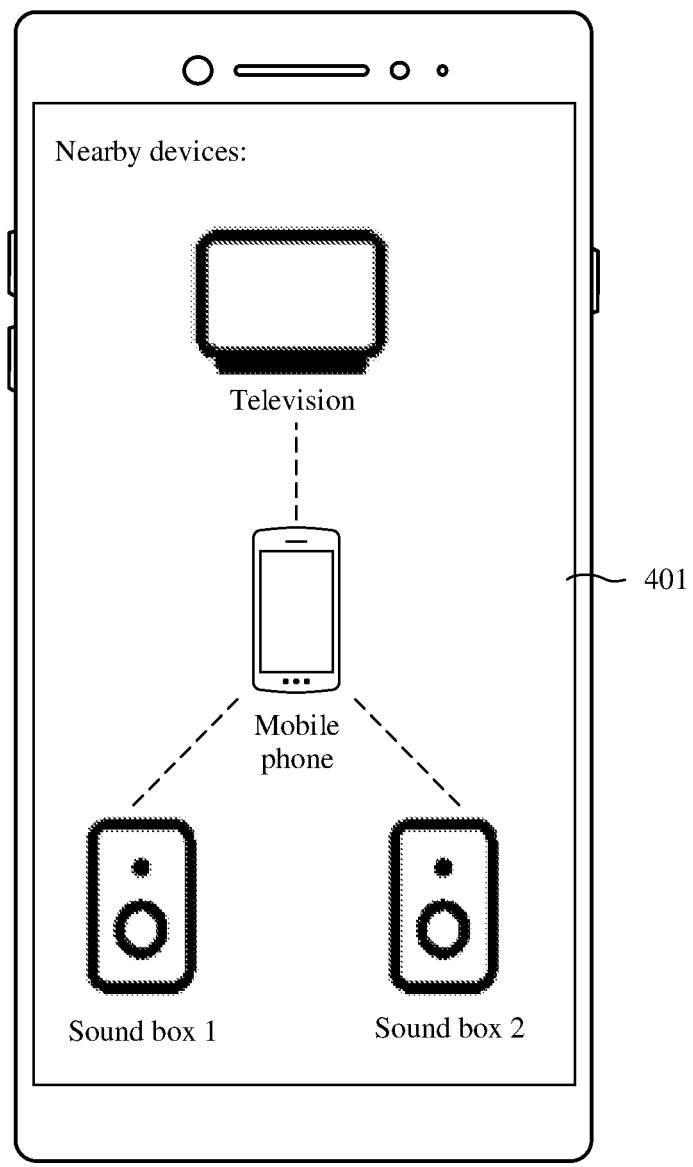
Figure 143:
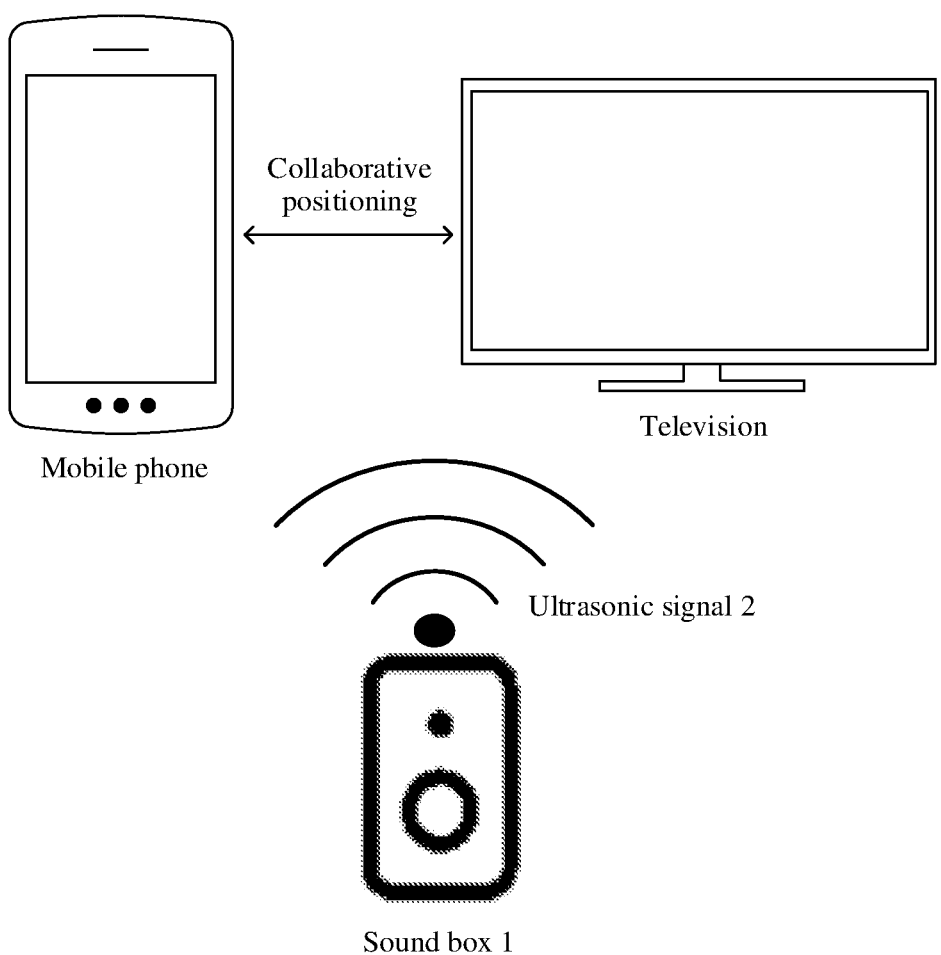
Figure 144:
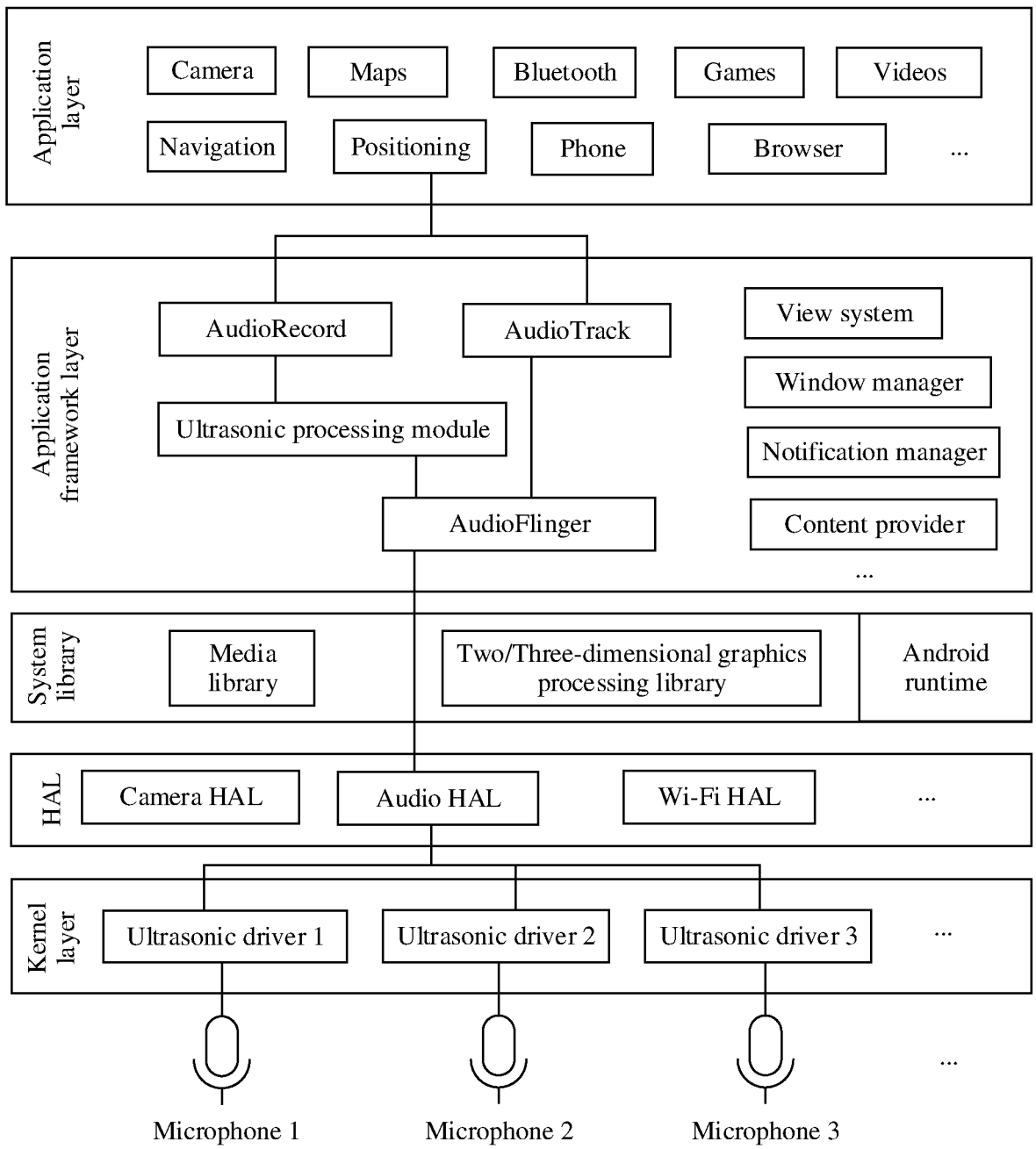
Figure 145:
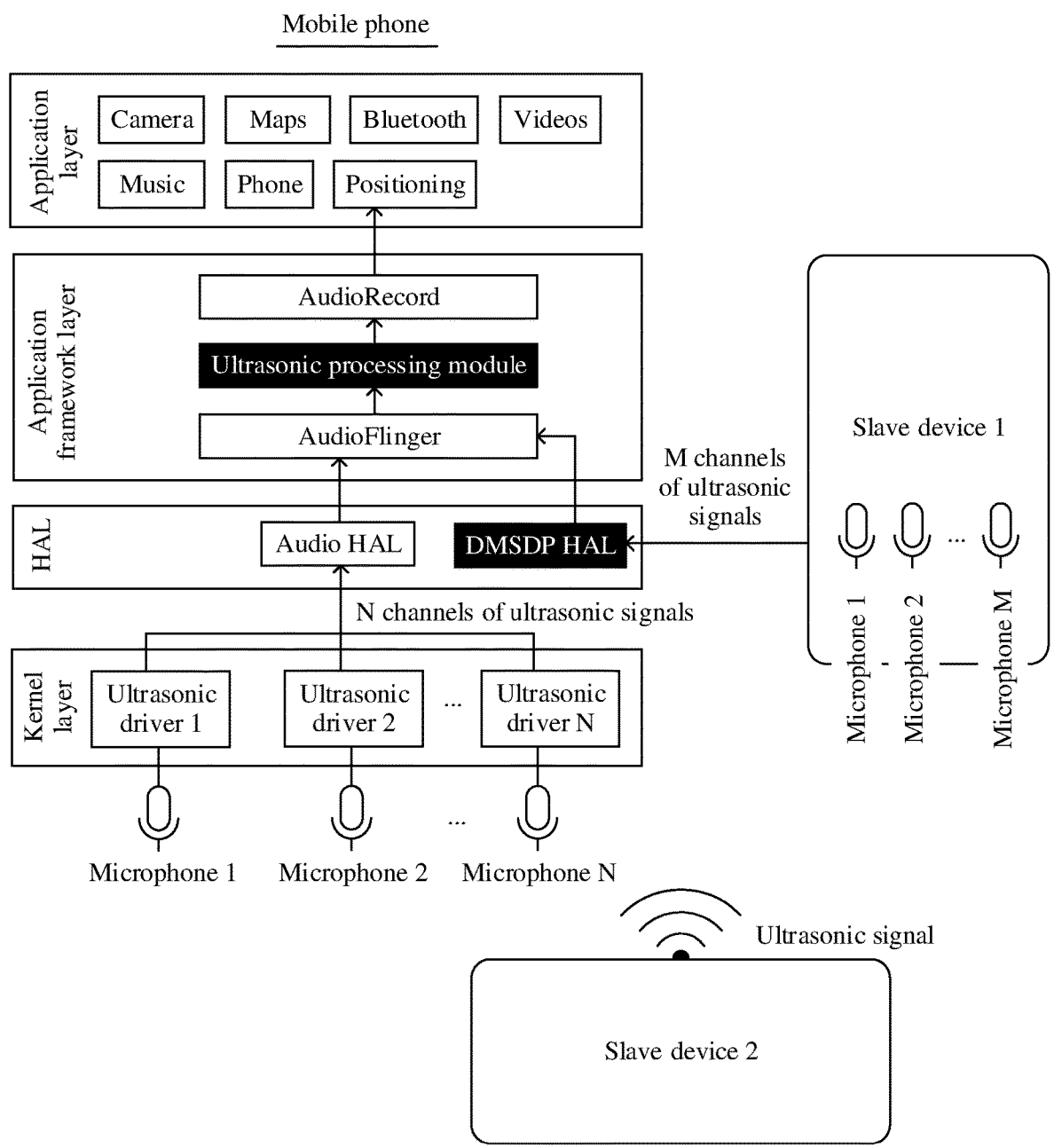
Figure 146:
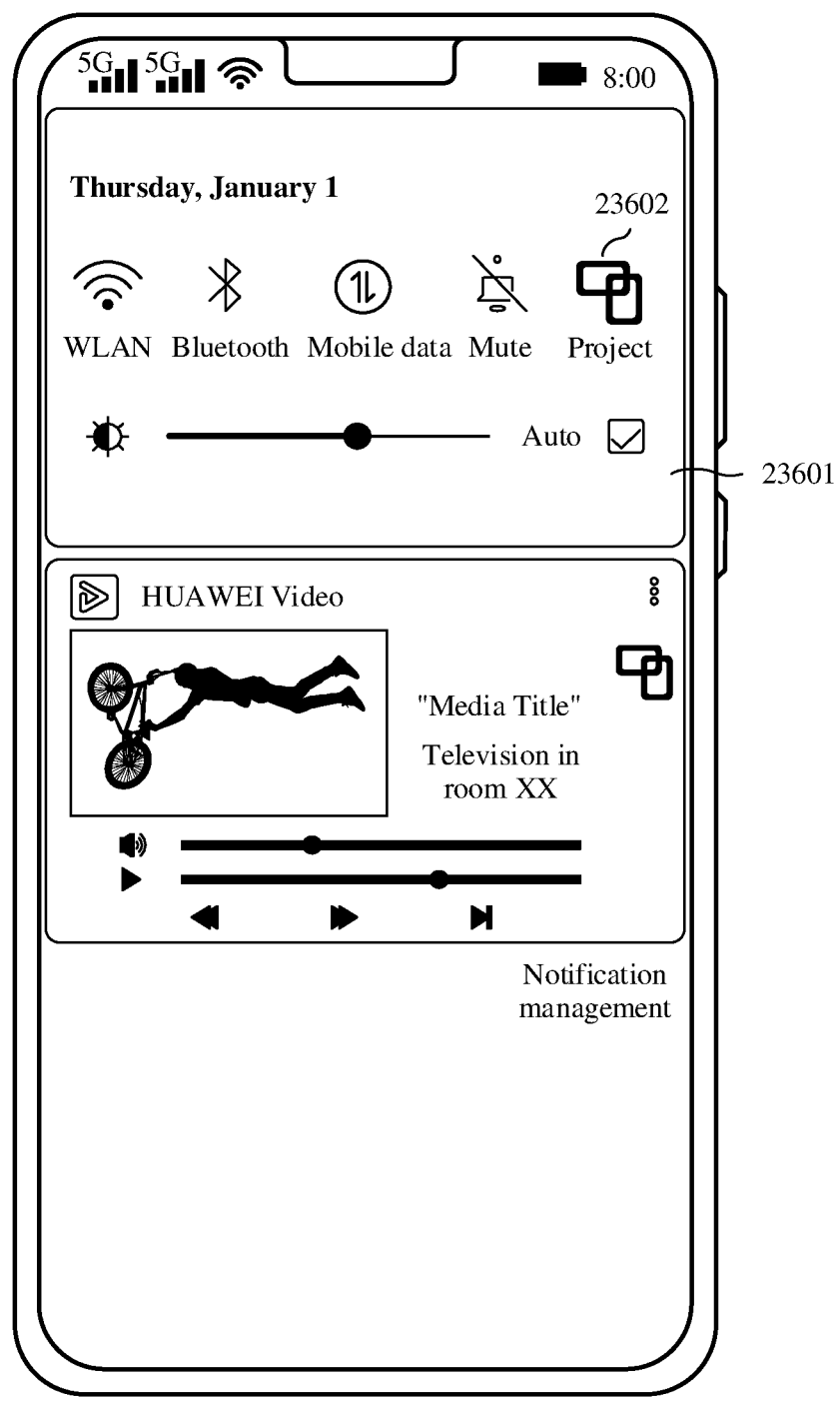
Figure 147:
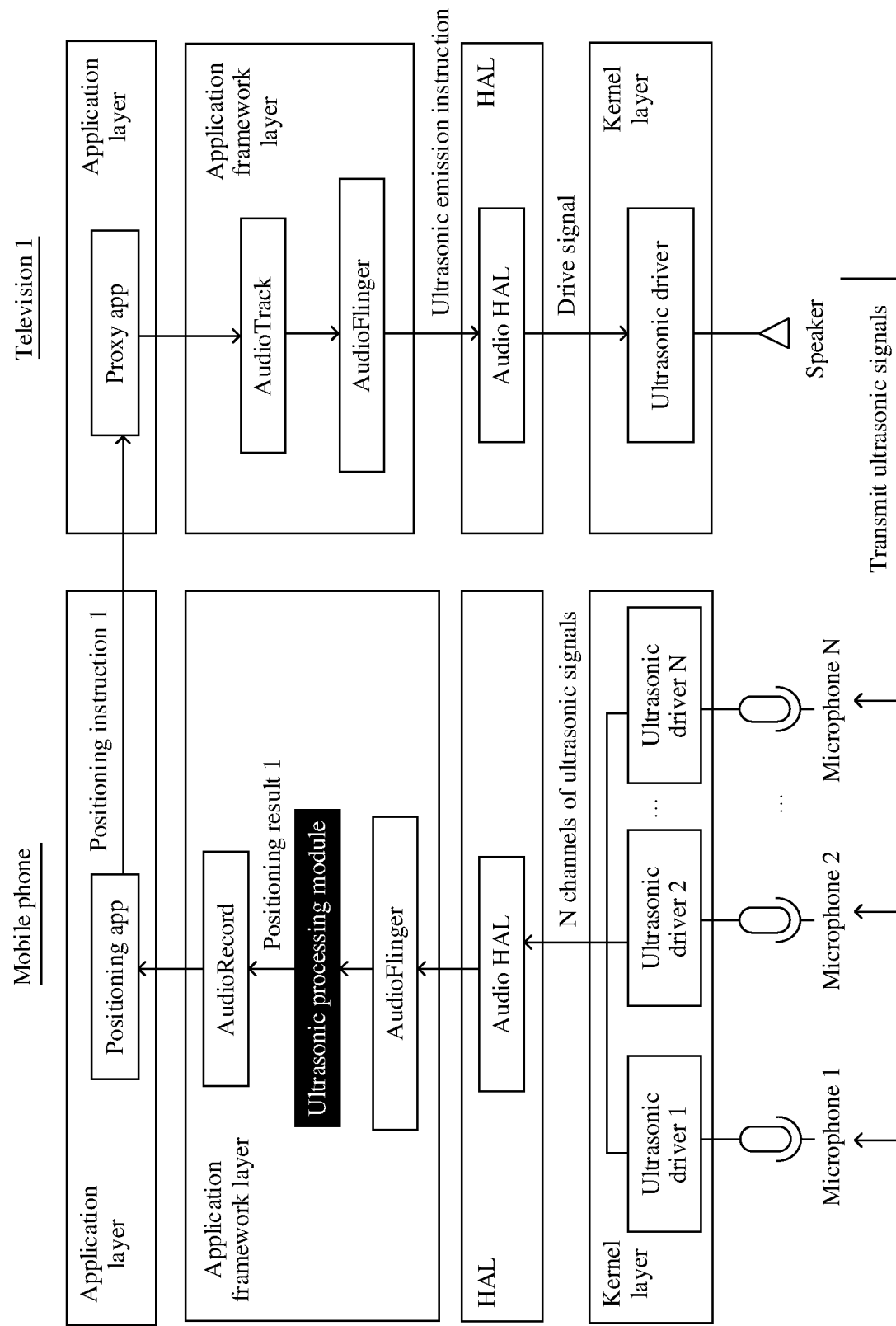
Figure 148:
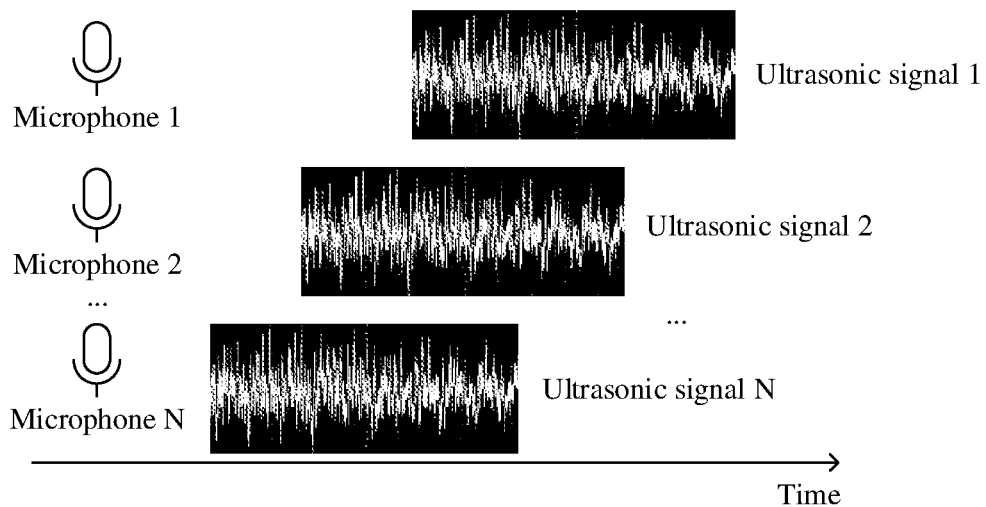
Figure 149:
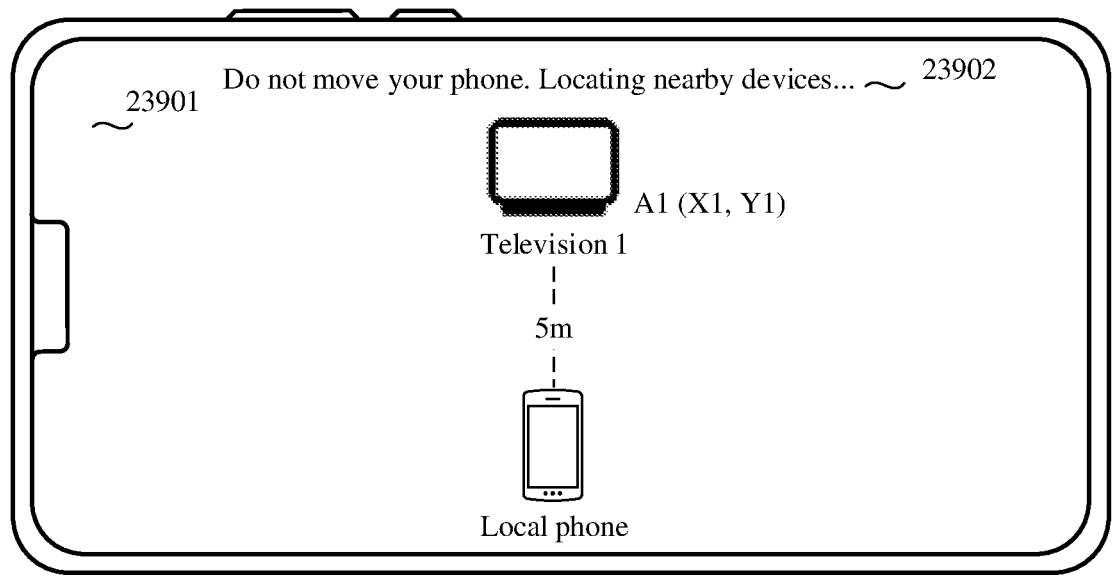
Figure 150:
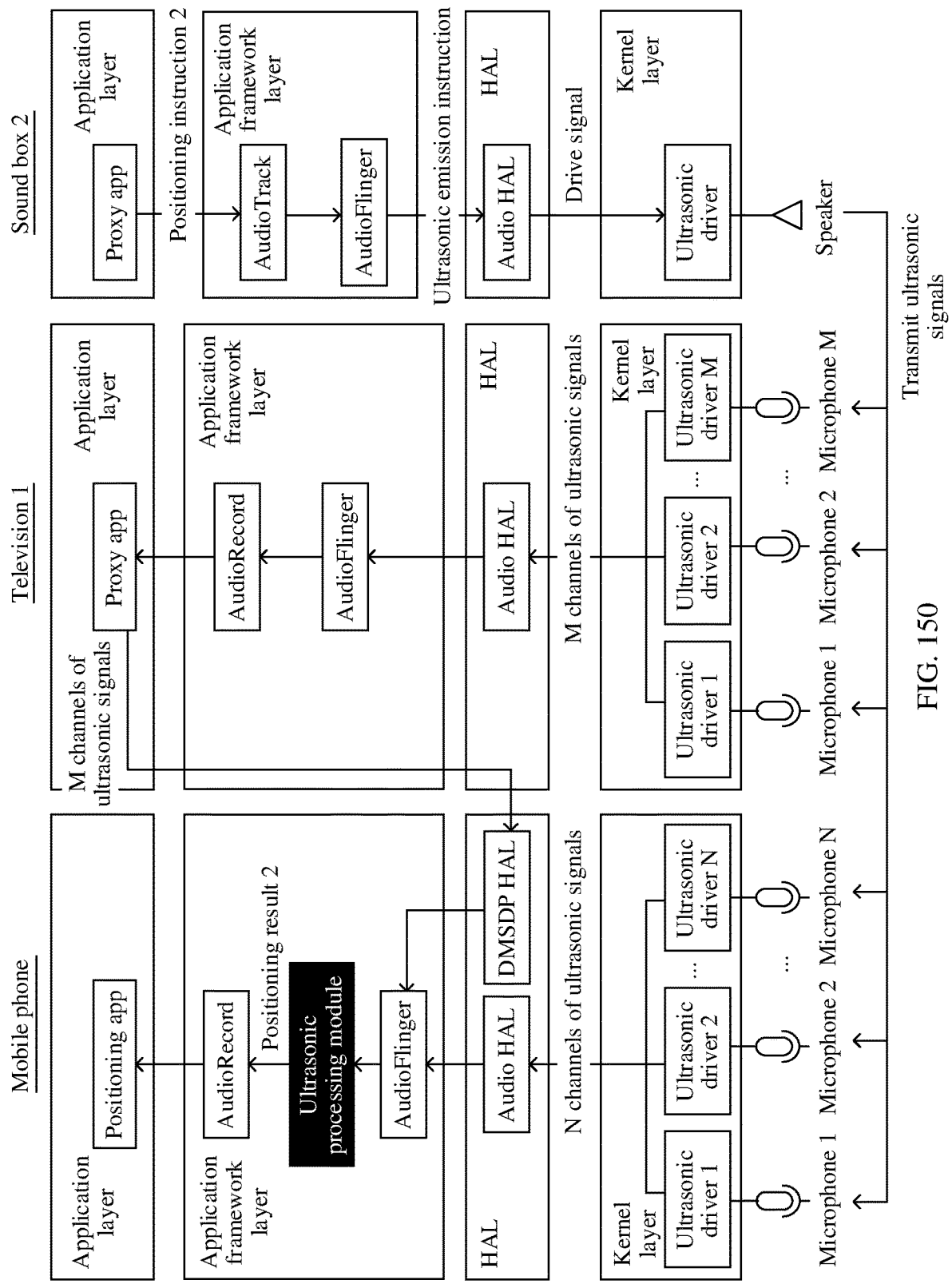
Figure 151:
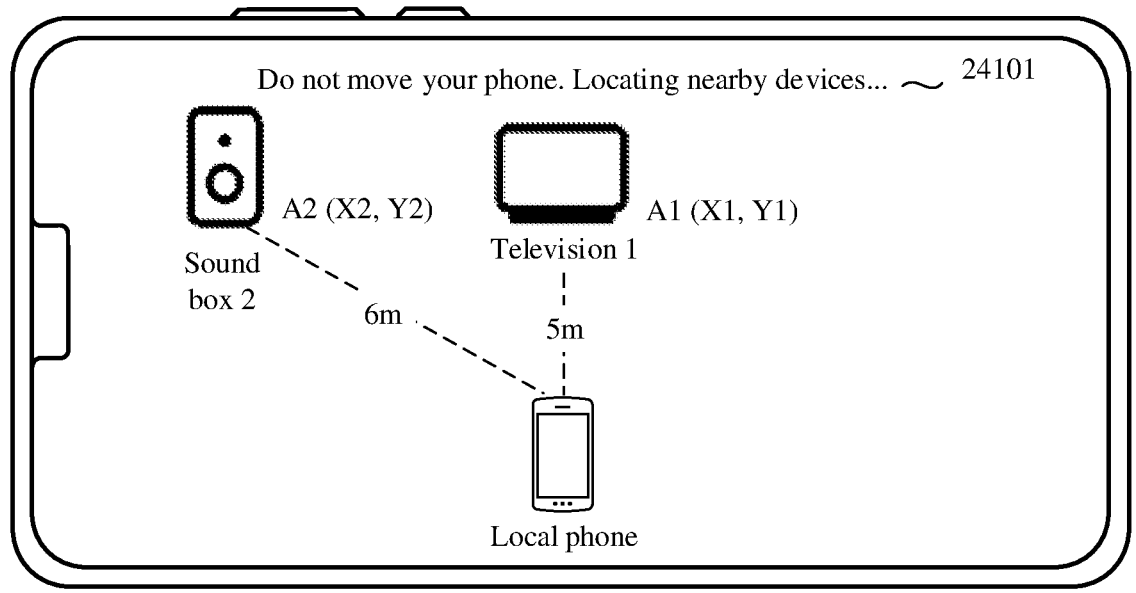
Figure 152:
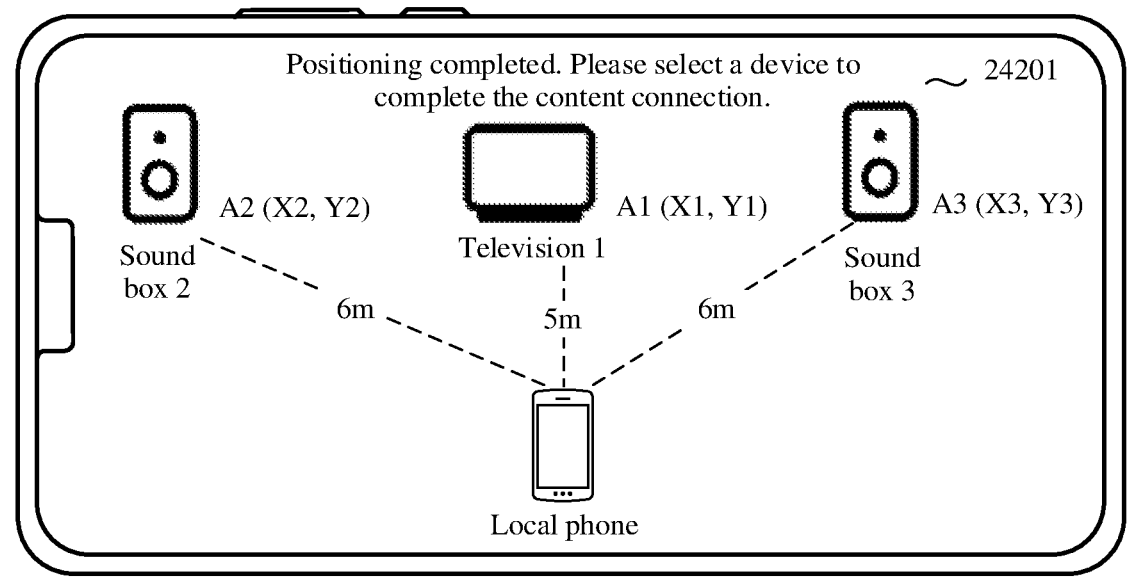
Figure 153:
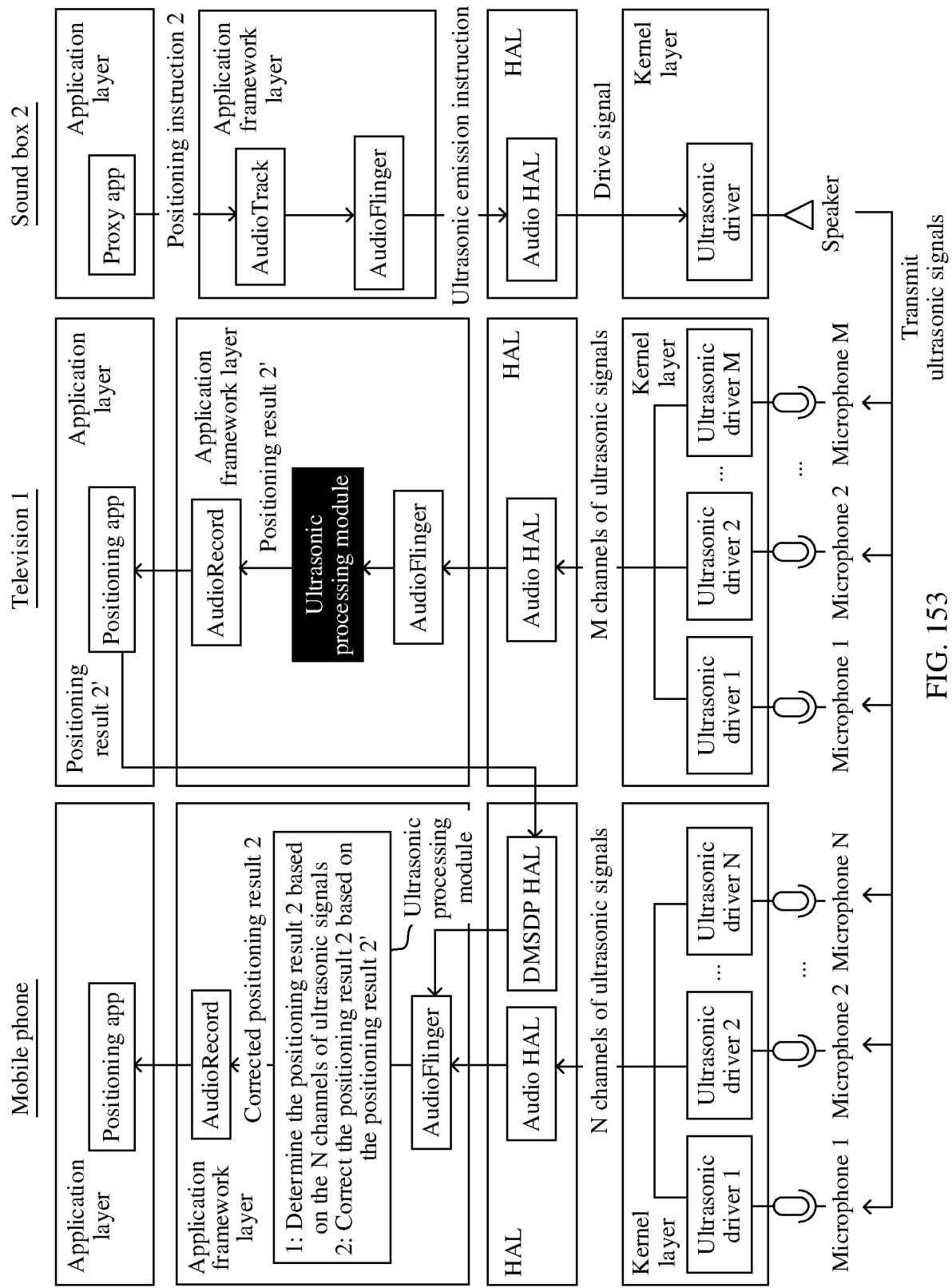
Figure 154:
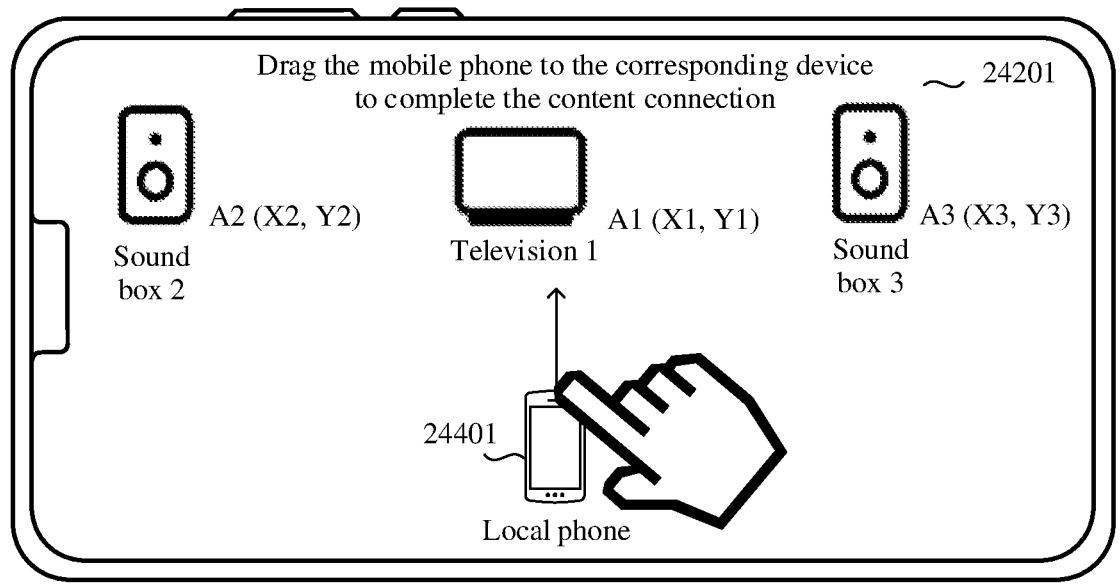
Figure 155:
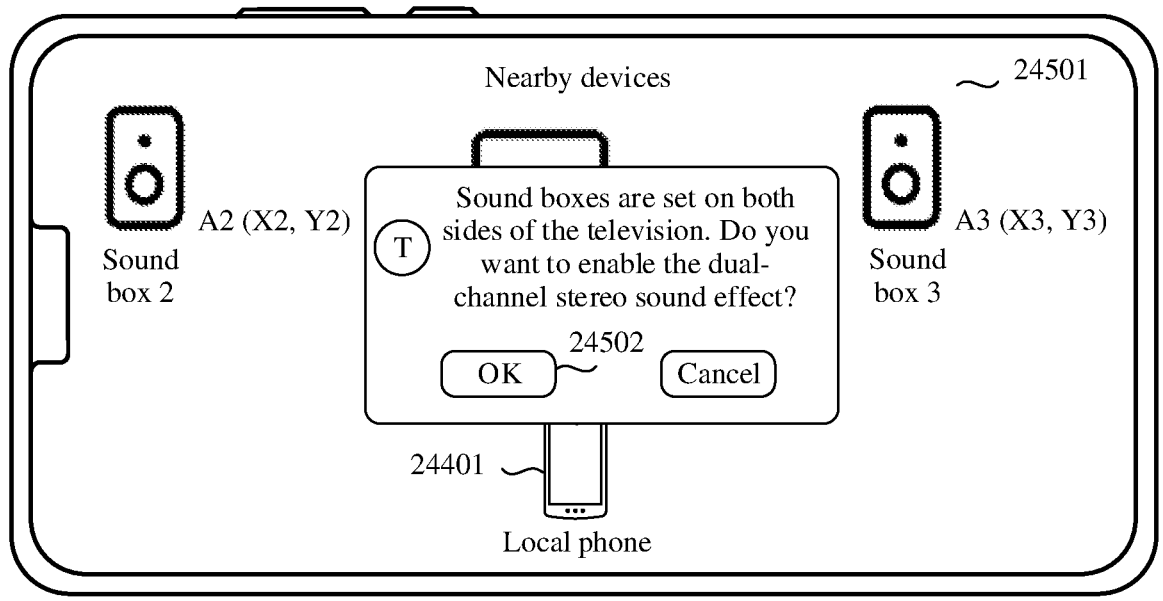
Figure 156:
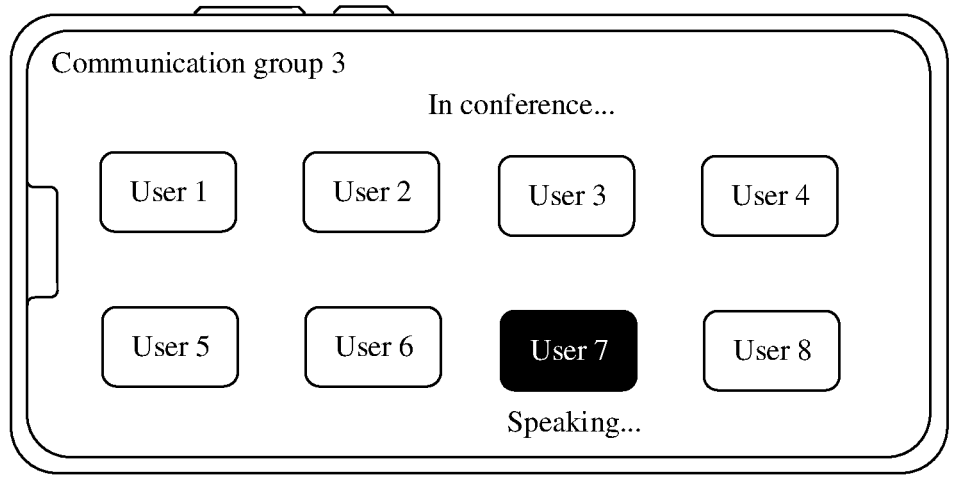
Figure 157:
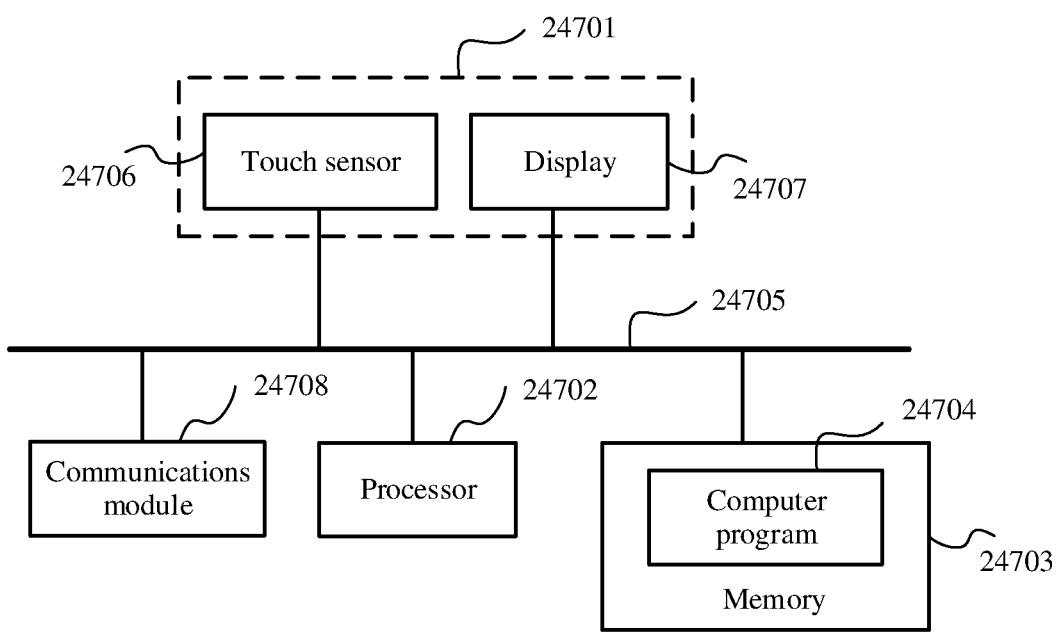
Figure 158:
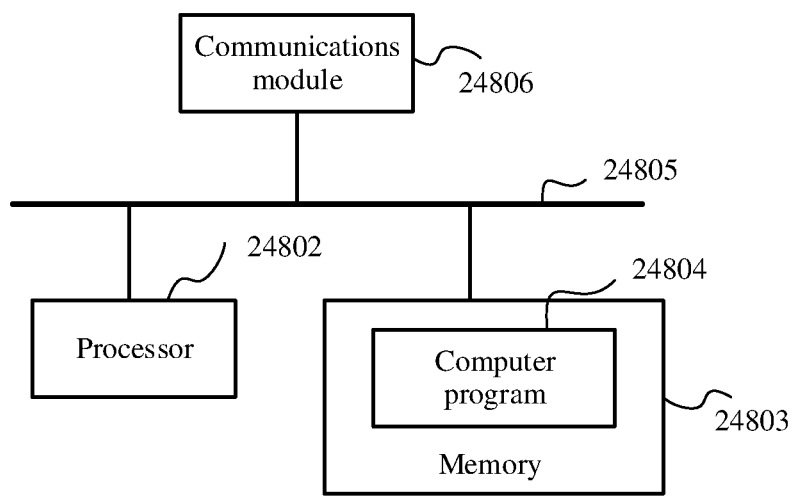

FIG. 129 is a schematic diagram 122 of an audio application scenario according to an embodiment of this application;

FIG. 130 is a schematic diagram 123 of an audio application scenario according to an embodiment of this application;

FIG. 131 is a schematic diagram 124 of an audio application scenario according to an embodiment of this application;

FIG. 132 is a schematic diagram 125 of an audio application scenario according to an embodiment of this application;

FIG. 133 is a schematic diagram 126 of an audio application scenario according to an embodiment of this application;

FIG. 134 is a schematic diagram 127 of an audio application scenario according to an embodiment of this application;

FIG. 135 is a schematic diagram 128 of an audio application scenario according to an embodiment of this application;

FIG. 136 is a schematic diagram 129 of an audio application scenario according to an embodiment of this application;

FIG. 137(a) and FIG. 137(b) are a schematic diagram 130 of an audio application scenario according to an embodiment of this application;

FIG. 138(a) and FIG. 138(b) are a schematic diagram 131 of an audio application scenario according to an embodiment of this application;

FIG. 139 is a schematic diagram 132 of an audio application scenario according to an embodiment of this application;

FIG. 140 is a schematic diagram 133 of an audio application scenario according to an embodiment of this application;

FIG. 141 is a schematic diagram 134 of an audio application scenario according to an embodiment of this application;

FIG. 142 is a schematic diagram 135 of an audio application scenario according to an embodiment of this application;

FIG. 143 is a schematic diagram 136 of an audio application scenario according to an embodiment of this application;

FIG. 144 is a schematic diagram 137 of an audio application scenario according to an embodiment of this application;

FIG. 145 is a schematic diagram 138 of an audio application scenario according to an embodiment of this application;

FIG. 146 is a schematic diagram 139 of an audio application scenario according to an embodiment of this application;

FIG. 147 is a schematic diagram 140 of an audio application scenario according to an embodiment of this application;

FIG. 148 is a schematic diagram 141 of an audio application scenario according to an embodiment of this application;

FIG. 149 is a schematic diagram 142 of an audio application scenario according to an embodiment of this application;

FIG. 150 is a schematic diagram 143 of an audio application scenario according to an embodiment of this application;

FIG. 151 is a schematic diagram 144 of an audio application scenario according to an embodiment of this application;

FIG. 152 is a schematic diagram 145 of an audio application scenario according to an embodiment of this application;

FIG. 153 is a schematic diagram 146 of an audio application scenario according to an embodiment of this application;

FIG. 154 is a schematic diagram 147 of an audio application scenario according to an embodiment of this application;

FIG. 155 is a schematic diagram 148 of an audio application scenario according to an embodiment of this application;

FIG. 156 is a schematic diagram 149 of an audio application scenario according to an embodiment of this application;

FIG. 157 is a schematic diagram 2 of a structure of an electronic device according to an embodiment of this application; and FIG. 158 is a schematic diagram 3 of a structure of an electronic device according to an embodiment of this application.

DETAILED DESCRIPTION OF ILLUSTRATIVE EMBODIMENTS

The following describes implementations of embodiments in detail with reference to the accompanying drawings.

Figure 1:
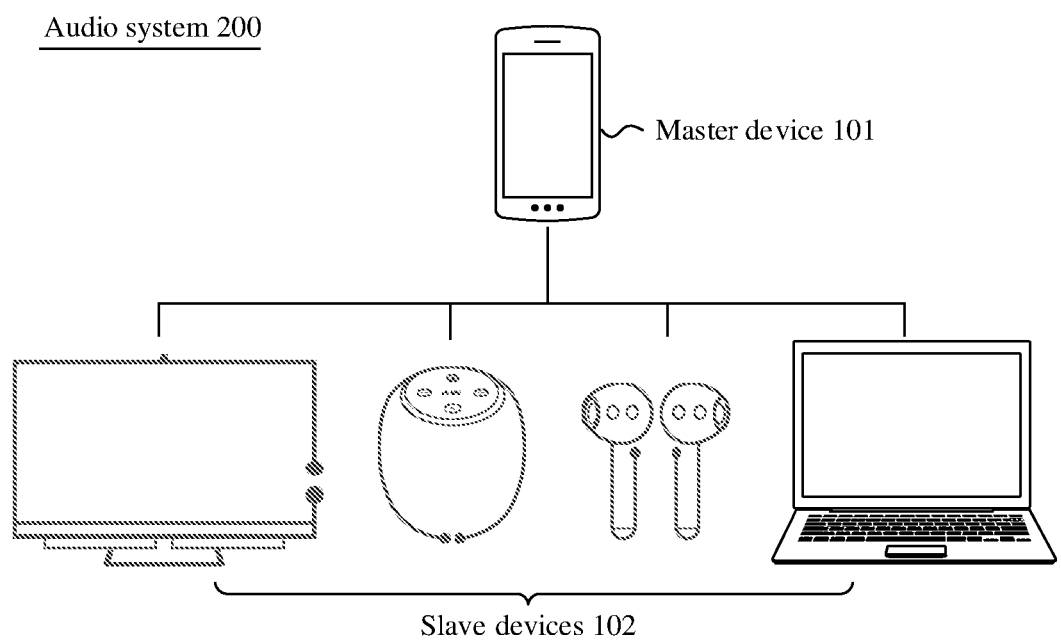
FIG. 1 is a schematic diagram of an architecture of an audio system according to an embodiment of this application.

An audio control method provided in an embodiment of this application may be applied to an audio system 200 shown in FIG. 1. As shown in FIG. 1, the audio system 200 may include a master (master) device 101 and N slave (slave) devices 102, where N is an integer greater than 0. The master device 101 may communicate with any slave device 102 in a wired manner or in a wireless manner.

For example, a wired connection may be established between the master device 101 and the slave device 102 by using a universal serial bus (universal serial bus, USB). For another example, a wireless connection may be established between the master device 101 and the slave device 102 by using a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), Bluetooth, wireless fidelity (wireless fidelity, Wi-Fi), NFC, voice over internet protocol (voice over Internet protocol, VoIP), or a communications protocol that supports a network slice architecture.

The master device 101 is configured to provide audio data that needs to be played, and output the audio data to the slave device 102. The slave device 102 is configured to receive the audio data sent by the master device 101, and play the audio data. Alternatively, the slave device 102 may also be configured to collect audio data, and send the collected audio data to the master device 101 for processing such as storage. In other words, the master device 101 may distribute an audio input/output function of the master device 101 to one or more slave devices 102 for implementation, so as to implement a cross-device distributed audio capability.

For example, the master device 101 may be specifically a device having an audio input/output function, such as a mobile phone, a sound box, a tablet, a television (which may also be referred to as a smart TV, Vision, or a large-screen device), a laptop, an ultra-mobile personal computer (Ultra-mobile Personal Computer, UMPC), a handheld computer, a netbook, a personal digital assistant (Personal Digital Assistant, PDA), a wearable electronic device, a vehicle-mounted device, or a virtual reality device. This is not limited in this embodiment of this application. For example, in addition to a conventional audio output device such as a Bluetooth headset or a wired headset, the slave device 102 may alternatively be an intelligent electronic device on which an operating system (for example, an Android system) is installed, such as a mobile phone, a television, a sound box, or a vehicle-mounted device. After receiving the audio data sent by the master device 101, the slave device 102 may perform processing such as sampling, mixing, or sound effect adding on the audio data by using the operating system of the slave device 102.

Figure 2:
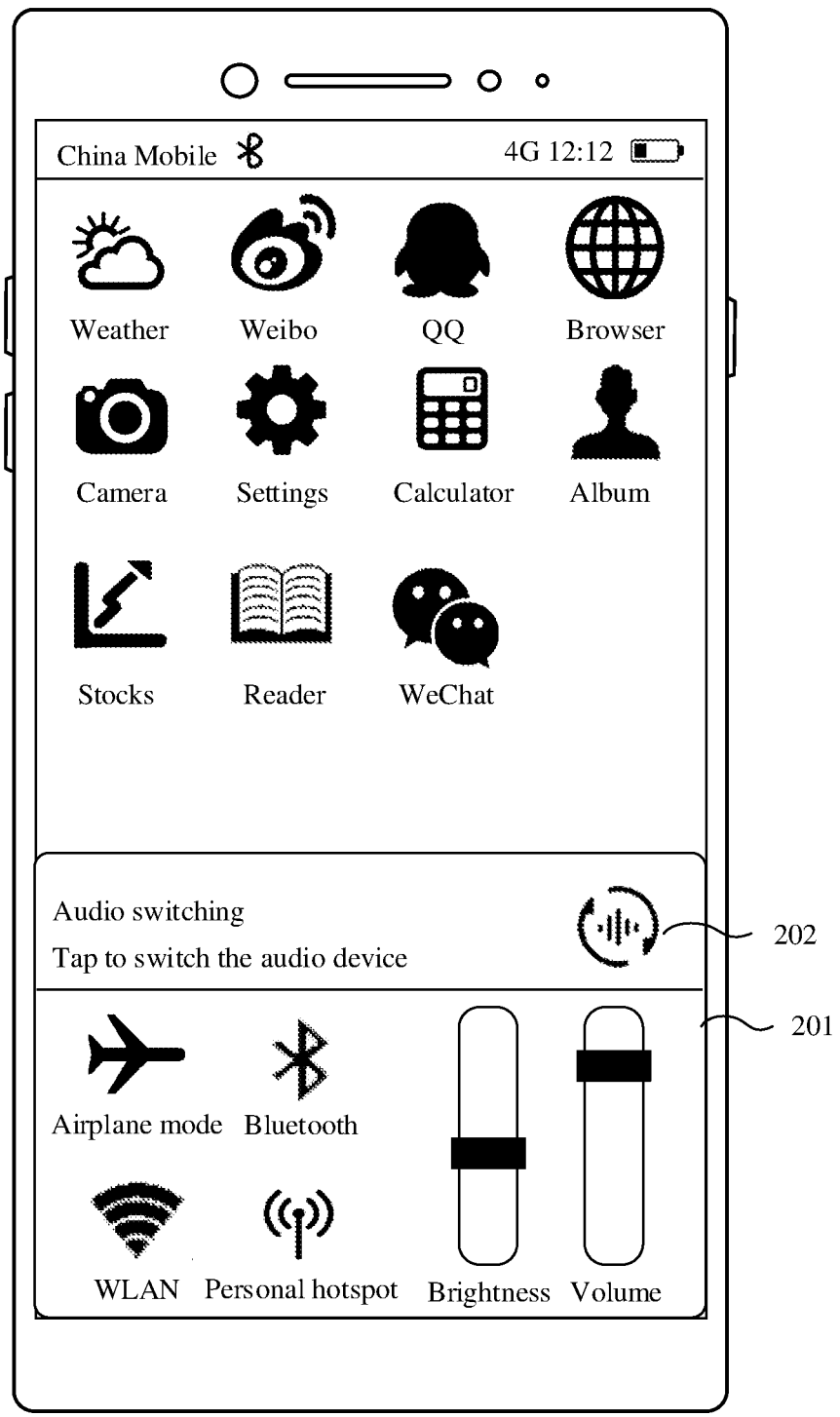
FIG. 2 is a schematic diagram 1 of an audio application scenario according to an embodiment of this application.

For example, the master device 101 is a mobile phone. A user may select one or more slave devices 102 as audio output devices of the mobile phone by using a control center of the mobile phone. For example, as shown in FIG. 2, the mobile phone may display a control center 201 (which may also be referred to as opening the control center) in response to a preset operation (for example, a pull-up operation or a pull-down operation) entered by the user on a current display interface. The control center 201 may also be referred to as a pull-up menu or a pull-down menu. In the control center 201, the user may set switches of some shortcut functions in the mobile phone, for example, a Bluetooth function switch, a wireless local area network (WLAN) function switch, a flashlight switch, a brightness adjustment switch, and a volume adjustment switch. This is not limited in this embodiment of this application.

In this embodiment of this application, still as shown in FIG. 2, the mobile phone may further display a switching button 202 of an audio switching function in the control center 201. When the user wants to change a current audio output device of the mobile phone, the user may tap the switching button 202 to query one or more electronic devices that can be currently used as audio output devices.

Figure 3:
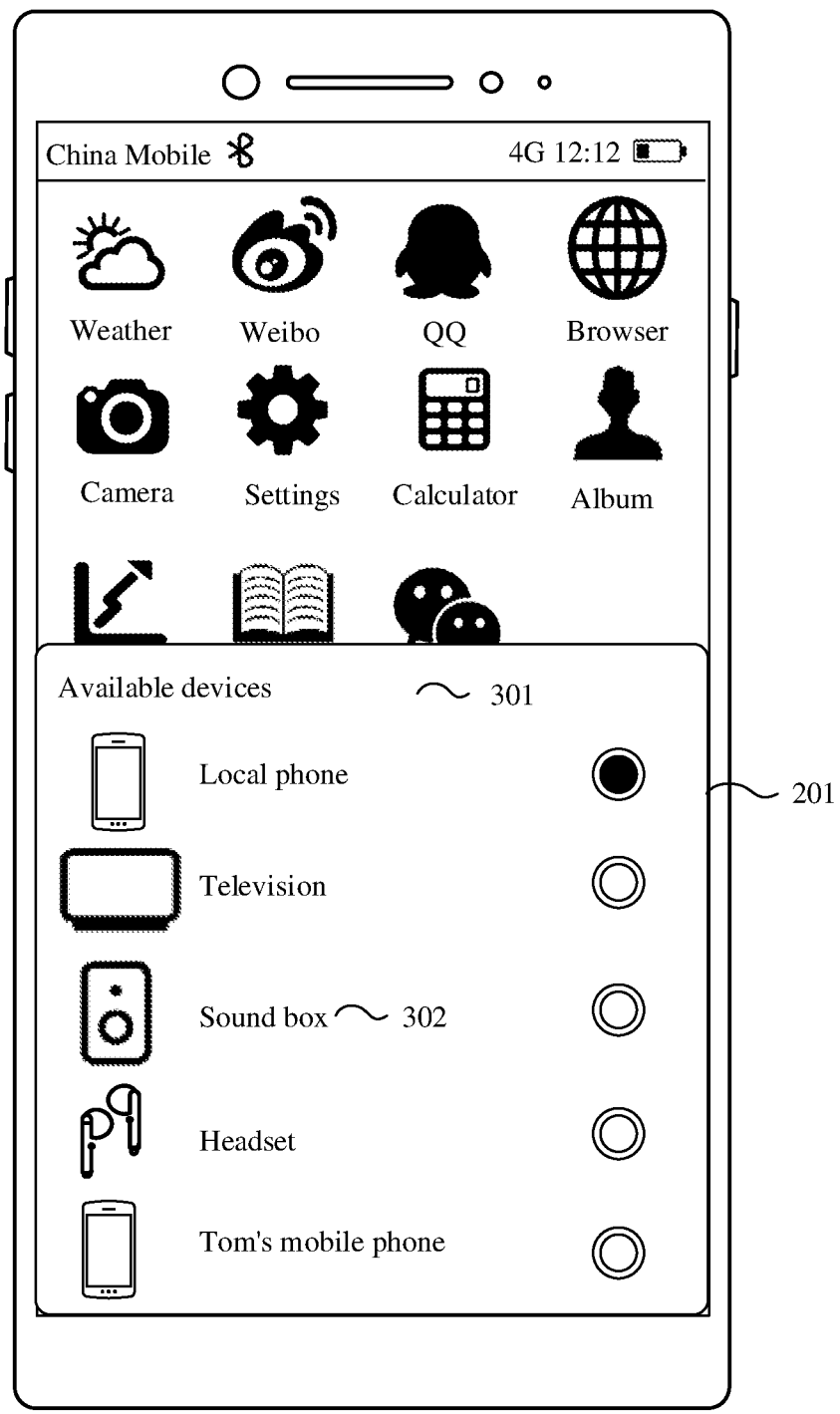
FIG. 3 is a schematic diagram 2 of an audio application scenario according to an embodiment of this application.

For example, after the mobile phone detects that the user taps the switching button 202, as shown in FIG. 3, the mobile phone may display a details menu 301 of the audio switching function in the control center 201. The details menu 301 includes one or more candidate devices 302 that are currently found by the mobile phone and that can perform audio switching with the mobile phone. For example, the mobile phone may search for an electronic device that is located in a same Wi-Fi network as the mobile phone, and display the found electronic device in the details menu 301 as a candidate device. For another example, the mobile phone may query a server for an electronic device that logs in to a same account (for example, a Huawei account) as the mobile phone, and display the found electronic device in the details menu 301 as a candidate device. In this way, the user can intuitively view, in the control center 201, one or more electronic devices that can currently perform audio switching with the mobile phone. This helps the user make a selection.

Still as shown in FIG. 3, the candidate devices displayed in the details menu 301 may include the mobile phone (that is, the local phone), and electronic devices having an audio input/output capability, such as a headset, a sound box, a television, and another mobile phone. If the user selects the local phone, it indicates that the user wants to output audio of the mobile phone by using a speaker (speaker) of the mobile phone. If the user selects another candidate device, it indicates that the user wants to output audio of the mobile phone by using the candidate device selected by the user. In this case, the candidate device selected by the user may serve as the slave device 102 of the mobile phone to play the audio that is output by the mobile phone.

Figure 4:
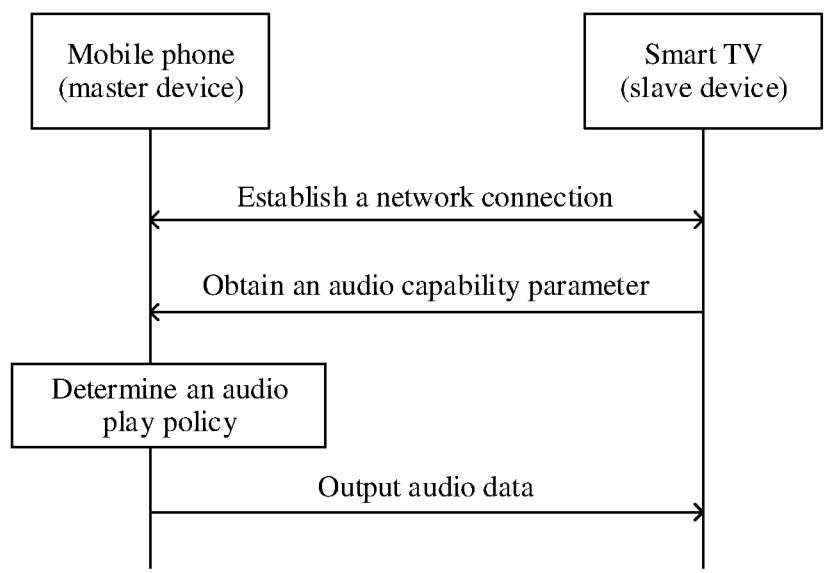
FIG. 4 is a schematic interaction diagram 1 of an audio control method according to an embodiment of this application.

In this embodiment of this application, as shown in FIG. 4, after the mobile phone detects that the user selects the slave device 102 that performs audio switching with the mobile phone, the mobile phone may establish a network connection to the slave device 102. For example, the slave device 102 selected by the user is a television. After detecting that the user selects the television, the mobile phone may establish a network connection to the television. For example, the mobile phone may establish a Wi-Fi connection to the television by using a router, or the mobile phone may directly establish a Wi-Fi P2P connection to the television. Further, the mobile phone may obtain an audio capability parameter of the television from the television, where the audio capability parameter is used to reflect a specific audio input or output capability supported by the television. The audio output capability supported by the television is used as an example. The audio capability parameter may include one or more parameters of the television, such as a play latency, a sound effect parameter, an audio sampling rate, or a quantity of sound channels. In this way, the mobile phone may determine, based on the audio capability parameter of the television, an audio play policy used to perform audio switching, and then output corresponding audio data to the television according to the audio play policy, to switch audio on the mobile phone to the television for play.

For example, the audio capability parameter of the television that is obtained by the mobile phone indicates that the television plays dual-channel audio data. In this case, if audio data that is output by Music running on the mobile phone is four channels of audio data, the mobile phone may require the four channels of audio data to be combined into dual-channel audio data in the audio play policy. Then, the mobile phone may send the combined dual-channel audio data to the television for play. Therefore, the mobile phone may flexibly switch, based on an audio capability of a current slave device, audio to the slave device for play. This provides good user audio experience.

For another example, the user may alternatively select a plurality of electronic devices in the details menu 301 as the slave devices 102 of the mobile phone to perform audio switching. For example, if it is detected that the user selects a headset and a television in the details menu 301, the mobile phone may obtain audio capability parameters of the headset and the television respectively. Because the headset has good portability, and the television has good display experience, when performing audio switching, the mobile phone may send audio data corresponding to a video image to the television for play, and send system audio data such as a ringtone and a notification tone of the mobile phone to the headset for play. In this way, the mobile phone may distribute audio data to a plurality of slave devices for play based on different audio capabilities of the plurality of slave devices. This provides good user audio experience.

It can be learned that, in this embodiment of this application, in response to user selection, the master device 101 (for example, the foregoing mobile phone) may output audio data to one or more slave devices 102 to perform audio switching, so as to implement a cross-device distributed audio capability. In addition, during audio switching, because the slave device 102 may also have an audio processing capability, the master device 101 may obtain an audio capability parameter of the slave device 102, and dynamically determine, based on the audio capability parameter of the slave device 102, an audio play policy used to perform audio switching. In this way, the master device 101 may output customized audio data to the slave device 102 based on an actual audio capability of the slave device 102, so that the slave device 102 can also process, based on the audio capability of the slave device 102, the audio data sent by the master device. This flexibly distributes an audio function of the master device 101 to the slave device 102 for implementation, and provides good user audio experience.

Audio switching between the master device and the slave device is described in detail in the following embodiments. Therefore, details are not described herein.

Figure 5:
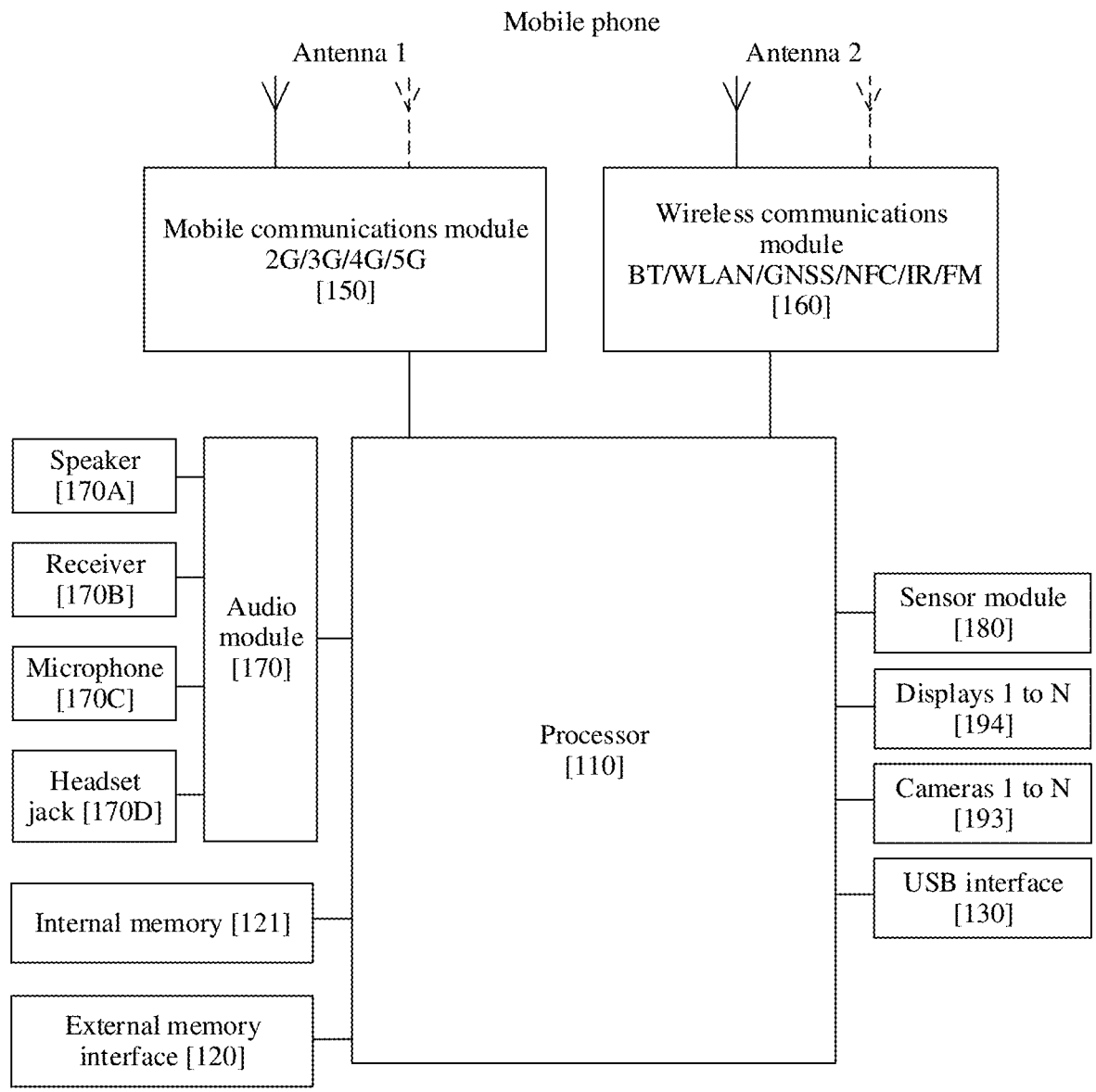
FIG. 5 is a schematic diagram 1 of a structure of an electronic device according to an embodiment of this application.

For example, the mobile phone serves as the master device 201 in the audio 200. FIG. 5 is a schematic diagram of a structure of the mobile phone.

The mobile phone may include a processor 110, an external memory interface 120, an internal memory 121, a universal serial bus (universal serial bus, USB) interface 130, an antenna 1, an antenna 2, a mobile communications module 150, a wireless communications module 160, an audio module 170, a speaker 170A, a receiver 170B, a microphone 170C, a headset jack 170D, a sensor module 180, and the like.

It can be understood that the structure shown in this embodiment of the present invention does not constitute a specific limitation on the mobile phone. In some other embodiments of this application, the mobile phone may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store an instruction or data that has been used or cyclically used by the processor 110. If the processor 110 needs to use the instruction or the data again, the processor may directly invoke the instruction or the data from the memory. This avoids repeated access, shortens a waiting time of the processor 110, and improves system efficiency.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal.

The mobile communications module 150 may provide a solution, applied to the mobile phone, to wireless communication including 2G, 3G, 4G, 5G, or the like. In some embodiments, at least some function modules in the mobile communications module 150 may be disposed in the processor 110. In some embodiments, at least some function modules in the mobile communications module 150 may be disposed in a same device as at least some modules in the processor 110.

The wireless communications module 160 may provide a solution, applied to the mobile phone, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

In some embodiments, in the mobile phone, the antenna 1 and the mobile communications module 150 are coupled, and the antenna 2 and the wireless communications module 160 are coupled, so that the mobile phone can communicate with a network and another device by using a wireless communication technology.

The mobile phone implements a display function by using the GPU, a display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone may include one or N displays 194, where N is a positive integer greater than 1.

The mobile phone may implement a photographing function by using the ISP, a camera 193, the video codec, the GPU, the display 194, the application processor, and the like.

The camera 193 is configured to capture a static image or a video. An optical image of an object is generated through a lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone may include one or N cameras 193, where N is a positive integer greater than 1.

The external memory interface 120 may be configured to connect to an external memory card, for example, a micro SD card, to extend a storage capability of the mobile phone. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the mobile phone and data processing. The internal memory 121 may include a program storage area and a data storage area. The program storage area may store an operating system, an application required by at least one function (for example, a sound play function or an image play function), and the like. The data storage area may store data (for example, audio data or an address book) created when the mobile phone is used, and the like. In addition, the internal memory 121 may include a high-speed random access memory, or may include a nonvolatile memory, for example, at least one magnetic disk storage device, a flash memory, or a universal flash storage (universal flash storage, UFS).

The mobile phone may implement an audio function such as music play or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The mobile phone may listen to music or answer a hands-free call by using the speaker 170A.

The receiver 170B, also referred to as an "earpiece", is configured to convert an audio electrical signal into a sound signal. When the mobile phone answers a call or receives a voice message, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to enter a sound signal into the microphone 170C. At least one microphone 170C may be disposed in the mobile phone. In some other embodiments, two microphones 170C may be disposed in the mobile phone, to collect a sound signal and further implement a noise reduction function. In some other embodiments, three, four, or more microphones 170C may alternatively be disposed in the mobile phone, to collect a sound signal, implement noise reduction, identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

Certainly, the mobile phone may further include a charging management module, a power management module, a battery, a button, an indicator, one or more SIM card interfaces, and the like. This is not limited in this embodiment of this application.

A software system of the mobile phone may use a layered architecture, an event-driven architecture, a microkernel architecture, a microservice architecture, or a cloud architecture. In this embodiment of this application, an Android system of a layered architecture is used as an example to describe the software structure of the mobile phone. Certainly, in another operating system, functions implemented by the function modules need to be similar to those in this embodiment of this application.

Figure 6:
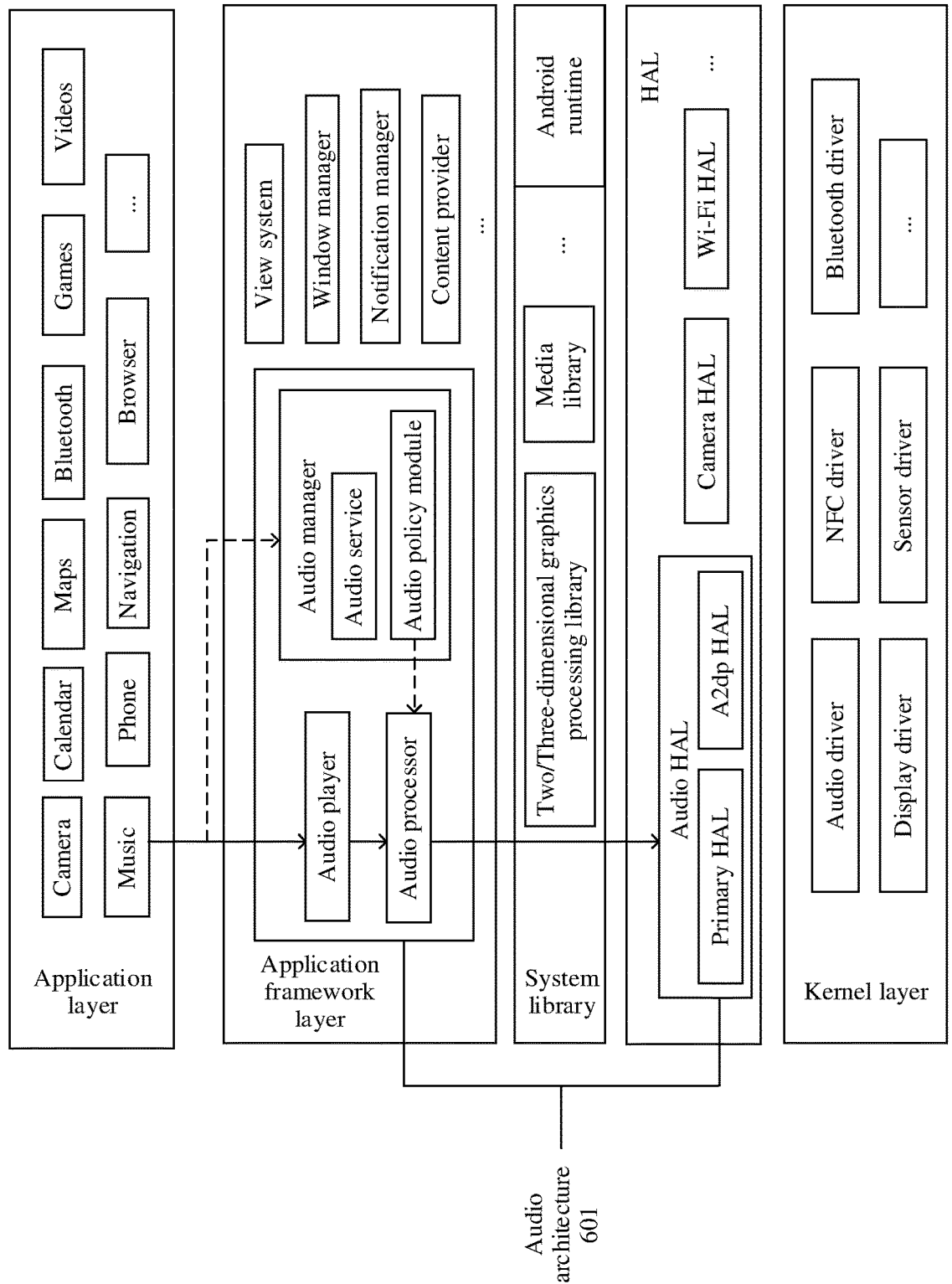
FIG. 6 is a schematic diagram 3 of an audio application scenario according to an embodiment of this application.

FIG. 6 is a block diagram of the software structure of the mobile phone according to an embodiment of this application.

In the layered architecture, software is divided into several layers, and each layer has a clear role and task. The layers communicate with each other through a software interface. In some embodiments, the Android system is divided into five layers: an application layer, an application framework layer, an Android runtime (Android runtime) and system library, a hardware abstraction layer (hardware abstraction layer, HAL), and a kernel layer from top to bottom.

The application layer may include a series of application packages.

As shown in FIG. 6, applications (application, app) such as Phone, Memo, Browser, Contacts, Camera, Gallery, Calendar, Maps, Bluetooth, Music, Videos, and Messages may be installed at the application layer.

It should be noted that these applications installed at the application layer may have an audio function. For example, Music may play audio, and Camera may output, during photographing, a shutter sound that is preset by the system. For another example, when playing a video, Videos may output audio corresponding to a video image. For another example, Maps may output a navigation voice after enabling a navigation function. In this embodiment of this application, an application having an audio function may be referred to as an audio app.

The application framework layer provides an application programming interface (application programming interface, API) and a programming framework for an application at the application layer. The application framework layer includes some predefined functions.

As shown in FIG. 6, an example in which Music is an audio app is used. An audio architecture 601 for implementing an audio function for the audio app is disposed in the Android system. At the application framework layer, the audio architecture 601 may include an audio manager (AudioManager), an audio player, and an audio processor.

For example, the audio player may be a player such as AudioTrack or MediaPlayer. The audio processor may be a processor such as AudioFlinger. When the audio app needs to play audio, the audio player may be invoked to input corresponding audio data into the audio player. For example, the audio app may input original audio data into the audio player, and the audio player performs processing such as parsing, decapsulation, or decoding on the original audio data, to obtain frames of pulse code modulation (pulse code modulation, PCM) data. Alternatively, the audio app may directly output PCM data to the audio player. Further, the audio player may send the audio data to the audio processor for audio processing.

Specifically, the audio processor may perform audio processing on the audio data based on an audio play policy that is output by the audio manager. For example, the audio manager may include an audio service (AudioService) and an audio policy module (AudioPolicy). When the audio app runs, the audio service may be invoked to indicate the audio policy module to set a specific audio play policy for audio data input/output, for example, set volume, an audio data sampling rate, a sound effect, and mixing. The audio policy module may output a corresponding audio play policy to the audio processor in real time in an audio play process, so that the audio processor can perform, according to a latest audio play policy, processing such as mixing, re-sampling, or sound effect setting on audio data that is output by the audio player, where processed audio data is to-be-played audio data.

Still as shown in FIG. 6, the hardware abstraction layer (hardware abstraction layer, HAL) may be further included between the application framework layer and the kernel layer of the Android system. The HAL is responsible for interacting with each hardware device of the mobile phone. The HAL hides implementation details of each hardware device, and may provide the Android system with an interface for invoking each hardware device. The HAL provides HALs corresponding to different hardware devices in the mobile phone, for example, an audio HAL, a camera HAL, and a Wi-Fi HAL.

The Audio HAL may also be used as a part of the audio architecture 601. The audio processor (for example, AudioFlinger) may directly invoke the audio HAL to send the processed audio data to the audio HAL. The Audio HAL sends the audio data to a corresponding audio output device (for example, a speaker or a headset) for play.

For example, the audio HAL may be further divided into a primary HAL and an A2dp HAL based on different audio output devices. AudioFlinger may invoke the primary HAL to output audio data to a speaker (speaker) of the mobile phone, or AudioFlinger may invoke the A2dp HAL to output audio data to a Bluetooth headset connected to the mobile phone. The A2dp HAL is used as an example. When the mobile phone is powered on, the Bluetooth app (which may also be referred to as a Bluetooth service) at the application layer may create an A2dp HAL at the HAL. In this case, the A2dp HAL may run in a form of an empty process, and the A2dp HAL is not connected to a specific Bluetooth device.

Subsequently, after the mobile phone is connected to a Bluetooth device (for example, a first Bluetooth headset), the Bluetooth app may register information such as an identifier or a Bluetooth address of the first Bluetooth headset with the audio manager, and send a related hardware parameter (for example, a sampling rate of the first Bluetooth headset) of the first Bluetooth headset to the A2dp HAL, so that the A2dp HAL can send data to and receive data from the first Bluetooth headset. In this case, the A2dp HAL is fixed in a process in which the mobile phone keeps connected to the first Bluetooth headset. After the mobile phone is disconnected from the first Bluetooth headset, the Bluetooth app may clear related information of the first Bluetooth headset in the audio manager, and restore the A2dp HAL to an empty process to run at the HAL.

When the mobile phone is connected to another Bluetooth device (for example, a second Bluetooth device, where the second Bluetooth device and the first Bluetooth device may be the same or different), similar to the foregoing process, the Bluetooth app may register information such as an identifier or a Bluetooth address of the second Bluetooth headset with the audio manager, and send a related hardware parameter of the second Bluetooth headset to the A2dp HAL, so that the A2dp HAL can send data to and receive data from the second Bluetooth headset. After the mobile phone is disconnected from the second Bluetooth headset, the Bluetooth app may clear related information of the second Bluetooth headset in the audio manager, and restore the A2dp HAL to an empty process to run at the HAL.

In addition, the application framework layer may further include a window manager, a content provider, a view system, a resource manager, a notification manager, and the like. This is not limited in this embodiment of this application.

For example, the window manager is configured to manage a window program. The window manager may obtain a size of the display, determine whether there is a status bar, lock a screen, take a screenshot, and the like. The content provider is configured to store and obtain data, and enable the data to be accessed by an application. The data may include a video, an image, audio, calls that are made and answered, a browsing history and bookmarks, an address book, and the like. The view system may be configured to construct a display interface of an application. Each display interface may include one or more controls. Generally, the controls may include interface elements such as an icon, a button, a menu, a tab, a text box, a dialog box, a status bar, a navigation bar, and a widget (Widget). The resource manager provides various resources for an application, such as a localized character string, an icon, a picture, a layout file, and a video file. The notification manager enables an application to display notification information in a status bar, and may be configured to convey a notification message. The notification manager may automatically disappear after a short pause without requiring user interaction. For example, the notification manager is configured to notify download completion, and give a message notification. The notification manager may alternatively be a notification that appears in a top status bar of the system in a form of a graph or a scroll bar text, for example, a notification of an application running in the background, or may be a notification that appears on the screen in a form of a dialog window. For example, text information is displayed on the status bar, an alert sound is played, vibration is generated, or an indicator light blinks.

As shown in FIG. 6, the Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run in the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem, and provide fusion of 2D and 3D layers for a plurality of applications. The media library supports playback and recording in a plurality of commonly used audio and video formats, and static image files. The media library may support a plurality of audio and video encoding formats, for example, MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is located below the HAL and is a layer between hardware and software. The kernel layer includes at least a display driver, a camera driver, an audio driver, a sensor driver, and the like. This is not limited in this embodiment of this application.

Figure 7:
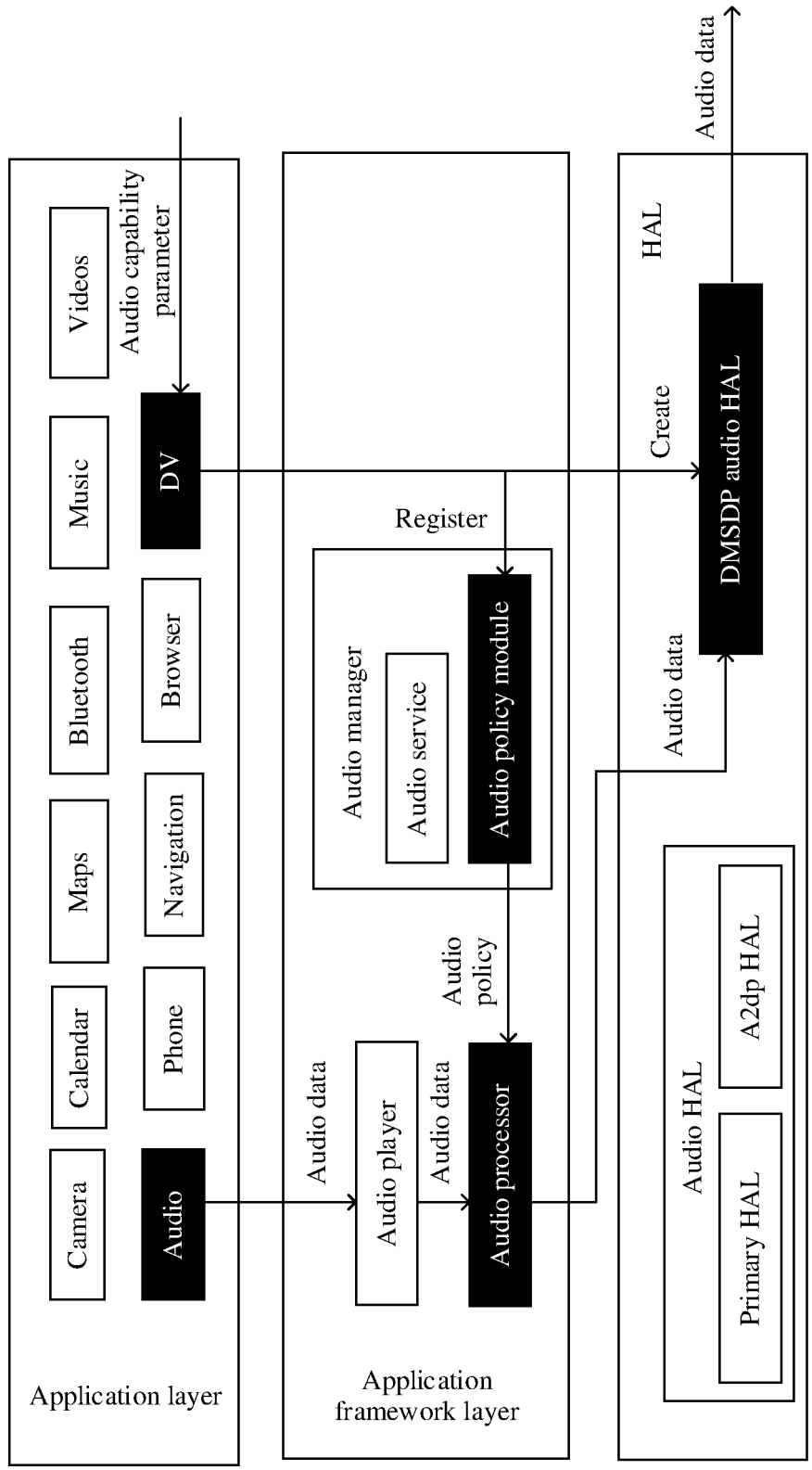
FIG. 7 is a schematic diagram 4 of an audio application scenario according to an embodiment of this application.

Based on the audio architecture 601 shown in FIG. 6, in this embodiment of this application, as shown in FIG. 7, a device virtualization (Device Virtualization) app for implementing an audio switching function may be installed at the application layer of the mobile phone, and may be referred to as a DV app below. The DV app may permanently run on the mobile phone as a system application. Alternatively, the audio switching function implemented by the DV app may permanently run on the mobile phone in a form of a system service. When the mobile phone needs to switch audio data generated by the audio app to a slave device for play, or needs to use a recording function of a slave device to record audio, the DV app may trigger the mobile phone to obtain an audio capability of the slave device, to create a corresponding virtual device in the mobile phone based on the audio capability of the slave device. In this way, the mobile phone may control the virtual device to switch an audio function of the mobile phone to the slave device for implementation.

For example, Music is an audio app. As shown in (a) in FIG. 8, when running Music, the mobile phone may display a switching button 801 for audio switching. Currently, the mobile phone outputs audio data by using the speaker of the mobile phone. If the user wants to continue to play the audio data by using another audio output device, the user may tap the switching button 801 to trigger an audio switching function. After the mobile phone detects that the user taps the switching button 801, the DV app may trigger the mobile phone to start to detect one or more nearby candidate devices that can perform audio switching. For example, as shown in (b) in FIG. 8, the mobile phone may detect a candidate device that is located in a same Wi-Fi network as the mobile phone and that has an audio output function, and display the detected candidate device in a menu 802. For example, the menu 802 includes three candidate devices: a television 803, a sound box 804, and a headset 805. The user may select one of the three candidate devices as a slave device for continuing to play audio data in Music.

For example, the user selects the television 803 in the menu 802. After detecting that the user taps the candidate device, that is, the television 803, the mobile phone may send an access request to the television 803. In this case, as shown in (a) in FIG. 9, the television 803 may display a dialog box 901 to request the user to allow the mobile phone to access the television 803. If the user allows the mobile phone to access the television 803, the user may select a button "Allow this time" or "Always allow" in the dialog box 901. In this case, the television 803 may send an access allow response to the mobile phone. Further, the DV app may trigger the mobile phone to establish a network connection to the television 803, for example, a Wi-Fi P2P connection.

It should be noted that the network connection established between the mobile phone and the slave device (for example, the television 803) may be specifically a service channel network connection (that is, a service connection). For example, before the user selects the television 803 as a slave device of the mobile phone, the mobile phone may have established a connection to the television 803 through the Wi-Fi network. In this case, the connection is a data channel connection (that is, a data connection). After the user selects the television 803 as a slave device of the mobile phone, the mobile phone establishes a service connection to the television 803 based on the established data connection. For example, the network connection may be a P2P connection based on the transmission control protocol (transmission control protocol, TCP) or the user datagram protocol (user datagram protocol, UDP). This is not limited in this embodiment of this application.

Figure 9:
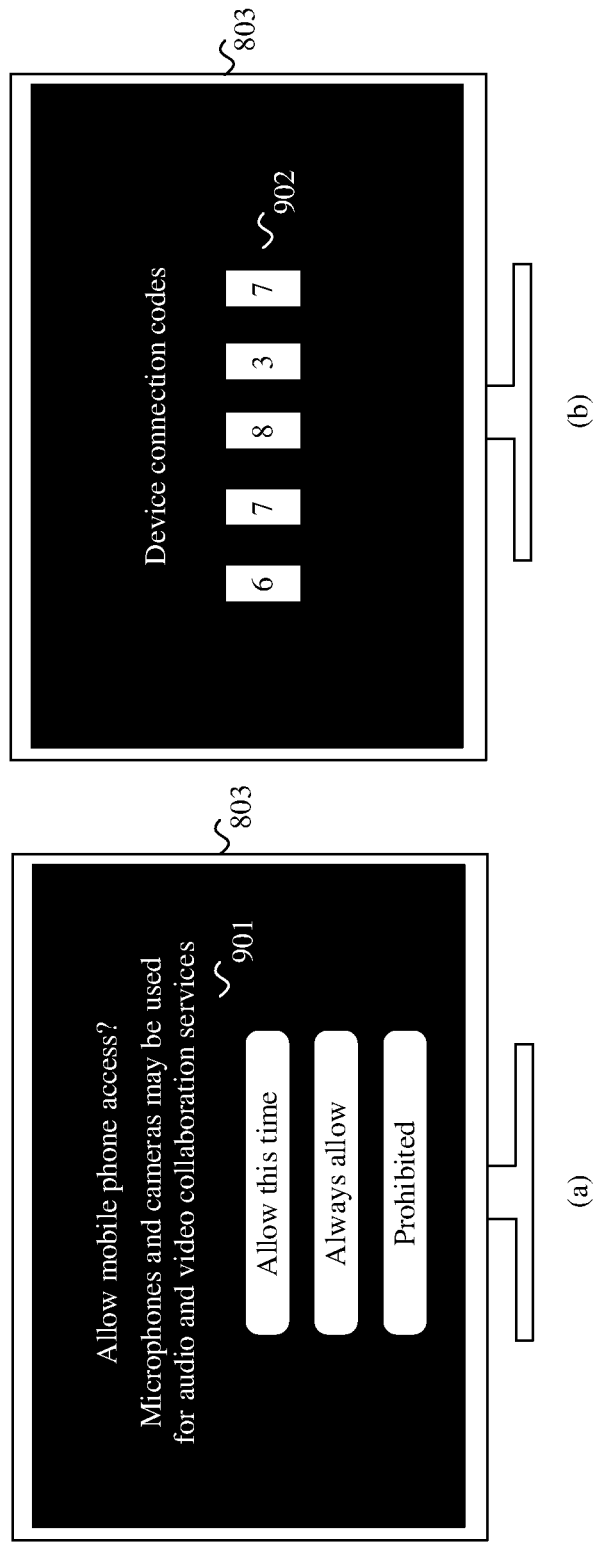
FIG. 9 is a schematic diagram 6 of an audio application scenario according to an embodiment of this application.

If the mobile phone currently establishes a network connection to the television 803 for the first time, as shown in (b) in FIG. 9, the television 803 may display a string of randomly generated connection codes 902 as authentication information to perform identity authentication on the mobile phone. In this case, the television 803 may send the connection codes 902 to the mobile phone. The DV app requires the user to enter, on the display of the mobile phone, the connection codes 902 displayed on the television 803. If the DV app detects that the connection codes entered by the user on the mobile phone are the same as the connection codes 902 sent by the television 803 to the mobile phone, it indicates that identity authentication between the mobile phone and the television 803 succeeds, and the DV app may trigger the mobile phone to establish a network connection to the television 803. Certainly, if the mobile phone and the television 803 have completed identity authentication, after detecting that the user selects the television 803, the DV app may directly establish a network connection to the television 803 without performing identity authentication again.

In this embodiment of this application, after the mobile phone establishes the network connection to the television 803, the mobile phone may communicate with the television 803 through the network connection. For example, the DV app in the mobile phone may use the television 803 as a slave device of the mobile phone, and obtain an audio capability parameter of the television 803 from the television 803 based on the established network connection. For example, the audio capability parameter may include one or more of an audio play latency, a sound effect parameter, an audio sampling rate, or a quantity of sound channels of the television 803, and these parameters may reflect a specific output capability supported by the television 803. Further, still as shown in FIG. 7, the DV app may invoke a preset interface of the HAL, and input the obtained audio capability parameter into the preset interface, to create an HAL corresponding to the television 803. In this embodiment of this application, the HAL created by the DV app to switch audio data to the slave device may be referred to as a distributed mobile sensing development platform (Distributed Mobile Sensing Development Platform, DMSDP) Audio HAL. Different from a conventional Audio HAL, the DMSDP audio HAL does not correspond to an actual hardware device of the mobile phone. The DMSDP audio HAL may transmit received audio data to the slave device of the mobile phone through an established network connection, so as to implement an audio switching function.

In some embodiments, the television 803 may also send, to the DV app in the mobile phone through the established network connection, a display capability parameter (for example, a screen resolution or a display data encoding/decoding algorithm) that is used to indicate a display capability of the television 803; or the television 803 (that is, a slave device) may also send, to the DV app in the mobile phone through the established network connection, a camera capability parameter (for example, a quantity of cameras or an image processing algorithm) that is used to indicate a camera capability of the television 803. Certainly, if the slave device (for example, the television 803) further has another capability (for example, a printing capability), the slave device may also send a related capability parameter to the DV app in the mobile phone. Therefore, the DV app in the mobile phone may further input these capability parameters and the foregoing audio capability parameters into the preset interface to create a corresponding HAL. In this case, the created HAL not only integrates the audio capability of the slave device, but also integrates other capabilities of the slave device. In the following embodiments, the HAL created by the DV app based on the capability parameters of the slave device may be referred to as a DMSDP HAL. In other words, the foregoing DMSDP audio HAL may be a function module configured to implement an audio function in the DMSDP HAL. In some embodiments, the DMSDP audio HAL may also be referred to as a DMSDP audio HAL. The mobile phone may implement a service function such as an audio function, a display function, or a camera function in various distributed scenarios by using a DMSDP HAL and a slave device. This is not limited in this embodiment of this application.

In addition, in this embodiment of this application, in addition to creating the corresponding DMSDP audio HAL for the slave device of the mobile phone at the HAL, the DV app may further invoke AudioManager to register the audio capability of the slave device with AudioPolicy. For example, the DV app may send an identifier of the television 803 and the audio capability parameter of the television 803 to AudioPolicy for storage. AudioPolicy may determine a corresponding audio policy based on the audio capability parameter of the television 803, and output the determined audio policy to the audio processor (for example, AudioFlinger). In this way, AudioFlinger may perform, according to the audio policy determined by AudioPolicy, corresponding processing on the audio data of Music that is output by the audio player (for example, AudioTrack), and send, by using the DMSDP audio HAL, processed audio data to the television 803 for play, so that audio on the mobile phone is switched to the slave device (that is, the television 803) in a customized manner for play, so as to implement a cross-device distributed audio capability.

The audio capability parameter of the television 803 may include a play parameter and a recording parameter of the television 803. The play parameter is used to reflect an audio play capability of the television 803, and the recording parameter is used to reflect an audio recording capability of the television 803. For example, the television 803 may encapsulate the play parameter in a first field, and encapsulate the recording parameter in a second field and send the second field to the mobile phone. AudioPolicy in the mobile phone may determine a corresponding audio play policy after extracting the play parameter from the first field, and AudioPolicy may determine a corresponding audio recording policy after extracting the recording parameter from the second field. Certainly, the first field or the second field may alternatively be empty, which indicates that the television 803 does not have an audio play capability or an audio recording capability.

In addition, the DMSDP audio HAL created by the DV app at the HAL may be dynamically updated. When the audio capability of the television 803 changes, for example, if the audio play latency of the television 803 changes, or the user manually changes the sound effect parameter of the television 803, the television 803 may dynamically send a latest audio capability parameter to the mobile phone. Further, the DV app in the mobile phone may update the DMSDP audio HAL based on the latest audio capability parameter of the television 803, so that the DMSDP audio HAL matches the audio capability of the television 803. In addition, the DV app in the mobile phone may register the latest audio capability parameter of the television 803 with AudioPolicy, so that AudioPolicy may update the current audio policy based on the latest audio capability parameter.

Figure 10:
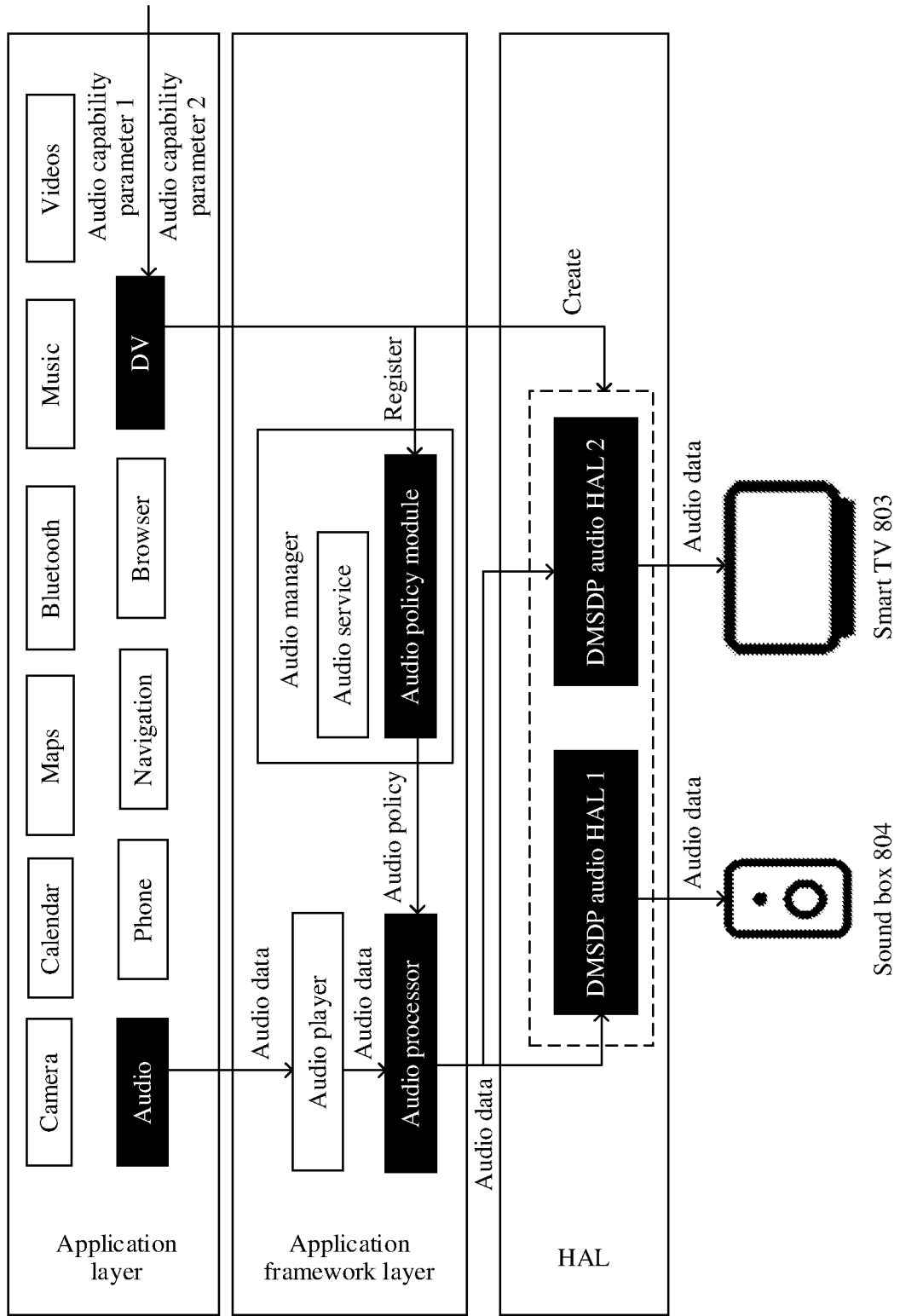
FIG. 10 is a schematic diagram 7 of an audio application scenario according to an embodiment of this application.

The foregoing embodiment is described by using an example in which a quantity of slave devices of the mobile phone is 1 during audio switching. In this embodiment of this application, the mobile phone may alternatively switch audio data of the mobile phone to a plurality of slave devices for play. For example, the user may select a plurality of devices as slave devices of the mobile phone from candidate devices found by the mobile phone. For example, the slave devices of the mobile phone include the sound box 804 and the television 803. Similar to the foregoing interaction between the mobile phone and the television 803, the mobile phone may separately establish a network connection to the plurality of slave devices, and obtain an audio capability parameter of each slave device, to create a DMSDP audio HAL corresponding to each slave device. For example, as shown in FIG. 10, the DV app may create a DMSDP audio HAL 1 at the HAL based on an audio capability parameter 1 of the sound box 804, and the DV app may create a DMSDP audio HAL 2 at the HAL based on an audio capability parameter 2 of the television 803. Further, after the mobile phone registers audio capabilities of the sound box 804 and the television 803 with AudioPolicy, AudioPolicy may customize a corresponding audio policy based on the audio capability parameter of each slave device, so that AudioFlinger can process audio data according to the audio policy determined by AudioPolicy. Subsequently, AudioFlinger may send first audio data that needs to be played by the sound box 804 to the sound box 804 by using the DMSDP audio HAL 1, and send second audio data that needs to be played by the television 803 to the television 803 by using the DMSDP audio HAL 2, so as to implement a cross-device distributed audio capability. The first audio data may be the same as or different from the second audio data.

It can be learned that, in the audio architecture provided in this embodiment of this application, the DV app may establish a network connection to a corresponding slave device in response to an audio switching requirement of the user, to obtain an audio capability parameter of the slave device. Further, the DV app may create a corresponding DMSDP audio HAL at the HAL based on the audio capability parameter, and register an audio capability of the slave device with AudioPolicy, so that AudioPolicy can output, based on the audio capability of the slave device, an audio policy that matches the audio capability of the slave device to AudioFlinger in a customized manner. Subsequently, after processing, according to the audio policy, audio data provided by the mobile phone, AudioFlinger may invoke the created DMSDP audio HAL to send processed audio data to the slave device, so that the slave device can play the audio data of the mobile phone (that is, a master device) that matches the audio capability of the slave device. In this way, the master device may switch an audio function of the master device to one or more other slave devices based on audio capabilities of the slave devices, so as to fully use the audio processing capabilities of the slave devices to collaborate with the slave devices to complete audio switching more efficiently and flexibly. This provides good user audio experience.

The following still uses an example in which the mobile phone is a master device to describe an audio control method provided in this embodiment of this application with reference to a specific audio capability parameter.

Figure 11:
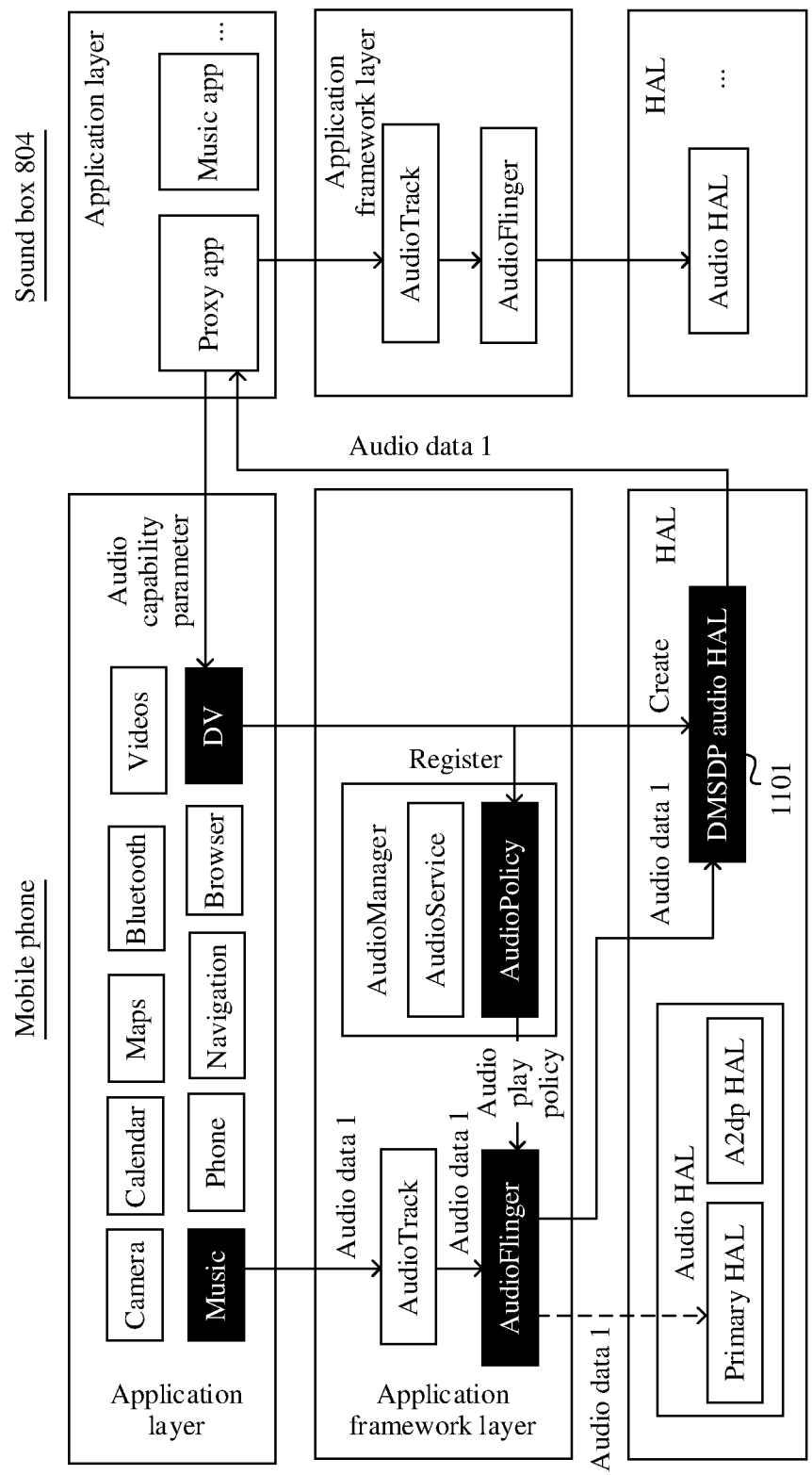
FIG. 11 is a schematic diagram 8 of an audio application scenario according to an embodiment of this application.

An example in which Music is an audio app is still used. When the mobile phone runs Music and plays a song A by using the speaker of the mobile phone, as shown in FIG. 11, Music may invoke the audio player (for example, AudioTrack) to send audio data 1 of the song A to the audio processor (for example, AudioFlinger). AudioFlinger performs processing such as sampling, mixing, sound effect setting, or sound channel conversion on the audio data 1. In this case, because the mobile phone is not connected to another audio output device, as shown by a dashed-line arrow in FIG. 11, AudioFlinger may invoke the primary HAL at the HAL to output processed audio data 1 to the speaker of the mobile phone for play, so as to implement a local audio play function of the mobile phone.

In addition, when running, Music may invoke AudioManager to register related information of the audio data 1 that is being played with AudioPolicy. For example, Music may buffer information such as a current sound effect mode, a quantity of sound channels, a sampling rate, or volume of the audio data 1 in AudioPolicy.

Figure 8:
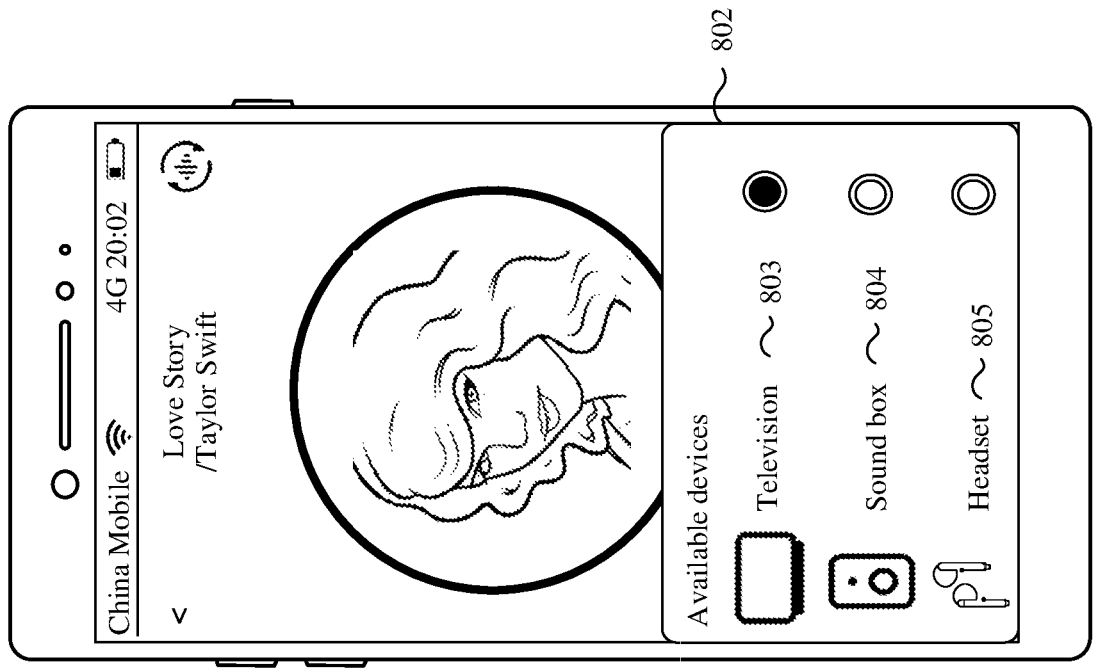
FIG. 8 is a schematic diagram 5 of an audio application scenario according to an embodiment of this application.
Figure 8:
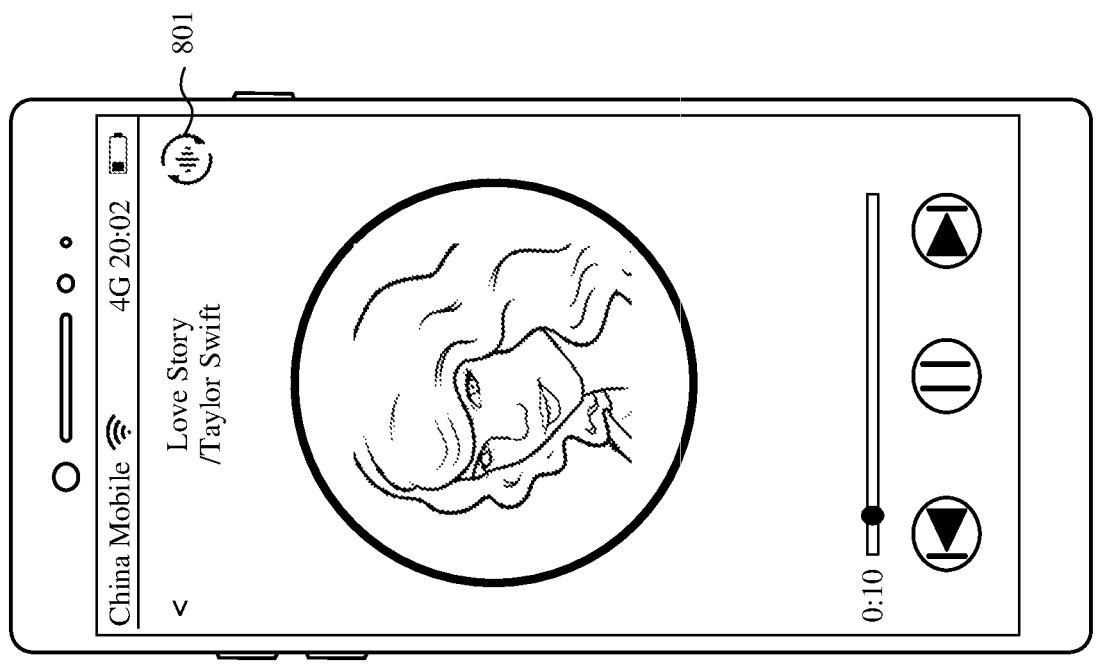

In this embodiment of this application, still as shown in (a) in FIG. 8, when running Music, the mobile phone may display the switching button 801 for audio switching. In addition, the mobile phone may run the DV app in the background for implementing an audio switching function. After detecting that the user taps the switching button 801, Music may communicate with the DV app, to trigger the DV app to search for one or more nearby candidate devices that can perform audio switching. As shown in (b) in FIG. 8, the DV app may display, in the menu 802, three candidate devices that are located in a same Wi-Fi network as the mobile phone: the television 803, the sound box 804, and the headset 805.

For example, the user selects the sound box 804 as a slave device of the mobile phone. After it is detected that the user selects the sound box 804, the DV app may establish a network connection to the sound box 804 by using the sound box 804 as a slave device of the mobile phone. Alternatively, after detecting that the user taps the switching button 801, Music may trigger a preset Communication app (for example, a HiLink app) to search for one or more nearby candidate devices that can perform audio switching. After it is detected that the user selects a candidate device (for example, the sound box 804), the DV app may be triggered to establish a network connection to the sound box 804 by using the sound box 804 as a slave device of the mobile phone. For example, the network connection may be a P2P connection based on the transmission control protocol (transmission control protocol, TCP) or the user datagram protocol (user datagram protocol, UDP).

It should be noted that, if the mobile phone establishes a network connection to the sound box 804 for the first time, the mobile phone and the sound box 804 further need to perform identity authentication. For a specific identity authentication process, refer to the related descriptions of identity authentication performed between the mobile phone and the television 803 in (a) and (b) in FIG. 9. Details are not described herein again.

Figure 12:
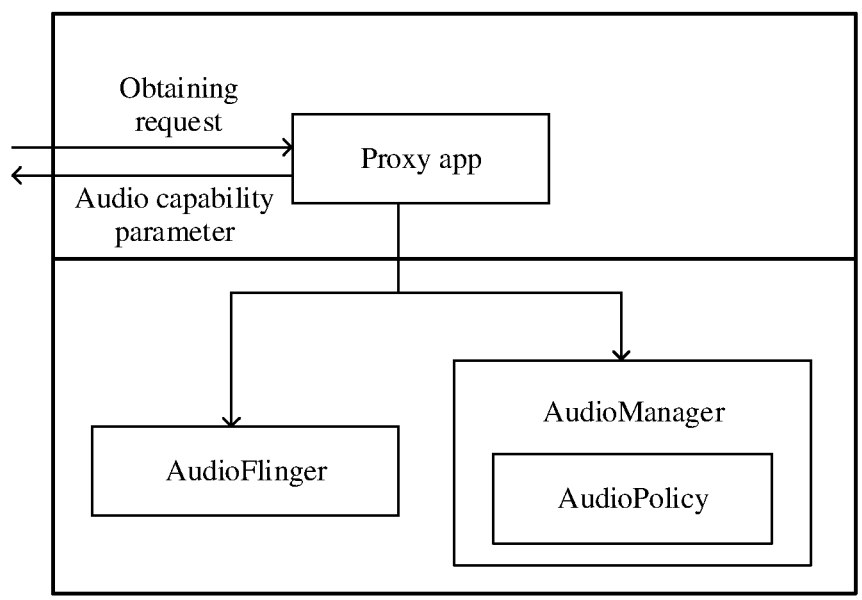
FIG. 12 is a schematic diagram 9 of an audio application scenario according to an embodiment of this application.

After the mobile phone establishes the network connection to the sound box 804, the DV app may use the sound box 804 as a slave device of the mobile phone, and obtain an audio capability parameter of the sound box 804 from the sound box 804. As shown in FIG. 12, an audio architecture in the sound box 804 is similar to that in the mobile phone, and a proxy app configured to implement an audio switching function may be installed in the sound box 804. After establishing the network connection to the sound box 804, the mobile phone may send an audio capability parameter obtaining request to the proxy app in the sound box 804. Further, in response to the obtaining request, the proxy app in the sound box 804 may invoke AudioManager in the sound box 804 to obtain the audio capability parameter of the sound box 804 from AudioPolicy or AudioFlinger in the sound box 804. In this way, the proxy app in the sound box 804 may send the audio capability parameter of the sound box 804 to the DV app in the mobile phone. Alternatively, a proxy app may be set in the mobile phone, and the proxy app in the sound box 804 may send the audio capability parameter of the sound box 804 to the proxy app in the mobile phone, so that the proxy app in the mobile phone sends the audio capability parameter of the sound box 804 to the DV app. This reduces running load of the DV app.

Still as shown in FIG. 11, after obtaining the audio capability parameter of the sound box 804, the DV app in the mobile phone may create, based on the audio capability parameter, a DMSDP audio HAL 1101 corresponding to the sound box 804. In addition, the DV app may invoke AudioManager to register an audio capability of the sound box 804 with AudioPolicy. For example, the DV app may send an identifier of the sound box 804 and the audio capability parameter of the sound box 804 to AudioPolicy. In this way, AudioPolicy may set, based on the audio capability parameter of the sound box 804, an audio play policy used for switching audio to the sound box 804.

The audio capability parameter of the sound box 804 may be used to reflect a specific audio input or output capability supported by the sound box 804. In this embodiment of this application, the audio capability parameter of the slave device (for example, the sound box 804) may include two types of parameters: an audio capability parameter (which may be referred to as a hardware capability parameter) that is mainly related to a hardware capability of the sound box 804 and that can reflect a hardware capability of the sound box 804 for inputting or outputting audio, for example, a sampling rate or a quantity of sound channels supported by the sound box 804; and an audio capability parameter (which may be referred to as a software capability parameter) that is mainly related to a software capability of the sound box 804 and that can reflect a software capability of the sound box 804 for inputting or outputting audio, for example, a sound effect mode or an encoding/decoding capability supported by the sound box 804. In this way, AudioPolicy may set a corresponding audio play policy based on the hardware capability and the software capability of the sound box 804 for playing audio.

For example, the audio capability parameter (that is, the hardware capability parameter) related to the hardware capability of the sound box 804 is mainly determined by a hardware feature of the sound box 804, for example, a hardware type, a model, or an interface type of a processor, a speaker, or a microphone in the sound box 804. When the slave device of the mobile phone does not change, for example, when the slave device of the mobile phone is the sound box 804, the hardware capability parameter in the audio capability parameter that is reported by the sound box 804 is generally fixed. Certainly, in some extreme cases, for example, when some hardware in the sound box 804 is faulty or damaged, the hardware capability parameter in the audio capability parameter that is reported by the sound box 804 to the mobile phone may change.

Correspondingly, the audio capability parameter (that is, the software capability parameter) related to the software capability of the sound box 804 is mainly determined by a software feature of the sound box 804, for example, a sound effect algorithm, an echo cancellation algorithm, an encoding or decoding algorithm used by the sound box 804. When the slave device of the mobile phone does not change, for example, when the slave device of the mobile phone is the sound box 804, the software capability parameter in the audio capability parameter that is reported by the sound box 804 may be dynamically updated. For example, after the user turns on a sound effect switch of the sound box 804, the sound box 804 may report, in the audio capability parameter, that the sound effect mode of the sound box 804 is in an on state. After the user turns off the sound effect switch of the sound box 804, the sound box 804 may update the audio capability parameter of the sound box 804, and report, in the audio capability parameter, that the sound effect mode of the sound box 804 is in an off state.

It should be noted that, when any device implements an audio input or output function, mutual support between hardware and software of the device is required. Therefore, when the software capability parameter and the hardware capability parameter are divided, the following cannot be defined: The software capability parameter is completely determined by the software feature of the device, and the hardware capability parameter is completely determined by the hardware feature of the device. For example, the audio capability parameter reported by the sound box 804 may include an audio play latency, and the audio play latency is related to software factors such as an algorithm for processing audio data by the sound box 804 and a network environment, and is also related to a hardware processing capability of the sound box 804. In this embodiment of this application, because the audio play latency reported by the sound box 804 may be dynamically updated, the audio play latency may be used as a software capability parameter. Certainly, a person skilled in the art may also divide the foregoing software capability parameter and the foregoing hardware capability parameter based on an actual application scenario or actual experience. This is not limited in this embodiment of this application.

In some embodiments, the audio capability parameter of the sound box 804 may include a sound effect capability (which may be referred to as a sound effect parameter) supported by the sound box 804. For example, the sound box 804 supports a heavy bass sound effect, a 3D surround sound effect, a Dolby sound effect, and a Histen sound effect.

Generally, a sound effect mode enabled by the sound box 804 at a moment is fixed. For example, after the sound box 804 is powered on, the Dolby sound effect may be enabled by default. If the user wants to change a sound effect of playing audio on the sound box 804, the user may manually set a current sound effect mode on the sound box 804. For example, the sound effect mode of the sound box 804 may be set from the Dolby sound effect to the heavy bass sound effect. In this case, when the sound box 804 reports the audio capability parameter to the DV app in the mobile phone, the sound effect mode supported by the sound box 804 and the currently enabled sound effect mode may be added to the audio capability parameter as sound effect parameters. Certainly, if the sound box 804 does not enable the sound effect mode, the sound box 804 may also indicate, in the audio capability parameter, that the sound box 804 does not enable the sound effect mode.

For example, when the mobile phone runs Music, Music may invoke AudioTrack to send the audio data 1 to AudioFlinger. Before processing the audio data 1, AudioFlinger may communicate with AudioPolicy, and request, from AudioPolicy, an audio play policy for currently processing the audio data 1. In response to the request of AudioFlinger, AudioPolicy may query, in the audio capability parameter of the sound box 804, whether the sound box 804 currently enables the sound effect mode. If the sound effect mode is enabled, AudioPolicy may set, in the audio play policy, that sound effect processing is not performed on the audio data 1. In this way, after AudioPolicy outputs the audio play policy to AudioFlinger, AudioFlinger does not need to perform sound effect processing on the audio data 1. After AudioFlinger invokes the DMSDP audio HAL 1101 to send the audio data 1 to the sound box 804, the sound box 804 may perform corresponding sound effect processing on the audio data 1 and then play processed audio data 1.

If the sound box 804 does not enable the sound effect mode, AudioPolicy may set, in the audio play policy, that sound effect processing is not performed on the audio data 1. Alternatively, if the sound box 804 does not enable the sound effect mode, to improve an effect of playing audio on the sound box 804, AudioPolicy may set, in the audio play policy, that sound effect processing is performed on the audio data 1. For example, heavy bass processing is performed on the audio data 1. In this way, after AudioPolicy outputs the audio play policy to AudioFlinger, AudioFlinger may perform heavy bass processing on the audio data 1 in response to the audio play policy, and send processed audio data 1 to the sound box 804 by using the DMSDP audio HAL 1101. In this case, although the sound box 804 does not enable any sound effect, the sound box 804 may also present a heavy bass sound effect to the user when playing audio from the mobile phone.

In this way, the audio play policy that is set by AudioPolicy based on the sound effect parameter of the sound box 804 can avoid sound effect superposition caused when both the mobile phone (that is, a master device) and the sound box 804 (that is, a slave device) perform sound effect processing on audio data, and can also avoid a sound effect loss caused when neither of the mobile phone (that is, a master device) and the sound box 804 (that is, a slave device) performs sound effect processing on audio data. This improves user audio experience.

In some embodiments, AudioPolicy may alternatively determine, based on a device type of the slave device, an audio play policy related to a sound effect. For example, if a current slave device of the mobile phone is a wearable watch, after establishing a network connection to the wearable watch, the mobile phone may obtain an identifier of the wearable watch and an audio capability parameter of the wearable watch. The mobile phone may determine, based on the identifier of the wearable watch, that a device type of the current slave device is the wearable device. If the audio capability parameter of the wearable watch indicates that the wearable watch enables a Dolby sound effect, AudioPolicy in the mobile phone may set, in the audio play policy, that audio data that needs to be played is processed by using the Dolby sound effect. Subsequently, AudioFlinger may add the Dolby sound effect to the audio data in response to the audio play policy, and send processed audio data to the wearable watch by using a corresponding DMSDP audio HAL. In this way, when playing the audio data, the wearable watch does not need to perform sound effect processing. This can reduce running load of a device having a low audio processing capability, such as the wearable watch, and can also ensure that the wearable watch can present a good Dolby sound effect when playing the audio data. This improves user audio experience.

In some other embodiments, when Music runs on the mobile phone, the mobile phone may alternatively invoke AudioManager to provide Music with a sound effect mode supported by the mobile phone and a sound effect mode supported by the slave device (for example, the sound box 804), and Music selects a specific sound effect mode to play current audio data. For example, Music may present, to the user in a form of a list, the sound effect modes supported by the mobile phone and the sound box 804, and the user manually selects a required sound effect mode. In this case, if the sound effect mode selected by the user is the sound effect mode supported by both the mobile phone and the sound box 804, AudioPolicy may set, in the audio play policy, that the mobile phone does not perform sound effect processing on the audio data, so that the sound box 804 performs corresponding sound effect processing on the audio data sent by the mobile phone and then plays processed audio data. If the sound effect mode selected by the user is the sound effect mode supported by only the mobile phone, AudioPolicy may set, in the audio play policy, that the mobile phone performs corresponding sound effect processing on the audio data, so that the sound box 804 plays the audio data and then can still present a sound effect required by the user. Correspondingly, if the sound effect mode selected by the user is the sound effect mode supported by only the sound box 804, AudioPolicy may set, in the audio play policy, that the mobile phone does not perform sound effect processing on the audio data, so that the sound box 804 performs corresponding sound effect processing on the audio data sent by the mobile phone and then plays processed audio data.

In some other embodiments, the audio capability parameter of the sound box 804 may include a sound emitting capability (which may be referred to as an audio quality parameter) supported by the sound box 804, for example, the sampling rate supported by the sound box 804 (that is, a quantity of samples that are extracted by the sound box 804 from continuous audio signals per second and that form a discrete signal) or the quantity of sound channels (that is, the quantity of sound channels).

For example, AudioPolicy learns from the obtained audio capability parameter that a maximum sampling rate supported by the sound box 804 is 96 kHz, and AudioPolicy may further query a sampling rate of the audio data 1 currently received by AudioFlinger. If the sampling rate of the audio data 1 currently received by AudioFlinger is greater than 96 kHz, AudioPolicy may set, in the audio play policy, that the audio data 1 is re-sampled, and a re-sampling rate is 96 kHz. In this way, after AudioPolicy outputs the audio play policy to AudioFlinger, AudioFlinger may re-sample the audio data 1 at the sampling rate of 96 kHz, so that re-sampled audio data 1 matches a sound play capability of the sound box 804.

For another example, AudioPolicy learns from the obtained audio capability parameter that the quantity of sound channels is 2, and AudioPolicy may further query whether the quantity of sound channels in the audio data 1 currently received by AudioFlinger is 2. If no, AudioPolicy may set the quantity of sound channels to 2 in the audio play policy. In this way, after AudioPolicy outputs the audio play policy to AudioFlinger, AudioFlinger may mix the audio data 1 based on the quantity 2 of sound channels, so that audio data 1 that is mixed matches a sound play capability of the sound box 804.

In some other embodiments, some audio apps have a low-latency play requirement when playing audio. For example, when recording a user's song, a Karaoke application needs to output accompaniment audio in time to ensure user recording experience. For another example, when outputting a display image, the video application needs to output corresponding audio in time to ensure user viewing experience. These audio apps having a low-latency requirement require that an audio output device processes audio as quickly as possible when outputting the audio.

For example, the audio capability parameter obtained by the mobile phone from the sound box 804 may also include an audio play latency (latency) of the sound box 804. The audio play latency may be specifically a time required by the sound box 804 to process one frame of audio data. Generally, audio data is generated in a form of an audio stream. For convenience of audio algorithm processing or transmission, continuous audio data may be divided into frames of audio data based on a time unit (which is also referred to as duration). For example, audio data in a unit of 2.5 ms to 60 ms may be used as one frame of audio data, and one frame of audio data is a minimum granularity for a device to perform audio processing.

AudioPolicy may determine, based on the audio play latency in the audio capability parameter, whether the sound box 804 supports a low-latency audio processing capability. For example, when the audio play latency of the sound box 804 is less than or equal to 5 ms (that is, the time required by the sound box 804 to process one frame of audio data is less than or equal to 5 ms), it may be determined that the sound box 804 supports the low-latency audio processing capability. In this case, AudioPolicy may set a low-latency mode in the audio play policy, so that AudioFlinger can process the audio data 1 in the low-latency mode. Alternatively, the sound box 804 may indicate, in the audio capability parameter, whether the sound box supports a low-latency audio processing capability. For example, if a field of a preset latency parameter in the audio capability parameter of the sound box 804 is 0, it indicates that the sound box 804 supports the low-latency audio processing capability. In this case, AudioPolicy may set a low-latency mode in the audio play policy. Correspondingly, if the field of the preset latency parameter in the audio capability parameter is 1, it indicates that the sound box 804 does not support the low-latency audio processing capability. In this case, AudioPolicy may set a non-low-latency mode in the audio play policy.

The low-latency audio processing capability generally requires that a device has a high audio data processing capability. For example, in the non-low-latency mode, AudioFlinger may set duration of one frame of audio data to 10 ms, and AudioFlinger needs to buffer 10 frames of audio data each time to ensure continuous consistency of audio output. To be specific, a time granularity of processing each frame of audio data by the mobile phone is 10 ms, and a period of processing audio data by the mobile phone each time is 100 ms (10 ms*10). However, in the low-latency mode, AudioFlinger may reduce duration of one frame of audio data to 5 ms, and a buffer of the mobile phone still needs to store 10 frames of audio data. In this case, in the low-latency mode, a time granularity of processing each frame of audio data by the mobile phone is 5 ms, and a period of processing audio data by the mobile phone each time is 50 ms (5 ms*10).

If the low-latency mode is set in the audio play policy that is output by AudioPolicy, AudioFlinger may send the audio data 1 to the sound box 804 by using 5 ms as duration of one frame of audio data. In other words, compared with the non-low-latency mode, in the low-latency mode, the mobile phone may set the duration of each frame of audio data to a small value. For example, the duration of the one frame of audio data is 5 ms. Subsequently, the sound box 804 may process each frame of audio data at a time granularity of 5 ms in the low-latency mode. This shortens a time of processing each frame of audio data, and improves user audio experience.

For example, AudioPolicy may further query whether the currently running Music has a low-latency play requirement. If Music has the low-latency play requirement, and the sound box 804 supports the low-latency play capability, AudioPolicy may set the low-latency mode in the audio play policy. If Music has the low-latency play requirement, but the sound box 804 does not support the low-latency play capability, AudioPolicy may simplify a processing process of the audio data 1 in the audio play policy as much as possible. For example, AudioPolicy may set that sound effect processing is not performed on the audio data 1. This can shorten a latency of sending audio data by the mobile phone to the sound box 804, and meet a low-latency play requirement of an audio app as much as possible. Correspondingly, if Music does not have the low-latency play requirement, AudioPolicy may set the low-latency mode in the audio play policy, or may set the non-low-latency mode in the audio play policy. This is not limited in this embodiment of this application.

In some other embodiments, the audio capability parameter of the sound box 804 may include an equalizer (Equalizer, EQ) parameter of the sound box 804. The EQ parameter generally includes three parameters: a frequency (frequency), a gain (gain), and a quantization (quantization). The frequency is used to set a parameter of a frequency point that needs to be adjusted in audio data. The gain is used to adjust a parameter for gaining or attenuating audio data of a frequency. The quantization is used to set a parameter of a frequency band "width" for a gain or an attenuation. The EQ parameter may be used to gain or attenuate one or more frequency bands in audio data to adjust timbre.

For example, after AudioPolicy obtains the EQ parameter in the audio capability parameter, AudioPolicy may set, in the audio play policy, that an EQ parameter in the audio data 1 is the EQ parameter obtained from the sound box 804. In this way, after AudioPolicy outputs the audio play policy to AudioFlinger, AudioFlinger may adjust timbre of the audio data 1 based on the EQ parameter of the sound box 804, so that the audio data 1 subsequently sent by the mobile phone to the sound box matches the audio play capability of the sound box 804.

In some embodiments, after obtaining the audio capability parameter of the sound box 804, AudioPolicy may store the audio capability parameter of the sound box 804 in the mobile phone. As shown in Table 1, AudioPolicy may store, in the mobile phone, a device name, an identifier, and a corresponding audio capability parameter of a slave device that are obtained by the DV app each time. The identifier may be specifically an identifier that can uniquely identify the device, such as an international mobile equipment identity (international mobile equipment identity, IMIE) or a media access control (Media Access Control, MAC) address of the slave device. The audio capability parameter may include a sound effect parameter, an audio quality parameter, an audio play latency, an EQ parameter, and the like. In this way, AudioPolicy may customize, based on the audio capability parameter of the sound box 804 in Table 1, the audio play policy that matches the audio capability of the sound box 804. Subsequently, after the mobile phone establishes a network connection to the mobile phone by using the sound box 804 as a slave device of the mobile phone again, the mobile phone may search Table 1 to determine, by obtaining the identifier of the sound box 804, whether the audio capability parameter of the sound box 804 is stored. If the audio capability parameter of the sound box 804 is stored, the mobile phone may determine the corresponding audio play policy without additionally obtaining the audio capability parameter of the sound box 804. This increases a switching speed in a subsequent audio switching process.

TABLE 1

| Device | Identifier | Sound effect parameter | Audio quality parameter | | | Audio play latency (ms) | EQ parameter |
|---|---|---|---|---|---|---|---|
| | | | Sampling rate (kHz) | Quantity of sound channels | | | |
| Sound box | 001 | Heavy bass sound effect/3D surround sound effect/Recording studio sound effect | 16/44.1/96/192/384 | 2, 4, or 6 | | 60 | EQ1 |
| Television | 002 | Heavy bass sound effect/3D surround sound effect | 48/96/192/384 | 2 or 4 | | 100 | EQ2 |
| ... | ... | ... | ... | ... | | ... | ... |

The foregoing embodiment is described by using an example in which the audio capability parameter of the sound box 804 that is obtained by the mobile phone includes a sound effect parameter, an audio quality parameter, an audio play latency, and an EQ parameter. It can be understood that the audio capability parameter may further include another parameter related to the audio capability of the sound box 804, such as a signal-to-noise ratio and a distortion rate. This is not limited in this embodiment of this application. AudioPolicy in the mobile phone may customize, based on the audio capability parameter of the sound box 804, an audio play policy that matches the audio capability of the sound box 804, so that the sound box 804 (that is, a slave device) can play audio data of the mobile phone (that is, a master device) that matches the audio capability of the sound box.

Similar to the process in which the mobile phone stores the audio capability parameter of the sound box 804 in the foregoing embodiment, in some other embodiments, after determining the corresponding audio play policy based on the audio capability parameter of the sound box 804, AudioPolicy may further store the audio play policy corresponding to the sound box 804 in the mobile phone. As shown in Table 2, AudioPolicy may store, in the mobile phone, audio play policies determined for different slave devices each time. In this way, when the mobile phone uses the sound box 804 as a slave device of the mobile phone again to perform audio switching, the DV app may search Table 2 to determine, by obtaining the identifier of the sound box 804, whether the audio play policy corresponding to the sound box 804 is stored. If the audio play policy corresponding to the sound box 804 is stored, the DV app may directly deliver the audio play policy corresponding to the sound box 804 to AudioPolicy, and the mobile phone does not need to additionally obtain the audio capability parameter of the sound box 804, and does not need to determine the corresponding audio play policy again. This increases a switching speed in a subsequent audio switching process.

TABLE 2

| | | Audio play policy | | | |
|---|---|---|---|---|---|
| Device | Identifier | Sampling rate (kHz) | Low-latency mode | EQ parameter | Sound effect policy |
| Sound box | 001 | 48 | Off | EQ1 | Enable a heavy bass sound effect |
| Television | 002 | 16 | On | EQ2 | None |
| ... | ... | ... | ... | ... | ... |

Certainly, if the audio capability parameter of the sound box 804 subsequently changes, AudioPolicy in the mobile phone may re-determine an audio play policy corresponding to the sound box 804 based on a latest audio capability parameter of the sound box 804. In this case, AudioPolicy may update the audio play policy corresponding to the sound box 804 in Table 2 and store an updated audio play policy in the mobile phone.

It should be noted that the audio play policy corresponding to the sound box 804 may alternatively be empty, that is, the mobile phone does not need to perform processing related to the audio capability parameter on audio data that needs to be sent to the sound box 804. In this case, the first device may directly send audio data of the audio app to the sound box 804. Certainly, before sending audio data to the sound box 804, the mobile phone may still perform conventional processing such as parsing, encoding, decoding, encapsulation, or decapsulation on the to-be-sent audio data. This is not limited in this embodiment of this application.

For example, still as shown in FIG. 11, after processing the audio data 1 according to the audio play policy that is output by AudioPolicy, AudioFlinger in the mobile phone may invoke the DMSDP audio HAL 1101 to send processed audio data 1 to the proxy app in the sound box 804. In some embodiments, when sending the audio data 1 to the sound box 804 by using the DMSDP audio HAL 1101, AudioFlinger may alternatively perform processing such as parsing, encapsulation, or encoding on the audio data 1 according to a specific rule or protocol, where the processing is generally not directly associated with the audio capability parameter of the sound box 804. For example, the DMSDP audio HAL 1101 may pack the audio data 1 that is output by AudioFlinger to frames of data packets, add related information of the audio data 1 (for example, a type and an audio format of the audio data 1) to a head file, and send the head file to the proxy app in the sound box 804 together with the data packets of the audio data 1.

Certainly, an application other than the proxy app may be installed at the application layer of the sound box 804, for example, Music. This is not limited in this embodiment of this application. Still as shown in FIG. 11, after receiving the audio data 1 sent by the mobile phone, the proxy app in the sound box 804 may invoke an audio player (for example, AudioTrack) in the sound box 804 to send the audio data 1 to an audio processor (for example, AudioFlinger) in the sound box 804. AudioFlinger processes the received audio data 1, and invokes an audio HAL at the HAL to output processed audio data 1 to a speaker of the sound box 804 for play. This completes a process in which the mobile phone switches audio to the sound box 804 for continuing play.

It can be learned that, for a slave device (for example, the sound box 804) of the mobile phone, the slave device only needs to install the foregoing proxy app, so that the slave device can report an audio capability parameter of the slave device to the mobile phone by using the proxy app, and obtain, from the mobile phone, audio data that matches an audio capability of the slave device for play. This flexibly distributes an audio function of the master device 101 to the slave device 102 for implementation, and provides good user audio experience.

Further, after the mobile phone successfully switches, to the sound box 804 for play, the audio data 1 of the song A that is being played, if it is detected that the currently played audio data changes, or it is detected that the audio capability of the slave device changes, or it is detected that the user switches to a new slave device, the mobile phone may further dynamically adjust a current audio play policy, so that the slave device can play audio data of the mobile phone (that is, a master device) that matches the audio capability of the slave device.

For example, after the mobile phone switches, to the sound box 804, the audio data 1 of the song A that is being played, the mobile phone still runs Music. In this case, the user may adjust, by using a volume button of the mobile phone, volume of playing the audio data 1 on the sound box 804. A plurality of types of audio streams are predefined in the audio architecture of the Android system. For example, the audio stream types include STREAM_ALARM (alarm), STREAM_MUSIC (music), STREAM_RING (ringtone), STREAM_SYSTEM (system), and STREAM_VOICE_CALL (call).

Figure 13:
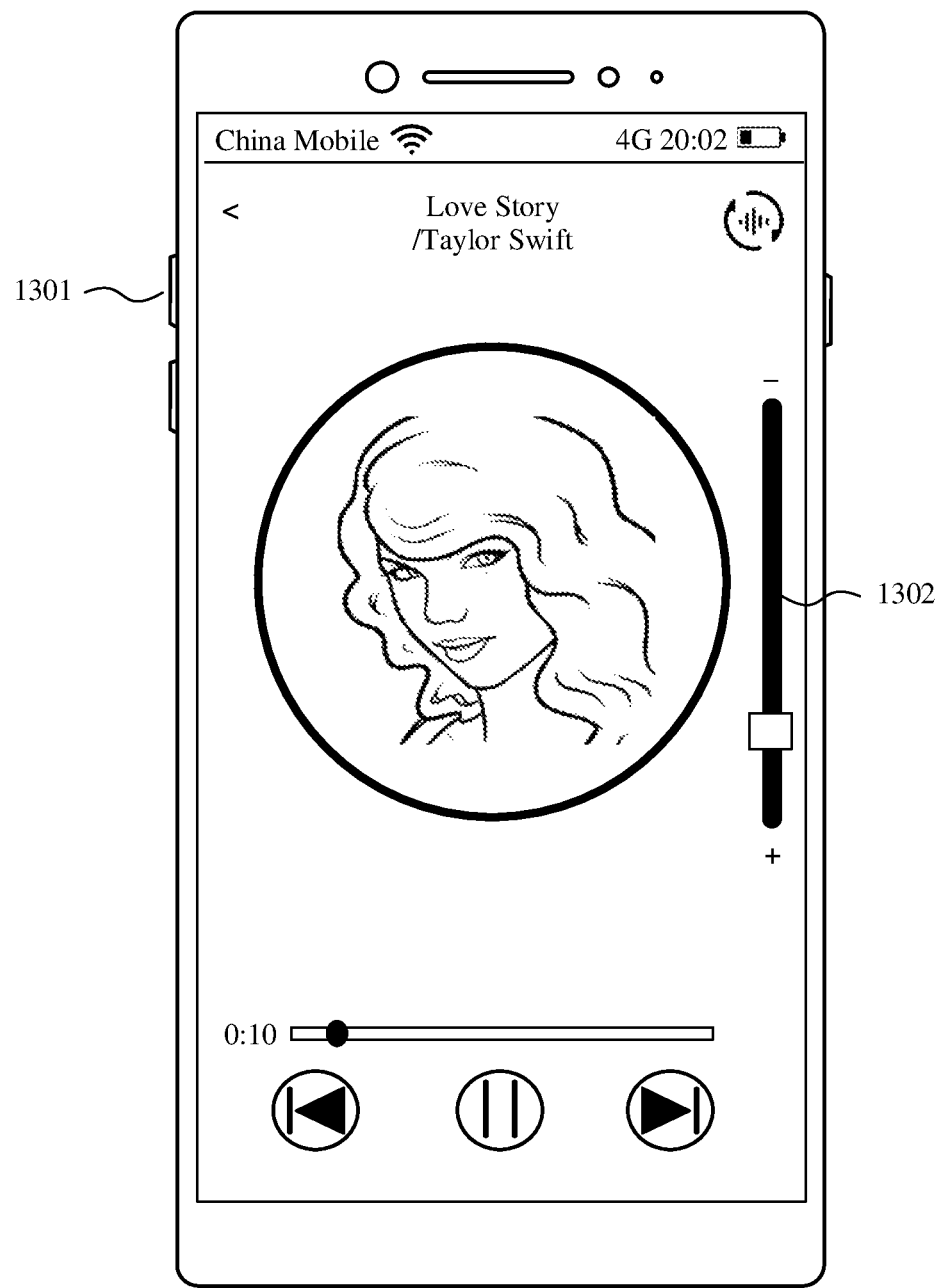
FIG. 13 is a schematic diagram 10 of an audio application scenario according to an embodiment of this application.

As shown in FIG. 13, when detecting that the user presses a volume button 1301, the mobile phone may display a volume adjustment control 1302. In addition, because an audio stream type of the audio data 1 that is output by Music is STREAM_MUSIC, the mobile phone may invoke AudioManager to reset volume in AudioPolicy based on the audio stream type STREAM_MUSIC.

For example, after detecting that the user presses the volume button 1301, the mobile phone may invoke AudioManager to multiply current volume of the audio data 1 by a preset volume coefficient in AudioPolicy, to obtain adjusted volume. For example, when the user presses a volume button "+", AudioPolicy may multiply current volume (for example, 100) by a volume coefficient 120%, to obtain adjusted volume 120. For another example, when the user presses a volume button "−", AudioPolicy may multiply current volume (for example, 100) by a volume coefficient 80%, to obtain adjusted volume 80. Further, AudioPolicy may output the adjusted volume to AudioFlinger, and AudioFlinger processes the audio data 1 based on the adjusted volume. For example, AudioFlinger may invoke a stream volume (function to modify a gain of the audio data 1, so as to adjust volume of the audio data 1. Further, AudioFlinger may invoke the DMSDP audio HAL 1101 to send processed audio data 1 to the sound box 804, so that the audio data 1 played by the sound box 804 is volume-adjusted audio data. In this way, after switching audio in the mobile phone to the sound box 804, the user may further conveniently control, by using the mobile phone, volume of playing the audio on the sound box 804.

Figure 14A:
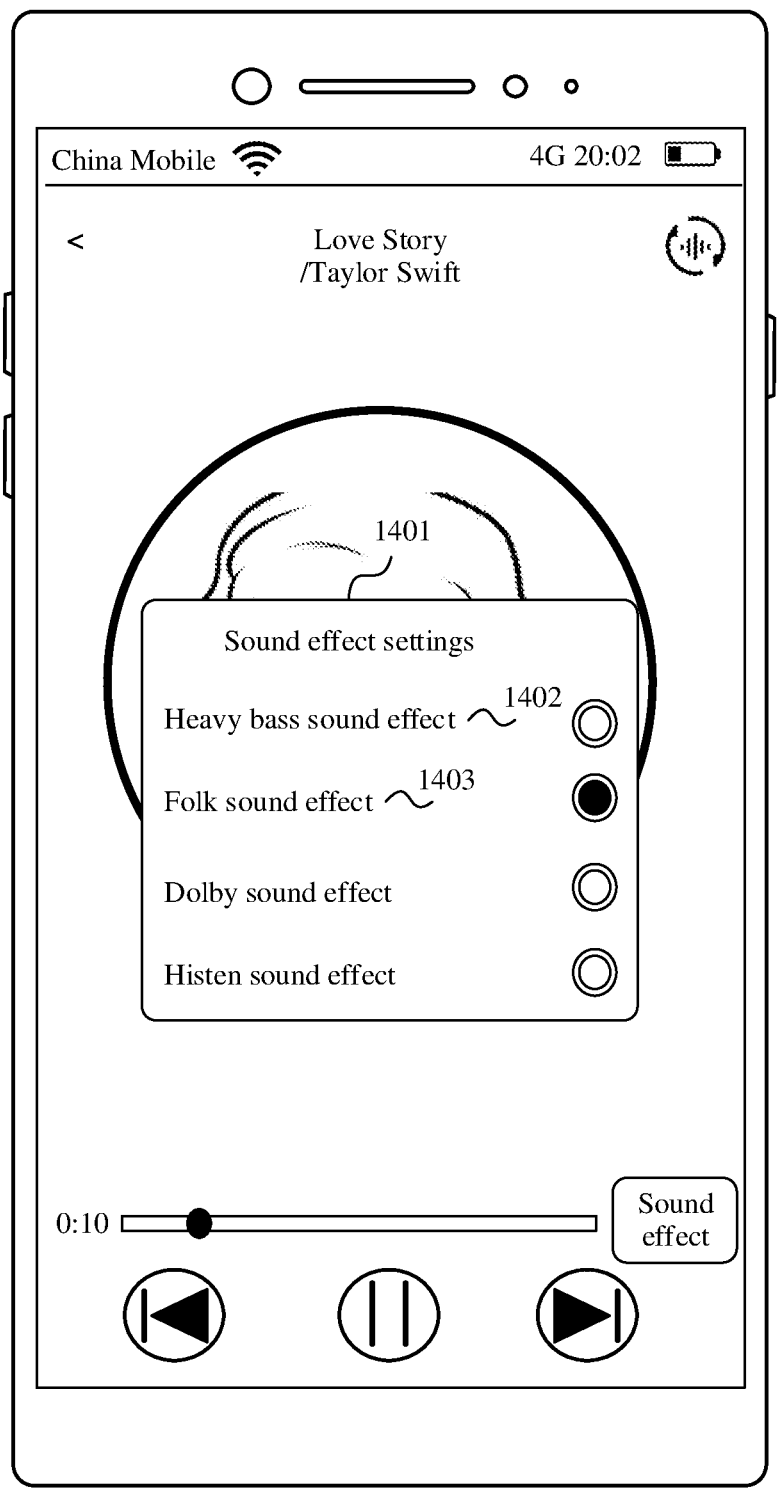
FIG. 14A is a schematic diagram 11 of an audio application scenario according to an embodiment of this application.

In some other embodiments, after the mobile phone switches, to the sound box 804, the audio data 1 of the song A that is being played, the mobile phone still runs Music. As shown in FIG. 14A, Music may further change a sound effect mode of the song A that is being played. For example, the user may change the sound effect mode of the song A from "Heavy bass sound effect" 1402 to "Folk sound effect" 1403 in a setting menu 1401 of Music. After detecting that the user taps "Folk sound effect" 1403 in the setting menu 1401, Music may invoke AudioManager to change, in AudioPolicy, the sound effect mode of the audio data 1 that is being played on the mobile phone.

Further, AudioPolicy may determine, based on the audio capability parameter obtained from the sound box 804, whether the sound box 804 currently supports the folk sound effect play mode. If the sound box 804 does not support the folk sound effect play mode, AudioPolicy may update a current audio play policy, and set, in the audio play policy, that folk sound effect processing is performed on the audio data 1. In this way, after AudioPolicy outputs the audio play policy to AudioFlinger, AudioFlinger may perform folk sound effect processing on the audio data 1. Subsequently, after AudioFlinger invokes the DMSDP audio HAL 1101 to send processed audio data 1 to the sound box 804, the audio data 1 played by the sound box 804 may present the folk sound effect to the user.

Alternatively, if the sound box 804 supports the folk sound effect play mode, AudioPolicy may also update a current audio play policy, and set, in the audio play policy, that folk sound effect processing is not performed on the audio data 1. In this way, after AudioPolicy outputs the audio play policy to AudioFlinger, AudioFlinger does not need to perform folk sound effect processing on the audio data 1. Subsequently, after AudioFlinger invokes the DMSDP audio HAL 1101 to send processed audio data 1 to the sound box 804, the sound box 804 may perform folk sound effect processing on the audio data 1 and then play processed audio data 1. In this way, the folk sound effect may also be presented to the user.

Figure 14B:
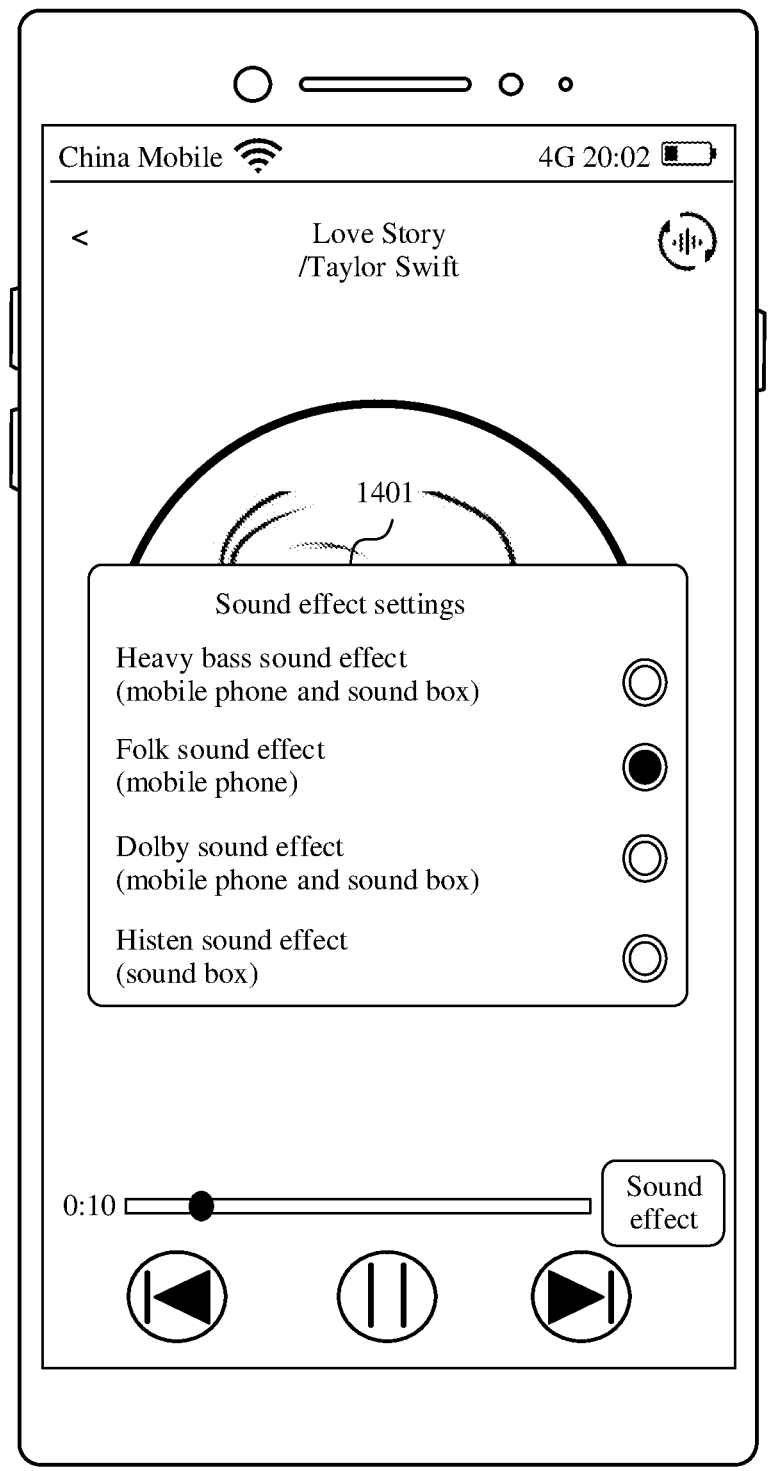
FIG. 14B is a schematic diagram 12 of an audio application scenario according to an embodiment of this application.

In some embodiments, as shown in FIG. 14B, the mobile phone may further identify, in the setting menu 1401 of Music, devices corresponding to various sound effect modes. For example, both the mobile phone and the sound box 804 support the heavy bass sound box and the Dolby sound effect, the folk sound effect is supported by only the mobile phone, and the Histen sound effect is supported by only the sound box 804. In this way, the user can intuitively learn of sound effect modes currently supported by the master device and the slave device, so as to select a corresponding sound effect mode for the audio data 1. For example, if the sound effect mode selected by the user is supported by only the sound box 804 (for example, the Histen sound effect), AudioPolicy in the mobile phone may update a current audio play policy, and set, in the audio play policy, that the mobile phone does not perform audio processing on the audio data 1. Subsequently, the sound box 804 may perform Histen sound effect processing on the audio data 1 and then play processed audio data 1. If the sound effect mode selected by the user is supported by only the mobile phone (for example, the folk sound effect), AudioPolicy in the mobile phone may update a current audio play policy, and set, in the audio play policy, that the mobile phone performs folk sound effect processing on the audio data 1. Subsequently, after the mobile phone sends processed audio data 1 to the sound box 804, the audio data 1 played by the sound box 804 may present the folk sound effect to the user. If the user selects the sound effect mode (for example, the Dolby sound effect) supported by both the mobile phone and the sound box, the mobile phone may set, by default in the audio play policy, that the mobile phone (or the sound box 804) performs Dolby sound effect processing on the audio data 1. Alternatively, the mobile phone may display a dialog box to prompt the user to select the Dolby sound effect provided by the mobile phone or the Dolby sound effect provided by the sound box 804 to process the audio data. Further, the mobile phone may set, in the audio play policy based on the user selection, that the mobile phone or the sound box 804 performs sound effect processing on the audio data 1.

Alternatively, in addition to the sound effect modes currently supported by the master device (that is, the mobile phone) and the slave device (that is, the sound box 804), the mobile phone may further present a sound effect mode supported by another audio output device to the user. For example, if the mobile phone previously uses the television as a slave device to perform audio switching, the mobile phone may obtain one or more sound effect modes supported by the television. The mobile phone may store the one or more sound effect modes supported by the television. When the mobile phone uses the sound box 804 as a slave device to perform audio switching, the one or more sound effect modes supported by the television may be further displayed in the setting menu 1401. Therefore, if the user selects the sound effect mode supported by the television, it indicates that the user wants to use the sound effect mode supported by the television to process audio data that is currently output by the mobile phone. In this case, the mobile phone may disconnect the network connection to the sound box 804, and establish a network connection to the television by using the television as a slave device again. Further, the mobile phone may output the audio data to the television, and the television performs sound effect processing on the audio data based on the sound effect mode selected by the user and then plays processed audio data. Certainly, before the mobile phone changes the slave device, a dialog box may be further used to ask the user whether to update the slave device from the sound box 804 to the television. If the user determines to update the slave device of the mobile phone to the television, the mobile phone may disconnect the network connection to the sound box 804, and establish a network connection to the television.

In some other embodiments, after the mobile phone switches the audio data 1 of the running Music to the sound box 804, if the mobile phone exits Music, the mobile phone may end current audio switching. In this case, AudioFlinger in the mobile phone may stop invoking the DMSDP audio HAL 1101 to send audio data subsequently generated by the mobile phone to the sound box 804, and may invoke the primary HAL at the HAL to output the audio data subsequently generated by the mobile phone to the speaker of the mobile phone for play.

Figure 15:
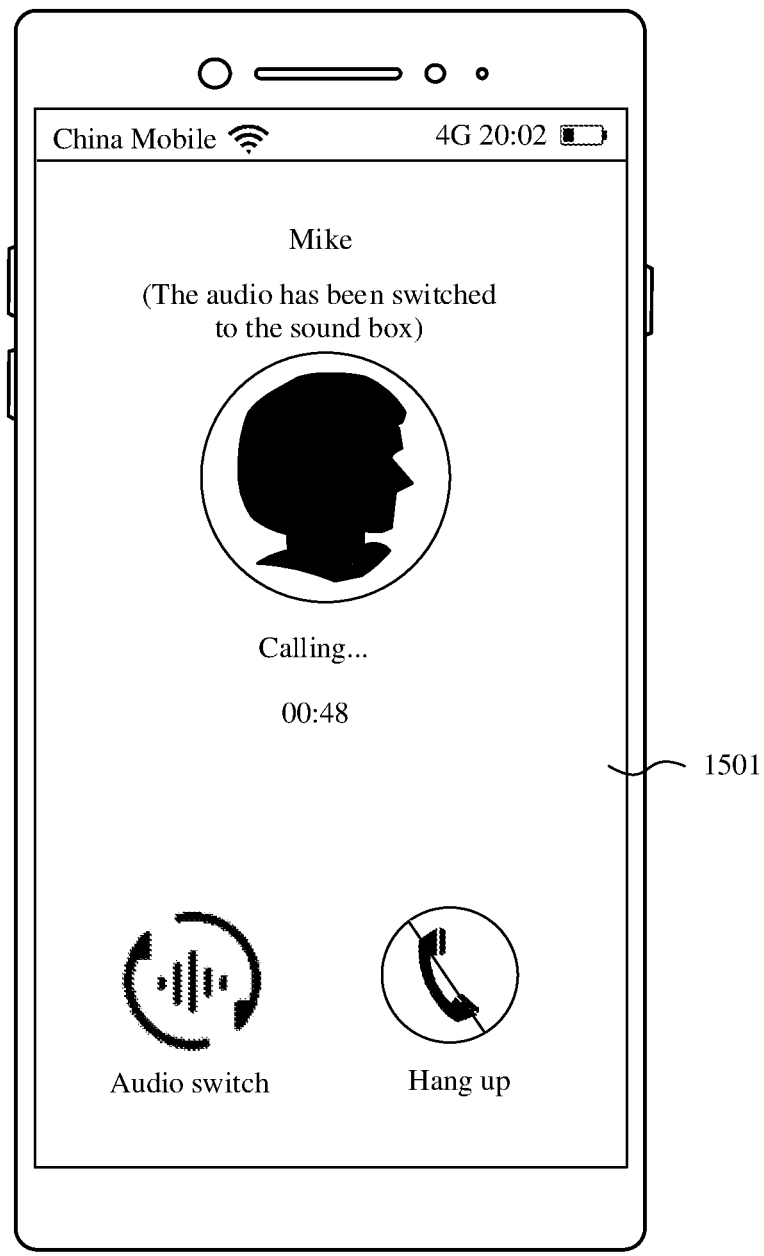
FIG. 15 is a schematic diagram 13 of an audio application scenario according to an embodiment of this application.
Figure 16A:
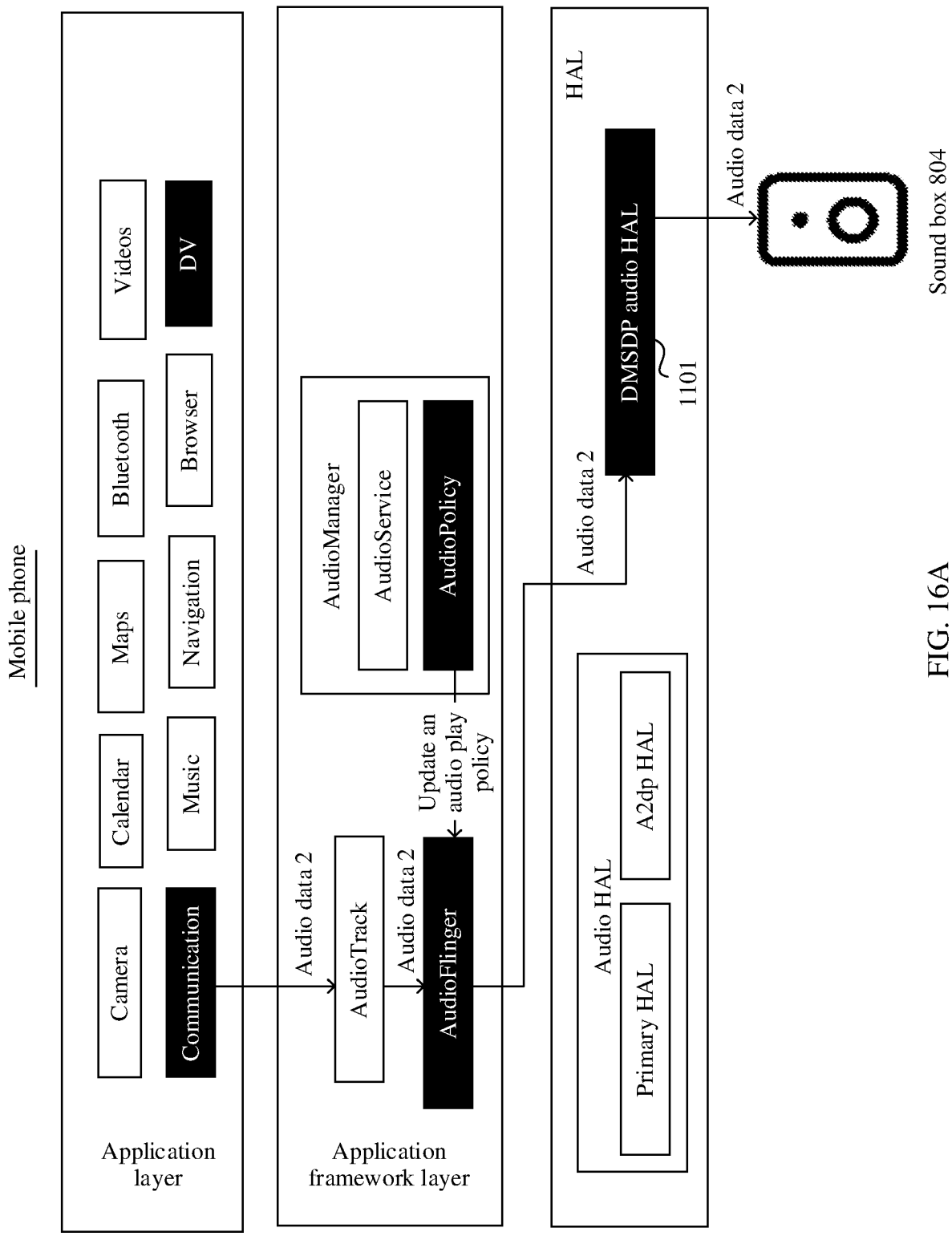
FIG. 16A is a schematic diagram 14 of an audio application scenario according to an embodiment of this application.

Alternatively, after the mobile phone exits Music, the mobile phone may continue to send audio data generated by the mobile phone to the sound box 804 for play, that is, current audio switching does not end. For example, after the user triggers the mobile phone to exit Music in a manner such as a manner of tapping a Home button, if the user opens the Communication app to perform an audio call (for example, a VoIP call) with a contact Mike at this time, as shown in FIG. 15, the mobile phone may display a call interface 1501 with the contact Mike. In this case, similar to the foregoing process in which Music switches the audio data 1 to the sound box 804, as shown in FIG. 16A, the Communication app may invoke AudioTrack to send audio data 2 of the contact Mike to AudioFlinger. AudioFlinger may process the audio data 2 according to the audio play policy that is output by AudioPolicy, and invoke the DMSDP audio HAL 1101 to send processed audio data 2 to the sound box 804 for play.

In addition, when running the Communication app, the mobile phone further needs to record a voice of the user, and send the voice of the user to the contact Mike. Therefore, after starting to run the Communication app, the mobile phone may further send a recording instruction to the sound box 804 (that is, a slave device), so that the sound box 804 can respond to the recording instruction to enable an audio recording function of the sound box 804 to collect audio data that is entered by the user, and send the collected audio data to the mobile phone. In this way, when switching the audio output function to another slave device for implementation, the mobile phone may further switch the audio input function to the another slave device for implementation. For a specific process in which the mobile phone collects, by using the sound box 804, audio data that is entered by the user, so as to implement the audio input function, refer to related descriptions in FIG. 26. Therefore, details are not described herein.

A difference is that after the Communication app receives the audio data 2 from the contact Mike, an audio stream type of the audio data 2 changes to STREAM_VOICE_CALL. In this case, the Communication app may invoke AudioManager to register related information of the audio data 2 with AudioPolicy. For example, the Communication app may buffer information such as a current sound effect mode, a quantity of sound channels, a sampling rate, or volume of the audio data 2 in AudioPolicy.

In this case, the slave device of the mobile phone does not change, that is, is still the sound box 804, but audio data (that is, a sound source) played by the mobile phone changes. Therefore, still as shown in FIG. 16A, AudioPolicy may update a corresponding audio play policy based on the related information of the audio data 2 and the audio capability parameter of the sound box 804.

For example, if the audio data 2 that is output by the Communication app is eight-channel audio data, but the sound box 804 supports only two-channel and four-channel audio data, AudioPolicy may indicate, in an updated audio play policy, to convert the eight-channel audio data into the four-channel audio data, so that the converted audio data 2 matches the sound play capability of the sound box 804. For another example, a type of the audio data 2 that is output by the Communication app is STREAM_VOICE_CALL, but the sound box 804 supports only an audio stream of the STREAM_MUSIC type. In this case, AudioPolicy may indicate, in an updated audio play policy, the mobile phone to play the audio data 2. In this case, AudioFlinger may invoke the primary HAL according to the updated audio play policy, and output, by using the primary HAL, the audio data 2 to the speaker of the mobile phone for play. In other words, in an audio switching process, if audio data that is output by the mobile phone changes, the mobile phone may also be triggered to re-customize an audio play policy that matches an audio capability of a slave device.

Figure 16B:
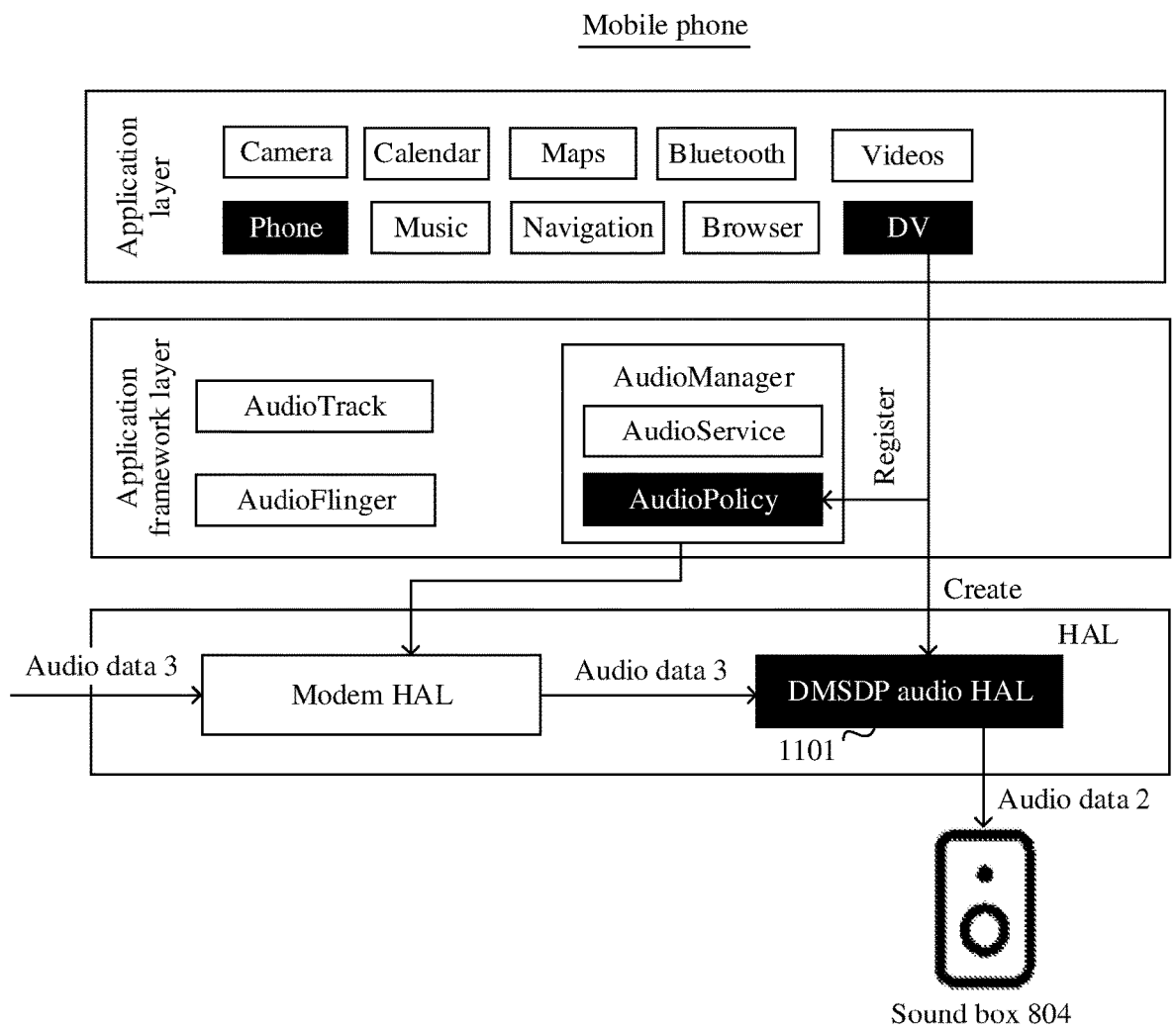
FIG. 16B is a schematic diagram 15 of an audio application scenario according to an embodiment of this application.

In some embodiments, as shown in FIG. 16B, when running a Phone app, the mobile phone may receive, by using a network device such as a base station, audio data 3 sent by a peer device (for example, another mobile phone). A difference from a common audio app is that the mobile phone may directly receive the audio data 3 by using a modem HAL at the HAL, and does not need to process the audio data 3 by using AudioTrack and AudioFlinger. In this embodiment of this application, as shown in FIG. 16B, after the DV app creates the DMSDP audio HAL 1101 based on the audio capability parameter of the sound box 804, and registers the audio capability parameter of the sound box 804 with AudioPolicy, AudioPolicy may indicate, to the modem HAL, that an output device of current audio data is the sound box 804 corresponding to the DMSDP audio HAL 1101. Further, after receiving the audio data 3, the modem HAL may send the audio data 3 to the DMSDP audio HAL 1101, so that the DMSDP audio HAL 1101 sends the audio data 3 to the sound box 804 for play. This implements an audio switching function in a call scenario.

In some other embodiments, after the mobile phone switches the audio data 1 of the running Music to the sound box 804, if the audio capability of the sound box 804 changes, the sound box 804 may dynamically report a latest audio capability parameter to the DV app in the mobile phone. Further, the DV app may update the DMSDP audio HAL 1101 based on the latest audio capability parameter of the sound box 804, and update the registered audio capability parameter of the sound box 804 in AudioPolicy.

For example, when a network speed of the Wi-Fi network in which the mobile phone and the sound box 804 are located decreases, the audio play latency of the sound box 804 accordingly increases. In this case, the sound box 804 may report a latest audio play latency to the DV app in the mobile phone. The DV app may update the DMSDP audio HAL 1101 at the HAL based on the latest audio play latency. In addition, the DV app may update the audio play latency of the sound box 804 in AudioPolicy. If an updated audio play latency is greater than a preset time (for example, 20 ms), AudioPolicy may determine that the sound box 804 does not support a low-latency play capability. Further, AudioPolicy may update the audio play policy, and set a non-low-latency mode in an updated audio play policy, so that AudioFlinger processes the audio data 1 in the non-low-latency mode. In other words, when an audio capability of a slave device changes, the mobile phone may also be triggered to re-customize an audio play policy that matches the audio capability of the slave device.

In some other embodiments, after the mobile phone switches the audio data 1 of the running Music to the sound box 804, the user may alternatively manually change, on the mobile phone, a slave device that currently performs audio switching with the mobile phone.

Figure 17:
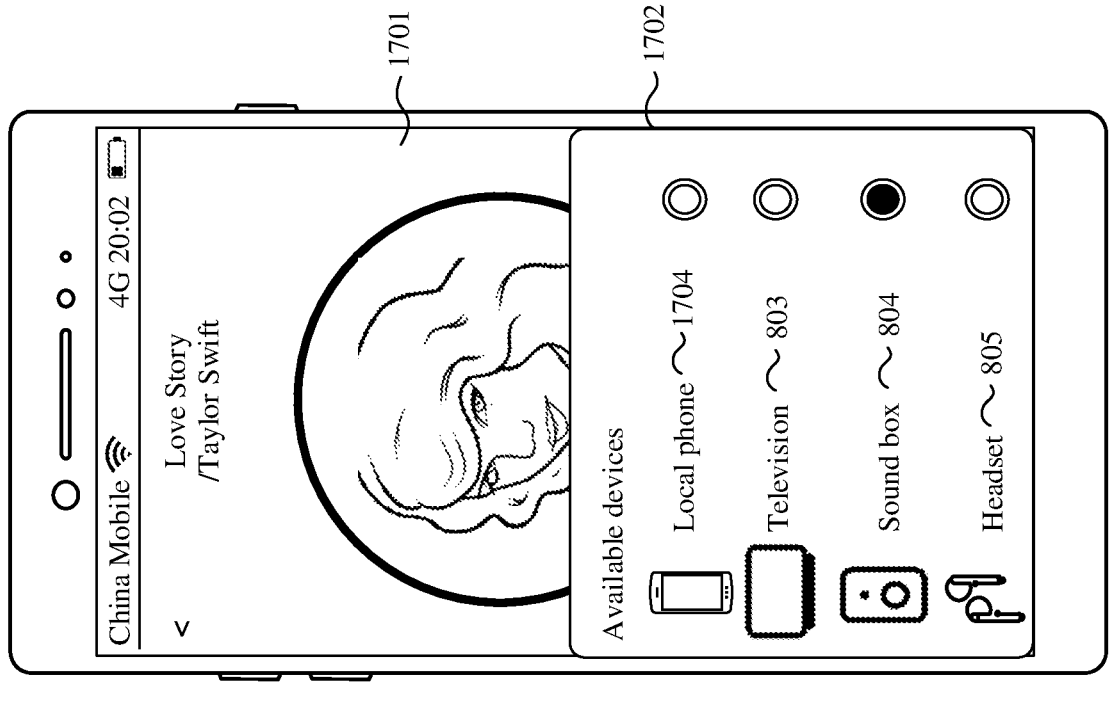
FIG. 17 is a schematic diagram 16 of an audio application scenario according to an embodiment of this application.
Figure 17:
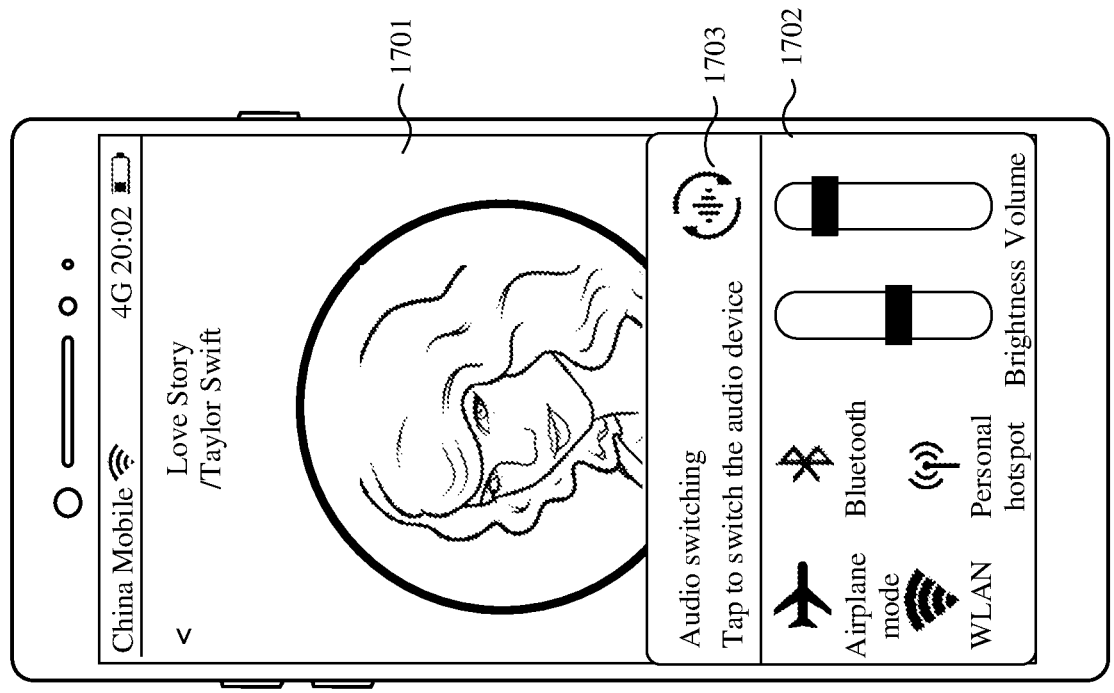

For example, as shown in (a) in FIG. 17, after switching the audio data 1 to the sound box 804, the mobile phone continues to display an application interface 1701 of Music. If the user needs to switch a slave device that currently performs audio switching with the mobile phone, the user may open a control center of the mobile phone. For example, the user may enter a pull-up operation on the application interface 1701, and in response to the pull-up operation of the user, the mobile phone may display a control center 1702. The control center 1702 includes a switching button 1703 for an audio switching function. When the user wants to change a current slave device of the mobile phone, the user may tap the switching button 1703 to query one or more candidate devices that can be currently used as slave devices of the mobile phone.

As shown in (b) in FIG. 17, after the mobile phone detects that the user taps the switching button 1703, the mobile phone may detect a candidate device that is located in a same Wi-Fi network as the mobile phone and that has an audio output function, and display the detected candidate device in the control center 1702. For example, the control center 1702 may include the sound box 804 that currently establishes a network connection to the mobile phone, may further include a local phone 1704, and may further include the television 803 and the headset 805 that are detected by the mobile phone and that do not establish a network connection to the mobile phone. The sound box 804 is already displayed in a selected state, so as to prompt the user that audio that is currently output by the mobile phone is switched to the sound box 804 for play.

Figure 18A:
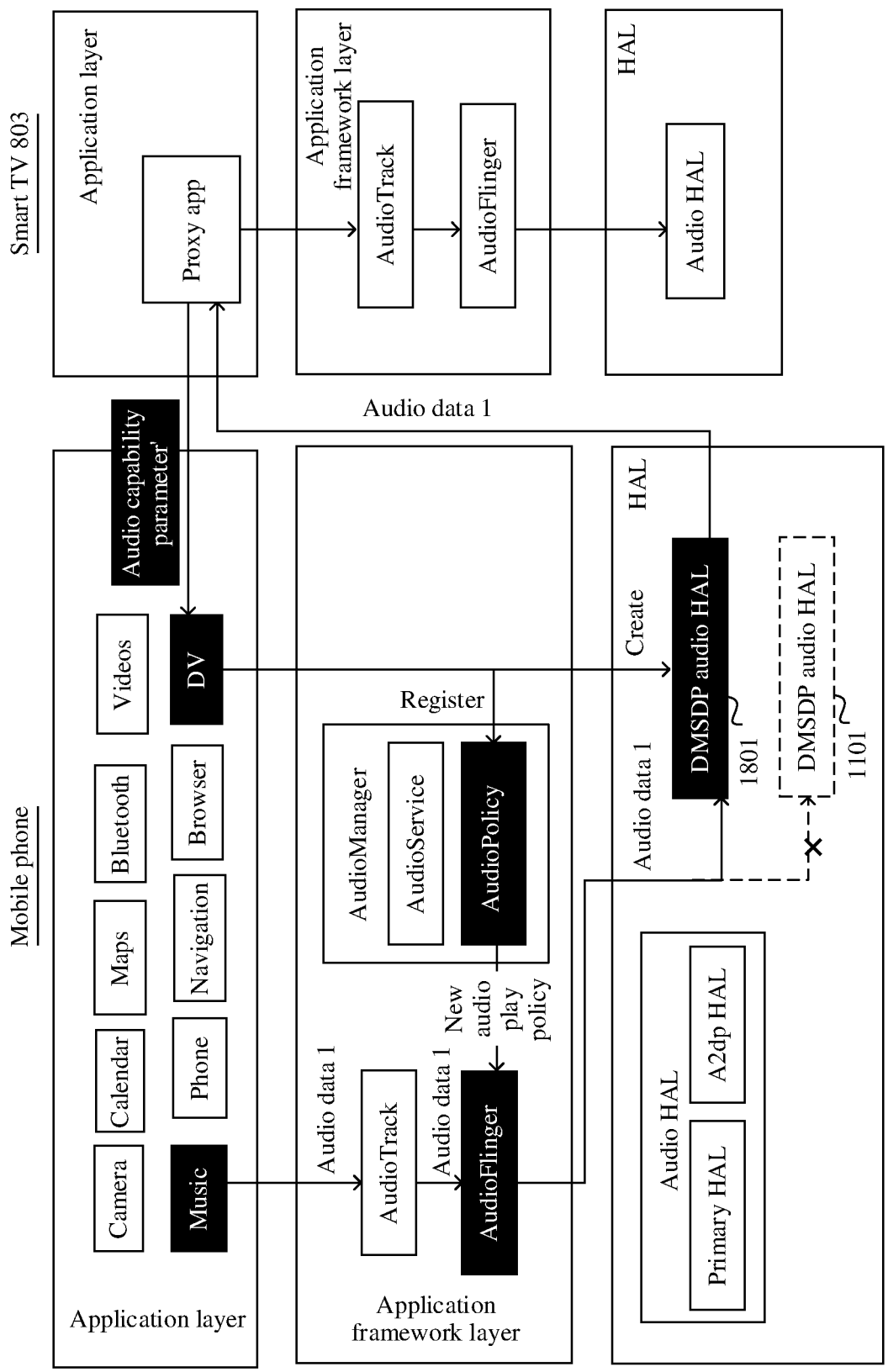
FIG. 18A is a schematic diagram 17 of an audio application scenario according to an embodiment of this application.

If the user wants to switch the audio that is output by the mobile phone from the sound box 804 to the television 803 for play, the user may tap the television 803 in the control center 1702. In response to the operation that the user taps the television 803, the DV app may disconnect the network connection to the sound box 804. In addition, the mobile phone may establish a network connection to the television 803 by using the television 803 as a current slave device of the mobile phone. Further, as shown in FIG. 18A, similar to the process in which the mobile phone switches the audio data to the sound box 804 in the foregoing embodiment, the DV app may use the television 803 as a latest slave device of the mobile phone, and obtain an audio capability parameter' of the television 803 from the television 803. Further, as shown in FIG. 18A, the DV app may invoke, based on the audio capability parameter', a related interface to create a DMSDP audio HAL 1801 corresponding to the television 803, and close a process of the DMSDP audio HAL 1101 created for the sound box 803. Alternatively, the DV app may update the DMSDP audio HAL 1101 based on the audio capability parameter of the television 803, so that an updated DMSDP audio HAL 1101 matches the audio capability of the television 803.

In addition, as shown in FIG. 18A, the DV app may invoke AudioManager to register the audio capability of the television 803 with AudioPolicy. For example, the DV app may send the identifier of the television 803 and the audio capability parameter' of the television 803 to AudioPolicy. In this way, AudioPolicy may set a new audio play policy based on the audio capability parameter' of the television 803, and output the newly set audio play policy to AudioFlinger. AudioFlinger may process, according to the new audio play policy that is output by AudioPolicy, the audio data 1 that is output by Music. Subsequently, AudioFlinger may invoke the newly created DMSDP audio HAL 1801 to send processed audio data 1 to the television 803, so as to switch the audio function of the mobile phone from the sound box 804 to the television 803.

In some other embodiments, if the user wants to switch the audio that is output by the mobile phone to the headset 805 for play, the user may tap the headset 805 in the control center 1702. An Audio HAL such as an A2dp HAL corresponding to the headset 805 has been set in the existing Android system. Therefore, after the mobile phone detects that the user taps the headset 805 in the control center 1702, the mobile phone may disconnect the network connection to the sound box 804, and AudioFlinger invokes, according to the existing audio architecture, the A2dp HAL to output the audio data 1 of Music to the headset 805, so as to switch the audio function of the mobile phone from the sound box 804 to the headset 805.

Figure 18B:
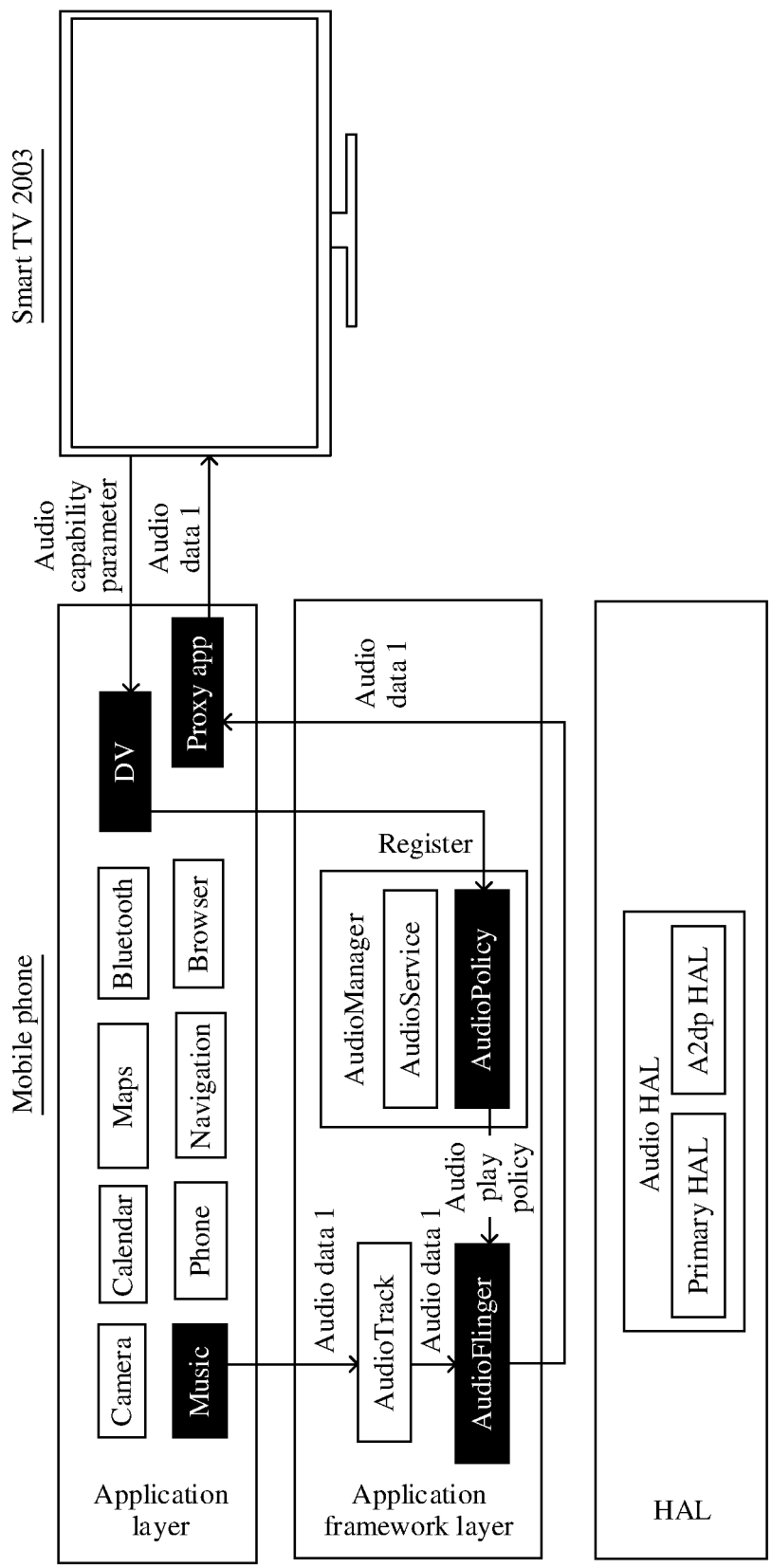
FIG. 18B is a schematic diagram 18 of an audio application scenario according to an embodiment of this application.

In some embodiments, when the mobile phone performs audio switching, the DV app may alternatively not create a corresponding DMSDP audio HAL at the HAL. An example in which the slave device of the mobile phone is the television 803 is still used. As shown in FIG. 18B, after obtaining an audio capability parameter of a television 2003, the DV app in the mobile phone may register the audio capability parameter of the television 2003 with AudioPolicy, and does not need to create a corresponding DMSDP audio HAL at the HAL. Therefore, after AudioPolicy outputs a corresponding audio play policy to AudioFlinger based on the audio capability parameter of the television 2003, AudioFlinger may process the audio data 1 from Music according to the audio play policy. A difference from the foregoing embodiment is that AudioFlinger may send processed audio data 1 to the proxy app at the application layer of the mobile phone, and the proxy app sends the processed audio data 1 to the television 2003 for play. Alternatively, the proxy app in the mobile phone may run on the mobile phone in a form of a system service. This is not limited in this embodiment of this application.

Similar to FIG. 18A, the proxy app in the mobile phone may send the processed audio data 1 to a proxy app in the television 2003, and the proxy app in the television 2003 may invoke an audio player (for example, AudioTrack) of the television 2003 to send the audio data 1 of the mobile phone to an audio processor (for example, AudioFlinger). AudioFlinger processes the received audio data 1, and invokes an audio HAL at the HAL to output processed audio data 1 to a speaker of the television 2003 for play. This completes a process in which the mobile phone switches audio to the television 2003 for continuing play.

Figure 19:
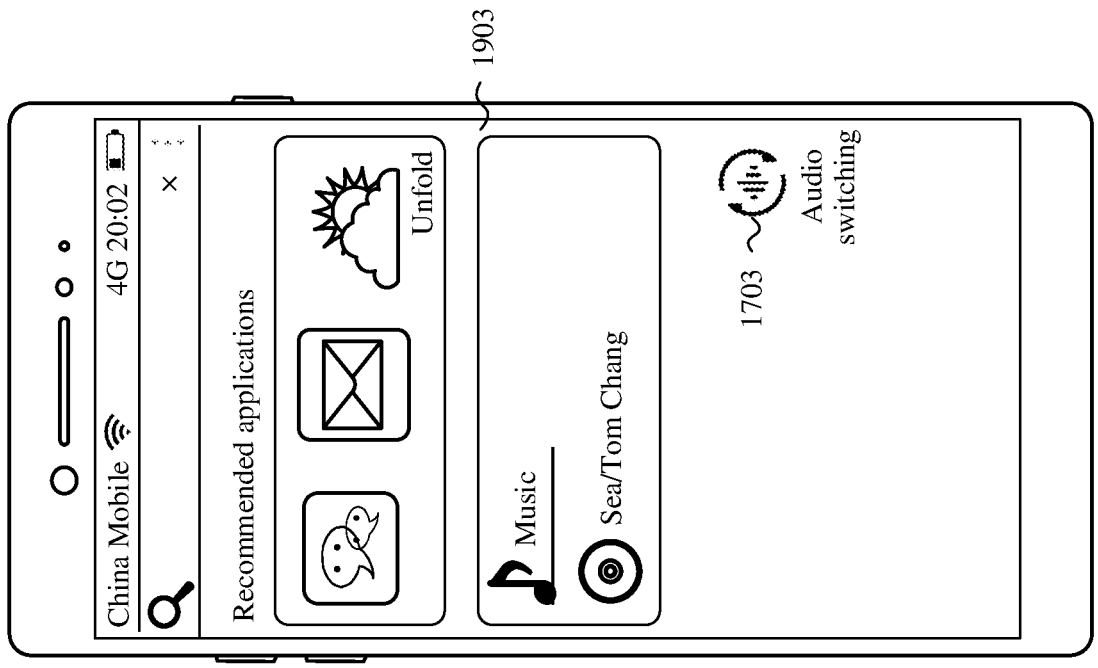
FIG. 19 is a schematic diagram 19 of an audio application scenario according to an embodiment of this application.
Figure 19:
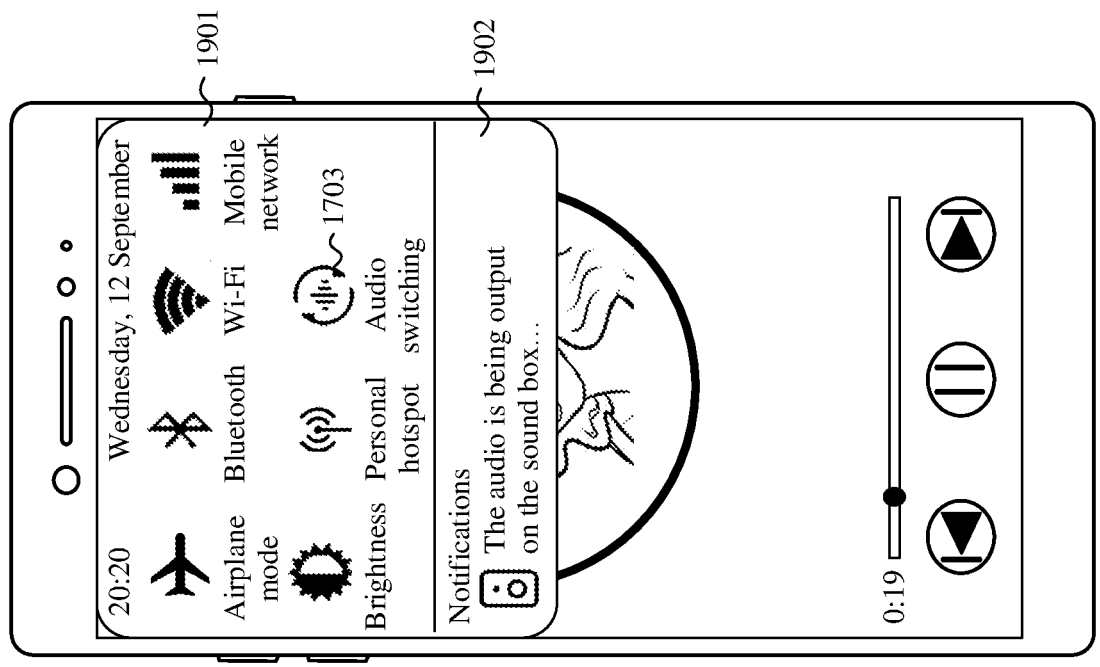

In addition, the foregoing embodiment is described by using an example in which the user switches an audio output device of the mobile phone from the control center of the mobile phone or an audio application that is running on the mobile phone. It can be understood that a person skilled in the art may further set an audio switching entry at another location of the mobile phone. For example, as shown in (a) in FIG. 19, the mobile phone may display the switching button 1703 in a pull-down menu 1901. The mobile phone may further prompt, in a notification form in a notification center 1902 of the pull-down menu 1901, the user that current audio of the mobile phone is switched to a device for play. For another example, as shown in (b) in FIG. 19, the mobile phone may further display the switching button 1703 in a leftmost screen menu 1903. This is not limited in this embodiment of this application.

In the foregoing embodiment, an example in which Music is an audio app is used to specifically describe a process in which the audio data 1 of Music is switched to a slave device for audio switching and an audio play policy is dynamically modified in an audio switching process. In some other embodiments, the user may need to simultaneously switch audio and an image on the mobile phone to another device for play. For example, when the mobile phone runs Videos to play a video, the user may need to simultaneously switch each frame of image in the video and audio corresponding to the image to the television for play.

Currently, some projection technologies are already used to simultaneously project an image and audio on the mobile phone to a large-screen device (for example, the television) for play. For example, the mobile phone may send, to the television in a Miracast projection manner, display data that is output by the display in real time, and the mobile phone may simultaneously send, to the television, audio data that is output by AudioFlinger in real time, so that an image and audio on the mobile phone are projected to the television for play. For another example, the mobile phone may send a uniform resource locator (Uniform Resource Locator, URL) of a video to the television in a digital living network alliance (digital living network alliance, DLNA) projection manner, and the television obtains a corresponding image and audio based on the URL for play.

Figure 20:
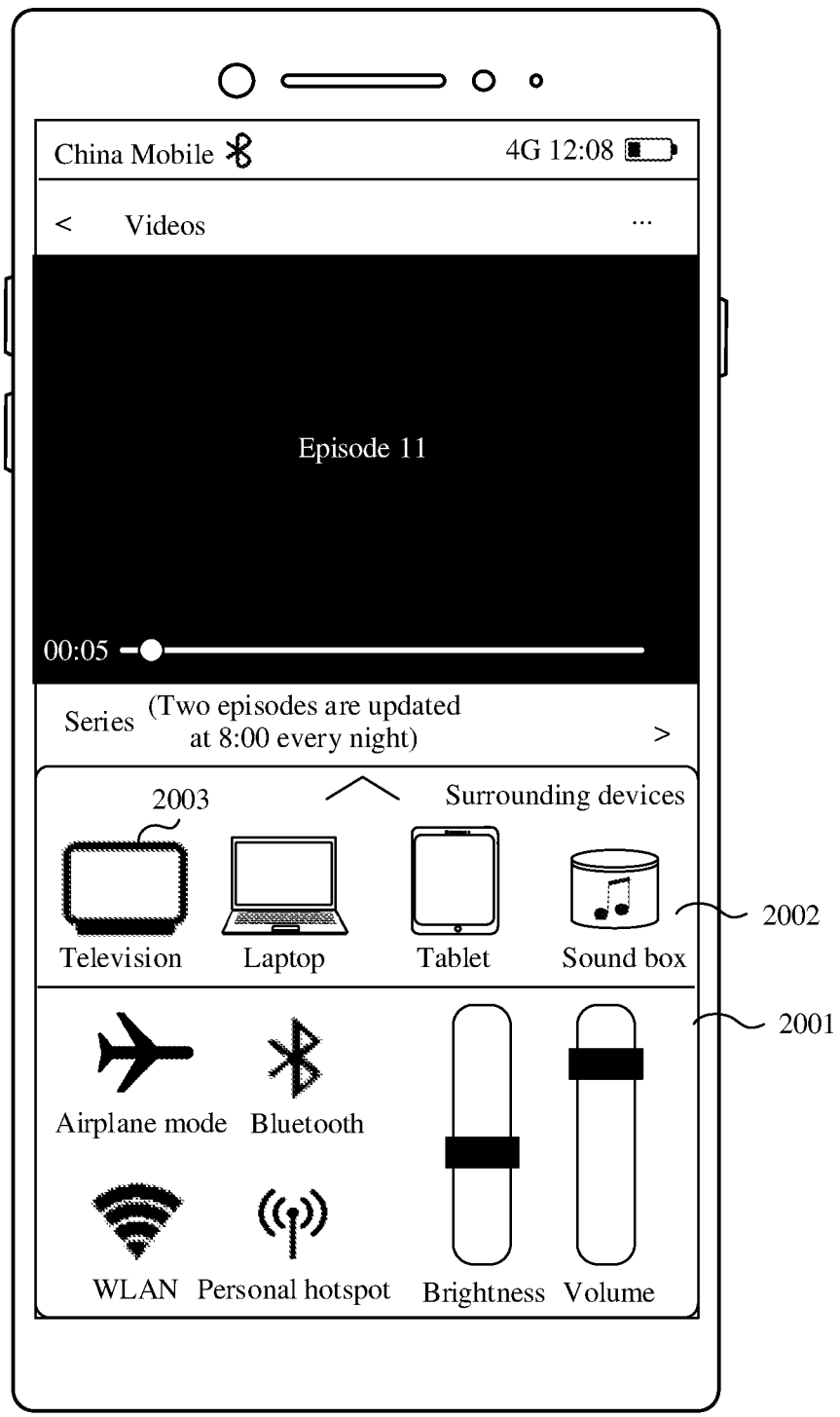
FIG. 20 is a schematic diagram 20 of an audio application scenario according to an embodiment of this application.

In this embodiment of this application, as shown in FIG. 20, when the mobile phone runs Videos, if the user needs to use a projection function, the user may open a control center 2001 of the mobile phone. A card 2002 may be disposed in the control center 2001, and the card 2002 is used to display one or more nearby devices detected by the mobile phone. For example, the mobile phone may display, in the card 2002 for use selection, a detected electronic device that is located in a same Wi-Fi network as the mobile phone. For another example, the mobile phone may display, in the card 2002, a plurality of electronic devices bound to a same account (for example, a Huawei account) as the mobile phone. If the mobile phone detects that an electronic device accesses the Wi-Fi network in which the mobile phone is located, the mobile phone may light up the electronic device in the card 2002, so as to prompt the user that the electronic device may be used as a slave device of the mobile phone to implement a projection function.

If it is detected that the user selects an electronic device (for example, the television 2003) in the card 2002, because the television 2003 has both a display function and an audio play function, it indicates that the user wants to project an image and audio of Videos running on the mobile phone to the television 2003. In this case, the mobile phone may establish a network connection to the television 2003. In addition, as shown in FIG. 21, the mobile phone may send, to the television 2003 in an existing projection manner for display, display data that is output by Videos in the mobile phone.

A difference is that the mobile phone may switch audio data in the mobile phone to the television 2003 according to the audio switching process in the foregoing embodiment, instead of switching audio data to the television 2003 in the DLNA or Miracast projection manner.

Figure 21:
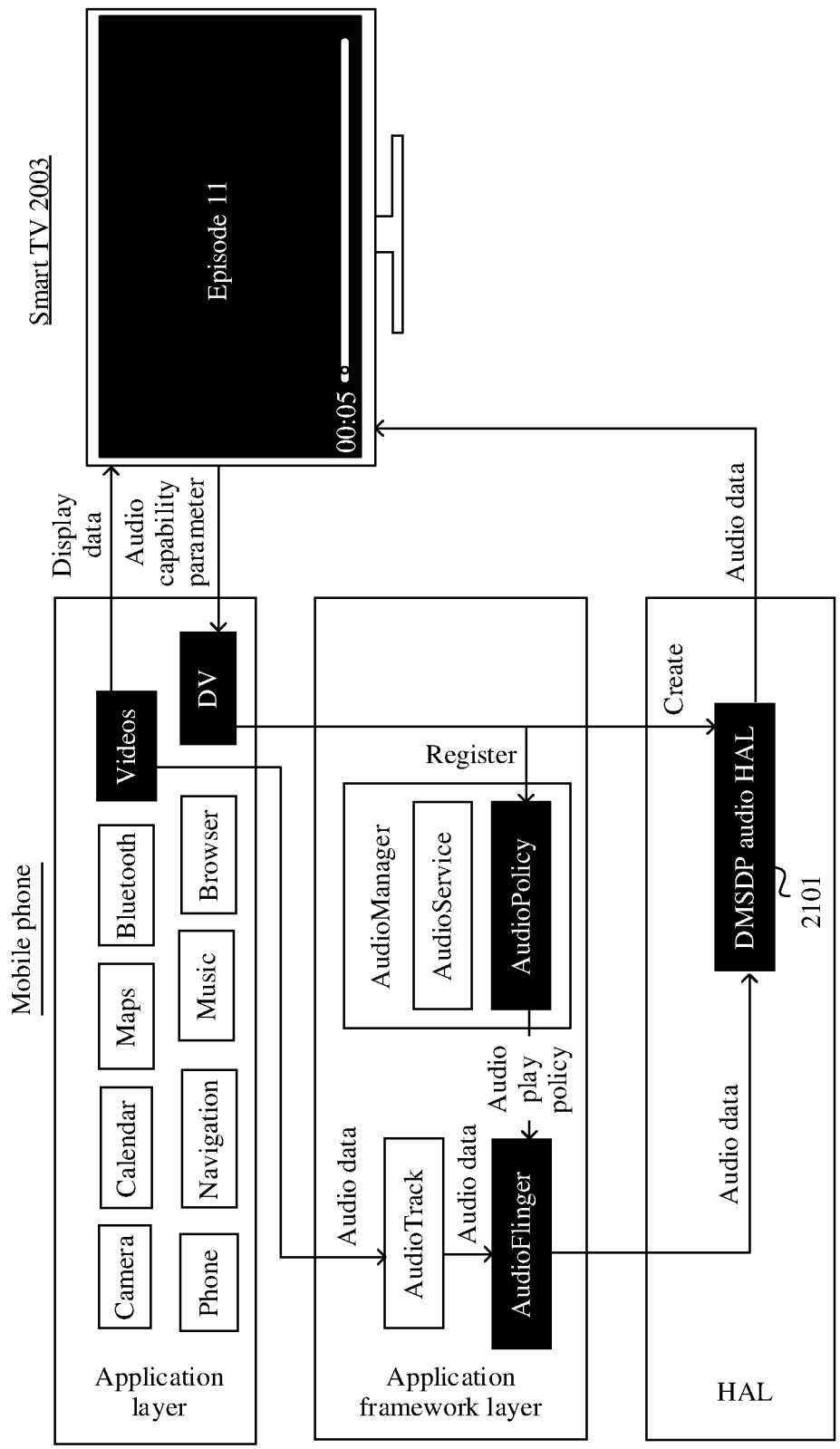
FIG. 21 is a schematic diagram 21 of an audio application scenario according to an embodiment of this application.

For example, after the mobile phone detects that the user taps the television 2003 in the card 2002, still as shown in FIG. 21, the mobile phone may send, to the television 2003, the display data that is output by Videos. In addition, the DV app in the mobile phone may obtain an audio capability parameter of the television 2003 from the television 2003. Further, the DV app may create a DMSDP audio HAL 2101 corresponding to the television 2003 at the HAL based on the audio capability parameter of the television 2003, and register the audio capability parameter of the television 2003 with AudioPolicy. In this way, AudioPolicy may set, based on the audio capability parameter of the television 2003, an audio play policy that matches an audio capability of the television 2003 during projection, and output the audio play policy to AudioFlinger. AudioFlinger may process, according to the audio play policy, the audio data generated by Videos, and invoke the DMSDP audio HAL 2101 to send processed audio data to the television 2003 for play. Alternatively, AudioFlinger may send processed audio data to Videos, and Videos sends the audio data to the television 2003 for play. This is not limited in this embodiment of this application.

In addition, when sending the foregoing audio data to the television 2003 by using the DMSDP audio HAL 2101, the mobile phone may further add a timestamp to the audio data. In addition, when sending the display data of Videos to the television 2003, the mobile phone may also add a timestamp to the display data. In this way, the television 2003 may play, based on the timestamp in the display data and the timestamp in the audio data, a video in which an image and audio are synchronized, so that the audio and the image that are played by the television 2003 during projection are synchronized.

It can be learned that, compared with a conventional projection manner in which audio data that is output by AudioFlinger in real time is directly sent to a slave device (for example, the television 2003), in the projection method provided in this embodiment of this application, the mobile phone may customize, by obtaining an audio capability parameter of a slave device, an audio play policy that matches an audio capability of the slave device, so that AudioFlinger can output corresponding audio data according to the audio play policy and send the audio data to the slave device. In this way, the slave device may play audio data of the mobile phone (that is, a master device) that matches the audio capability of the slave device. This improves an audio play effect in a projection scenario.

The foregoing embodiment is described by using an example in which the mobile phone switches audio data to a slave device to implement an audio switching function. In some other embodiments of this application, the mobile phone may further switch audio data to a plurality of slave devices to perform audio switching.

Figure 22:
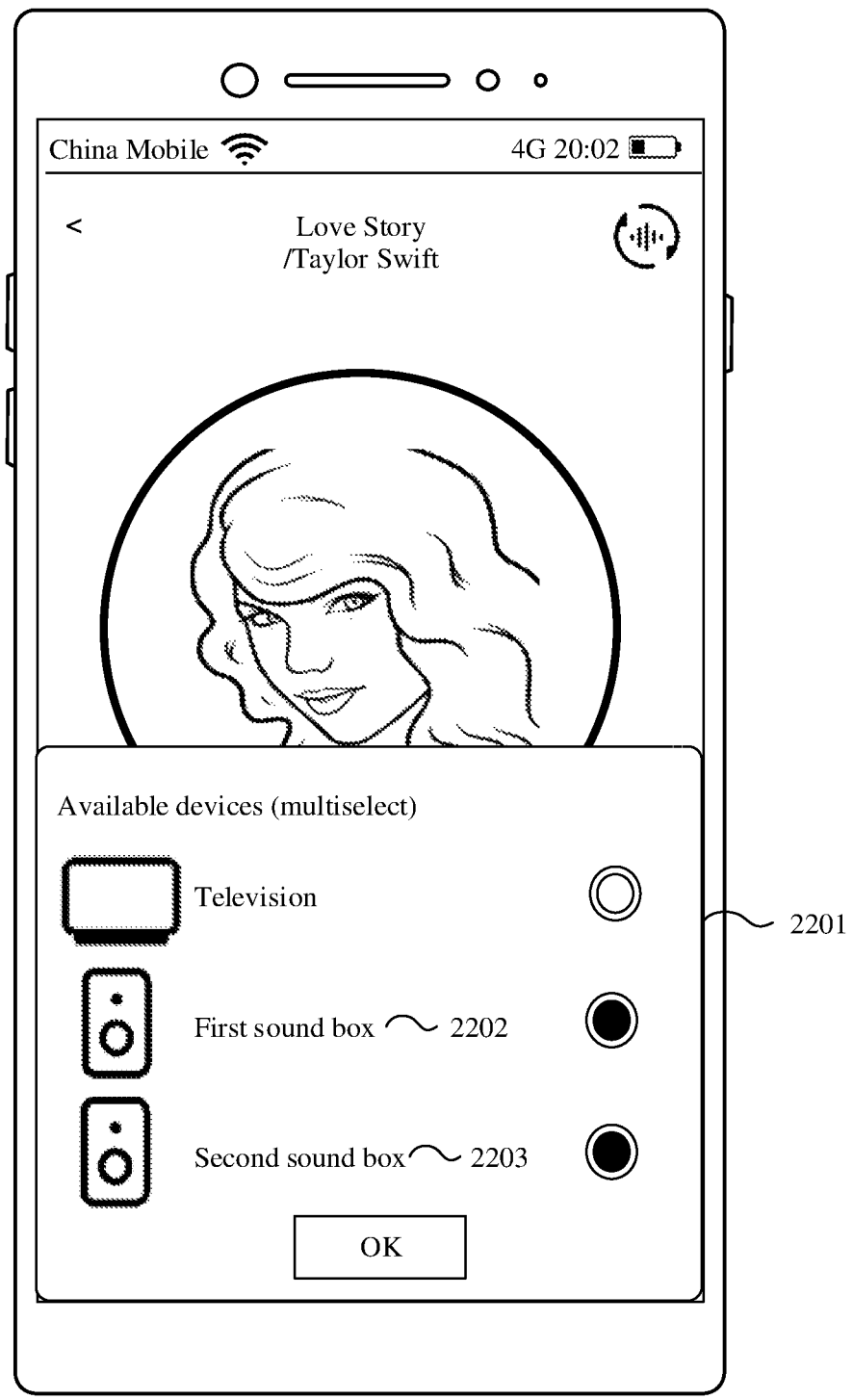
FIG. 22 is a schematic diagram 22 of an audio application scenario according to an embodiment of this application.

An example in which the mobile phone runs Music is still used. As shown in (a) in FIG. 8, if it is detected that the user taps the switching button 801 in Music, the mobile phone may be triggered to search for one or more nearby candidate devices for audio switching. A difference from the foregoing embodiment is that, as shown in FIG. 22, after the mobile phone displays, in a menu 2201, a plurality of candidate devices found by the mobile phone, the user may select a plurality of devices from the plurality of candidate devices as slave devices of the mobile phone to perform audio switching.

Figure 23:
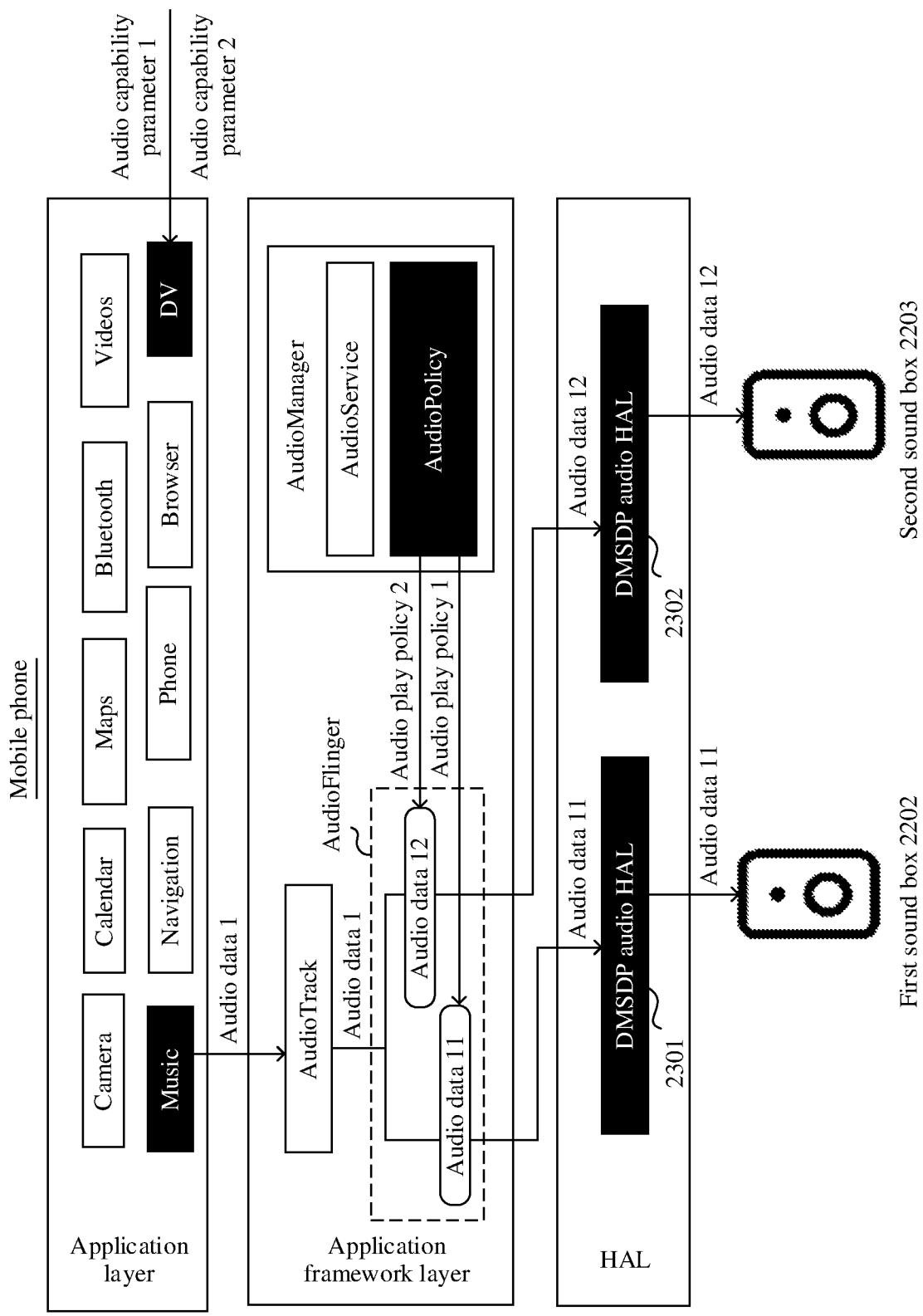
FIG. 23 is a schematic diagram 23 of an audio application scenario according to an embodiment of this application.

For example, the user selects a first sound box 2202 and a second sound box 2203 in the menu 2201 as slave devices of the mobile phone. The mobile phone may respectively establish network connections to the first sound box 2202 and the second sound box 2203. Further, as shown in FIG. 23, the mobile phone may respectively obtain audio capability parameters of the first sound box 2202 and the second sound box 2203 by using the DV app. For example, the audio capability parameter of the first sound box 2202 is an audio capability parameter 1, and the audio capability parameter of the second sound box 2203 is an audio capability parameter 2. In this case, the DV app may register the audio capability parameter 1 of the first sound box 2202 and the audio capability parameter 2 of the second sound box 2203 with AudioPolicy. In addition, at the HAL, the DV app may create a DMSDP audio HAL 2301 corresponding to the first sound box 2202 based on the audio capability parameter 1, and create a DMSDP audio HAL 2302 corresponding to the second sound box 2203 based on the audio capability parameter 2. Further, AudioPolicy may set an audio play policy based on the audio capability parameter 1 of the first sound box 2202 and the audio capability parameter 2 of the second sound box 2203, so that AudioFlinger can process audio data from Music according to the audio play policy determined by AudioPolicy.

For example, the audio play policy determined by AudioPolicy may include an audio play policy 1 corresponding to the first sound box 2202 and an audio play policy 2 corresponding to the second sound box 2203. A process in which AudioPolicy determines the audio play policy 1 based on the audio capability parameter 1 of the first sound box 2202 is similar to the process in which AudioPolicy determines the audio play policy based on the audio capability parameter of the sound box 803 in the foregoing embodiment. Likewise, a process in which AudioPolicy determines the audio play policy 2 based on the audio capability parameter 2 of the second sound box 2203 is also similar to the process in which AudioPolicy determines the audio play policy based on the audio capability parameter of the sound box 803 in the foregoing embodiment. Therefore, details are not described herein again.

A difference is that AudioPolicy may indicate AudioFlinger to make two copies of the audio data 1 from Music, for example, audio data 11 and audio data 12. In this way, still as shown in FIG. 23, after AudioPolicy outputs the audio play policy 1 to AudioFlinger, AudioFlinger may process the audio data 11 according to the audio play policy 1, to obtain audio data that matches an audio capability of the first sound box 2202. Likewise, after AudioPolicy outputs the audio play policy 2 to AudioFlinger, AudioFlinger may process the audio data 12 according to the audio play policy 2, to obtain audio data that matches an audio capability of the second sound box 2203. Subsequently, still as shown in FIG. 23, AudioFlinger may invoke the DMSDP audio HAL 2301 to send the processed audio data 11 to the first sound box 2202 for play, and AudioFlinger may simultaneously invoke the DMSDP audio HAL 2302 to send the processed audio data 12 to the second sound box 2203 for play. In this way, the mobile phone may simultaneously switch an audio play function of the mobile phone to a plurality of slave devices, so as to implement a cross-device distributed audio capability.

In some embodiments, AudioPolicy may alternatively customize a corresponding audio play policy based on information such as an audio capability or a device location of each slave device. For example, the audio capability parameters respectively reported by the first sound box 2202 and the second sound box 2203 may further carry respective location information. For example, a placement location of the first sound box 2202 is located on the left of the user relative to the user, and a placement location of the second sound box 2203 is located on the right of the user relative to the user. In this case, based on the location information, AudioPolicy may set, in the audio play policy 1, that left-channel sound effect processing is performed on the audio data 11, and set, in the audio play policy 2, that right-channel sound effect processing is performed on the audio data 12. In this way, when AudioFlinger invokes the corresponding DMSDP audio HALs to respectively send processed audio data 11 and processed audio data 12 to the first sound box 2202 and the second sound box 2203 for play, a stereo play effect may be presented to the user.

For another example, slave devices to which the mobile phone performs audio switching are a television and a sound box. AudioPolicy may determine, based on audio capability parameters respectively reported by the television and the sound box, that a sound effect processing capability of the sound box is stronger than a sound effect processing capability of the television. In this case, AudioPolicy may set, in an audio play policy, that audio data on which sound effect processing needs to be performed is output to the sound box for play and audio data on which sound effect processing does not need to be performed is output to the television for play. Further, AudioFlinger may split the audio data from the audio app according to the audio play policy that is output by AudioPolicy, to obtain audio data A on which sound effect processing needs to be performed and audio data B on which sound effect processing does not need to be performed. Subsequently, AudioFlinger may invoke a DMSDP audio HAL corresponding to the sound box to send processed audio data A to the sound box for play, and invoke a DMSDP audio HAL corresponding to the television to send processed audio data B to the television for play.

Figure 24:
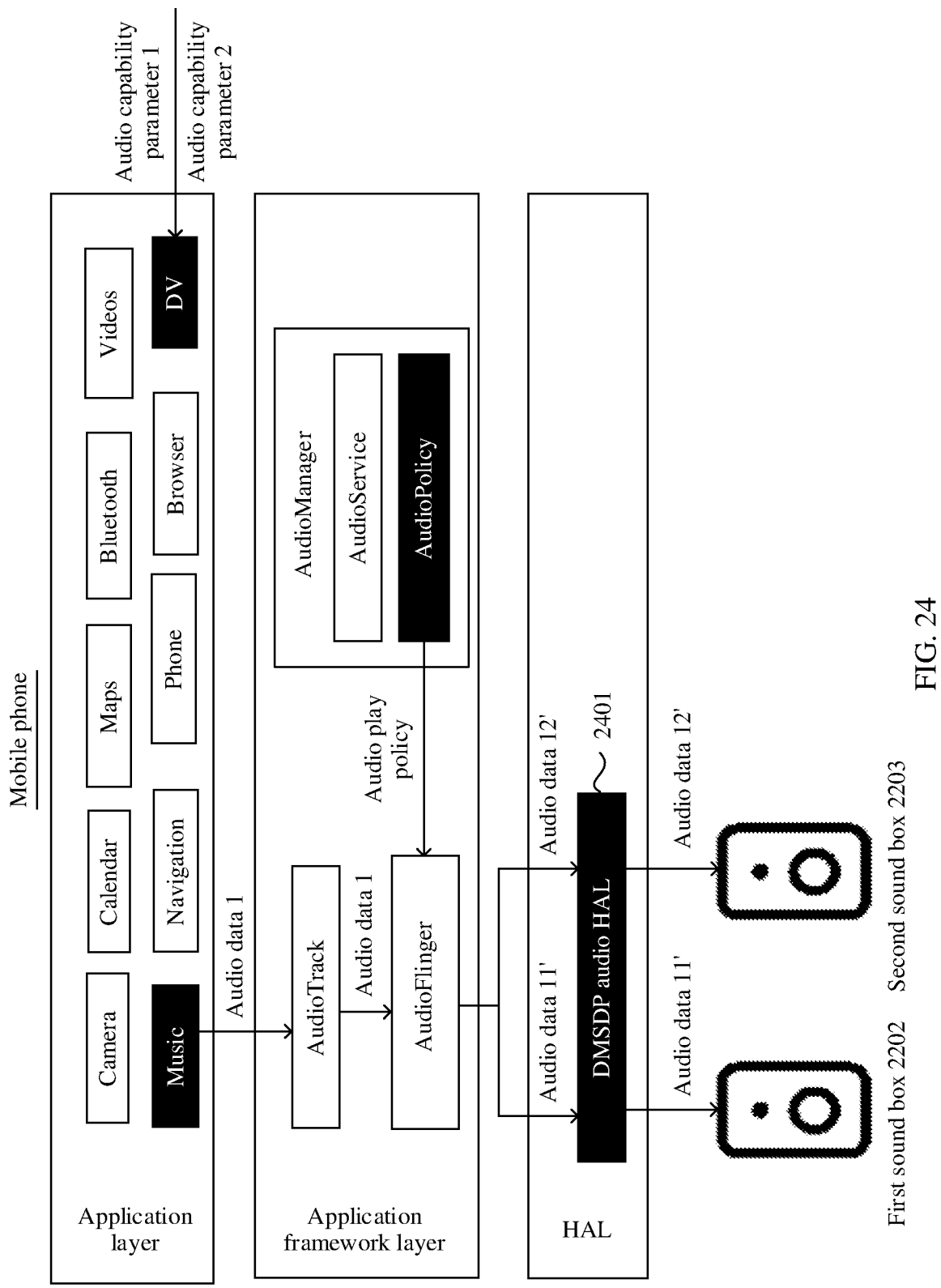
FIG. 24 is a schematic diagram 24 of an audio application scenario according to an embodiment of this application.

In some other embodiments, if the audio capability parameter 1 of the first sound box 2202 is the same as the audio capability parameter 2 of the second sound box 2203, for example, the first sound box 2202 and the second sound box 2203 are two sound boxes of a same model, as shown in FIG. 24, the DV app may create a DMSDP audio HAL 2401 corresponding to the audio capability parameter 1 (or the audio capability parameter 2) at the HAL. In other words, a DMSDP audio HAL created by the DV app at the HAL corresponds to an audio capability parameter. Because the audio capability parameter 1 of the first sound box 2202 is the same as the audio capability parameter 2 of the second sound box 2203, the audio play policies determined by AudioPolicy based on the audio capability parameters are also the same. As shown in FIG. 24, AudioPolicy may output the determined audio play policy to AudioFlinger, and AudioFlinger processes the audio data from the audio app according to the audio play policy. A difference is that AudioFlinger may divide processed audio data into two parts. For example, AudioFlinger may replicate the processed audio data 1, to obtain audio data 11' and audio data 12' (the audio data 11' is the same as the audio data 12' in this case). Alternatively, AudioFlinger may extract audio data 11' corresponding to a left channel and audio data 12' corresponding to a right channel (the audio data 11' is different from the audio data 12' in this case) from the processed audio data 1. Further, AudioFlinger may invoke the DMSDP audio HAL 2401 to respectively send the audio data 11' and the audio data 12' to the first sound box 2202 and the second sound box 2203, so as to implement a cross-device distributed audio capability.

The foregoing embodiment is described by using an example in which the mobile phone switches audio data of the mobile phone to one or more slave devices for play. For example, the mobile phone creates a DMSDP audio HAL by obtaining an audio capability of a television, and switches, by using the DMSDP audio HAL, audio data of an audio app to the television for play. In this case, the television is a slave device of the mobile phone.

In some other embodiments, when playing audio, a slave device (for example, a television) of the mobile phone may also switch corresponding audio data to another device to perform audio switching. In this case, the slave device of the mobile phone may serve as a master device, and switch, to another slave device according to the audio switching method in the foregoing embodiment for play, audio data sent by the mobile phone, so as to implement a function of performing continuous audio switching between a plurality of levels of devices.

Figure 25:
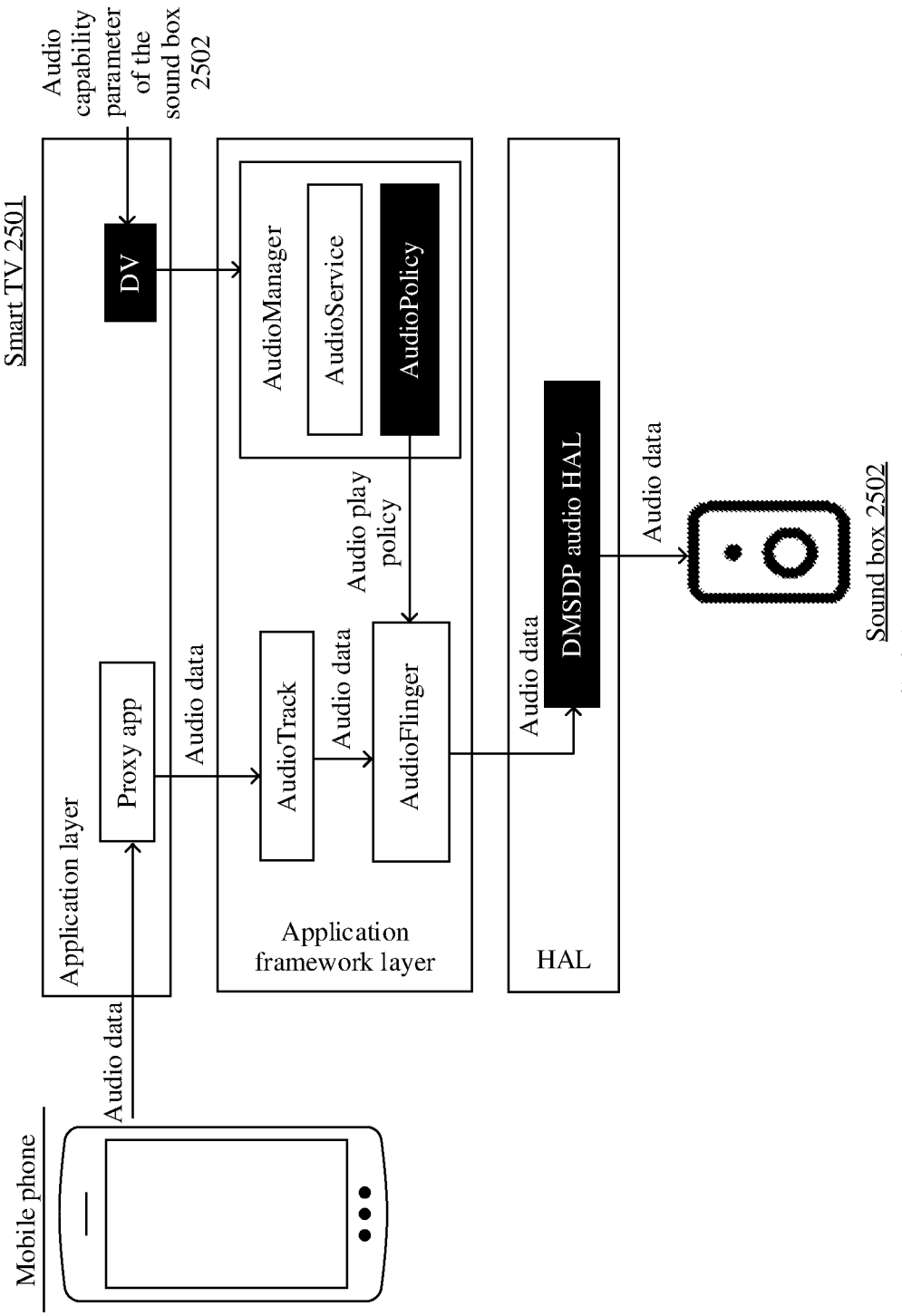
FIG. 25 is a schematic diagram 25 of an audio application scenario according to an embodiment of this application.

For example, as shown in FIG. 25, after a television 2501 establishes a Bluetooth connection to a sound box 2502, the television 2501 may obtain an audio capability parameter of the sound box 2502, to create a corresponding DMSDP audio HAL. In this case, the sound box 2502 may serve as a slave device of the television 2501 to play audio data from the television 2501. Therefore, after the mobile phone sends audio data to the television 2501, the television 2501 may serve as a master device to set a corresponding audio play policy based on the audio capability parameter of the sound box 2502, and process, according to the audio play policy, the audio data sent by the mobile phone. Subsequently, the television 2501 may invoke the DMSDP audio HAL corresponding to the sound box 2502 to send the audio data to the sound box 2502 for play. In this way, the mobile phone finally switches the audio data to the sound box 2502 for play, the sound box 2502 may play the audio data that matches an audio capability of the sound box 2502, and the master device (that is, the television 2501) of the sound box 2502 may also control an audio play process of the sound box 2502 based on the audio capability of the sound box 2502. This provides good user audio experience.

Alternatively, when the mobile phone obtains an audio capability parameter of the television 2501, if the television 2501 has established a Bluetooth connection to the sound box 2502, that is, an audio output device of the television 2501 is the sound box 2502, the television 2501 may directly report an audio capability parameter of the sound box 2502 to the mobile phone. In this way, the mobile phone may directly customize a corresponding audio play policy based on the audio capability parameter of the sound box 2502, process the audio data according to the audio play policy, and send processed audio data to the television 2501, and then the television 2501 transparently transmits, to the sound box 2502 for play, the audio data sent by the mobile phone.

Alternatively, if the mobile phone learns from the television 2501 that a current slave device of the television 2501 is the sound box 2502, the mobile phone may directly establish a network connection to the sound box 2502, and obtain an audio capability parameter of the sound box 2502 from the sound box 2502. In this way, the mobile phone may include the sound effect parameter, the audio quality parameter, or the audio play latency in the foregoing embodiment, and the play parameter is used to reflect an audio output capability of the sound box. The recording parameter may specifically include a sampling rate and a voice algorithm that is supported by the device, and the recording parameter is used to reflect an audio input capability of the sound box. A 3A algorithm in the voice algorithm may specifically include an acoustic echo cancellation (acoustic echo cancellation, AEC) algorithm, an automatic gain control (automatic gain control, AGC) algorithm, and an active noise canceling (active noise canceling, ANC) algorithm, so as to improve audio quality of recorded audio.

TABLE 3

| | | Play parameter | | | Recording parameter | |
| | | | Audio quality parameter | | | |
| Device | Identifier | Sound effect parameter | Sampling rate (kHz) | Quantity of sound channels | Sampling rate (kHz) | Voice algorithm |
|---|---|---|---|---|---|---|
| Sound box | 001 | Heavy bass sound effect/3D surround sound effect/Recording studio sound effect | 16/44.1/96/192/384 | 2, 4, or 6 | 16 | 3A algorithm, audio-zoom algorithm, or voice change algorithm |
| ... | ... | ... | ... | ... | ... | ... | alternatively directly customize a corresponding audio play policy based on the audio capability parameter of the sound box 2502, process the audio data according to the audio play policy, and send processed audio data to the sound box 2502 for play, and then the television 2501 does not need to transparently transmit, to the sound box 2502, the audio data sent by the mobile phone.

It can be understood that a specific process in which the television 2501 serves as a master device to switch audio data to the Bluetooth sound box 2502 is similar to a specific process in which the mobile phone switches audio data to the television 2501 when the television 2501 serves as a slave device. Therefore, details are not described herein again.

In addition, the foregoing embodiment is described by using an example in which the mobile phone switches audio data to one or more slave devices for play, that is, an audio output function of the mobile phone is distributed to one or more slave devices for implementation. It can be understood that the mobile phone may also distribute an audio input function (also referred to as an audio recording function or a recording function) to one or more slave devices for implementation. In other words, the mobile phone may input audio data by using recording functions of one or more slave devices, and send the input audio data to the mobile phone.

For example, similar to the audio play process in the foregoing embodiment, in addition to an audio play capability (for example, a sound effect parameter, an audio quality parameter, or an audio play latency) of a slave device, an audio capability parameter obtained by the mobile phone from the slave device may further include an audio recording capability of the slave device.

Figure 26:
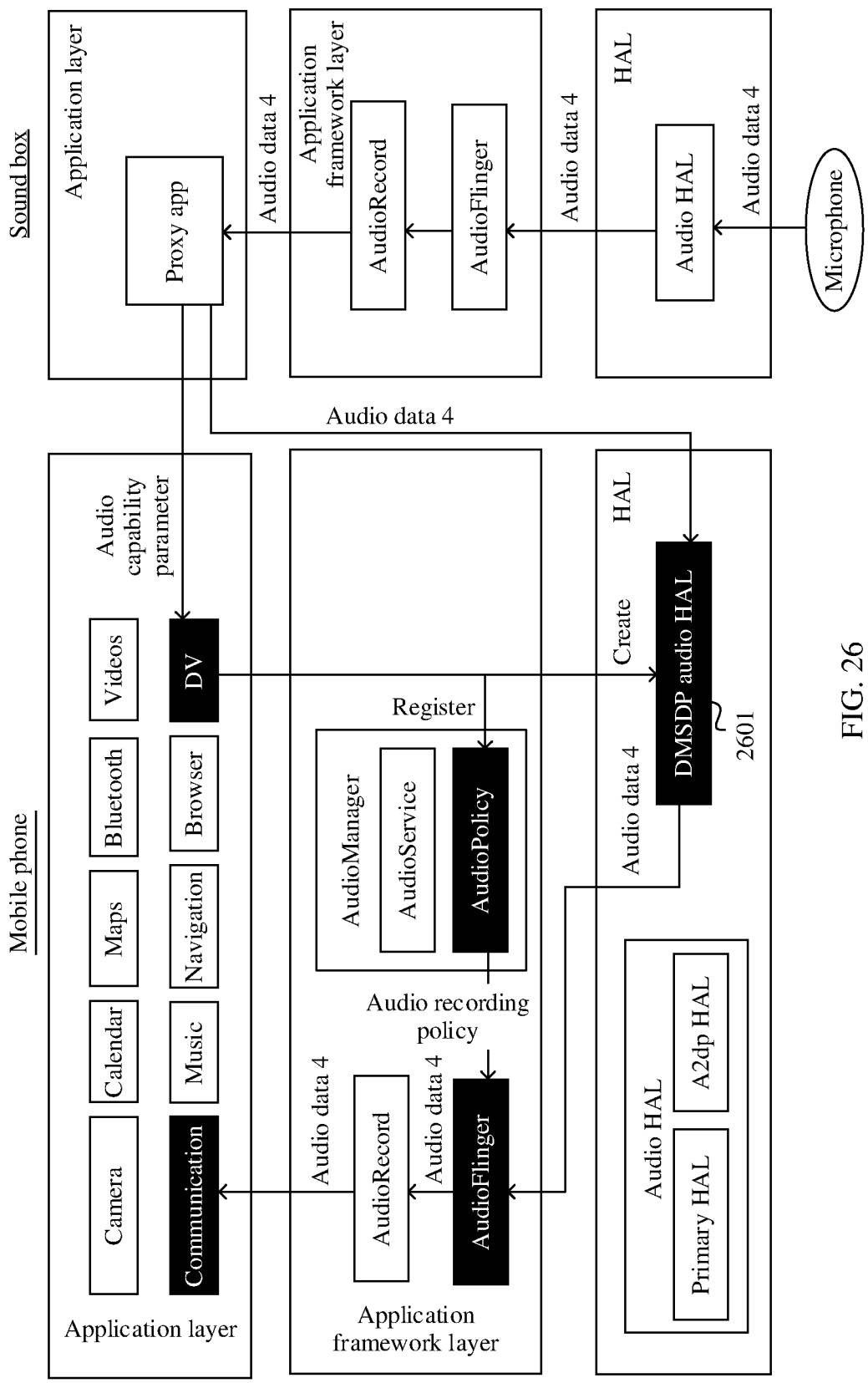
FIG. 26 is a schematic diagram 26 of an audio application scenario according to an embodiment of this application.
Figure 27:
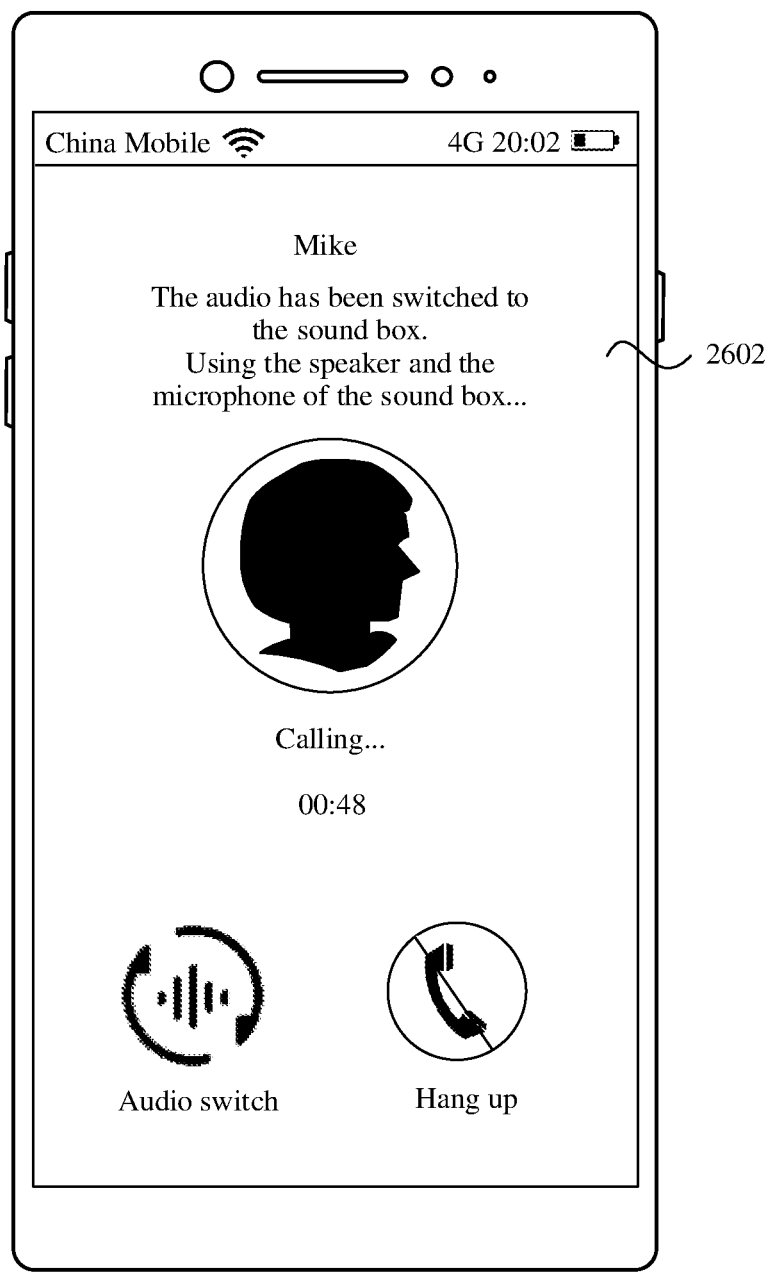
FIG. 27 is a schematic diagram 27 of an audio application scenario according to an embodiment of this application.

For example, a sound box is a slave device of the mobile phone. As shown in Table 3, an audio capability parameter of the sound box may include a play parameter and a recording parameter. The play parameter may specifically As shown in FIG. 26, an example in which the mobile phone runs the Communication app to perform an audio call is used. When the Communication app runs, audio data from a contact needs to be played, and audio data entered by the user needs to be recorded and then sent to the contact. Therefore, in a process of running the Communication app, if the user selects to switch the audio function of the mobile phone to the sound box, as shown in FIG. 27, the mobile phone may display a prompt 2602 when running the Communication app, so as to prompt the user to play and record a sound by using a speaker and a microphone of the sound box. In addition, still as shown in FIG. 26, the mobile phone may establish a network connection to the sound box and obtain an audio capability parameter of the sound box, where the audio capability parameter may include the play parameter and the recording parameter shown in Table 2. Further, the DV app may create a DMSDP audio HAL 2601 at the HAL based on the audio capability parameter. The created DMSDP audio HAL 2601 may send audio data to the sound box, and may also receive audio data recorded by the sound box. In addition, after the DV app registers the audio capability parameter of the sound box with AudioPolicy, AudioPolicy may customize a corresponding audio play policy based on the play parameter in the audio capability parameter, and AudioPolicy may simultaneously customize a corresponding audio recording policy based on the recording parameter in the audio capability parameter.

Certainly, if an audio capability parameter reported by a slave device (for example, the sound box) does not include a recording parameter, it indicates that the slave device does not have an audio recording capability. In this case, the mobile phone may select to use a microphone of the mobile phone or another device having an audio recording capability to record audio data. This is not limited in this embodiment of this application.

Figure 28A:
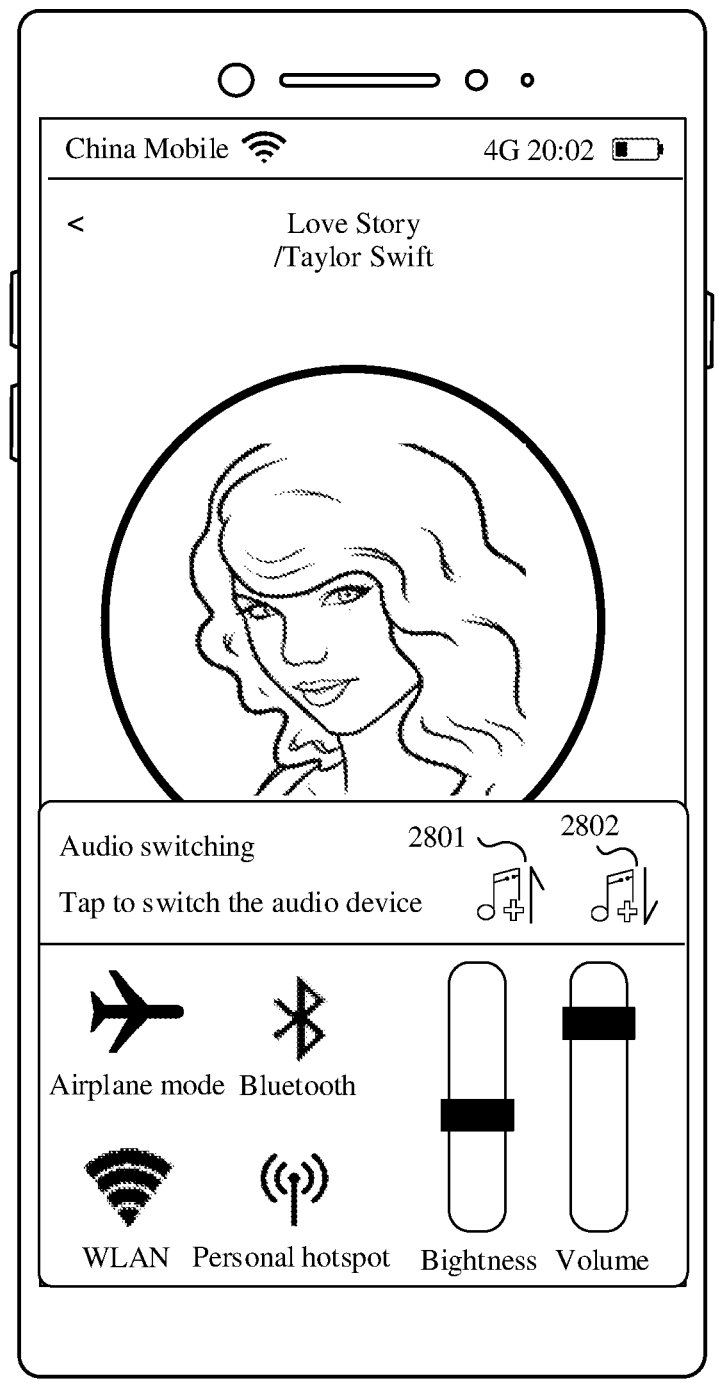
FIG. 28(a) to FIG. 28(c) are a schematic diagram 28 of an audio application scenario according to an embodiment of this application.
Figure 28B:
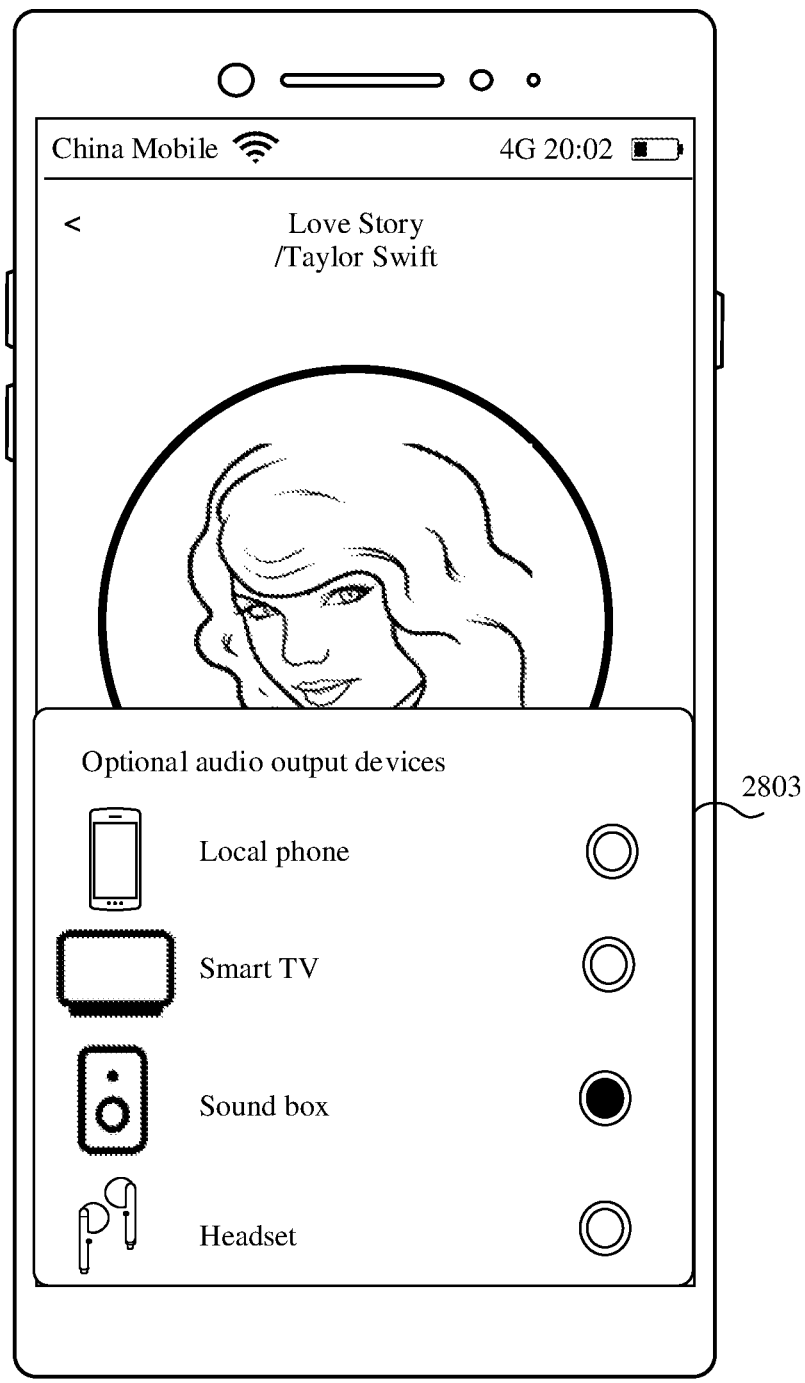
Figure 28C:
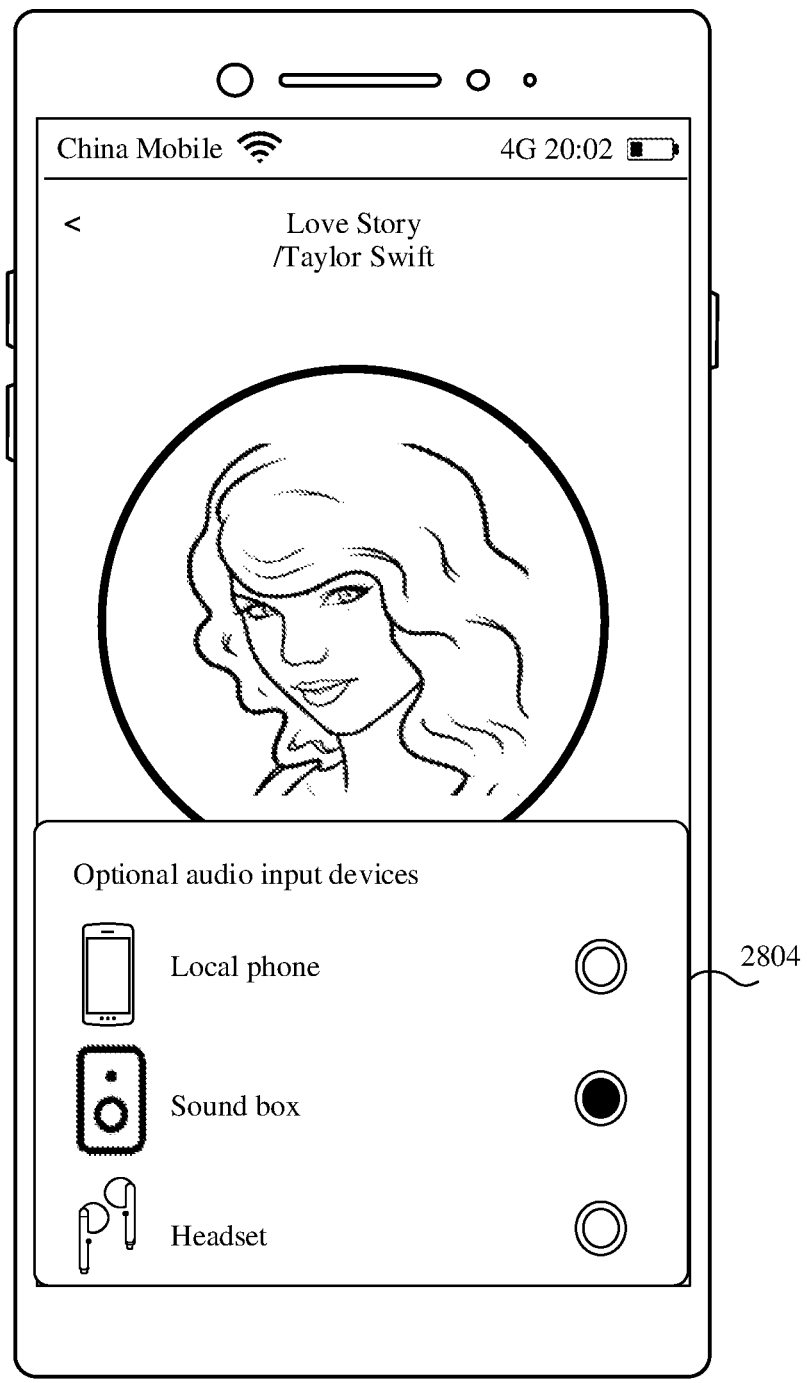

For example, if the audio capability parameter of the sound box that is obtained by the mobile phone includes both the play parameter and the recording parameter, it indicates that the sound box has both an audio output capability and an audio input capability. Therefore, after the mobile phone switches the audio function to the sound box based on the audio capability parameter of the sound box, as shown in FIG. 28(a), the mobile phone may display, in a control center, a first button 2801 corresponding to the audio output capability and a second button 2802 corresponding to the audio input capability. The user may respectively control switching of an audio output function and switching of an audio input function of the mobile phone on slave devices by using the first button 2801 and the second button 2802. For example, if it is detected that the user taps the first button 2801, as shown in FIG. 28(b), the mobile phone may display a device list 2803 including candidate devices each having an audio output function, where a current audio output device of the mobile phone is the sound box. The user may switch an audio output device of the mobile phone in the device list 2803. Similarly, if it is detected that the user taps the second button 2802, as shown in FIG. 28(c), the mobile phone may display a device list 2804 including candidate devices each having an audio input function, where a current audio input device of the mobile phone is also the sound box. The user may switch an audio input device of the mobile phone in the device list 2804. In this way, the user may respectively switch the audio output capability and the audio input capability of the mobile phone to corresponding devices according to a user requirement, to respectively control the audio output function and the audio input function of the mobile phone. This improves user audio experience.

Similar to the process in which AudioPolicy in the mobile phone customizes an audio play policy in the foregoing embodiment, AudioPolicy may set an audio recording policy based on the sampling rate and the voice algorithm in the foregoing recording parameter. For example, if the sound box supports the sampling rate of 16 kHz when recording audio data 1, AudioPolicy may set, in the audio recording policy, that sampling is performed on the audio data 1 at the sampling rate of 16 kHz. For another example, if the sound box supports the 3A algorithm when recording audio data 1, AudioPolicy may set, in the audio recording policy, that the audio data 1 is not processed by using the 3A algorithm, so as to prevent the mobile phone and the sound box from repeatedly processing the recorded audio data 1 by using the 3A algorithm.

After AudioPolicy in the mobile phone determines the current audio recording policy, still as shown in FIG. 26, AudioPolicy may output the audio recording policy to AudioFlinger, and AudioFlinger may invoke the DMSDP audio HAL 2601 to receive the audio data recorded by the sound box. For example, still as shown in FIG. 26, the sound box may record audio data 4 by using a hardware device such as a microphone at the hardware layer, and output, by using an audio HAL, the recorded audio data 4 to AudioFlinger in the sound box for processing, for example, processing the audio data 4 by using the 3A algorithm. Further, AudioFlinger may output processed audio data 4 to an audio recorder (AudioRecord) in the sound box, AudioRecord reports the recorded audio data 4 to a proxy app installed in the sound box, and finally the proxy app sends the recorded audio data 4 to the mobile phone. After receiving the audio data 4 sent by the sound box, the mobile phone may output the audio data 4 to AudioFlinger in the mobile phone by using the DMSDP audio HAL 2601. In this case, AudioFlinger may process the audio data 4 according to the audio recording policy that is output by AudioPolicy, so that processed audio data 4 matches an audio recording capability of the sound box. Subsequently, AudioFlinger may output the processed audio data 4 to the Communication app by using the audio recorder (AudioRecord). In addition, audio data generated when the Communication app runs may also be switched to the sound box according to the audio switching method in the foregoing embodiment for play. In this way, the mobile phone may flexibly switch the audio input/output function of the mobile phone to a slave device based on an audio capability of another slave device, so as to implement a cross-device distributed audio architecture.

Figure 29:
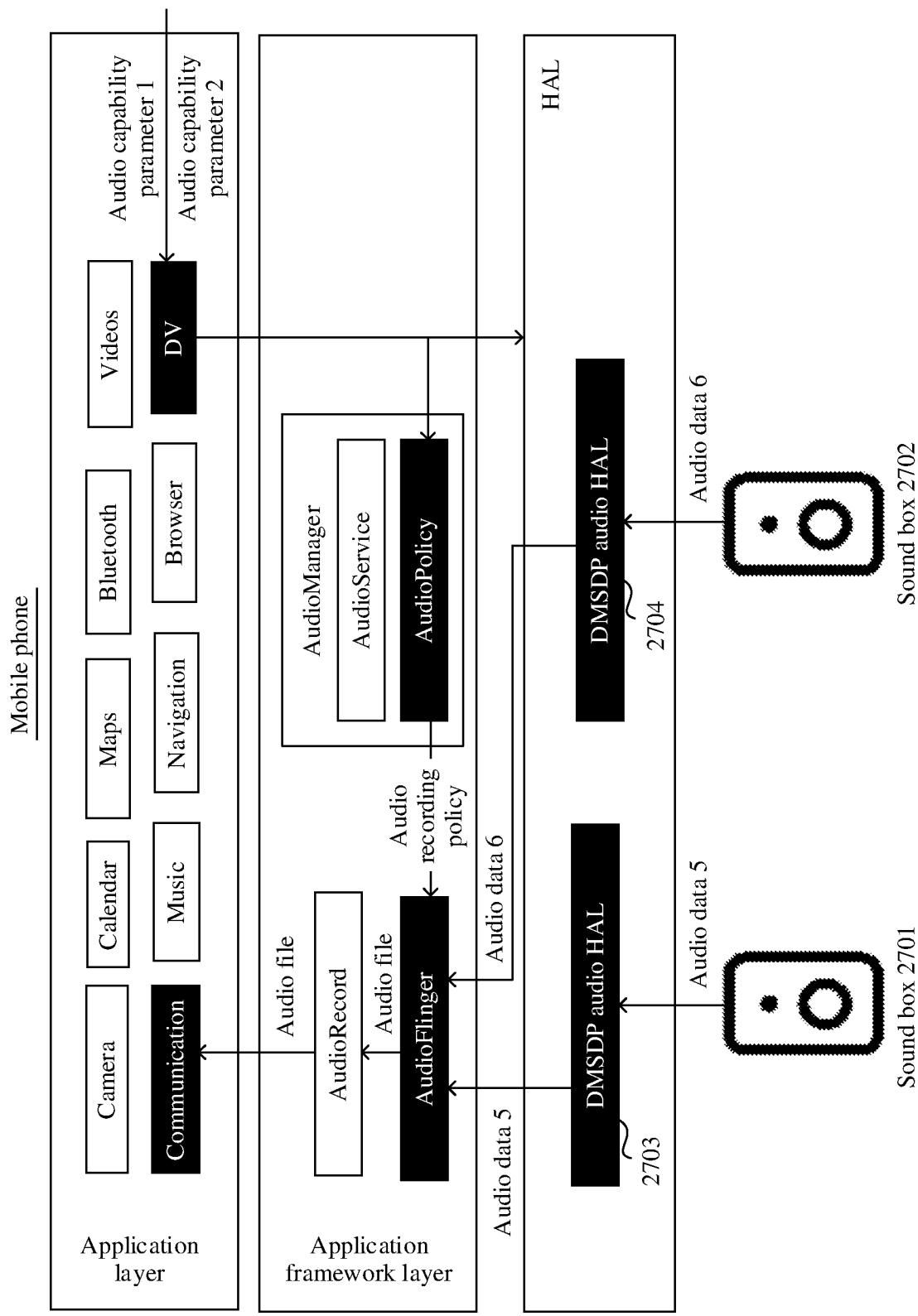
FIG. 29 is a schematic diagram 29 of an audio application scenario according to an embodiment of this application.

Similar to the process in which the mobile phone switches audio data to a plurality of slave devices for play in the foregoing embodiment, the mobile phone may also record audio data by using a plurality of slave devices. For example, as shown in FIG. 29, slave devices of the mobile phone may include a sound box 2701 and a sound box 2702, and the sound box 2701 and the sound box 2702 each have a recording function. In this case, after obtaining audio capability parameters of the sound box 2701 and the sound box 2702, the DV app in the mobile phone may create a corresponding DMSDP audio HAL 2703 and DMSDP audio HAL 2704 at the HAL. In addition, the DV app may register the audio capability parameters of the sound box 2701 and the sound box 2702 with AudioPolicy, so that AudioPolicy can determine an audio recording policy based on the audio capability parameters of the sound box 2701 and the sound box 2702. For example, the audio recording policy may indicate AudioFlinger to mix audio data separately collected by the sound box 2701 and the sound box 2702, so as to implement a stereo mixing effect.

Therefore, after AudioFlinger receives, by using the DMSDP audio HAL 2703, audio data 5 recorded by the sound box 2701 and receives, by using the DMSDP audio HAL 2704, audio data 6 recorded by the sound box 2702, AudioFlinger may mix the audio data 5 and the audio data 6 according to the audio recording policy that is output by AudioPolicy. For example, AudioFlinger may use the audio data 5 as left-channel data after filtering out noise and echo in the audio data 5, and AudioFlinger may use the audio data 6 as right-channel data after filtering out noise and echo in the audio data 6. Further, AudioFlinger may combine the left-channel data and the right-channel data into one audio file. Subsequently, AudioFlinger may output the combined audio file to the Communication app by using the audio recorder (AudioRecord), so that the audio finally obtained by the Communication app can restore a real sound making situation of the user as authentic as possible.

Similar to the process in which the mobile phone switches audio data to a slave device according to an audio play policy for play in the foregoing embodiment, after the mobile phone switches an audio recording function to a slave device for implementation, if it is detected that currently recorded audio data changes, or it is detected that an audio recording capability of the slave device changes, or it is detected that the user switches to a new slave device, the mobile phone may further dynamically adjust a current audio recording policy. In this way, the mobile phone may dynamically adjust an audio recording policy to control audio recording of a slave device, so as to provide good user audio experience.

In a distributed audio scenario, a master device may exchange audio data of different types with a slave device. An example in which the mobile phone is a master device is still used. A song played when the mobile phone runs Music is audio data of a MUSIC (music) type, and an SMS message prompt tone played when the mobile phone receives an SMS message is audio data of a NOTIFICATION (notification) type. When the mobile phone is connected to a slave device (for example, a sound box), the mobile phone may send, to the sound box for play, audio data of the MUSIC type that is being played. In this case, if the mobile phone receives a new SMS message, the mobile phone may also send audio data of the NOTIFICATION type to the sound box for play. In this way, when the user uses the sound box to listen to music, the user is disturbed by an SMS message prompt tone. Consequently, user audio experience is deteriorated.

In this embodiment of this application, audio data of different types may be defined based on service functions specifically implemented by the audio data. For example, audio data that is sent by a peer end and that is received by the mobile phone in a call service to implement a call function may be defined as a call tone. For example, audio data generated by the mobile phone in an audio service or a video service to implement an audio/video play function may be defined as media audio. For example, audio data generated by the mobile phone in a navigation service to implement a navigation function may be defined as a navigation tone. For example, audio data generated when the user taps a button for implementing a button function by the mobile phone may be defined as a keypad tone. One application may generate or receive audio data of one or more types. For example, audio data of a media audio type may be generated when WeChat plays a song, and audio data received when WeChat performs an audio call service is audio data of a call tone type.

Figure 30:
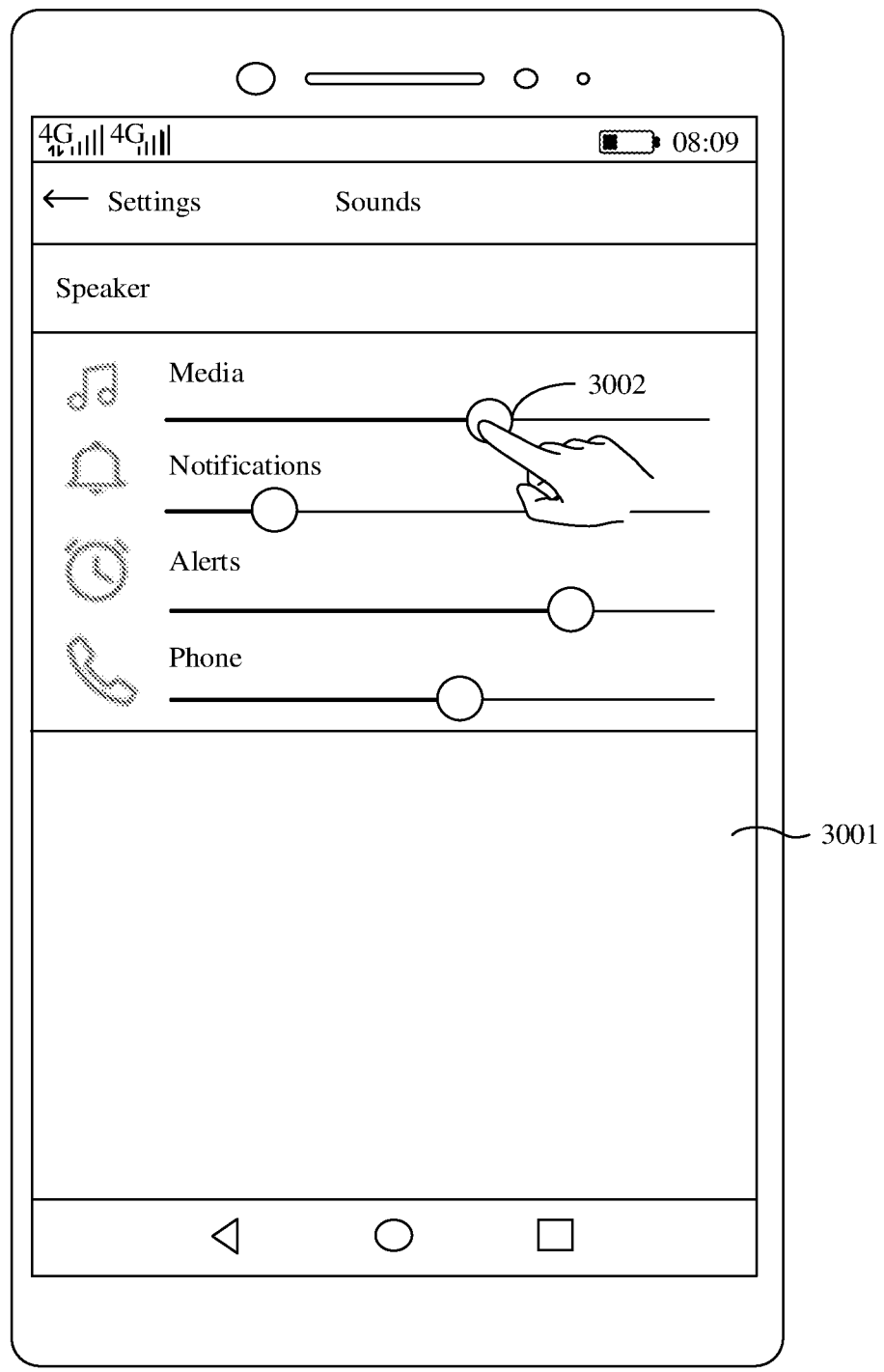
FIG. 30 is a schematic diagram 30 of an audio application scenario according to an embodiment of this application.

For example, in the Android system, audio data types may be classified into types such as ALARM (alarm), MUSIC (music), RING (ringtone), SYSTEM (system), NOTIFICATION (notification), DTMF (dual-tone multifrequency), COMMUNICATION (communication), and VOICE_CALL (call) based on specific service functions. The mobile phone may separately control audio data of different types. For example, as shown in FIG. 30, a Settings application in the mobile phone may provide the user with an option for setting volume of audio data of each type on a sound setting interface 3001. For example, the setting interface 3001 may include a volume adjustment slider 3002 corresponding to the MUSIC (music) type. The user may set volume of the audio data of the MUSIC (music) type by sliding the volume adjustment slider 3002. Similarly, the user may further set, on the setting interface 3001, volume of audio data of types such as NOTIFICATION (notification), ALARM (alarm), and VOICE_CALL (call). In this way, when playing audio data of different types, the mobile phone may play corresponding audio data based on volume that is set by the user.

Because audio data usually exists in a form of a data stream, a type of the audio data may be referred to as a type of the audio stream. In the Android system, the audio data of the RING (ringtone) type is used as an example, and the audio data of the RING (ringtone) type may also be represented as STREAM_RING (ringtone stream). Certainly, in Android systems of different versions, specific classification of audio data types may be inconsistent. This is not limited in this embodiment of this application. In addition, in another operating system, audio data may alternatively be classified into a plurality of types based on different service scenarios.

For audio data of different types, the mobile phone may split different audio data according to a specified device selection policy. For example, it may be preset in the device selection policy that the audio data of the RING type may be simultaneously played by a connected headset and a speaker of the local phone, and the audio data of the MUSIC type is preferentially played by the headset.

Therefore, after the mobile phone is connected to the headset, when the mobile phone plays the audio data of the MUSIC type, for example, when the mobile phone runs Music to play a song, the mobile phone may send the audio data of the MUSIC type to the headset according to the foregoing device selection policy for play. If the mobile phone receives a call from a contact, the mobile phone needs to play a ringtone of the RING type. In this case, the mobile phone may simultaneously send the ringtone of the RING type to the headset and the speaker of the local phone according to the foregoing device selection policy, and the headset and the speaker of the local phone simultaneously play the ringtone of the RING type.

In this embodiment of this application, the mobile phone serving as a master device may switch generated audio data to one or more slave devices for play. The mobile phone may set corresponding device selection policies for audio data of different types based on a device feature of a current slave device, so as to help perform splitting according to the device selection policy during audio switching.

Figure 31:
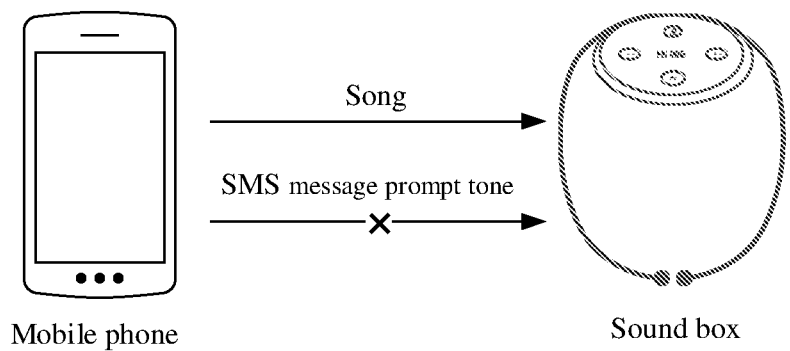
FIG. 31 is a schematic diagram 31 of an audio application scenario according to an embodiment of this application.

For example, when a slave device of the mobile phone is a sound box, because a sound effect is good but portability is poor when the sound box plays audio data, the user usually listens to music or an audio program by using the sound box. Therefore, it may be preset in the device selection policy that the sound box is used as a slave device of the mobile phone to receive audio data of the MUSIC type instead of audio data of the NOTIFICATION type. Subsequently, as shown in FIG. 31, when the user selects the sound box as a slave device of the mobile phone for current audio switching, the mobile phone may send audio data of the MUSIC type (for example, a song) to the sound box according to the foregoing device selection policy for play. If the mobile phone generates audio data of the NOTIFICATION type, the mobile phone does not send the audio data of the NOTIFICATION type (for example, an SMS message prompt tone) to the sound box for play. In this way, when the mobile phone performs audio switching by using the sound box as a slave device, the user may listen to audio data of the MUSIC type from the mobile phone on the sound box, without being disturbed by other audio data (for example, the SMS message prompt tone) in another mobile phone.

Figure 32:
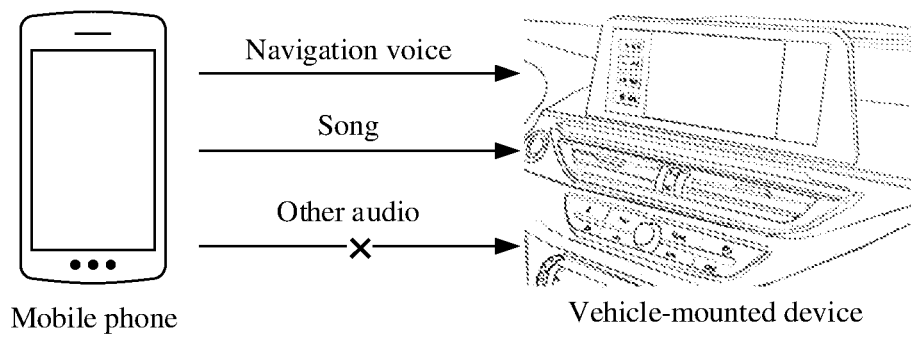
FIG. 32 is a schematic diagram 32 of an audio application scenario according to an embodiment of this application.

For another example, when a slave device of the mobile phone is a vehicle-mounted device (which may also be referred to as a head unit), because the vehicle-mounted device plays audio data mostly in a driving scenario, the user needs to stay focused. Therefore, it may be preset in the device selection policy that the vehicle-mounted device may be used as a slave device of the mobile phone to receive audio data of the MUSIC type and the navigation voice type instead of audio data of other types (for example, the NOTIFICATION type and SYSTEM). Subsequently, as shown in FIG. 32, when the user selects the vehicle-mounted device as a slave device of the mobile phone for current audio switching, the mobile phone may send audio data of the MUSIC type (for example, a song) or the navigation voice type to the vehicle-mounted device according to the foregoing device selection policy for play. If the mobile phone receives or generates audio data of another type, the mobile phone does not send the audio data to the vehicle-mounted device for play. In this way, when the mobile phone performs audio switching by using the vehicle-mounted device as a slave device, the user may listen to audio data of the MUSIC type or the VOICE_CALL type from the mobile phone on the vehicle-mounted device, without being disturbed by other audio data (for example, the SMS message prompt tone) in another mobile phone.

In addition, when the mobile phone forbids a slave device to receive audio data of a type in the device selection policy, for example, forbids the vehicle-mounted to receive audio data of the NOTIFICATION type, the mobile phone may further set an audio output device corresponding to the audio data of the NOTIFICATION type in the device selection policy, that is, a specific device that is allowed to play the audio data of the NOTIFICATION type. For example, the mobile phone may set the mobile phone as an audio output device corresponding to the audio data of the NOTIFICATION type. Therefore, when the mobile phone performs audio switching by using the vehicle-mounted device as a slave device, if audio data of the NOTIFICATION type is generated, the mobile phone does not send the audio data to the vehicle-mounted device, but plays the audio data by using the speaker of the mobile phone, so as to prevent the audio data generated by the mobile phone from being missed. Certainly, the mobile phone may alternatively select another device as an audio output device corresponding to the audio data of the NOTIFICATION type during audio switching. This is not limited in this embodiment of this application.

It can be learned that, in this embodiment of this application, when outputting audio data to one or more slave devices for audio switching, the master device (for example, the foregoing mobile phone) may send audio data that matches device features of the slave devices to the slave devices for play, so as to filter out, for the user, some audio data that is not suitable to be played by the slave devices, so that audio data is more adaptable to an audio output device. This provides good user audio experience.

Figure 33:
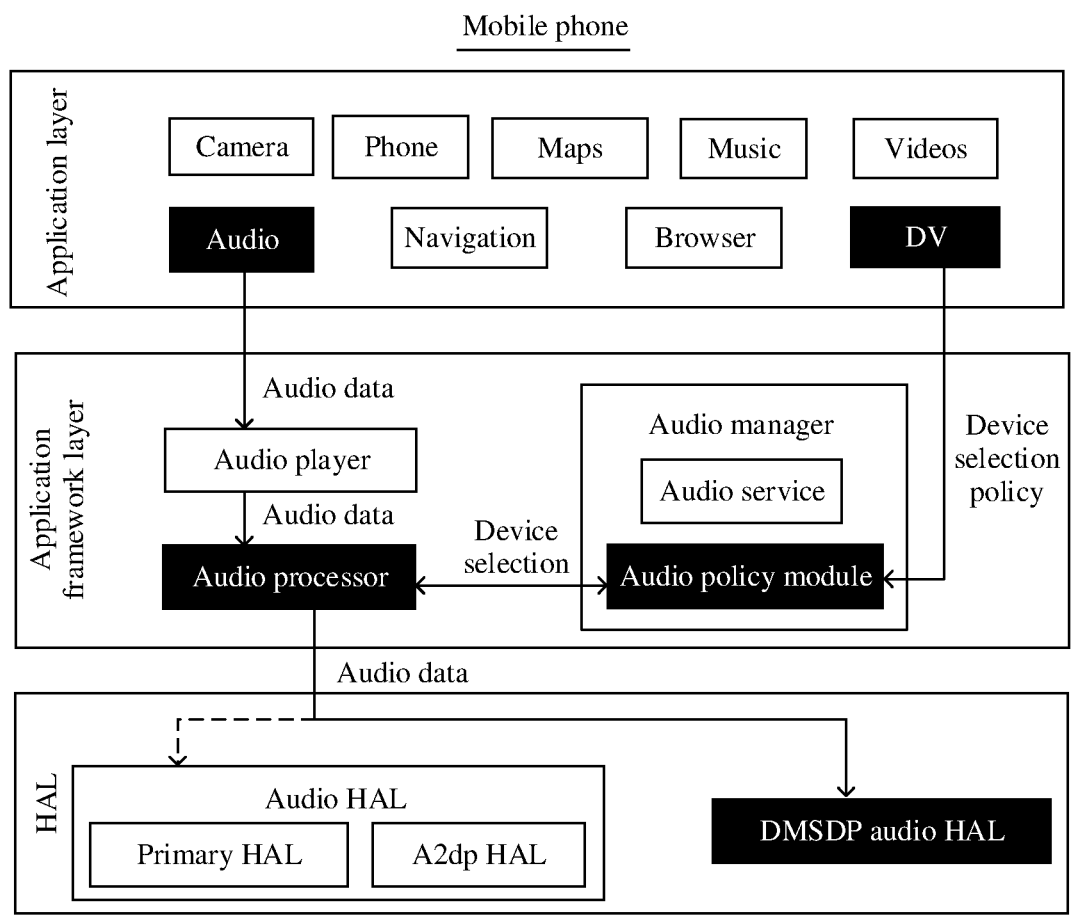
FIG. 33 is a schematic diagram 33 of an audio application scenario according to an embodiment of this application.

In some embodiments, as shown in FIG. 33, after the DV app in the mobile phone creates a DMSDP audio HAL for a slave device, the DV app may further deliver a device selection policy corresponding to the current slave device to AudioPolicy. The device selection policy records capabilities of the slave device to play audio data of different types. For example, a slave device of the mobile phone is a sound box. A device selection policy corresponding to the sound box may be shown in Table 4. The device selection policy records a capability of the sound box to play audio data of each type. For example, audio data of the MUSIC type and audio data of the RING type are allowed to be played by the sound box, and audio data of the SYSTEM type and audio data of the NOTIFICATION type are not allowed to be played by the sound box.

TABLE 4

| Slave device | Type | Allowed to play or not |
|---|---|---|
| Sound box | MUSIC (music) | Yes |
| | RING (ringtone) | Yes |
| | SYSTEM (system) | No |
| | NOTIFICATION (notification) | No |
| | . . . | . . . |

Generally, as shown in FIG. 33, after generating audio data of a type, Audio may invoke the audio player to play the audio data. In addition, Audio may identify a specific type of the audio data by setting a preset parameter (for example, a mode parameter) in the audio player. For example, when Audio sets the mode parameter to 01, it indicates that the audio data that is input by Audio into the audio player is of the MUSIC type; or when Audio sets the mode parameter to 11, it indicates that the audio data that is input by Audio into the audio player is of the RING type.

Therefore, still as shown in FIG. 33, after AudioFlinger receives, by using the audio player, the audio data generated by Audio, AudioFlinger may determine a type of the currently received audio data by reading the mode parameter in the audio player. Further, still as shown in FIG. 33, AudioFlinger may request AudioPolicy to query whether the audio data of this type is allowed to be played by the current slave device (that is, the sound box). In response to the request, AudioPolicy may determine, according to a device selection policy delivered by the DV app, as shown in Table 4, whether an audio output device corresponding to the current audio data is the sound box, that is, select an appropriate audio output device for the current audio data.

If the sound box is allowed to play the audio data of the current type, AudioPolicy may indicate, to AudioFlinger, that the audio output device corresponding to the current audio data is the sound box. Further, as shown by a solid-line arrow in FIG. 33, after AudioFlinger processes the audio data, AudioFlinger may send processed audio data to the sound box by using the DMSDP audio HAL, and the sound box plays the audio data.

Correspondingly, if the sound box is not allowed to play the audio data of the current type, AudioPolicy may reselect an audio output device for the current audio data. For example, AudioPolicy may set the speaker of the local phone as an audio output device corresponding to the current audio data. Further, AudioPolicy may indicate, to AudioFlinger, that the audio output device corresponding to the current audio data is the speaker of the local phone. Therefore, as shown by a dashed-line arrow in FIG. 33, after AudioFlinger processes the audio data, AudioFlinger may send processed audio data to the speaker of the mobile phone by using the primary HAL, and the speaker of the mobile phone plays the audio data.

It can be understood that only a type of audio data that is allowed to be played by the sound box may be set in the device selection policy (for example, the device selection policy corresponding to the sound box shown in Table 4). In this case, audio data of another type may be considered by default as audio data that is not allowed to be played by the sound box. Alternatively, only a type of audio data that is not allowed to be played by the sound box may be set in the device selection policy shown in Table 4. In this case, audio data of another type may be considered by default as audio data that is allowed to be played by the sound box. This is not limited in this embodiment of this application.

In some other embodiments, as shown in Table 5, an audio output device corresponding to audio data of each type may also be set in the device selection policy. For example, for audio data of the MUSIC type, the audio data is allowed to be played by the mobile phone, the sound box, and the television. For audio data of the NOTIFICATION type, the audio data is allowed to be played by the mobile phone and the watch.

TABLE 5

| Type | Audio output device |
|---|---|
| MUSIC (music) | Mobile phone, sound box, or television |
| NOTIFICATION (notification) | Mobile phone or watch |
| . . . | . . . |

Therefore, after receiving audio data of a type, AudioFlinger may still request AudioPolicy to determine a specific audio output device corresponding to the audio data of the type. The audio data of the MUSIC type is used as an example. AudioPolicy may determine, according to the device selection policy shown in Table 5, that an audio output device capable of playing the audio data includes the mobile phone, the sound box, and the television. If a slave device currently connected to the mobile phone is the sound box, AudioPolicy may determine that the audio output device corresponding to the audio data of the MUSIC type is the sound box, and further indicate AudioFlinger to send the audio data of the MUSIC type to the sound box for play. The audio data of the NOTIFICATION type is used as an example. AudioPolicy may determine, according to the device selection policy shown in Table 5, that an audio output device capable of playing the audio data includes the mobile phone and the watch, that is, the sound box currently connected to the mobile phone is not allowed to play the audio data. In this case, AudioPolicy may determine the mobile phone as the audio output device corresponding to the audio data of the NOTIFICATION type, and further indicate AudioFlinger to send the audio data of the NOTIFICATION type to the speaker of the mobile phone for play.

When the type of the audio data that is output by Audio changes, Audio may modify the foregoing mode parameter in the audio player. Further, when AudioFlinger reads that the mode parameter changes, AudioFlinger may determine a current type of the audio data based on a latest mode parameter. In this way, AudioFlinger may re-request AudioPolicy to query whether the audio data of the new type is allowed to be played by the current slave device (that is, the sound box), so as to dynamically switch audio data of different types to corresponding audio output devices for play.

Alternatively, when the slave device of the mobile phone changes (for example, the slave device is updated from the sound box to the television), the DV app may be triggered to deliver a device selection policy corresponding to the television to AudioPolicy. Further, AudioPolicy may select an appropriate audio output device for the audio data of the current type in real time according to the device selection policy corresponding to the television, so as to dynamically switch audio data of different types to corresponding audio output devices for play.

It can be learned that, based on the audio architecture shown in FIG. 33, the master device may preset a device selection policy corresponding to each slave device based on a device feature of each slave device. In this way, in an audio switching process, the master device may send, according to a device selection policy corresponding to a current slave device, audio data that matches a device feature of the slave device to the slave device for play, so as to filter out, for the user, some audio data that is not suitable to be played by the slave device, so that the master device can selectively switch audio data of various types to corresponding audio output devices for play. This provides good user audio experience.

The following still uses an example in which the mobile phone is a master device to describe an audio control method provided in an embodiment of this application with reference to the accompanying drawings.

Figure 34:
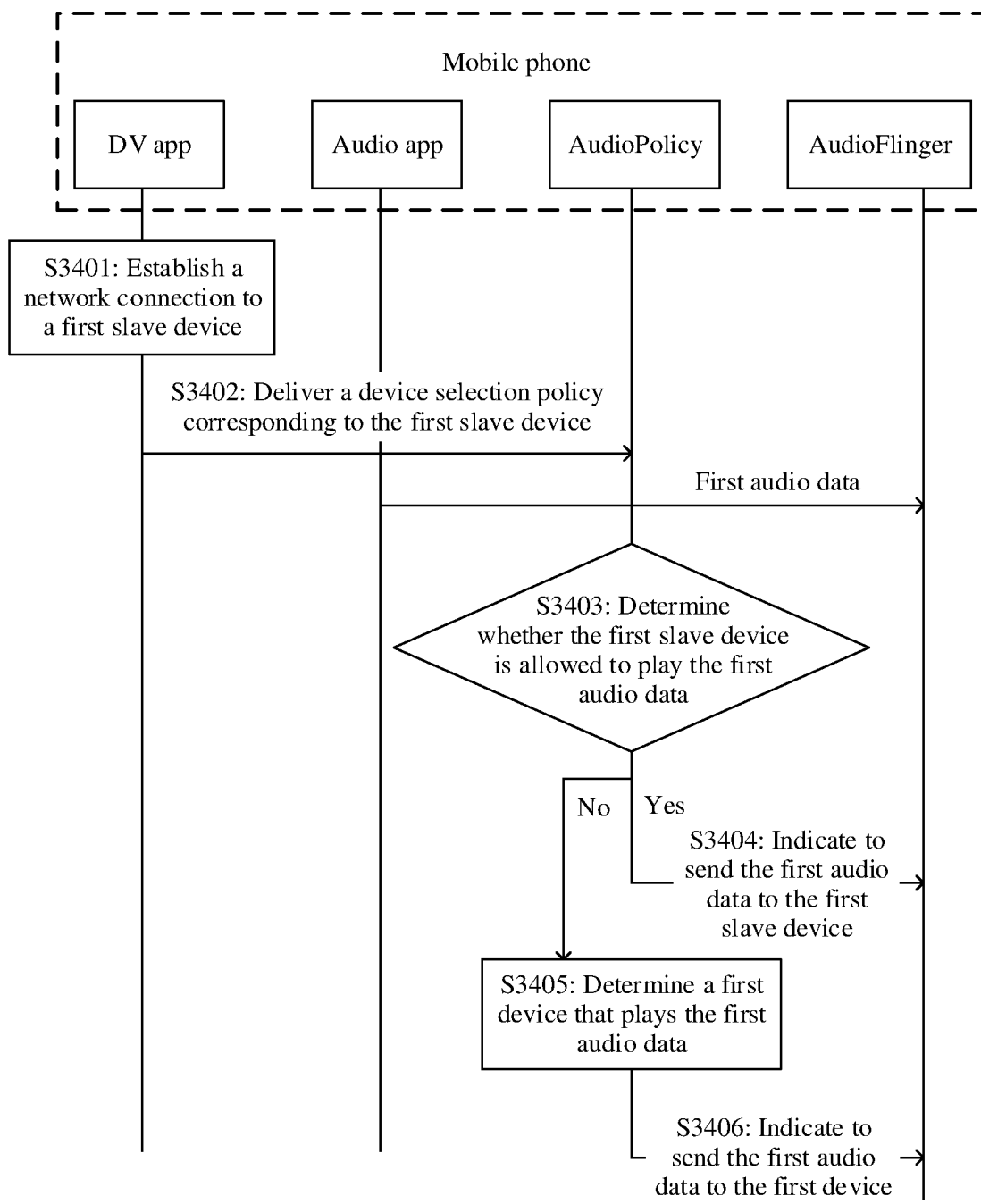
FIG. 34 is a schematic interaction diagram 2 of an audio control method according to an embodiment of this application.

As shown in FIG. 34, the audio control method provided in this embodiment of this application includes the following steps.

S3401: The mobile phone establishes a network connection to a first slave device by running a DV app.

Figure 35:
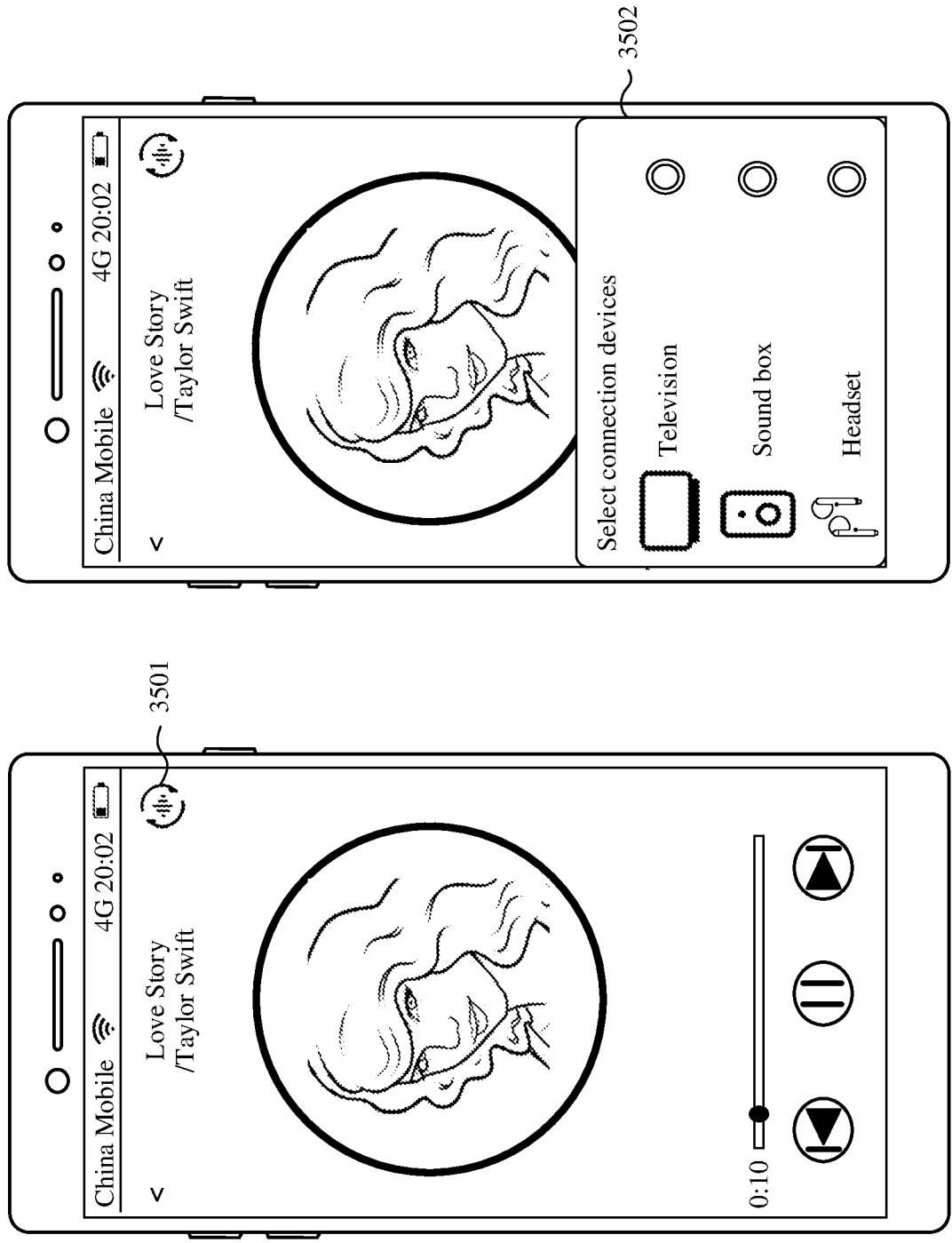
FIG. 35 is a schematic diagram 34 of an audio application scenario according to an embodiment of this application.

For example, a user may switch an audio output device in the mobile phone when the mobile phone outputs audio. For example, as shown in (a) in FIG. 35, when running Music, the mobile phone may display a switching button 3501 for audio switching. If it is detected that the user taps the switching button 3501, the mobile phone may run the DV app to search for one or more nearby candidate devices for audio switching. As shown in (b) in FIG. 35, the DV app may display, in a menu 3502, candidate devices that are located in a same Wi-Fi network as the mobile phone, for example, a television, a sound box, and a headset. The user may select one of these candidate devices as an audio output device when the mobile phone subsequently outputs audio, that is, a slave device of the mobile phone.

Figure 36:
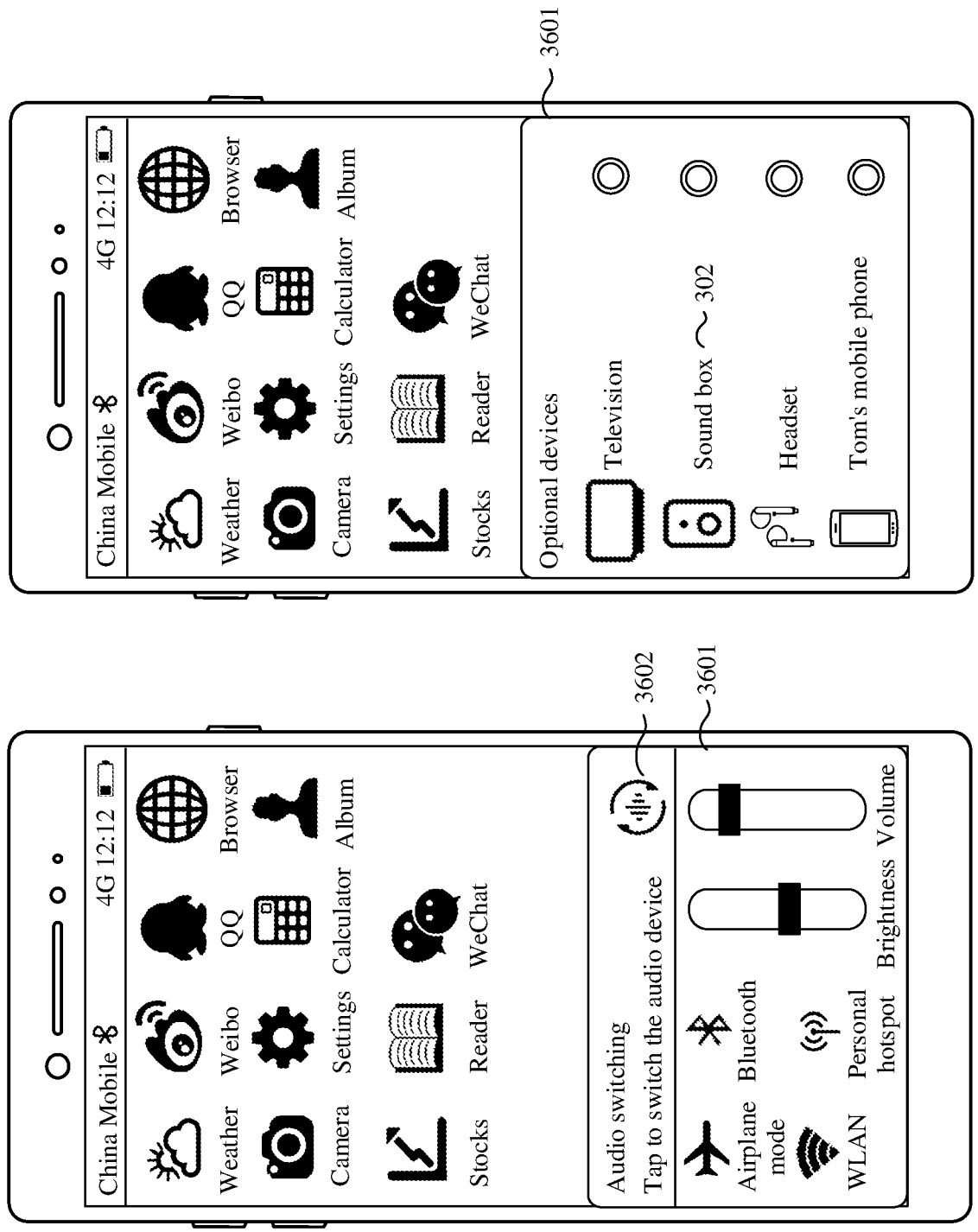
FIG. 36 is a schematic diagram 35 of an audio application scenario according to an embodiment of this application.

For another example, the user may alternatively open a control center of the mobile phone, and switch an audio output device in the control center when the mobile phone outputs audio. In response to the operation that is entered by the user into the mobile phone and that is of opening the control center, as shown in (a) in FIG. 36, the mobile phone may display a control center 3601. A switching button 3602 for audio switching is disposed in the control center 3601. If it is detected that the user taps the switching button 3602, the mobile phone may also run the DV app to search for one or more nearby candidate devices for audio switching. As shown in (b) in FIG. 36, the DV app may display, in the control center 3601, found candidate devices that are located in a same Wi-Fi network as the mobile phone, for example, a television, a sound box, and a headset. Likewise, the user may select one of these candidate devices as an audio output device when the mobile phone subsequently outputs audio, that is, a slave device of the mobile phone.

For example, the user selects the sound box as a slave device. After it is detected that the user selects the sound box from the foregoing candidate devices, the DV app may establish a network connection to the sound box by using the sound box as a slave device of the mobile phone. For example, the network connection may be a P2P connection based on the transmission control protocol (transmission control protocol, TCP) or the user datagram protocol (user datagram protocol, UDP). This is not limited in this embodiment of this application.

It should be noted that the network connection established between the mobile phone and the slave device in step S3401 may be specifically a service channel network connection (that is, a service connection). For example, before the user selects the sound box as a slave device of the mobile phone, the mobile phone may have established a connection to the sound box through the Wi-Fi network. In this case, the connection is a data channel connection (that is, a data connection). After the user selects the sound box as a slave device of the mobile phone, the mobile phone may establish a service connection to the sound box based on the established data connection.

Figure 37:
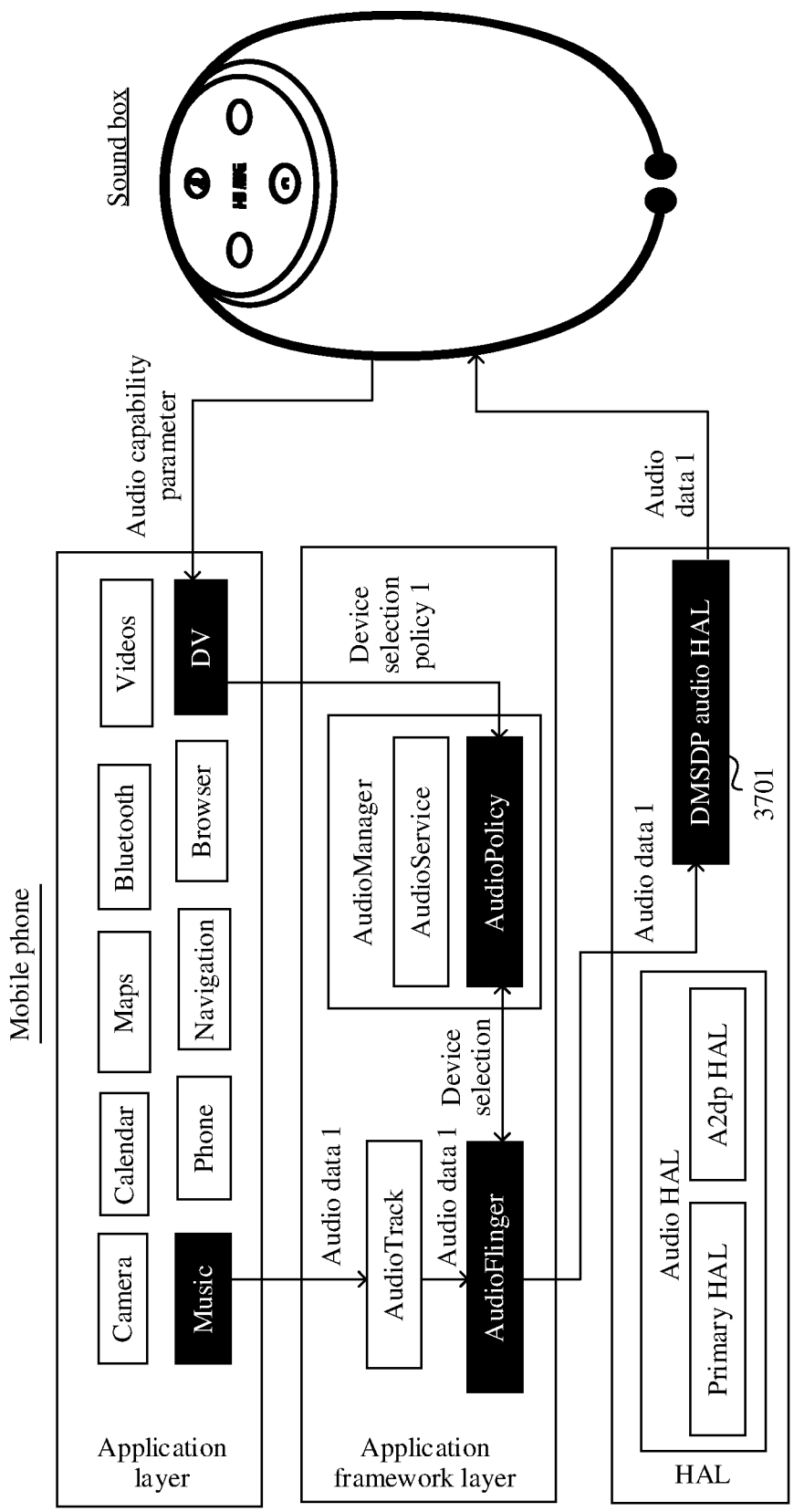
FIG. 37 is a schematic diagram 36 of an audio application scenario according to an embodiment of this application.

After the mobile phone establishes the network connection to the sound box, as shown in FIG. 37, the DV app may obtain an audio capability parameter of the sound box based on the network connection, where the audio capability parameter may reflect an audio output function specifically supported by the sound box. Further, the DV app may create a corresponding DMSDP audio HAL 3701 at an HAL based on the audio capability parameter of the sound box. Subsequently, the mobile phone may transmit audio data to the sound box by using the DMSDP audio HAL 3701.

In some embodiments, the user may alternatively select a plurality of slave devices to output audio of the mobile phone. For example, the user may simultaneously select the sound box and the television from the foregoing candidate devices as slave devices of the mobile phone. In this case, the DV app may respectively establish network connections to the sound box and the television box and obtain corresponding audio capability parameters. Further, the DV app may create a first DMSDP audio HAL corresponding to the sound box at the HAL based on the audio capability parameter of the sound box, and the DV app may create a second DMSDP audio HAL corresponding to the television at the HAL based on the audio capability parameter of the television. Subsequently, the mobile phone may send corresponding first audio data to the sound box by using the first DMSDP audio HAL, and send corresponding second audio data to the television by using the second DMSDP audio HAL (the second audio data may be the same as or different from the first audio data).

S3402: The DV app in the mobile phone delivers a device selection policy corresponding to the first slave device to AudioPolicy.

In some embodiments of this application, the mobile phone may pre-store device selection policies corresponding to a plurality of audio output devices. A device selection policy corresponding to each audio output device is used to indicate capabilities of the device for playing audio data of different types. For example, the mobile phone may pre-store device selection policies corresponding to four types of audio output devices: a sound box device, a large-screen device, a vehicle-mounted device, and a wearable device.

Therefore, after the mobile phone establishes the network connection to the first slave device (for example, a sound box 1), the DV app may obtain an identifier of the sound box 1. Further, the DV app may identify, based on the identifier of the sound box 1, that the sound box 1 is a sound box device. Further, still as shown in FIG. 37, the DV app may send the pre-stored device selection policy (that is, a device selection policy 1) corresponding to the sound box device to AudioPolicy. AudioPolicy may associate the device selection policy 1 delivered by the DV app with the sound box 1. In this case, the device selection policy 1 may be bound to the sound box 1 as a device selection policy corresponding to the sound box 1.

For example, the device selection policy 1 corresponding to the sound box 1 (that is, the device selection policy corresponding to the sound box device) may be shown in Table 6. The device selection policy 1 records a capability of the sound box 1 to play audio data of each type. For example, in the device selection policy 1, audio data of a MUSIC type and audio data of a RING type are allowed to be played by the sound box 1. In this case, an audio output device corresponding to the audio data of the MUSIC type and the audio data of the RING type is the sound box 1. For another example, in the device selection policy 1, audio data of a SYSTEM type and audio data of a NOTIFICATION type are not allowed to be played by the sound box 1. For audio data of a type that is not allowed to be played, an audio output device corresponding to the audio data of the type may be further set in the device selection policy 1, that is, a specific audio output device that is allowed to play the audio data of the type. For example, because the audio data of the SYSTEM type is not allowed to be played by the sound box 1, an audio output device corresponding to the audio data of this type is the mobile phone, that is, the audio data of the SYSTEM type is allowed to be played by a speaker of the mobile phone.

TABLE 6

| Slave device | Type | Allowed to play or not | Audio output device |
|---|---|---|---|
| Sound box 1 | MUSIC (music) | Yes | Sound box 1 |
| | RING (ringtone) | Yes | Sound box 1 |
| | SYSTEM (system) | No | Headset |
| | NOTIFICATION (notification) | No | Mobile phone |
| | ... | ... | ... |

Figure 38:
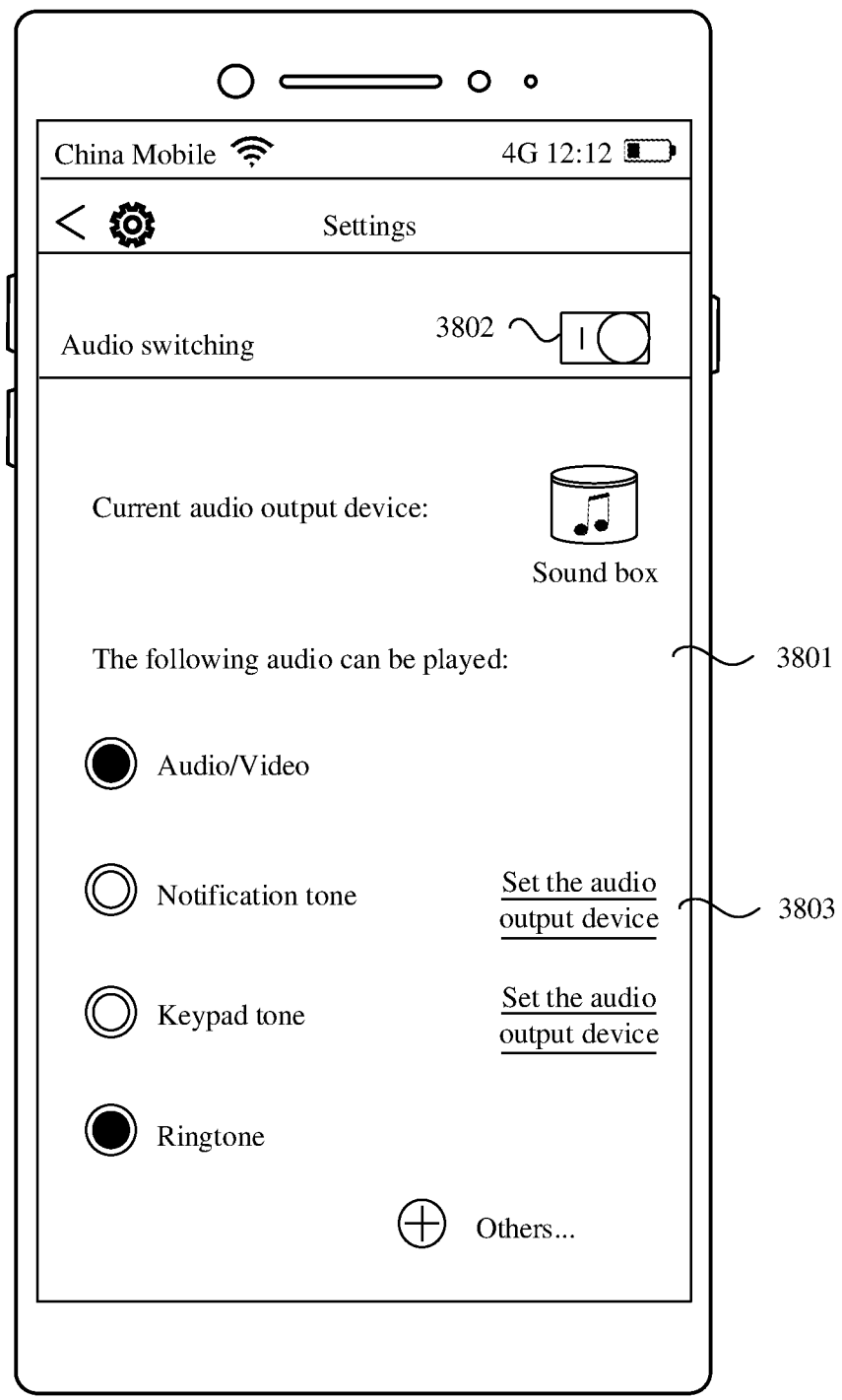
FIG. 38 is a schematic diagram 37 of an audio application scenario according to an embodiment of this application.

In addition, the user may further manually modify, by using the DV app, the device selection policy 1 corresponding to the sound box 1. For example, as shown in FIG. 38, the DV app may display a setting interface 3801 of an audio switching function to the user. An on/off button 3802 with an audio switching function is disposed on the setting interface 3801. If it is detected that the user turns on the on/off button 3802, it indicates that the user wants to enable an audio switching function, and the mobile phone may allow to switch audio in the mobile phone to another audio output device for play. In addition, the user may further set, on the setting interface 3801, a device selection policy corresponding to a current audio output device. For example, the user may select, on the setting interface 3801, audio data of a specific type that is allowed to be played by the sound box 1 and audio data of a specific type that is not allowed to be played by the sound box 1. For audio data that is not allowed to be played by the sound box 1, the user may tap a button 3803 to further set an audio output device corresponding to the audio data of this type.

The DV app may update the device selection policy 1 corresponding to the sound box 1 shown in Table 6 based on user selection on the setting interface 3801, and deliver an updated device selection policy 1 to AudioPolicy. AudioPolicy determines, according to the updated device selection policy 1, whether current audio data is allowed to be played on the sound box 1.

In this way, the user may set or modify, on the setting interface 3801 according to a user requirement, an audio type that is allowed to be played by each audio output device, that is, set a device selection policy corresponding to each audio output device, so that audio data of various types can be distributed by the mobile phone to corresponding audio output devices according to the user setting for play.

Certainly, the mobile phone may further store the device selection policy that is set by the user for the sound box 1. Subsequently, when the mobile phone establishes a network connection to the sound box 1 again, the mobile phone may find, based on the identifier of the sound box 1, the stored device selection policy corresponding to the sound box 1, and determine, by using the device selection policy, whether to output current audio data to the sound box 1 for play.

In some application scenarios, the mobile phone may simultaneously have a plurality of audio output devices, that is, the mobile phone may have a plurality of current slave devices. For example, the mobile phone may simultaneously establish network connections to the sound box 1 and a sound box 2. In this case, the DV app in the mobile phone may deliver the device selection policy corresponding to the sound box 1 and a device selection policy corresponding to the sound box 2 to AudioPolicy according to the foregoing method. For example, because both the sound box 1 and the sound box 2 are sound box devices, the device selection policy corresponding to the sound box 1 may be the same as the device selection policy corresponding to the sound box 2. Subsequently, the user may further set, on the setting interface 3801 shown in FIG. 38, the device selection policy corresponding to the sound box 1 and/or the sound box 2. In some embodiments, when both the sound box 1 and the sound box 2 play audio data of a type, AudioPolicy may send the current audio data to both the sound box 1 and the sound box 2, or AudioPolicy may send the current audio data to one of the sound box 1 and the sound box 2. For example, AudioPolicy may send the current audio data to a sound box that is in the sound box 1 and the sound box 2 and that is closer to the user for play. This is not limited in this embodiment of this application.

In some other embodiments of this application, the mobile phone may set by default that each audio output device is allowed to play audio data of any type. Therefore, after the mobile phone establishes the network connection to the first slave device (for example, the sound box 1), the DV app may send a device selection policy shown in Table 7 to Audio-Policy. In the device selection policy shown in Table 7, the sound box 1 is allowed to play audio data of any type. Subsequently, the mobile phone may update the device selection policy corresponding to the sound box 1 shown in Table 7 based on user selection on the setting interface 1201, and deliver an updated device selection policy corresponding to the sound box 1 to AudioPolicy. AudioPolicy determines, according to the updated device selection policy corresponding to the sound box 1, a specific audio output device corresponding to current audio data.

TABLE 7

| Slave device | Type | Allowed to play or not | Audio output device |
| --- | --- | --- | --- |
| Sound box 1 | MUSIC (music) | Yes | Sound box 1 |
|  | RING (ringtone) | Yes | Sound box 1 |
|  | SYSTEM (system) | Yes | Sound box 1 |
|  | NOTIFICATION (notification) | Yes | Sound box 1 |
|  | . . . | . . . | . . . |

Certainly, the device selection policy corresponding to the audio output device may alternatively be obtained by the mobile phone from a server, or the device selection policy corresponding to the audio output device may be preset by a developer in the mobile phone. This is not limited in this embodiment of this application.

S3403: When the mobile phone runs an audio app, AudioPolicy determines, according to the device selection policy corresponding to the first slave device, whether the first slave device is allowed to play first audio data from the audio app.

It should be noted that the mobile phone may start to run the audio app before or after establishing the network connection to the first slave device. In other words, there is no sequence relationship between a process in which the mobile phone runs the audio app and steps S3401 and S3402. If the mobile phone has run the audio app to generate audio data before establishing the network connection to the first slave device, because the mobile phone is not connected to another audio output device, the mobile phone may play the audio data by using the speaker of the mobile phone.

In step S3403, still as shown in FIG. 37, when running the audio app, the mobile phone may invoke an audio player (for example, AudioTrack) to input currently generated audio data (for example, audio data 1) into an audio processor (for example, AudioFlinger). In addition, the audio app may set a type of the audio data 1 in AudioTrack. For example, the audio app may set a mode parameter in AudioTrack to 01, so as to indicate that the audio data 1 that is currently input into AudioTrack is of the MUSIC type.

After receiving the audio data from the audio app, AudioFlinger may identify a specific type of the audio data 1 by reading the mode parameter in AudioTrack. Further, AudioFlinger may send a query request to AudioPolicy, where the query request may include a type identifier (for example, 01) of the audio data 1, to request AudioPolicy to query whether the slave device (that is, the first slave device) currently connected to the mobile phone is allowed to play the audio data 1 whose type identifier is 01.

After receiving the query request sent by AudioFlinger, AudioPolicy may query, based on the type identifier of the audio data in the query request, the device selection policy that corresponds to the first slave device and that is delivered by the DV app, to determine whether the first slave device is allowed to play the audio data 1. If the first slave device is allowed to play the audio data 1, the mobile phone may continue to perform step S3404; or if the first slave device is not allowed to play the audio data 1, the mobile phone may continue to perform steps S3405 and S3406.

In some other embodiments, the DV app in the mobile phone may alternatively deliver device selection policies corresponding to various audio output devices to Audio-Policy in advance. After the DV app establishes the network connection to the first slave device, the DV app may indicate an identifier of the first slave device to AudioPolicy. In this way, AudioPolicy may determine a device type of the first slave device based on the identifier of the first slave device. Further, AudioPolicy may find a device selection policy corresponding to the device type of the first slave device from the device selection policies corresponding to the audio output devices, and determine the found device selection policy as the device selection policy corresponding to the first slave device. Alternatively, a device selection policy corresponding to each audio output device may be pre-stored in AudioPolicy, and the DV app does not need to deliver the device selection policy corresponding to the audio output device to AudioPolicy. This is not limited in this embodiment of this application.

S3404: If the first slave device is allowed to play the first audio data, AudioPolicy indicates AudioFlinger to send the first audio data to the first slave device.

An example in which the first slave device is the sound box 1 is still used. Refer to the device selection policy 1 shown in Table 6. If the audio data 1 currently generated by the audio app is of the MUSIC or RING type, AudioPolicy may determine that the sound box 1 is allowed to play the audio data 1. For example, when the audio app is Music, audio data 1 generated when the mobile phone runs Music to play a song is of the MUSIC type. After receiving the audio data 1, AudioFlinger may request AudioPolicy to query whether the audio data 1 of the MUSIC type is played by the sound box 1. In this case, AudioPolicy may determine, according to the device selection policy shown in Table 6, that the audio data 1 may be played by the slave device (that is, the sound box 1) of the mobile phone. Further, AudioPolicy may send a first indication message to AudioFlinger, to indicate AudioFlinger to send the currently generated audio data 1 to the sound box.

Therefore, still as shown in FIG. 37, after AudioFlinger receives the first indication message sent by AudioPolicy, AudioFlinger may invoke the DMSDP audio HAL 3701 corresponding to the sound box 1 at the HAL, and send the audio data 1 to the sound box 1 by using the DMSDP audio HAL 3701, and the sound box 1 plays the audio data 1 of the MUSIC type.

Certainly, before sending the audio data 1 to the sound box 1 by using the DMSDP audio HAL 3701, AudioFlinger may further perform processing such as parsing, sampling, encoding, decoding, encapsulation, or decapsulation on the audio data 1, and send processed audio data 1 to the sound box 1. Similarly, after receiving the audio data 1 sent by the mobile phone, the sound box 1 may also perform processing such as parsing, sampling, encoding, decoding, encapsulation, or decapsulation on the audio data 1, and then play processed audio data 1. This is not limited in this embodiment of this application.

S3405: If the first slave device is not allowed to play the first audio data, AudioPolicy determines, according to the device selection policy corresponding to the first slave device, that a first device plays the first audio data.

S3406: AudioPolicy indicates AudioFlinger to send the first audio data to the first device.

Corresponding to step S3404, in steps S3405 and S3406, an example in which the first slave device is the sound box 1 is still used. Refer to the device selection policy 1 corresponding to the sound box 1 shown in Table 6. If the audio data 1 currently generated by the audio app is of the SYSTEM or NOTIFICATION type, AudioPolicy may determine that the sound box 1 is not allowed to play the audio data 1.

Figure 39:
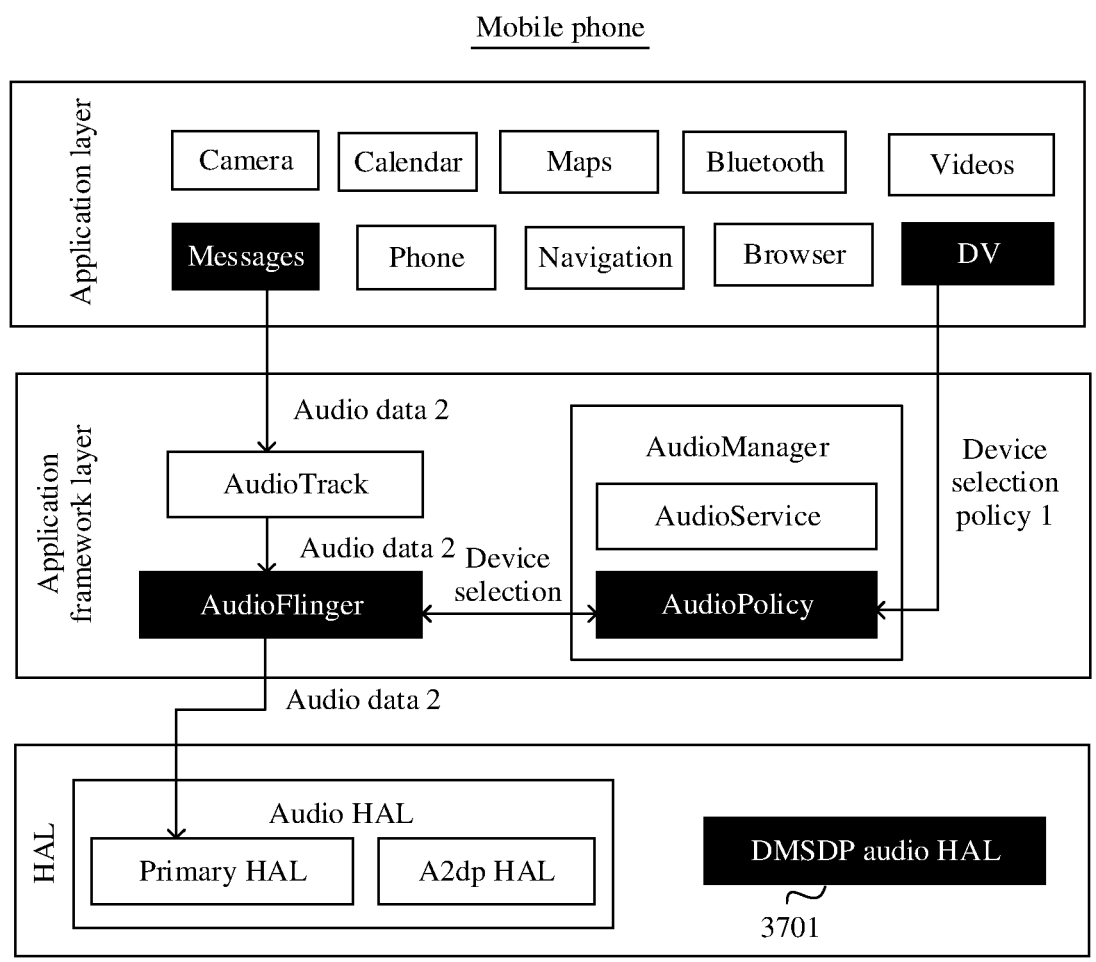
FIG. 39 is a schematic diagram 38 of an audio application scenario according to an embodiment of this application.

For example, as shown in FIG. 39, when the mobile phone runs Messages, if Messages receives a new SMS message, Messages may be used as an audio app to input a generated SMS message prompt tone (that is, audio data 2) into AudioFlinger by using AudioTrack, and Messages may set a type of the audio data 2 to NOTIFICATION in AudioTrack. After receiving the audio data 2, AudioFlinger may request AudioPolicy to query whether the sound box 1 is allowed to play the audio data 2 of the NOTIFICATION type. Further, AudioPolicy may determine, according to the device selection policy 1 shown in Table 6, that the sound box 1 is not allowed to play the audio data 2 of the NOTIFICATION type. In addition, AudioPolicy may further determine an audio output device corresponding to the audio data 2 in the device selection policy 1 shown in Table 6, that is, the first device that is allowed to play the NOTIFICATION type.

For example, the audio output device corresponding to the audio data of the NOTIFICATION type is set to the mobile phone in the device selection policy 1 shown in Table 6. In this case, AudioPolicy may send a second indication message to AudioFlinger, to indicate AudioFlinger to send the audio data 2 of Messages to the mobile phone. In other words, the first device that plays the audio data 2 is the mobile phone. Still as shown in FIG. 39, after receiving the second indication message sent by AudioPolicy, AudioFlinger may invoke a primary HAL corresponding to the speaker of the mobile phone at the HAL, and send, by using the primary HAL, the audio data 2 to the speaker of the mobile phone for play.

It can be learned that, after the mobile phone switches an audio function to the sound box, the mobile phone does not send all audio data generated or received by the mobile phone to the sound box 1 (that is, a slave device) for play without distinction, but the mobile phone may send, according to the device selection policy corresponding to the sound box 1, audio data of one or more types that are suitable to be played by the sound box 1 to the sound box 1 for play, and send other audio data to another audio output device for play. In this way, when performing audio switching, the mobile phone may accurately control an output flow direction of audio data of each type based on a device feature of a slave device, and selectively switch audio data to a corresponding audio output device for play, so as to filter out, for the user, some audio data that is not suitable to be played by a current slave device of the mobile phone.

In some embodiments, if the device selection policy 1 corresponding to the sound box 1 (that is, a slave device) sets that the audio data 2 of the NOTIFICATION type is not allowed to be played, when determining the first device that plays the audio data 2, AudioPolicy may further dynamically determine, according to a specific selection policy, a current audio output device corresponding to the audio data 2. For example, AudioPolicy may determine, according to a last-access-last-priority principle, an audio output device that is connected to the mobile phone most recently other than the sound box as the audio output device corresponding to the audio data 2, that is, the first device that plays the audio data 2.

Figure 40:
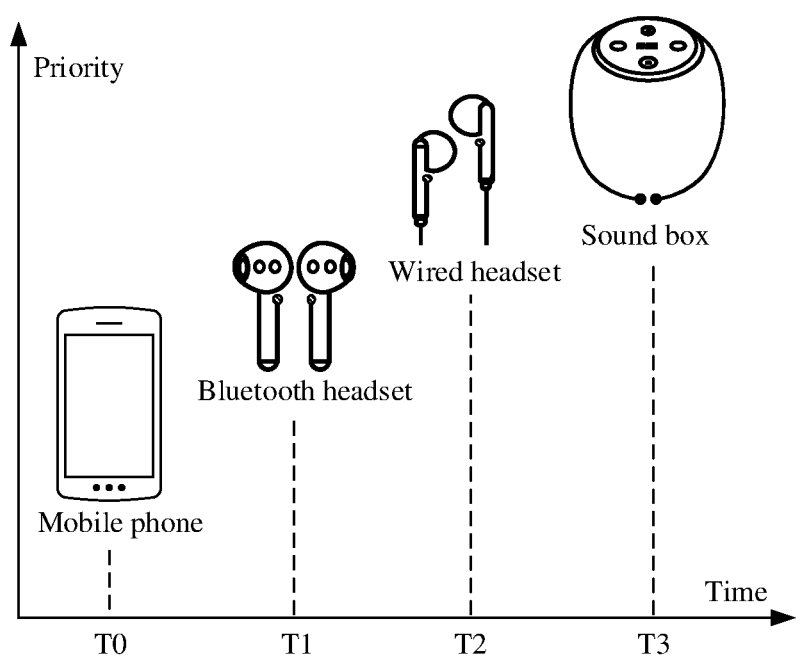
FIG. 40 is a schematic diagram 39 of an audio application scenario according to an embodiment of this application.

For example, as shown in FIG. 40, an audio output device of the mobile phone is the mobile phone from a moment T0, that is, audio is played by the speaker of the mobile phone. At a moment T1 (T1>T0), if the mobile phone is connected to a Bluetooth headset, the audio output device of the mobile phone is currently updated to the Bluetooth headset. At a moment T2 (T2>T1), if the user inserts a wired headset into a headset jack of the mobile phone, the audio output device of the mobile phone is currently updated to the wired headset. At a moment T3 (T3>T2), if the user selects the sound box 1 as a slave device for the mobile phone to perform audio switching, the mobile phone is triggered to establish a network connection to the sound box 1, and the audio output device of the mobile phone is currently updated to the sound box 1.

It can be learned that a later time indicates a higher priority of the audio output device that is connected to the mobile phone (that is, an audio output device that is connected to the mobile phone most recently). Therefore, when the audio data 2 is not allowed to be played by the sound box 1, AudioPolicy may select an audio output device with a highest priority other than the sound box 1 as an audio output device for playing the audio data 2, that is, select the wired headset to play the audio data 2. Further, AudioPolicy may indicate AudioFlinger to send the audio data 2 to the wired headset for play. Certainly, a person skilled in the art may set, based on actual experience or an actual application scenario, a device selection policy corresponding to an audio output device. This is not limited in this embodiment of this application.

By performing steps S3401 to S3406, after the mobile phone serves as a master device and establishes the network connection to the first slave device, the mobile phone may dynamically and selectively switch, according to the device selection policy corresponding to the first slave device, audio data of different types generated by the audio app in the mobile phone to the first slave device for play, so as to filter out, for the user, some audio data that is not suitable to be played by the first slave device. This provides good user audio experience.

Subsequently, if the user changes the first slave device connected to the mobile phone to a second slave device, similar to the process in which the mobile phone switches audio data to the first slave device for play, the mobile phone may further switch, according to a device selection policy corresponding to the second slave device, audio data currently generated by the audio app to the second slave device for play.

Figure 41:
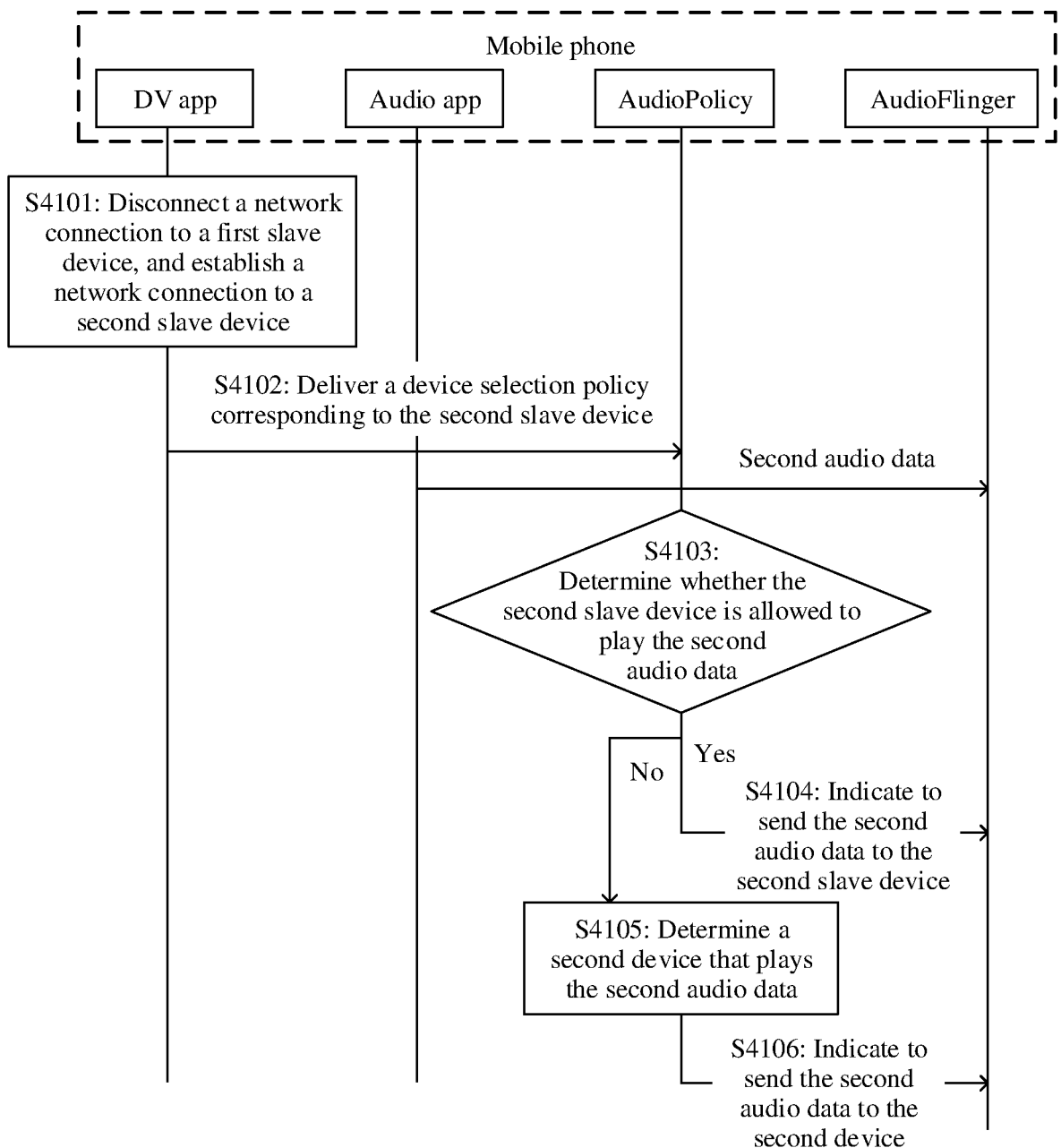
FIG. 41 is a schematic interaction diagram 3 of an audio control method according to an embodiment of this application.

For example, as shown in FIG. 41, the mobile phone may perform steps S4101 to S4106 to switch audio data to the second slave device for play.

S4101: The mobile phone disconnects the network connection to the first slave device, and establishes a network connection to the second slave device by running the DV app.

Figure 42:
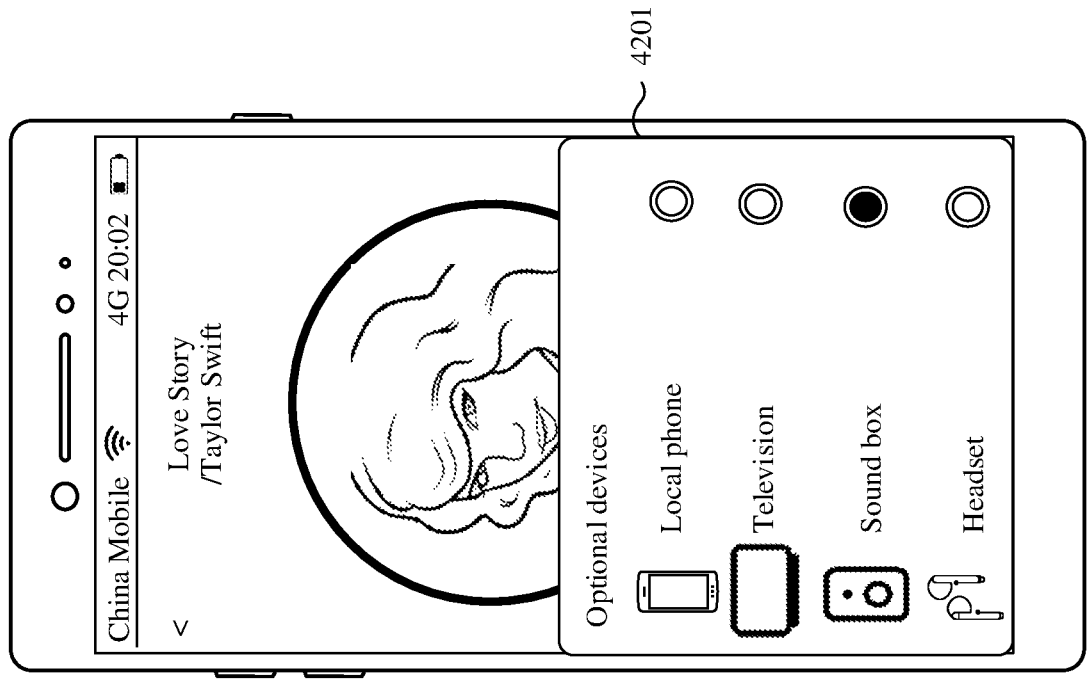
FIG. 42 is a schematic diagram 40 of an audio application scenario according to an embodiment of this application.
Figure 42:
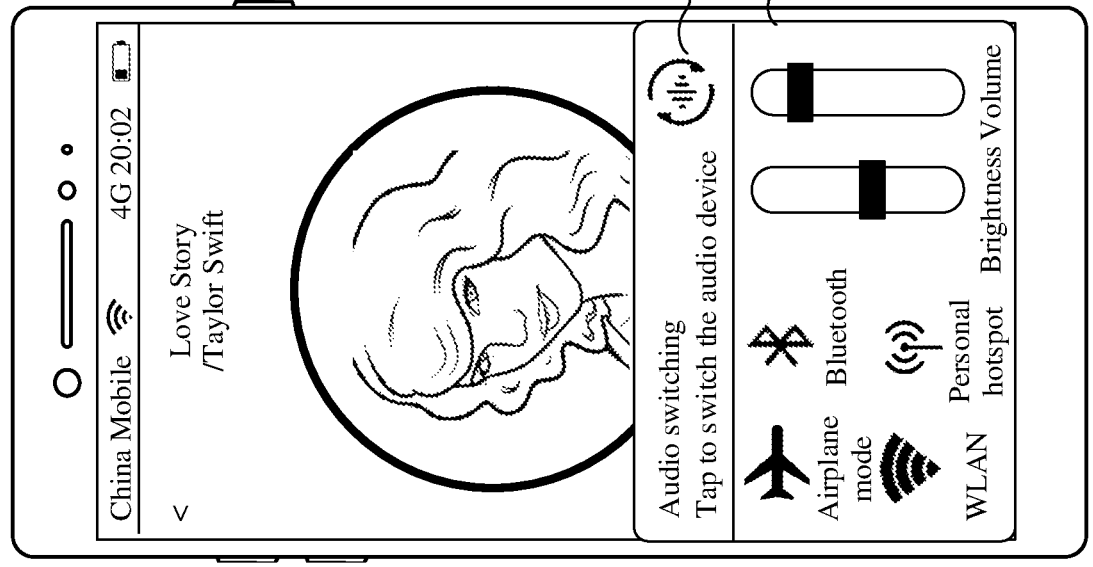

An example in which the first slave device is the sound box 1 is still used. After the mobile phone switches the audio function to the sound box 1, the user may further manually change, in the mobile phone, a slave device that currently performs audio switching with the mobile phone. For example, as shown in (a) in FIG. 42, in response to an operation that the user opens a control center, the mobile phone may display a control center 4201. The control center 4201 includes a switching button 4202 for an audio switching function. When the user wants to change a current slave device of the mobile phone, the user may tap the switching button 4202 to query one or more candidate devices that can be currently used as slave devices of the mobile phone. As shown in (b) in FIG. 42, after the mobile phone detects that the user taps the switching button 4202, the mobile phone may display one or more detected candidate devices in the control center 4201. In this case, the user may select a slave device (that is, the second slave device) in the control center 4201 to perform audio switching with the mobile phone.

Alternatively, if the mobile phone detects that the user enables a projection function of the mobile phone, because the mobile phone needs to simultaneously switch audio and an image to another device for play during projection, that is, audio switching also needs to be performed during projection, in response to the operation that the user enables the projection function, the mobile phone may change a slave device that performs audio switching with the mobile phone.

Figure 43:
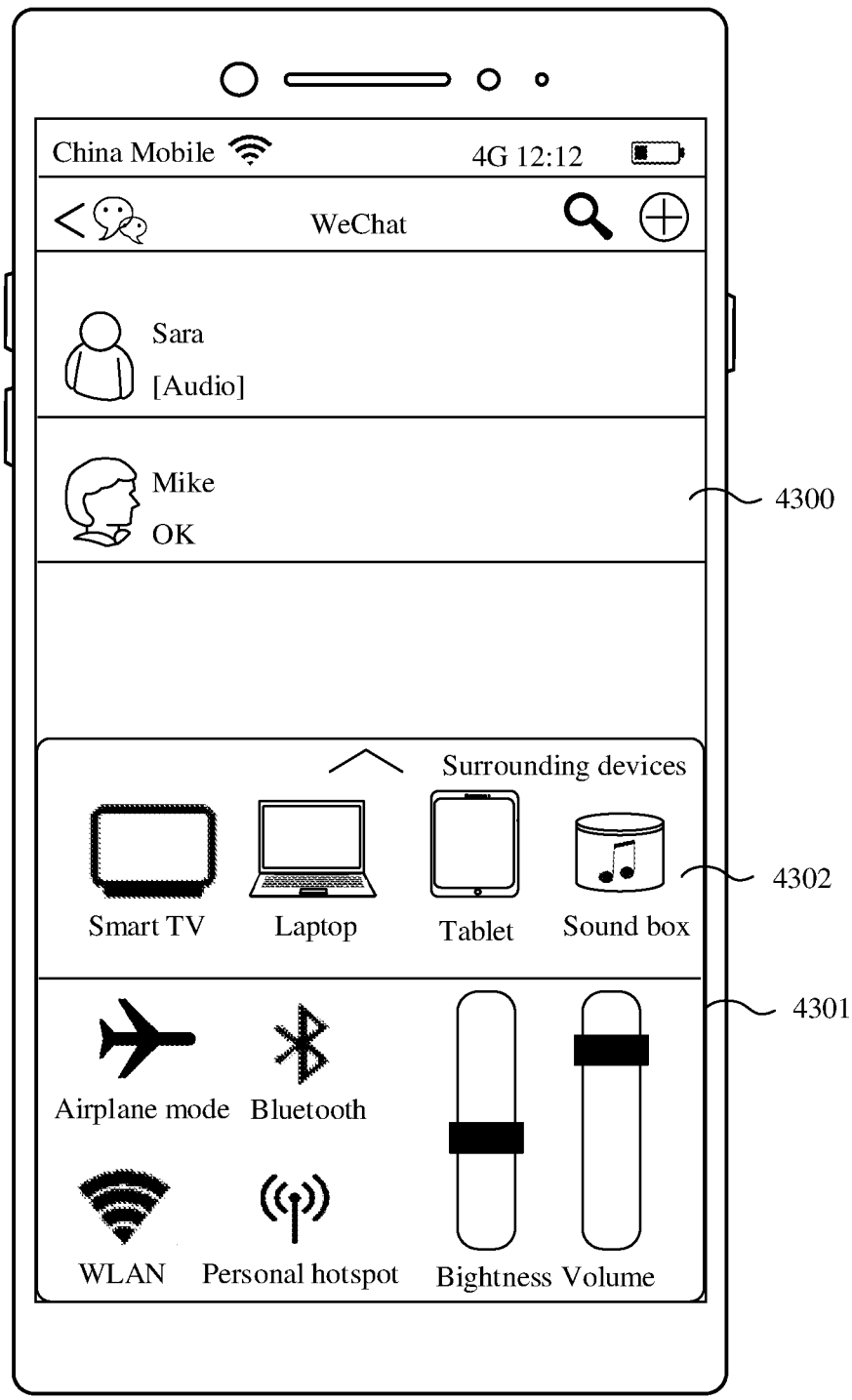
FIG. 43 is a schematic diagram 41 of an audio application scenario according to an embodiment of this application.

For example, as shown in FIG. 43, when running WeChat, the mobile phone may display an application interface 4300 of WeChat. On the application interface 4300, the user may open a dialog interface with a contact (for example, Sara or Mike), and listen to audio sent by the user or the contact. If the user needs to use the projection function, still as shown in FIG. 43, the user may open a control center 4301 of the mobile phone on the application interface 4300. A card 4302 may be disposed in the control center 4301, and the card 4302 is used to display one or more nearby candidate devices that can perform projection and that are detected by the mobile phone. If the mobile phone has enabled the projection function, the mobile phone may further identify, in the card 4302 in a manner such as highlighting, a device that currently performs projection with the mobile phone. If it is detected that the user selects an electronic device (for example, a television) in the card 4302, it indicates that the user wants to enable the projection function, and an image and audio that are currently generated by the mobile phone are projected to the television. In this case, the mobile phone may disconnect the established network connection to the sound box 1 (that is, the first slave device), and establish a network connection to the television by using the television as the second slave device.

Figure 44A:
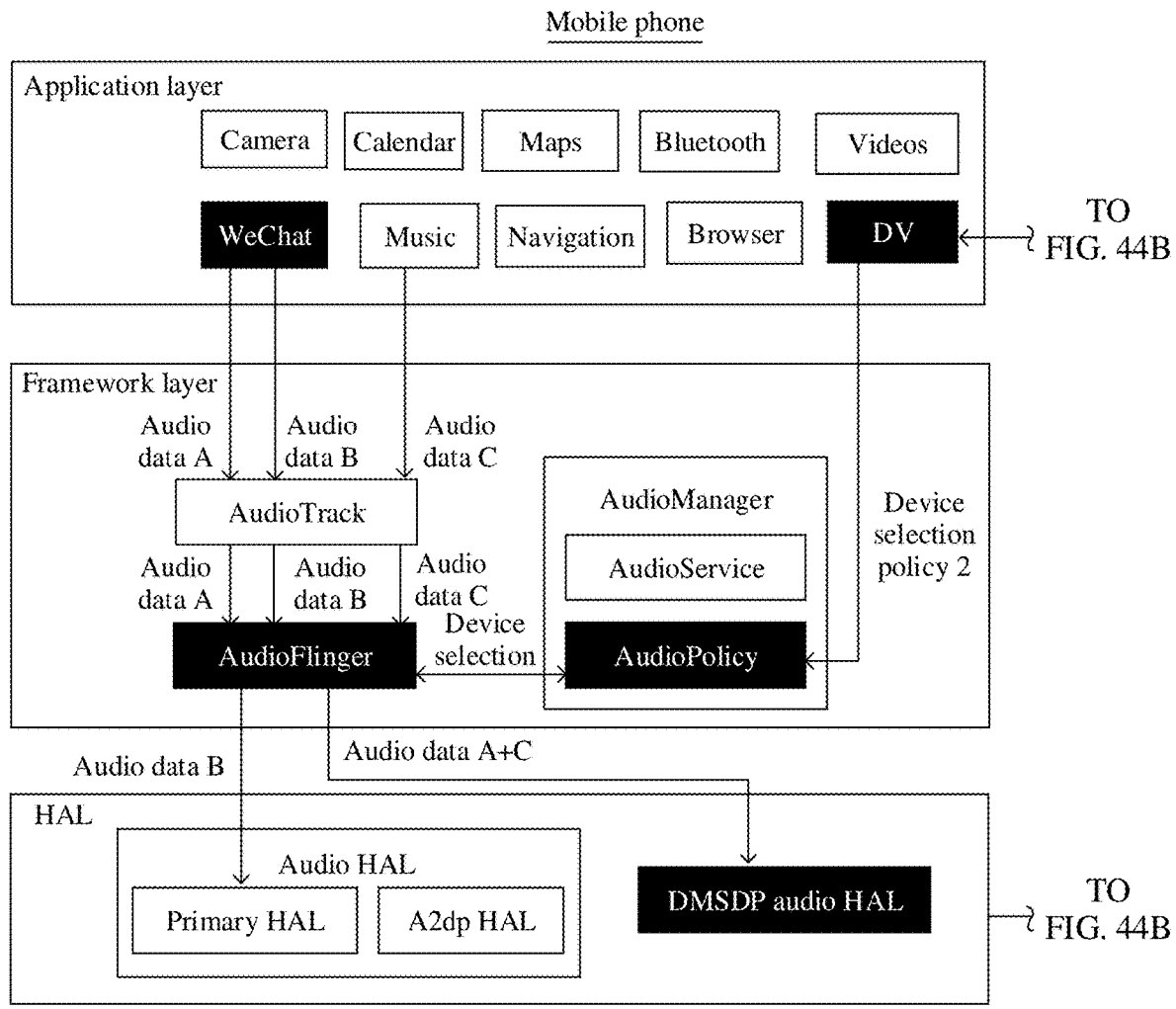
FIG. 44A and FIG. 44B are a schematic diagram 42 of an audio application scenario according to an embodiment of this application.
Figure 44B:
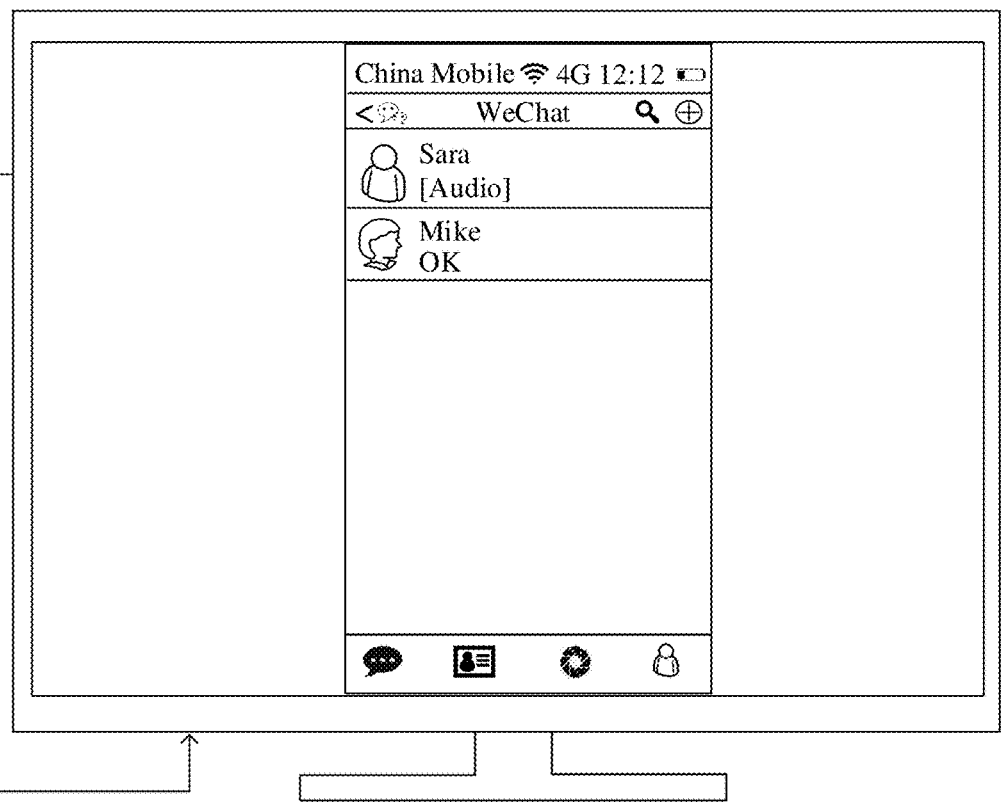

In addition, similar to step S3401, as shown in FIG. 44A and FIG. 44B, the DV app in the mobile phone may obtain an audio capability parameter of the television, and create a corresponding DMSDP audio HAL at the HAL based on the audio capability parameter of the television. Alternatively, the mobile phone may update, based on the audio capability parameter of the television, the DMSDP audio HAL created for the sound box in step S3401, so that an updated DMSDP audio HAL matches an audio capability of the television. Subsequently, during projection, the mobile phone may transmit audio data to the television by using the updated DMSDP audio HAL. In addition, during projection, the mobile phone may send, in an existing projection manner, display data (for example, the application interface 4300 of WeChat) in the mobile phone to the television for display. This is not limited in this embodiment of this application.

S4102: The DV app in the mobile phone delivers the device selection policy corresponding to the second slave device to AudioPolicy.

Similar to step S3402, after the mobile phone determines the television as a current slave device (that is, the second slave device) and establishes the network connection, still as shown in FIG. 44A and FIG. 44B, the DV app may deliver a device selection policy (that is, a device selection policy 2) corresponding to the television to AudioPolicy. For example, the DV app may obtain an identifier of the television, so as to determine that the currently connected second slave device is a large-screen device. Further, the DV app may use a device selection policy that is pre-stored for the large-screen device as the device selection policy 2 corresponding to the television and deliver the device selection policy 2 to AudioPolicy. Subsequently, AudioPolicy may determine, according to the device selection policy 2 corresponding to the television, a specific audio output device corresponding to current audio data in the mobile phone.

For example, the device selection policy 2 corresponding to the television may be shown in Table 8. A difference from the device selection policy 1 shown in Table 6 is that identifiers such as application package names (Package Name) of one or more applications may be further set in the device selection policy 2 corresponding to the television. In other words, the mobile phone may further set, in the device selection policy 2, capabilities of different applications to play audio data of different types. For example, for WeChat, the television allows WeChat to play audio data of a MUSIC type and audio data of a COMMUNICATION type, and does not allow WeChat to play audio data of a NOTIFICATION type and audio data of a DTMF type. For Videos, the television allows WeChat to play the audio data of the MUSIC type and the like. A specific application included in the device selection policy 2 may be preset by a developer. Alternatively, each time the user installs a new application in the mobile phone, the mobile phone may obtain device selection policies corresponding to the application in different audio output devices from the server. In this way, the mobile phone may dynamically update a device selection policy corresponding to each audio output device based on an application installed in the mobile phone. This is not limited in this embodiment of this application.

TABLE 8

| Slave device | Package name | Type | Allowed to play or not | Audio output device |
| --- | --- | --- | --- | --- |
| Television | WeChat | MUSIC (music) | Yes | Television |
| | | COMMUNICATION (communication) | Yes | Television |
| | | NOTIFICATION (notification) | No | Mobile phone |
| | | DTMF (dual-tone multifrequency) | No | Mobile phone |
| | | . . . | . . . | . . . |
| | Videos | MUSIC (music) | Yes | Television |
| | | . . . | . . . | . . . |

In this way, when the mobile phone runs WeChat, audio or media audio generated by WeChat may be switched to the television for play, and a message prompt tone and a keypad tone generated by WeChat may be split into the mobile phone for play, so as to prevent the message prompt tone and the keypad tone generated by WeChat from disturbing projection of the mobile phone to the television. It can be learned that the mobile phone may output, at a granularity of an application according to a device selection policy, audio data of different types generated by one application to a corresponding audio output device for play, so that different audio output devices can pertinently play audio data of a specific type in a specific application. This improves user audio experience.

In some other embodiments, a device selection policy shown in Table 9 may alternatively be set in AudioPolicy. In the device selection policy, for different applications, audio output devices corresponding to audio data of different types are set for each application. For example, when WeChat generates audio data of a MUSIC type, an audio output device corresponding to the audio data may be the mobile phone, the sound box, the television, or the headset. For another example, when Music generates audio data of a COMMUNICATION type, an audio output device corresponding to the audio data may be the mobile phone, the sound box, or the television. Subsequently, AudioPolicy may determine, according to the device selection policy shown in Table 9, audio output devices corresponding to audio data of various types generated by a running audio app.

TABLE 9

| Package name | Type | Audio output device |
| --- | --- | --- |
| WeChat | MUSIC (music) | Mobile phone, sound box, television, or headset |
|  | DTMF (dual-tone multifrequency) | Mobile phone or headset |
|  | NOTIFICATION (notification) | Mobile phone or headset |
|  | ... | ... |
| Music | MUSIC (music) | Mobile phone, sound box, television, or headset |
|  | COMMUNICATION (notification) | Mobile phone, sound box, or television |
|  | NOTIFICATION | Mobile phone or headset |
|  | ... | ... |

Figure 45:
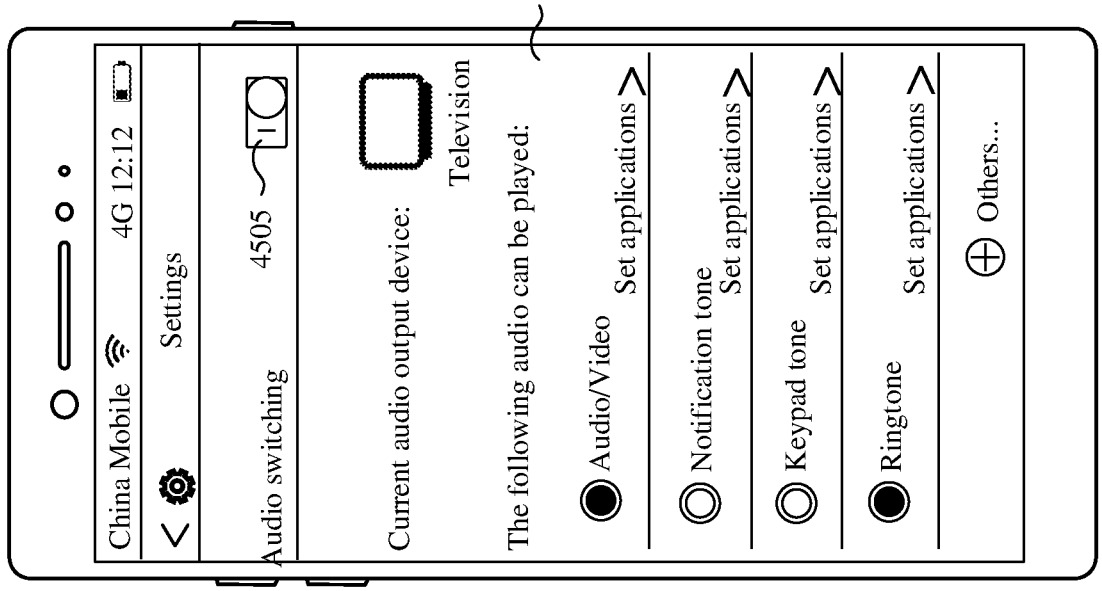
FIG. 45 is a schematic interaction diagram 4 of an audio control method according to an embodiment of this application.
Figure 45:
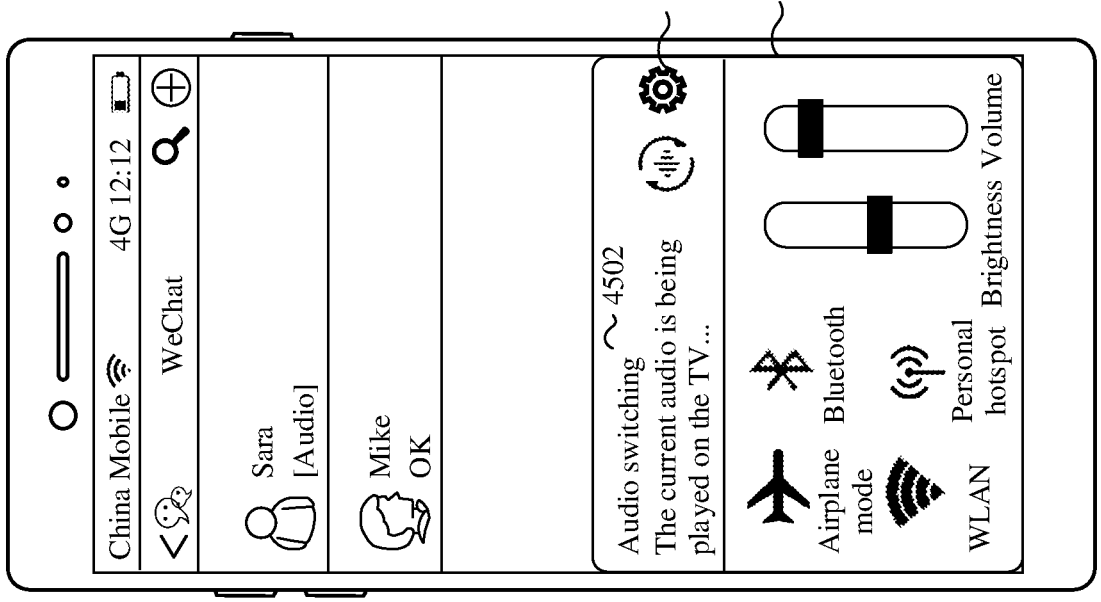

In some other embodiments, the user may alternatively manually modify a device selection policy corresponding to a current slave device in the mobile phone. As shown in (a) in FIG. 45, when the mobile phone uses the television as a slave device to switch audio data, an audio switching card 4502 may be displayed in a control center 4501, and a setting button 4503 for audio switching is disposed in the card 4502. If it is detected that the user taps the setting button 4503, as shown in (b) in FIG. 45, the DV app may display a setting interface 4504 when the television is used as a slave device. Similar to FIG. 38, an on/off button 4505 with an audio switching function may be disposed on the setting interface 4504. After the user turns on the on/off button 4505, on the setting interface 4504, the user may set a type of audio data that can be received by the television, or set a type of audio data that can be received by the television when the mobile phone runs different applications. Further, the DV app may update the device selection policy 2 corresponding to the television shown in Table 8 based on user selection on the setting interface 4504, so that the user can dynamically specify a type of audio data that is output by each audio output device.

S4103: When the mobile phone runs an audio app, AudioPolicy determines, according to the device selection policy corresponding to the second slave device, whether the second slave device is allowed to play second audio data from the audio app.

Similar to step S3403, still as shown in FIG. 44A and FIG. 44B, AudioFlinger may receive audio data generated by different audio apps. After the slave device of the mobile phone is switched from the sound box 1 to the television, AudioFlinger may request AudioPolicy to query whether currently received audio data is allowed to be played by the television. Further, AudioPolicy may determine, according to the device selection policy 2 corresponding to the television, whether the current audio data is allowed to be played by the television.

Figure 46:
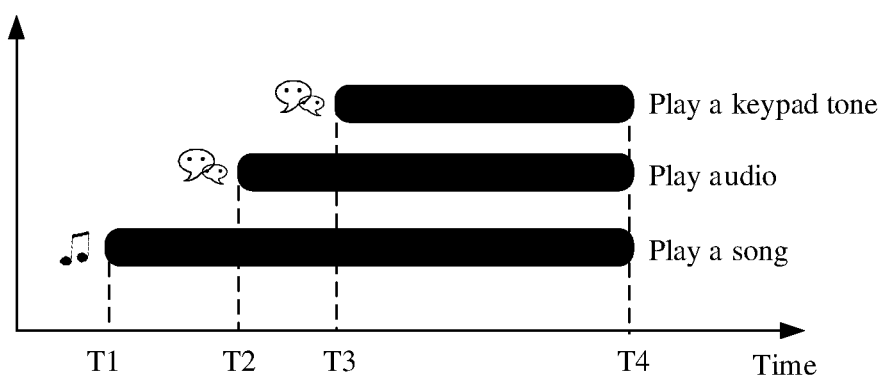
FIG. 46 is a schematic diagram 43 of an audio application scenario according to an embodiment of this application.

In some scenarios, AudioFlinger may simultaneously receive a plurality of channels of audio data generated by a same audio app or different audio apps. For example, as shown in FIG. 46, at a moment T1, the user opens Music in the mobile phone and starts to play a song; at a moment T2 (T2>T1), the user opens a voice message sent by a contact and then starts to play audio in WeChat in the mobile phone; and at a time period from T3 to T4 (T4>T3>T2), a keypad tone starts to be played when the user taps a button on a keypad in WeChat. In this case, AudioFlinger in the mobile phone may simultaneously receive audio data A of the COMMUNICATION type and audio data B of the DTMF type from WeChat and audio data C of the MUSIC type from Music in the time period from T3 to T4. Still as shown in FIG. 44A and FIG. 44B, AudioFlinger may request AudioPolicy to query whether the audio data A, the audio data B, and the audio data C are allowed to be played by the television. Further, AudioPolicy may determine, according to the device selection policy 2 shown in Table 8, whether the current audio data A, audio data B, and audio data C are allowed to be played by the television.

S4104: If the second slave device is allowed to play the second audio data, AudioPolicy indicates AudioFlinger to send the second audio data to the second slave device.

Similar to step S3404, still as shown in FIG. 44A and FIG. 44B, AudioPolicy may determine, according to the device selection policy 2 shown in Table 8, that the television is allowed to play the audio data A of the COMMUNICATION type and the audio data C of the MUSIC type, but is not allowed to play the audio data B of the DTMF type. In this case, AudioPolicy may send a first indication message to AudioFlinger, to indicate AudioFlinger to send the audio data A and the audio data C to the sound box. Further, in response to the first indication message, AudioFlinger may mix the two channels of audio data, namely, the audio data A and the audio data C, into audio data A+C, and then send the mixed audio data A+C to the television by using the DMSDP audio HAL. Alternatively, AudioFlinger may not mix the audio data A and the audio data C, and send the audio data A and the audio data C that are not mixed to the television by using the DMSDP audio HAL, and the television plays the audio data A from WeChat and the audio data C from Music during projection.

S4105: If the second slave device is not allowed to play the second audio data, AudioPolicy determines, according to the device selection policy corresponding to the second slave device, that a second device plays the second audio data.

S4106: AudioPolicy indicates AudioFlinger to send the second audio data to the second device.

In steps S4105 and S4106, still as shown in FIG. 44A and FIG. 44B, AudioPolicy may determine, according to the device selection policy 2 shown in Table 8, that the television is not allowed to play the audio data B of the DTMF type. In this case, AudioPolicy may further determine, in the device selection policy shown in Table 8, a specific audio output device that is allowed to play the DTMF type, that is, the second device that plays the audio data B.

For example, the audio output device corresponding to the audio data of the DTMF type in WeChat is set to the mobile phone in the device selection policy shown in Table 8. In this case, AudioPolicy may send a second indication message to AudioFlinger, to indicate AudioFlinger to send the currently generated audio data B to the mobile phone. Therefore, still as shown in FIG. 44A and FIG. 44B, after responding to the second indication message, AudioFlinger may invoke a primary HAL corresponding to the speaker of the mobile phone at the HAL, and send, by using the primary HAL, the audio data B to the speaker of the mobile phone for play.

By performing steps S4101 to S4106, after the mobile phone serves as a master device and establishes the network connection to the second slave device, the mobile phone may dynamically and selectively switch, according to the device selection policy corresponding to the second slave device, audio data of different types generated by the audio app in the mobile phone to the second slave device for play, so as to filter out, for the user, some audio data that is not suitable to be played by the second slave device. This provides good user audio experience.

In a distributed audio scenario, a master device (for example, the foregoing mobile phone) may simultaneously generate a plurality of channels of audio data. For example, when the mobile phone runs Maps, Maps may generate a navigation voice in a navigation mode, the mobile phone may further simultaneously run Music to play a song. In this case, the mobile phone may simultaneously play a navigation voice (that is, audio data 1) from Maps and a song (that is, audio data 2) from Music. Subsequently, if Messages in the mobile phone receives a new SMS message, the mobile phone further needs to play an SMS message prompt tone (that is, audio data 3). In this case, in addition to the audio data 1 and the audio data 2, the mobile phone may further simultaneously play the audio data 3.

In this embodiment of this application, the mobile phone serving as a master device may send generated audio data to one or more slave devices for play, so as to implement a function of audio switching between a plurality of devices. Therefore, when the mobile phone needs to output a plurality of channels of audio data, the mobile phone may mix the plurality of channels of audio data, and then output mixed audio data to a slave device for play. However, the plurality of channels of audio data are distorted after the mixing, and consequently the mixed audio data that is played by the slave device is also distorted.

Figure 47:
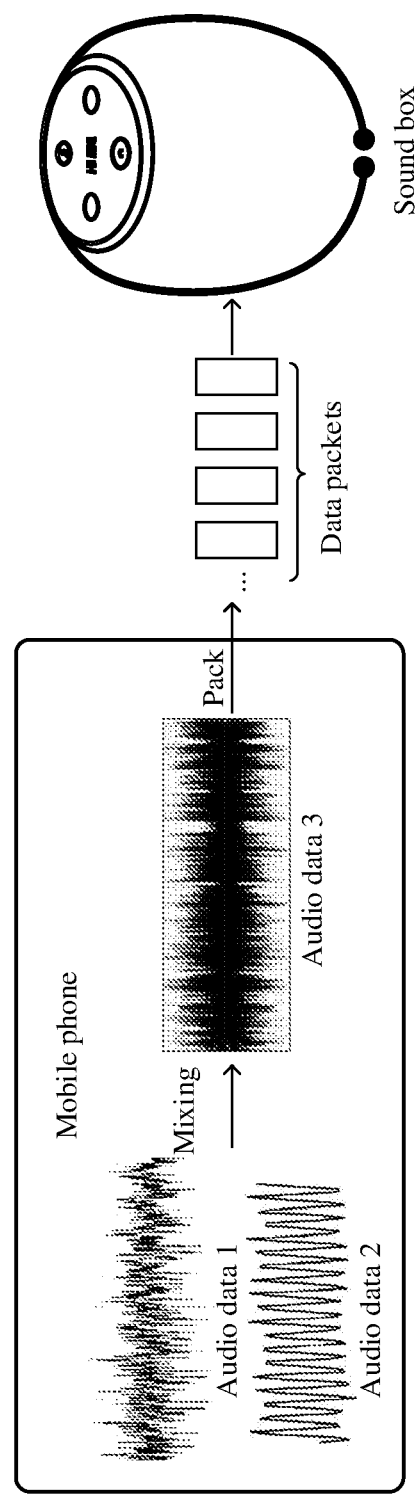
FIG. 47 is a schematic diagram 44 of an audio application scenario according to an embodiment of this application.

For example, an audio output device (that is, a slave device) of the mobile phone may be the sound box. The mobile phone may simultaneously generate the audio data 1 and the audio data 2 during running. In the conventional technology, as shown in FIG. 47, when projecting the audio data 1 and the audio data 2 to the sound box, the mobile phone first needs to mix the audio data 1 and the audio data 2, so that audio signals in the audio data 1 and the audio data 2 are superimposed, to obtain mixed audio data 3. Subsequently, the mobile phone may pack the audio data 3 into data packets and send the data packets to the sound box.

After obtaining the audio data 3 by parsing each data packet, the sound box may play corresponding audio.

After mixing, a plurality of channels of audio data may be converted into one channel of audio data. However, in the mixing process, due to processing such as sampling, audio features of the audio data 1 and the audio data 2 that exist before the mixing cannot be completely retained in the mixed audio data 3. For example, audio features such as loudness and frequency of the audio data 1 or the audio data 2 change in the mixed audio data 3, and consequently the audio data 3 is distorted. In other words, a component of the audio data 1 in the audio data 3 may deviate from the audio data 1 that is not mixed, and consequently an audio feature of the audio data 1 that is not mixed is different from an audio feature of the audio data 1 included in the mixed audio data 3. Similarly, a component of the audio data 2 in the audio data 3 may deviate from the audio data 2 that is not mixed, and consequently an audio feature of the audio data 2 that is not mixed is different from an audio feature of the audio data 2 included in the mixed audio data 2. Consequently, distortion occurs when the sound box plays the audio data 3, and user audio experience is affected.

Therefore, in this embodiment of this application, a mixing policy may be preset in the master device (for example, the mobile phone), and the mixing policy may be used to indicate whether to allow to mix audio data of different types. For example, in a mixing policy shown in Table 1, the user generally has a high requirement on audio quality of the Music type. Therefore, it may be preset in the mixing policy that music of the MUSIC type is not allowed to be mixed with other audio data, and a notification tone of the NOTIFICATION type and a keypad tone of the DTMF type are allowed to be mixed with other audio data. Subsequently, when the mobile phone generates a plurality of channels of audio data, and the plurality of channels of audio data need to be played by a same audio output device, the mobile phone may determine, based on a type of each channel of audio data and the mixing policy shown in Table 1, audio data that does not need to be mixed and audio data that needs to be mixed.

TABLE 10

| Type | Allow to mix or not |
| --- | --- |
| NOTIFICATION (notification) | Yes |
| DTMF (dual-tone multifrequency) | Yes |
| MUSIC (music) | No |
| ... | ... |

It can be understood that only a type of audio data that is allowed to be mixed may be set in the mixing policy (for example, the mixing policy shown in Table 10). In this case, audio data of another type may be considered by default as audio data that is not allowed to be mixed. Alternatively, only a type of audio data that is not allowed to be mixed may be set in the mixing policy. In this case, audio data of another type may be considered by default as audio data that is allowed to be mixed. This is not limited in this embodiment of this application.

An example in which the mobile phone is a master device is still used. After the mobile phone establishes the network connection to the sound box, the sound box may be used as a slave device to perform audio switching. For example, audio data 1 of the MUSIC type is generated when the mobile phone runs Music. If there is only one channel of audio data, that is, the audio data 1, the mobile phone may send the audio data 1 to the sound box for play. Certainly, before sending the audio data 1, the mobile phone may further perform processing such as parsing, sampling, encoding, decoding, encapsulation, or decapsulation on the audio data 1. This is not limited in this embodiment of this application. Subsequently, in a process in which the sound box plays the audio data 1, if WeChat in the mobile phone receives a new short message, WeChat may generate audio data 2 of the NOTIFICATION type. In this case, the mobile phone needs to send two channels of audio data from WeChat and Music to the sound box.

Figure 48:
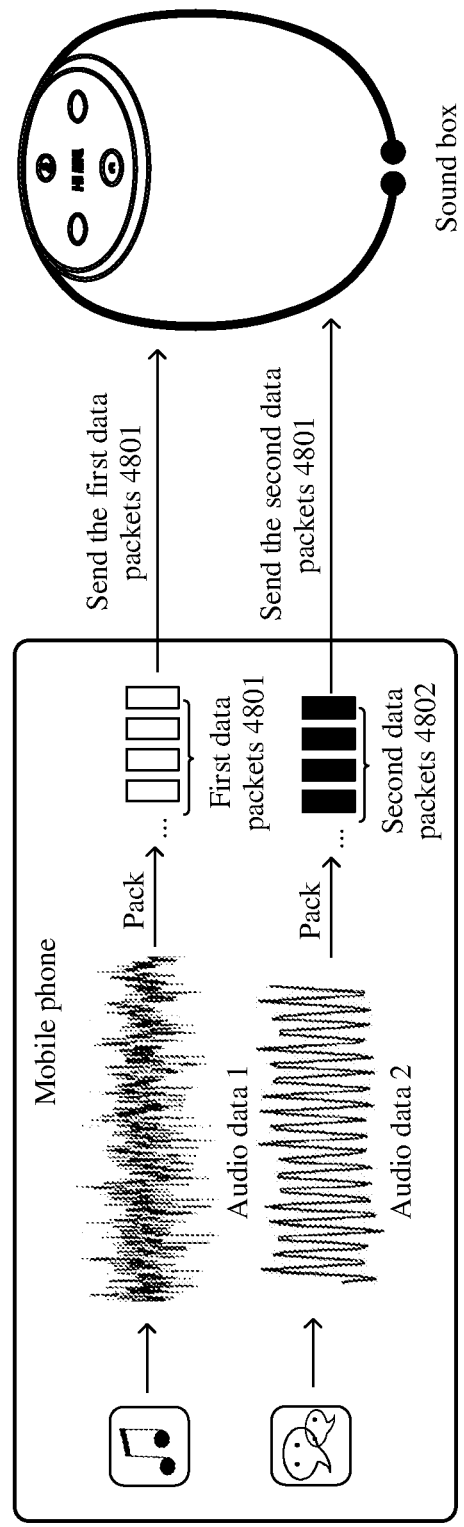
FIG. 48 is a schematic diagram 45 of an audio application scenario according to an embodiment of this application.

Therefore, the mobile phone may determine, by querying the mixing policy shown in Table 10, that the audio data 1 of the MUSIC type is not allowed to be mixed with other audio data. Therefore, the audio data 1 and the audio data 2 do not need to be mixed, that is, the two channels of audio data need to be independently transmitted to the sound box. Further, as shown in FIG. 48, the mobile phone may pack the audio data 1 from Music (which may also be referred to as encapsulation), to obtain a first data packet 4801 corresponding to the audio data 1 (there may be a plurality of first data packets 4801), and the mobile phone may simultaneously pack the audio data 2 from WeChat, to obtain a second data packet 4802 corresponding to the audio data 2 (there may be a plurality of second data packets 4802). Subsequently, the mobile phone may send the first data packet 4801 and the second data packet 4802 to the sound box, and the sound box may parse the received first data packet 4801 and second data packet 4802 to obtain the audio data 1 and the audio data 2 that are not mixed. In other words, the mobile phone may independently send the audio data 1 and the audio data 2 to the sound box, and does not need to mix the two channels of audio data.

In this way, the audio data 1 and the audio data 2 that are obtained by the sound box from the mobile phone are not mixed, so that the audio data 1 can truly reflect an audio feature of a song in Music, and the audio data 2 can also truly reflect an audio feature of a notification tone of Messages. In other words, the audio data 1 and the audio data 2 that are obtained by the sound box are not distorted because no mixing is performed by the mobile phone. This also accordingly reduces distortion that occurs when the sound box plays the audio data 1 and the audio data 2, reduces distortion of a plurality of channels of audio data during cross-device play, and improves audio output quality in an audio switching scenario.

In some embodiments, in a process of packaging the audio data 1, the mobile phone may further add feature information of the audio data 1 to the first data packet 4801. For example, an identifier of the audio data 1 is 01, a type of the audio data 1 is the MUSIC type, and a volume level of the audio data 1 is 5. The feature information can reflect an actual audio feature of the audio data 1. In this way, after parsing the first data packet 4801, the sound box can obtain the audio data 1 that is not mixed, and can further obtain the audio feature of the audio data 1 based on the feature information in the first data packet 4801. Subsequently, when playing the audio data 1, the sound box may more accurately restore the audio feature of the audio data 1 based on the feature information of the audio data 1. This reduces distortion in an audio switching process.

Similarly, in a process of packaging the audio data 1, the mobile phone may also add feature information of the audio data 2 to the second data packet 4802. In this way, the sound box can obtain the audio data 2 that is not mixed, and can further obtain the audio feature of the audio data 2 based on the feature information in the second data packet 4802. This reduces distortion in an audio switching process. A specific process in which the mobile phone packs a plurality of channels of audio data is described in detail in the following embodiments. Therefore, details are not described herein again.

Certainly, when playing the audio data 1 and the audio data 2, the sound box may also perform processing such as parsing, sampling, encoding, decoding, encapsulation, or decapsulation on the audio data 1 and the audio data 2. This is not limited in this embodiment of this application.

Figure 49:
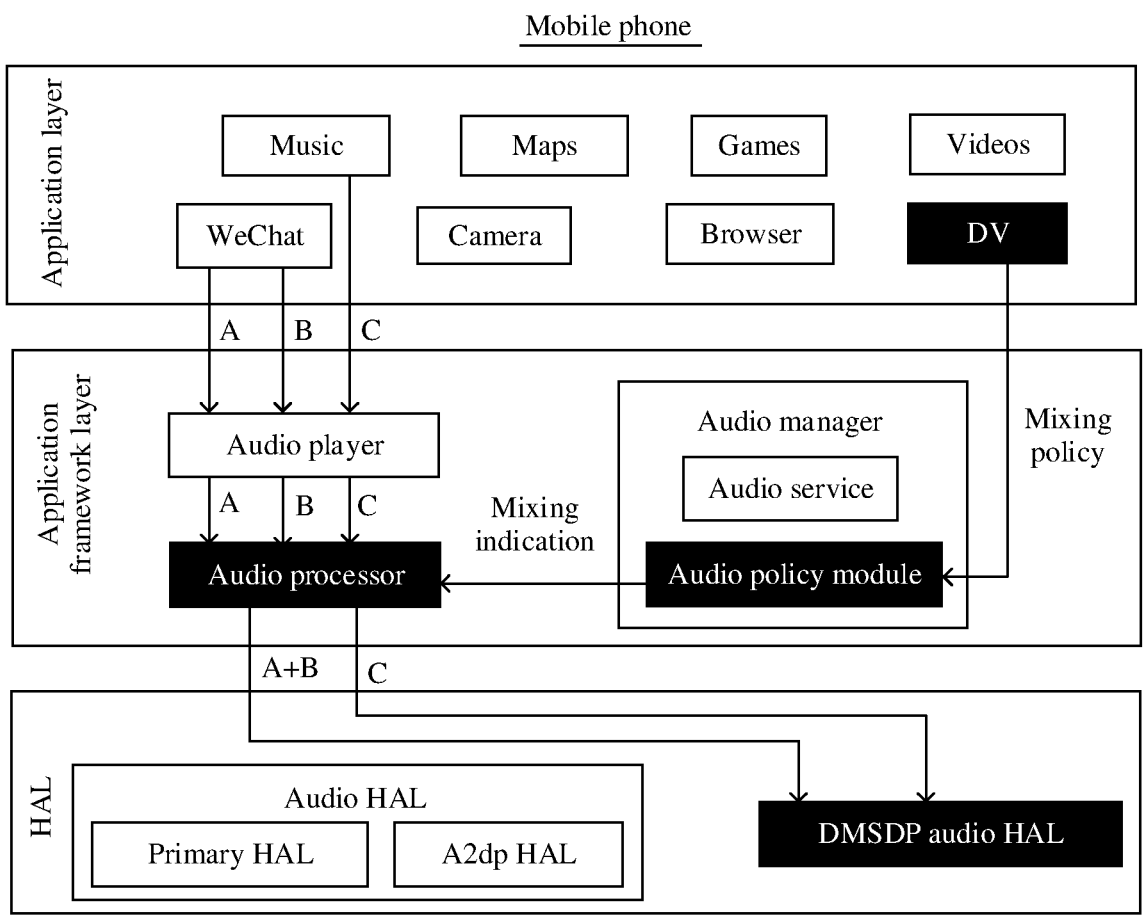
FIG. 49 is a schematic diagram 46 of an audio application scenario according to an embodiment of this application.

In this embodiment of this application, as shown in FIG. 49, after the DV app in the mobile phone creates a DMSDP audio HAL for a slave device of the mobile phone, the DV app may further deliver mixing policies corresponding to audio data of different types to AudioPolicy. For example, the DV app may deliver the mixing policy shown in Table 10 to AudioPolicy, where the mixing policy records whether to allow to mix audio data of each type.

Therefore, when AudioFlinger receives at least two channels of audio data of different types, as shown in FIG. 49, AudioFlinger requests AudioPolicy to query a plurality of channels of current audio data to determine audio data that needs to be independently transmitted and audio data that needs to be transmitted after mixing. In response to the request of AudioFlinger, AudioPolicy may determine, according to the mixing policy shown in Table 10, current audio data that needs to be independently transmitted and current audio data that needs to be transmitted after mixing.

For example, if AudioFlinger simultaneously receives the audio data A of the NOTIFICATION type, the audio data B of the DTMF type, and the audio data C of the MUSIC type, AudioFlinger may send a first request to AudioPolicy, to request AudioPolicy to determine whether the three channels of audio data need to be mixed. Further, in response to the first request, AudioPolicy may query the mixing policy shown in Table 10 to determine that the audio data C of the MUSIC type does not need to be mixed but the audio data A of the NOTIFICATION type and the audio data B of the DTMF type need to be mixed. Therefore, AudioPolicy may output a mixing indication to AudioFlinger, where the mixing indication indicates to mix the audio data A and the audio data B into one channel of audio data and not to mix the audio data C with the audio data A and the audio data B. In response to the mixing indication, AudioFlinger may mix the audio data A and the audio data B, and do not mix the audio data C. In this way, AudioFlinger may finally output two channels of audio data, where one channel of audio data is mixed audio data A+B, and the other channel of audio data is the audio data C that is not mixed.

Subsequently, AudioFlinger may invoke the DMSDP audio HAL to separately output the audio data A+B and the audio data C to the slave device for play. In this way, for music of the MUSIC type (that is, the audio data C) having a high audio requirement, the master device may independently transmit the audio data C to the slave device without mixing with other audio data, so that some audio features in the audio data C received by the slave device are not lost because the audio data C is not mixed. This avoids audio distortion caused by mixing, reduces distortion of a plurality of channels of audio data during cross-device play, and improves audio output quality in an audio switching scenario.

It can be learned that, based on the audio architecture shown in FIG. 49, the master device may preset mixing policies corresponding to audio data of various types. In this way, when the master device needs to output a plurality of channels of audio data to a slave device, the master device may select not to mix some audio data in the plurality of channels of audio data according to a mixing policy, and independently transmit the audio data to the slave device for play. This avoids distortion of audio data of a type caused by mixing, and improves audio output quality in an audio switching scenario.

The following still uses an example in which the mobile phone is a master device to describe an audio control method provided in an embodiment of this application with reference to the accompanying drawings.

Figure 50:
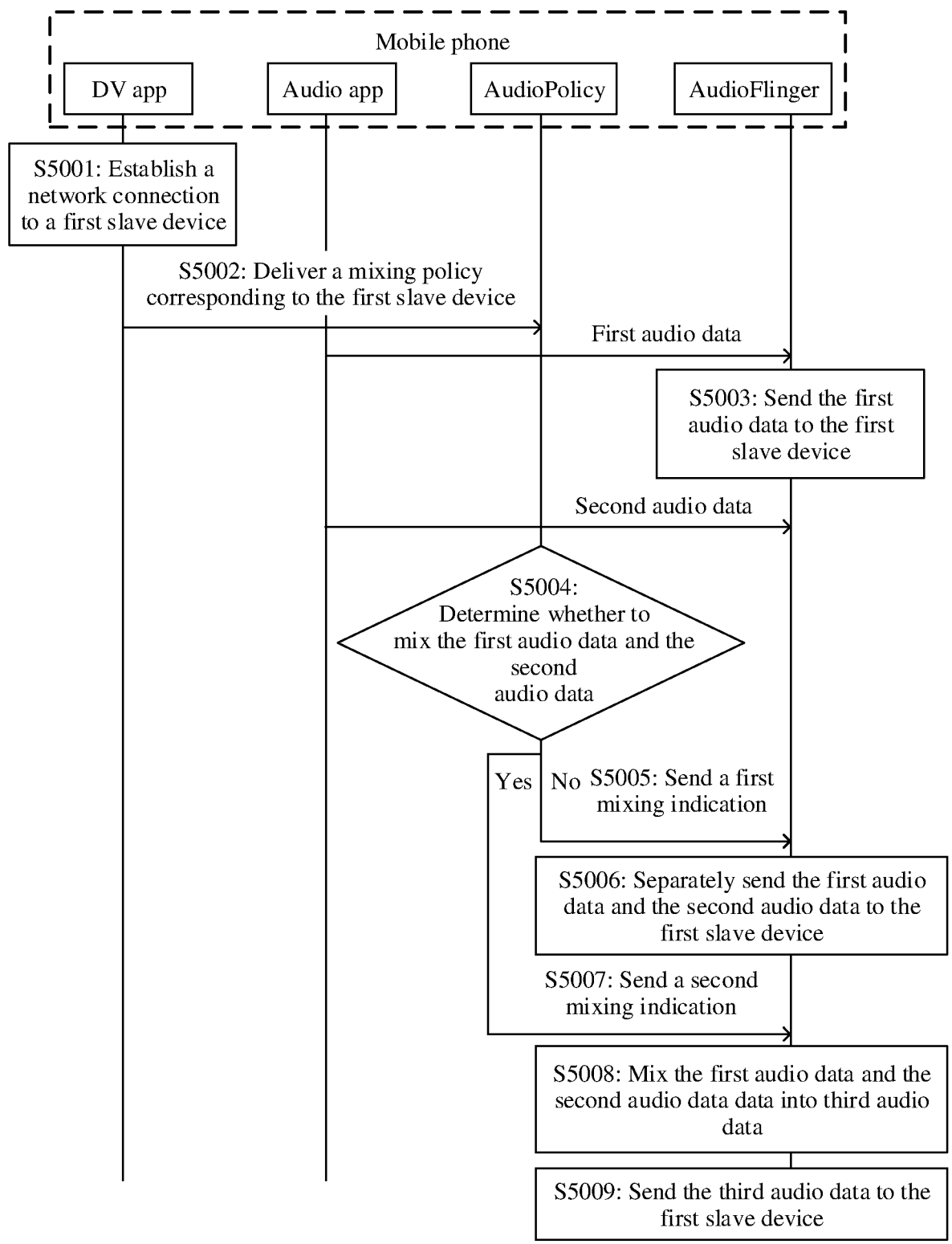
FIG. 50 is a schematic diagram 47 of an audio application scenario according to an embodiment of this application.

As shown in FIG. 50, the audio control method provided in this embodiment of this application includes the following steps.

S5001: The mobile phone establishes a network connection to a first slave device by running a DV app.

Figure 51:
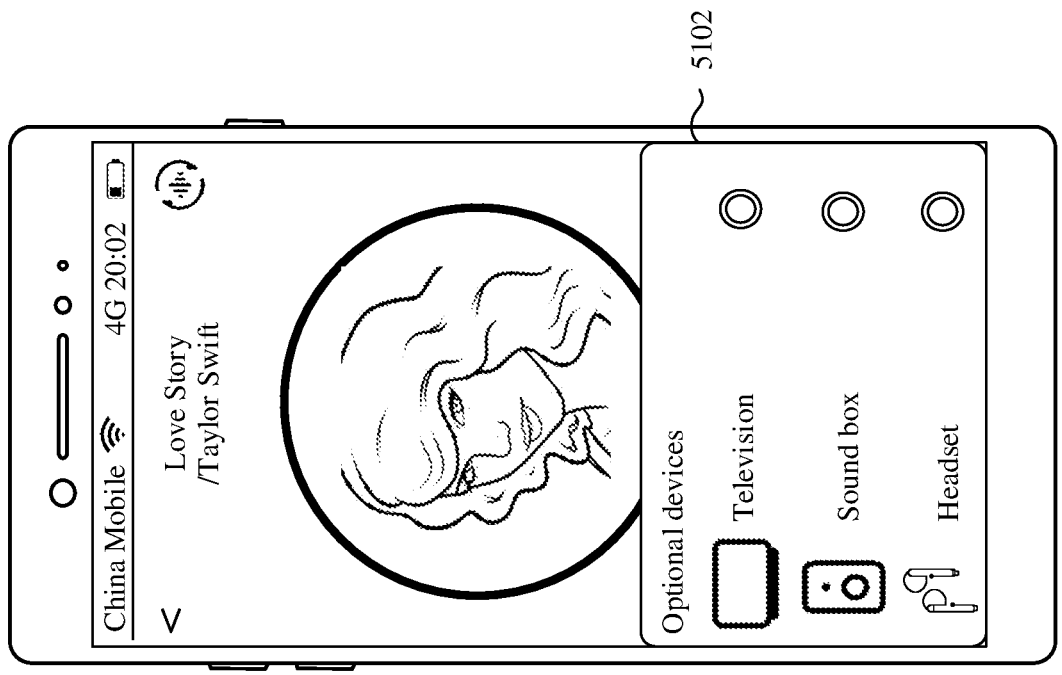
FIG. 51 is a schematic diagram 48 of an audio application scenario according to an embodiment of this application.
Figure 51:
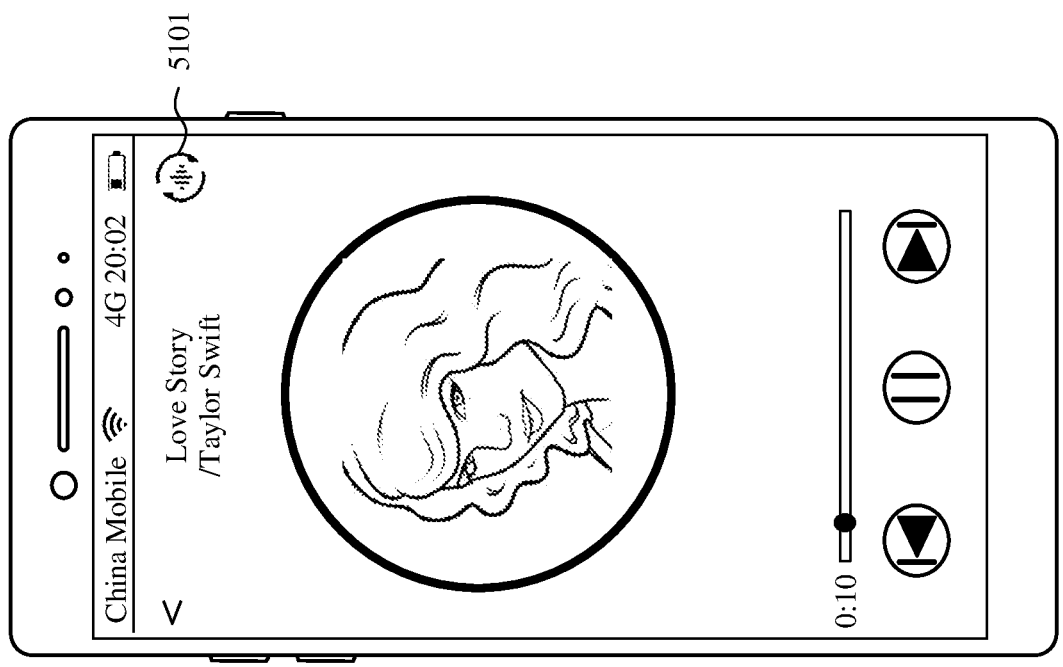

For example, a user may switch an audio output device in the mobile phone when the mobile phone outputs audio. For example, as shown in (a) in FIG. 51, when running Music, the mobile phone may display a switching button 5101 for audio switching. If it is detected that the user taps the switching button 5101, the mobile phone may run the DV app to search for one or more nearby candidate devices for audio switching. As shown in (b) in FIG. 51, the DV app may display, in a menu 5102, candidate devices that are located in a same Wi-Fi network as the mobile phone, for example, a television, a sound box, and a headset. The user may select one of these candidate devices as an audio output device when the mobile phone subsequently outputs audio, that is, a slave device of the mobile phone.

Figure 52:
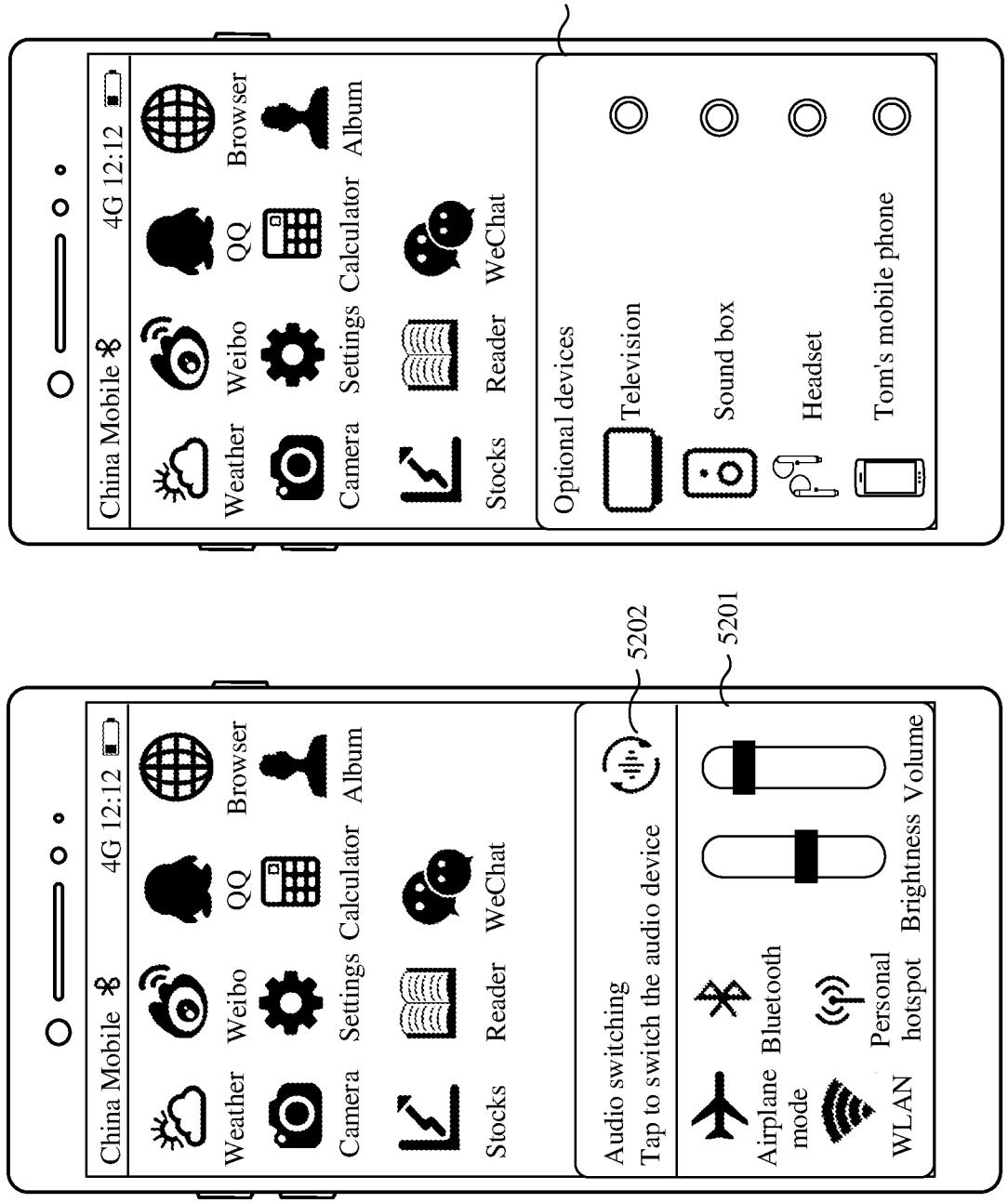
FIG. 52 is a schematic diagram 49 of an audio application scenario according to an embodiment of this application.

For another example, the user may alternatively open a control center of the mobile phone, and switch an audio output device in the control center when the mobile phone outputs audio. In response to the operation that the user opens the control center, as shown in (a) in FIG. 52, the mobile phone may display a control center 5201. A switching button 5202 for audio switching is disposed in the control center 5201. If it is detected that the user taps the switching button 5202, the mobile phone may also run the DV app to search for one or more nearby candidate devices for audio switching. As shown in (b) in FIG. 52, the DV app may display, in the control center 5201, found candidate devices that are located in a same Wi-Fi network as the mobile phone, for example, a television, a sound box, and a headset. Likewise, the user may select one of these candidate devices as an audio output device when the mobile phone subsequently outputs audio, that is, a slave device of the mobile phone.

For example, the user selects the sound box as a slave device of the mobile phone (that is, the first slave device in step S5001). For example, after it is detected that the user selects the sound box from the foregoing candidate devices, the DV app may establish a network connection to the sound box by using the sound box as a slave device of the mobile phone. For example, the network connection may be a P2P connection based on the transmission control protocol (transmission control protocol, TCP) or the user datagram protocol (user datagram protocol, UDP). This is not limited in this embodiment of this application.

It should be noted that the network connection established between the mobile phone and the slave device in step S5001 may be specifically a service channel network connection (that is, a service connection). For example, before the user selects the sound box as a slave device of the mobile phone, the mobile phone may have established a connection to the sound box through the Wi-Fi network. In this case, the connection is a data channel connection (that is, a data connection). After the user selects the sound box as a slave device of the mobile phone, the mobile phone may establish a service connection to the sound box based on the established data connection.

Figure 53:
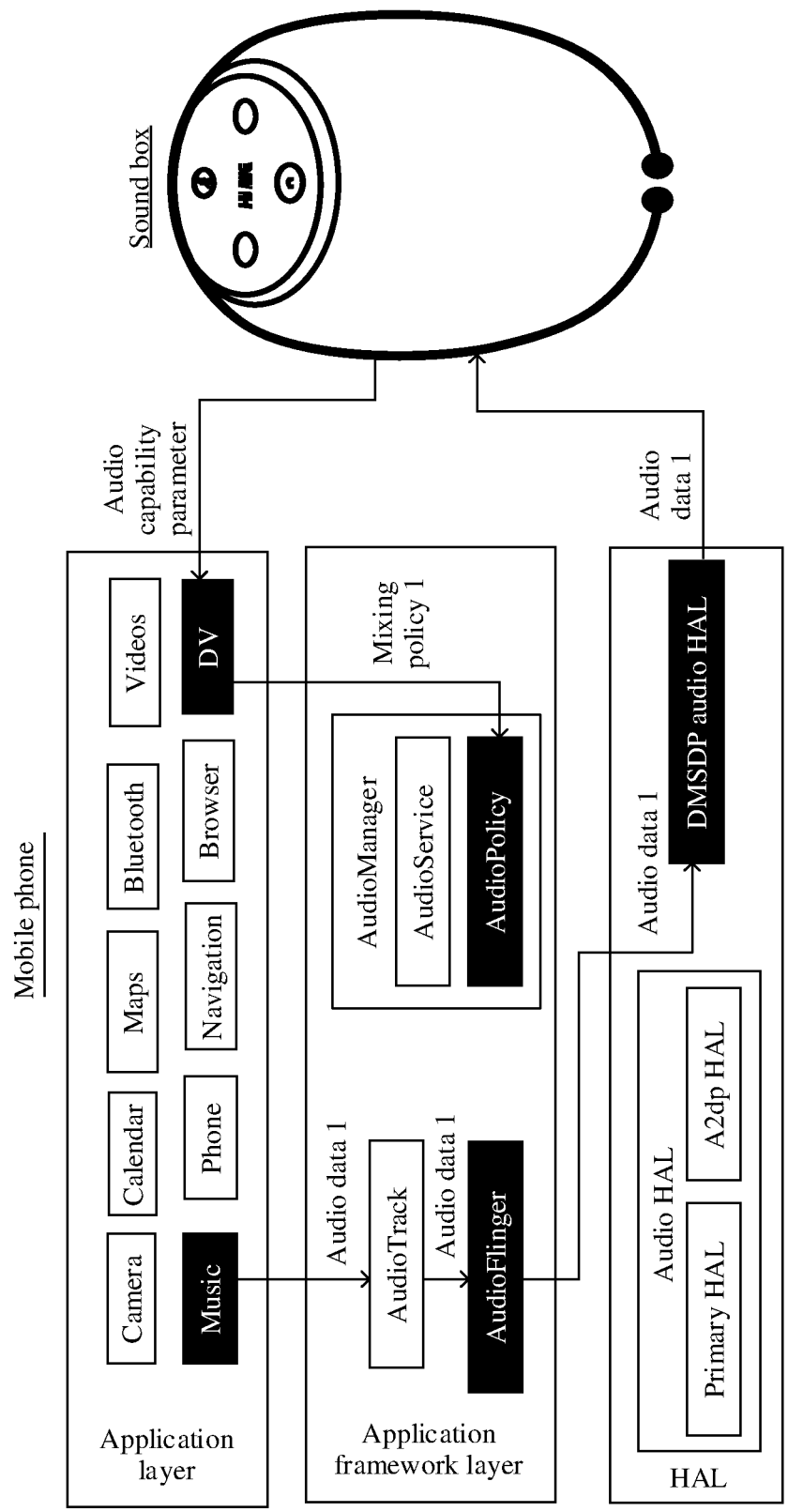
FIG. 53 is a schematic diagram 50 of an audio application scenario according to an embodiment of this application.

After the mobile phone establishes the network connection to the sound box, as shown in FIG. 53, the DV app may obtain an audio capability parameter of the sound box based on the network connection, where the audio capability parameter may reflect an audio output function specifically supported by the sound box. For example, the audio capability parameter may include a sampling rate, a quantity of sound channels, a sound effect mode, and a play latency that are supported by the sound box. Further, the DV app may create a corresponding DMSDP audio HAL at an HAL based on the audio capability parameter of the sound box. Subsequently, the mobile phone may transmit audio data to the sound box by using the DMSDP audio HAL, so as to switch an audio function of the mobile phone to the sound box for implementation.

In some embodiments, the user may alternatively select a plurality of slave devices to output audio of the mobile phone. For example, the user may simultaneously select the sound box and the television from the foregoing candidate devices as slave devices of the mobile phone. In this case, the DV app may respectively establish network connections to the sound box and the television box and obtain corresponding audio capability parameters. Further, the DV app may create a first DMSDP audio HAL corresponding to the sound box at the HAL based on the audio capability parameter of the sound box, and the DV app may create a second DMSDP audio HAL corresponding to the television at the HAL based on the audio capability parameter of the television. Subsequently, the mobile phone may send corresponding first audio data to the sound box by using the first DMSDP audio HAL, and send corresponding second audio data to the television by using the second DMSDP audio HAL (the second audio data may be the same as or different from the first audio data).

S5002: The DV app in the mobile phone delivers a mixing policy corresponding to the first slave device to AudioPolicy.

In some embodiments of this application, the mobile phone may pre-store mixing policies corresponding to a plurality of audio output devices. A mixing policy corresponding to each audio output device is used to indicate mixing requirements of the device for audio data of different types. For example, the mobile phone may pre-store mixing policies corresponding to four types of audio output devices: a sound box device, a large-screen device, a vehicle-mounted device, and a wearable device.

For example, as shown in Table 11, the mobile phone pre-stores mixing policies corresponding to the sound box device and the large-screen device. Whether mixing is allowed to be performed when audio data of each type is output to different types of audio output devices is set in the mixing policy. It can be learned that a difference from the mixing policy shown in Table 10 is that the mobile phone may set mixing policies corresponding to different types of audio output devices.

For example, in the mixing policy corresponding to the sound box device, audio data of a MUSIC type is not allowed to be mixed. In other words, the audio data of the MUSIC type needs to be independently transmitted to the sound box without being mixed with other audio data. In addition, in the mixing policy corresponding to the sound box device, each of audio data of a NOTIFICATION type and audio data of a DTMF type is allowed to be mixed with other audio data. For another example, in the mixing policy corresponding to the large-screen device, each of audio data of a MUSIC type and audio data of a NOTIFICATION type is not allowed to be mixed. In other words, the audio data of the MUSIC type and the audio data of the NOTIFICATION type need to be independently transmitted to the television without being separately mixed with other audio data.

TABLE 11

| Device type | Audio data type | Allowed to mix or not |
| --- | --- | --- |
| Sound box | MUSIC (music) | No |
| | NOTIFICATION (notification) | Yes |
| | DTMF (dual-tone multifrequency) | Yes |
| | ... | ... |
| Large screen | MUSIC (music) | No |
| | NOTIFICATION (notification) | No |
| | ... | ... |

Therefore, after the mobile phone establishes the network connection to the first slave device (for example, a sound box 1), the DV app may obtain an identifier of the sound box 1. Further, the DV app may identify, based on the identifier of the sound box 1, that the sound box 1 is a sound box device. Further, still as shown in FIG. 53, the DV app may send the pre-stored mixing policy (that is, a mixing policy 1) corresponding to the sound box device to AudioPolicy. AudioPolicy may associate the mixing policy 1 delivered by the DV app with the sound box 1. In this case, the mixing policy 1 may be bound to the sound box 1 as a mixing policy corresponding to the sound box 1.

Figure 54:
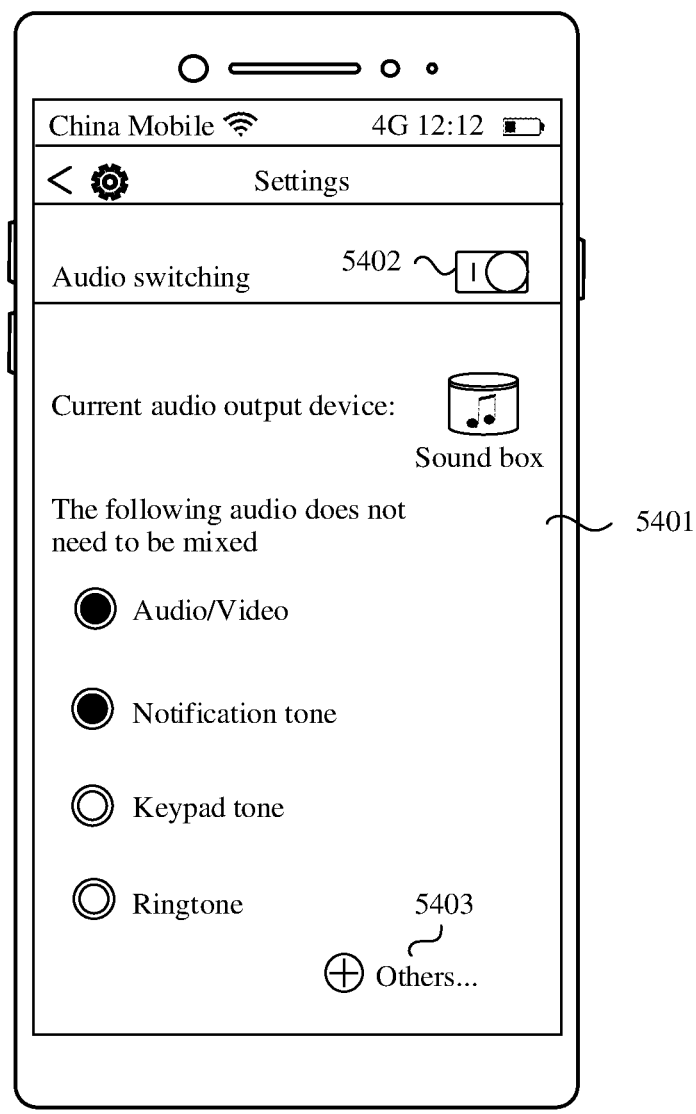
FIG. 54 is a schematic diagram 51 of an audio application scenario according to an embodiment of this application.

In addition, the user may further manually modify, by using the DV app, the mixing policy 1 corresponding to the sound box 1. For example, as shown in FIG. 54, the DV app may display a setting interface 5401 of an audio switching function to the user. An on/off button 5402 with an audio switching function is disposed on the setting interface 5401. If it is detected that the user turns on the on/off button 5402, it indicates that the user wants to enable an audio switching function, and the mobile phone may allow to switch audio in the mobile phone to another audio output device for play. In addition, the user may further set, on the setting interface 5401, a mixing policy corresponding to a current audio output device. For example, the user may select, on the setting interface 5401, audio data of a specific type that does not need to be mixed and audio data of a specific type that needs to be mixed. For another example, if the user needs to set mixing policies for audio data of more types, the user may tap an "Others" option 5403 on the setting interface 5401. In response to the operation that the user taps the option 5403, the mobile phone may display audio data of more types, and the user may set whether to mix the audio data.

The DV app may update the mixing policy 1 corresponding to the sound box 1 based on user selection on the setting interface 5401, and deliver an updated mixing policy 1 to AudioPolicy. AudioPolicy determines, according to the updated mixing policy 1, whether to mix different audio data generated by an audio app.

In this way, the user may set or modify, on the setting interface 5401 according to a user requirement, an audio type of audio data that needs to be independently transmitted to each audio output device, that is, set a mixing policy corresponding to each audio output device, so as to transmit, according to the user setting for play, audio data of various types to corresponding audio output devices independently or after mixing.

Certainly, the mobile phone may further store the mixing policy that is set by the user for the sound box 1. Subsequently, when the mobile phone establishes a network connection to the sound box 1 again, the mobile phone may find, based on the identifier of the sound box 1, the stored mixing policy corresponding to the sound box 1, and determine, by using the mixing policy, whether to mix different audio data generated by an audio app.

In some other embodiments of this application, the mobile phone may set by default that each type of audio output device other than the mobile phone is allowed to mix audio data of any type. Therefore, after the mobile phone establishes the network connection to the first slave device (for example, the sound box 1), the DV app may send a mixing policy shown in Table 12 to AudioPolicy. In the mixing policy shown in Table 13, audio data of any type that is sent by the mobile phone to the sound box 1 is allowed to be mixed. Subsequently, the mobile phone may update the mixing policy corresponding to the sound box 1 shown in Table 12 based on user selection on the setting interface 1101, and deliver an updated mixing policy corresponding to the sound box 1 to AudioPolicy. AudioPolicy determines, according to the updated mixing policy corresponding to the sound box 1, whether to mix different audio data generated by an audio app. Alternatively, the mobile phone may set by default that each type of audio output device other than the mobile phone is not allowed to mix audio data of any type. Subsequently, the user may set, in the mobile phone according to a user requirement, a mixing policy corresponding to a current slave device.

TABLE 12

| Slave device | Audio data type | Allowed to mix or not |
| --- | --- | --- |
| Sound box 1 | MUSIC (music) | Yes |
| | NOTIFICATION (notification) | Yes |
| | DTMF (dual-tone multifrequency) | Yes |
| | ... | ... |

Certainly, the mixing policy may alternatively be obtained by the mobile phone from a server, or the mixing policy may be preset by a developer in the mobile phone. This is not limited in this embodiment of this application.

In some other embodiments, the DV app in the mobile phone may alternatively deliver mixing policies corresponding to various audio output devices to AudioPolicy in advance. After the DV app establishes the network connection to the first slave device (for example, the sound box 1), the DV app may indicate the identifier of the sound box 1 to AudioPolicy. In this way, AudioPolicy may find, based on the identifier of the sound box 1, a mixing policy corresponding to a device type of the sound box 1 from the mixing policies corresponding to the audio output devices, and determine the found mixing policy as the mixing policy corresponding to the sound box 1. Alternatively, a mixing policy corresponding to each audio output device may be pre-stored in AudioPolicy, and the DV app does not need to deliver the mixing policy corresponding to the audio output device to AudioPolicy. This is not limited in this embodiment of this application.

S5003: After a first audio application in the mobile phone generates first audio data, AudioFlinger sends the first audio data to the first slave device for play.

In step S5003, still as shown in FIG. 53, if audio data (which may be referred to as the first audio data) is generated when the mobile phone runs the first audio app (for example, Music), the first audio app may invoke an audio player (for example, AudioTrack), and input the currently generated first audio data into an audio processor (for example, AudioFlinger). In addition, Music may set a type of audio data 1 in AudioTrack. For example, the audio app may set a mode parameter corresponding to the audio data 1 in AudioTrack to 01, so as to indicate that the audio data 1 that is currently input into AudioTrack is of the MUSIC type.

After receiving the audio data (for example, the audio data 1) from the first audio app, AudioFlinger may identify a specific type of the audio data 1 by reading the mode parameter in AudioTrack. In addition, after receiving the audio data 1, AudioFlinger may determine a quantity of channels of received audio data, that is, a quantity of pieces of audio data that need to be simultaneously played by the slave device. In this case, if AudioFlinger receives only this channel of audio data, no mixing needs to be performed regardless of the type of the audio data 1. Therefore, still as shown in FIG. 53, AudioFlinger may invoke the DMSDP audio HAL corresponding to the sound box at the HAL, and send the audio data 1 to the sound box by using the DMSDP audio HAL, and the sound box plays the audio data 1.

It should be noted that, before the audio data 1 is sent to the sound box, AudioPolicy may further set a corresponding audio policy based on the audio capability parameter of the sound box, and output the audio policy to AudioFlinger. For example, AudioPolicy may set, based on the audio capability parameter of the sound box, whether to perform sampling or sound effect adding on the audio data 1. Further, AudioFlinger may correspondingly process the audio data 1 according to the audio policy that is output by AudioPolicy. Therefore, the audio data 1 that AudioFlinger invokes the DMSDP audio HAL to send to the sound box is audio data processed by AudioFlinger according to the foregoing audio policy.

S5004: After a second audio application in the mobile phone generates second audio data, AudioPolicy determines, according to the mixing policy corresponding to the first slave device, whether to mix the first audio data and the second audio data.

Figure 55:
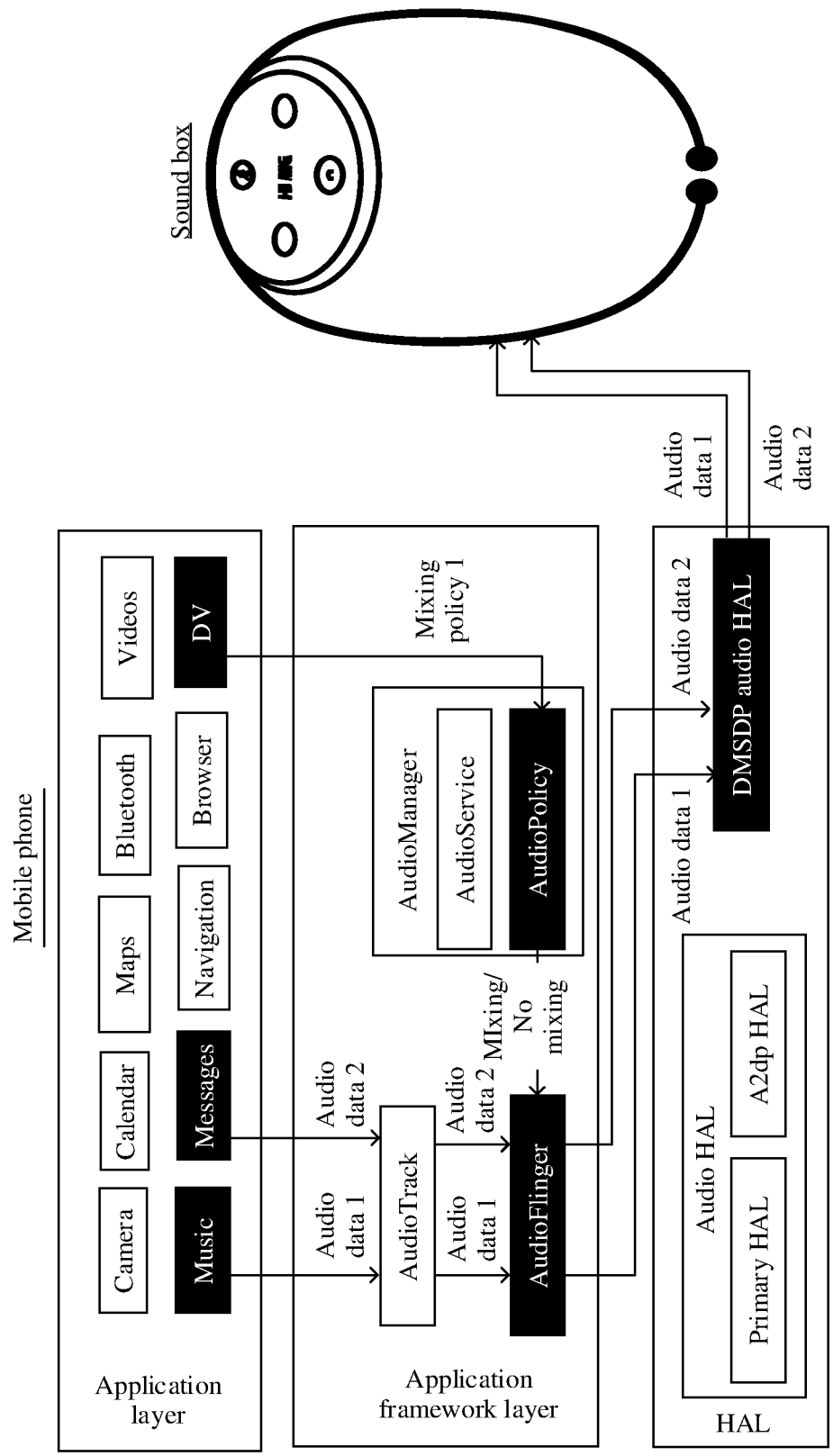
FIG. 55 is a schematic diagram 52 of an audio application scenario according to an embodiment of this application.

As shown in FIG. 55, for example, the second audio application is Messages. In a process of playing a song by Music (that is, the first audio application), if Messages receives a new SMS message, Messages may generate audio data 2 of the NOTIFICATION type (that is, the second audio data). Similar to the first audio data, the second audio app may also invoke AudioTrack to input the currently generated second audio data into AudioFlinger.

After receiving the audio data 2 from Messages, AudioFlinger may query whether there is other audio data that needs to be played by a slave device. For example, if AudioFlinger simultaneously receives the audio data 1 from Music and the audio data 2 from Messages, AudioFlinger may determine that the audio data 1 and the audio data 2 need to be simultaneously played by a current slave device (that is, the sound box).

In addition, AudioFlinger may identify, by reading mode parameters respectively corresponding to the audio data 1 and the audio data 2 from AudioTrack, that the audio data 1 and the audio data 2 are of different types. For example, AudioFlinger may determine that the audio data 1 is of the MUSIC type, and the audio data 2 is of the NOTIFICATION type. Because audio data that currently needs to be played by the sound box is a plurality of channels of audio data of different types, AudioFlinger may send a query request to AudioPolicy, where the query request may include specific types of the audio data 1 and the audio data 2, so as to request AudioPolicy to determine whether to mix the audio data 1 and the audio data 2.

If the audio data 1 and the audio data 2 do not need to be mixed, the mobile phone may continue to perform steps S5005 and S5006; or if the audio data 1 and the audio data 2 need to be mixed, the mobile phone may continue to perform steps S5007 to S5009.

It should be noted that the first audio application and the second audio application may be a same application, or may be different applications. For example, when WeChat is used as an audio app, both a prompt tone of the NOTIFICATION type and music of the MUSIC type can be played. This is not limited in this embodiment of this application. In addition, if the first audio data and the second audio data are of a same type, it indicates that the first audio data and the second audio data have a same audio feature, and distortion caused by mixing the first audio data and the second audio data is small. In this case, AudioPolicy may allow to mix the first audio data and the second audio data by default.

S5005: If the first audio data and the second audio data do not need to be mixed, AudioPolicy sends a first mixing indication to AudioFlinger, where the first mixing indication indicates to independently transmit the first audio data and the second audio data.

An example in which the first slave device is the sound box 1 is still used. After AudioPolicy receives the query request sent by AudioFlinger, as shown in the mixing policy shown in Table 11, AudioPolicy may determine, based on the types of the audio data 1 and the audio data 2, that the audio data 1 of the MUSIC type is not allowed to be mixed, that is, the audio data 1 needs to be independently transmitted. Although the audio data 2 of the NOTIFICATION type is allowed to be mixed with other audio data, because there is no audio data that can be mixed other than the audio data 1 and the audio data 2, AudioPolicy may determine that the audio data 1 and the audio data 2 do not need to be mixed. In other words, when one of the audio data 1 and the audio data 2 is not allowed to be mixed, AudioPolicy may determine that the audio data 1 and the audio data 2 do not need to be mixed.

In this case, AudioPolicy may send the first mixing indication to AudioFlinger, where the first mixing indication indicates that the audio data 1 and the audio data 2 do not need to be mixed, that is, the audio data 1 and the audio data 2 need to be independently transmitted to the sound box 1, so as to ensure that the sound box 1 can restore audio features of the audio data 1 and the audio data 2 as much as possible according to the received audio data 1 and audio data 2 for play.

S5006: In response to the first mixing indication, AudioFlinger in the mobile phone separately sends the first audio data and the second audio data to the first slave device.

After receiving the first mixing indication sent by AudioPolicy, AudioFlinger may determine that the currently received audio data 1 and audio data 2 need to be independently transmitted to the sound box 1. In this case, AudioFlinger does not need to mix the audio data 1 and the audio data 2 according to a method in the conventional technology. Correspondingly, still as shown in FIG. 55, AudioFlinger may invoke the DMSDP audio HAL at the HAL to send the two channels of audio data (that is, the audio data 1 and the audio data 2) to the DMSDP audio HAL, and then send the audio data 1 and the audio data 2 to the sound box 1 by using the DMSDP audio HAL. In this way, the audio data 1 and the audio data 2 received by the sound box 1 are two channels of independent audio data, so that the audio features of the audio data 1 and the audio data 2 can be restored as much as possible when the sound box 1 plays the audio data 1 and the audio data 2.

Figure 56:
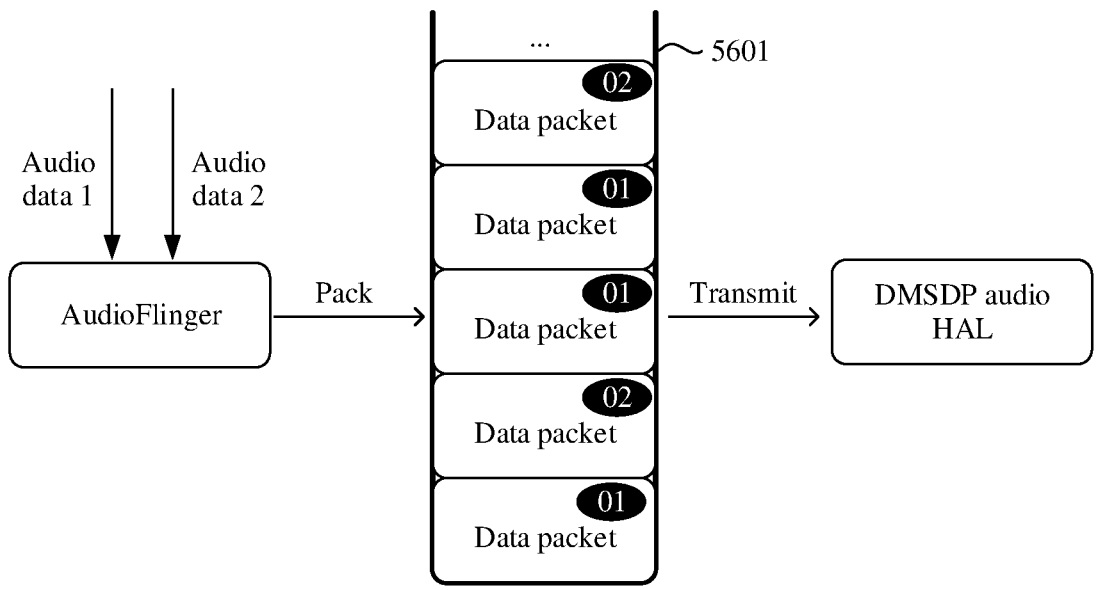
FIG. 56 is a schematic diagram 53 of an audio application scenario according to an embodiment of this application.

For example, after receiving the first mixing indication, AudioFlinger may separately pack the audio data 1 and the audio data 2 (which may also be referred to as encapsulation). For example, the mobile phone may encapsulate every three frames of audio data in the audio data 1 into one data packet, and the mobile phone may encapsulate every two frames of audio data in the audio data 2 into one data packet. As shown in FIG. 56, in a process of packaging the audio data 1, an identifier of the audio data 1 may be added to each data packet, for example, 01. Correspondingly, in a process of packaging the audio data 2, an identifier of the audio data 2 may be added to each data packet, for example, 02. Still as shown in FIG. 56, AudioFlinger may store, in real time in a buffer (buffer) 5601 of AudioFlinger, a data packet obtained after packaging, and send the data packet in the buffer 5601 to the DMSDP audio HAL in real time. In this way, although the DMSDP audio HAL obtains the data packets of the audio data 1 and the audio data 2 from the same buffer 5601, the DMSDP audio HAL may identify the data packets of the audio data 1 and the data packets of the audio data 2 based on the identifiers in the data packets for restoring.

Alternatively, a plurality of buffers may be set in AudioFlinger, and each channel of audio data that needs to be transmitted to a slave device (for example, the sound box 1) corresponds to one buffer. For example, AudioFlinger may pack the audio data 1 into several data packets and store the data packets in a first buffer, and pack the audio data 2 into several data packets and store the data packets in a second buffer. In this case, AudioFlinger may add, to a data packet, an identifier used to indicate specific audio data, or may not add, to a data packet, an identifier used to indicate specific audio data. In this way, a data packet obtained by the DMSDP audio HAL from the first buffer is a data packet in the audio data 1, and a data packet obtained by the DMSDP audio HAL from the second buffer is a data packet in the audio data 2.

After obtaining each data packet carrying an identifier from the buffer 5601, the DMSDP audio HAL may unpack each data packet, that is, decapsulate each data packet. In this way, the DMSDP audio HAL may restore, based on the identifier carried in each data packet, the two channels of audio data that each are not mixed (that is, the audio data 1 and the audio data 2). Further, the DMSDP audio HAL may independently send the audio data 1 and the audio data 2 to the sound box 1 through the network connection established in step S5001, so that the sound box 1 can obtain the audio data 1 and the audio data 2 that each are not mixed.

Alternatively, after the DMSDP audio HAL obtains each data packet carrying an identifier from the buffer 5601, the DMSDP audio HAL may directly send the obtained data packet to the sound box 1, and the sound box 1 unpacks each received data packet, so as to restore, based on the identifier carried in each data packet, the two channels of audio data that each are not mixed (that is, the audio data 1 and the audio data 2). This can reduce processing complexity of the DMSDP audio HAL in the mobile phone, and shorten a latency generated when the mobile phone performs audio switching with the sound box 1.

In some embodiments, it is assumed that the audio data 1 and the audio data 2 need to be sent to two different audio output devices. For example, the audio data 1 is sent to the sound box 1 for play, and the audio data 2 is sent to the television 2 for play. In this case, after obtaining each data packet carrying an identifier from the buffer 5601, the DMSDP audio HAL needs to first unpack each data packet to restore the two channels of audio data, namely, the audio data 1 and the audio data 2, and then send the audio data 1 to the sound box 1 and send the audio data 2 to the television 2.

After the audio data 1 and the audio data 2 are sent to the sound box 1, because the audio data 1 and the audio data 2 each are not mixed, the audio features of the audio data 1 and the audio data 2 are retained to a maximum extent, so that the audio features of the audio data 1 and the audio data 2 can be restored to a maximum extent when the sound box 1 plays the audio data 1 and the audio data 2. This reduces play distortion in an audio switching scenario.

Figure 57:
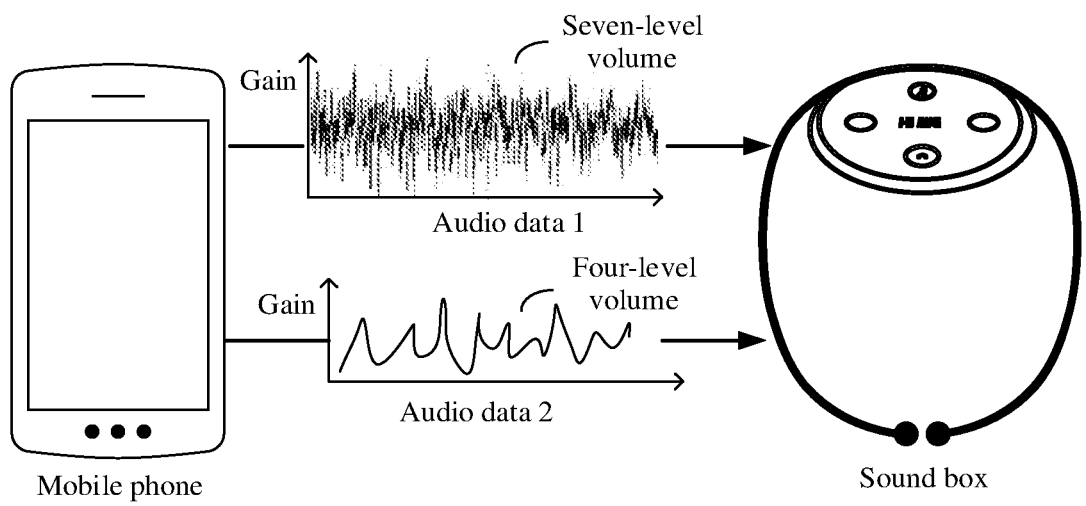
FIG. 57 is a schematic diagram 54 of an audio application scenario according to an embodiment of this application.

For example, the user has set volume of the audio data 1 of the MUSIC type to level 7 and volume of the audio data 2 of the NOTIFICATION type to level 4 in the mobile phone. A higher volume level indicates a larger gain of corresponding audio data that is set by AudioFlinger, and therefore indicates higher play loudness of the audio data. Therefore, as shown in FIG. 57, because the audio data 1 and the audio data 2 that are sent by the DMSDP audio HAL in the mobile phone to the sound box 1 are two channels of independent audio data, a gain of the audio data 1 received by the sound box 1 still corresponds the volume of level 7 in the mobile phone, and a gain of the audio data 2 still corresponds the volume of level 4 in the mobile phone. In this case, the sound box 1 may simultaneously play the audio data 1 and the audio data 2 directly based on the gains of the audio data 1 and the audio data 2. Alternatively, the sound box 1 may proportionally increase or decrease the gains of the audio data 1 and the audio data 2 based on the audio data 1 and the audio data 2, and then play processed audio data. Regardless of a manner, because the volume of the audio data 1 received by the sound box 1 is greater than the volume of the audio data 2, the volume of the audio data 1 finally played by the sound box 1 is still greater than the volume of the audio data 2, so that original volume features of the audio data 1 and the audio data 2 in the mobile phone are restored. This prevents the user from perceiving excessively high or excessively low volume of a channel of audio data in a plurality of channels of audio data.

It should be noted that, before playing the audio data 1 and the audio data 2, the sound box 1 may further perform processing such as parsing, sampling, encoding, decoding, encapsulation, or decapsulation on the audio data 1 and the audio data 2, and then play processed audio data 1 and audio data 2. This is not limited in this embodiment of this application.

S5007: If the first audio data and the second audio data need to be mixed, AudioPolicy sends a second mixing indication to AudioFlinger, where the second mixing indication indicates to mix the first audio data and the second audio data.

Corresponding to step S5005, in step S5007, AudioPolicy may determine, based on the types of the audio data 1 and the audio data 2 and the mixing policy shown in Table 11, whether the audio data 1 is allowed to be mixed and whether the audio data 2 is allowed to be mixed. If each of the audio data 1 and the audio data 2 is allowed to be mixed, AudioPolicy may determine that the audio data 1 and the audio data 2 need to be mixed.

In this case, AudioPolicy may send the second mixing indication to AudioFlinger, where the second mixing indication indicates that the audio data 1 and the audio data 2 need to be mixed, that is, the audio data 1 and the audio data 2 do not need to be independently transmitted to the sound box 1.

S5008: In response to the second mixing indication, AudioFlinger in the mobile phone mixes the first audio data and the second audio data into third audio data.

Figure 58:
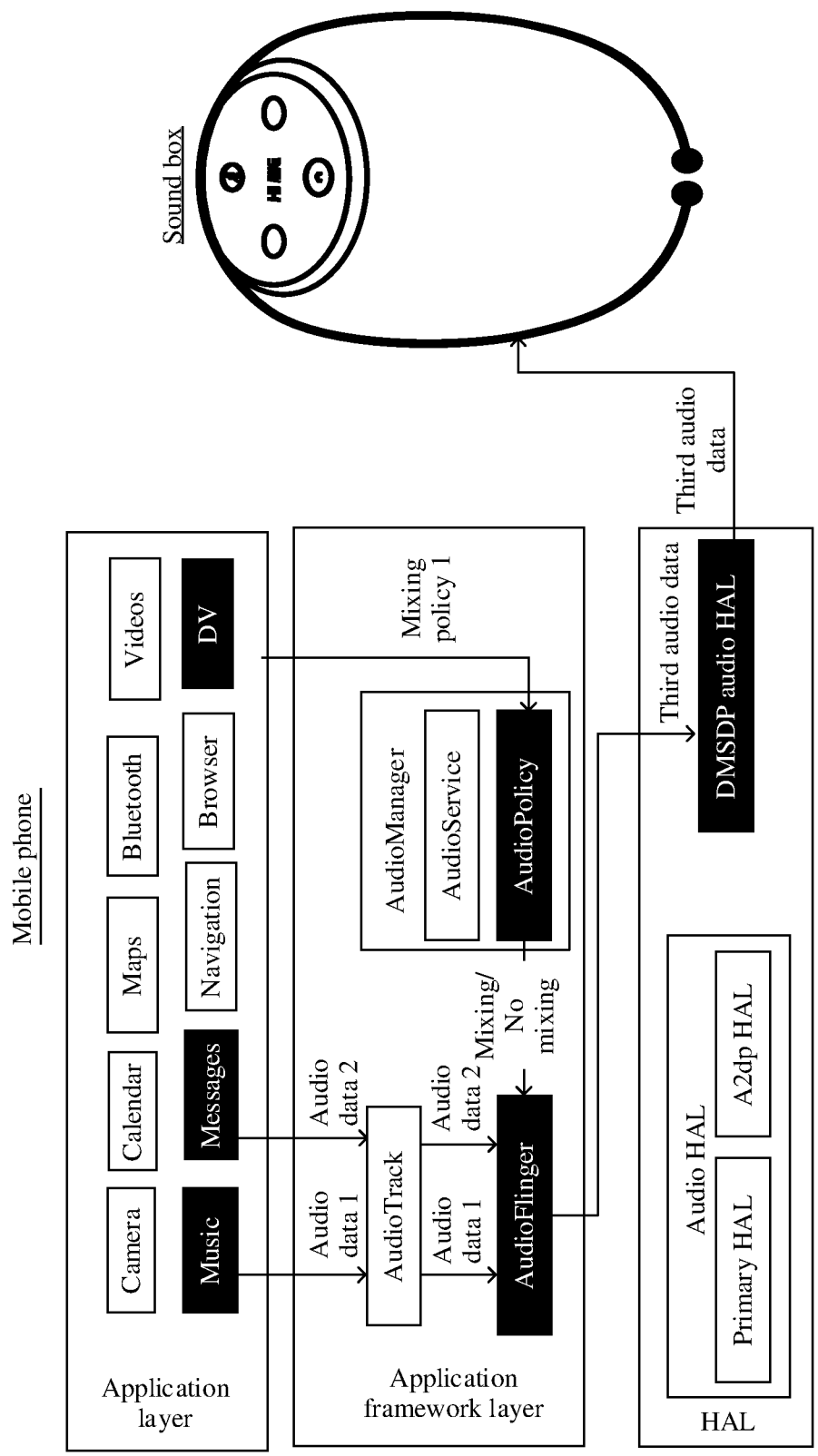
FIG. 58 is a schematic diagram 55 of an audio application scenario according to an embodiment of this application.

After receiving the second mixing indication sent by AudioPolicy, as shown in FIG. 58, AudioFlinger may mix the audio data 1 and the audio data 2. For example, when a sampling rate of the audio data 1 is greater than a sampling rate of the audio data 2, AudioFlinger may uniformly perform sampling on the audio data 1 and the audio data 2 by using the sampling rate of the audio data 2 (that is, a smaller sampling rate). For another example, when volume of the audio data 1 is inconsistent with volume of the audio data 2, AudioFlinger may adjust an increment of the audio data 1 and an increment of the audio data 2 to a same value. In this case, the audio data 1 and the audio data 2 are mixed into one channel of audio data (that is, the third audio data).

S5009: AudioFlinger in the mobile phone sends the third audio data to the first slave device.

In step S5009, still as shown in FIG. 58, AudioFlinger may send the mixed third audio data to the sound box 1 by using the DMSDP audio HAL, and the sound box 1 plays the mixed third audio data. Some audio features of the audio data 1 and the audio data 2 in the third audio data are modified during mixing. Consequently, distortion may occur when the sound box 1 plays the third audio data. However, because the user has set, in the mixing policy corresponding to the sound box 1, that audio data corresponding to the types of the audio data 1 and the audio data 2 is allowed to be mixed, distortion that occurs when the third audio data is played is generally within a receiving range of the user.

The foregoing embodiment is described by using an example of determining whether to mix the two channels of audio data, namely, the audio data 1 and the audio data 2. It can be understood that, when AudioFlinger in the mobile phone simultaneously receives three or more channels of audio data, AudioFlinger may still determine, according to the method in the foregoing embodiment, audio data that needs to be independently transmitted to a slave device and audio data that needs to be mixed and then transmitted to a slave device. This is not limited in this embodiment of this application.

Figure 59:
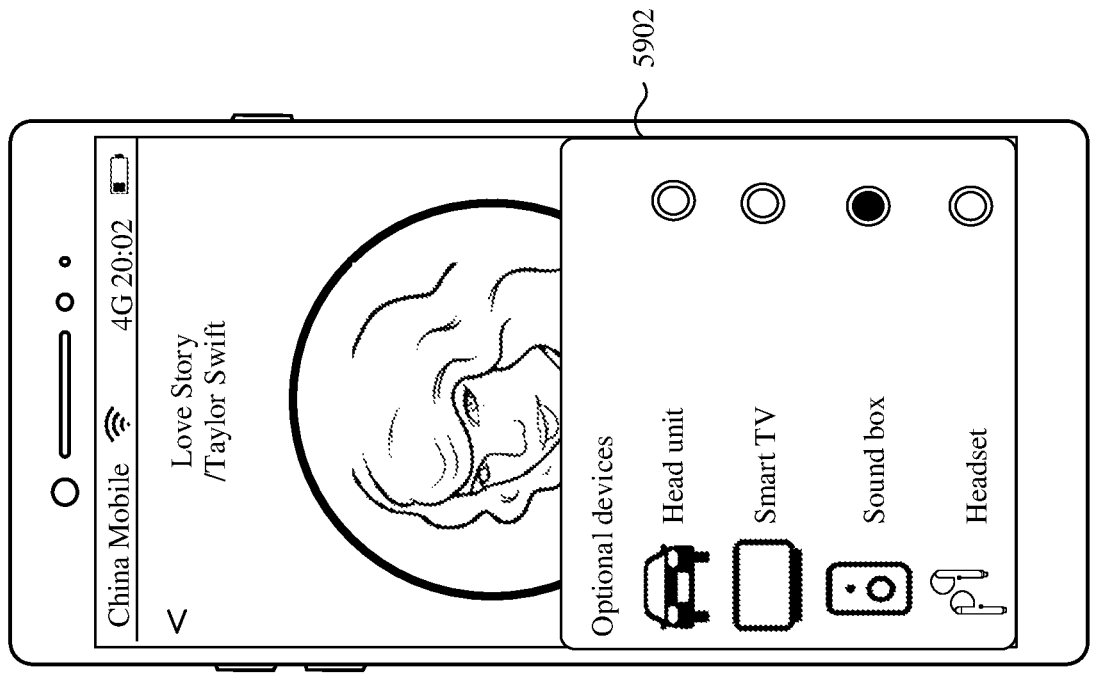
FIG. 59 is a schematic diagram 56 of an audio application scenario according to an embodiment of this application.
Figure 59:
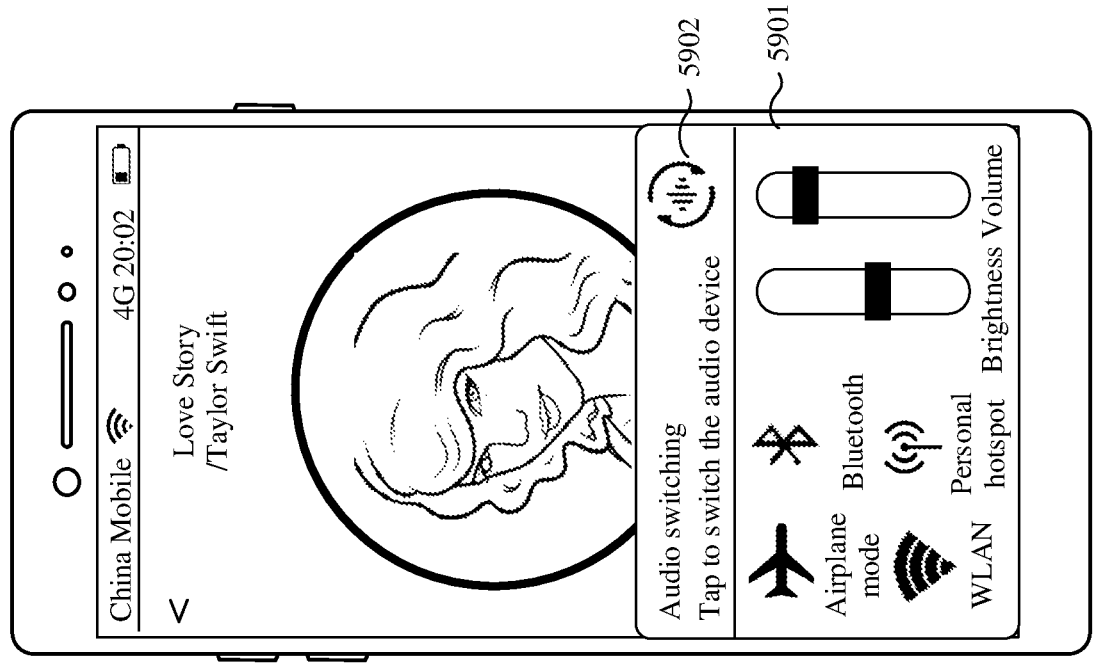

An example in which the first slave device is the sound box 1 is still used. After the mobile phone switches the audio function to the sound box 1, the user may further manually change, in the mobile phone, a slave device that currently performs audio switching with the mobile phone. For example, when the mobile phone runs Music, if the mobile phone receives an operation that the user opens a control center, as shown in (a) in FIG. 59, the mobile phone may display a control center 5901 on an application interface of Music. The control center 5901 includes a switching button 5902 for an audio switching function. When the user wants to change a current slave device of the mobile phone, the user may tap the switching button 5902 to query one or more candidate devices that can be currently used as slave devices of the mobile phone. As shown in (b) in FIG. 59, after the mobile phone detects that the user taps the switching button 5902, the mobile phone may display one or more detected candidate devices in the control center 5902. The sound box 1 in the control center 5902 has been marked as selected. In this case, the sound box is used as a slave device (that is, the first slave device) of the mobile phone and is playing audio from the mobile phone. If the user needs to change the slave device of the mobile phone, the user may reselect a slave device (that is, the second slave device) in the control center 5902 to perform audio switching.

For example, the user selects a head unit as the second slave device of the mobile phone. In response to the operation that the user selects the head unit in the control center 5902, the mobile phone may disconnect the established network connection to the sound box 1, and establish a network connection to the head unit. Similar to step S5001, after establishing the network connection to the head unit, the mobile phone may obtain an audio capability parameter of the head unit by using the DV app, and create a corresponding DMSDP audio HAL at the HAL based on the audio capability parameter of the head unit. Alternatively, the mobile phone may update, based on the audio capability parameter of the head unit, the DMSDP audio HAL created for the sound box 1 in step S5001, so that an updated DMSDP audio HAL matches an audio capability of the head unit.

Figure 60:
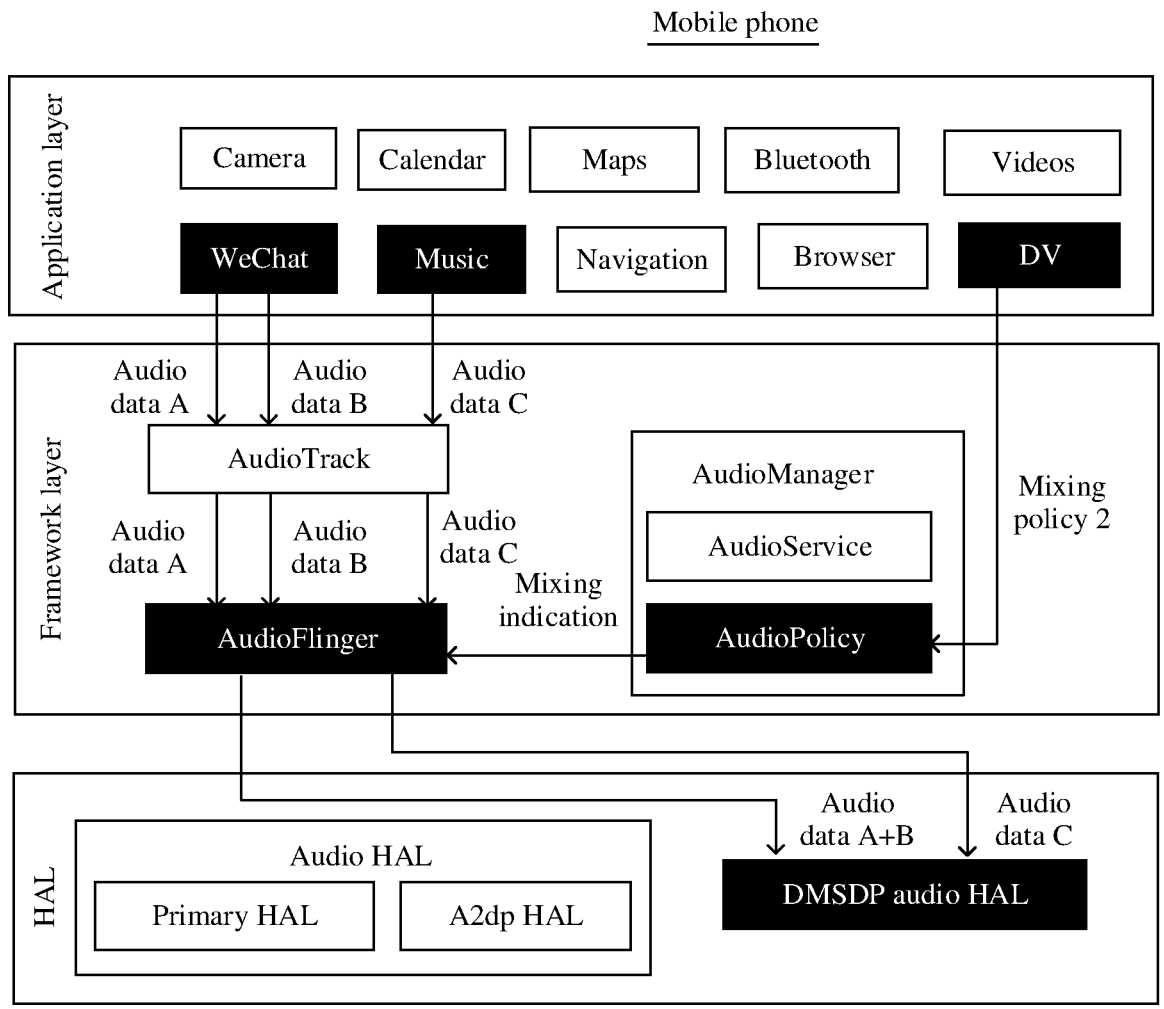
FIG. 60 is a schematic diagram 57 of an audio application scenario according to an embodiment of this application.

Further, similar to step S5002, as shown in FIG. 60, after the mobile phone determines the head unit as a current slave device (that is, the second slave device) and establishes the network connection, the DV app may obtain an identifier of the head unit, to determine that the currently connected second slave device is a vehicle-mounted device. Further, the DV app may use a mixing policy that is pre-stored for the vehicle-mounted device as a mixing policy 2 corresponding to the head unit and deliver the mixing policy 2 to AudioPolicy. Subsequently, AudioPolicy may determine, according to the mixing policy 2 corresponding to the head unit, whether to mix currently received audio data.

For example, the mixing policy 2 corresponding to the head unit may be shown in Table 13. A difference from the mixing policy shown in Table 11 is that identifiers such as application package names (Package Name) of one or more applications may be further set in the mixing policy 2. In other words, the mobile phone may further set, in the mixing policy 2, capabilities of different applications for mixing audio data of different types. For example, for WeChat, the head unit is not allowed to mix the audio data of the MUSIC type and the audio data of the COMMUNICATION type, and is allowed to mix the audio data of the NOTIFICATION type and the audio data of the DTMF type. For Music, the head unit is not allowed to mix the audio data of the MUSIC type. A specific application included in the mixing policy 2 may be preset by a developer. Alternatively, each time the user installs a new application in the mobile phone, the mobile phone may obtain mixing policies corresponding to the application in different audio output devices from the server. In this way, the mobile phone may dynamically update a mixing policy corresponding to each audio output device based on an application installed in the mobile phone. This is not limited in this embodiment of this application.

TABLE 13

| Head unit | Package name | Type | Allowed to mix or not |
|---|---|---|---|
| | WeChat | MUSIC (music) | No |
| | | COMMUNICATION (communication) | No |
| | | NOTIFICATION (notification) | Yes |
| | | DTMF (dual-tone multifrequency) | Yes |
| | ... | ... | ... |
| | Music | MUSIC (music) | No |
| | | ... | ... |

In this way, when the mobile phone runs WeChat, audio data of the MUSIC type and audio data of the COMMUNICATION type that are generated by WeChat may be independently transmitted to the head unit for play, without being separately mixed with other simultaneously received audio data, so that distortion rates of the audio data of the two types are reduced when the head unit plays the audio data of the two types. In addition, the mobile phone may mix or not mix, at a granularity of an application, audio of different types generated by one application, so as to independently transmit audio data on which the user has a high voice quality requirement in an application to a slave device, so that an original audio feature of the audio data in the master device (that is, the mobile phone) can be restored as authentic as possible when the slave device plays the audio data.

In some other embodiments, a mixing policy shown in Table 14 may alternatively be set in AudioPolicy. In the mixing policy, for different applications, device types that are not allowed to perform mixing, namely, types of audio output devices to which audio data needs to be independently transmitted, are set for audio data of different types in each application. For example, when WeChat generates audio data of the MUSIC type, and the audio data needs to be played by an audio output device such as the mobile phone, the sound box, the television, or the head unit, the audio data is not allowed to be mixed with other audio data. For another example, when Music generates audio data of the NOTIFICATION type, mixing may be performed when the audio data is played by any type of audio output device, that is, there is no device type that is not allowed to perform mixing. Subsequently, AudioPolicy may determine, based on a device type of a current slave device and the mixing policy shown in Table 14, whether to mix audio data of various types generated by a running audio app. Certainly, audio output devices that are allowed to perform mixing may also be set for audio data of different types in each application in the mixing policy shown in Table 14. This is not limited in this embodiment of this application.

TABLE 14

| Package name | Type | Device type that is not allowed to be mixed |
|---|---|---|
| WeChat | MUSIC (music) | Mobile phone, sound box, television, or head unit |
| | DTMF (dual-tone multifrequency) | None |
| | NOTIFICATION (notification) | Sound box or head unit |
| | . . . | . . . |
| Music | MUSIC (music) | Mobile phone, sound box, television, head unit, or headset |
| | COMMUNICATION (communication) | None |
| | NOTIFICATION (notification) | None |
| | . . . | . . . |

Figure 61:
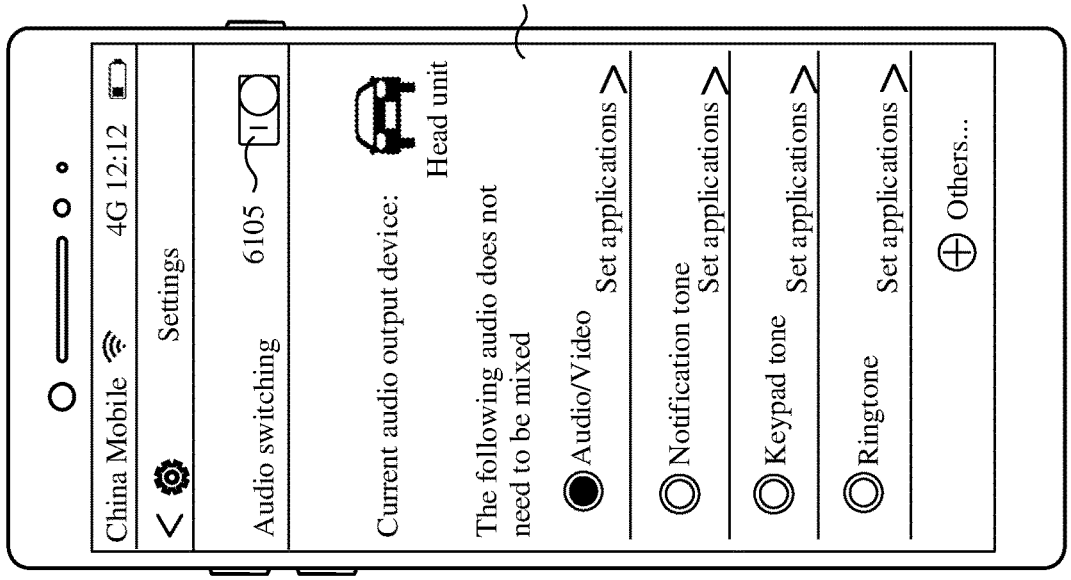
FIG. 61 is a schematic diagram 58 of an audio application scenario according to an embodiment of this application.
Figure 61:
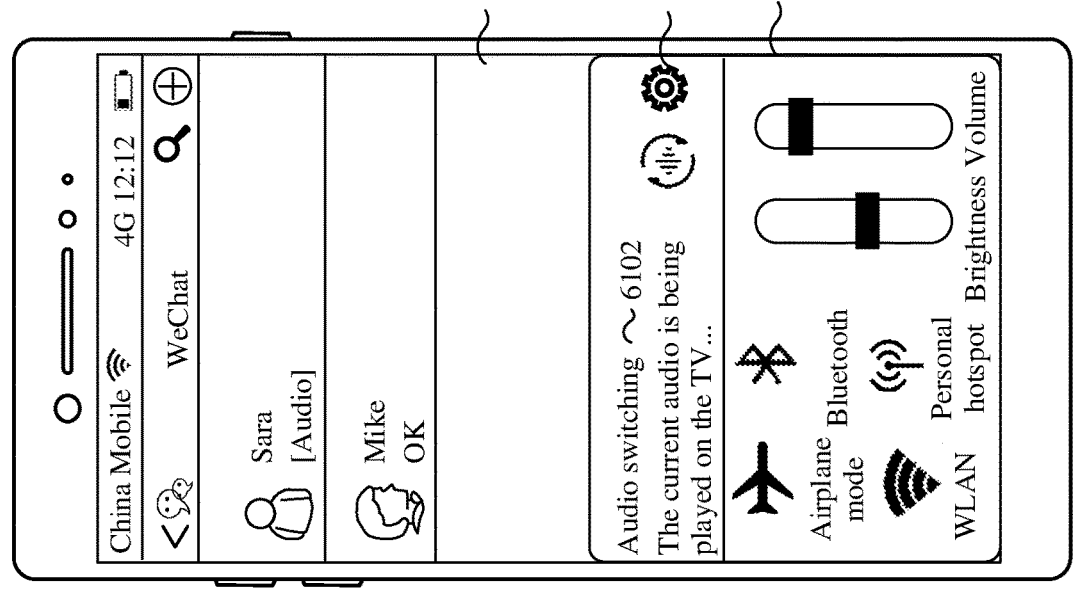

In some other embodiments, the user may alternatively manually modify a mixing policy corresponding to a current slave device in the mobile phone. As shown in (a) in FIG. 61, after switching Music to the background for running, the mobile phone may open WeChat to display an application interface 6100 of WeChat. If it is detected that the user enters an operation of opening a control center on the application interface 6100, the mobile phone may display a control center 6101 on the application interface 6100. An audio switching card 6102 is disposed in the control center 6101, and the card 6102 includes a setting button 6103 for audio switching. If it is detected that the user taps the setting button 6103, as shown in (b) in FIG. 61, the DV app may display a setting interface 6104 when the head unit is used as a slave device. Similar to FIG. 54, an on/off button 6105 with an audio switching function may be disposed on the setting interface 6104. After the user turns on the on/off button 6105, on the setting interface 6104, the user may set types of audio data that each are allowed to be mixed by the mobile phone when the head unit is a slave device, or further set that the mobile phone is allowed to mix audio data of some types in some applications when the head unit is a slave device. Further, the DV app may update the mixing policy 2 corresponding to the head unit shown in Table 13 based on user selection on the setting interface 6104, so that the user can dynamically specify whether to perform mixing when audio data of each type is output to a slave device.

After the slave device of the mobile phone is switched from the sound box to the head unit, AudioFlinger may request AudioPolicy to query whether currently received audio data needs to be mixed. Further, AudioPolicy may determine, according to the mixing policy 2 delivered by the DV app, whether to mix the currently received audio data.

Figure 62:
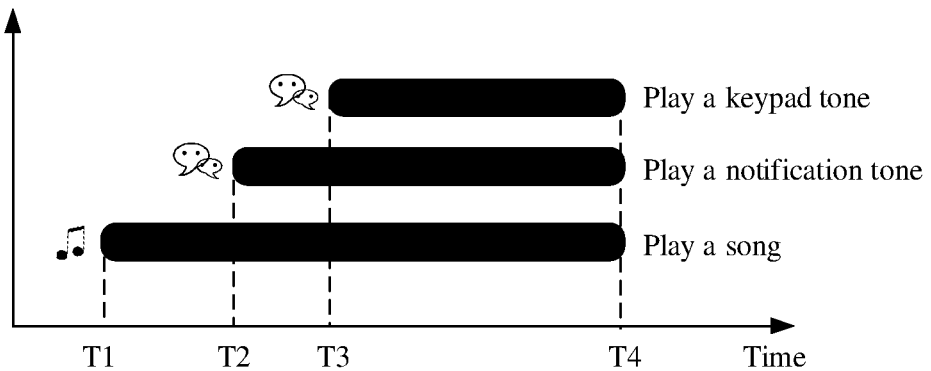
FIG. 62 is a schematic diagram 59 of an audio application scenario according to an embodiment of this application.

For example, AudioFlinger simultaneously receives three channels of audio data. As shown in FIG. 62, at a moment T1, the user opens Music in the mobile phone and starts to play a song; at a moment T2 (T2>T1), WeChat receives a new message sent by a contact and then starts to play a prompt tone; and at a time period from T3 to T4 (T4>T3>T2), a keypad tone starts to be played when the user taps a button on a keypad in WeChat. In this case, as shown in FIG. 60, AudioFlinger in the mobile phone may simultaneously receive audio data A of the NOTIFICATION type and audio data B of the DTMF type from WeChat and audio data C of the MUSIC type from Music in the time period from T3 to T4.

Still as shown in FIG. 60, AudioFlinger may request AudioPolicy to query whether the audio data A, the audio data B, and the audio data C need to be mixed. Further, AudioPolicy may determine, according to the mixing policy 2 shown in Table 13, that the audio data A of the NOTIFICATION type and the audio data B of the DTMF type can be mixed but the audio data C of the MUSIC type is not allowed to be mixed with other audio data and needs to be independently transmitted to the head unit, so as to ensure sound quality when the head unit plays the audio data C of the MUSIC type.

In this case, AudioPolicy may send an indication message to AudioFlinger, to indicate AudioFlinger to mix the audio data A and the audio data B and not to mix the audio data C. Still as shown in FIG. 60, in response to the indication message, AudioFlinger may mix the audio data A and the audio data B into one channel of audio data (that is, audio data A+B), and then output two channels of audio data, namely, the mixed audio data A+B and the audio data C that is not mixed. Further, AudioFlinger may invoke the DMSDP audio HAL to send the mixed audio data A+B and the audio data C that is not mixed to the head unit, and the head unit plays the audio data A+B and the audio data C. In this way, the audio data C of the MUSIC type may be independently transmitted to the slave device (that is, the head unit) without being mixed, so that the audio data C received by the slave device can truly reflect an original audio feature. This avoids audio distortion caused by mixing, reduces distortion of a plurality of channels of audio data during cross-device play, and improves audio output quality in an audio switching scenario.

In some embodiments, an example in which the head unit is a slave device of the mobile phone is still used. When sending each channel of audio data (for example, the audio data C) to the head unit, the mobile phone may pack the audio data C into data packets, and send the data packets to the head unit. For example, AudioFlinger in the mobile phone may pack the audio data C according to the JavaScript object notation (JavaScript Object Notation, JSON) protocol, and add feature information of the audio data C to the data packets. For example, the feature information may include an application package name, a play type (for example, a game or a movie), a play format (for example, MP3), a volume level, whether to perform mixing, an audio type (for example, the MUSIC type), and audio track information (for example, a quantity of audio tracks or a sequence number of an audio track) of the audio data C. The feature information can reflect an actual audio feature of the audio data C. Therefore, the slave device that receives the data packets can truly restore the audio data C and a related feature of the audio data C by parsing the feature information in the data packets, and then play the audio data C based on the feature information of the audio data C, so that distortion of the audio data C is reduced in an audio switching process.

For example, AudioFlinger may add feature information corresponding to audio data to a head (head) file of each data packet. Audio data in a PCM format is used as an example. A data packet 1 and a data packet 2 that are encapsulated by AudioFlinger according to the JSON protocol may be shown as follows:

```
data:[
{
    name:"audio1", //          data packet 1
    pkg: "com.android.wechat",// from WeChat
    trackNums:"2",//           a quantity of audio tracks is 2
    track: "1",//              a track sequence number corresponding to a current
    audio track is 1
    playType: "game",          //a play type is game
    fileFormat: "mp3",         //a play format is MP3
    ...... //
pcm:"......" //  specific pcm data
},
{
    name:"audio2", //          data packet 2
    pkg: "com.android.music ",// from Music
    track Nums:"1",//          a quantity of audio tracks is 1
    track: "1",//              a track sequence number corresponding to a current
    audio track is 1
    playType: "music",         //a play type is music
    fileFormat: "flac",        //a play format is flac
    ...... //
pcm:"......" //  specific pcm data
},
]
```

In some embodiments, AudioFlinger may first send encapsulated data packets (for example, the data packet 1 and the data packet 2) to the DMSDP audio HAL, and the DMSDP audio HAL unpacks the data packet 1 and the data packet 2. The DMSDP audio HAL may identify, by reading feature information (for example, application package names) in the data packet 1 and the data packet 2, that the data packet 1 comes from WeChat and the data packet 2 comes from Music. In other words, the data packet 1 and the data packet 2 respectively belong to two channels of audio data. In this way, after unpacking all the data packets sent by AudioFlinger, the DMSDP audio HAL may obtain the corresponding two channels of audio data that are not mixed. Further, the DMSDP audio HAL may independently send the two channels of audio data to the head unit for play.

In some other embodiments, after obtaining the data packets encapsulated by AudioFlinger, the DMSDP audio HAL may directly send the obtained data packets to the head unit. The head unit unpacks all the received data packets to restore, based on feature information carried in all the data packets, the corresponding two channels of audio data that are not mixed. In addition, the head unit may further select corresponding play manners based on the corresponding feature information to accurately restore play processes of the two channels of audio data. For example, the head unit may play audio data corresponding to the foregoing data packet 1 in an MP3 format, and play audio data corresponding to the foregoing data packet 2 in a flac format, so as to restore, as much as possible, audio features of the two channels of audio data played on the mobile phone. This reduces play distortion in an audio switching scenario.

The foregoing embodiment is described by using an example in which the mobile phone switches all audio data in the mobile phone to a slave device (for example, the sound box) for play. It can be understood that, in some embodiments, when AudioFlinger in the mobile phone receives a plurality of channels of audio data from different applications or a same application, AudioFlinger may further determine, through interaction with AudioPolicy, an audio output device corresponding to each of the plurality of channels of audio data.

Figure 63:
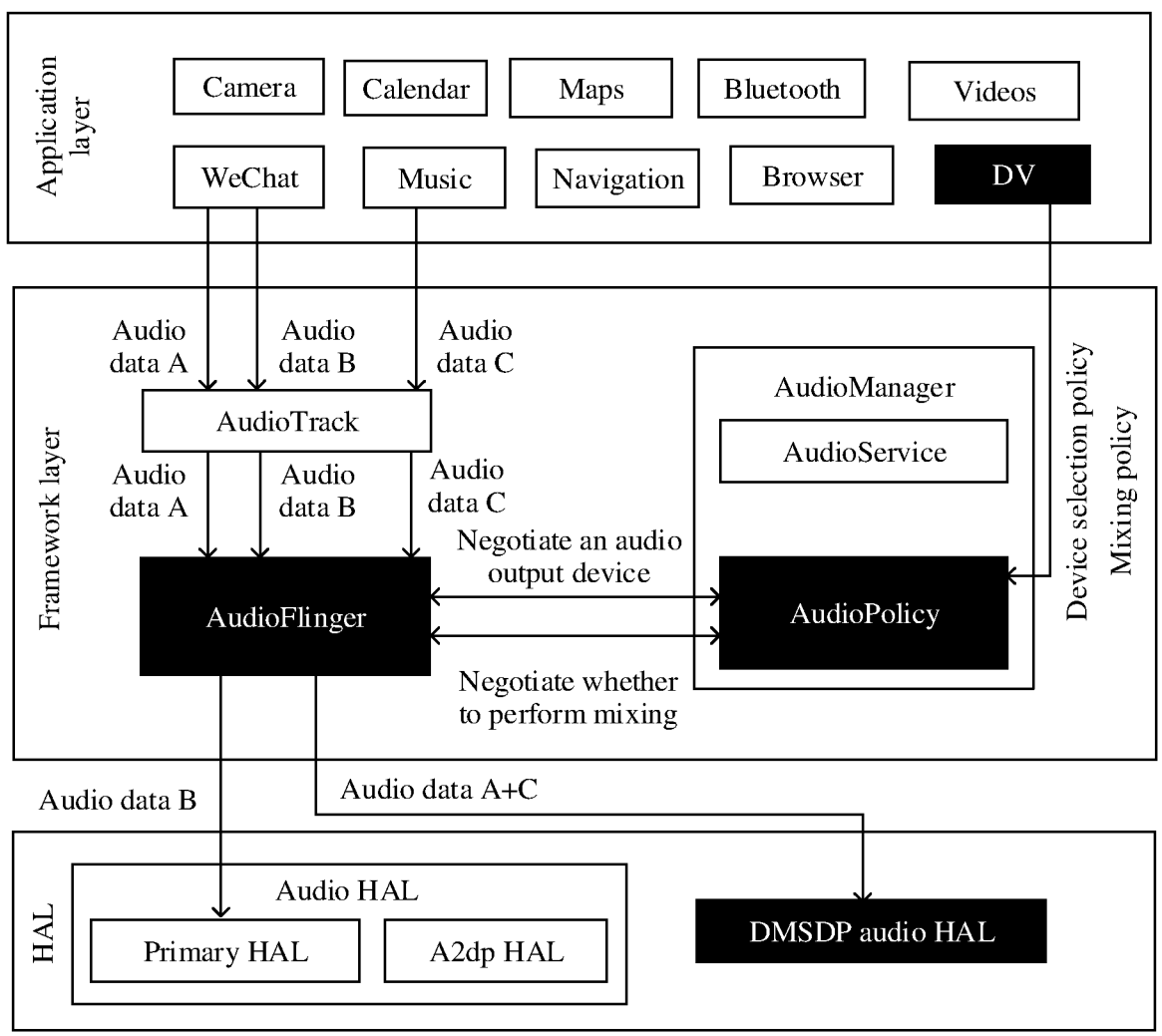
FIG. 63 is a schematic diagram 60 of an audio application scenario according to an embodiment of this application.

An example in which the slave device of the mobile phone is the sound box is still used. After the mobile phone establishes a connection to the sound box, as shown in FIG. 63, in addition to delivering the foregoing mixing policy to AudioPolicy, the DV app in the mobile phone may further deliver a device selection policy corresponding to the sound box to AudioPolicy, where a type of audio data that is allowed to be played by the sound box and a type of audio data that is not allowed to be played by the sound box are set in the device selection policy. For example, the sound box is allowed to play audio data of the MUSIC type, audio data of the NOTIFICATION type, and audio data of a RING type, but the sound box is not allowed to play audio data of a SYSTEM type and audio data of the DTMF type.

Still as shown in FIG. 62, AudioFlinger in the mobile phone may simultaneously receive audio data A of the NOTIFICATION type and audio data B of the DTMF type from WeChat and audio data C of the MUSIC type from Music in the time period from T3 to T4. Further, still as shown in FIG. 63, AudioFlinger may request AudioPolicy to query whether the audio data A, the audio data B, and the audio data C are allowed to be played by the sound box, that is, negotiate an audio output device corresponding to audio data with AudioPolicy. Further, AudioPolicy may determine, according to the foregoing device selection policy, that the audio data A of the NOTIFICATION type and the audio data C of the MUSIC type can be played by the sound box, but the audio data B of the DTMF type is not allowed to be played by the sound box. In addition, AudioPolicy may further set an audio output device for the audio data B, for example, set the audio output device corresponding to the audio data B to the mobile phone. Further, AudioPolicy may indicate AudioFlinger to output the audio data A and the audio data C to the sound box for play and output the audio data B to a speaker of the mobile phone for play.

Further, AudioFlinger may determine, according to the indication of AudioPolicy, that the audio data A and the audio data C need to be sent to the sound box for play. In this case, to ensure audio quality of the audio data A and the audio data C played by the sound box, AudioFlinger may request AudioPolicy to query whether the audio data A and the audio data C need to be mixed, that is, negotiate with AudioPolicy to determine whether to mix the audio data. Further, AudioPolicy may determine, according to the method in the foregoing embodiment and the mixing policy delivered by the DV app, whether the audio data A and the audio data C need to be mixed. If the audio data A and the audio data C do not need to be mixed, the mobile phone may perform the method described in steps S5005 and S5006, that is, independently send the two channels of audio data, namely, the audio data A and the audio data C, to the sound box for play (not shown in FIG. 63). If the audio data A and the audio data C need to be mixed, as shown in FIG. 63, the mobile phone may perform the method described in steps S5007 to S5009, that is, send one channel of audio data A+C obtained by mixing the audio data A and the audio data C to the sound box for play.

Alternatively, when AudioPolicy determines, according to the device selection policy, that audio output devices corresponding to the audio data A and the audio data C each are the sound box and an audio output device corresponding to the audio data B is the mobile phone, because the sound box needs to simultaneously play a plurality of channels of audio data, AudioPolicy may further determine, according to the mixing policy delivered by the DV app, whether the audio data A and the audio data C need to be mixed. Further, AudioPolicy may indicate, to AudioFlinger, that the audio output devices corresponding to the audio data A and the audio data C each are the sound box, and indicate whether the audio data A and the audio data C need to be mixed. In addition, AudioPolicy indicates, to AudioFlinger, that the audio output device corresponding to the audio data B is the mobile phone.

Subsequently, AudioFlinger may output, by using a primary HAL, the audio data B to the speaker of the mobile phone for play, and AudioFlinger may send, by using the DMSDP audio HAL, the audio data A and the audio data C that are not mixed (or the mixed audio data A+C) to the sound box for play.

In this way, when the mobile phone needs to switch a plurality of channels of simultaneously generated audio data to a slave device for play, the mobile phone may select, according to a device selection policy corresponding to a current slave device, audio output devices corresponding to different audio data, and may further determine, according to a mixing policy corresponding to the current slave device, audio data that needs to be independently transmitted in a plurality of channels of audio data played by a same audio output device. This avoids distortion of audio data of a type caused by mixing, and improves audio output quality in an audio switching scenario.

In a distributed audio scenario, a master device may be an electronic device having a split-screen display function (which may also be referred to as a split-screen function). For example, the split-screen function means that the master device may create a plurality of windows when performing display on a display of the master device, and run and display a corresponding application, corresponding software, or a corresponding program in each window.

Figure 64:
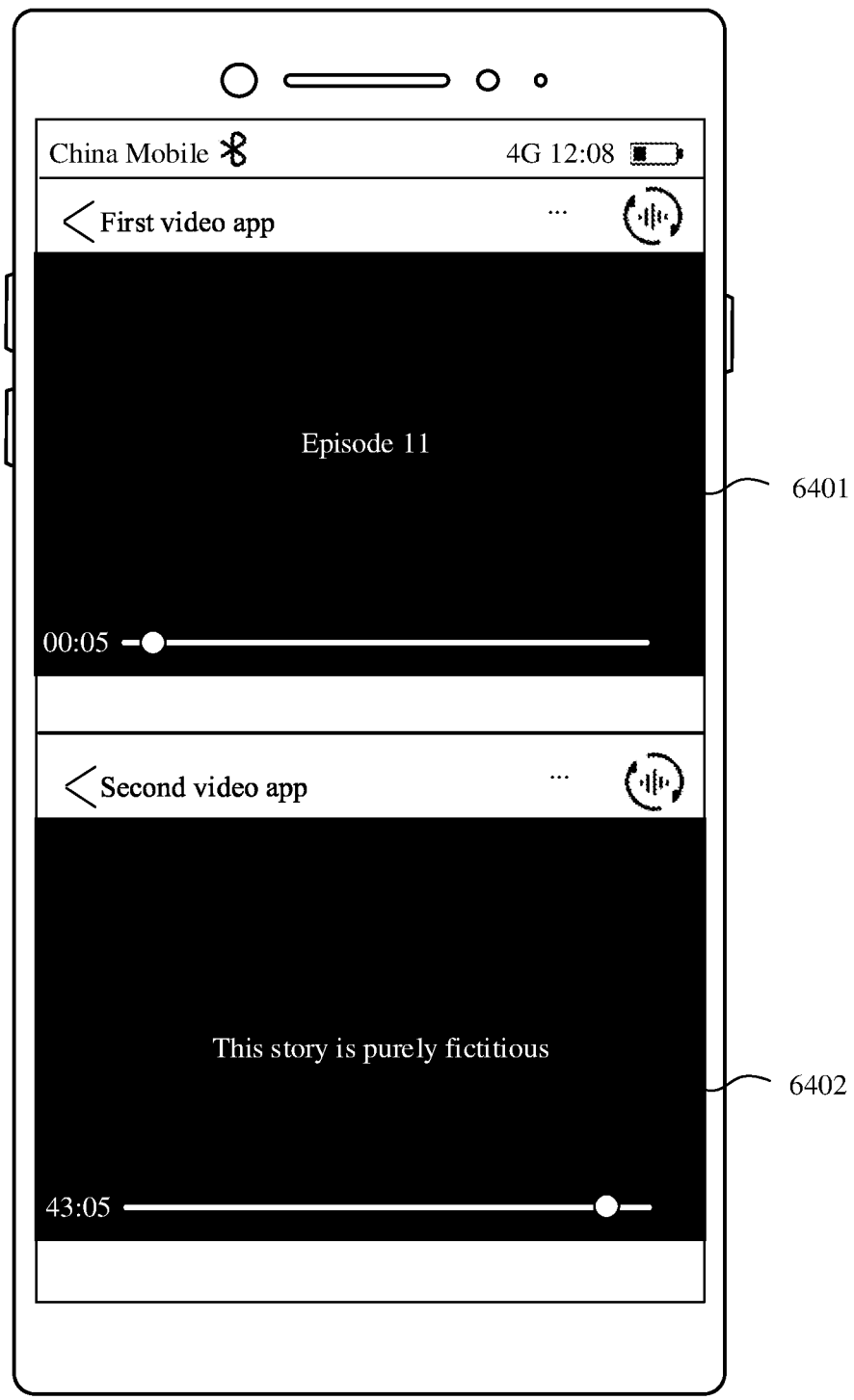
FIG. 64 is a schematic diagram 61 of an audio application scenario according to an embodiment of this application.

An example in which the mobile phone is a master device is still used. The user may perform a preset operation (for example, an operation of touching and holding the screen) to trigger the mobile phone to enter a split-screen mode. As shown in FIG. 64, in the split-screen mode, the mobile phone may divide a display area in the display into a window 6401 and a window 6402. A status bar of the mobile phone may be displayed in the window 6401 or the window 6402, or a status bar of the mobile phone may be hidden in the split-screen mode. This is not limited in this embodiment of this application. The window 6401 and the window 6402 may be respectively used to run and display corresponding applications, or the window 6401 and the window 6402 may respectively run and display different tasks of a same application. For example, the window 6401 may display a chat interface with a contact Amy in WeChat, and the window 6402 may simultaneously display a chat interface with a contact Mike in WeChat. Certainly, the mobile phone may alternatively divide the display area into three or more windows. This is not limited in this embodiment of this application.

For example, a first video app may run in the window 6401, and a second video app may run in the window 6402. When the first video app is running, one or more audio tasks may be created, for example, an audio task 1 for playing a video A and an audio task 2 for playing a notification message prompt tone. Similarly, when the second video app is running, one or more audio tasks may also be created.

In this embodiment of this application, each window displayed by the master device (for example, the mobile phone) may be associated with one audio output device. In other words, audio data that is output by an audio task in each window may be played by using an audio output device associated with the window. For example, an association relationship between a window and an audio output device may be set by the user. For example, if the user sets that a window A is associated with a wired headset, when an audio task created by an application in the window A outputs corresponding audio data, the mobile phone may send the audio data to the wired headset connected to the mobile phone for play. In some embodiments, the mobile phone may also modify the association relationship between a window and an audio output device. An example in which the user sets an audio output device associated with the window A to the wired headset is still used. If the mobile phone is not connected to the wired headset, the mobile phone may re-determine the audio output device associated with the window A. For example, the mobile phone may determine the mobile phone as the audio output device associated with the window A, and the mobile phone may further send, to the speaker of the mobile phone for play, audio data that is output in the window A. Alternatively, if the wired headset does not play current audio data in the window A, for example, some wired headsets with low configurations may not play audio data in a high-definition format, the mobile phone may re-determine the audio output device associated with the window A, and send the audio data to the associated audio output device for play. Certainly, the mobile phone may alternatively modify the association relationship between a window and an audio output device in response to user setting. This is not limited in this embodiment of this application.

Figure 65:
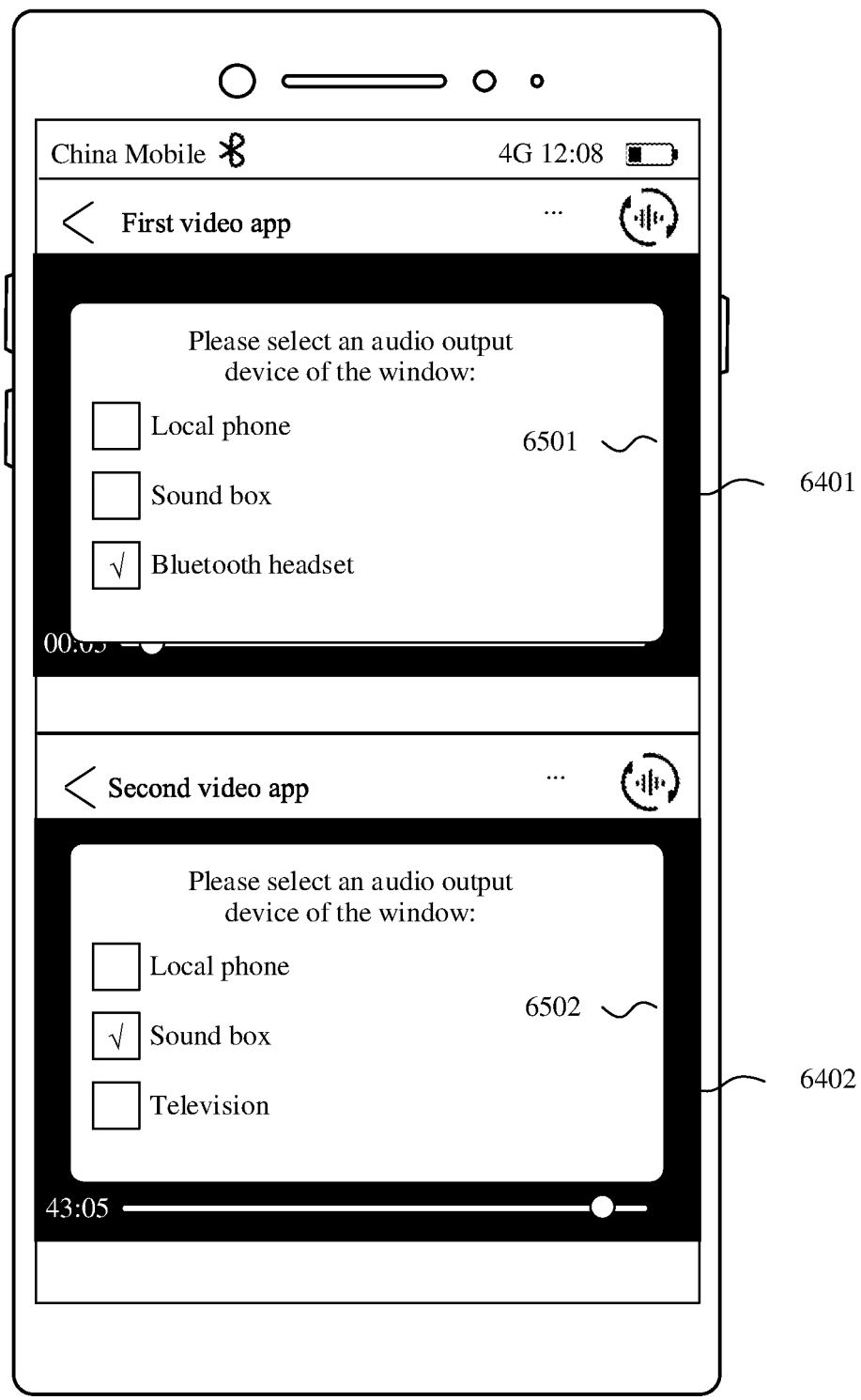
FIG. 65 is a schematic diagram 62 of an audio application scenario according to an embodiment of this application.

For example, after the mobile phone enters the split-screen mode, as shown in FIG. 65, the mobile phone may display a first dialog box 6501 in the window 6401, and prompt the user in the first dialog box 6501 to select an audio output device associated with the window 6401. For example, the mobile phone may display, in the first dialog box 6501, an electronic device that is located in a same Wi-Fi network as the mobile phone or an electronic device that has established a connection to the mobile phone and that has an audio play function. In this way, the user may select the audio output device associated with the window 6401 (that is, one slave device of the mobile phone) in the first dialog box 6501. For example, the user selects a Bluetooth headset in the first dialog box 6501. If it is detected that the user selects the Bluetooth headset in the first dialog box 6501, the mobile phone may establish an association relationship between the window 6401 and the Bluetooth headset. Subsequently, the mobile phone may send, to the Bluetooth headset for play, audio data that is output by an audio task in the window 6401. The first dialog box 6501 may be automatically displayed in the window 6401 after the mobile phone enters the split-screen mode, or may be displayed in the window 6401 after the mobile phone enters the split-screen mode and then the user triggers the mobile phone by using a button or gesture.

Similarly, still as shown in FIG. 65, after the mobile phone enters the split-screen mode, the mobile phone may further display a second dialog box 6502 in the window 6402, and prompt the user in the second dialog box 6502 to select an audio output device associated with the window 6402. For example, the mobile phone may display, in the second dialog box 6502, an electronic device that is located in a same Wi-Fi network as the mobile phone or an electronic device that has established a connection to the mobile phone and that has an audio play function. In this way, the user may select the audio output device associated with the window 6402 (that is, another slave device of the mobile phone) in the second dialog box 6502. For example, the user selects a sound box in the second dialog box 6502. If it is detected that the user selects the sound box in the second dialog box 6502, the mobile phone may establish an association relationship between the window 6402 and the sound box. Subsequently, the mobile phone may send, to the sound box for play, audio data that is output by an audio task in the window 6402. Similarly, the second dialog box 6502 may be automatically displayed in the window 6402 after the mobile phone enters the split-screen mode, or may be displayed in the window 6402 after the mobile phone enters the split-screen mode and then the user triggers the mobile phone by using a button or gesture.

Figure 66:
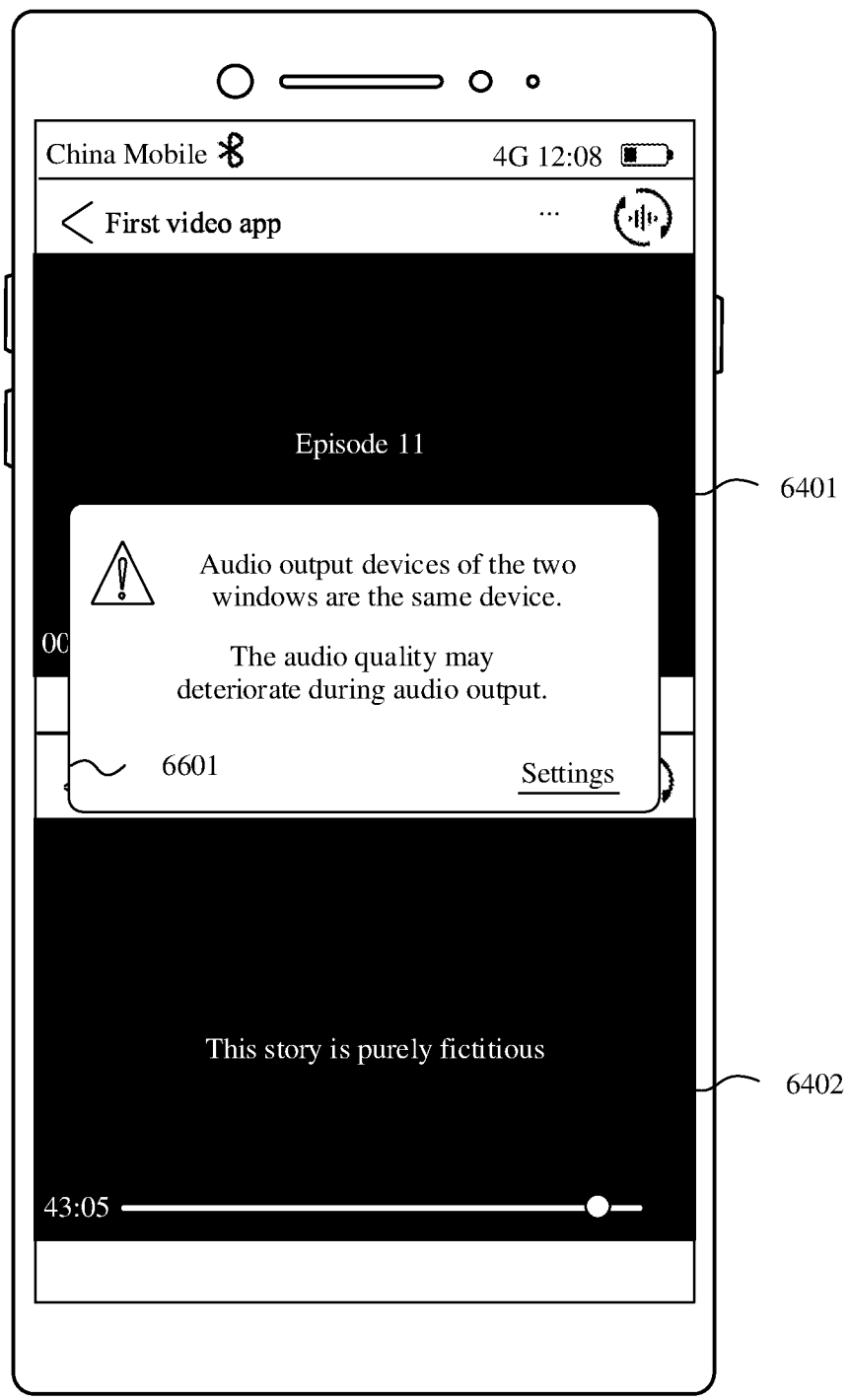
FIG. 66 is a schematic diagram 63 of an audio application scenario according to an embodiment of this application.

In some embodiments, the associated audio output device that is set by the user for the window 6401 may be the same as the associated audio output device that is set by the user for the window 6402. For example, the user selects the local phone in the first dialog box 6501, and the user also selects the local phone in the second dialog box 6502. In this case, as shown in FIG. 66, the mobile phone may display a prompt message 6601, where the prompt message 6601 is used to prompt the user that the window 6401 and the window 6402 are associated with a same audio output device (that is, the mobile phone). Subsequently, the mobile phone may mix the audio data corresponding to the window 6401 and the audio data corresponding to the window 6402, and then output mixed audio data to the speaker of the local phone for play.

In some embodiments, the mobile phone may further provide an entry for the user to modify an association relationship between different windows and different audio output devices. For example, as shown in (a) in FIG. 67, the mobile phone may display a first switching button 6701 of an audio output device in the window 6401, and the mobile phone may display a second switching button 6702 of an audio output device in the window 6402. If it is detected that the user taps the first switching button 6701, similar to FIG. 65, the mobile phone may display one or more currently detected electronic devices that each have an audio play function in a dialog box 6703 for user selection. If the user selects an electronic device other than the Bluetooth headset, for example, the user selects the local phone in the dialog box 6703, namely, the mobile phone, it indicates that the user wants the mobile phone, to play the audio data that is output by the audio task in the window 6401. In this case, in response to the user operation, the mobile phone may modify the association relationship between the window 6401 and the Bluetooth headset to an association relationship between the window 6401 and the mobile phone.

Figure 67:
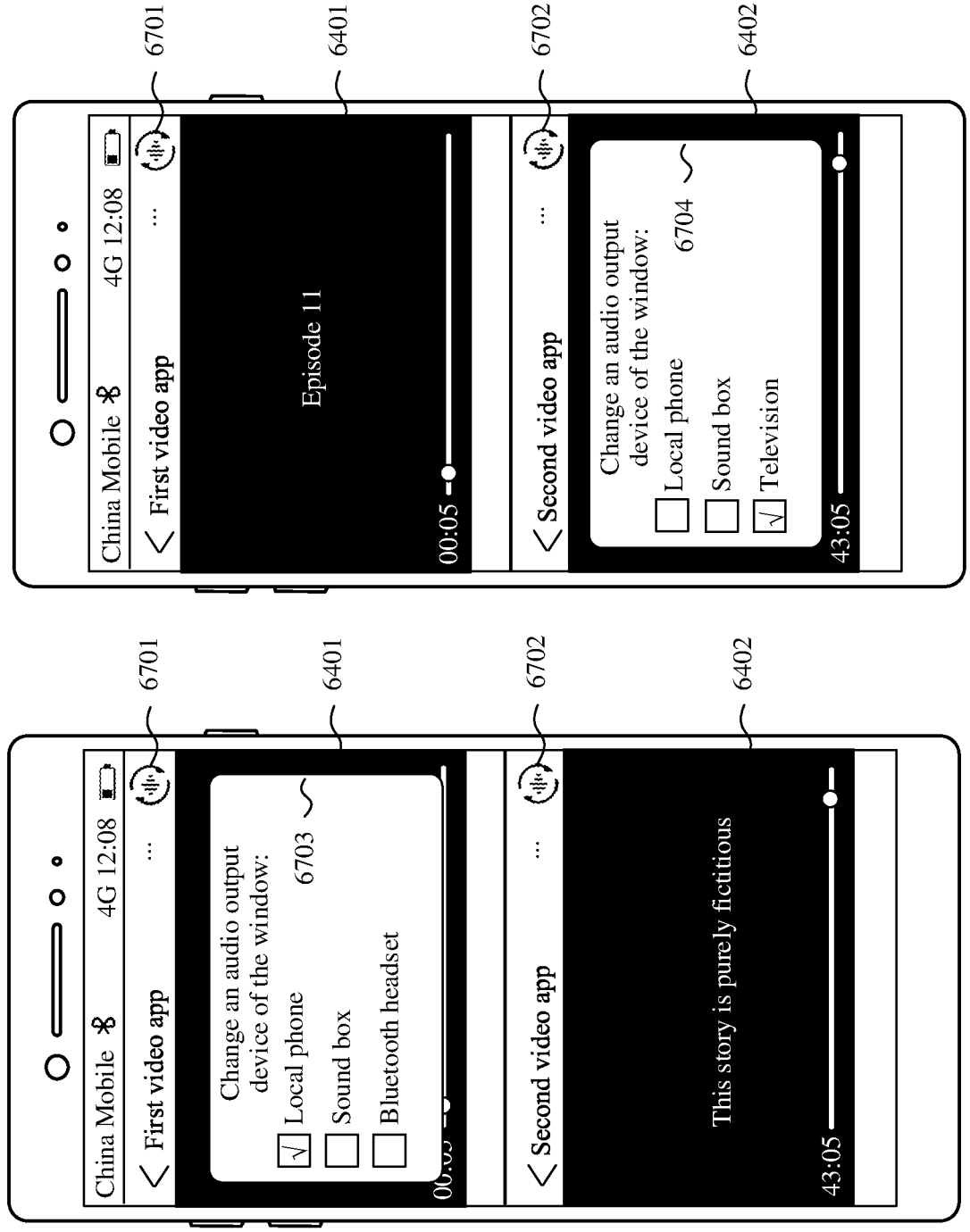
FIG. 67 is a schematic diagram 64 of an audio application scenario according to an embodiment of this application.

Similarly, as shown in (b) in FIG. 67, if it is detected that the user taps the second switching button 6702, the mobile phone may display one or more currently detected electronic devices that each have an audio play function in a dialog box 6704 for user selection. If the user selects an electronic device other than the sound box, for example, the user selects a television in the dialog box 6704, it indicates that the user wants the television to play the audio data that is output by the audio task in the window 6402. In this case, in response to the user operation, the mobile phone may modify the association relationship between the window 6402 and the sound box to an association relationship between the window 6402 and the television.

Certainly, in addition to a switching button (for example, the first switching button 6701 or the second switching button 6702) in a window, a person skilled in the art may further set another manner to modify the association relationship between a window and an audio output device. For example, if it is detected that the user enters a touch and hold operation in the window 6402, the mobile phone may display the dialog box 6704, to help the user change the audio output device corresponding to the window 6402. This is not limited in this embodiment of this application.

In addition, the mobile phone may store the audio output device that is set by the user for each window, that is, store the association relationship between different windows and different audio output devices. After the mobile phone enters the split-screen mode again, the mobile phone may send, based on the stored association relationship between a window and an audio output device, audio data corresponding to a window to a corresponding audio output device for play.

Certainly, in addition to that the user manually sets the audio output device associated with each window in the split-screen mode, the mobile phone may alternatively obtain the association relationship between different windows and different audio output devices from the server. Alternatively, the mobile phone may automatically set, based on types of applications in different windows or types of audio data, audio output devices associated with the windows. For example, if an audio task created by Music in the window 6402 outputs audio data of the MUSIC type, the mobile phone may automatically send the audio data of the MUSIC type to the sound box for play. This is not limited in this embodiment of this application.

It may be learned that, in this embodiment of this application, the master device (for example, the mobile phone) may set the association relationship between different windows and different audio output devices at a granularity of a window. In a multi-window and multi-audio task concurrency scenario, the mobile phone may send, to a corresponding audio output device for play, audio data that is output by a related audio task in each window. In this way, a plurality of channels of concurrent audio data of the master device do not interfere with each other, the plurality of channels of audio data may be played to different users by using different audio output devices, and each user may listen to corresponding audio data by using an audio output device associated with a related window, without being affected by audio data from another window. This improves user audio experience.

Figure 68:
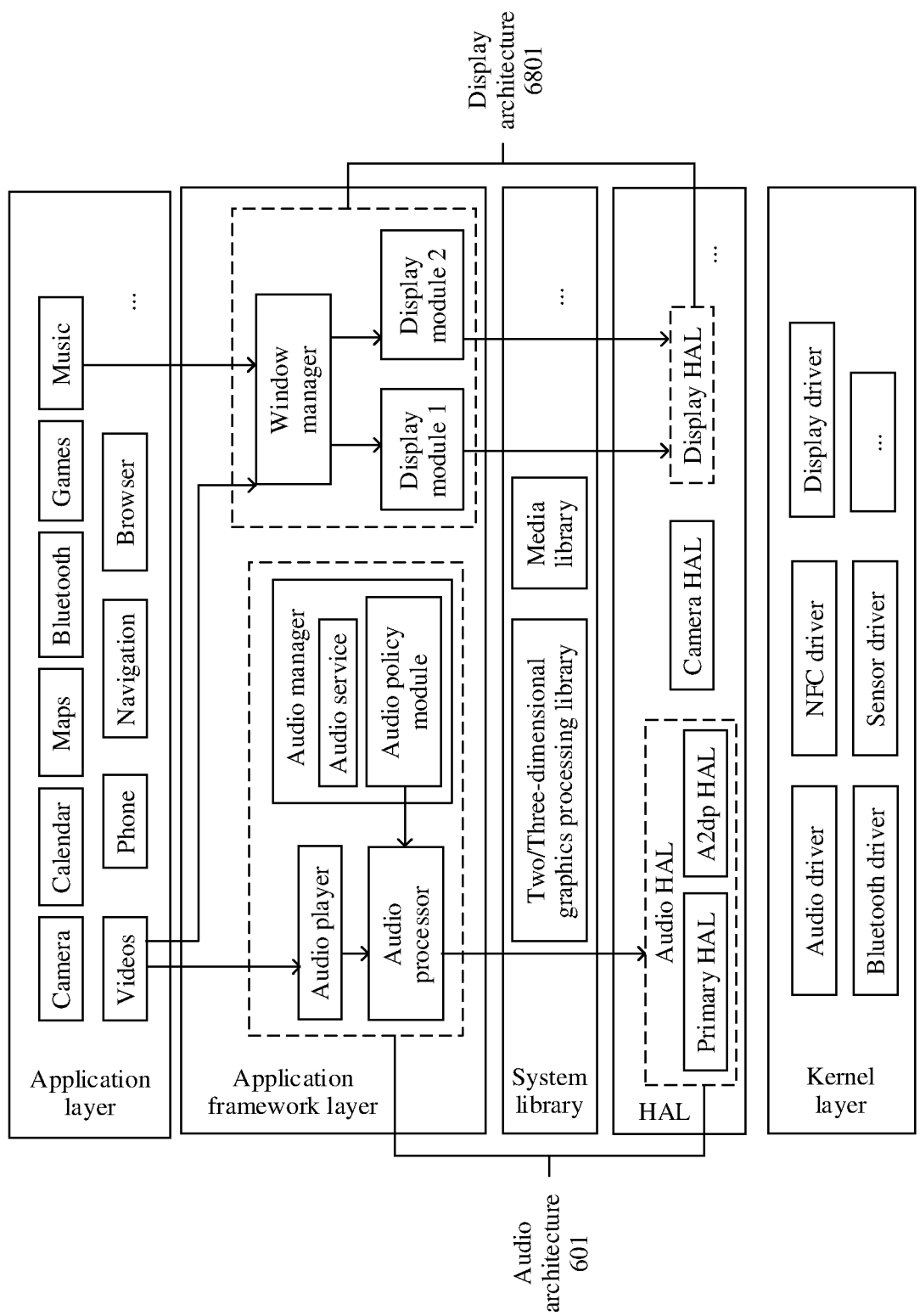
FIG. 68 is a schematic diagram 65 of an audio application scenario according to an embodiment of this application.

An example in which the mobile phone is a master device is still used. FIG. 6 is a schematic diagram of an architecture of the Android system in the mobile phone. An audio architecture 601 for implementing an audio function is disposed in the Android system. Based on the Android system shown in FIG. 6, as shown in FIG. 68, a display architecture 6801 for implementing a display function is further disposed in the Android system. At the application framework layer, the display architecture 6801 may include a window manager (WindowManager) and a display module.

Videos is still used as an example. Videos may output a series of drawing instructions of to-be-displayed display data to the window manager. For example, the drawing instruction may be an OpenGL instruction. The window manager may create a corresponding display module, and draw corresponding display data in the display module according to the drawing instructions delivered by Videos. For example, the window manager may query whether the mobile phone is currently in a split-screen mode. If the mobile phone is not in the split-screen mode, the window manager may create one display module, where the display module is configured to provide display data for the display. Further, the window manager may draw the to-be-displayed display data of Videos in the display module according to the received drawing instructions. Subsequently, the window manager may send, by using a display HAL, the display data in the display module to the display for display. In other words, in a non-split-screen mode, the mobile phone may use an entire display area in the display as a window to display the display data of Videos.

If the mobile phone is in the split-screen mode, the window manager may create a plurality of display modules, where each display module corresponds to one window in the display. For example, still as shown in FIG. 68, in the split-screen mode, the mobile phone may divide the display area in the display into two windows by default. In this case, if it is detected that the user enters an operation of enabling the split-screen mode, the window manager may create a display module 1 corresponding to a window 1 and a display module 2 corresponding to a window 2. The display module 1 can be understood as virtual storage space, and is configured to store display data that needs to be displayed in the window 1. Similarly, the display module 2 can also be understood as virtual storage space, and is configured to store display data that needs to be displayed in the window 2. If Videos runs in the window 1, after receiving a drawing instruction from Videos, the window manager may draw corresponding display data 1 in the display module 1 according to the drawing instruction. Subsequently, the window manager may send, by using the display HAL, the display data 1 in the display module 1 to the window 1 in the display for display. Similarly, an application (for example, Music) running in the window 2 may also transmit a corresponding drawing instruction to the window manager. The window manager may draw corresponding display data 2 in the display module 2 according to the drawing instruction, and send, by using the display HAL, the display data 2 in the display module 2 to the window 2 in the display for display. In this way, in the split-screen mode, the mobile phone may display display data of a related application in each window at a granularity of a window.

Generally, in the split-screen mode, the display data in the display module 1 and the display data in the display module 2 jointly form display data in the display. In this case, the display HAL may periodically obtain two channels of corresponding display data from the display module 1 and the display module 2, combine the two channels of display data into one channel of display data corresponding to the entire display, and send the channel of display data to the display for display.

The following describes in detail an audio control method in a split-screen scenario with reference to a specific example.

Figure 69:
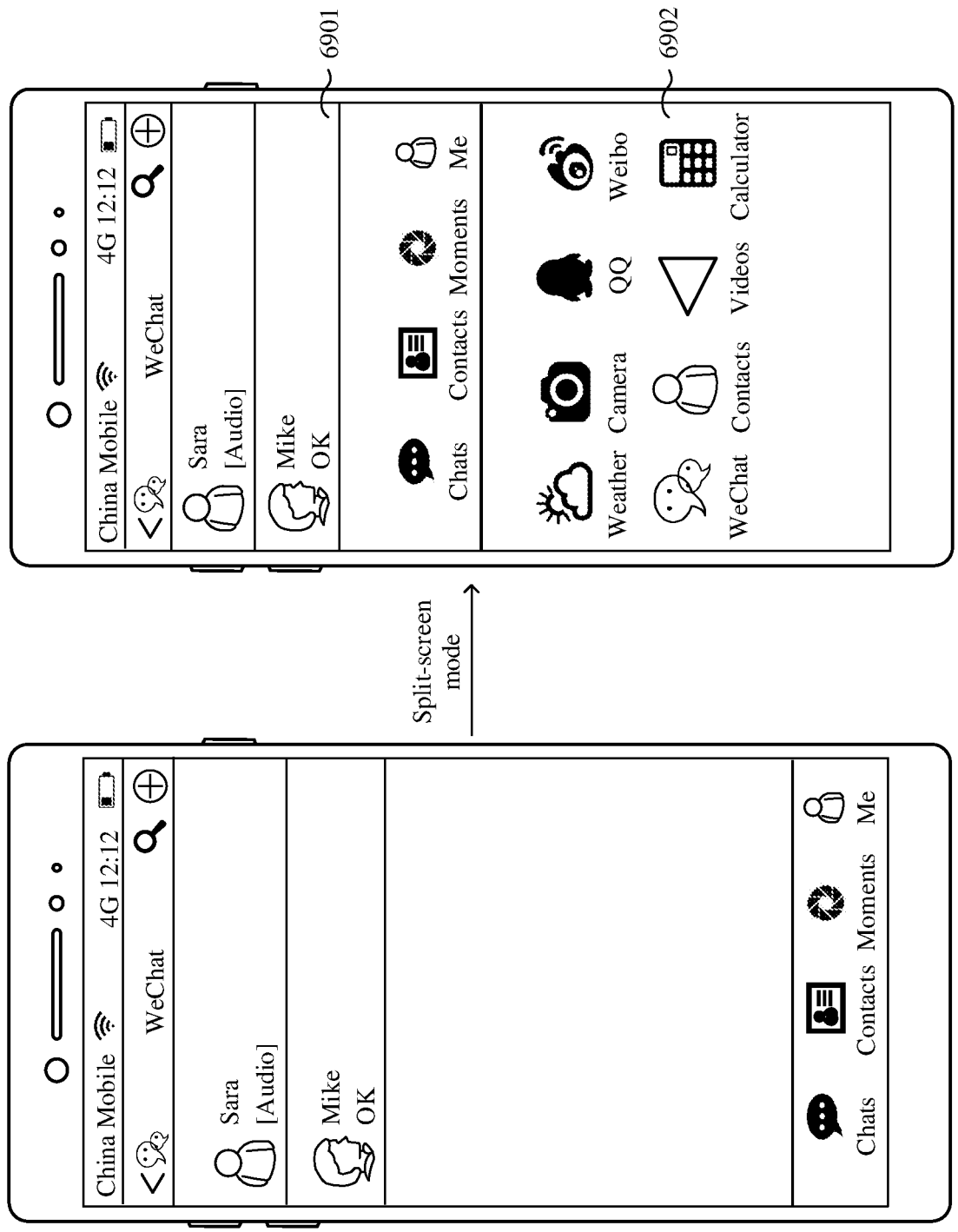
FIG. 69 is a schematic diagram 66 of an audio application scenario according to an embodiment of this application.

For example, the user may enter a preset split-screen operation into the mobile phone (that is, a master device) to trigger the mobile phone to enter a split-screen mode. For example, as shown in (a) in FIG. 69, when the mobile phone runs WeChat, if it is detected that the user draws a straight line on the display by using a knuckle, the mobile phone may enter the split-screen mode in response to the operation. As shown in (b) in FIG. 69, after entering the split-screen mode, the mobile phone may automatically divide the display into two windows, namely, a first window 6901 and a second window 6902. The first window 6901 may be used to continue to run WeChat, and the second window 6902 may be used to display a desktop of the mobile phone. The user may use, in the first window 6901, functions provided by the mobile phone, and may also use, in the second window 6902, functions provided by the mobile phone.

Figure 70:
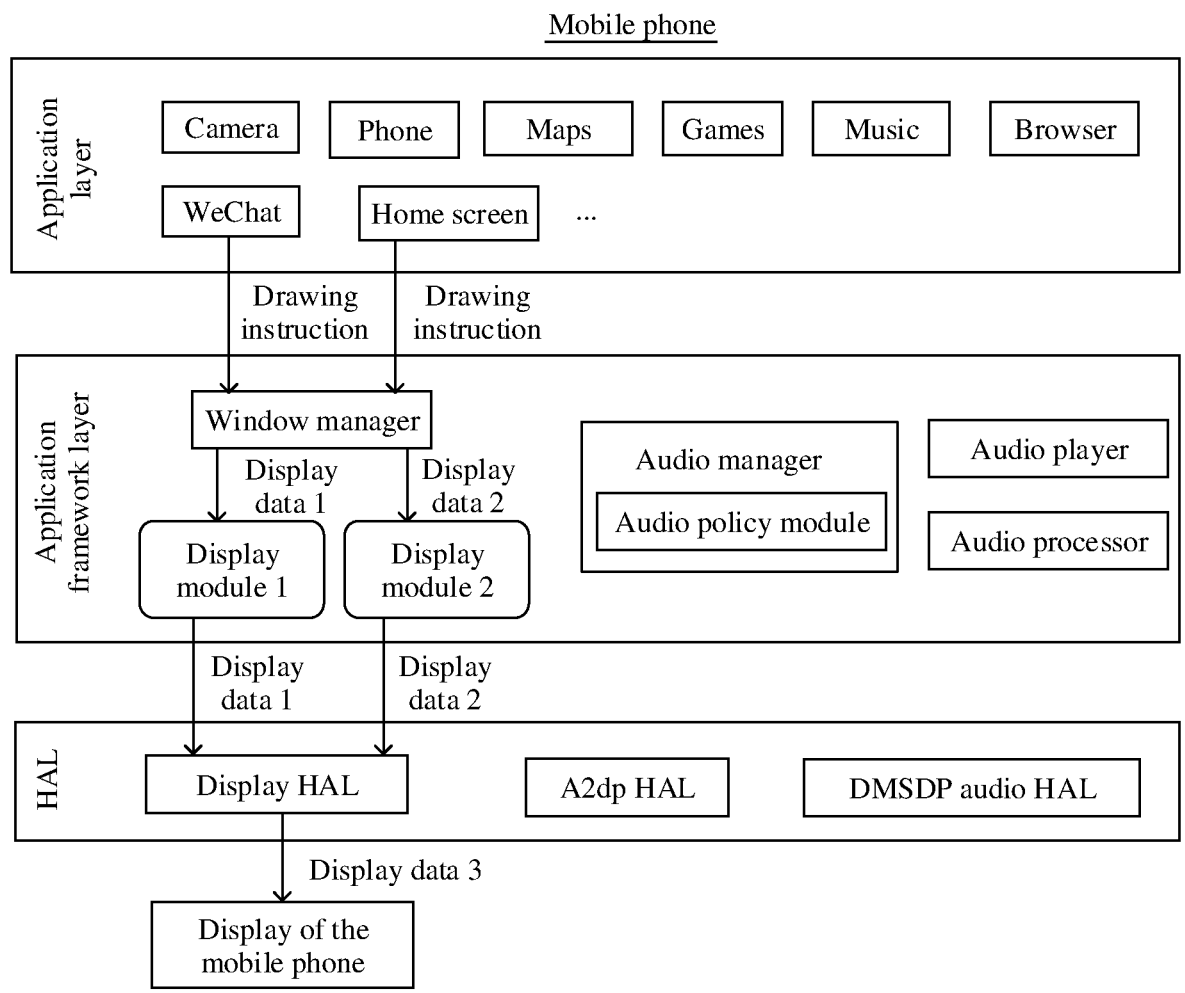
FIG. 70 is a schematic diagram 67 of an audio application scenario according to an embodiment of this application.

For example, before the mobile phone enters the split-screen mode, if WeChat detects an operation that the user draws a straight line on the display by using a knuckle, WeChat may send an indication message to the window manager, to indicate the window manager to enter the split-screen mode. Further, as shown in FIG. 70, in response to the indication message, the window manager may create a display module 1 corresponding to the first window 6901 and a display module 2 corresponding to the second window 6902. The display module 1 and the display module 2 may be distinguished by using different display IDs. The display module 1 is configured to provide corresponding display data for the first window 6901, and the display module 2 is configured to provide corresponding display data for the second window 6902.

After the window manager creates the display module 1 and the display module 2, as shown in FIG. 70, the window manager may receive a drawing instruction from WeChat, and draw display data corresponding to WeChat in the display module 1 according to the drawing instruction. In addition, the window manager may draw the display data 2 of the desktop in the display module 2 by default. Subsequently, the display HAL at the HAL may combine the display data 1 in the display module 1 and the display data 2 in the display module 2 into display data 3 of the entire display, and send the display data 3 to the display of the mobile phone, so that the display displays a display interface shown in (b) in FIG. 69. Certainly, the mobile phone may alternatively run WeChat in the second window 6902, and run the desktop in the first window 6901. Alternatively, in addition to the desktop, the mobile phone may also run another application by default in a window in which WeChat runs. This is not limited in this embodiment of this application.

The Android system is used as an example. Currently, an audio focus (Audio Focus) preemption mechanism is set in the Android system, and only one application can hold an audio focus at a time. Generally, an application that obtains an audio focus has audio play permission. For example, after creating an audio task, an application 1 may invoke a requestAudioFocus( ) interface to obtain an audio focus, and the application 1 that obtains the audio focus (which may be referred to as an audio focus application) may start to execute the audio task to play corresponding audio data. When execution of the audio task ends, the application 1 may invoke abandonAudioFocus( ) to release the audio focus (which may also be referred to as defocus), and stop playing the corresponding audio data. Alternatively, when the application 1 holds the audio focus, if an application 2 invokes the requestAudioFocus( ) interface to apply for obtaining the audio focus, the application 1 may also release the audio focus, so that the application 2 obtains the application 2 and becomes a current audio focus application.

In this embodiment of this application, the mobile phone may set one audio focus (Audio Focus) for each window in the split-screen mode. For example, the first window 6901 may correspond to an audio focus 1, and the second window 6902 may correspond to an audio focus 2. In this way, an audio focus application that obtains the audio focus 1 in the first window 6901 may start to execute a related audio task. Likewise, an audio focus application that obtains the audio focus 2 in the second window 6902 may start to execute a related audio task. In this case, audio tasks in all windows do not interfere with each other. Subsequently, audio data that is output by audio tasks in different windows may also be distributed to different audio output devices for play, so that the pieces of audio data in the windows do not interfere with each other.

For example, the window manager may be configured to manage processes of obtaining and releasing the audio focus 1 in the first window 6901 and processes of obtaining and releasing the audio focus 62 in the second window 902. For example, after the mobile phone enters the split-screen mode, the window manager may create and maintain a correspondence between each window and an audio focus application. For example, as shown in Table 15, an ID of the display module 1 corresponds to a package name of WeChat, that is, the audio focus application in the first window 6901 is WeChat, and WeChat currently holds the audio focus 1 in the first window 6901. An ID of the display module 2 corresponds to a package name of the desktop, that is, the audio focus application in the second window 6902 is the desktop, and the desktop currently holds the audio focus 2 in the second window 6902. Subsequently, if the user opens another application on the desktop displayed in the second window 6902, for example, if an operation that the user opens Videos is detected, Videos may invoke the requestAudioFocus( ) interface to apply to the window manager for obtaining the audio focus 2 of the second window 6902. In response to the application of Videos, the window manager may modify the application package name corresponding to the ID of the display module 2 in Table 15 to a package name of Videos, so that the desktop in the second window 6902 releases the audio focus 2, and Videos in the second window 6902 simultaneously obtains the audio focus 2.

TABLE 15

| Display ID | Package name of the audio focus application |
| --- | --- |
| ID of the display module 1 | Package name of WeChat |
| ID of the display module 2 | Package name of the desktop |

In this way, the window manager may determine a current application corresponding to each window by recording an audio focus application corresponding to each display module. In some embodiments, one window may alternatively run a plurality of applications. For example, a foreground application and a background application may be set in each window at a granularity of a window. For example, WeChat may run in the foreground of the first window 6901, and Music may run in the background of the first window 6901. For another example, Videos may run in the foreground of the second window 6902, and Sports may run in the background of the second window 6902. In this case, as shown in Table 16, applications corresponding to the display module 1 include WeChat and Music, and applications corresponding to the display module 2 include Videos and Sports.

TABLE 16

| Display ID | Package name of the foreground application and/or package name of the background application |
| --- | --- |
| ID of the display module 1 | Package name of WeChat and package name of Music |
| ID of the display module 2 | Package name of Videos and package name of Sports |

In this embodiment of this application, the correspondence between a display module and an application shown in Table 15 or Table 16 may be referred to as application information of each window. The window manager may be configured to record and maintain the application information of each window, so that the mobile phone can determine, based on the application information, a specific application running in each window.

After the mobile phone enters the split-screen mode, the window manager may further set a corresponding audio output device for each window at a granularity of a window. For example, the mobile phone may be connected to one or more audio output devices, that is, the mobile phone may have one or more slave devices. For example, the mobile phone may establish a Bluetooth connection to a Bluetooth headset, and the mobile phone may further establish network connections to a sound box and a television through a Wi-Fi network. In addition, the speaker of the mobile phone may also be used as an audio output device to play audio.

Still in the audio architecture shown in FIG. 68, after establishing a network connection to each slave device, the DV app in the mobile phone may register the slave device with the audio policy module, for example, register an identifier, a device name, a device model, or a device type of the slave device. In this case, the audio manager in the mobile phone may query the audio policy module for specific audio output devices that are currently available to the mobile phone.

Figure 71:
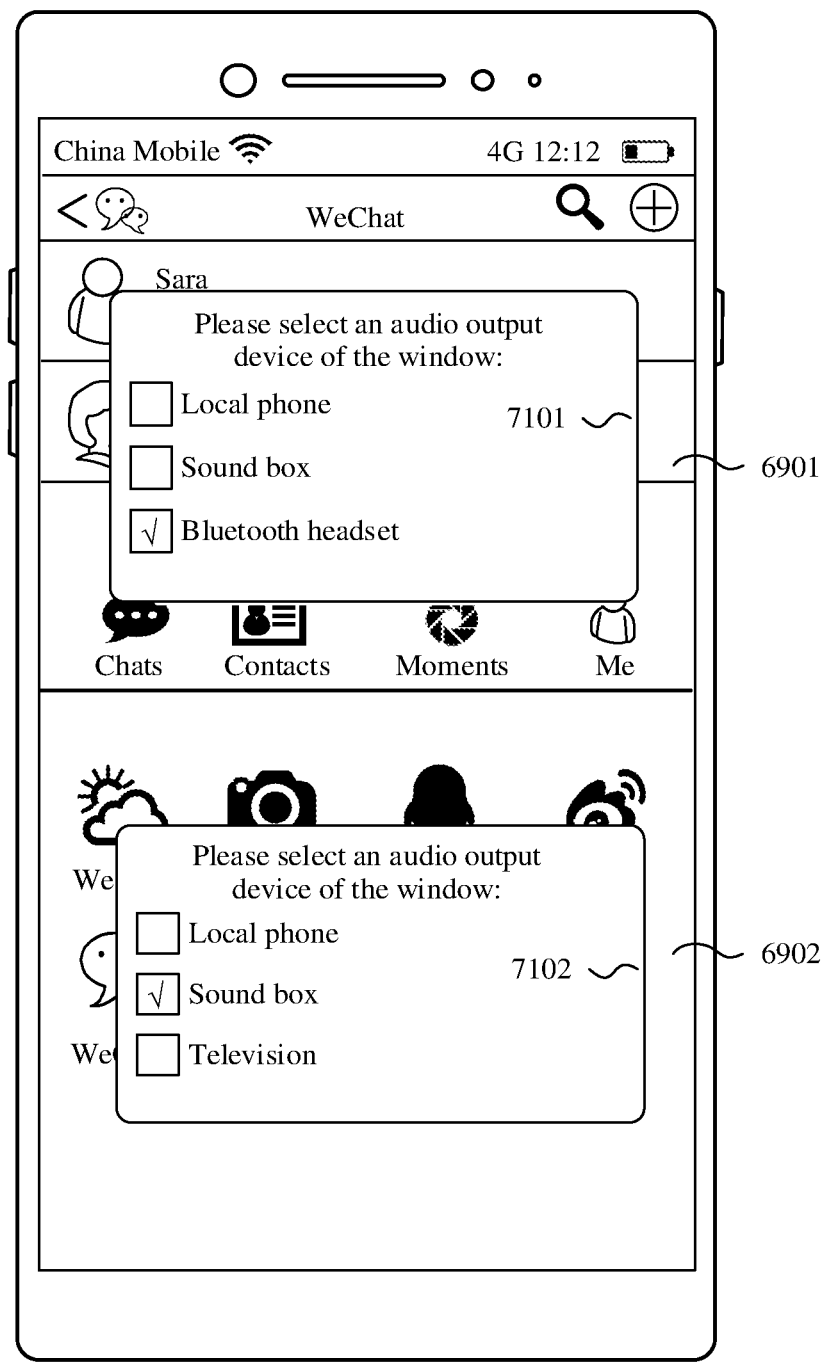
FIG. 71 is a schematic diagram 68 of an audio application scenario according to an embodiment of this application.

For example, the audio focus application in the first window 6901 is WeChat, and the audio focus application in the second window 6902 is Videos. After the mobile phone enters the split-screen mode, the audio manager may query the audio policy module for one or more audio output devices that are currently available to the mobile phone, and notify the window manager of the found audio output devices. Further, as shown in FIG. 71, the window manager may display a first dialog box 7101 in the first window 6901 running WeChat, where the first dialog box 7101 includes one or more audio output devices that are currently available to the mobile phone; and the window manager may display a second dialog box 7102 in the second window 6902 running Videos, where the second dialog box 7102 also includes one or more audio output devices that are currently available to the mobile phone. In this way, the user may select an audio output device associated with the first window 6901 in the first dialog box 7101, and the user may select an audio output device associated with the second window 6902 in the second dialog box 7102.

For example, if it is detected that the user selects a Bluetooth headset in the first dialog box 7101, it indicates that the user wants the Bluetooth headset to play the audio data that is output by the audio task in the first window 6901. In this case, as shown in Table 17, the window manager may establish an association relationship between the display module 1 and the Bluetooth headset, that is, the first window 6901 is associated with the Bluetooth headset. If it is detected that the user selects a sound box in the second dialog box 7102, it indicates that the user wants the sound box to play the audio data that is output by the audio task in the second window 6902. In this case, as shown in Table 17, the window manager may establish an association relationship between the display module 2 and the sound box, that is, the second window 6902 is associated with the sound box. In this way, as shown in Table 17, the window manager may establish and maintain a correspondence between different windows and different audio output devices in the split-screen mode.

TABLE 17

| Display ID | Audio output device |
|---|---|
| ID of the display module 1 | Bluetooth headset |
| ID of the display module 2 | Sound box |

In some embodiments, in addition to setting the corresponding audio output device for each window, the window manager may further set a type of audio data that is allowed to be played by the corresponding audio output device. For example, in the Android system, audio data types may be classified into types such as ALARM (alarm), MUSIC (music), RING (ringtone), SYSTEM (system), NOTIFICATION (notification), DTMF (dual-tone multifrequency), COMMUNICATION (communication), and VOICE_CALL (call) based on specific service functions.

For example, as shown in Table 18, the window manager may set the audio output device associated with the first window 6901 to the Bluetooth headset, and the window manager may set that the Bluetooth headset is allowed to play audio data of the MUSIC (music) type and audio data of the NOTIFICATION (notification) type, but is not allowed to play audio data of the RING (ringtone) type. In this way, when audio data of the MUSIC (music) type or audio data of the NOTIFICATION (notification) type is generated in the first window 6901, the audio data may be output to the Bluetooth headset for play. However, when audio data of the RING (ringtone) type is generated in the first window 6901, the audio data is not output to the Bluetooth headset for play, so that the audio data of the RING (ringtone) type is filtered out for the user when the user uses the Bluetooth headset. Certainly, the window manager may alternatively set, by default, that the audio output device associated with the first window 6901 is allowed to play audio data of all types. This is not limited in this embodiment of this application.

TABLE 18

| Display ID | Audio output device | Type of audio data that is allowed to be played | Type of audio data that is not allowed to be played |
|---|---|---|---|
| ID of the display module 1 | Bluetooth headset | MUSIC (music) and NOTIFICATION (notification) | RING (ringtone) |
| ID of the display module 2 | Sound box | MUSIC (music), RING (ringtone), SYSTEM (system), and NOTIFICATION (notification) | DTMF (dual-tone multifrequency) |

Alternatively, the window manager may set, in Table 18, only a type of audio data that is allowed to be played by an audio output device. In this case, audio data of another type is audio data that is not allowed to be played by the audio output device. Alternatively, the window manager may set, in Table 18, only a type of audio data that is not allowed to be played by an audio output device. In this case, audio data of another type is audio data that is allowed to be played by the audio output device.

Figure 72:
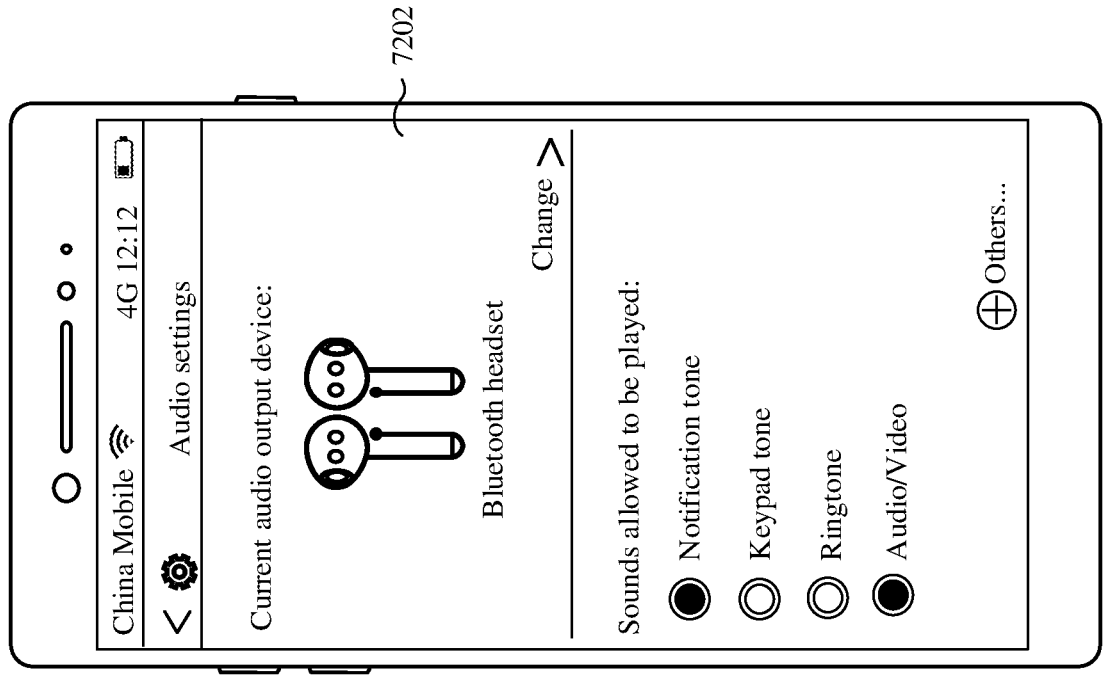
FIG. 72 is a schematic diagram 69 of an audio application scenario according to an embodiment of this application.
Figure 72:
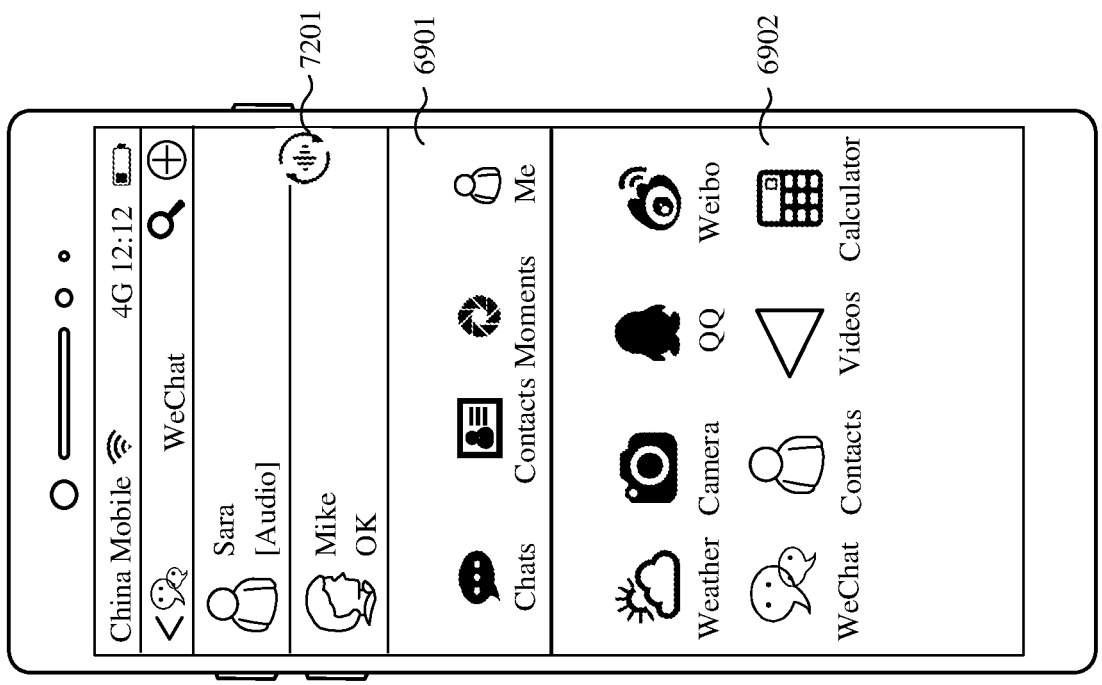

In some embodiments, the user may also manually change an audio output device associated with each window and a type of audio data that is allowed or not allowed to be played by the audio output device. For example, as shown in (a) in FIG. 72, the mobile phone may display a first setting button 7201 in the first window 6901. For example, the first setting button 7201 may be a floating button. If it is detected that the user taps the first setting button 7201, as shown in (b) in FIG. 72, the mobile phone may display a first setting menu 7202. In the first setting menu 7202, the user may reset an audio output device associated with the first window 6901. In addition, in the first setting menu 7202, the user may further set a type of audio data that is allowed or not allowed to be played by an audio output device associated with a current window.

Figure 73:
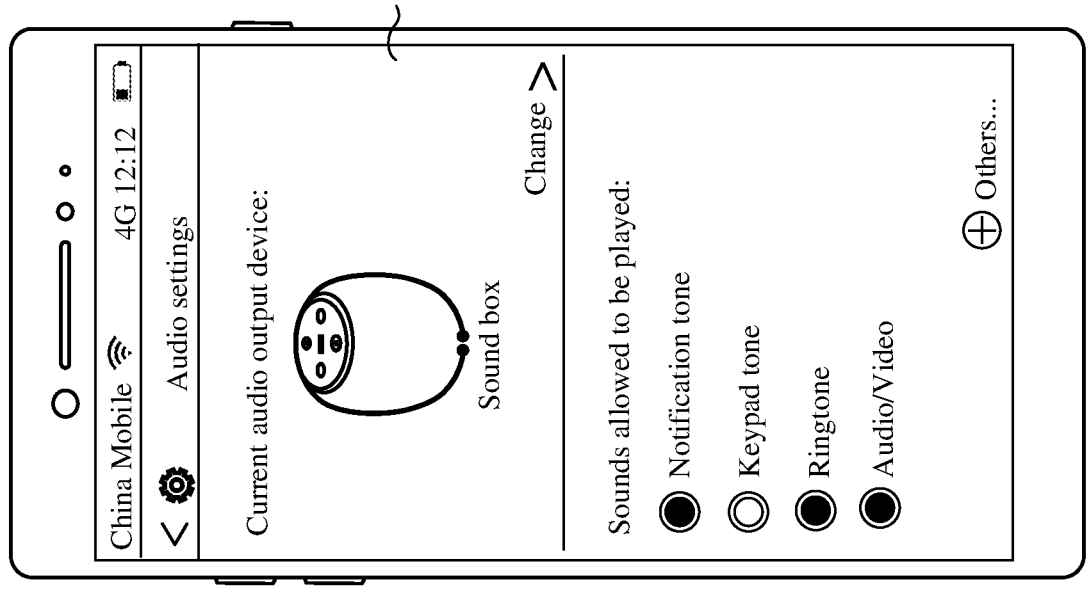
FIG. 73 is a schematic diagram 70 of an audio application scenario according to an embodiment of this application.
Figure 73:
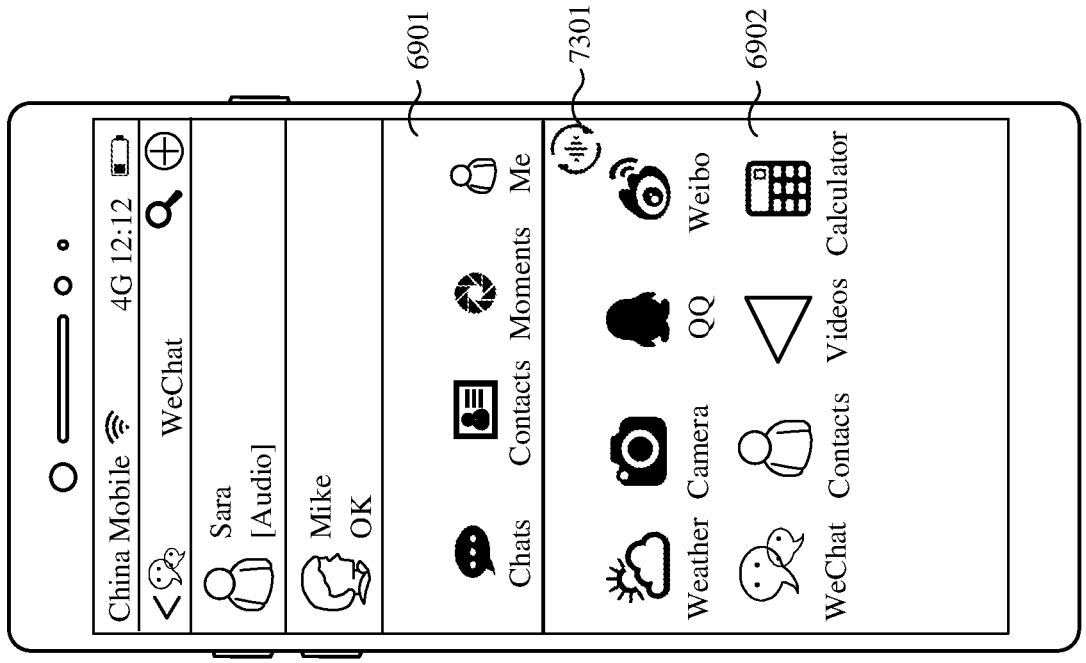

Similarly, as shown in (a) in FIG. 73, the mobile phone may also display a second setting button 7301 in the second window 6902. If it is detected that the user taps the second setting button 7301, as shown in (b) in FIG. 73, the mobile phone may display a second setting menu 7302. In the second setting menu 7302, the user may reset an audio output device associated with the second window 6902. In addition, in the second setting menu 7302, the user may further set a type of audio data that is allowed or not allowed to be played by an audio output device associated with a current window.

Further, the window manager may update a correspondence between different windows, audio output devices, and types of audio data that are allowed or not allowed to be played in Table 18 based on user selection in the first setting menu 7202 or the second setting menu 7302. In this way, the user may set, at a granularity of a window according to a user requirement, an audio output device corresponding to each window and specific audio data that is output on the audio output device, so that audio data in each window can be distributed by the mobile phone to a corresponding audio output device according to user setting for play.

In some embodiments, the window manager may further set volume of playing audio data of each type corresponding to each window. For example, as shown in Table 19, the audio output device corresponding to the display module 1 (that is, the first window 6901) is the Bluetooth headset, and the Bluetooth headset is allowed to play the audio data of the MUSIC (music) type and the audio data of the NOTIFICATION (notification) type. A volume level of playing the audio data of the MUSIC (music) type is level 15, and a volume level of playing the audio data of the NOTIFICATION (notification) type is level 10. The audio output device corresponding to the display module 2 (that is, the second window 6902) is the sound box, and the sound box is allowed to play the audio data of the MUSIC (music) type, the audio data of the RING (ringtone) type, and the audio data of the NOTIFICATION (notification) type. A volume level of playing the audio data of the MUSIC (music) type is level 12, a volume level of playing the audio data of the RING (ringtone) type is level 8, and a volume level of playing the audio data of the NOTIFICATION (notification) type is level 6.

TABLE 19

| Display ID | Audio output device | Type of audio data that is allowed to be played | Volume level |
| --- | --- | --- | --- |
| ID of the display module 1 | Bluetooth headset | MUSIC (music) | 15 |
| | | NOTIFICATION (notification) | 10 |
| ID of the display module 2 | Sound box | MUSIC (music) | 12 |
| | | RING (ringtone) | 8 |
| | | NOTIFICATION (notification) | 6 |
| ... | | | ... |

Figure 74:
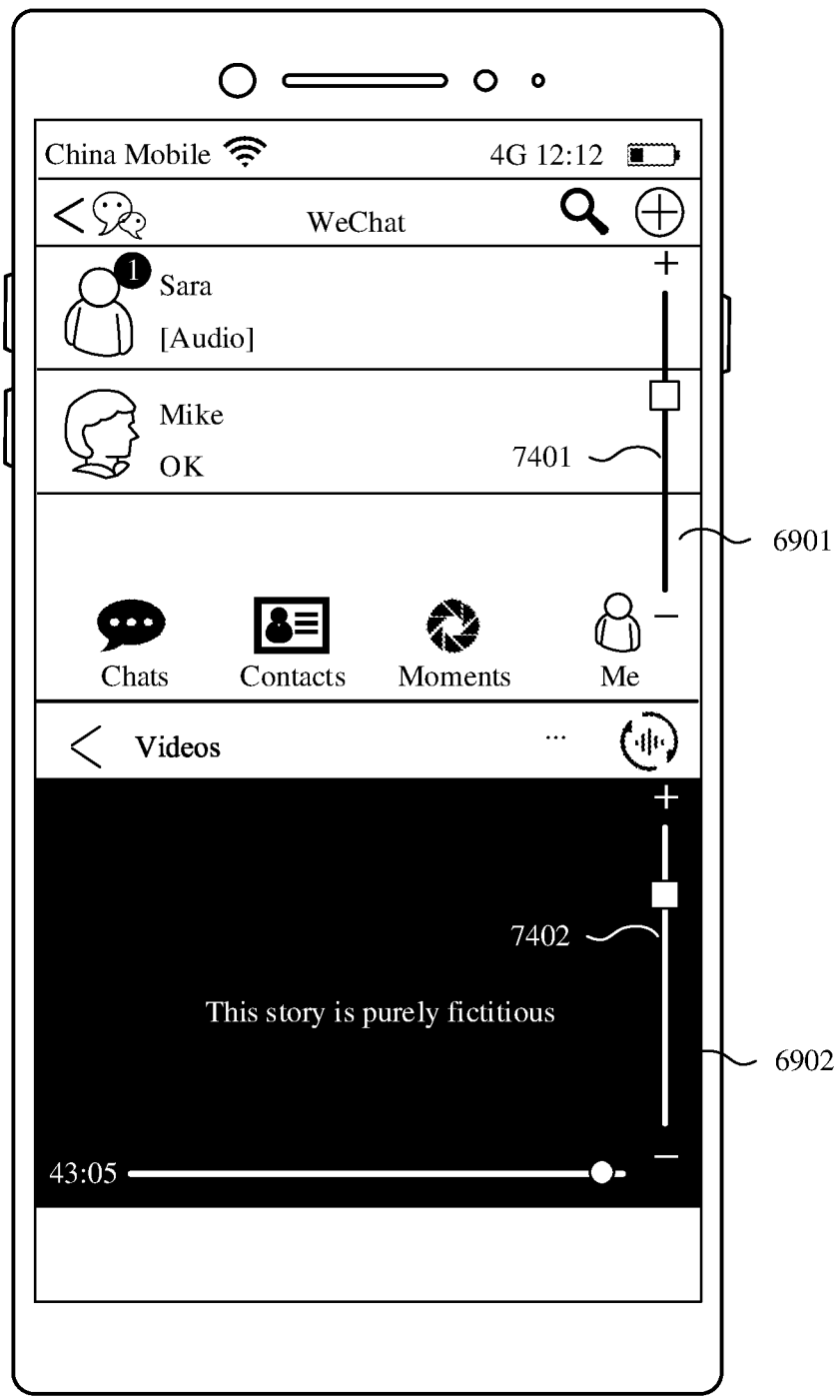
FIG. 74 is a schematic diagram 71 of an audio application scenario according to an embodiment of this application.

For example, the user may manually adjust volume of playing audio data of each type corresponding to each window. As shown in FIG. 74, when the mobile phone runs WeChat in the first window 6901, if a new message sent by a contact Sara is received, WeChat may generate a notification prompt tone of the NOTIFICATION (notification) type. In this case, if the user wants to adjust volume of the notification prompt tone in the first window 6901, the user may trigger, by using a preset gesture, the mobile phone to display a volume adjustment bar 7401 in the first window 6901. In this way, the user may adjust the volume of the notification prompt tone in the first window 6901 by adjusting a location of a sliding block on the volume adjustment bar 7401. In this case, the window manager may adjust, based on the location of the sliding block on the volume adjustment bar 7401, the volume level of playing the audio data of the NOTIFICATION (notification) type corresponding to the display module 1 in Table 19.

Similarly, when the audio data of the MUSIC (music) type is played in the first window 6901, the user may also trigger, by using the volume adjustment bar 7401 in the first window 6901, the window manager to adjust the volume level of playing the audio data of the MUSIC (music) type corresponding to the display module 1. In addition, when no audio task is being played in the first window 6901, if it is detected that the user adjusts the location of the sliding block on the volume adjustment bar 7401, the window manager may adjust, by default, a volume level of playing audio data of a type (for example, the MUSIC type) corresponding to the display module 1. Alternatively, when pieces of audio data of a plurality of types are simultaneously played in the first window 6901, the window manager may adjust, by default, a volume level of playing audio data of a type corresponding to the display module 1.

Similarly, still as shown in FIG. 74, when running Videos in the second window 6902, the mobile phone may also display a volume adjustment bar 7402 in the second window 6902. Because audio data generated when Videos runs is audio data of the MUSIC (music) type, if the mobile phone detects that the user adjusts a sliding block on the volume adjustment bar 7402, the window manager may adjust, based on a location of the sliding block on the volume adjustment bar 7402, the volume level of playing the audio data of the MUSIC (music) type corresponding to the display module 2 in Table 19.

Likewise, if the audio data of the RING (ringtone) type is being played in the second window 6902, the user may also trigger, by using the volume adjustment bar 7402 in the second window 6902, the window manager to adjust the volume level of playing the audio data of the RING (ringtone) type corresponding to the display module 2. If the audio data of the NOTIFICATION (notification) type is being played in the second window 6902, the user may also trigger, by using the volume adjustment bar 7402 in the second window 6902, the window manager to adjust the volume level of playing the audio data of the NOTIFICATION (notification) type corresponding to the display module 2. If no audio task is being played in the second window 6902, if it is detected that the user adjusts the location of the sliding block on the volume adjustment bar 7402, the window manager may adjust, by default, a volume level of playing audio data of a type (for example, the MUSIC type) corresponding to the display module 2. Alternatively, when pieces of audio data of a plurality of types are simultaneously played in the second window 6902, the window manager may adjust, by default, a volume level of playing audio data of a type corresponding to the display module 2.

Certainly, the mobile phone may alternatively set, in the first setting menu 7202 or the second setting menu 7302, an option for adjusting volume of audio data of each type, so that the user can manually set volume of playing audio data of each type in different windows and different audio output devices. This is not limited in this embodiment of this application.

In this embodiment of this application, specific audio configuration content including the association relationship between different windows and different audio output devices shown in Table 17 to Table 19 may be referred to as audio configuration information of each window. For example, audio configuration information of the first window 6901 (that is, the display module 1) includes an associated audio output device, and may further include a type of audio data that is allowed and/or not allowed to be played by the audio output device and a volume level of audio data that is allowed to be played.

In other words, in the split-screen mode, the window manager may establish and maintain the application information of each window (for example, the correspondence between different display modules and corresponding applications shown in Table 15 or Table 16), and the window manager may establish and maintain the audio configuration information of each window (for example, the audio configuration information shown in any one of Table 17 to Table 19). In this way, after applications in different windows in the mobile phone create corresponding audio tasks, the mobile phone may manage audio data corresponding to the windows at a granularity of a window based on the application information and the audio configuration information of the windows, so that pieces of audio data that are output by the audio tasks in the windows do not interfere with each other.

Figure 75:
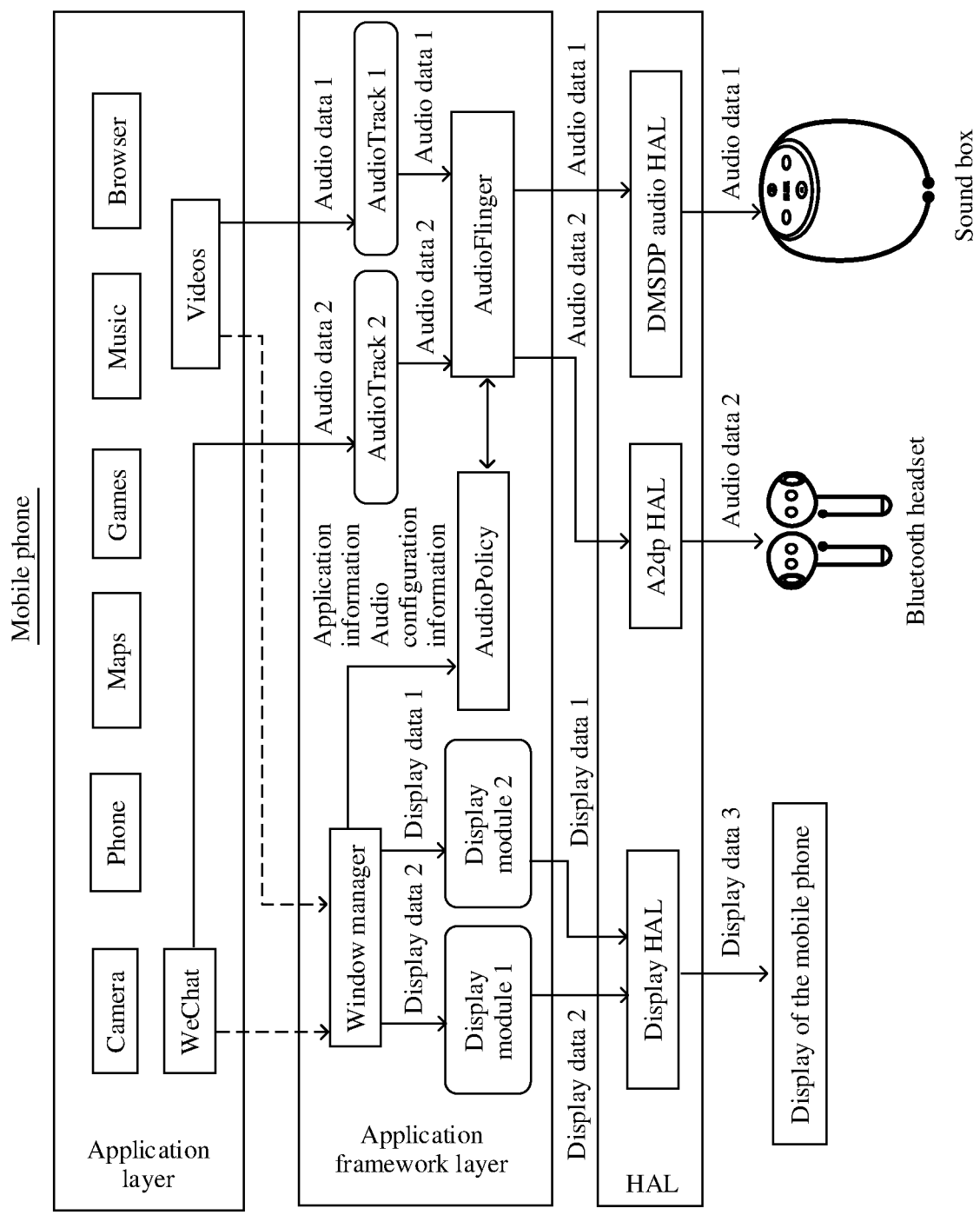
FIG. 75 is a schematic diagram 72 of an audio application scenario according to an embodiment of this application.

For example, as shown in FIG. 75, in the split-screen mode, the window manager may send the application information and the audio configuration information of each window to the audio manager, for example, to an audio policy module (for example, AudioPolicy) of the audio manager. In addition, when the window manager detects that application information or audio configuration information of a window changes, the window manager may dynamically update the application information or audio configuration information of the window, and send latest application information or audio configuration information of each window to AudioPolicy.

An example in which the audio focus application in the first window 6901 is WeChat and the audio focus application in the second window 6902 is Videos is still used. If it is detected that the user taps a play button of Videos in the second window 6902, Videos may create an audio task 1 for playing audio data in a video, and may further create a display task 1 for playing display data in the video.

Still as shown in FIG. 75, for the display task 1, Videos may deliver a related drawing instruction (a dashed-line arrow from Videos in FIG. 75) to the window manager. Because the window manager has established a correspondence between the display module 2 and the second window 6902 when creating the display module 2, after the window manager receives the drawing instruction delivered by Videos in the second window 6902, the window manager may draw display data 1 of Videos in the corresponding display module 2 according to the drawing instruction delivered by Videos.

For the audio task 1, Videos may create a corresponding audio player 1 (for example, AudioTrack 1), and send, to AudioTrack 1, audio data 1 to be played by Videos. AudioTrack 1 may send the audio data 1 from Videos to an audio processor (for example, AudioFlinger), and AudioFlinger performs processing such as sampling or sound effect adding on the audio data 1.

In this embodiment of this application, as shown in FIG. 75, after receiving the audio data 1, AudioFlinger may send a query request to AudioPolicy, to request AudioPolicy to query a specific audio output device corresponding to the audio data 1. For example, when creating AudioTrack 1, Videos may associate AudioTrack 1 with Videos, for example, establish a correspondence between AudioTrack 1 and a package name of Videos. When receiving the audio data 1, AudioFlinger may determine, based on the foregoing correspondence, that the received audio data 1 is video data from Videos. Further, AudioFlinger may add the package name of Videos to the query request and send the query request to AudioPolicy.

After receiving the query request sent by AudioFlinger, AudioPolicy may query, based on the package name of Videos in the query request, a specific window in which Videos runs. For example, as shown in Table 15, if the package name of Videos corresponds to the ID of the display module 2, it indicates that Videos is an audio focus application currently running in the second window 6902, that is, Videos holds the audio focus 2 in the second window 6902 and has audio data play permission. Further, AudioPolicy may determine an audio output device corresponding to the display module 2 based on the audio configuration information of each window that is delivered by the window manager.

In some embodiments, Videos may also be associated with a process ID of Videos in created AudioTrack 1. A plurality of processes may be created when Videos runs. In other words, Videos may correspond to a plurality of process IDs, and an audio task created in each process may have corresponding AudioTrack. In this case, the window manager may send a correspondence between a window, an audio focus application, and different process IDs in the audio focus application to AudioPolicy. In this way, AudioPolicy may also determine, based on the process ID associated with AudioTrack 1, that the audio data 1 is audio data from Videos. Further, AudioPolicy may query, according to the foregoing method, a specific window in which Videos runs, that is, a display module corresponding to Videos.

The audio configuration information of each window shown in Table 17 is used as an example. After AudioPolicy determines that the audio data 1 from Videos corresponds to the display module 2, AudioPolicy may determine, based on the audio configuration information shown in Table 17, that the audio output device corresponding to the display module 2 is the sound box. Further, AudioPolicy may send an indication message to AudioFlinger, where the indication message indicates AudioFlinger to send, by using a DMSDP audio HAL, processed audio data 1 to the sound box for play.

The audio configuration information of each window shown in Table 18 is used as another example. The query request sent by AudioFlinger to AudioPolicy may further carry a type identifier of the audio data 1. For example, the audio data 1 is audio data of the MUSIC (music) type. Further, after AudioPolicy determines that the audio data 1 corresponds to the display module 2, AudioPolicy may determine, based on the audio configuration information shown in Table 18, that the audio output device corresponding to the display module 2 is the sound box. In addition, AudioPolicy may determine, based on the audio configuration information shown in Table 18, that the sound box is allowed to play the audio data of the MUSIC (music) type, that is, the sound box is allowed to play the audio data 1. Further, AudioPolicy may send an indication message to AudioFlinger, where the indication message indicates AudioFlinger to send, by using a DMSDP audio HAL, processed audio data 1 to the sound box for play.

In some embodiments, if the audio output device corresponding to the audio data 1 is the sound box, but the sound box is not allowed to play the audio data of this type, namely, the audio data 1, AudioPolicy may re-determine an audio output device corresponding to the audio data 1. For example, AudioPolicy may use the speaker of the local phone as an audio output device by default to play the audio data 1. Alternatively, AudioPolicy may use an audio output device that is connected to the mobile phone most recently other than the sound box as an audio output device to play the audio data 1. Certainly, AudioPolicy may alternatively determine that there is no audio output device corresponding to the audio data 1, that is, no audio output device is used to play the audio data 1. This is not limited in this embodiment of this application.

The audio configuration information of each window shown in Table 19 is used as another example. After AudioPolicy determines that the audio data 1 from Videos corresponds to the display module 2, AudioPolicy may determine, based on the audio configuration information shown in Table 19, that the audio output device corresponding to the display module 2 is the sound box. In addition, AudioPolicy may determine, based on the audio configuration information shown in Table 19, that the sound box is allowed to play the audio data of the MUSIC (music) type, and a volume level of play is level 12. Further, AudioPolicy may send an indication message to AudioFlinger, where the indication message may indicate AudioFlinger to send, by using a DMSDP audio HAL, processed audio data 1 to the sound box for play, and may also indicate that a volume level of the audio data 1 is level 12. In this way, in response to the indication message, AudioFlinger may increase or decrease a gain of an audio signal in the audio data 1 based on the volume level, namely, level 12, and send, by using the DMSDP audio HAL, the output audio data 1 to the sound box for play.

Figure 76:
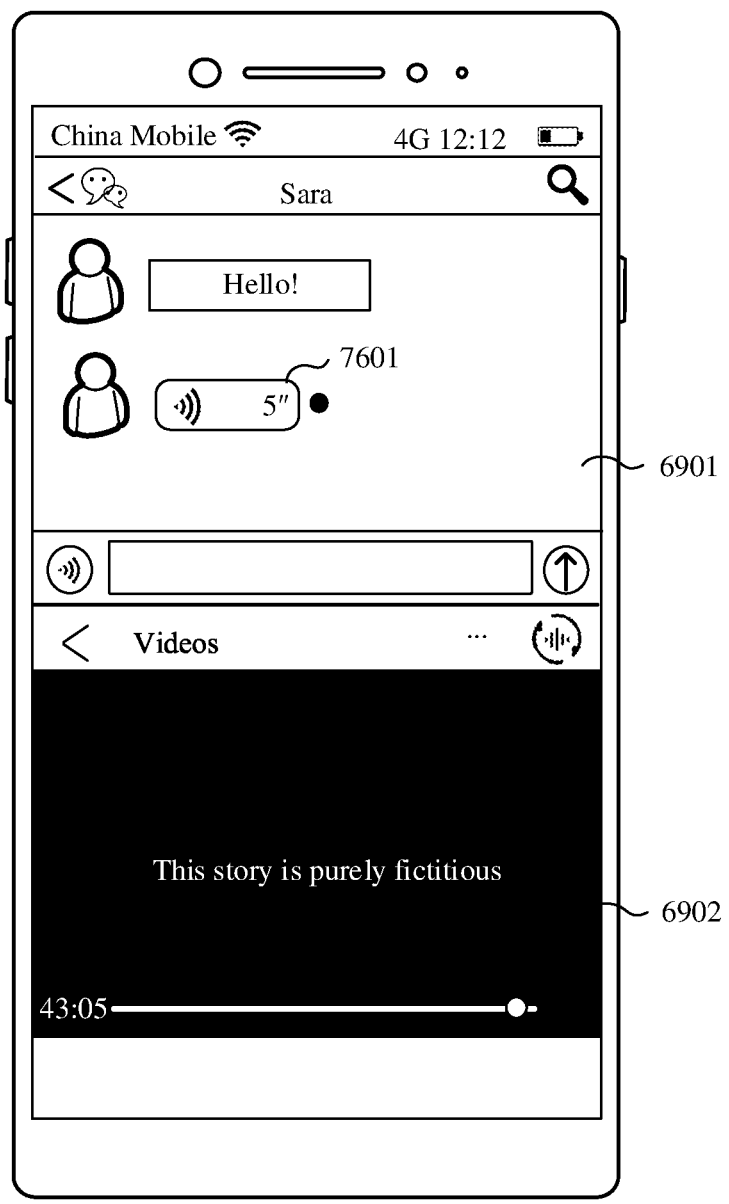
FIG. 76 is a schematic diagram 73 of an audio application scenario according to an embodiment of this application.

In some embodiments, in the split-screen mode, a plurality of audio tasks in a plurality of windows may be concurrently played. For example, as shown in FIG. 76, when Videos in the second window 6902 creates the audio task 1 to play the video, if the user simultaneously taps a voice message 7601 in WeChat in the first window 6901, WeChat may create an audio task 2 for playing the voice message 7601, and may further create a display task 2 for displaying an application interface in WeChat.

Similar to the display task 1, still as shown in FIG. 75, for the display task 2, WeChat may deliver a related drawing instruction (for example, a dashed-line arrow from WeChat in FIG. 75) to the window manager. Because the window manager has established a correspondence between the display module 1 and the first window 6901 when creating the display module 1, after the window manager receives the drawing instruction delivered by WeChat in the first window 6901, the window manager may draw the display data 2 corresponding to the application interface of WeChat in the corresponding display module 1 according to the drawing instruction delivered by WeChat.

For example, still as shown in FIG. 75, the display HAL at the HAL may periodically obtain corresponding display data from the display module 1 and the display module 2 based on a specific frame rate. For example, the display HAL obtains the display data 2 from the display module 1 and obtains the display data 1 from the display module 2. The display HAL may synthesize the display data 1 and the display data 2 into display data 3 corresponding to the display of the mobile phone. Further, the display HAL may send the display data 3 to the display of the mobile phone for display, so that the display can display the first window 6901 and the second window 6902 shown in FIG. 76.

For the audio task 2, still as shown in FIG. 75, similar to the audio task 1, WeChat may create a corresponding audio player 2 (for example, AudioTrack 2), and send, to AudioTrack 2, audio data (that is, the audio data 2) of the voice message 7601 to be played in WeChat. AudioTrack 2 may send the audio data 2 from WeChat to an audio processor (for example, AudioFlinger), and AudioFlinger performs processing such as sampling or sound effect adding on the audio data 2.

Likewise, after receiving the audio data 2, AudioFlinger may add the package name of WeChat to a query request and send the query request to AudioPolicy, to request AudioPolicy to query a specific audio output device corresponding to the audio data 2. After receiving the query request sent by AudioFlinger, AudioPolicy may query, based on the package name of WeChat in the query request, a specific window in which WeChat runs. For example, as shown in Table 16, if the package name of WeChat corresponds to the ID of the display module 1, it indicates that WeChat currently runs in the first window 6901. Further, AudioPolicy may determine an audio output device corresponding to the display module 1 based on the audio configuration information of each window that is delivered by the window manager.

The audio configuration information of each window shown in Table 17 is used as an example. AudioPolicy may determine, based on the audio configuration information shown in Table 17, that the audio output device corresponding to the display module 1 is the Bluetooth headset. Further, AudioPolicy may send an indication message to AudioFlinger, where the indication message indicates AudioFlinger to send, by using the DMSDP audio HAL, processed audio data 2 to the Bluetooth headset for play.

The audio configuration information of each window shown in Table 18 is used as another example. The query request sent by AudioFlinger to AudioPolicy may further carry a type identifier of the audio data 2. For example, the audio data 2 is audio data of the MUSIC (music) type. Further, AudioPolicy may determine, based on the audio configuration information shown in Table 18, that the audio output device corresponding to the display module 1 is the Bluetooth headset. In addition, AudioPolicy may determine, based on the audio configuration information shown in Table 18, that the Bluetooth headset is allowed to play the audio data of the MUSIC (music) type, that is, the Bluetooth headset is allowed to play the audio data 2. Further, AudioPolicy may send an indication message to AudioFlinger, where the indication message indicates AudioFlinger to send, by using an A2dp HAL, processed audio data 2 to the Bluetooth headset for play.

The audio configuration information of each window shown in Table 19 is used as another example. AudioPolicy may determine, based on the audio configuration information shown in Table 19, that the audio output device corresponding to the display module 1 is the Bluetooth headset. In addition, AudioPolicy may determine, based on the audio configuration information shown in Table 19, that the Bluetooth headset is allowed to play the audio data of the MUSIC (music) type, and a volume level of play is level 15. Further, AudioPolicy may send an indication message to AudioFlinger, where the indication message may indicate AudioFlinger to send, by using an A2dp HAL, processed audio data 2 to the Bluetooth headset for play, and may further indicate that a volume level of the audio data 2 is level 15. In this way, in response to the indication message, AudioFlinger may increase or decrease a gain of an audio signal in the audio data 2 based on the volume level, namely, level 15, and send, by using the A2dp HAL, the output audio data 2 to the Bluetooth headset for play.

In other words, when an audio task in the first window 6901 and an audio task in the second window 6902 are concurrently played, at a granularity of a window based on the application information and the audio configuration information of each window that are delivered by the window manager, AudioPolicy may send, to a first audio output device (for example, the Bluetooth headset) for play, audio data that is output by the audio task in the first window 6901, and send, to a second audio output device (for example, the sound box) for play, audio data that is output by the audio task in the second window 6902. In this way, a user A may listen to the audio data from the first window 6901 by using the first audio output device, and a user B may listen to the audio data from the second window 6902 by using the second audio output device, so that pieces of audio data that are output by the windows do not interfere with each other. This improves user audio experience.

In addition, in a scenario in which the audio task 1 and the audio task 2 are concurrently played, if AudioPolicy receives latest audio configuration information of each window that is delivered by the window manager, AudioPolicy may re-determine, according to the foregoing method, information such as audio output devices or volume of audio data in different windows based on the latest audio configuration information of each window, to indicate AudioFlinger to output audio data corresponding to each window to a latest audio output device for play. Details are not described in this embodiment of this application.

Figure 77:
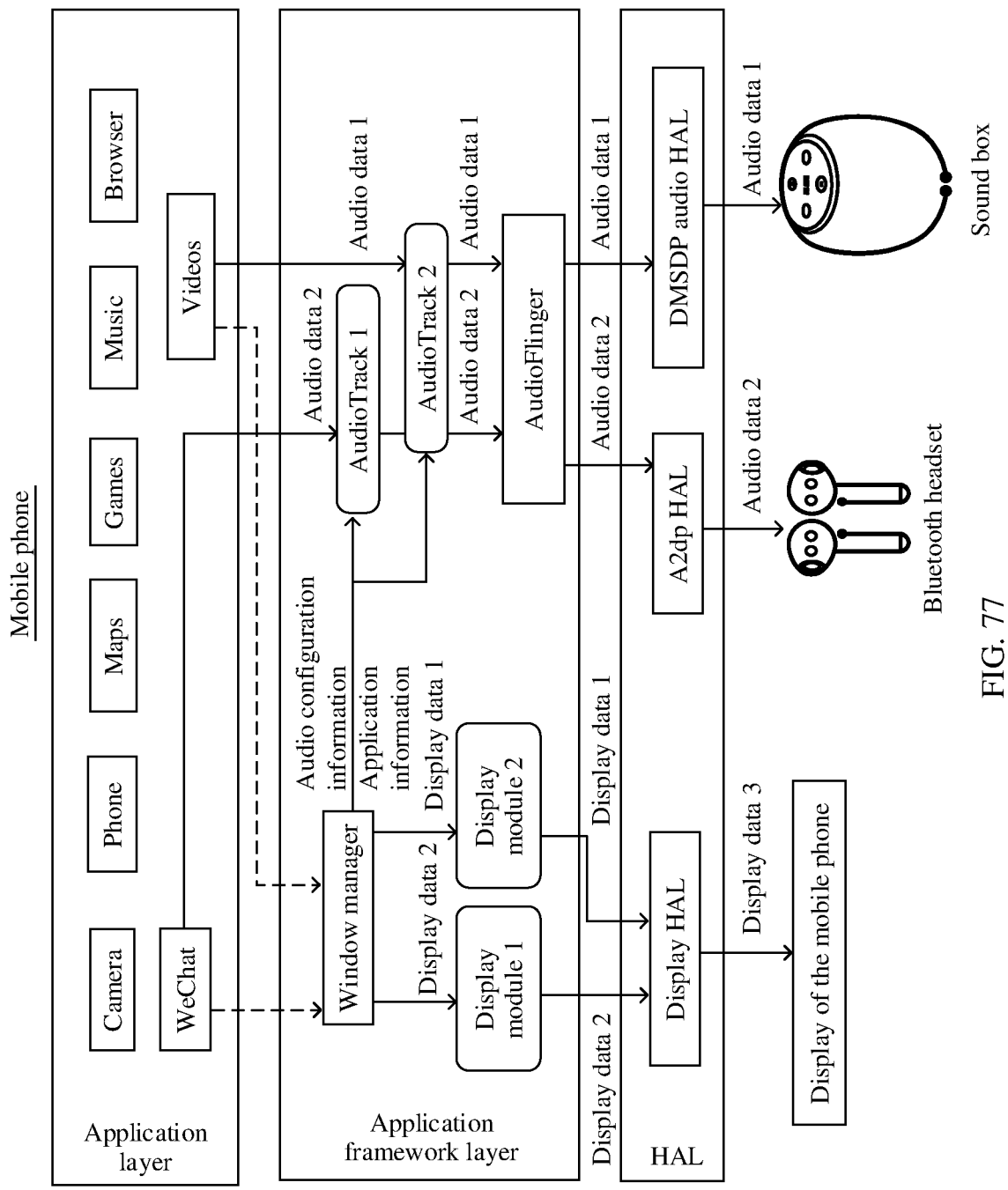
FIG. 77 is a schematic diagram 74 of an audio application scenario according to an embodiment of this application.

In some other embodiments, the audio task 1 and the audio task 2 are still used as an example. As shown in FIG. 77, after creating the audio task 1, Videos in the second window 6902 may create AudioTrack 1 corresponding to the audio task 1 at the application framework layer. In addition, after creating the audio task 2, WeChat in the first window 6901 may create AudioTrack 2 corresponding to the audio task 2 at the application framework layer. A difference from the foregoing embodiment is that the window manager may send the application information and the audio configuration information of each window to AudioTrack 1 and AudioTrack 2, and does not need to send the application information and the audio configuration information of each window to AudioPolicy.

In this way, as shown in FIG. 77, AudioTrack 1 may determine, based on the application information, that audio data received by AudioTrack 1 corresponds to the display module 1. Further, AudioTrack 1 may determine, based on the audio configuration information, that the audio output device associated with the display module 1 is the sound box, that is, the audio data received by AudioTrack 1 needs to be output to the sound box for play. In this case, after subsequently receiving the audio data 1 from Videos, AudioTrack 1 may send the audio data 1 to AudioFlinger for processing such as sampling, and AudioTrack 1 may simultaneously indicate AudioFlinger to send, by using the DMSDP audio HAL, processed audio data 1 to the sound box for play.

Similarly, as shown in FIG. 77, AudioTrack 2 may determine, based on the application information, that audio data received by AudioTrack 2 corresponds to the display module 2. Further, AudioTrack 2 may determine, based on the audio configuration information, that the audio output device associated with the display module 2 is the Bluetooth headset, that is, the audio data received by AudioTrack 2 needs to be output to the Bluetooth headset for play. In this case, after subsequently receiving the audio data 2 from WeChat, AudioTrack 2 may send the audio data 2 to AudioFlinger for processing such as sampling, and AudioTrack 1 may simultaneously indicate AudioFlinger to send, by using the A2dp HAL, processed audio data 2 to the Bluetooth headset for play.

Similar to the foregoing embodiment, if the user changes an audio focus application in a window, the window manager may send latest application information to a plurality of pieces of current AudioTrack in response to the changing by the user. Alternatively, if the user changes an audio output device associated with a window, volume of audio data, or the like, the window manager may send latest audio configuration information to a plurality of pieces of current AudioTrack in response to the changing by the user. In this way, each AudioTrack may re-determine, according to the foregoing method, information such as audio output devices or volume of audio data in different windows based on the latest application information and audio configuration information, to indicate AudioFlinger to output audio data corresponding to each window to a latest audio output device for play. Details are not described in this embodiment of this application.

In some other embodiments, after entering the split-screen mode, the mobile phone may alternatively project, by using a projection function, each window in the display of the mobile phone to another electronic device for display.

Figure 78:
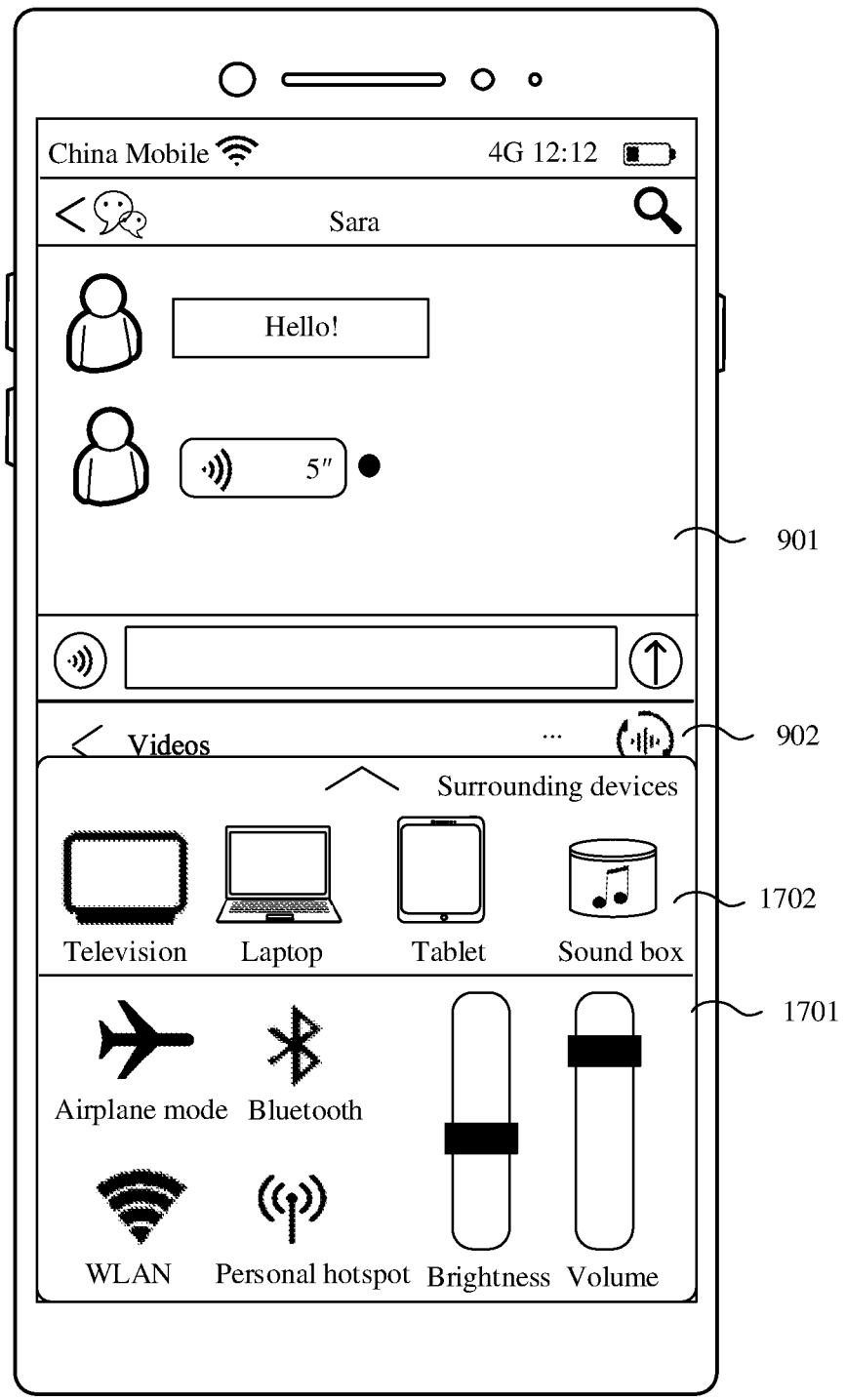
FIG. 78 is a schematic diagram 75 of an audio application scenario according to an embodiment of this application.

For example, as shown in FIG. 78, after the mobile phone enters the split-screen mode, WeChat runs in the first window 6901, and Videos runs in the second window 6902. If the user needs to use the projection function, the user may open a control center 7801 of the mobile phone. A card 7802 may be disposed in the control center 7801, and the card 7802 is used to display one or more nearby candidate devices that can perform projection and that are detected by the mobile phone. If it is detected that the user selects an electronic device (for example, the television) in the card 7802, it indicates that the user wants to enable the projection function, and display data in the mobile phone is projected to the television for display. In this case, a display output device of the mobile phone is the television.

Figure 79:
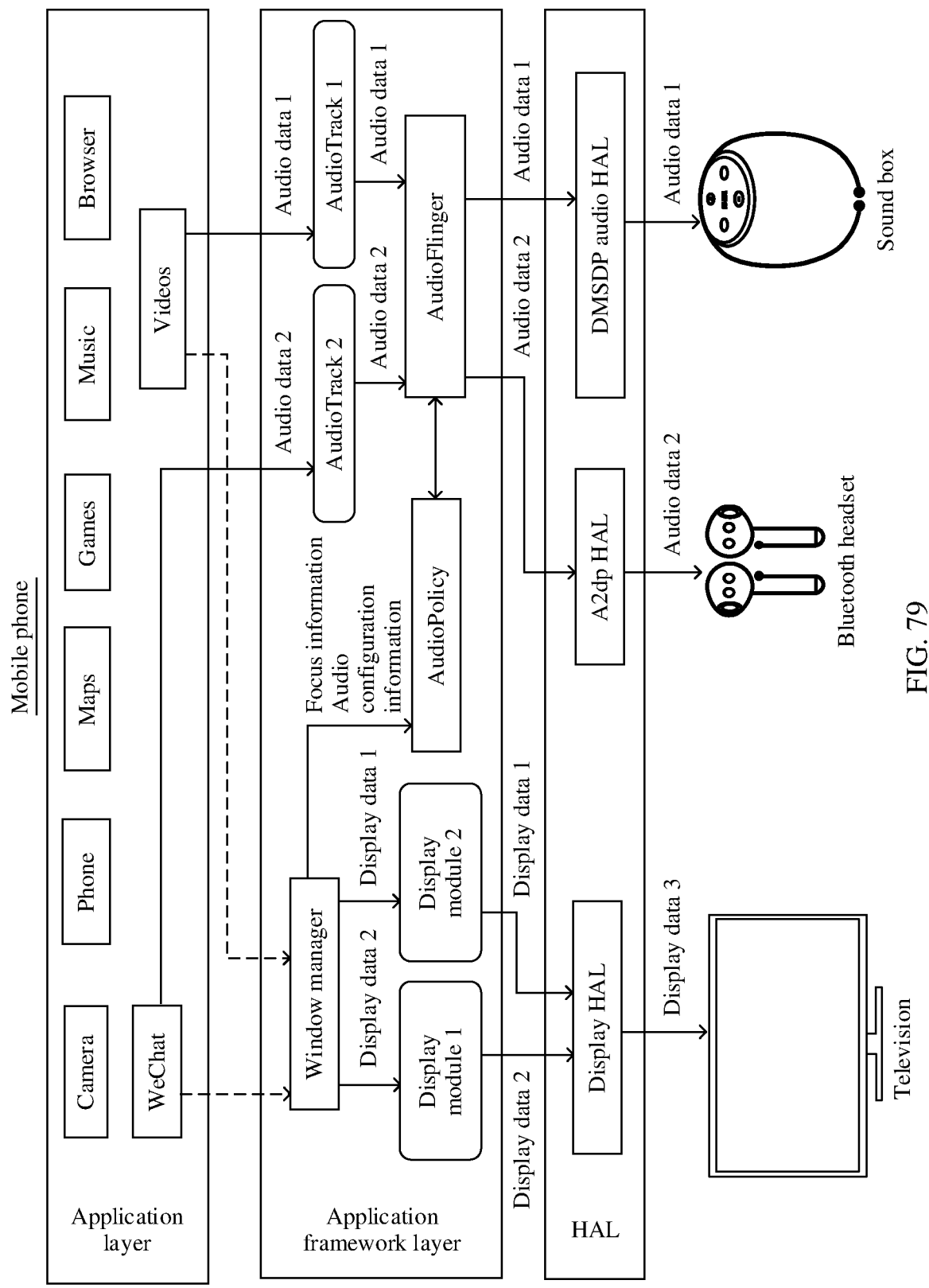
FIG. 79 is a schematic diagram 76 of an audio application scenario according to an embodiment of this application.

In a possible implementation, as shown in FIG. 79, in response to the operation that the user selects the television in the card 7802, the window manager may indicate the display HAL to combine the display data 1 in the display module 1 and the display data 2 in the display module 2 into corresponding display data 3 in real time. Further, the display HAL may send the display data 3 to the television in real time for display, so that the television can display the first window 6901 and the second window 6902 of the mobile phone in the split-screen mode. Certainly, the display HAL may alternatively send the display data 3 to the display of the mobile phone in real time for display. In this case, the mobile phone and the television may synchronously display the first window 6901 and the second window 6902.

In addition, if the mobile phone has not established a network connection to the television when the user selects the television in the card 1702, the mobile phone may first establish a network connection to the television, and then send the display data 3 to the television in real time by using the display HAL.

In this case, audio data generated by WeChat in the first window 6901 and audio data generated by Videos in the second window 6902 may still be sent by AudioFlinger to different audio output devices according to an indication of AudioPolicy for play. For example, AudioFlinger may send, by using the DMSDP audio HAL, the audio data 1 generated by Videos to the sound box for play, and send, by using the A2dp HAL, the audio data 2 generated by WeChat to the Bluetooth headset for play. In other words, during projection in the split-screen mode, a master device may separately control a distribution process of display data and a distribution process of audio data, and the master device distributes audio data in different windows to corresponding audio output devices for play.

Figure 80A:
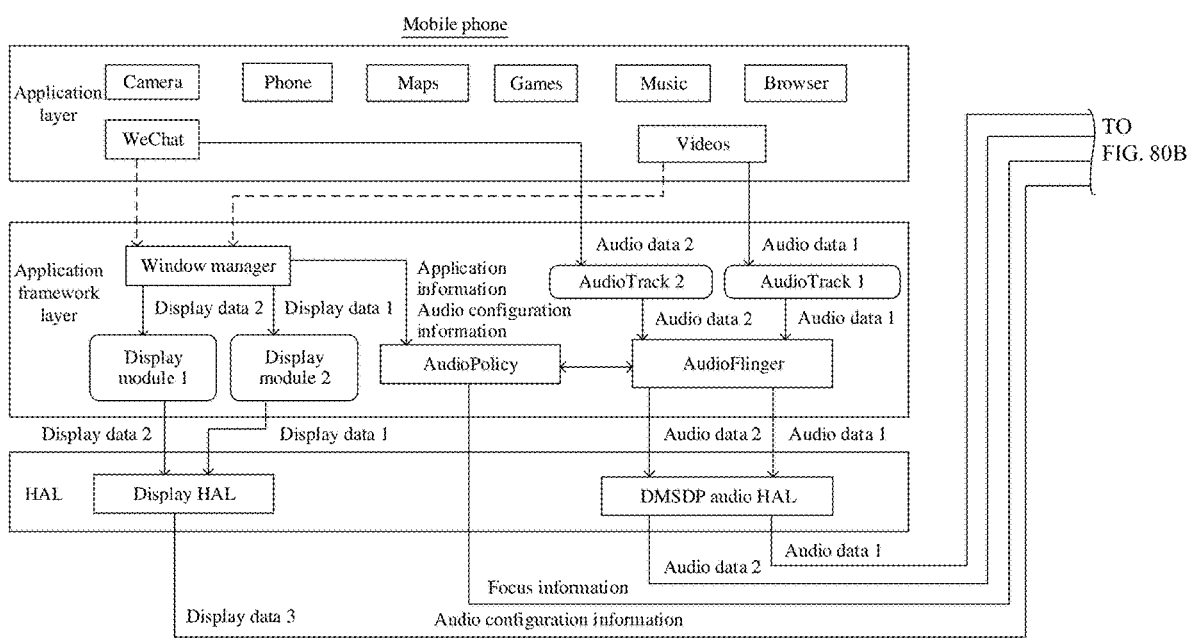
FIG. 80A and FIG. 80B are a schematic diagram 77 of an audio application scenario according to an embodiment of this application.
Figure 80B:
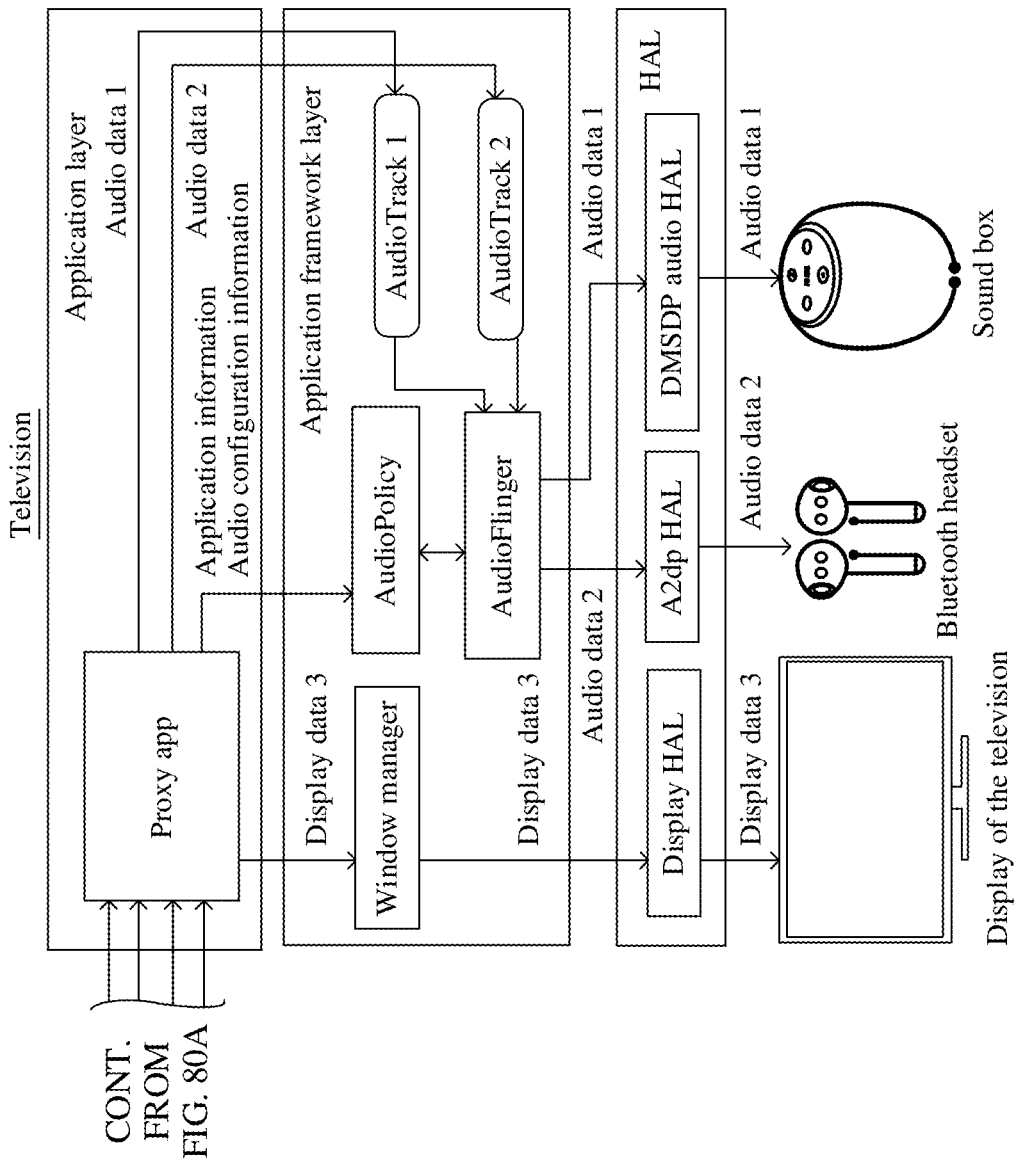

In another possible implementation, as shown in FIG. 80A and FIG. 80B, in response to the operation that the user selects the television in the card 7802, the mobile phone may send, by using the display HAL, the display data 3 including the first window 6901 and the second window 6902 to the television in real time for display, and the mobile phone may further send the audio data 1 of the first window 6901 and the audio data 2 of the second window 6902 to the television in real time by using the DMSDP audio HAL. In addition, still as shown in FIG. 80A and FIG. 80B, AudioPolicy in the mobile phone may further send, to the television, the application information and the audio configuration information of each window that are delivered by the window manager.

For example, as shown in FIG. 80A and FIG. 80B, a proxy app may be installed at an application layer of the television, and the proxy app is configured to receive display data and audio data that are sent by the mobile phone. For example, the display data may be the display data 3, and the audio data may be the audio data 1 and the audio data 2. In addition, similar to the display architecture and the audio architecture of the mobile phone, an application framework layer of the television may also include a window manager, an audio policy module (for example, AudioPolicy), an audio processor (for example, AudioFlinger), and the like. After receiving the display data 3, the proxy app may invoke the window manager to send, by using a display HAL in the television, the display data 3 to a display of the television for display.

As shown in FIG. 80A and FIG. 80B, the proxy app in the television is further configured to receive the application information and the audio configuration information of each window that are sent by the mobile phone, and the proxy app may further send the application information and the audio configuration information to AudioPolicy in the television. In addition, after receiving the audio data 1 and the audio data 2 that are sent by the mobile phone, the proxy app in the television may create AudioTrack 1 for playing the audio data 1, and create AudioTrack 2 for playing the audio data 2. Further, AudioTrack 1 may send the received audio data 1 to AudioFlinger in the television for processing such as sampling. Likewise, AudioTrack 2 may send the received audio data 2 to AudioFlinger in the television for processing such as sampling.

Similar to the process of interaction between AudioFlinger and AudioPolicy in the mobile phone, after receiving the audio data 1 and the audio data 2, AudioFlinger in the television may also send a query request to AudioPolicy in the television, to request AudioPolicy to query specific audio output devices corresponding to the audio data 1 and the audio data 2. In response to the query request, AudioPolicy may determine, based on the application information and the audio configuration information of each window, that the audio output device corresponding to the audio data 1 is the sound box and the audio output device corresponding to the audio data 2 is the Bluetooth headset. Further, AudioPolicy in the television may indicate AudioFlinger in the television to send, by using a DMSDP audio HAL, the audio data 1 to the sound box for play, and indicate AudioFlinger to send, by using an A2dp HAL, the audio data 2 to the Bluetooth headset for play. The process of interaction between AudioPolicy and AudioFlinger in the television is similar to the process of interaction between AudioPolicy and AudioFlinger in the mobile phone. Therefore, details are not described herein again.

It can be learned that, during projection in the split-screen mode, the mobile phone (that is, a master device) may send both display data and audio data generated in each window to the television (that is, a slave device). In addition, the mobile phone may send both the application information and the audio configuration information of each window to the television, so that the television can distribute, based on the application information and the audio configuration information, audio data in different windows of the mobile phone to corresponding audio output devices for play. This implements an isolation effect of preventing pieces of audio data in a plurality of windows from interfering with each other.

Figure 81:
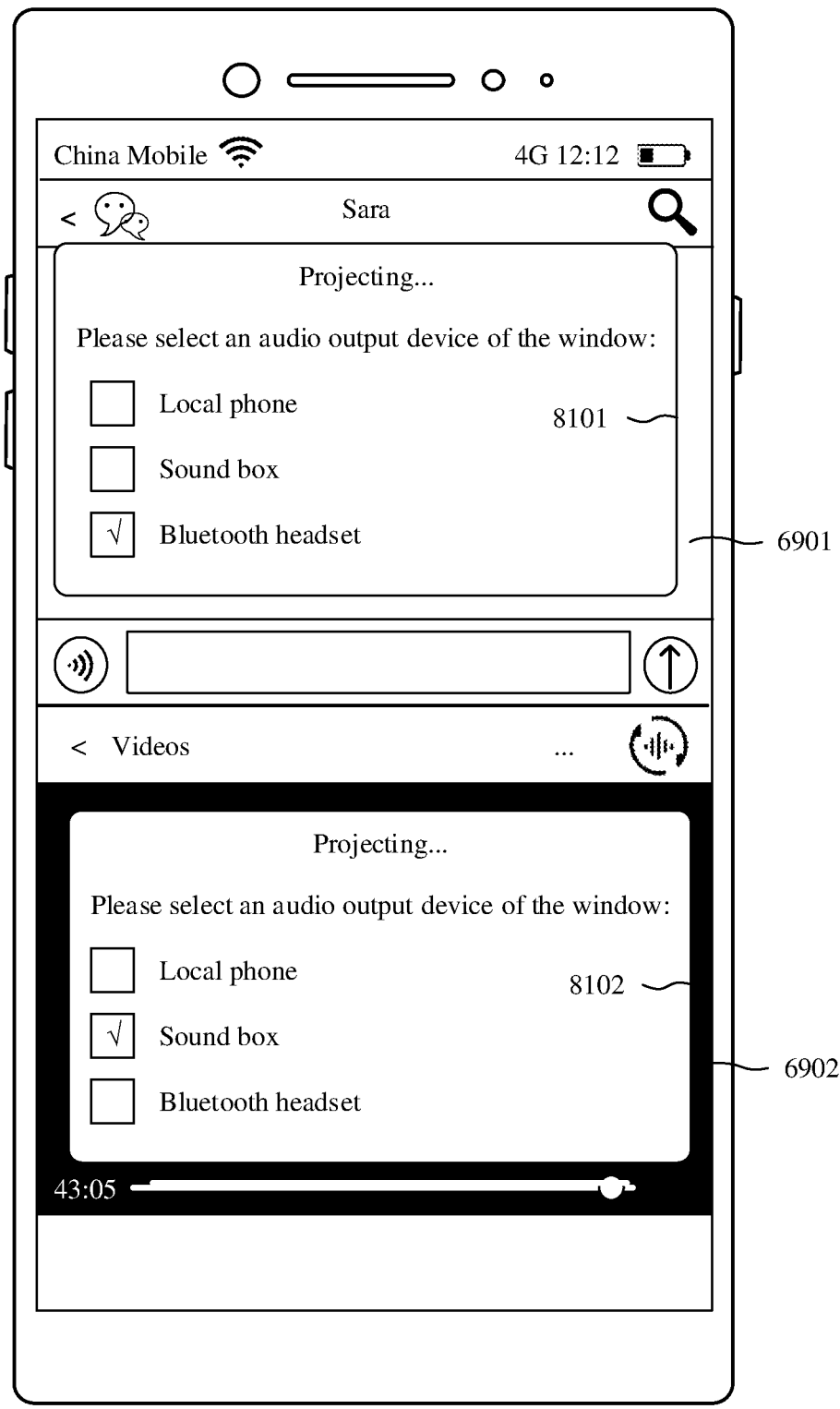
FIG. 81 is a schematic diagram 78 of an audio application scenario according to an embodiment of this application.

In some embodiments, when the mobile phone performs projection to the television in the split-screen mode, the user may also change the audio output device associated with each window. For example, as shown in FIG. 81, in a process in which the mobile phone projects the first window 6901 and the second window 6902 to the television for display, if it is detected that the user makes a preset gesture on the first window 6901 (for example, touches and holds the first window 6901), the mobile phone may display a first device list 8101, and the user may select an audio output device associated with the first window 6901 from the first device list 8101. Similarly, if it is detected that the user makes a preset gesture on the second window 6902 (for example, touches and holds the second window 6902), the mobile phone may display a second device list 8102, and the user may select an audio output device associated with the second window 6902 from the second device list 8102.

For example, a television device in the first device list 8101 (or the second device list 8102) may be one or more television devices that each are connected to the mobile phone and that each have an audio output function. Alternatively, a television device in the first device list 8101 (or the second device list 8102) may be one or more television devices that each are connected to the television and that each have an audio output function. This is not limited in this embodiment of this application.

The window manager in the mobile phone may update the audio configuration information of each window based on user selection in the first device list 8101 (or the second device list 8102), and send updated audio configuration information to AudioPolicy in the mobile phone. Further, AudioPolicy in the mobile phone may send the updated audio configuration information to the television, and the proxy app in the television sends the received updated audio configuration information to AudioPolicy in the television, so that AudioPolicy in the television can obtain latest audio configuration information in real time. In this way, the television may distribute, based on the latest audio configuration information, audio data of different windows to corresponding audio output devices for play.

In addition, if the television detects that an audio output device associated with a window in the audio configuration information does not establish a network connection to the television, the television may first establish a network connection to the audio output device, and then send audio data of the window to the audio output device through the established network connection.

Figure 82:
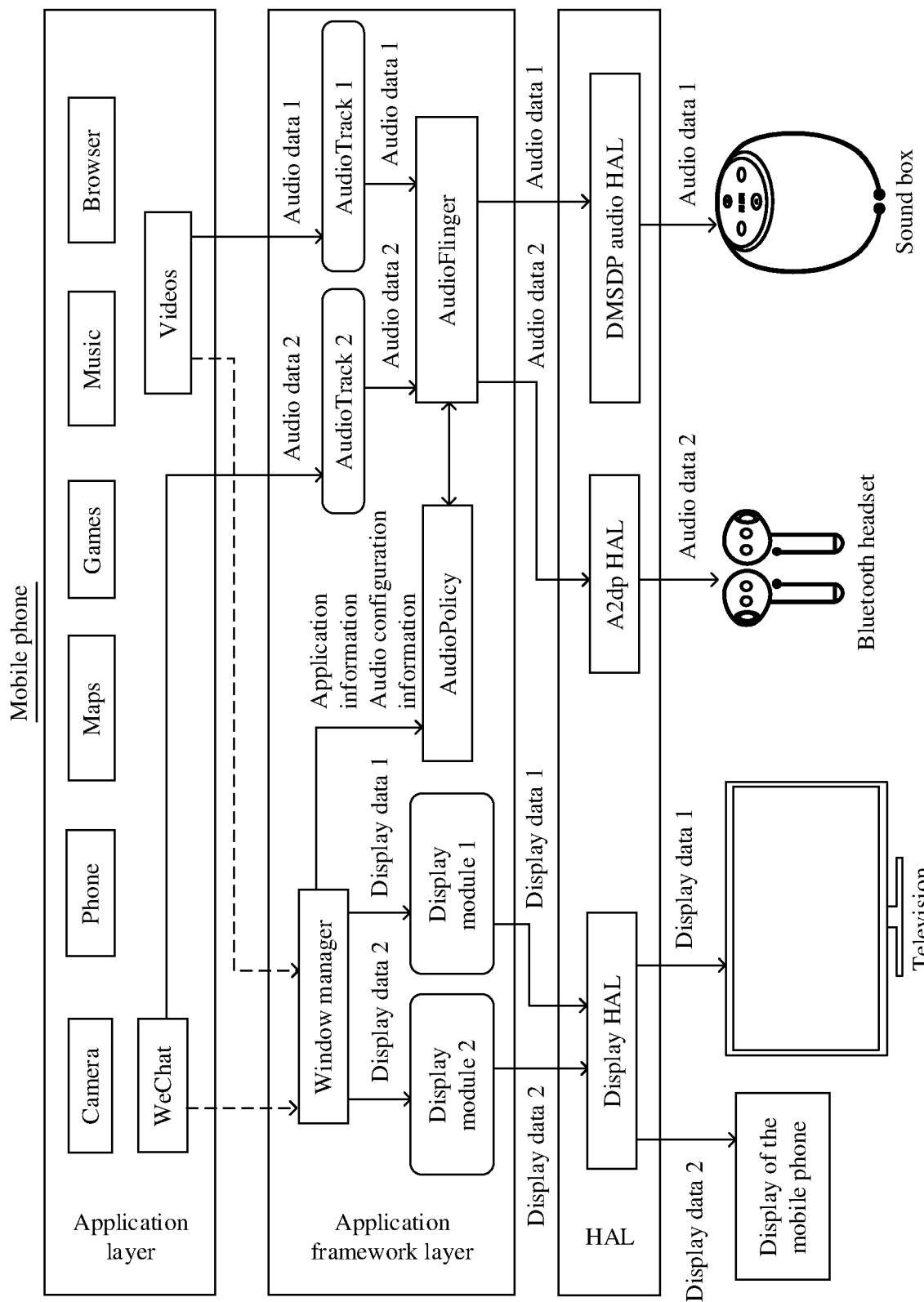
FIG. 82 is a schematic diagram 79 of an audio application scenario according to an embodiment of this application.

The foregoing embodiment is described by using an application scenario in which a plurality of windows are displayed in the mobile phone to concurrently play a plurality of audio tasks as an example. In some embodiments, the mobile phone may also hide one or more windows displayed in the display. For example, the mobile phone may perform projection at a granularity of an application. As shown in FIG. 82, when the mobile phone projects an application (for example, Videos) to the television, the window manager may create a display module 1, and draw, in the display module 1, display data 1 generated by Videos, that is, the display module 1 corresponds to the television. The display HAL in the mobile phone may obtain display data 1 from the display module 1 in real time, and send the display data 1 to the television for display. A difference is that the display HAL does not need to send the display data 1 to the display of the mobile phone for display, that is, the mobile phone may hide a window corresponding to the display module 1 on the display.

Simultaneously, the user may run another application in the mobile phone, and display an application interface of the application. For example, after the user enables WeChat in the mobile phone, WeChat may create a display module 2 by using the window manager. The window manager may draw, in the display module 2, display data 2 generated by WeChat, that is, the display module 2 corresponds to the display of the mobile phone. Further, the display HAL in the mobile phone may obtain the display data 2 from the display module 2 in real time, and send the display data 2 to the display of the mobile phone for display. In this case, the mobile phone projects the running Videos to the television for display, and the mobile phone reserves the running WeChat for display on the display of the mobile phone. In other words, when the mobile phone projects an application to the television, the mobile phone may still normally work, and the user may further run another application on the mobile phone.

In this scenario, an audio output device associated with the display module 1 is an audio output device of a slave device (that is, the television), and an audio output device associated with the display module 2 is an audio output device of a master device (that is, the mobile phone). Similar to the foregoing embodiment, still as shown in FIG. 82, Videos may send the generated audio data 1 to AudioFlinger by creating AudioTrack 1, and WeChat may simultaneously send the generated audio data 2 to AudioFlinger by creating AudioTrack 2. AudioPolicy stores latest application information and audio configuration information of each window. AudioFlinger may determine, through interaction with AudioPolicy, that an audio output device corresponding to the audio data 1 is the sound box and an audio output device corresponding to the audio data 2 is the Bluetooth headset. Further, AudioFlinger may send, by using the DMSDP audio HAL, the audio data 1 to the sound box for play, and AudioFlinger may send, by using the A2dp HAL, the audio data 2 to the Bluetooth headset for play.

In other words, after the mobile phone enters the split-screen mode, display data may be provided for different display output devices (including the mobile phone) by using different display modules. In addition, different display output devices may be associated with different audio output devices, and the mobile phone may send audio data matching a corresponding display output device to an associated audio output device for play. In this way, pieces of display data in the display output devices do not interfere with each other, and pieces of audio data in the display output devices do not interfere with each other either. This improves user audio experience.

In a distributed audio scenario, a master device may have a screen recording function, and a slave device of the master device may also have a screen recording function. The master device (for example, the foregoing mobile phone) may record first screen data of the master device, where the first screen data may include display data and audio data that are played by the master device. In addition, the master device may obtain, from the slave device (for example, the television) having a screen recording function, second screen data that is recorded by the slave device, where the second screen data may include display data and audio data that are played by the slave device.

After the user enables the screen recording function on the master device, the master device may obtain the first screen data by using the screen recording function of the master device, and the master device may simultaneously send a screen recording instruction to the slave device. After the slave device receives the screen recording instruction, if the slave device has a screen recording function, the slave device may record the second screen data of the slave device in response to the screen recording instruction. In addition, the slave device may send the recorded second screen data to the master device in real time. In this way, the master device may generate a screen recording file of current screen recording based on the first screen data of the master device and the second screen data of the slave device. The screen recording file can restore content played by the master device during screen recording, and can also restore content played by the slave device during screen recording, so as to more comprehensively restore service scenarios implemented on the master device and the slave device. This improves user experience in a distributed system.

Figure 83:
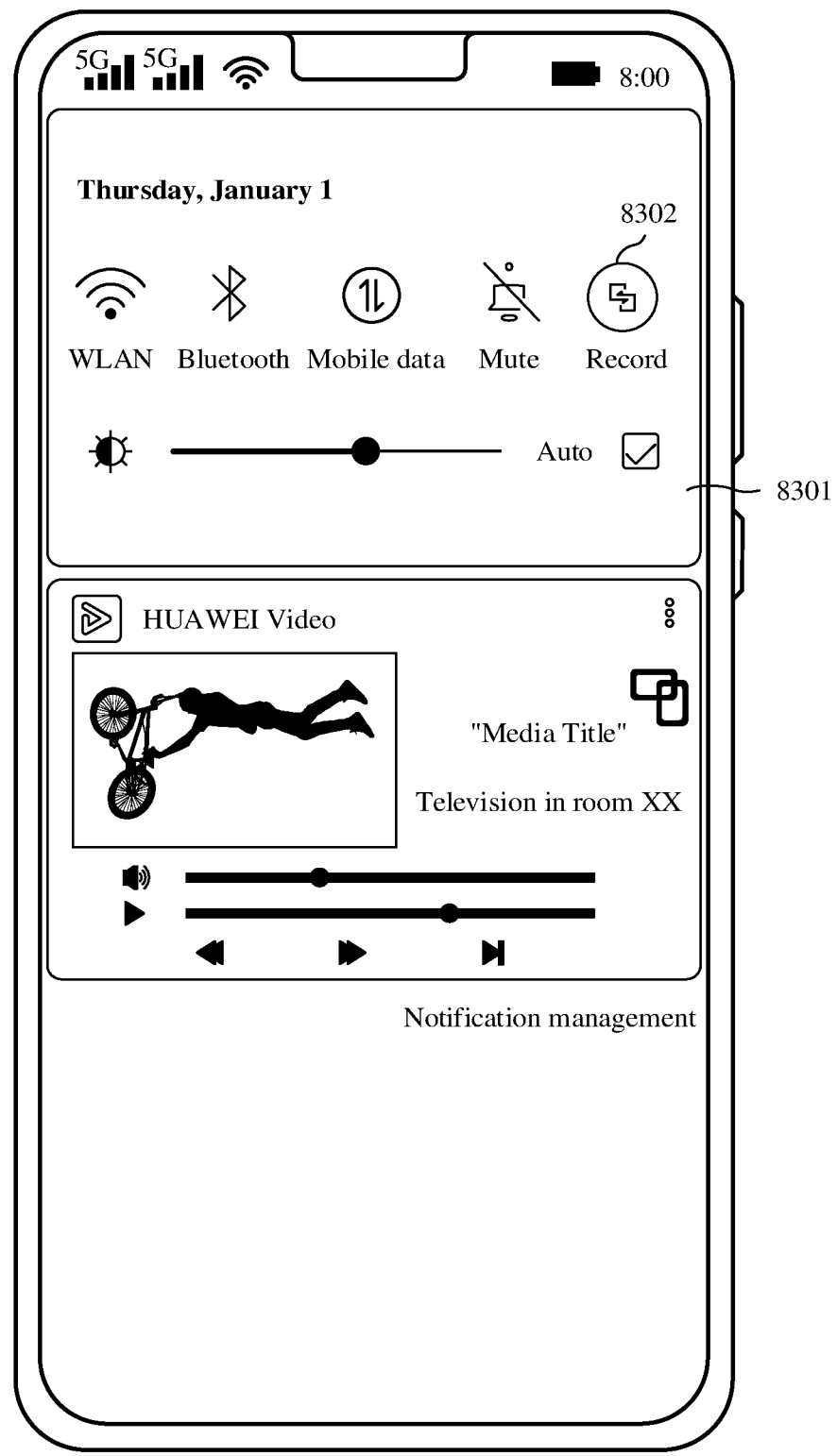
FIG. 83 is a schematic diagram 80 of an audio application scenario according to an embodiment of this application.

For example, the mobile phone is a master device. The mobile phone may display, at a location such as a control center, a leftmost screen menu, or a pull-down menu, a screen recording button used to enable a screen recording function. For example, as shown in FIG. 83, after detecting an operation that the user opens a pull-down menu in the mobile phone, the mobile phone may display a pull-down menu 8301, where a "Screen recording" button 8302 is disposed in the pull-down menu 8301. If it is detected that the user taps the "Screen recording" button 8302, it indicates that the user currently needs to use the screen recording function. In this case, the mobile phone may search for one or more electronic devices that currently access a same communications network as the mobile phone. For example, the mobile phone may search for one or more electronic devices that are located in a same Wi-Fi network as the mobile phone. For another example, the mobile phone may query a server for one or more electronic devices that log in to a same account (for example, a Huawei account) as the mobile phone.

Figure 84:
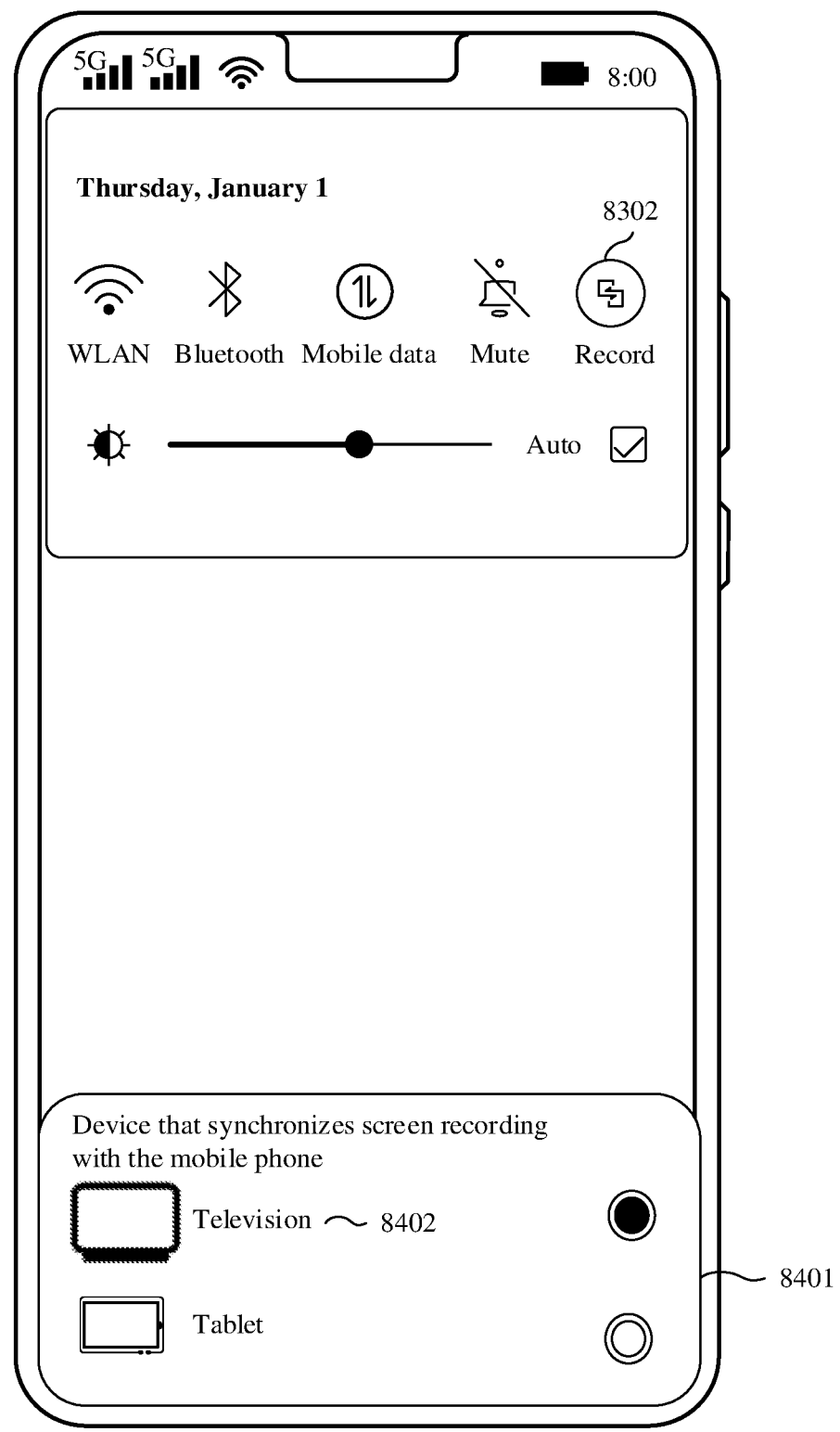
FIG. 84 is a schematic diagram 81 of an audio application scenario according to an embodiment of this application.

Further, as shown in FIG. 84, the mobile phone may display the one or more found electronic devices in a device list 8401. Alternatively, the mobile phone may select an electronic device having a display function from the one or more found electronic devices, and display the electronic device having a display function in the device list 8401. Alternatively, when searching for one or more electronic devices that currently access a same communications network as the mobile phone, the mobile phone may query whether the found electronic devices each have a screen recording function. If the found electronic devices each have a screen recording function, the mobile phone may display the electronic devices in the device list 8401. Certainly, the device list 8401 may also include the mobile phone (that is, a master device). The user may select, in the device list 8401, a device or devices whose screen data needs to be recorded for current screen recording. For example, the mobile phone may consider by default that the user needs to record screen data of the mobile phone. In this case, the user only needs to select, in the device list 8401, one or more electronic devices that want to simultaneously perform screen recording with the mobile phone.

Figure 85:
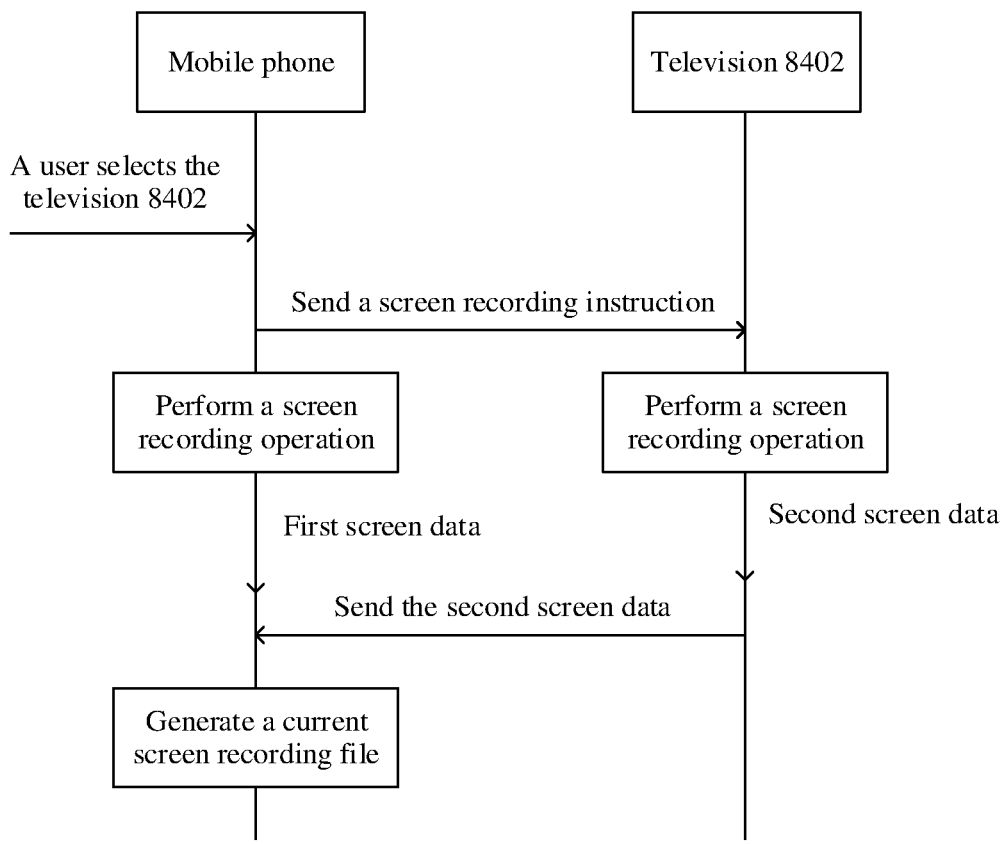
FIG. 85 is a schematic interaction diagram of a screen recording method according to an embodiment of this application.

For example, if it is detected that the user selects a television 8402 in the device list 8401, it indicates that the user needs to simultaneously record screen data played by the mobile phone and screen data played by the television 8402. In this case, as shown in FIG. 85, the mobile phone may perform a screen recording operation, and start to record display data and audio data that are played by the mobile phone, to obtain first screen data. In addition, the mobile phone may use the television 8402 as a slave device, and send a screen recording instruction to the television 8402. In response to the screen recording instruction sent by the mobile phone, the television 8402 may also perform a screen recording operation, and start to record display data and audio data that are played by the television 8402, to obtain second screen data. In addition, the television 8402 may send, to the mobile phone, the second screen data obtained through real-time recording. The mobile phone may generate a current screen recording file based on the first screen data and the second screen data.

A specific process in which the master device (for example, the foregoing mobile phone) completes screen recording through interaction with the slave device (for example, the television 8402) is described in detail in the following embodiments. Therefore, details are not described herein.

It can be learned that, in this embodiment of this application, during screen recording, the user may select to record screen data of both the master device and the slave device in the master device. The master device serving as a main control device may send a screen recording instruction to a slave device selected by the user, to trigger the slave device to record screen data of the slave device. In addition, the master device may simultaneously record the screen data of the master device. Subsequently, the master device may generate a current screen recording file based on the screen data recorded by the two devices. The screen recording file can restore content played by the master device, and can also restore content played by the slave device, so as to more comprehensively record and restore service scenarios implemented on the master device and the slave device. This improves user experience in a distributed system.

Figure 86:
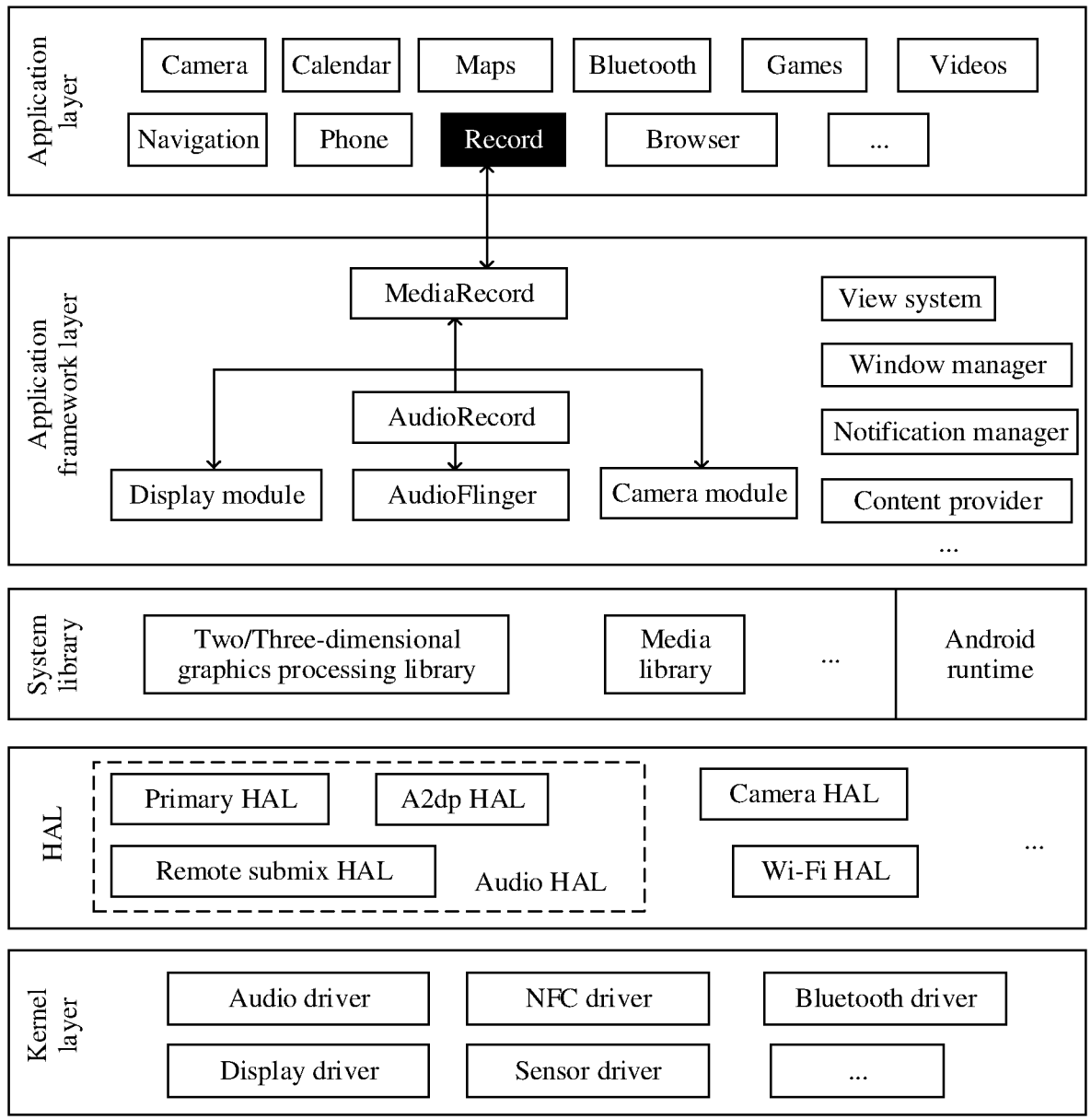
FIG. 86 is a schematic diagram 82 of an audio application scenario according to an embodiment of this application.

Based on the architecture of the Android system shown in FIG. 6, as shown in FIG. 86, the application layer may include a screen recording application having a screen recording function. The application framework layer may include MediaRecord, a display module, AudioRecord, and AudioFlinger. The display module is configured to store to-be-played display data, and output the to-be-played display data to the display in real time for play. AudioFlinger is configured to perform processing such as mixing, resampling, or sound effect setting on audio data from an application, and output processed audio data to a corresponding audio output device (for example, a speaker or a headset) by using the HAL. AudioRecord is configured to obtain corresponding audio data from AudioFlinger for audio recording. After the screen recording application detects that the user enables a screen recording function, the screen recording application may invoke MediaRecord to start current screen recording.

For example, still as shown in FIG. 86, the screen recording application may send a screen recording request to MediaRecord. For example, the screen recording request may indicate that display data played by the display and audio data played by the speaker need to be recorded during current recording. Further, in response to the screen recording request, MediaRecord may obtain, from the display module in real time, display data that is played by the display. In addition, MediaRecord may invoke AudioRecord, and AudioRecord obtains, from AudioFlinger in real time, audio data that is currently played by the speaker, and sends the obtained audio data to MediaRecord. Subsequently, MediaRecord may synthesize the display data and the audio data that are obtained in real time into first screen data, where the first screen data may restore an image and audio that are being played by the mobile phone during screen recording. Further, MediaRecord may send the first screen data to the screen recording application. The screen recording application may locally store the obtained first screen data in the mobile phone in a form of a screen recording file. Alternatively, the screen recording application may send the obtained first screen data to the server or another electronic device in real time.

Still as shown in FIG. 86, the HAL provides HALs corresponding to different hardware modules in the mobile phone, for example, an audio HAL, a camera HAL, and a Wi-Fi HAL. The Audio HAL is used as an example. The Audio HAL may be further divided into a primary HAL, a remote submix HAL, an A2dp HAL, and the like based on different audio output devices of the mobile phone. The primary HAL may correspond to a microphone of the mobile phone, the A2dp HAL may correspond to a Bluetooth headset connected to the mobile phone, and the remote submix HAL may correspond to system audio played in the mobile phone. For example, AudioFlinger may invoke the primary HAL to obtain audio data collected by the microphone of the mobile phone. For another example, AudioFlinger may invoke the A2dp HAL to output audio data to the Bluetooth headset connected to the mobile phone for play. For another example, AudioFlinger may invoke the remote submix HAL to obtain system audio played by the speaker.

During screen recording, if the screen recording request sent by the screen recording application to MediaRecord indicates to record system audio of the mobile phone (that is, an internal recording scenario), AudioFlinger may obtain, in real time from the remote submix HAL, audio data that is being played by the mobile phone, and send the obtained audio data to MediaRecord by using AudioRecord. Alternatively, if the screen recording request sent by the screen recording application to MediaRecord indicates to record a sound collected by the microphone of the mobile phone (that is, an external recording scenario), AudioFlinger may obtain, in real time from the primary HAL, audio data recorded by the microphone of the mobile phone, and send the obtained audio data to MediaRecord by using AudioRecord. Certainly, the screen recording application may alternatively indicate MediaRecord to simultaneously record audio data that is being played by the mobile phone and audio data that is collected by the microphone of the mobile phone. AudioFlinger may mix the audio data obtained from the primary HAL and the audio data obtained from the remote submix HAL, and then send mixed audio data to MediaRecord by using AudioRecord.

In some embodiments, still as shown in FIG. 86, a camera module is further disposed at the application framework layer, and the camera module may obtain, by using the camera HAL, display data currently collected by a camera. For example, the screen recording application may alternatively send a screen recording request to MediaRecord to indicate that display data that currently needs to be recorded is display data collected by the camera. Further, in response to the screen recording request, MediaRecord may obtain corresponding display data from the camera module in real time, and report the display data to MediaRecord, and MediaRecord synthesizes the display data and the audio data that are obtained in real time into first screen data.

In other words, the first screen data recorded by the mobile phone during screen recording may include at least one of display data played on the display of the mobile phone, display data collected by the camera of the mobile phone, audio data played by the mobile phone, or audio data collected by the microphone of the mobile phone. This is not limited in this embodiment of this application.

In this embodiment of this application, after the mobile phone establishes a network connection to a slave device, the mobile phone may create a DMSDP HAL corresponding to the slave device at the HAL. In this case, the DMSDP HAL corresponds to the slave device currently connected to the mobile phone. The mobile phone may serve as a main control device to receive data from and send data to the slave device by using the DMSDP HAL, and use the slave device as a virtual device of the mobile phone to collaborate with the slave device to complete a service such as an audio service or a display service in a distributed scenario.

Figure 87:
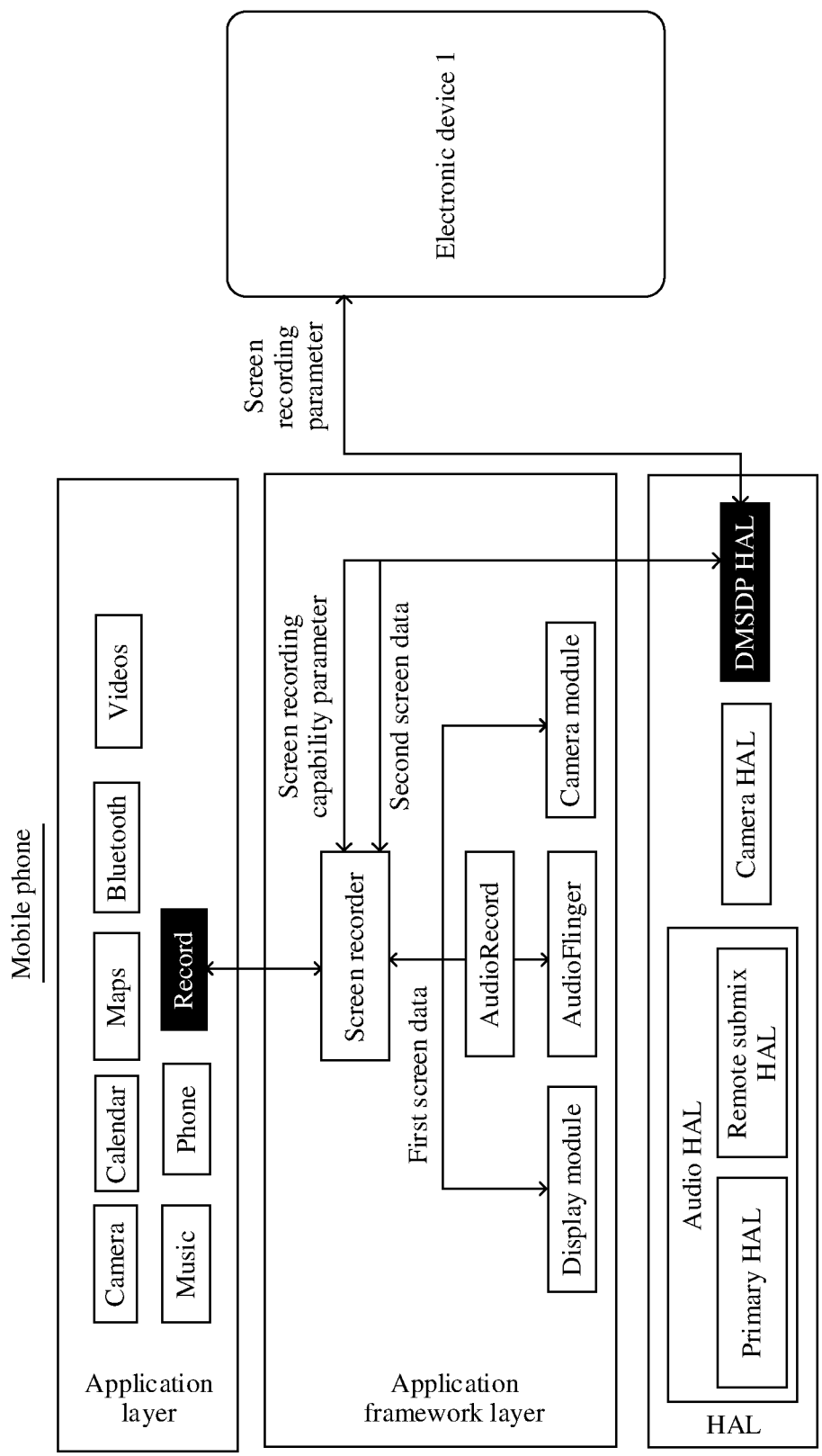
FIG. 87 is a schematic diagram 83 of an audio application scenario according to an embodiment of this application.

For example, when the user enables the screen recording function provided by the screen recording application on the mobile phone, the screen recording application may display, to the user, a currently found electronic device that can perform screen recording synchronously with the mobile phone. For example, the screen recording application may present, to the user, an electronic device that currently logs in to a same account as the mobile phone. For example, the user selects an electronic device 1. The mobile phone may establish a connection to the mobile phone by using the electronic device 1 selected by the user as a slave device. For example, the mobile phone may establish a Wi-Fi P2P (peer-to-peer) connection or a Bluetooth connection to the electronic device 1. In addition, as shown in FIG. 87, the mobile phone may create a DMSDP HAL corresponding to the slave device at the HAL. In this case, the DMSDP HAL corresponds to the electronic device 1.

In this embodiment of this application, still as shown in FIG. 87, a screen recorder may be disposed at the application framework layer. The screen recorder is compatible with a function of MediaRecord to record the first screen data of the mobile phone, and may also indicate the slave device of the mobile phone to record the second screen data of the slave device. Further, the screen recorder may generate a corresponding screen recording file based on the first screen data and the second screen data. This implements a function of screen recording synchronization between the mobile phone and the slave device.

For example, the screen recorder may obtain a screen recording capability parameter of the electronic device 1 by using the DMSDP HAL. The screen recording capability parameter may include a display capability parameter and an audio capability parameter that are supported by the slave device during screen recording. For example, the display capability parameter may specifically include a capability parameter of the slave device that is used to record display data, such as a resolution or a dots per inch (Dots Per Inch, DPI); and the audio capability parameter may specifically include a capability parameter of the slave device that is used to record audio data, such as an audio data sampling rate, a parameter indicating whether the slave device has a capability of recording system audio, or a parameter indicating whether the slave device has a capability of collecting audio by using a microphone.

In addition, the screen recorder may obtain a screen recording capability parameter of the mobile phone, that is, a display capability parameter and an audio capability parameter of the mobile phone. Further, the screen recorder may determine, based on the screen recording capability parameter of the electronic device 1 and the screen recording capability parameter of the mobile phone, screen recording parameters used by the mobile phone and the electronic device 1 during current screen recording. Corresponding to the screen recording capability parameter, the screen recording parameter may include a display recording parameter such as a resolution or a DPI, and an audio recording parameter such as an audio data sampling rate, a parameter indicating whether the slave device has a capability of recording system audio, or a parameter indicating whether the slave device has a capability of collecting audio by using a microphone. In other words, the master device may determine, based on the screen recording capability of the slave device, a screen recording parameter currently used by the mobile phone to synchronize screen recording with the slave device.

Further, still as shown in FIG. 87, the screen recorder may send the screen recording parameter determined for the electronic device 1 to the electronic device 1 (that is, a slave device). For example, the screen recorder may send an identifier of the electronic device 1 and the screen recording parameter to the DMSDP HAL, and the DMSDP HAL may send a screen recording instruction to the electronic device 1 based on the identifier of the electronic device 1, where the screen recording instruction includes the screen recording parameter. In this way, after receiving the screen recording instruction sent by the mobile phone, the electronic device 1 may start to record screen data of the electronic device 1 based on the screen recording parameter in the screen recording instruction. For example, the screen data of the electronic device 1 may include one or more of display data that is being played by a display of the electronic device 1, display data that is being collected by a camera of the electronic device 1, audio data that is being played by a speaker of the electronic device 1, or audio data that is being collected by a microphone of the electronic device 1. In addition, before current screen recording ends, the electronic device 1 may send recorded screen data (which may be referred to as second screen data below) to the screen recorder in real time.

Still as shown in FIG. 87, for the mobile phone, after determining a corresponding screen recording parameter for the mobile phone, the screen recorder may start to record screen data (which may be referred to as first screen data below) of the mobile phone based on the screen recording parameter. For example, the first screen data may include one or more of display data that is being played by the display of the mobile phone, display data that is being collected by the camera of the mobile phone, audio data that is being played by the speaker of the mobile phone, or audio data that is being collected by the microphone of the mobile phone.

In this way, the screen recorder in the mobile phone may obtain, in real time during current screen recording, the first screen data recorded by the mobile phone and the second screen data recorded by the electronic device 1. Subsequently, the screen recorder may report the first screen data and the second screen data to the screen recording application. The screen recording application may encapsulate the received first screen data and second screen data into one screen recording file, or the screen recording application may respectively encapsulate the received first screen data and second screen data into two screen recording files. Certainly, the screen recorder may alternatively encapsulate the first screen data and the second screen data into one or more screen recording files, and then report the one or more screen recording files to the screen recording application.

In addition, the screen recorder or another function module in the mobile phone may further perform an operation such as parsing, encoding/decoding, mixing, or sound effect adding on the first screen data and/or the second screen data. This is not limited in this embodiment of this application.

It can be learned that, during screen recording, the mobile phone (that is, a master device) may synchronously obtain the first screen data recorded by the master device and the second screen data recorded by the electronic device 1 (that is, a slave device). Therefore, the screen recording file generated by the mobile phone based on the first screen data and the second screen data can restore content played by the master device, and can also restore content played by the slave device, so as to more comprehensively record and restore service scenarios implemented on the master device and the slave device, so that the user can simultaneously record screen data in a plurality of electronic devices. This improves user screen recording experience in a distributed system.

The following still uses an example in which the mobile phone is a master device to specifically describe a screen recording method provided in an embodiment of this application with reference to the accompanying drawings.

Figure 88A:
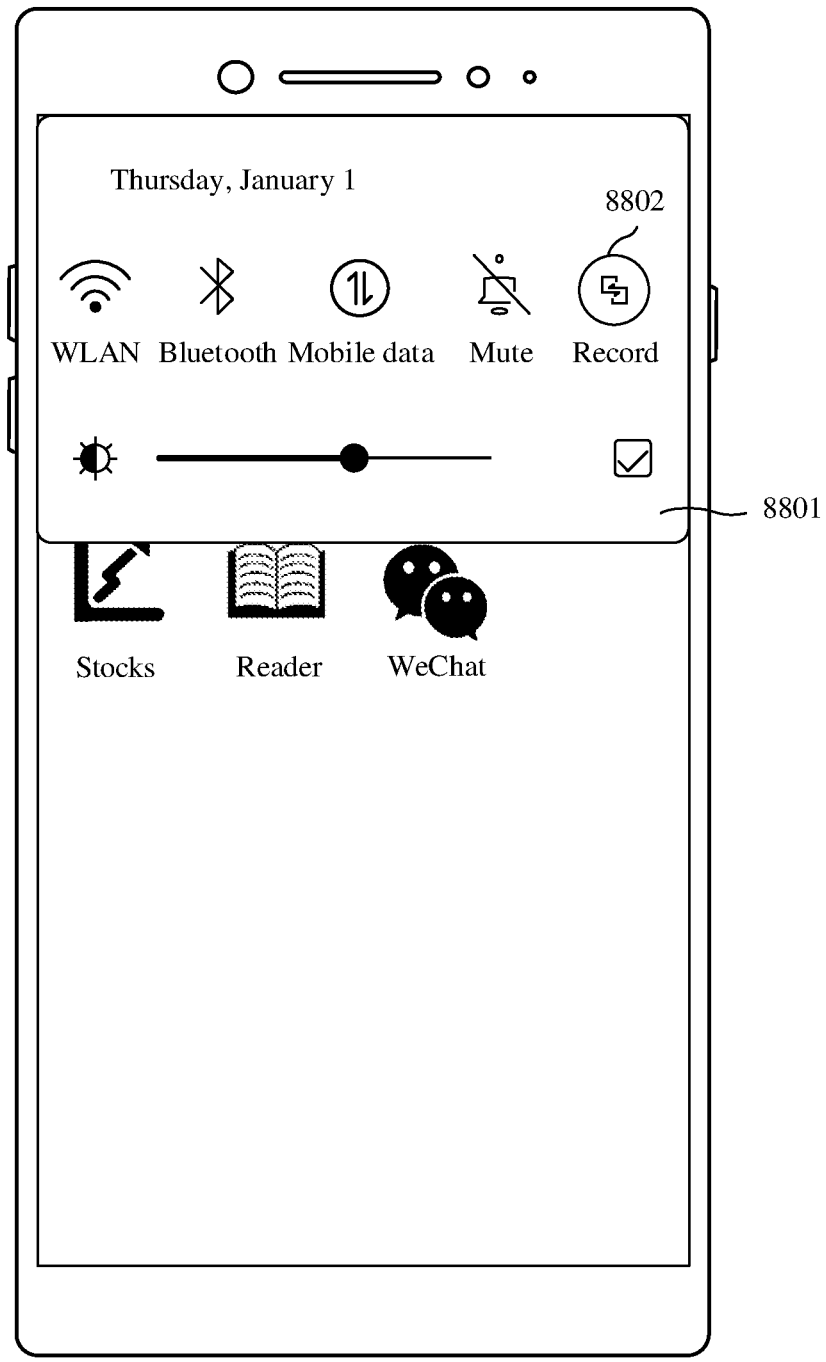
FIG. 88(a) and FIG. 88(b) are a schematic diagram 84 of an audio application scenario according to an embodiment of this application.

As shown in FIG. 88(a), for example, a "Screen recording" button 8802 is disposed in a pull-down menu 8801 in the mobile phone. If it is detected that the user taps the "Screen recording" button 8802, the mobile phone may be triggered to obtain one or more electronic devices that are currently located in a same communications network as the mobile phone. For example, the mobile phone may search for electronic devices that access a same Wi-Fi network or that log in to a same account as the mobile phone. Further, the mobile phone may determine an electronic device having a screen recording function in the found electronic devices. For example, the mobile phone may send a request message to the found electronic device, to request the electronic device that receives the request message to report whether the electronic device has a screen recording function.

Figure 88B:
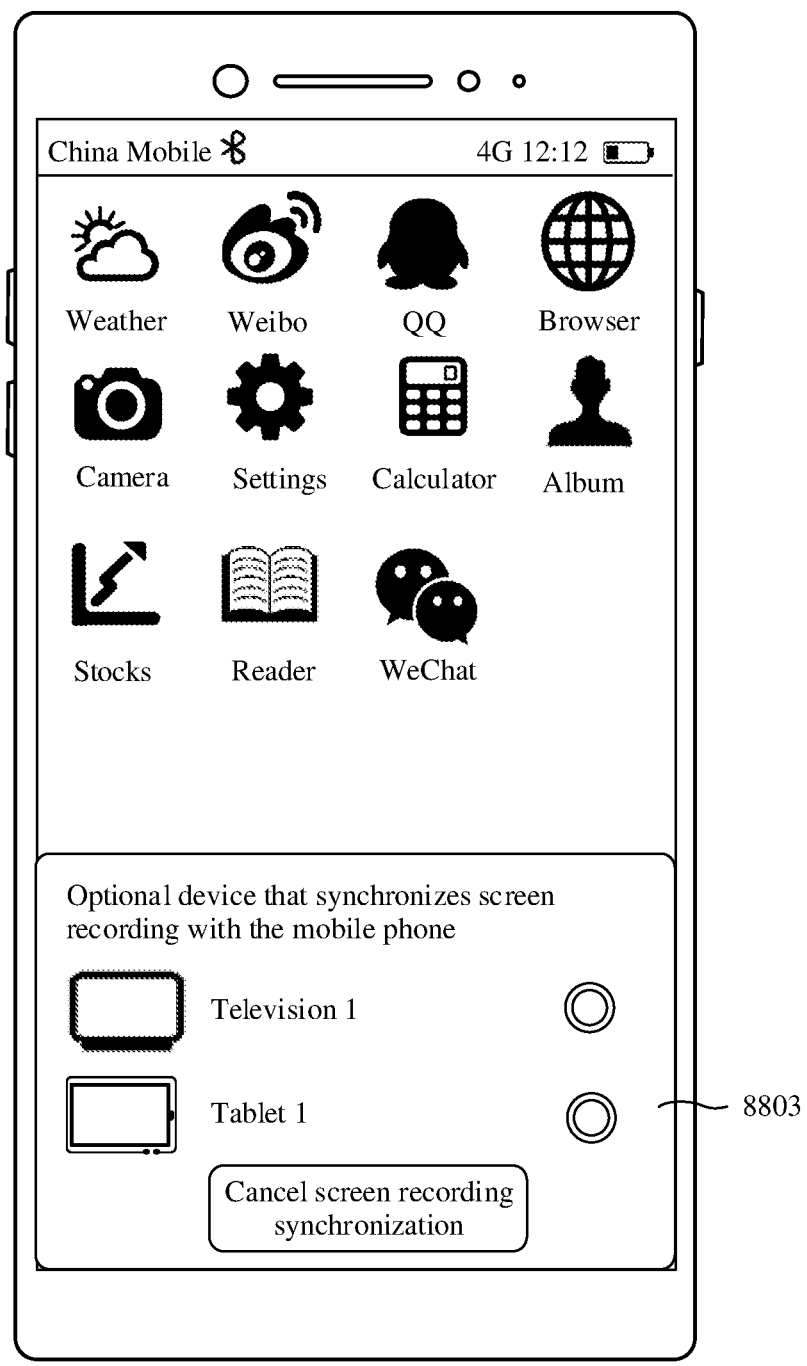

For example, a television 1 and a tablet 1 each have a screen recording function. As shown in FIG. 88(b), the mobile phone may display the television 1 and the tablet 1 in a dialog box 8803. The user may select one or more slave devices for synchronizing screen recording with the mobile phone in the dialog box 8803. In other words, after enabling a screen recording function on the mobile phone (that is, a master device), the user may select one or more slave devices to synchronize screen recording with the mobile phone.

In some embodiments, the mobile phone may also display the mobile phone in the dialog box 8803 as an option. In this case, the user may select to record or select not to record screen data in the mobile phone. For example, the user may select to synchronously record screen data in the television 1 and the tablet 1, and does not record the screen data in the mobile phone. Certainly, in addition to tapping the "Screen recording" button 8802, the user may alternatively enter a preset gesture, a voice instruction, or the like into the mobile phone to enable a function of screen recording synchronization between the mobile phone and another device. This is not limited in this embodiment of this application.

Figure 89:
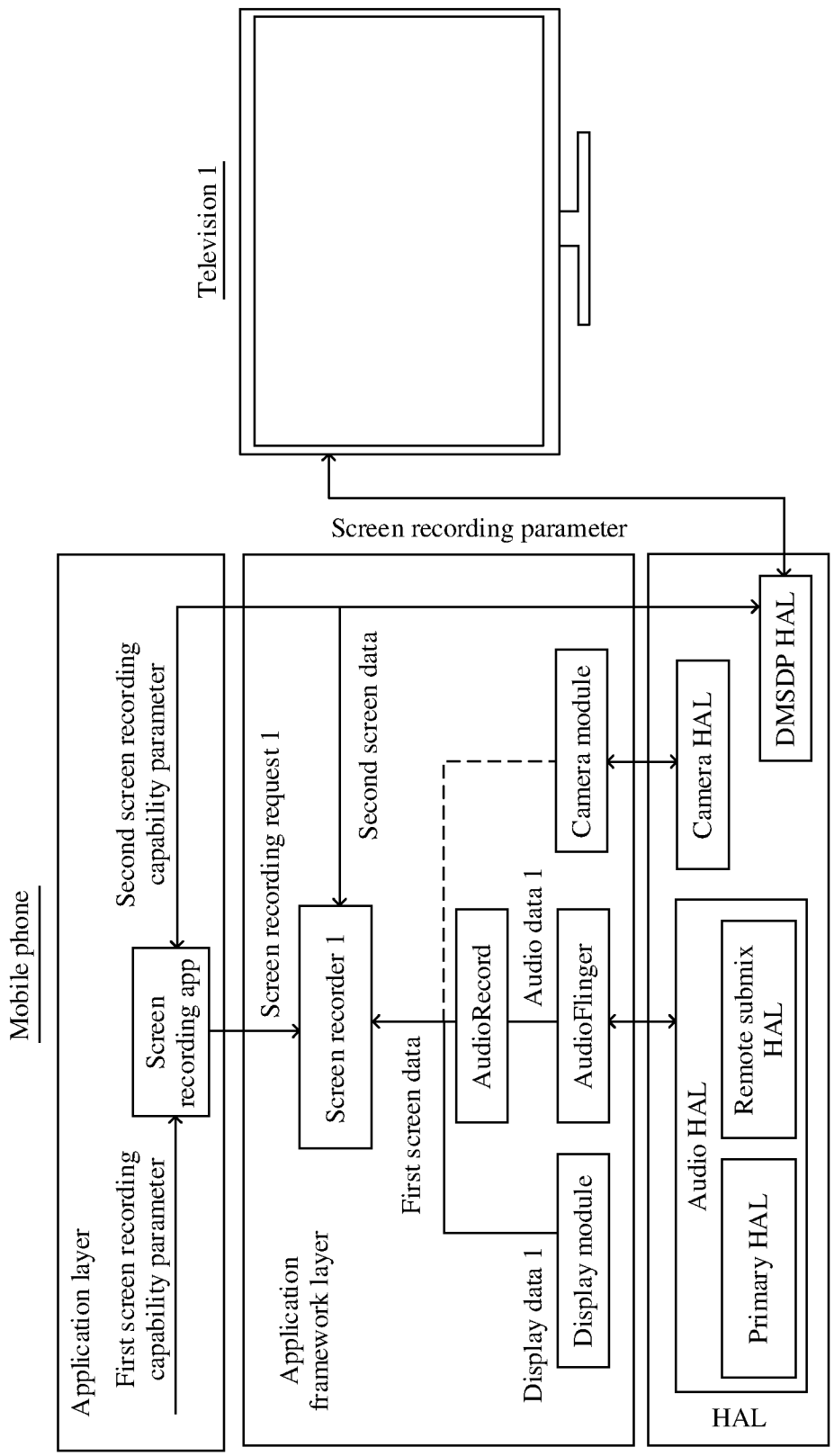
FIG. 89 is a schematic diagram 85 of an audio application scenario according to an embodiment of this application.

For example, the user selects the television 1 in the dialog box 8803. After detecting that the user selects the television 1, as shown in FIG. 89, the mobile phone may use the television 1 as a slave device of the mobile phone, and trigger a screen recording application to obtain a screen recording capability parameter of the television 1 (which may be referred to as a second screen recording capability parameter). The second screen recording capability parameter may include a display capability parameter and an audio capability parameter that are supported by the television 1 during screen recording. For example, the display capability parameter may include a parameter of the television 1 such as a resolution or a DPI; and the audio capability parameter may include a parameter of the television 1 such as a sampling rate, a capability of recording system audio, or a capability of collecting audio by using a microphone. It can be understood that each parameter that may be used by the television 1 during screen recording may be used as the second screen recording capability parameter. For example, the second screen recording capability parameter may further include a parameter such as an audio or image encoding/decoding format supported by the television 1, or a focal length or a resolution of a camera in the television 1. This is not limited in this embodiment of this application.

For example, the second screen recording capability parameter of the television 1 is used to indicate that the resolution of the television 1 is 1080*720, the DPI of the television 1 is 200, the sampling rate of the television 1 is 36 kHz, and the television 1 supports system audio recording but does not support microphone audio recording. The television 1 may send the second screen recording capability parameter to the DMSDP HAL in the mobile phone, and the DMSDP HAL sends the second screen recording capability parameter to the screen recording application.

Still as shown in FIG. 89, in addition to the second screen recording capability parameter of the television 1, the screen recording application may further obtain a screen recording capability parameter of the mobile phone (which may be referred to as a first screen recording capability parameter). Similar to the second screen recording capability parameter, the first screen recording capability parameter may include a display capability parameter and an audio capability parameter that are supported by the mobile phone during screen recording. For example, the first screen recording capability parameter of the mobile phone is used to indicate that a resolution of the mobile phone is 1920*1080, a DPI of the mobile phone is 300, a sampling rate of the mobile phone is 48 kHz, and the mobile phone supports system audio recording and also supports microphone audio recording.

Further, still as shown in FIG. 89, the screen recording application may send a screen recording request 1 to a screen recorder 1 at the application framework layer, where the screen recording request 1 may include the first screen recording capability parameter and the second screen recording capability parameter. In response to the screen recording request 1, the screen recorder 1 may determine, based on the first screen recording capability parameter and the second screen recording capability parameter, screen recording parameters used for current screen recording. The screen recording parameter may include a display recording parameter corresponding to the display capability parameter and an audio recording parameter corresponding to the audio capability parameter. The screen recorder 1 may provide an application (for example, the screen recording application) at the application framework layer with a screen recording interface, for example, a screen recording interface named HwMediaProject. The screen recording application may invoke the screen recording interface HwMediaProject to interact with the screen recorder 1.

For example, when the resolution 1920*1080 of the mobile phone is greater than the resolution 1080*720 of the television 1, the screen recorder 1 may set a resolution used for current screen recording to 1080*720 (that is, the resolution of the television 1), so as to ensure that both the mobile phone and the television 1 can complete current screen recording.

For another example, when the DPI 300 of the mobile phone is greater than the DPI 200 of the television 1, the screen recorder 1 may set a DPI used for current screen recording to 200 (that is, the DPI of the television 1), so as to ensure that both the television 1 and the mobile phone can complete current screen recording.

For another example, when an audio data sampling rate 1 of the mobile phone is greater than an audio data sampling rate 2 of the television 1, the screen recorder 1 may set an audio data sampling rate used for current screen recording to the sampling rate 2 (that is, the sampling rate of the television 1), so as to ensure that both the television 1 and the mobile phone can complete current screen recording.

For another example, when the television 1 supports system audio recording but does not support microphone audio recording, and the mobile phone supports system audio recording and also supports microphone audio recording, the screen recorder 1 may set that the television 1 records system audio during current screen recording and the mobile phone records both system audio and microphone audio during current screen recording.

In this way, as shown in Table 20, the screen recorder 1 may determine, based on the first screen recording capability parameter and the second screen recording capability parameter, screen recording parameters used by the mobile phone and the television 1 during current screen recording. The screen recording parameter includes a display recording parameter and an audio recording parameter. The screen recording parameter meets screen recording capabilities of both the mobile phone (that is, a master device) and the television 1 (that is, a slave device), so that the mobile phone and the television 1 can complete current screen recording based on the determined screen recording parameters.

TABLE 20

| Device | Display recording parameter | | Sampling rate | Audio recording parameter | |
|---|---|---|---|---|---|
| | Resolution | DPI | | System audio recording | Microphone audio recording |
| Mobile phone | 1080*720 | 200 | 36 kHz | Yes | Yes |
| Television 1 | 1080*720 | 200 | 36 kHz | Yes | No |

In some embodiments, the screen recorder 1 may alternatively determine the screen recording parameters with reference to a current network status. For example, when a network bandwidth between the mobile phone and the television 1 is less than a preset value, it indicates that a network status between the mobile phone and the television 1 is poor. In this case, the screen recorder 1 may set the resolution used by each of the mobile phone and the television 1 in the screen recording parameters to a default value, where the default value may be less than a current resolution of each of the mobile phone and the television 1. In this way, an amount of screen data subsequently collected by the television 1 based on the resolution during screen recording is small, so as to avoid a case in which the television 1 cannot send recorded screen data to the mobile phone in time due to an insufficient bandwidth when the television 1 and the mobile phone subsequently synchronize screen recording.

In some embodiments, the screen recorder 1 may alternatively determine the screen recording parameters with reference to a current service scenario. For example, when the screen recording application is an application of a live broadcast type, because a live broadcast service has a high requirement on an audio latency and an image latency, the screen recorder 1 may also set the resolution used by each of the mobile phone and the television 1 in the screen recording parameters to the foregoing default value. In this way, an amount of screen data subsequently collected by the television 1 based on the resolution during screen recording is small, so as to avoid a case in which screen data recorded by the mobile phone and screen data recorded by the television 1 are not synchronized due to an excessively large amount of data when the television 1 and the mobile phone subsequently synchronize screen recording.

In some embodiments, the display recording parameter in the screen parameter may further include a display data source. The display data source may include a display and/or a camera. For example, when the screen recording application is an application of a live broadcast type, the screen recorder 1 may set a source of display data recorded by the mobile phone to a camera and a source of display data recorded by the television to a display. In other words, during current screen recording, the screen recording application may simultaneously record display data that is collected by the camera on the mobile phone and display data that is played on the display of the television 1.

In some other embodiments, the user may alternatively manually set or modify the screen parameter during current screen recording. For example, the screen recorder 1 may determine one or more optional screen parameters based on the first screen recording capability parameter and the second screen recording capability parameter. The screen recorder 1 may display an optional screen parameter to the user by using the screen recording application, for example, a parameter indicating whether to enable microphone recording or whether to enable camera recording, and the user manually sets the screen parameter.

Figure 90:
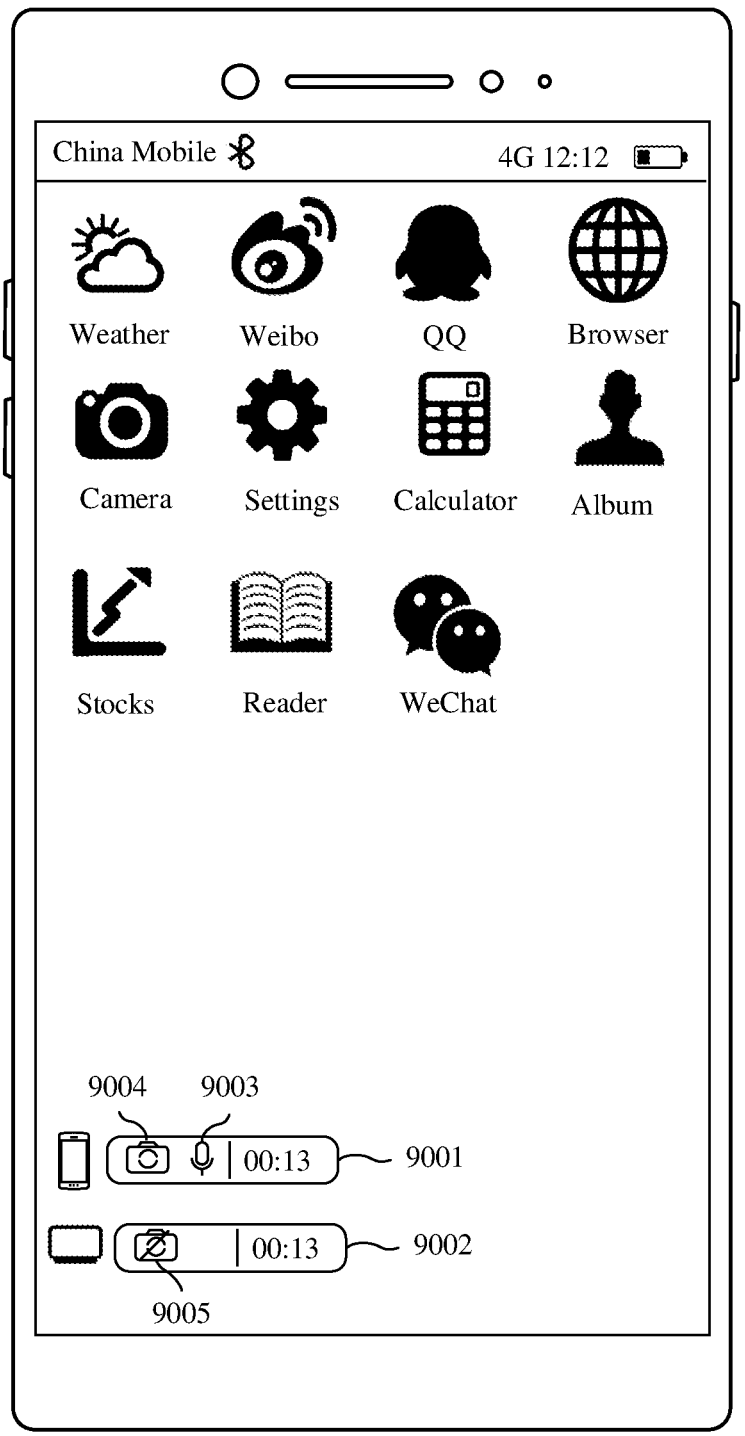
FIG. 90 is a schematic diagram 86 of an audio application scenario according to an embodiment of this application.

As shown in FIG. 90, the screen recording application may display a recording control bar 9001 of the mobile phone and a recording control bar 9002 of the television 1 during recording. The recording control bar 9001 and the recording control bar 9002 each may display information such as current recording duration.

In addition, when the first screen recording capability parameter of the mobile phone indicates that the mobile phone supports the microphone in recording audio data and the camera in collecting display data, the screen recording application may display a microphone button 9003 and a camera button 9004 in the recording control bar 9001. For example, the user may turn on or off the microphone of the mobile phone by tapping the microphone button 9003, and the screen recorder 1 may modify, based on the operation performed by the user on the microphone button 9003, the audio recording parameter used by the mobile phone in the screen parameter. For another example, the user may turn on or off the camera of the mobile phone by tapping the camera button 9004, and the screen recorder 1 may modify, based on the operation performed by the user on the camera button 9004, the display recording parameter used by the mobile phone in the screen parameter.

Similarly, when the second screen recording capability parameter of the television 1 indicates that the television 1 does not support the microphone in recording audio data but supports the camera in collecting display data, the screen recording application may display a camera button 9005 in the recording control bar 9001. The user may turn on or off the camera of the television 1 by tapping the camera button 9005, and the screen recorder 1 may modify, based on the operation performed by the user on the camera button 9005, the display recording parameter used by the television 1 in the screen parameter. Certainly, during recording, the mobile phone may alternatively indicate the television 1 to display the recording control bar 9001 and/or the recording control bar 9002. This is not limited in this embodiment of this application.

After detecting that the user modifies the screen recording parameter used by the mobile phone or the television 1, the screen recording application may send a latest screen recording parameter to the screen recorder 1. Subsequently, the screen recorder 1 may control, based on the latest screen recording parameter, the mobile phone and the television 1 to synchronize screen recording.

In addition, the foregoing embodiment is described by using an example in which the screen recorder 1 determines, based on the first screen recording capability parameter and the second screen recording capability parameter, the screen recording parameters used by the mobile phone and the television 1 during current screen recording. It can be understood that the screen recording application may alternatively determine, according to the method in the foregoing embodiment, the screen recording parameters used by the mobile phone and the television 1, and the screen recording application may further add the determined screen recording parameters to the screen recording request 1 and then send the screen recording request to the screen recorder 1. This is not limited in this embodiment of this application.

Still as shown in FIG. 89, after the screen recorder 1 determines the screen recording parameters used by the mobile phone and the television 1, the screen recorder 1 may trigger the mobile phone to perform screen recording based on the screen recording parameter corresponding to the mobile phone. In addition, the screen recorder 1 may send the screen recording parameter used by the television 1 to the television 1, and the television 1 performs screen recording based on the screen recording parameter corresponding to the television 1. For example, the screen recorder 1 may transmit an identifier of the television 1 and the screen recording parameter corresponding to the television 1 in Table 20 to the DMSDP HAL by using AudioFlinger, and the DMSDP HAL sends a screen recording instruction to the television 1 based on the identifier of the television 1, where the screen recording instruction may include the screen recording parameter used by the television 1.

In addition, for the mobile phone, the screen recorder 1 may invoke a display module, and obtain, from the display module in real time based on the display recording parameter corresponding to the mobile phone in the screen recording parameter, display data 1 that is being played on the display of the mobile phone. Alternatively, if the display recording parameter indicates that the display data collected by the camera of the mobile phone needs to be recorded, the screen recorder 1 may invoke a camera module, and obtain, from the camera module in real time based on the corresponding display recording parameter, the display data collected by the camera of the mobile phone. Certainly, the screen recorder 1 may alternatively obtain, from the display module, the display data that is being played on the display of the mobile phone, and obtain, from the camera module, the display data that is collected by the camera of the mobile phone. This is not limited in this embodiment of this application.

In addition, the screen recorder 1 may invoke AudioRecord, and obtain audio data 1 of the mobile phone from AudioFlinger in real time based on the audio recording parameter corresponding to the mobile phone in the screen recording parameter. For example, if the audio recording parameter indicates that the mobile phone records system audio, AudioFlinger may obtain, from a remote submix HAL, audio data that is being played by the mobile phone. In this way, the audio data 1 obtained by the screen recorder 1 from AudioFlinger is system audio of the mobile phone. For another example, if the audio recording parameter indicates that the mobile phone records microphone audio, AudioFlinger may obtain, from a primary HAL, audio data that is recorded by the microphone of the mobile phone. In this way, the audio data 1 obtained by the screen recorder 1 from AudioFlinger is audio collected by the microphone of the mobile phone. For another example, if the audio recording parameter indicates that the mobile phone records system audio and microphone audio, AudioFlinger may mix audio data obtained from the remote submix HAL and audio data obtained from the primary HAL. In this way, the audio data 1 obtained by the screen recorder 1 from AudioFlinger is audio collected by the microphone of the mobile phone and system audio of the mobile phone.

Still as shown in FIG. 89, the screen recorder 1 may obtain the display data 1 and the audio data 1 of the mobile phone in real time, that is, first screen data recorded by the mobile phone. The first screen data may record and restore audio and an image that are being played (or collected) by the mobile phone. In addition, for the television 1, after receiving the screen recording instruction sent by the mobile phone, the television 1 may perform screen recording based on the screen recording parameter corresponding to the television 1 in the screen recording instruction by using the screen recording capability of the television 1.

Figure 91:
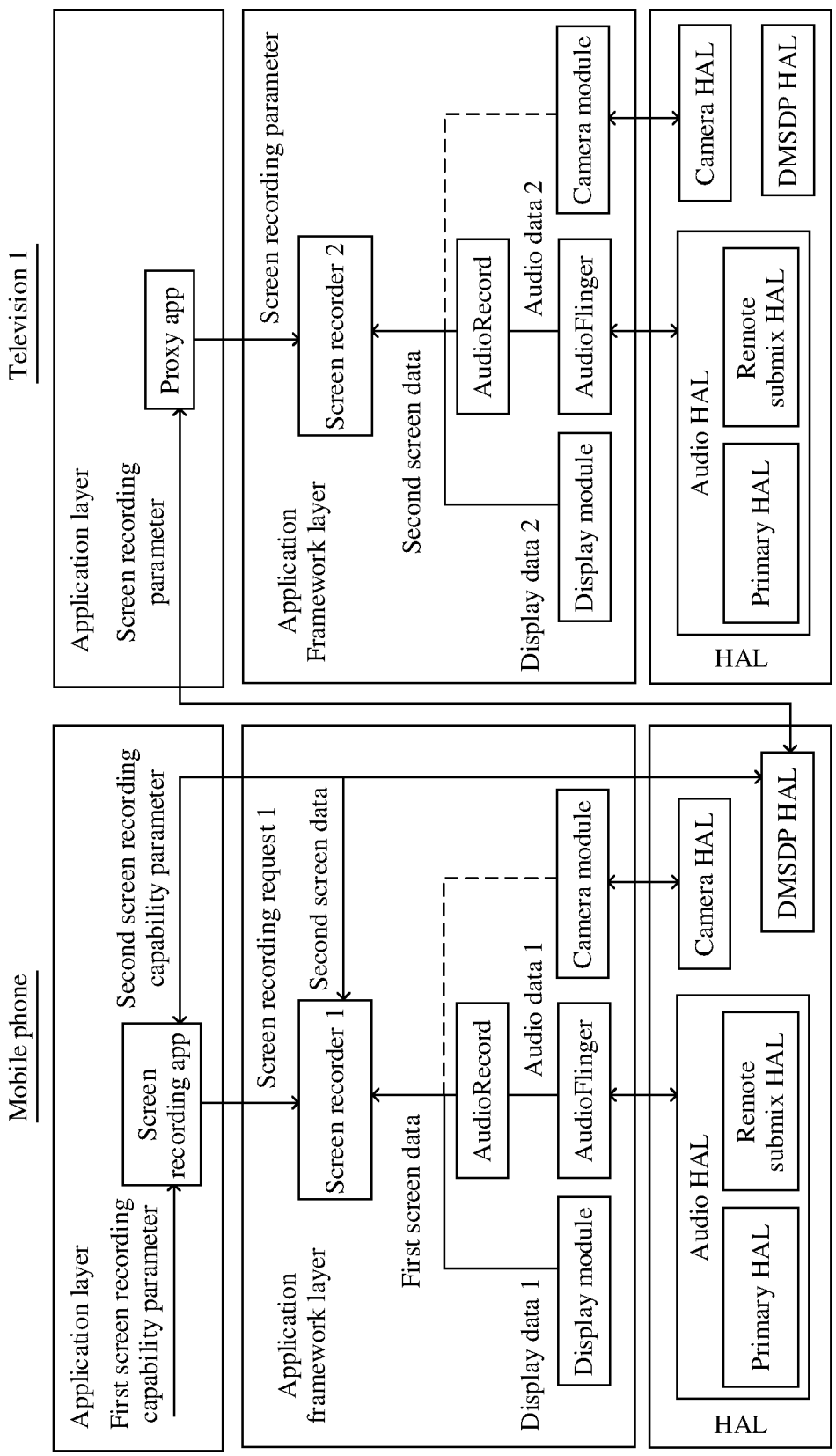
FIG. 91 is a schematic diagram 87 of an audio application scenario according to an embodiment of this application.

As shown in FIG. 91, similar to the software architecture of the operating system of the mobile phone, a proxy application may be set at an application layer of the television 1, function modules such as a screen recorder 2, a display module, a camera module, AudioRecord, and AudioFlinger are set at an application framework layer of the television 1, and a camera HAL, a remote submix HAL, and a primary HAL are set at an HAL of the television 1.

The proxy application in the television 1 may be configured to interact with the mobile phone. For example, after the television 1 establishes a connection to the mobile phone, the proxy application in the television 1 may invoke the screen recorder 2 to obtain the screen recording capability parameter (that is, the second screen recording capability parameter) of the television 1, and send the second screen recording capability parameter to the mobile phone (for example, the screen recording application in the mobile phone or the screen recorder 1 in the mobile phone). For another example, the proxy application may receive a screen recording instruction sent by the mobile phone (for example, the screen recording application in the mobile phone or the screen recorder 1 in the mobile phone), where the screen recording instruction includes the screen recording parameter corresponding to the television 1. In response to the screen recording instruction, the proxy application may invoke the screen recorder 2 based on the screen recording parameter to perform current screen recording.

Similar to the process in which the mobile phone performs screen recording, the screen recorder 2 may invoke the display module in the television 1, and obtain, from the display module in real time based on the display recording parameter corresponding to the television 1 in the screen recording parameter, display data 2 that is being played on the display of the television 1. Alternatively, if the display recording parameter indicates that the display data collected by the camera of the television 1 needs to be recorded, the screen recorder 2 may invoke the camera module in the television 1, and obtain, from the camera module in real time based on the corresponding display recording parameter, display data collected by the camera of the television 1. Certainly, the screen recorder 2 may alternatively obtain, from the display module, the display data that is being played on the display of the television 1, and obtain, from the camera module, the display data that is collected by the camera of the television 1. This is not limited in this embodiment of this application.

In addition, the screen recorder 2 may invoke AudioRecord of the television 1, and obtain audio data 2 of the television 1 from AudioFlinger in real time based on the audio recording parameter corresponding to the television 1 in the screen recording parameter. For example, AudioFlinger may obtain, from the remote submix HAL, audio data that is being played by the television 1. For another example, AudioFlinger may obtain, from the primary HAL, audio data collected by the microphone of the television 1.

In this way, the screen recorder 2 in the television 1 may obtain the display data 2 and the audio data 2 of the television 1 in real time, that is, second screen data recorded by the television 1. The second screen data may record and restore audio and an image that are being played (or collected) by the television 1. Further, the screen recorder 2 may send the obtained second screen data to the mobile phone. Alternatively, the screen recorder 2 may report the obtained second screen data to the proxy application, and the proxy application sends the second screen data to the mobile phone. Data interaction between the television 1 and the mobile phone may be implemented by using the DMSDP HAL in the mobile phone.

Still as shown in FIG. 89, the screen recorder 1 in the mobile phone may receive, by using the DMSDP HAL, the second screen data sent by the screen recorder 2 in the television 1 (or the proxy application in the television 1). In this way, the screen recorder 1 may obtain, in real time, the first screen data recorded by the mobile phone and the second screen data recorded by the television 1. The first screen data includes the display data 1 and the audio data 1 that are recorded by the mobile phone, and the second screen data includes the display data 2 and the audio data 2 that are recorded by the television 1. Subsequently, the screen recorder 1 may report the first screen data and the second screen data to the screen recording application, and the screen recording application may invoke a corresponding interface to make the first screen data and the second screen data into a current screen recording file. Certainly, the screen recorder 1 may alternatively make a current screen recording file based on the first screen data and the second screen data, and report the screen recording file to the screen recording application. This is not limited in this embodiment of this application.

Figure 92:
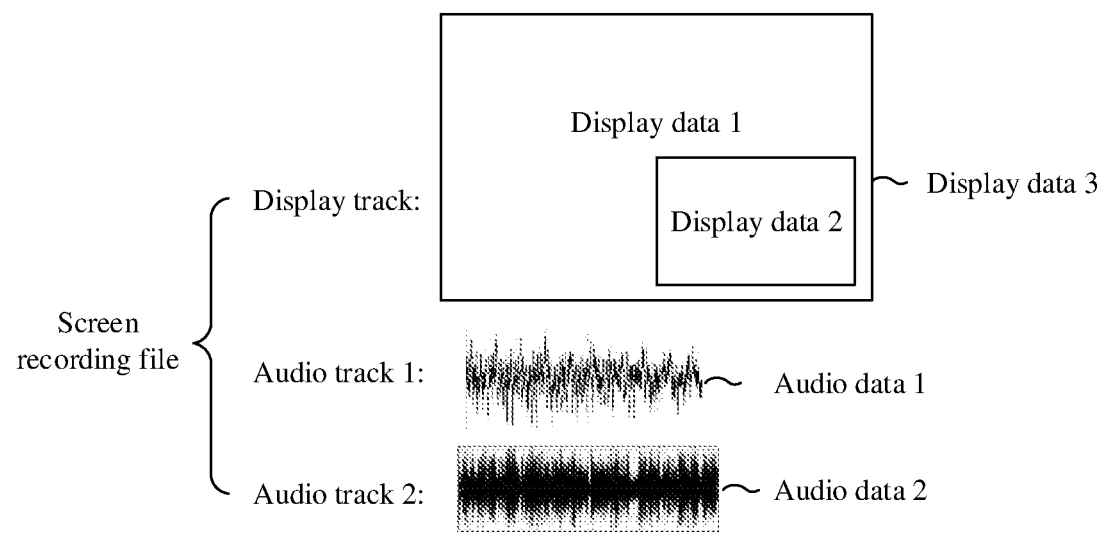
FIG. 92 is a schematic diagram 88 of an audio application scenario according to an embodiment of this application.

In some embodiments, for example, the screen recording application makes the current screen recording file based on the first screen data and the second screen data. The screen recording application may make the first screen data and the second screen data into one screen recording file. For example, as shown in FIG. 92, because the first screen data and the second screen data are recorded based on the unified screen recording parameter shown in Table 20, the display recording parameters such as the resolution of the display data 1 in the first screen data and the resolution of the display data 2 in the second screen data are unified. Therefore, the screen recording application may re-encode the display data 1 and the display data 2, and combine the display data 1 and the display data 2 into display data 3 corresponding to one display image. The screen recording application may set a display track in the screen recording file, where the display track corresponds to the display data 3. Locations, shapes, and proportions of the display data 1 and the display data 2 in the combined display image are not limited in this embodiment of this application.

Still as shown in FIG. 92, the screen recording application may set two audio tracks in the screen recording file, where an audio track 1 corresponds to the audio data 1 in the first screen data, and an audio track 2 corresponds to the audio data 2 in the second screen data. Certainly, the screen recording application may also perform an operation such as encoding on the audio data 1 and the audio data 2. This is not limited in this embodiment of this application. Finally, the screen recording file made by the screen recording application includes the display data 3 and audio data on the audio track 1 and the audio track 2.

Alternatively, the screen recording application may synthesize the audio data 1 and the audio data 2 into audio data 3 through mixing. In this case, the screen recording application may set that one audio track corresponds to the audio data 3 and one display track corresponds to the display data 3 in the screen recording file. This is not limited in this embodiment of this application.

In a process in which the mobile phone and the television 1 synchronize screen recording, it takes a specific time for the television 1 to transmit the recorded second screen data to the mobile phone through a communications network. Consequently, the first screen data recorded by the mobile phone and the second screen data recorded by the television 1 are asynchronous in terms of time. In some embodiments, the screen recording application may further obtain a transmission latency T during screen recording. For example, the screen recording application may periodically query a current transmission latency T of a Wi-Fi module by using the DMSDP HAL. When the transmission latency T is greater than a threshold, the screen recording application may first synchronize the first screen data and the second screen data based on the current transmission latency T, and the screen recording application may further make the synchronized first screen data and second screen data into one screen recording file according to the foregoing method. This avoids a case in which screen data is not synchronized during screen recording synchronization between a plurality of devices.

Figure 93:
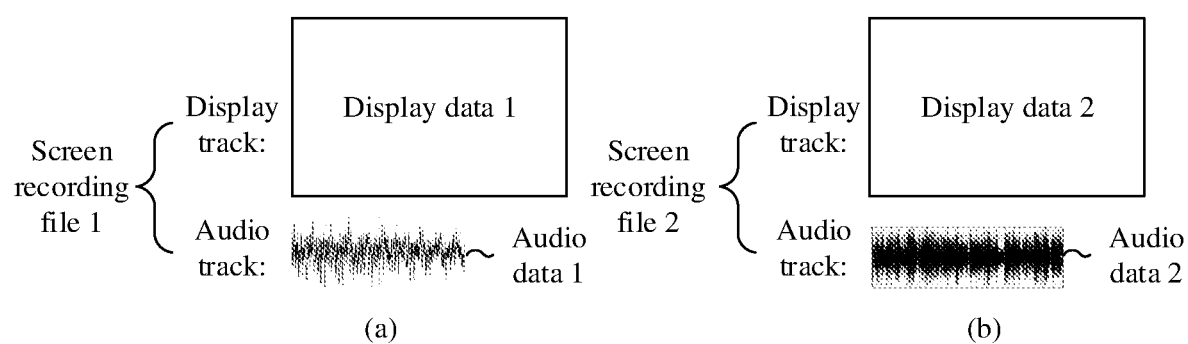
FIG. 93 is a schematic diagram 89 of an audio application scenario according to an embodiment of this application.

In some embodiments, the screen recording application may respectively make the first screen data and the second screen data into two corresponding screen recording files. For example, as shown in (a) in FIG. 93, the screen recording application may perform an operation such as encoding/decoding or encapsulation on the display data 1 and the audio data 1 in the first screen data, to obtain a screen recording file 1. A display track in the screen recording file 1 corresponds to the display data 1, and an audio track in the screen recording file 1 corresponds to the audio data 1. In addition, as shown in (b) in FIG. 93, the screen recording application may perform an operation such as encoding/decoding or encapsulation on the display data 2 and the audio data 2 in the second screen data, to obtain a screen recording file 2. A display track in the screen recording file 2 corresponds to the display data 2, and an audio track in the screen recording file 2 corresponds to the audio data 2.

It should be noted that the screen recording application may locally store one or more made screen recording files in the mobile phone, or may send one or more made screen recording files to the television 1, and the television 1 locally stores the screen recording files in the television 1. Alternatively, the screen recording application may send a generated screen recording file to the server or another electronic device in real time. This is not limited in embodiments of this application.

In addition, if the user further selects to use another slave device to synchronize screen recording with the mobile phone and the television 1 when enabling the screen recording function, similar to the process in which the mobile phone and the television 1 synchronize screen recording in the foregoing embodiment, the mobile phone may further indicate the another slave device to record screen data of the another slave device based on the screen recording parameter determined by the mobile phone. In this case, the screen recording application may further receive the screen data sent by the another slave device, and the screen recording application may still make obtained screen data recorded by a plurality of devices into a corresponding screen recording file according to the foregoing method.

Figure 94:
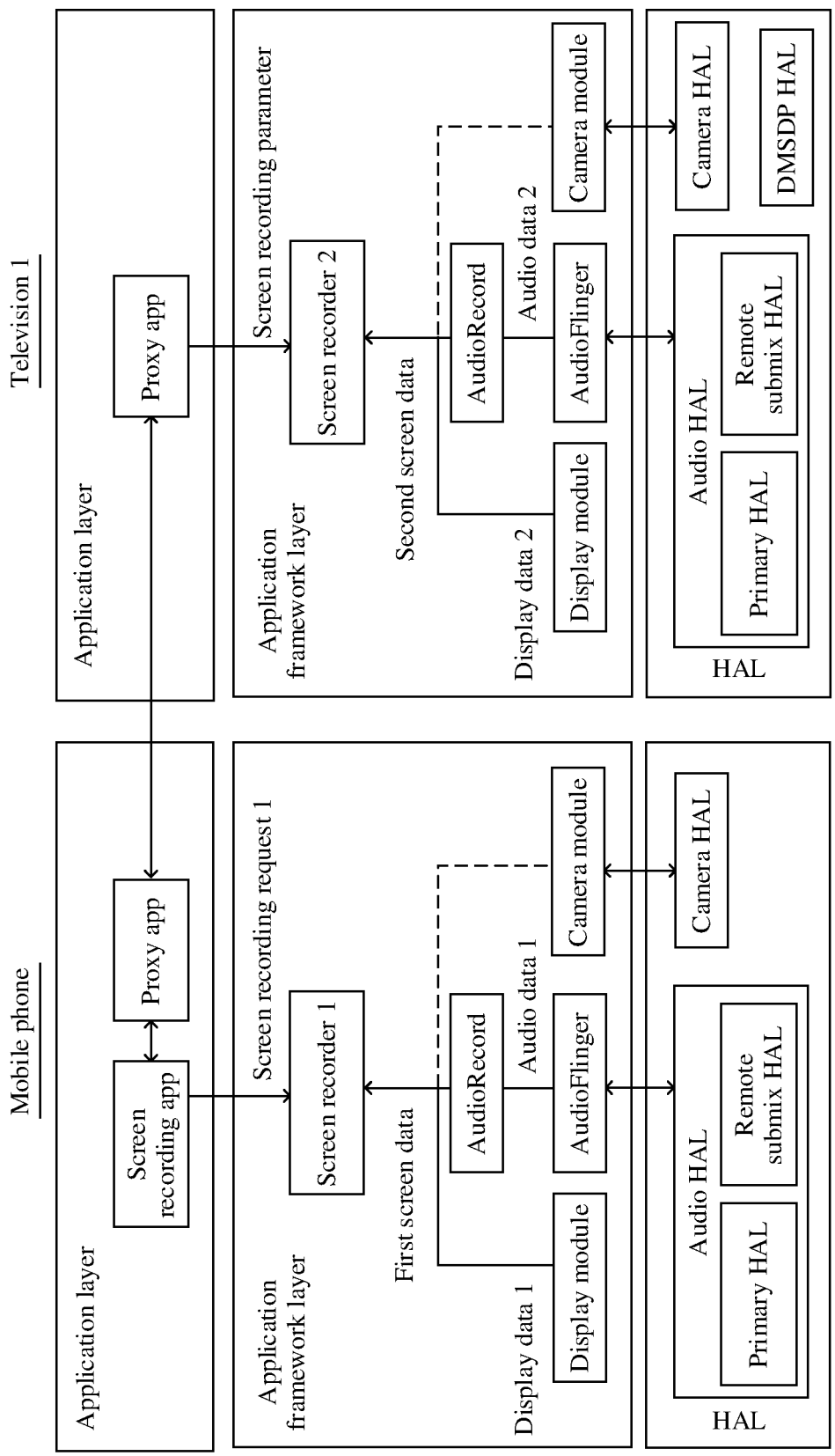
FIG. 94 is a schematic diagram 90 of an audio application scenario according to an embodiment of this application.

In some embodiments, the mobile phone may create a DMSDP HAL and then interact with a slave device (for example, the television 1) by using the DMSDP HAL, or the mobile phone may set a proxy application at the application layer and the proxy application in the mobile phone interacts with a slave device. For example, as shown in FIG. 94, a proxy application is set in each of the mobile phone and the television 1. The proxy application in the mobile phone may interact with the proxy application in the television 1, so as to implement data receiving and sending between the mobile phone and the television 1. For example, in a process in which the mobile phone and the television 1 synchronize screen recording, the mobile phone may send the screen recording parameter of the television 1 to the proxy application in the television 1 by using the proxy application in the mobile phone, and the proxy application in the television 1 invokes the screen recorder 2 according to the method described in FIG. 91 to record the second screen data. In addition, the proxy application in the television 1 may send the second screen data to the proxy application in the mobile phone, and the proxy application in the mobile phone sends the second screen data to the screen recording application. Likewise, the screen recording application may obtain not only the first screen data reported by the screen recorder 1, but also the second screen data sent by the proxy application. Subsequently, the screen recording application may make, according to the foregoing method, a corresponding screen recording file based on the first screen data and the second screen data. In this implementation, the mobile phone can implement screen recording synchronization between the mobile phone and another device without creating a DMSDP HAL corresponding to a slave device at the HAL.

It can be learned that, in this embodiment of this application, during screen recording, the mobile phone (that is, a master device) may synchronously obtain the first screen data recorded by the master device and the second screen data recorded by the slave device. Further, the mobile phone may generate the screen recording file based on the first screen data and the second screen data, so as to synchronously restore audio and images that are played (or collected) by the master device and the slave device, and more comprehensively record and restore service scenarios implemented on the master device and the slave device, so that the user can simultaneously record screen data in a plurality of electronic devices. This improves user screen recording experience in a distributed system.

In a distributed audio scenario, for example, the mobile phone is a master device. There may be specifically a plurality of scenarios in which the master device projects display data and/or audio data to a slave device.

Scenario 1

Figure 95:
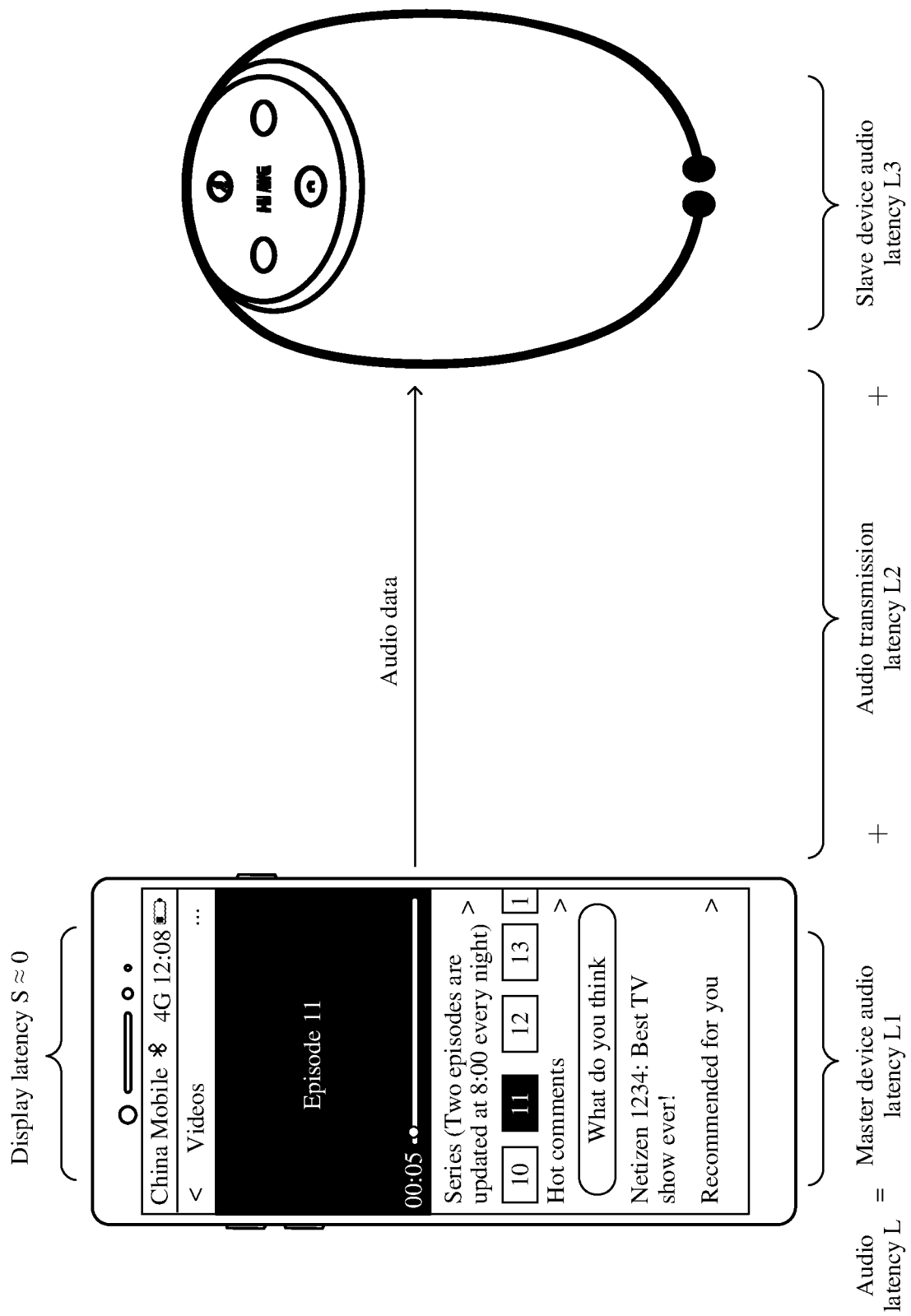
FIG. 95 is a schematic diagram 91 of an audio application scenario according to an embodiment of this application.

As shown in FIG. 95, a video played when the mobile phone runs Videos generally includes audio data and display data. The mobile phone may display, by using the display of the mobile phone, display data generated by Videos, and the mobile phone may simultaneously send audio data generated by Videos to a slave device (for example, a sound box) for play. In other words, in the scenario 1, the mobile phone may project the audio data to the slave device for play, and the mobile phone may play the corresponding display data.

In this scenario, because a speed of processing the display data by the mobile phone is fast, and human eyes have the persistence of vision on an image, a display latency S consumed by the mobile phone to process and display the display data may be ignored. The display latency S may specifically mean a time elapsed since the generating a data packet of the display data until the data packet is finally displayed. The data packet of the display data may be generated in response to a play instruction entered by the user. For example, in response to the play instruction that the user taps a play button in Videos, Videos may start to generate a data packet of to-be-played display data. Alternatively, the data packet of the display data may be automatically generated by Videos. For example, when displaying an advertisement, Videos may automatically generate a data packet of to-be-played display data. This is not limited in this embodiment of this application.

However, an audio latency L elapsed since the mobile phone starts to process the audio data generated by Videos until the mobile phone sends the audio data to the sound box and finally the sound box plays the audio data is usually long. Still as shown in FIG. 95, an audio latency L of one data packet in the audio data may include: a time L1 (referred to as a master device audio latency below) consumed for processing the data packet in the mobile phone (that is, a master device), a time L2 (referred to as an audio transmission latency below) consumed for transmitting the data packet between the mobile phone and the sound box (that is, a slave device), and a time L3 (referred to as a slave device audio latency below) elapsed since the sound box starts to process the data packet after the sound box receives the data packet until audio data in the data packet is finally played. It can be understood that a start moment and an end moment of each of the processing process and the transmission process may be implemented in a plurality of manners, and a person skilled in the art may make a selection as required during product implementation.

For example, a start moment of the master device audio latency L1 may be a moment at which Videos generates one data packet in the to-be-played audio data, and an end moment of the master device audio latency L1 may be a moment at which the data packet is sent from the mobile phone. Videos may generate the data packet of the to-be-played audio data in response to the play instruction entered by the user, or Videos may automatically generate the data packet of the to-be-played audio data. This is not limited in this embodiment of this application.

For example, a start moment of the audio transmission latency L2 may be a moment at which the data packet is sent from the mobile phone (that is, the end moment of the master device audio latency L1), and an end moment of the audio transmission latency L2 may be a moment at which the data packet is transmitted to the sound box, that is, a moment at which the sound box receives the data packet.

For example, a start moment of the slave device audio latency L3 may be a moment at which the sound box receives the data packet (that is, the end moment of the audio transmission latency L2), and an end moment of the slave device audio latency L3 may be a moment at which the sound box plays audio data in the data packet.

For example, the start moment of the master device audio latency L1 may be specifically a moment at which Videos in the master device receives an operation that the user taps the play button in Videos, or the start moment of the master device audio latency L1 may be a moment at which Videos generates a play instruction in response to the operation that the user taps the play button, or the start moment of the master device audio latency L1 may be a moment at which an audio player in the master device receives the play instruction.

Similarly, the end moment of the master device audio latency L1 (that is, the start moment of the audio transmission latency L2) may be a moment at which the HAL of the master device sends a data packet in the audio data, or may be a moment at which a hardware module such as Wi-Fi of the master device sends a data packet in the audio data, or the like.

Similarly, the end moment of the audio transmission latency L2 (that is, the start moment of the slave device audio latency L3) may be a moment at which a related application in the slave device receives the foregoing data packet, or may be a moment at which a related hardware module in the slave device receives the foregoing data packet, or the like.

It can be understood that a person skilled in the art may adjust specific time nodes of the start moment and the end moment according to a detection precision requirement, an actual application scenario, or actual experience. In this case, specific values of the master device audio latency L1, the audio transmission latency L2, or the slave device audio latency L3 may fluctuate slightly. However, if an error caused by the fluctuation is within a preset value range, calculation and update of the audio latency L are not obviously affected.

In other words, audio latency L=master device audio latency L1+audio transmission latency L2+slave device audio latency L3. Certainly, when the audio latency L is calculated, the master device may alternatively multiply the master device audio latency L1, the audio transmission latency L2, and the slave device audio latency L3 by a proportion coefficient, and then perform addition to obtain the audio latency L. In other words, audio latency L=k1*master device audio latency L1+k2*audio transmission latency L2+k3*slave device audio latency L3, where k1+k2+k3=1.

In addition, the master device audio latency L1 may also be referred to as a first latency, the audio transmission latency L2 may also be referred to as a second latency, and the slave device audio latency L3 may also be referred to as a third latency. This is not limited in this embodiment of this application.

Therefore, synchronization latency T between the audio data and the display data=audio latency L−display latency S. When the synchronization latency T is greater than 0, it indicates that sound of the audio data is later than display of the display data; when the synchronization latency T is less than 0, it indicates that sound of the audio data is earlier than display of the display data; or when the synchronization latency T is equal to 0, it indicates that sound of the audio data corresponds to display of the display data. Because the display latency S of the display data in the scenario 1 may be ignored, synchronization latency T≈audio latency L. In other words, the audio latency L can reflect a time difference between audio data and display data that correspond to a same moment and that are played.

For example, the audio latency L is 500 ms. Because the display latency S may be ignored, it indicates that audio data corresponding to one moment is played 500 ms later than display data corresponding to the moment. Therefore, after obtaining the audio latency L, the mobile phone may use the audio latency L as the synchronization latency T, and set a synchronization policy based on the audio latency L for current audio-to-video synchronization. For example, after receiving an operation that the user taps a play button in a video, Videos may obtain a currently latest audio latency L (audio latency L=500 ms). Further, Videos may set the following in the synchronization policy: After Videos generates display data of the first second, the mobile phone displays the display data by using the display after 500 ms. In this case, after the audio latency L of 500 ms, audio data of the first second corresponding to the display data of the first second is processed and then sent to the sound box for play, so that audio played by the sound box and an image played by the mobile phone can achieve an audio-to-video synchronization effect. This improves user experience.

Scenario 2

Figure 96:
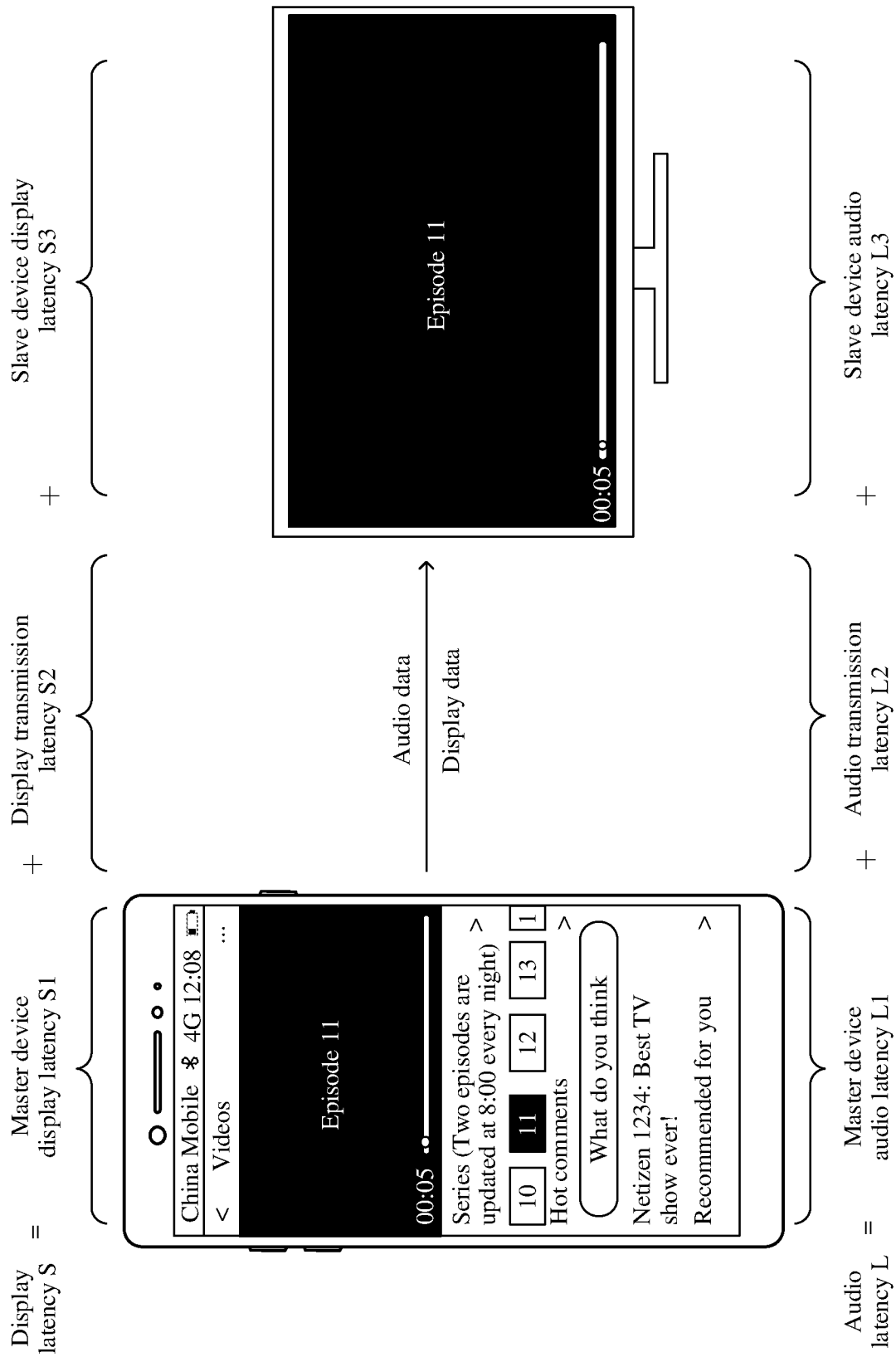
FIG. 96 is a schematic diagram 92 of an audio application scenario according to an embodiment of this application.

As shown in FIG. 96, an example in which the mobile phone runs Videos and plays a video is still used. In the scenario 2, the mobile phone may send both audio data and display data generated by Videos to a slave device (for example, a television) for play. In other words, in the scenario 2, the mobile phone may project both audio and an image in the video to a same slave device for play.

In this scenario, a time elapsed since the mobile phone starts to process the display data generated by Videos until the mobile phone sends the display data to the television and finally the television plays the display data is a display latency S. Still as shown in FIG. 96, a display latency S of one data packet of the display data may include: a time S1 (referred to as a master device display latency below) consumed for processing the data packet in the mobile phone (that is, a master device), a time S2 (referred to as a display transmission latency below) consumed for transmitting the data packet between the mobile phone and the television (that is, a slave device), and a time S3 (referred to as a slave device display latency below) elapsed since the television starts to process the data packet after the television receives the data packet until display data in the data packet is finally played.

Similar to the master device audio latency L1, a start moment of the master device display latency S1 may be a moment at which Videos generates one data packet in the to-be-played display data, and an end moment of the master device display latency S1 may be a moment at which the data packet is output from the mobile phone. A start moment of the display transmission latency S2 may be a moment at which the data packet is output from the mobile phone (that is, the end moment of the master device display latency S1), and an end moment of the display transmission latency S2 may be a moment at which the data packet is transmitted to the television, that is, a moment at which the television receives the data packet. A start moment of the slave device display latency S3 may be a moment at which the television receives the data packet (that is, the end moment of the display transmission latency S2), and an end moment of the slave device display latency S3 may be a moment at which the television displays display data in the data packet.

In other words, display latency S=master device display latency S1+display transmission latency S2+slave device display latency S3. Similar to the audio latency L, when the display latency S is calculated, the master device may also multiply the master device display latency S1, the display transmission latency S2, and the slave device display latency S3 by a proportion coefficient, and then perform addition to obtain the display latency S.

Regardless of the master device or the slave device, because a process of processing the display data in the electronic device is usually simple, that is, a processing speed is fast, the master device display latency S1 and the slave device display latency S3 of the display data may be ignored. In this case, display latency S≈display transmission latency S2.

For the audio data generated when the mobile phone runs Videos, similar to the foregoing scenario 1, audio latency L of the audio data=master device audio latency L1+audio transmission latency L2+slave device audio latency L3.

Therefore, synchronization latency T between the audio data and the display data=audio latency L−display latency S≈audio latency L−display transmission latency S2. The synchronization latency T can reflect a time difference between audio data and display data that correspond to a same moment and that are played.

For example, the audio latency L is 500 ms, and the display transmission latency S2 is 200 ms. In this case, synchronization latency T between the audio data and the display data=500 ms−200 ms=300 ms. In other words, the television plays audio data corresponding to one moment 300 ms later than display data corresponding to the moment. Therefore, after obtaining the synchronization latency T, the mobile phone may set a synchronization policy based on the synchronization latency T for current audio-to-video synchronization. For example, when playing the $N^{th}$ frame of display data, Videos may obtain a currently latest synchronization latency T (synchronization latency T=300 ms).

Further, Videos may set the following in the synchronization policy: After receiving the $(N+1)^{th}$ frame of display data, the television plays the display data after 300 ms. Because the $(N+1)^{th}$ frame of display data needs to be transmitted from the mobile phone to the television for 200 ms (that is, display transmission latency S2=200 ms), audio data corresponding to the $(N+1)^{th}$ frame of display data may also be synchronously played by the television after being processed and transmitted for 500 ms, so that audio and an image played by the television can achieve an audio-to-video synchronization effect. This improves user experience.

In some embodiments, when the mobile phone sends the audio data and the display data to the television, a network connection between the mobile phone and the television is usually fixed. For example, the mobile phone may transmit the audio data and the display data based on a Wi-Fi P2P connection to the television. In this case, transmission rates for transmitting the audio data and the display data on the Wi-Fi P2P connection are usually the same, and a size of a data packet in the audio data is mostly at a same quantity level as a size of a data packet in the display data. Therefore, a time consumed by the mobile phone for transmitting one data packet in the audio data on the Wi-Fi P2P connection is basically the same as a time consumed for transmitting one data packet in the display data, that is, display transmission latency S2 of the display data z audio transmission latency L2 of the audio data. In this case, synchronization latency T≈(master device audio latency L1+audio transmission latency L2+slave device audio latency L3)−display transmission latency S2≈master device audio latency L1+slave device audio latency L3. In this way, the mobile phone may calculate the current synchronization latency T by obtaining the master device audio latency L1 and the slave device audio latency L3.

Scenario 3

Figure 97:
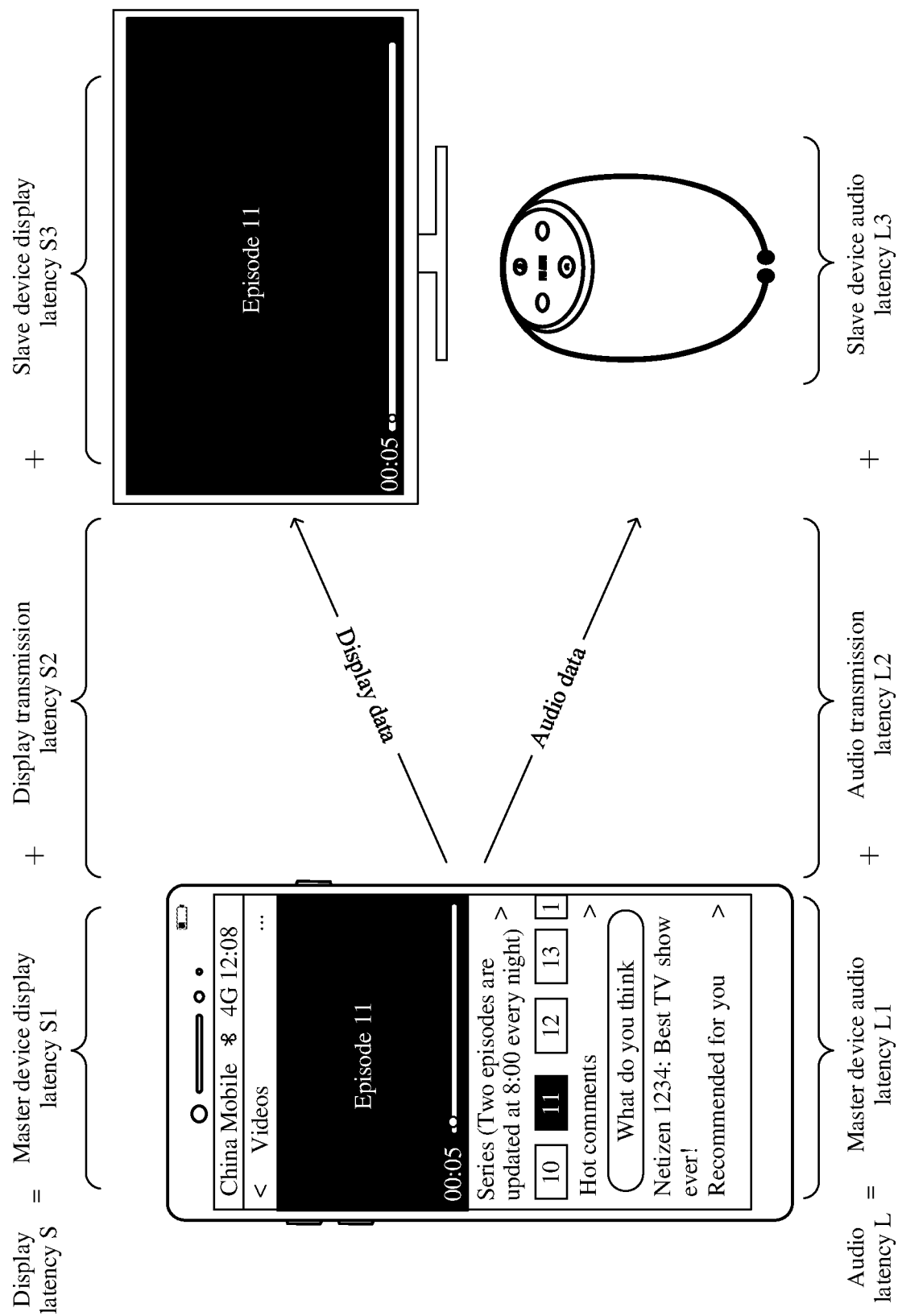
FIG. 97 is a schematic diagram 93 of an audio application scenario according to an embodiment of this application.

As shown in FIG. 97, an example in which the mobile phone runs Videos and plays a video is still used. In the scenario 3, the mobile phone may send display data generated by Videos to a first slave device (for example, a television) for play, and the mobile phone may send audio data generated by Videos to a second slave device (for example, a sound box) for play. In other words, in the scenario 3, the mobile phone may project audio and an image in a video to different slave devices for play.

In this scenario, display latency S of the display data=master device display latency S1+display transmission latency S2+slave device display latency S3. Similar to the scenario 2, the master device display latency S1 and the slave device display latency S3 of the display data may be ignored. In other words, display latency S≈ display transmission latency S2. A difference from the scenario 2 is that the display transmission latency S2 is a latency of transmitting the display data between the mobile phone and the television (that is, the first slave device).

Similarly, audio latency L of the audio data=master device audio latency L1+audio transmission latency L2+slave device audio latency L3. A difference from the scenario 2 is that the audio transmission latency L2 is a latency of transmitting the audio data between the mobile phone and the sound box (that is, the second slave device).

A first network connection between the mobile phone and the television and a second network connection between the mobile phone and the sound box may be different. For example, the mobile phone and the television establish a Wi-Fi connection, but the mobile phone and the sound box establish a Bluetooth connection. Therefore, in the scenario 3, the display transmission latency S2 may be different from the audio transmission latency L2.

Therefore, synchronization latency T between the audio data and the display data=audio latency L−display latency S=(master device audio latency L1+audio transmission latency L2+slave device audio latency L3)−display transmission latency S2.

Likewise, by obtaining the synchronization latency T, the mobile phone may set a synchronization policy based on the synchronization latency T for current audio-to-video synchronization, so as to respectively project the audio data and the video data to the sound box and the television according to the synchronization policy, so that audio played by the sound box and an image played by the television can achieve an audio-to-video synchronization effect.

It can be learned that, in any scenario, when the mobile phone projects the display data and/or the audio data to the slave device, to achieve the audio-to-video synchronization effect, the mobile phone needs to obtain the synchronization latency T between the audio latency L and the display latency S, to set the synchronization policy based on the synchronization latency T for audio-to-video synchronization.

In this embodiment of this application, the mobile phone may dynamically detect and update the audio latency L. In this way, the mobile phone can more accurately calculate the synchronization latency T between the audio latency L and the display latency S based on a latest audio latency L, that is, the synchronization latency T is also dynamically updated with the audio latency L. Subsequently, the mobile phone may set a synchronization policy based on the latest synchronization latency T for audio-to-video synchronization, so that audio and an image that are projected by the mobile phone can more accurately achieve an audio-to-video synchronization effect. This improves user experience.

Figure 98:
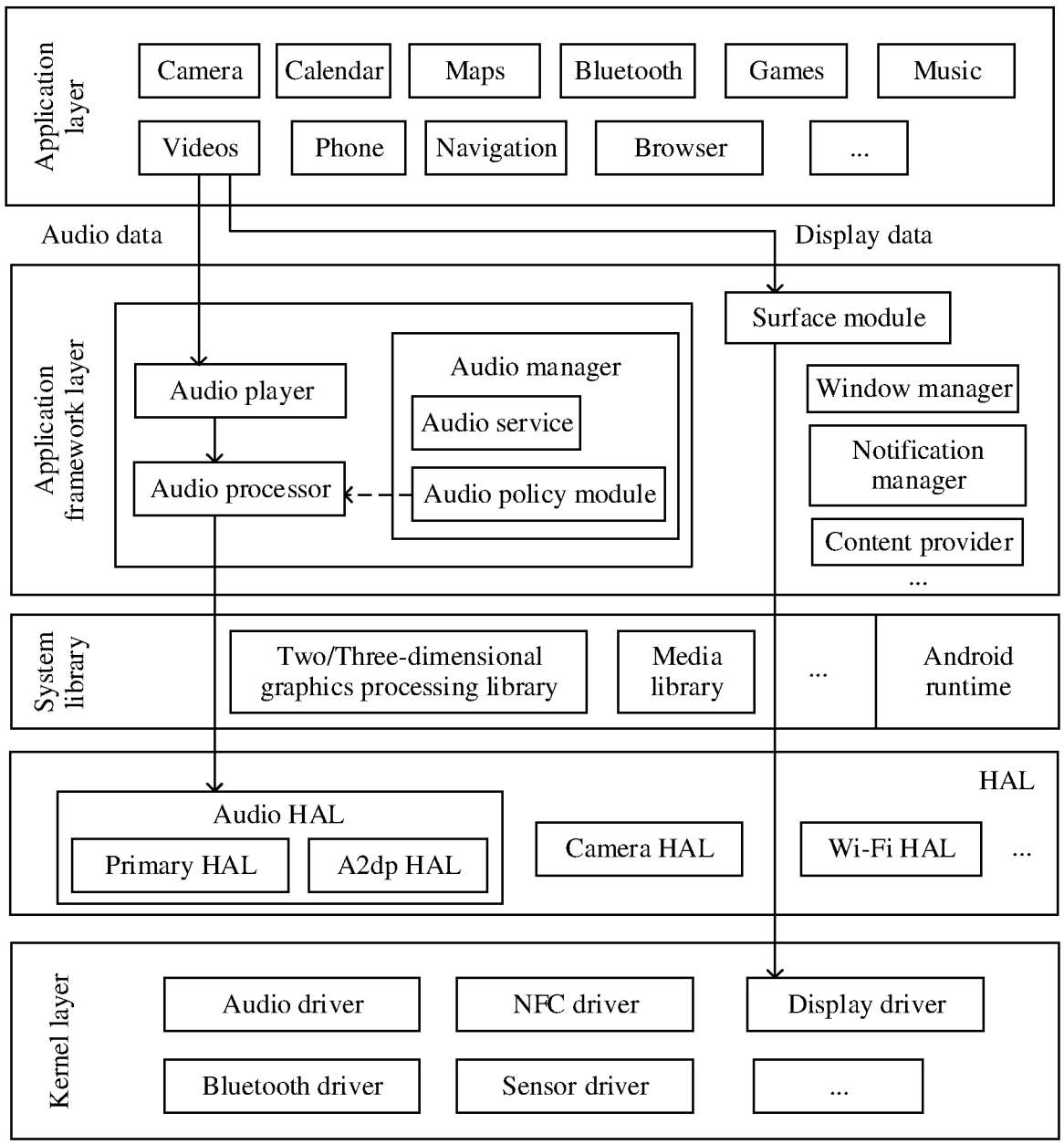
FIG. 98 is a schematic diagram 94 of an audio application scenario according to an embodiment of this application.

Based on the architecture of the Android system shown in FIG. 6, as shown in FIG. 98, in an audio play process, audio data needs to be processed layer by layer by an audio player, an audio processor, an audio manager, and an HAL and finally output to a hardware module such as a speaker for play. In other words, an audio latency L of the audio data starts from a moment at which Videos generates the audio data, and the audio data is processed layer by layer by the audio player, the audio processor, the audio manager, and the HAL until the audio data is played from the speaker. Apparently, the audio latency L of the audio data is usually long.

However, when the mobile phone displays an image, for example, still for Videos, still as shown in FIG. 98, display data generated by Videos may be directly parsed by using a surface module, and the surface module sends, by using a display driver, parsed display data to the display for display. It may be learned that, when an image is displayed on the mobile phone, a process of processing display data in an image display process is simple. In this case, a display latency S of the display data may be ignored. In this scenario, the audio latency L of the audio data can reflect a time difference between audio data and display data that correspond to a same moment and that are played by the mobile phone. In other words, audio latency L synchronization latency T.

To ensure that an image and audio that are played in Videos are synchronized (that is, audio-to-video synchronization), when the mobile phone runs Videos, Videos may periodically invoke a getLatency( ) interface to obtain the audio latency L of the audio data. Further, Videos may set a synchronization policy based on the obtained audio latency L for audio-to-video synchronization. For example, Videos may periodically obtain a latest audio latency L. For example, the period is 3 seconds. When Videos generates audio data and display data that correspond to the third second and that are to be played, if a currently obtained audio latency L is 500 ms, Videos may further set, in the synchronization policy, that the audio data corresponding to the third second is input into the audio player 500 ms earlier than the display data. In this way, the audio data corresponding to the third second may be played synchronously with the display data corresponding to the third second after 500 ms processing, so as to achieve an audio-to-video synchronization effect.

For example, when an app (for example, Videos) running on the mobile phone needs to perform audio-to-video synchronization, Videos may invoke the getLatency (interface to query an audio service (AudioService) for a synchronization latency T, that is calculated most recently, between audio data and display data (synchronization latency T=audio latency L–display latency S). Alternatively, Videos may invoke a player (for example, Nuplayer or Mediaplayer), and the player invokes the getLatency( ) interface to query an audio service (AudioService) for a synchronization latency T, that is calculated most recently, between audio data and display data. Subsequently, after obtaining the synchronization latency T, Videos or the player may set a synchronization policy based on the synchronization latency T for audio-to-video synchronization, so as to output audio data and/or display data subsequently generated by Videos to a slave device according to the synchronization policy.

In this embodiment of this application, to improve accuracy of synchronization between audio and an image during audio-to-video synchronization, the synchronization latency T stored in AudioService may be dynamically updated, so that the synchronization latency T obtained by Videos or the player can more accurately indicate a time difference between audio data and display data that correspond to a same moment and that are currently played. A specific method for dynamically updating the synchronization latency T is described in detail below with reference to a specific embodiment.

Scenario 1

In the scenario 1, when the mobile phone runs Videos, audio data generated by Videos may be projected to a slave device for play, and display data generated by Videos is still played by the mobile phone.

Figure 99A:
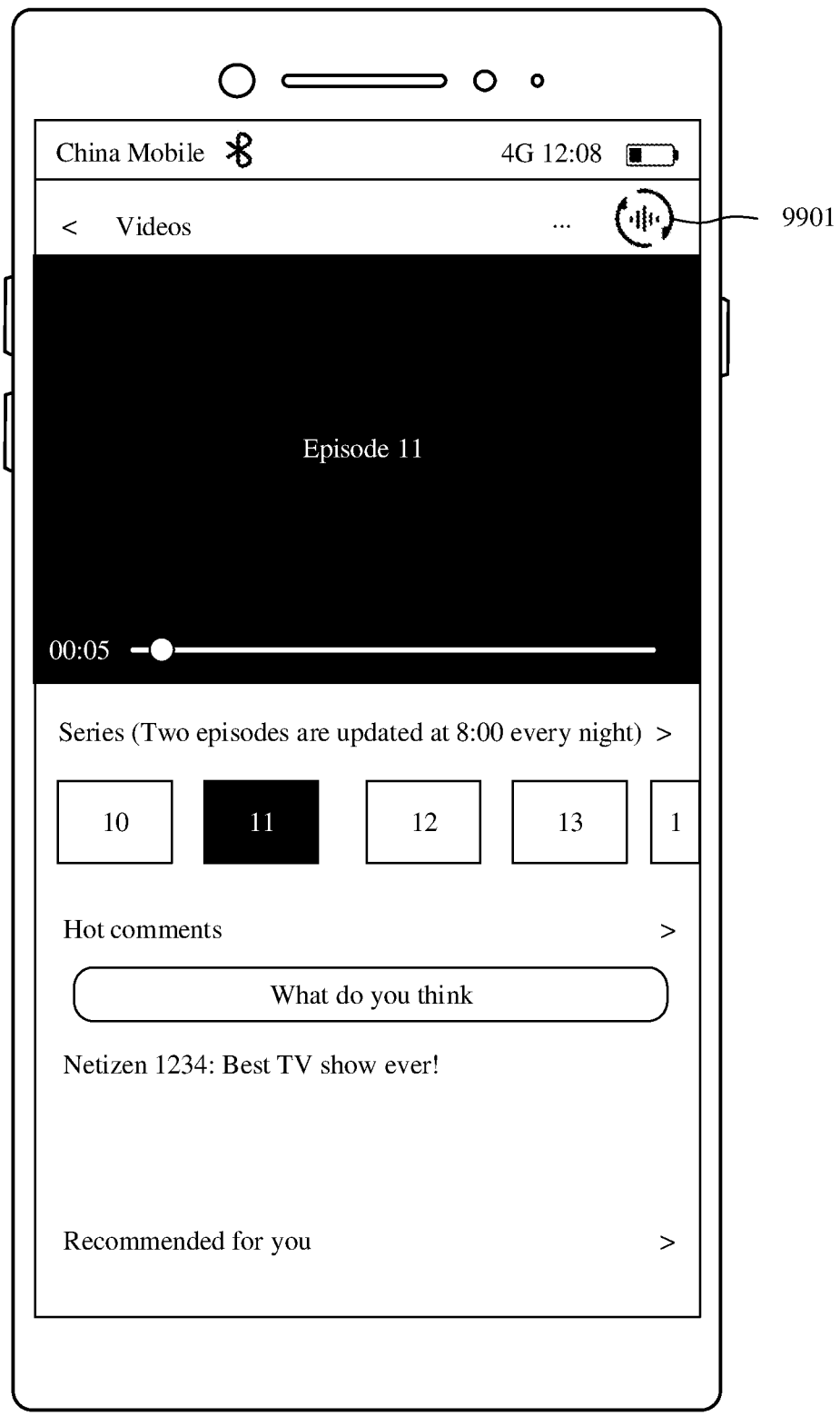
FIG. 99(a) and FIG. 99(b) are a schematic diagram 95 of an audio application scenario according to an embodiment of this application.
Figure 99B:
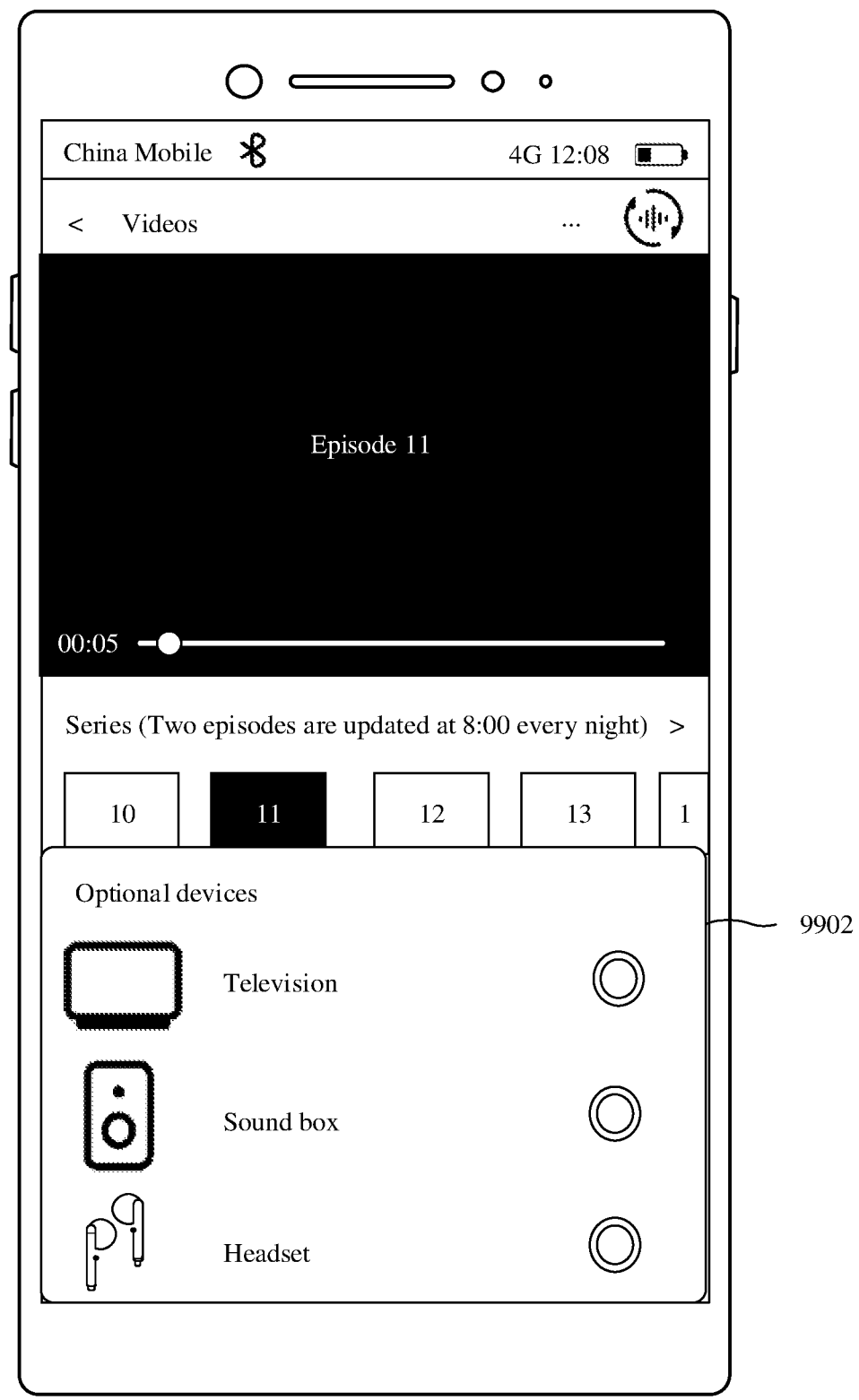

For example, as shown in FIG. 99(*a*), when running Videos, the mobile phone may display a switching button 9901 for audio switching. If it is detected that the user taps the switching button 9901, it indicates that the user wants to switch audio data generated by Videos to another audio output device for play. In this case, the mobile phone runs the DV app to search for one or more nearby candidate devices for audio switching. For example, as shown in FIG. 99(*b*), the DV app may display, in a menu 9902, candidate devices that are located in a same Wi-Fi network as the mobile phone, for example, a television, a sound box, and a headset. The user may select one of these candidate devices as an audio output device when the mobile phone subsequently outputs audio, that is, a slave device of the mobile phone.

Figure 100A:
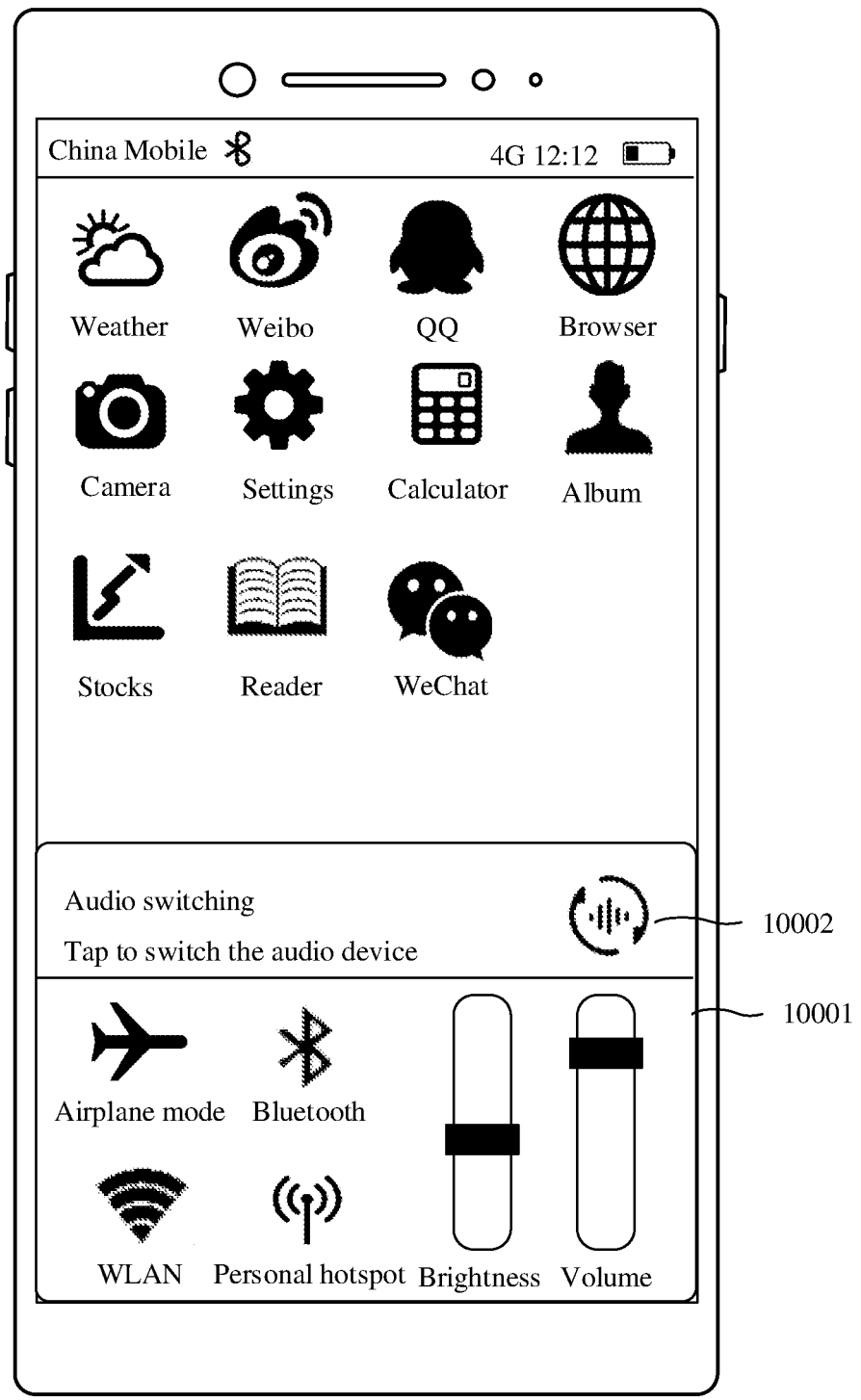
FIG. 100(a) and FIG. 100(b) are a schematic diagram 96 of an audio application scenario according to an embodiment of this application.
Figure 100B:
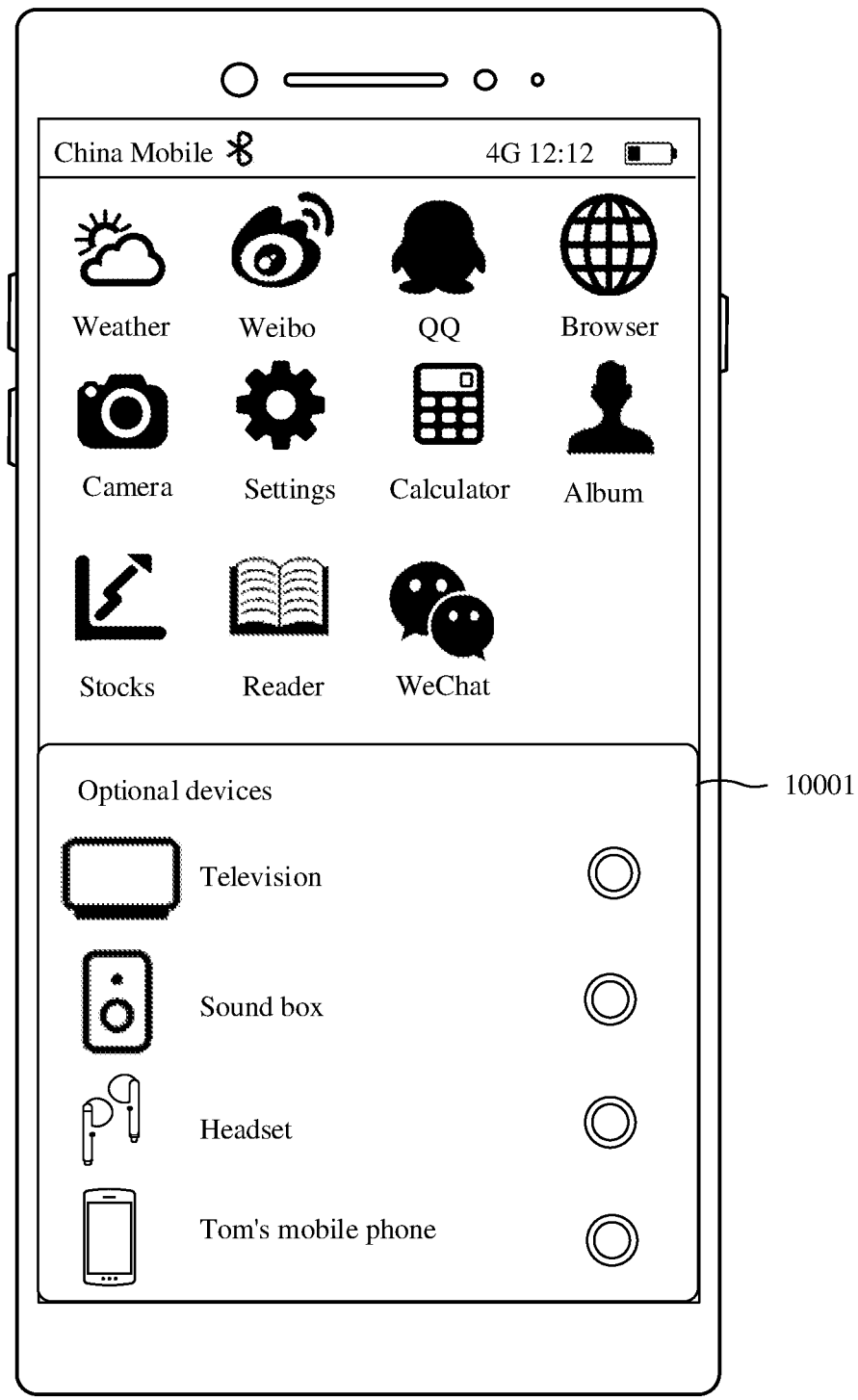

For another example, the user may alternatively open a control center of the mobile phone, and switch an audio output device in the control center when the mobile phone outputs audio. In response to the operation that the user opens the control center, as shown in FIG. 100(*a*), the mobile phone may display a control center 10001. A switching button 10002 for audio switching is disposed in the control center 10001. If it is detected that the user taps the switching button 10002, the mobile phone may also run the DV app to search for one or more nearby candidate devices for audio switching. As shown in FIG. 100(*b*), the DV app may display, in the control center 10001, found candidate devices that are located in a same Wi-Fi network as the mobile phone, for example, a television, a sound box, and a headset. Likewise, the user may select one of these candidate devices as an audio output device when the mobile phone subsequently outputs audio, that is, a slave device of the mobile phone.

For example, the user selects the sound box as a slave device of the mobile phone. After it is detected that the user selects the sound box from the foregoing candidate devices, the DV app may establish a network connection to the sound box by using the sound box as a slave device of the mobile phone. For example, the network connection may be a P2P connection based on the transmission control protocol (transmission control protocol, TCP) or the user datagram protocol (user datagram protocol, UDP). This is not limited in this embodiment of this application.

After the mobile phone establishes the network connection to the sound box, the DV app may obtain an audio capability parameter of the sound box based on the network connection, where the audio capability parameter may reflect an audio output function specifically supported by the sound box. For example, the audio capability parameter may include a sampling rate, a quantity of sound channels, and a sound effect mode that are supported by the sound box. Further, the DV app may create a corresponding DMSDP audio HAL at an HAL based on the audio capability parameter of the sound box. Subsequently, the mobile phone may transmit audio data to the sound box by using the DMSDP audio HAL, so as to switch an audio function of the mobile phone to the sound box for implementation.

Figure 101:
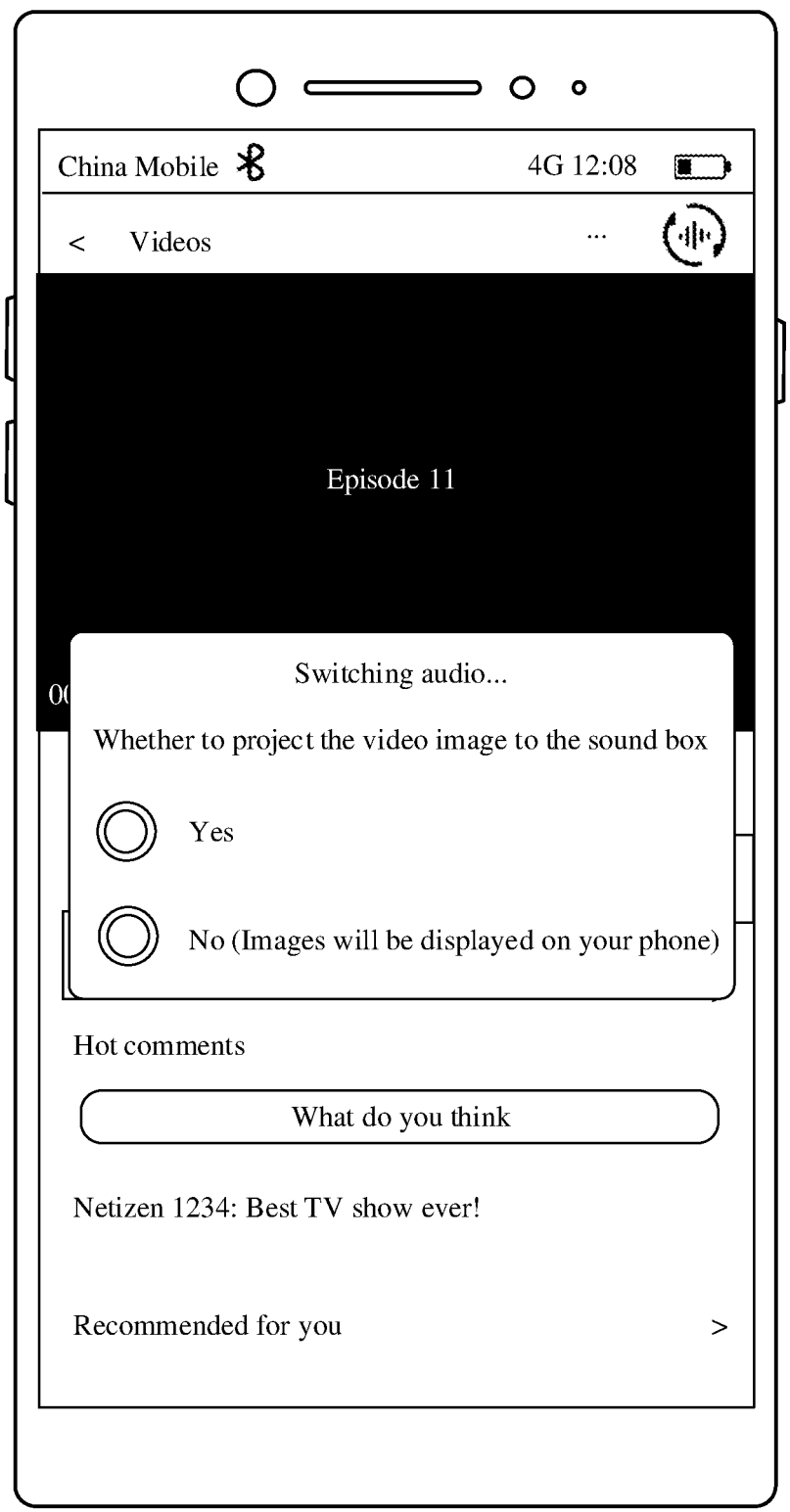
FIG. 101 is a schematic diagram 97 of an audio application scenario according to an embodiment of this application.

In some embodiments, after the mobile phone establishes the network connection to the sound box, the mobile phone may further query whether the current slave device (for example, the sound box) has a display function. For example, the mobile phone may send a query request to the sound box, to request the sound box to report whether the sound box has the display capability. For another example, the mobile phone may obtain information such as a device model of the sound box, and further determine, based on the information such as the device model of the sound box, whether the sound box has the display function. If the sound box has the display function, as shown in FIG. 101, the mobile phone may prompt the user whether the display data in the mobile phone also needs to be projected to the sound box for display, that is, the display data and the audio data are simultaneously projected to the slave device.

If the user also selects to project the display data to the sound box for display, the mobile phone may simultaneously project, according to a specific method in the following scenario 2, the display data and the audio data in the mobile phone to the slave device for play.

If the user selects to retain the display data in the mobile phone for display, or if the mobile phone determines that the sound box has no display function, the mobile phone may determine that only the audio data in the mobile phone needs to be projected to the sound box for play, and the display data in the mobile phone is still displayed by the display of the mobile phone.

In a process in which the mobile phone projects the audio data to the sound box for play, still as shown in FIG. 95, audio latency L generated by each data packet in the audio data=master device audio latency L1+audio transmission latency L2+slave device audio latency L3. However, display latency S of playing the display data by the mobile phone by using the display of the mobile phone≈0. Therefore, synchronization latency T between the audio data and the display data=audio latency L−display latency S≈audio latency L.

For example, after the DV app creates the corresponding DMSDP audio HAL for the sound box at the HAL, the DMSDP audio HAL may periodically obtain a synchronization latency T between audio data and display data. In the scenario 1, the synchronization latency T is an audio latency L that exists when the mobile phone projects audio data to the sound box. For example, the DMSDP audio HAL may periodically obtain a master device audio latency L1, an audio transmission latency L2, and a slave device audio latency L3 currently in a period of 1 second (s), and then calculate a sum of the obtained master device audio latency L1, audio transmission latency L2, and slave device audio latency L3, to obtain a latest audio latency L. Certainly, a person skilled in the art may set, according to actual experience or an actual application scenario, a specific period for the DMSDP audio HAL to obtain the master device audio latency L1, the audio transmission latency L2, and the slave device audio latency L3.

A value of the master device audio latency L1 mainly depends on a specific process of processing audio data by the mobile phone (that is, a master device). For example, when the mobile phone needs to perform sound effect processing on audio data, a corresponding master device audio latency L1 increases. For another example, when the mobile phone encodes audio data by using different encoding algorithms, corresponding master device audio latencies L1 are also different. For another example, when the mobile phone needs to perform re-sampling on audio data, a corresponding master device audio latency L1 increases.

In this embodiment of this application, after the mobile phone establishes the network connection to the sound box, AudioPolicy in the mobile phone may determine a corresponding audio policy based on the audio capability parameter of the current slave device (for example, the sound box). The audio policy specifically includes audio processing indications, for example, whether to add a sound effect, whether to perform re-sampling, and how to perform encoding. In this case, the DMSDP audio HAL may request AudioPolicy to query the current audio policy, and further determine a current master device audio latency L1 according to the current audio policy.

Figure 102:
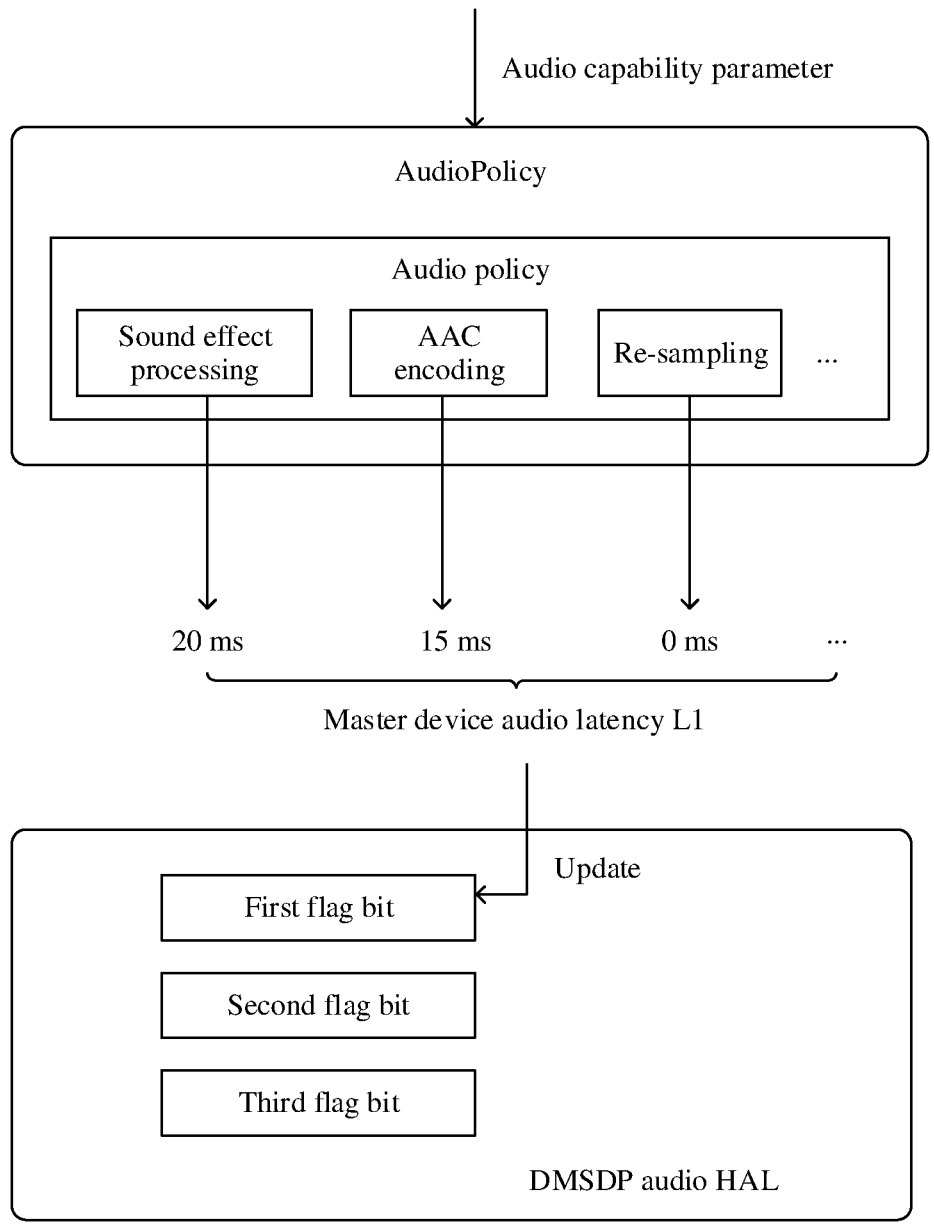
FIG. 102 is a schematic diagram 98 of an audio application scenario according to an embodiment of this application.

For example, as shown in FIG. 102, if it is set in the audio policy that a sound effect needs to be added to audio data (that is, sound effect processing is performed), the DMSDP audio HAL may determine that a sound effect processing process takes 20 ms. Correspondingly, if it is set in the audio policy that sound effect processing is not performed on audio data, the DMSDP audio HAL may determine that a sound effect processing process takes 0 ms.

For another example, as shown in FIG. 102, if it is set in the audio policy that audio data is encoded in an advanced audio coding (Advanced Audio Coding, AAC) format, the DMSDP audio HAL may determine that an encoding process takes 15 ms; or if it is set in the audio policy that audio data is encoded in an H.264 format, the DMSDP audio HAL may determine that an encoding process takes 10 ms.

For another example, as shown in FIG. 102, if it is set in the audio policy that re-sampling is performed on audio data, the DMSDP audio HAL may determine that a re-sampling process takes 5 ms; or if it is set in the audio policy that re-sampling is not performed on audio data, the DMSDP audio HAL may determine that a re-sampling process takes 0 ms.

Further, still as shown in FIG. 102, the DMSDP audio HAL may obtain the current master device audio latency L1 by adding the time consumed for the sound effect processing process, the time consumed for the encoding process, and the time consumed for the re-sampling process. It should be noted that a specific time consumed for the sound effect processing process, a specific time consumed for the encoding process, and a specific time consumed for the re-sampling process may be empirical values that are preset by a developer, or may be obtained by the mobile phone from the server. The mobile phone may update the specific time consumed for each of these audio processing processes. For example, when the time consumed for the sound effect processing process is updated from 20 ms to 15 ms in a new-version operating system, the time consumed for the sound effect processing process is also updated from 20 ms to 15 ms after the mobile phone updates the new-version operating system.

Certainly, if another audio processing process is further set in the audio policy, the DMSDP audio HAL may further determine a time consumed for the another audio processing process, and use the time as a part of the master device audio latency L1. This is not limited in this embodiment of this application.

In this embodiment of this application, because the audio capability parameter obtained by the DV app from the sound box is dynamically updated, the audio policy determined by AudioPolicy based on the audio capability parameter is also dynamically updated. In this case, the master device audio latency L1 determined by the DMSDP audio HAL according to the foregoing audio policy is also dynamically updated.

For example, a first flag bit used to store the master device audio latency L1 may be set in the DMSDP audio HAL. The DMSDP audio HAL may calculate a latest master device audio latency L1 periodically (for example, in a period of 1 second) according to the foregoing method, and update each calculated master device audio latency L1 in the first flag bit for storage.

For another example, each time AudioPolicy updates the audio policy based on the latest audio capability parameter, AudioPolicy may send an update message to the DMSDP audio HAL, that is, notify the DMSDP audio HAL that the audio policy is updated. The DMSDP audio HAL may obtain a latest audio policy from AudioPolicy in response to the update message, and calculate a latest master device audio latency L1 according to the latest audio policy. Further, the DMSDP audio HAL may update the calculated master device audio latency L1 in the first flag bit for storage.

In some embodiments, a value of the audio transmission latency L2 mainly depends on a network status of a network connection between the mobile phone (that is, a master device) and the sound box (that is, a slave device). For example, when network quality of the network connection between the mobile phone and the sound box is good, a corresponding audio transmission latency L2 decreases; or when network quality of the network connection between the mobile phone and the sound box is poor, a corresponding audio transmission latency L2 increases. For another example, when a distance between the mobile phone and the sound box is short, a corresponding audio transmission latency L2 decreases; or when a distance between the mobile phone and the sound box is long, a corresponding audio transmission latency L2 increases.

Figure 103:
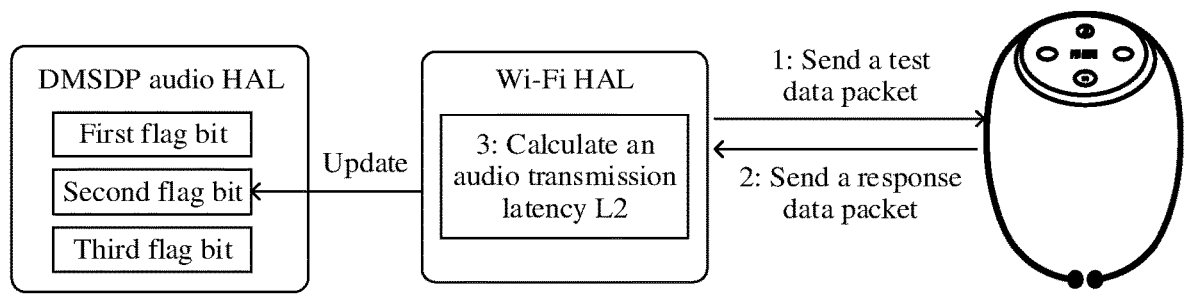
FIG. 103 is a schematic diagram 99 of an audio application scenario according to an embodiment of this application.

For example, the network connection between the mobile phone and the sound box is a Wi-Fi P2P connection. A Wi-Fi HAL at the HAL of the mobile phone may periodically detect the audio transmission latency L2 between the mobile phone and the sound box. For example, as shown in FIG. 103, the Wi-Fi HAL may send a test data packet to the sound box through the Wi-Fi P2P connection between the mobile phone and the sound box in a period of 500 ms. After receiving the test data packet, the sound box may send a response data packet to the Wi-Fi HAL in the mobile phone. In this way, the Wi-Fi HAL may calculate the current audio transmission latency L2 between the mobile phone and the sound box by detecting a time interval elapsed since the sending the test data packet until the receiving the response data packet.

For another example, after the mobile phone establishes the Wi-Fi P2P connection to the sound box, the mobile phone may periodically receive, by using a heartbeat mechanism, a heartbeat packet or a heartbeat response sent by the sound box. When the mobile phone does not receive, within a preset time, a heartbeat packet or a heartbeat response sent by the sound box, it indicates that a network condition between the mobile phone and the sound box may change. In this case, the Wi-Fi HAL in the mobile phone may be triggered to send a test data packet to the sound box, and receive a response data packet sent by the sound box in response to the test data packet. In this way, the Wi-Fi HAL may calculate the current audio transmission latency L2 between the mobile phone and the sound box by detecting a time interval elapsed since the sending the test data packet until the receiving the response data packet.

For example, if the time interval elapsed since the mobile phone sends the test data packet to the sound box until the mobile phone receives the response data packet sent by the sound box is N, the Wi-Fi HAL may calculate the current audio transmission latency L2=N/2 between the mobile phone and the sound box, that is, a time consumed by the mobile phone to transmit one data packet in the audio data to the sound box.

In this embodiment of this application, a second flag bit used to store the audio transmission latency L2 may be set in the DMSDP audio HAL. Still as shown in FIG. 103, the DMSDP audio HAL may periodically read the audio transmission latency L2 stored in the Wi-Fi HAL, and update each read audio transmission latency L2 in the second flag bit for storage. The period for the DMSDP audio HAL to obtain the audio transmission latency L2 may be the same as or different from the period for the DMSDP audio HAL to obtain the master device audio latency L1 in the foregoing embodiment.

For another example, after calculating a latest audio transmission latency L2 each time, the Wi-Fi HAL may send an update message to the DMSDP audio HAL, that is, notify the DMSDP audio HAL that the audio transmission latency L2 is updated. In response to the update message, the DMSDP audio HAL may read the audio transmission latency L2 stored in the Wi-Fi HAL, and update the read audio transmission latency L2 in the second flag bit for storage.

In some embodiments, a value of the slave device audio latency L3 mainly depends on a specific process in which the sound box (that is, a slave device) processes and plays audio data. For example, when the sound box needs to perform sound effect processing on audio data, a corresponding slave device audio latency L3 increases. For another example, when the sound box needs to process audio data by using a DSP, a corresponding slave device audio latency L3 also increases. For another example, when the sound box plays audio data by using speakers of different models or from different manufacturers, corresponding slave device audio latencies L3 are also different.

In this embodiment of this application, the audio capability parameter obtained by the DV app in the mobile phone from the sound box may include the slave device audio latency L3 that exists when the sound box serves as a slave device. In other words, the sound box may calculate an audio latency of the sound box, add the audio latency to the audio capability parameter as the slave device audio latency L3, and report the audio capability parameter to the mobile phone (that is, a master device).

For example, a process in which the sound box serves as a slave device to obtain the slave device audio latency L3 is similar to a process in which the mobile phone serves as a master device to obtain the master device audio latency L1. For example, if the sound box needs to perform sound effect processing on audio data, the sound box may determine that a sound effect processing process takes 15 ms. For another example, if the sound box does not need to perform sound effect processing on audio data, the sound box may determine that a sound effect processing process takes 0 ms. For another example, if the sound box needs to process audio data by using the DSP, the sound box may determine that a processing process of the DSP takes 10 ms. Correspondingly, if the sound box does not need to process audio data by using the DSP, the sound box may determine that a processing process of the DSP takes 0 ms.

Figure 104:
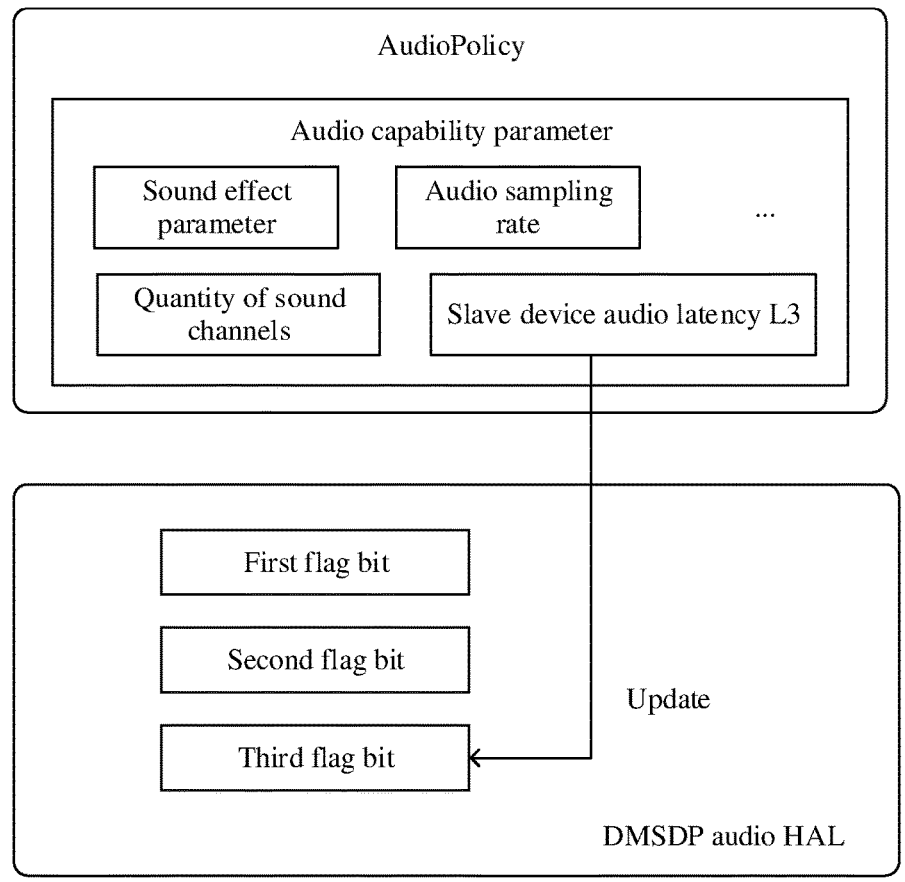
FIG. 104 is a schematic diagram 100 of an audio application scenario according to an embodiment of this application.

The sound box may obtain the slave device audio latency L3 by adding the time consumed for each audio data processing process. Further, the sound box may add the current slave device audio latency L3 to the audio capability parameter and report the audio capability parameter to the DV app in the mobile phone, and the DV app in the mobile phone registers the audio capability parameter with AudioPolicy. As shown in FIG. 104, a third flag bit used to store the slave device audio latency L3 may be set in the DMSDP audio HAL. The DMSDP audio HAL may read the slave device audio latency L3 in the audio capability parameter in AudioPolicy, and store the read slave device audio latency L3 in the third flag bit.

In this embodiment of this application, the audio capability parameter obtained by the DV app from the sound box is dynamically updated. For example, after the user sets a sound effect mode of the sound box from a Dolby sound effect mode to a heavy bass sound effect mode, in response to the user setting, the sound box may update the time consumed for the sound effect processing process from 15 ms to 20 ms. In this case, the sound box may recalculate and update the slave device audio latency L3, add an updated slave device audio latency L3 to the audio capability parameter, and report the audio capability parameter to the DV app in the mobile phone. The DV app may deliver a latest audio capability parameter to AudioPolicy. After obtaining the latest audio capability parameter, AudioPolicy may notify the DMSDP audio HAL. In this case, the DMSDP audio HAL may obtain a latest slave device audio latency L3 from AudioPolicy, and update the latest slave device audio latency L3 in the third flag bit.

In this way, the first flag bit of the DMSDP audio HAL stores the latest master device audio latency L1, the second flag bit stores the latest audio transmission latency L2, and the third flag bit stores the latest slave device audio latency L3. Therefore, the DMSDP audio HAL may periodically obtain the latest master device audio latency L1, the latest audio transmission latency L2, and the latest slave device audio latency L3 from the first flag bit, the second flag bit, and the third flag bit. Further, the DMSDP audio HAL may calculate a corresponding audio latency L, where audio latency L=master device audio latency L1+audio transmission latency L2+slave device audio latency L3. In this way, the DMSDP audio HAL may dynamically update the current audio latency L of the audio data.

Alternatively, the DMSDP audio HAL may be set as follows: When content of one of the first flag bit, the second flag bit, and the third flag bit is updated, the DMSDP audio HAL may be triggered to obtain the master device audio latency L1 in the first flag bit, the audio transmission latency L2 in the second flag bit, and the slave device audio latency L3 in the third flag bit, and calculate the latest audio latency L: latest audio latency L=master device audio latency L1+audio transmission latency L2+slave device audio latency L3. In this way, the DMSDP audio HAL may also dynamically update the current audio latency L of the audio data.

For example, the DMSDP audio HAL in the mobile phone may dynamically calculate the current audio latency L of the audio data according to the foregoing method. In addition, the DMSDP audio HAL may store, in a preset flag bit, an audio latency L that is calculated most recently. If a difference between the audio latency L that is currently calculated by the DMSDP audio HAL and the audio latency L that is calculated most recently is less than a threshold, it indicates that the current audio latency L does not fluctuate greatly. In this case, the DMSDP audio HAL does not need to modify the audio latency L stored in the preset flag bit.

Figure 105:
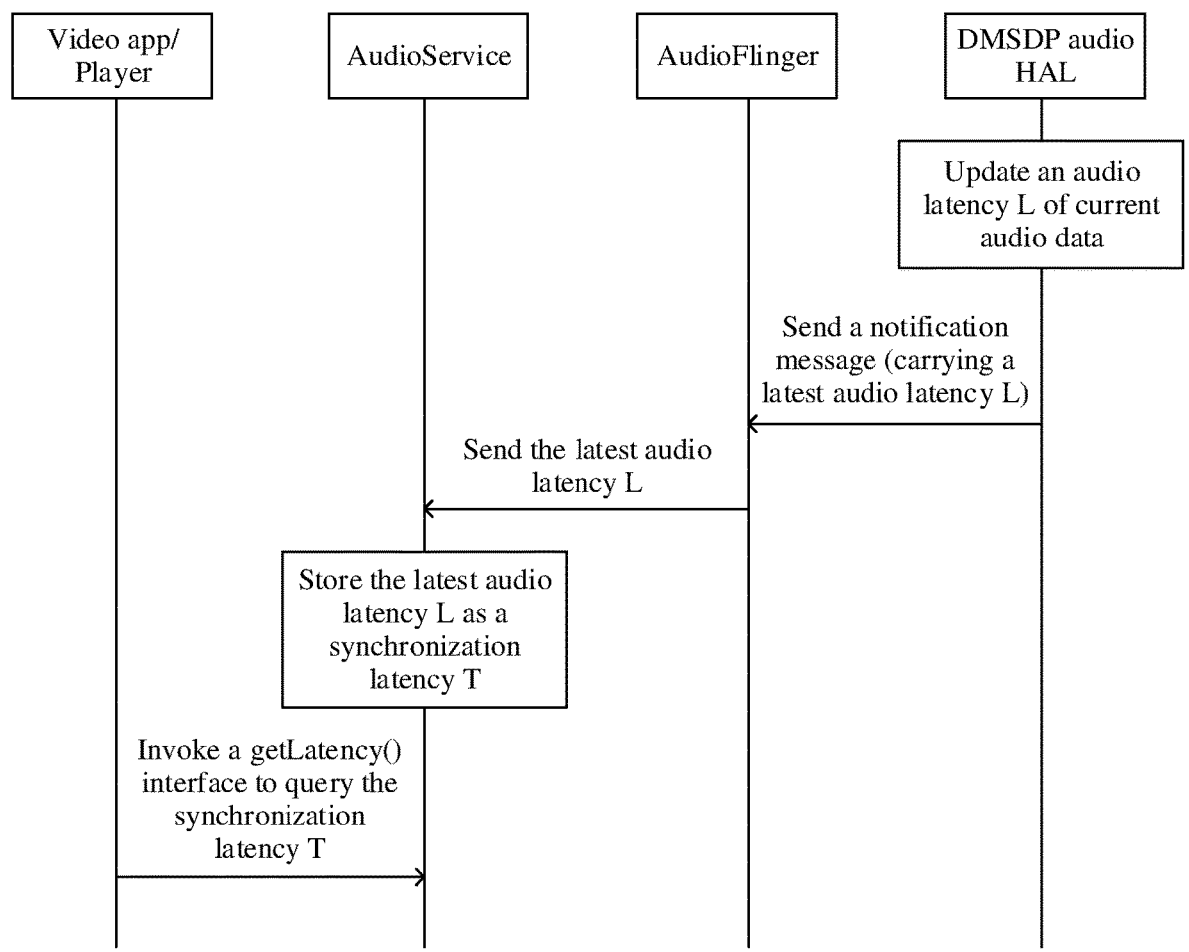
FIG. 105 is a schematic interaction diagram 1 of an audio update method according to an embodiment of this application.

As shown in FIG. 105, after the DMSDP audio HAL in the mobile phone may calculate the current audio latency L of the audio data according to the foregoing method, if the difference between the currently calculated audio latency L and the audio latency L that is calculated most recently is greater than the threshold, it indicates that the current audio latency L fluctuates greatly. In this case, the DMSDP audio HAL may update content in the preset flag bit to the currently calculated audio latency L. Further, the DMSDP audio HAL may add the audio latency L in the preset flag bit to a notification message and send the notification message to AudioFlinger, that is, notify AudioFlinger of the latest audio latency L. Further, AudioFlinger may send the latest audio latency L in the notification message to AudioService, and AudioService stores the latest audio latency L.

Subsequently, during running, Videos or the player may invoke the getLatency( ) interface to query AudioService for a current synchronization latency T between audio data and display data. In the scenario 1, synchronization latency T≈audio latency L. Therefore, AudioService may feed back the stored latest audio latency L to Videos or the player as the synchronization latency T. In this way, Videos or the player may set a synchronization policy based on the latest audio latency L for audio-to-video synchronization.

Figure 106:
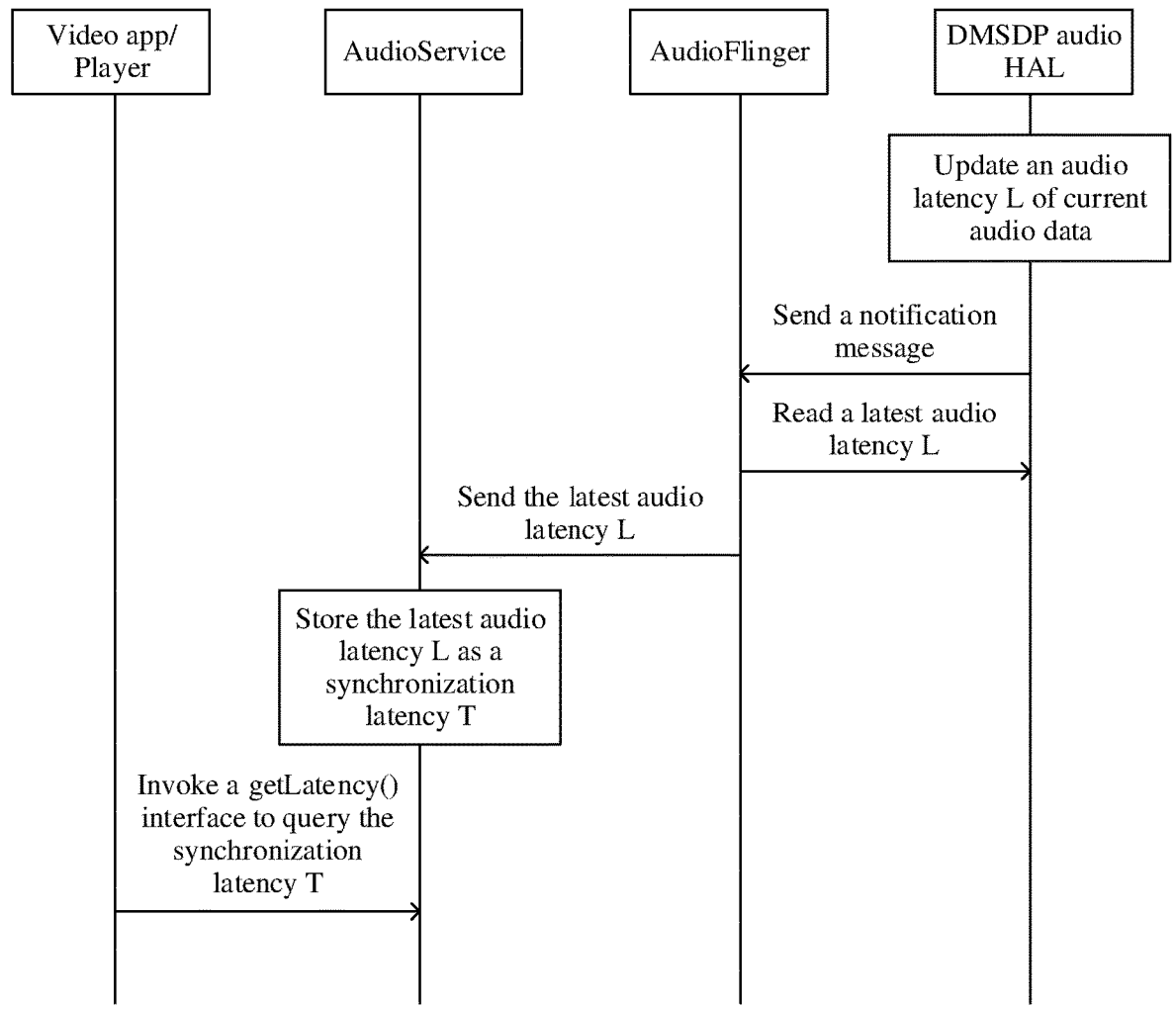
FIG. 106 is a schematic interaction diagram 2 of an audio update method according to an embodiment of this application.

In some other embodiments, as shown in FIG. 106, the DMSDP audio HAL in the mobile phone may calculate the current audio latency L of the audio data according to the foregoing method, and update the audio latency L in the preset flag bit. Further, the DMSDP audio HAL may send a notification message to AudioFlinger, to indicate that the current audio latency L has been updated. In this case, the notification message does not include an updated audio latency L. Therefore, after receiving the notification message, AudioFlinger may read the updated audio latency L (that is, the latest audio latency L) from the preset flag bit of the DMSDP audio HAL. Further, AudioFlinger may send the latest audio latency L to AudioService, and AudioService stores the latest audio latency L.

Subsequently, similar to FIG. 105, during running, Videos or the player may invoke the getLatency( ) interface to query AudioService for a current synchronization latency T between audio data and display data. AudioService may feed back the stored latest audio latency L to Videos or the player as the synchronization latency T, so that Videos or the player can set a synchronization policy based on the latest audio latency L for audio-to-video synchronization.

Because AudioService may dynamically obtain the audio latency L that is calculated by the DMSDP audio HAL most recently, the audio latency L that is obtained by Videos or the player from AudioService each time is also the audio latency L that is calculated most recently. The audio latency L can accurately reflect a time difference between current audio data and display data. Therefore, when Videos or the player performs audio-to-video synchronization based on the foregoing audio latency L, audio that is played by the sound box and an image that is played by the mobile phone can better achieve an audio-to-video synchronization effect. This improves audio-to-video synchronization user experience.

For example, during running, Videos or the player may periodically invoke the getLatency( ) interface to obtain the latest audio latency L. After obtaining the latest audio latency L each time, Videos or the player may set, for subsequently output audio data and display data, a corresponding synchronization policy based on the latest audio latency L for audio-to-video synchronization. For example, Videos may obtain the latest audio latency L by using five frames of audio data as a period. After outputting the $N^{th}$ frame of audio data, Videos may invoke the getLatency( ) interface to obtain the latest audio latency L. For example, if audio latency L=400 ms, Videos may set, in the synchronization policy, that display data is played 400 ms later than audio data. In this way, in a process of playing the $(N+1)^{th}$ frame of audio data to the $(N+5)^{th}$ frame of audio data, Videos may play corresponding audio data and video data according to the foregoing synchronization policy, so as to implement an audio-to-video synchronization effect.

Further, after Videos outputs the $(N+5)^{th}$ frame of audio data, Videos may invoke the getLatency( ) interface again to obtain the latest audio latency L. In this case, for example, if audio latency L=500 ms, Videos may update the foregoing synchronization policy based on the latest audio latency L. For example, Videos may set, in the synchronization policy, that display data is played 500 ms later than audio data. In this way, in a process of playing the $(N+6)^{th}$ frame of audio data to the $(N+10)^{th}$ frame of audio data, Videos may play corresponding audio data and video data according to the foregoing synchronization policy. In this way, during running, Videos may continuously update the corresponding synchronization policy based on the latest audio latency L, so that the user obtains a better audio-to-video synchronization effect during audio play.

Alternatively, AudioService may actively report the latest audio latency L to Videos during running of Videos. For example, each time after obtaining the latest audio latency L reported by AudioFlinger, AudioService may actively send the latest audio latency L to Videos, to trigger Videos to set a corresponding synchronization policy based on the latest audio latency L. In other words, once the mobile phone detects that the current audio latency L changes, the mobile phone may notify Videos of the latest audio latency L, so that Videos can update the corresponding synchronization policy based on the latest audio latency L, and the user obtains the better audio-to-video synchronization effect during audio play.

Figure 107A:
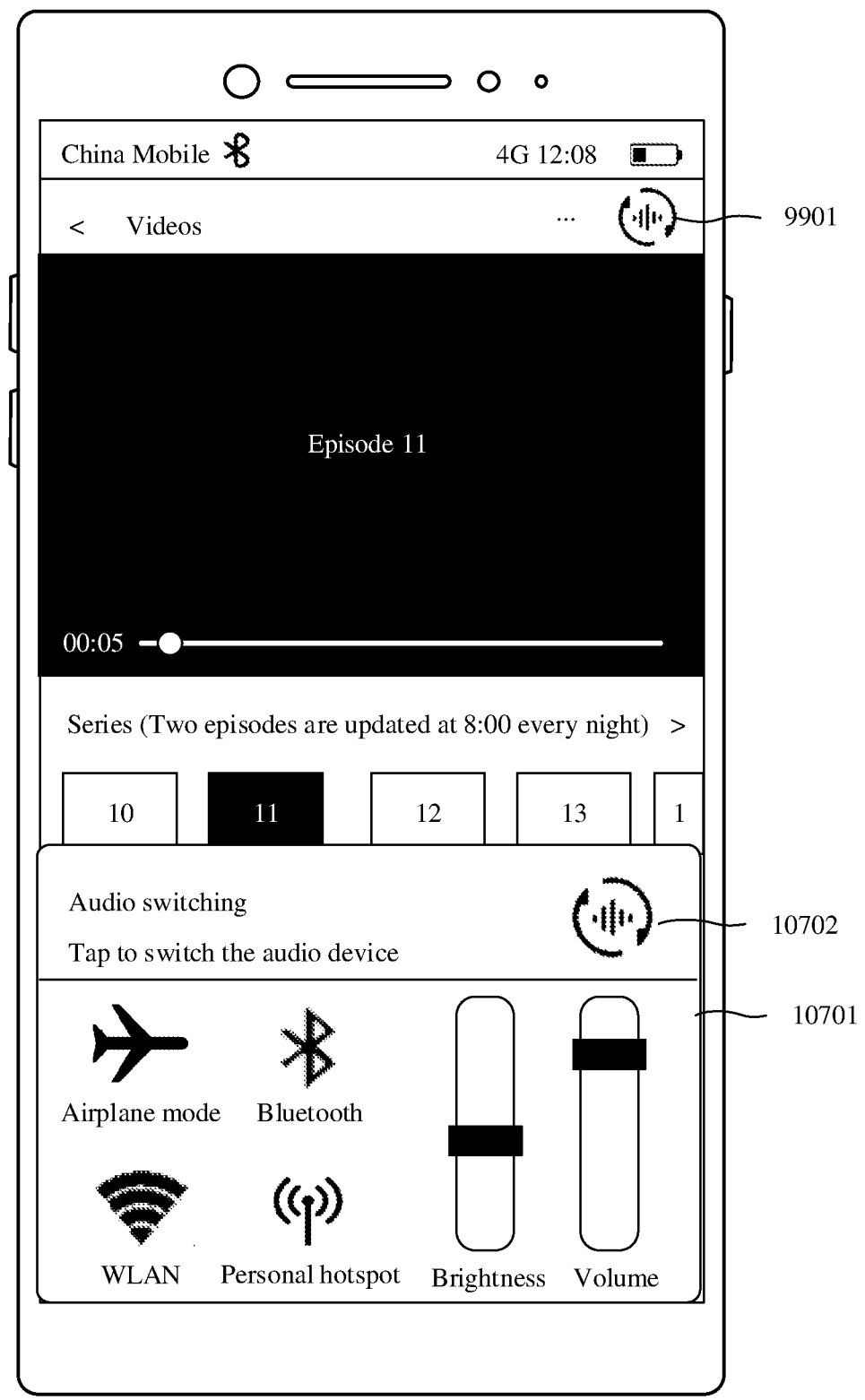
FIG. 107(a) and FIG. 107(b) are a schematic diagram 101 of an audio application scenario according to an embodiment of this application.
Figure 107B:
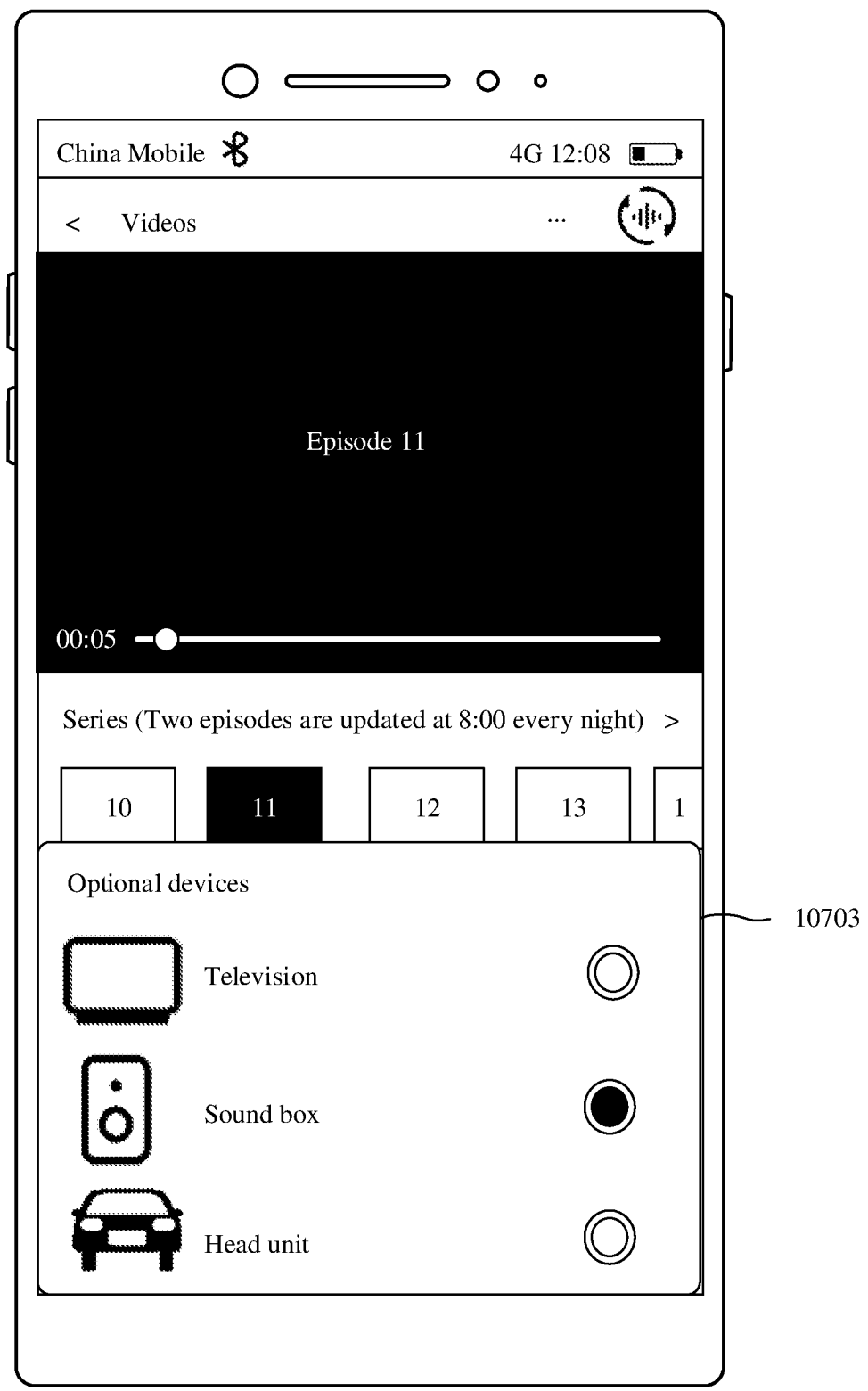

In some embodiments, in a process in which the mobile phone projects audio data to the sound box for play, the user may further change, on the mobile phone, a slave device that currently performs audio switching with the mobile phone. For example, when the mobile phone runs Videos, if the mobile phone receives an operation that the user opens a control center, as shown in FIG. 107(a), the mobile phone may display a control center 10701 on an application interface of Videos. The control center 10701 includes a switching button 10702 for an audio switching function. When the user wants to change a current slave device of the mobile phone, the user may tap the switching button 10702 to query one or more candidate devices that can be currently used as slave devices of the mobile phone. As shown in FIG. 107(b), after the mobile phone detects that the user taps the switching button 10702, the mobile phone may display one or more detected candidate devices in the control center 10703. In this case, the sound box in the control center 10703 has been marked as selected. In this case, the sound box is used as a slave device of the mobile phone and is playing audio from the mobile phone. If the user needs to change the slave device of the mobile phone, the user may reselect a slave device in the control center 10703 to perform audio switching.

For example, the user selects a head unit as a new slave device of the mobile phone. In response to the operation that the user selects the head unit in the control center 10703, the mobile phone may disconnect the established network connection to the sound box, and establish a network connection to the head unit. Further, the mobile phone may obtain an audio capability parameter of the head unit by using the DV app, and update the DMSDP audio HAL at the HAL based on the audio capability parameter of the head unit, so that an updated DMSDP audio HAL matches an audio capability of the head unit.

Further, the updated DMSDP audio HAL may use the head unit as a slave device, and continue to periodically obtain the master device audio latency L1, the audio transmission latency L2, and the slave device audio latency L3 according to the foregoing method, so as to periodically calculate the latest audio latency L. Subsequently, similar to the process in FIG. 105 or FIG. 106, the DMSDP audio HAL may use each latest audio latency L as a synchronization latency T, and store the synchronization latency T in AudioService by using AudioFlinger, so that Videos or the player can obtain the latest audio latency L from AudioService, and then set a synchronization policy based on the latest audio latency L for audio-to-video synchronization.

Scenario 2

In the scenario 2, when running Videos, the mobile phone may project audio data and display data that are generated by Videos to a same slave device for play, that is, a projection function of the mobile phone is used to simultaneously switch audio and an image of the mobile phone to the slave device for play.

Figure 108:
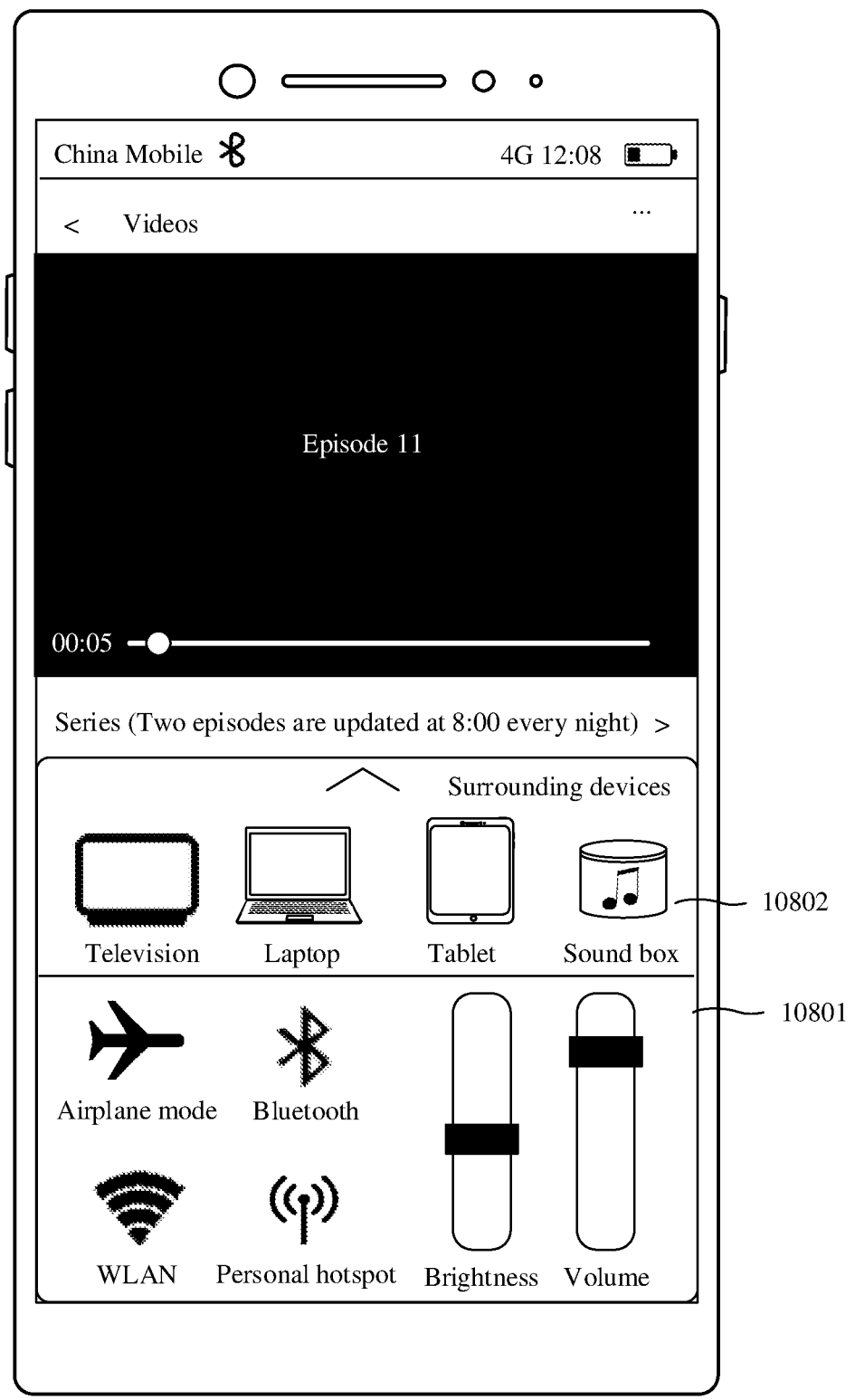
FIG. 108 is a schematic diagram 102 of an audio application scenario according to an embodiment of this application.

For example, as shown in FIG. 108, when the mobile phone runs Videos, if the user needs to use the projection function, the user may open a control center 10801 of the mobile phone on an application interface of Videos. A card 10802 may be disposed in the control center 10801, and the card 10802 is used to display one or more nearby candidate devices that can perform projection and that are detected by the mobile phone. If it is detected that the user selects an electronic device (for example, a television) in the card 10802, it indicates that the user wants to project, by using the projection function of the mobile phone, the audio data and the display data that are generated by Videos to the television for play.

Similar to the scenario 1, when the mobile phone detects that the user selects the television as a slave device of the mobile phone for projection, the DV app may establish a network connection to the television, then obtain an audio capability parameter of the television through the network connection, and create a corresponding DMSDP audio HAL at the HAL based on the audio capability parameter of the television. Subsequently, the mobile phone may transmit the audio data generated by Videos to the television by using the DMSDP audio HAL. In addition, during projection, the mobile phone may send, in an existing projection manner, the display data generated by Videos to the television for display. Alternatively, the mobile phone may create a DMSDP display HAL corresponding to a display function at the HAL, and then transmit the display data generated by Videos to the television by using the DMSDP display HAL. This is not limited in this embodiment of this application.

In the scenario 2, as shown in FIG. 96, for the audio data generated when the mobile phone runs Videos, similar to the foregoing scenario 1, audio latency L of the audio data=master device audio latency L1+audio transmission latency L2+slave device audio latency L3.

In the scenario 2, as shown in FIG. 96, for the display data generated when the mobile phone runs Videos, display latency S of the display data=master device display latency S1+display transmission latency S2+slave device display latency S3. Because a process of processing the display data in the electronic device is usually simple, that is, a processing speed is fast, the master device display latency S1 and the slave device display latency S3 of the display data may be ignored. In this case, display latency S≈display transmission latency S2.

In addition, in the scenario 2, both the display data and the audio data that are generated by Videos are transmitted through the network connection between the mobile phone and the television. In this case, a time consumed for transmitting one data packet in the display data from the mobile phone to the television is basically the same as a time consumed for transmitting one data packet in the video data from the mobile phone to the television. In other words, display transmission latency S2≈audio transmission latency L2.

Therefore, synchronization latency T between the audio data and the display data=audio latency L−display latency S≈(master device audio latency L1+audio transmission latency L2+slave device audio latency L3)−display transmission latency S2≈master device audio latency L1+slave device audio latency L3.

In this embodiment of this application, the DMSDP audio HAL may dynamically obtain a current master device audio latency L1 and a current slave device audio latency L3, to dynamically obtain a latest synchronization latency T (synchronization latency T=master device audio latency L1+slave device audio latency L3). For a specific method in which the DMSDP audio HAL dynamically obtains the master device audio latency L1 and the slave device audio latency L3, refer to the related descriptions in the scenario 1. Therefore, details are not described herein again. Because the synchronization latency T in a process of projection between the mobile phone and the television is dynamically updated, the synchronization latency T can accurately indicate a time difference between audio data and display data that correspond to a same moment and that are played by the television.

Similar to the process in FIG. 105 or FIG. 106, the DMSDP audio HAL in the mobile phone may store each updated synchronization latency T (that is, a latest synchronization latency T) in AudioService by using AudioFlinger, so that Videos or the player can obtain the latest synchronization latency T from AudioService, and then set a synchronization policy based on the latest synchronization latency T for audio-to-video synchronization. Because the latest synchronization latency T obtained by Videos or the player can accurately indicate a time difference between audio data and display data that correspond to a same moment and that are played by the television, when Videos or the player performs audio-to-video synchronization based on the synchronization latency T, audio and an image that are played by the television can better achieve an audio-to-video synchronization effect. This improves audio-to-video synchronization user experience.

Scenario 3

In the scenario 3, when the mobile phone runs Videos, the mobile phone may send display data generated by Videos to a first slave device for play, and the mobile phone may send audio data generated by Videos to a second slave device for play. In other words, in the scenario 3, the mobile phone may project audio and an image in a video to different slave devices for play.

Figure 109A:
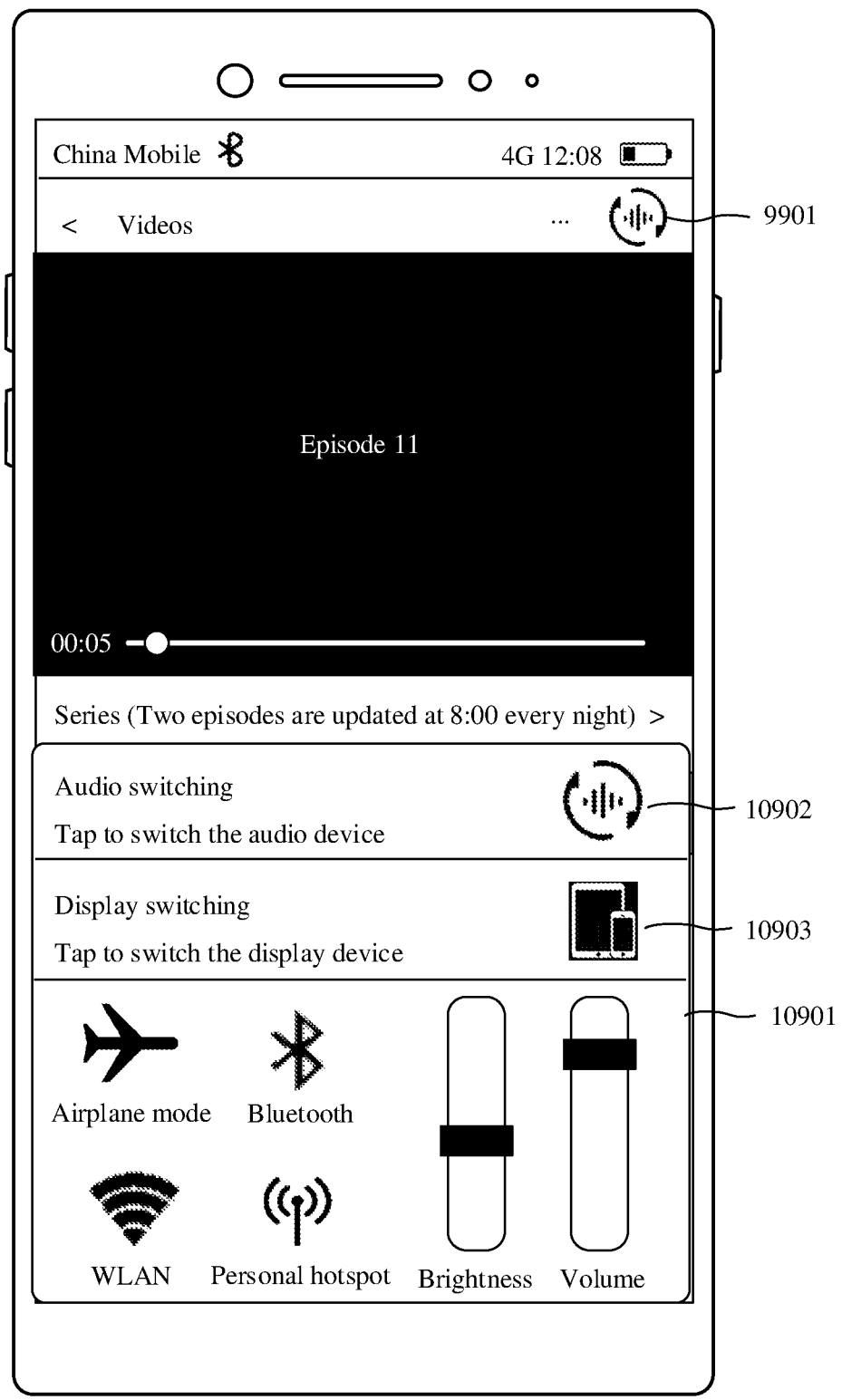
FIG. 109(a) to FIG. 109(c) are a schematic diagram 103 of an audio application scenario according to an embodiment of this application.

For example, as shown in FIG. 109(a), when the mobile phone runs Videos, the user may open a control center 10901 of the mobile phone on an application interface of Videos. A first button 10902 for audio switching and a second button 10903 for display switching may be disposed in the control center 10901.

Figure 109B:
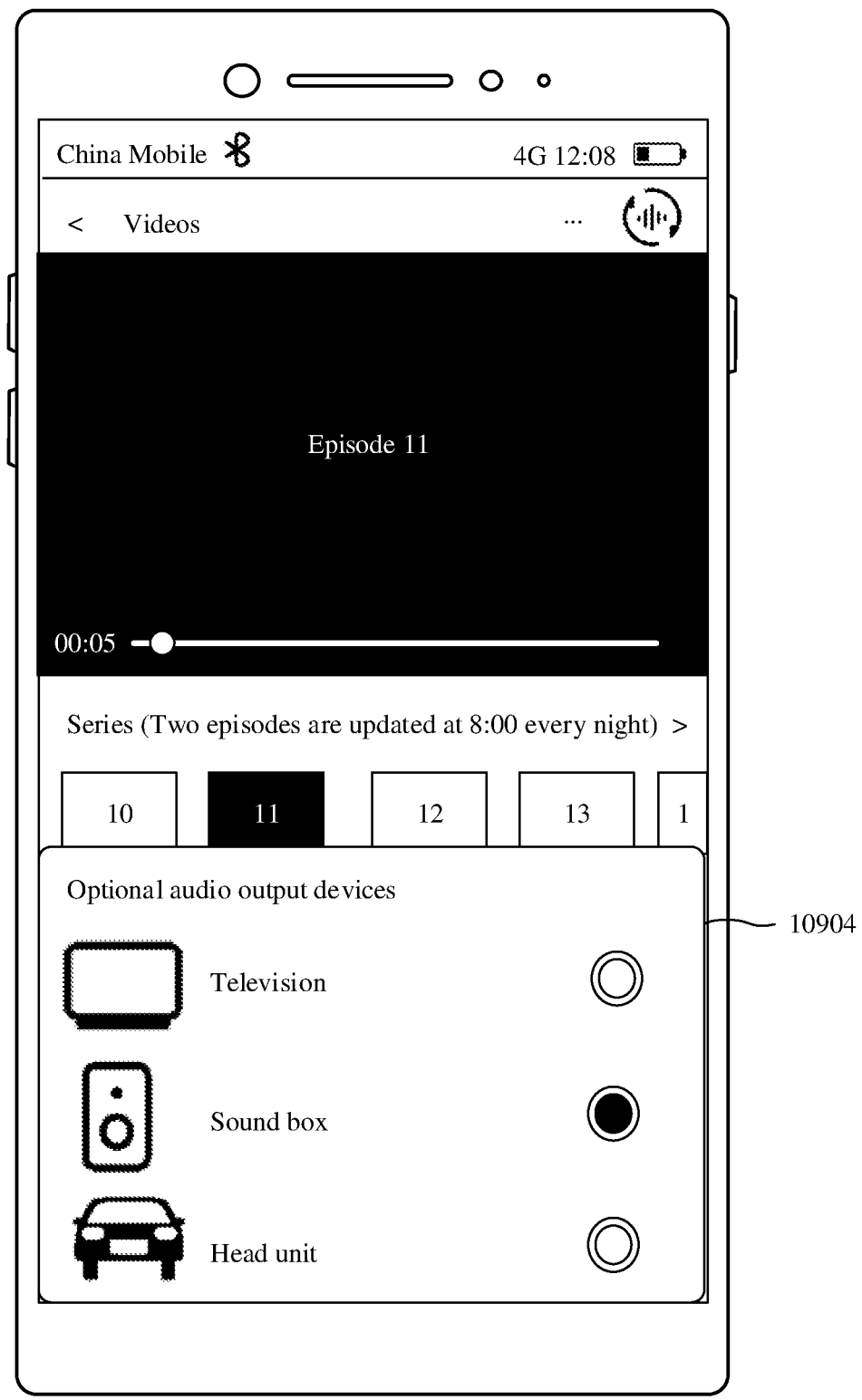

If it is detected that the user taps the first button 10902, it indicates that the user wants to switch audio data generated by Videos to another audio output device for play. In this case, the mobile phone runs the DV app to search for one or more nearby candidate devices for audio switching. As shown in FIG. 109(b), the DV app may display, in a menu 10904, candidate devices that perform audio switching with the mobile phone. The user may select one of these candidate devices as an audio output device when the mobile phone subsequently outputs audio data.

Figure 109C:
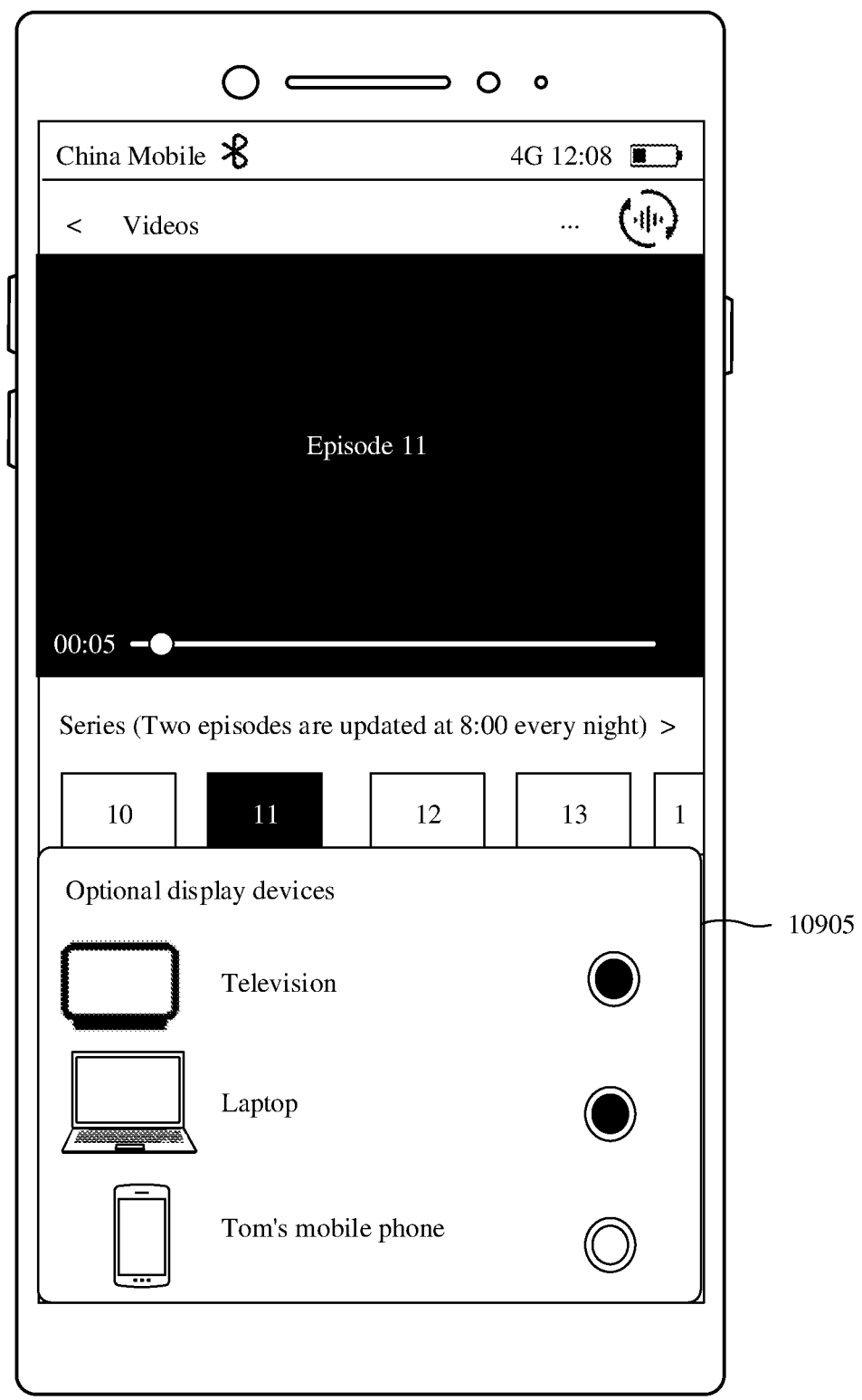

If it is detected that the user taps the second button 10903, it indicates that the user wants to switch display data generated by Videos to another display device for play. In this case, as shown in FIG. 109(c), the mobile phone may display, in a menu 10905, candidate devices that are currently detected and that can be used to receive and display the display data of the mobile phone. The user may select one of these candidate devices as a display output device when the mobile phone subsequently outputs display data.

For example, the user selects a sound box in the menu 10904 as an audio output device corresponding to the audio data, and selects a television in the menu 10905 as a display output device corresponding to the display data. The mobile phone may establish a first network connection to the sound box, and establish a second network connection to the television. The mobile phone may send, through the first network connection, the audio data generated by Videos to the sound box for play, and the mobile phone may send, through the second network connection, the display data generated by Videos to the television for display.

In this embodiment of this application, after the mobile phone establishes the first network connection to the sound box, the DV app in the mobile phone may obtain an audio capability parameter of the sound box through the first network connection, and create a corresponding DMSDP audio HAL at the HAL based on the audio capability parameter of the sound box. The DMSDP audio HAL may dynamically obtain a synchronization latency T between current audio data and display data.

In the scenario 3, as shown in FIG. 97, similar to the scenario 1 and the scenario 2, audio latency L of the audio data=master device audio latency L1+audio transmission latency L2+slave device audio latency L3.

In the scenario 3, as shown in FIG. 97, similar to the scenario 2, display latency S of the display data=master device display latency S1+display transmission latency S2+slave device display latency S3≈display transmission latency S2.

Therefore, synchronization latency T between the audio data and the display data=audio latency L−display latency S≈(master device audio latency L1+audio transmission latency L2+slave device audio latency L3)−display transmission latency S2.

For example, the network connection between the mobile phone and the sound box is a first Wi-Fi connection, and the network connection between the mobile phone and the television is a second Wi-Fi connection. The Wi-Fi HAL at the HAL of the mobile phone may send a first test data packet to the sound box through the first Wi-Fi connection, receive a first response data packet sent by the sound box in response to the first test data packet, and then calculate a current audio transmission latency L2 between the mobile phone and the sound box based on a time interval elapsed since the sending the first test data packet until the receiving the first response data packet. Likewise, the Wi-Fi HAL may send a second test data packet to the television through the second Wi-Fi connection, receive a second response data packet sent by the television in response to the second test data packet, and then calculate a current display transmission latency S2 between the mobile phone and the television based on a time interval elapsed since the sending the second test data packet until the receiving the second response data packet.

In other words, in the scenario 3, the Wi-Fi HAL in the mobile phone may dynamically detect and update the audio transmission latency L2 and the display transmission latency S2. In this way, the DMSDP audio HAL may read a latest audio transmission latency L2 and a latest display transmission latency S2 from the Wi-Fi HAL.

In addition, the DMSDP audio HAL may obtain a latest master device audio latency L1 and a latest slave device audio latency L3 according to the method in the scenario 1. Further, the DMSDP audio HAL may calculate a latest audio latency L based on the latest master device audio latency L1, the latest audio transmission latency L2, and the latest slave device audio latency L3. Further, the DMSDP audio HAL may calculate a latest synchronization latency T based on the latest audio latency L and the latest display transmission latency S2 (synchronization latency T=audio latency L−display transmission latency S2).

Subsequently, similar to the process in FIG. 105 or FIG. 106, after calculating the latest synchronization latency T each time, the DMSDP audio HAL in the mobile phone may store the latest synchronization latency T in AudioService by using AudioFlinger, so that Videos or the player can obtain the latest audio latency L from AudioService, and then set a synchronization policy based on the latest audio latency L for audio-to-video synchronization.

Alternatively, the DMSDP audio HAL in the mobile phone may report the latest audio latency L and the latest display transmission latency S2 to AudioService by using AudioFlinger. AudioService calculates a latest synchronization latency T based on the latest audio latency L and the latest display transmission latency S2, and then sets a synchronization policy based on the latest audio latency L for audio-to-video synchronization.

Likewise, because the latest synchronization latency T obtained by Videos or the player can accurately indicate a time difference between audio data and display data that correspond to a same moment and that are respectively played by two slave devices (namely, the sound box and the television), when Videos or the player performs audio-to-video synchronization based on the synchronization latency T, an image that is played by the television and audio that is played by the sound box can better achieve an audio-to-video synchronization effect. This improves audio-to-video synchronization user experience.

Figure 110:
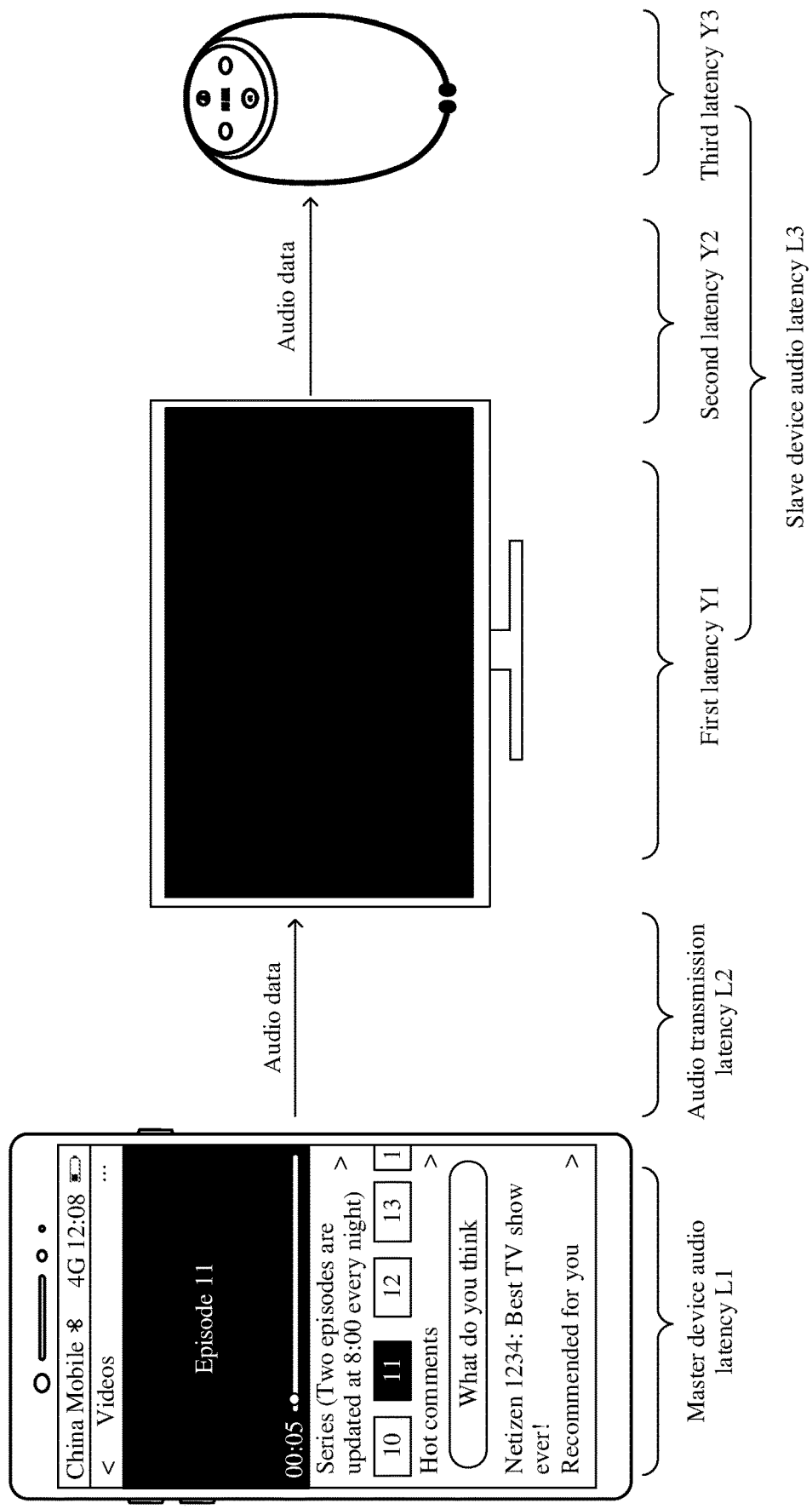
FIG. 110 is a schematic diagram 104 of an audio application scenario according to an embodiment of this application.

In some other embodiments, the user may further connect another audio output device to the audio output device of the mobile phone. For example, after the user selects the television as an audio output device of the mobile phone, the mobile phone may send the audio data generated by Videos to the television for play. As shown in FIG. 110, when the television is an audio output device of the mobile phone, the user may further connect the television to the sound box. In this case, the television may send, to the sound box for play, the audio data sent by the mobile phone, that is, the sound box is an audio output device of the television.

Still as shown in FIG. 110, in the foregoing scenario in which a plurality of audio output devices are cascaded, audio latency L of the audio data=master device audio latency L1+audio transmission latency L2+slave device audio latency L3. A difference is that the slave device audio latency L3 specifically includes: a first latency Y1 consumed for processing a data packet in the audio data in the television, a second latency Y2 consumed for transmitting the data packet between the television and the sound box, and a third latency Y3 elapsed since the sound box starts to process the data packet after the sound box receives the data packet until audio data in the data packet is finally played, that is, L3=Y1+Y2+Y3.

Therefore, similar to the method in which the mobile phone obtains the master device audio latency L1, the audio transmission latency L2, and the slave device audio latency L3 in the scenario 1, the television serving as a master device of the sound box may also obtain the current first latency Y1, second latency Y2, and third latency Y3 according to the foregoing method, to obtain a latest slave device audio latency L3 through calculation. Further, the television may add the latest slave device audio latency L3 to the audio capability parameter and report the audio capability parameter to the mobile phone, and the mobile phone updates the audio latency L of the current audio data according to the method described in the scenario 1.

In this way, in the scenario in which a plurality of audio output devices are cascaded, the mobile phone may also dynamically update the audio latency L of the current audio data, so that Videos or the player can determine the corresponding synchronization latency T based on the latest audio latency L for audio-to-video synchronization. This improves an audio-to-video synchronization effect in the scenario in which a plurality of audio output devices are cascaded.

The foregoing embodiment is described by using an example of a scenario in which the mobile phone runs Videos to perform audio-to-video synchronization. It can be understood that, when running another application, the mobile phone may also need to invoke the getLatency( ) interface to obtain an audio latency L of audio data from AudioService. According to the method provided in this embodiment of this application, the audio latency L stored in AudioService may be dynamically updated, so that the audio latency L can more accurately reflect a time required for playing current audio data. Therefore, accuracy of other processing performed by another application based on the audio latency L is also correspondingly improved.

Figure 111A:
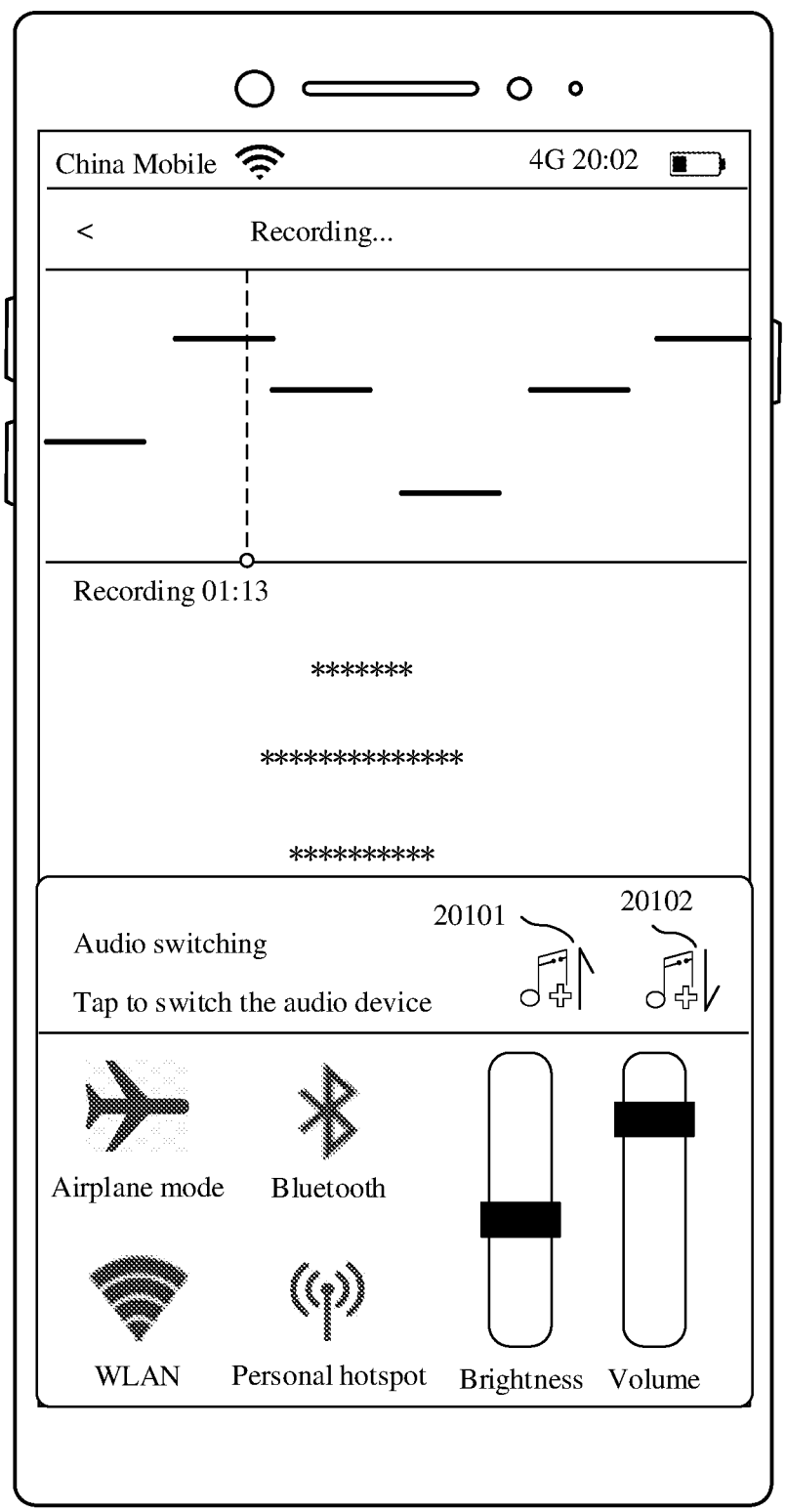
FIG. 111(a) to FIG. 111(c) are a schematic diagram 105 of an audio application scenario according to an embodiment of this application.
Figure 111B:
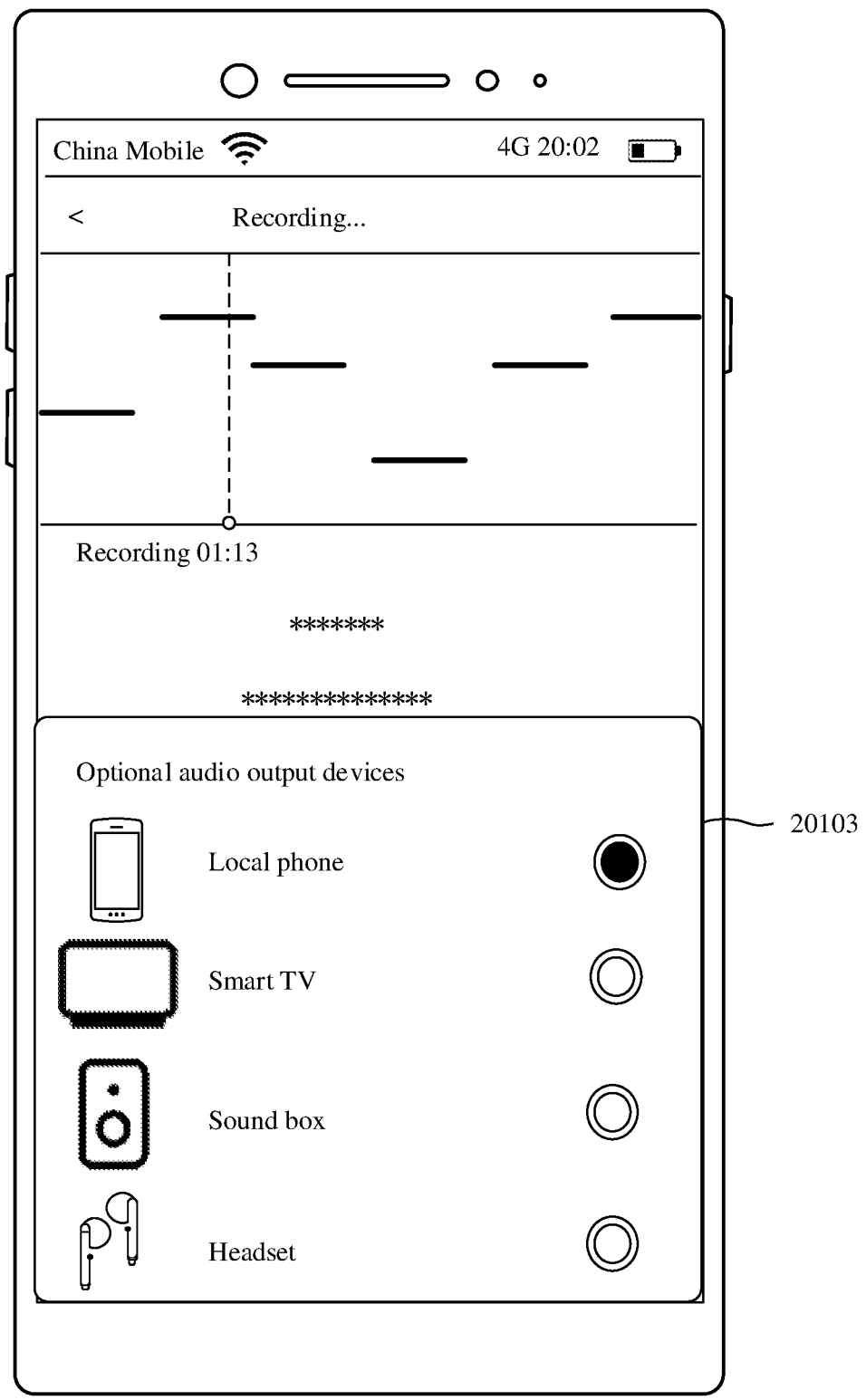
Figure 111C:
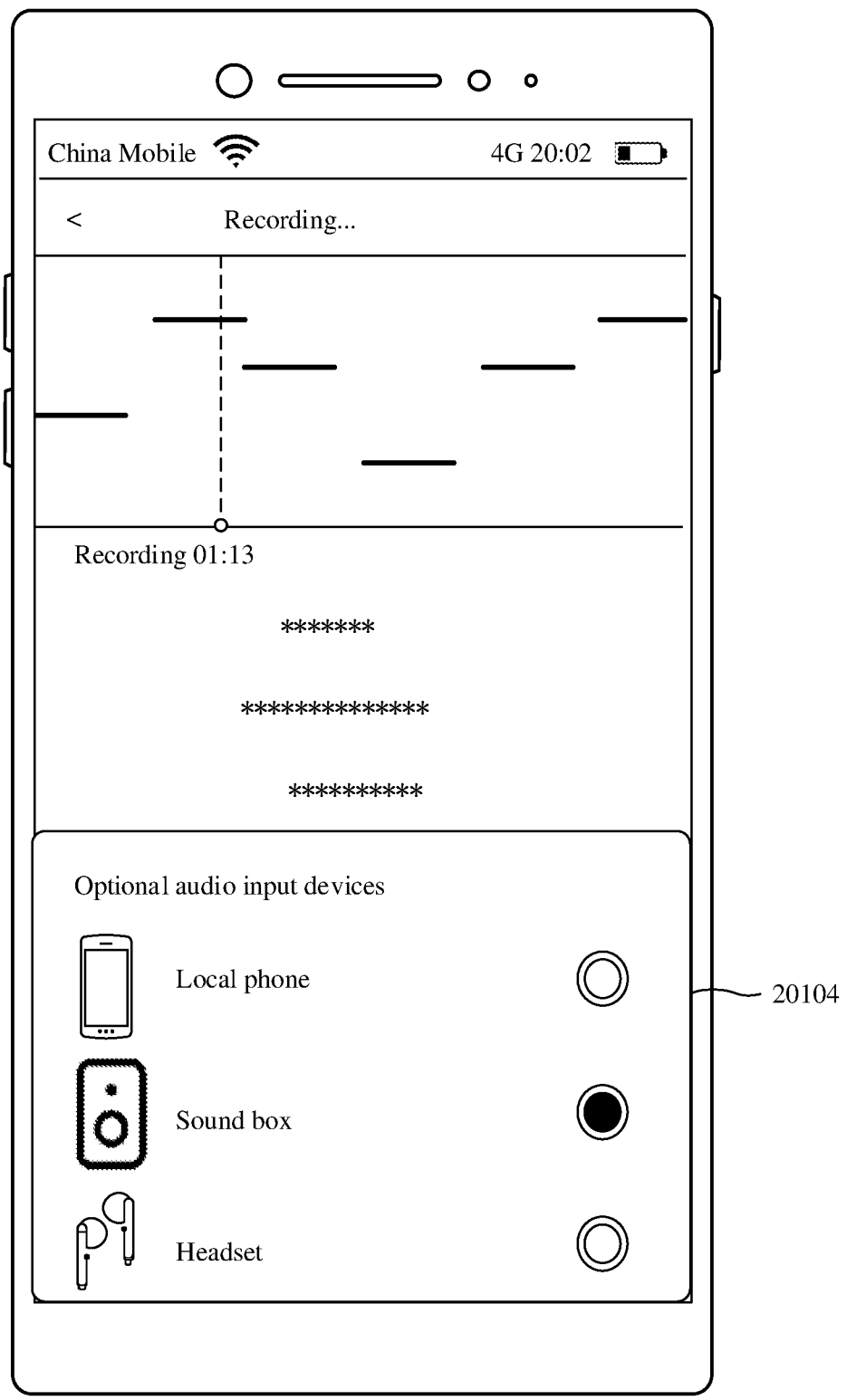

For example, as shown in FIG. 111(a), when the mobile phone runs a Karaoke application, a first button 20101 corresponding to an audio output capability and a second button 20102 corresponding to an audio input capability may be displayed in a control center. The user may respectively control switching of an audio output function and switching of an audio input function of the mobile phone on slave devices by using the first button 20101 and the second button 20102. For example, if it is detected that the user taps the first button 20101, as shown in FIG. 111(b), the mobile phone may display a device list 20103 including candidate devices each having an audio output function, where a current audio output device of the mobile phone is the mobile phone. The user may switch an audio output device of the mobile phone in the device list 20103. Similarly, if it is detected that the user taps the second button 20102, as shown in FIG. 111(c), the mobile phone may display a device list 20104 including candidate devices each having an audio input function, where a current audio input device of the mobile phone is a sound box. The user may switch an audio input device of the mobile phone in the device list 20104. In this way, the user may respectively switch the audio output capability and the audio input capability of the mobile phone to corresponding devices according to a user requirement, to respectively control the audio output function and the audio input function of the mobile phone.

For example, the user selects the sound box in the device list 20104 as an audio input device. Similar to a process in which the mobile phone outputs audio data to an audio output device by using a DMSDP audio HAL, the mobile phone may receive, by using the DMSDP audio HAL, recording data collected by the sound box, and report the recording data to the Karaoke application, so as to distribute the audio input function (which may also be referred to as an audio recording function or a recording function) of the mobile phone to a slave device for implementation.

Similar to the audio latency L of playing the audio data in the foregoing embodiment, an audio latency of the recording data may be referred to as a recording latency R, and a recording latency R of one data packet in the recording data is: recording latency R=master device recording latency R1+recording transmission latency R2+slave device recording latency R3.

For example, a start moment of the slave device recording latency R3 may be a moment at which a slave device (for example, the sound box) collects one data packet in recording data entered by the user, and an end moment of the slave device recording latency R3 may be a moment at which the data packet is output from the sound box. A start moment of the recording transmission latency R2 may be a moment at which the data packet is output from the sound box (that is, the end moment of the slave device recording latency R3), and an end moment of the recording transmission latency R2 may be a moment at which a master device (for example, the mobile phone) receives the data packet. A start moment of the master device recording latency R1 may be a moment at which the mobile phone receives the data packet (that is, the end moment of the recording transmission latency R2), and an end moment of the master device recording latency R1 may be a moment at which a corresponding application (for example, the Karaoke application) in the mobile phone obtains the data packet.

Similar to the process in which the DMSDP audio HAL dynamically obtains the latest master device audio latency L1, the latest audio transmission latency L2, and the latest slave device audio latency L3 according to the method in the foregoing embodiment, in the foregoing recording scenario, the DMSDP audio HAL may also dynamically obtain a latest master device recording latency R1, a latest recording transmission latency R2, and a latest slave device recording latency R3, to calculate a latest recording latency R of recording data, and update the recording latency R in AudioService. Subsequently, the Karaoke application may also invoke the getLatency( ) interface to obtain the recording latency R of the recording data from AudioService. Further, the Karaoke application may mix the recording data and currently played accompaniment music based on the recording latency R, to obtain a recorded song file.

Figure 112:
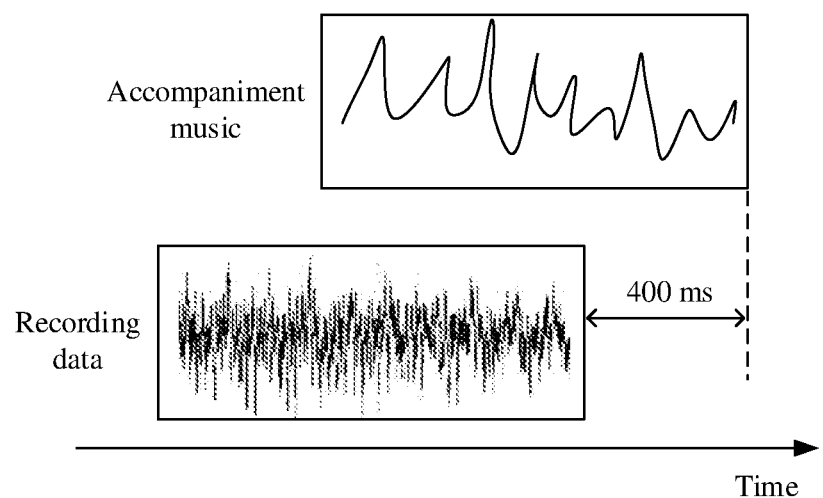
FIG. 112 is a schematic diagram 106 of an audio application scenario according to an embodiment of this application.

For example, as shown in FIG. 112, when audio latency L of the recording data=400 ms, it indicates that a time at which the Karaoke application receives the recording data is 400 ms later than a time at which the user actually makes a sound, and it also indicates that the current recording data is 400 ms later than the accompaniment music. In this case, the Karaoke application may mix the currently received recording data and the accompaniment music that exists before 400 ms, to obtain a song file that is more accurately synchronized with the accompaniment music.

Alternatively, in addition to the foregoing Karaoke application, when running Music, the mobile phone may also project audio data (for example, a song) from Music to a slave device (for example, the sound box) for play. Therefore, Music may also obtain a latest audio latency L from AudioService according to the method in the foregoing embodiment, and Music may further synchronize played lyric data with audio data based on the audio latency L, so that lyrics seen by the user correspond to a song heard by the user. In other words, after a master device dynamically updates an audio latency L according to the method in the foregoing embodiment, a person skilled in the art may set a related application according to actual experience or an actual application scenario to obtain a latest audio latency L, so as to perform audio-related synchronization based on the latest audio latency L, so that a synchronization result is more accurate.

Currently, in a process in which a master device (for example, the foregoing mobile phone) performs projection to a slave device, the mobile phone needs to first decode audio data and display data, and then encode the audio data and the display data in a preset format. Consequently, data processing during projection is complex, and a projection latency is long.

For example, the user uses Videos in the mobile phone to perform projection to a television. A video file played when Videos runs is usually obtained in a form of a data packet. For example, Videos may obtain one or more data packets of the video file from a network-side server. For another example, Videos may obtain one or more data packets of the video file from a local memory of the mobile phone. In other words, one video file may include one or more data packets. Certainly, the video file may further include other information such as a format, duration, and a name of the video file. The information and the data packets of the video file jointly constitute the video file.

Figure 113:
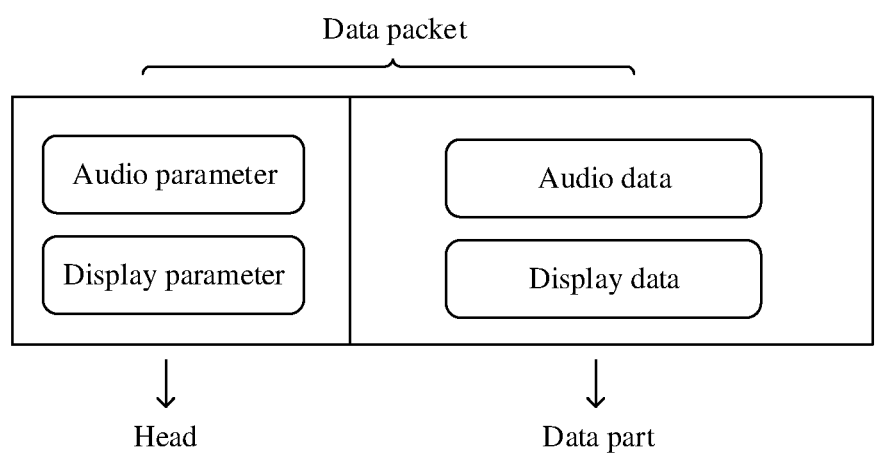
FIG. 113 is a schematic diagram 107 of an audio application scenario according to an embodiment of this application.

As shown in FIG. 113, a data packet in the video file generally includes a head (head) and a data (data) part.

The data (data) part includes specific display data and audio data. For example, a data (data) part of a data packet 1 includes three frames of audio data and two frames of display data. The display data and the audio data are generally data encoded by a producer of the video file in a specific encoding format. The encoded display data and audio data usually have a relatively small amount of data, so that the encoded display data and audio data can be added to a data packet for fast transmission.

The head (head) includes an audio parameter and a display parameter that correspond to the data part in the data packet. For example, the head (head) may include a display parameter of display data such as an encoding format or a resolution. The display parameter may be specifically a parameter used by the producer of the video file to encode the display data. For another example, the head (head) may include an audio parameter of audio data such as an encoding format, a sampling rate, or a quantity of sound channels. The audio parameter may be specifically a parameter used by the producer of the video file to encode the audio data.

In addition, the head (head) may further include some information of the video file, for example, a format (for example, an MP4 format) of the video file, a name (for example, a movie**) of the video file, and duration (for example, 120 minutes) of the video file. This is not limited in this embodiment of this application.

Figure 114:
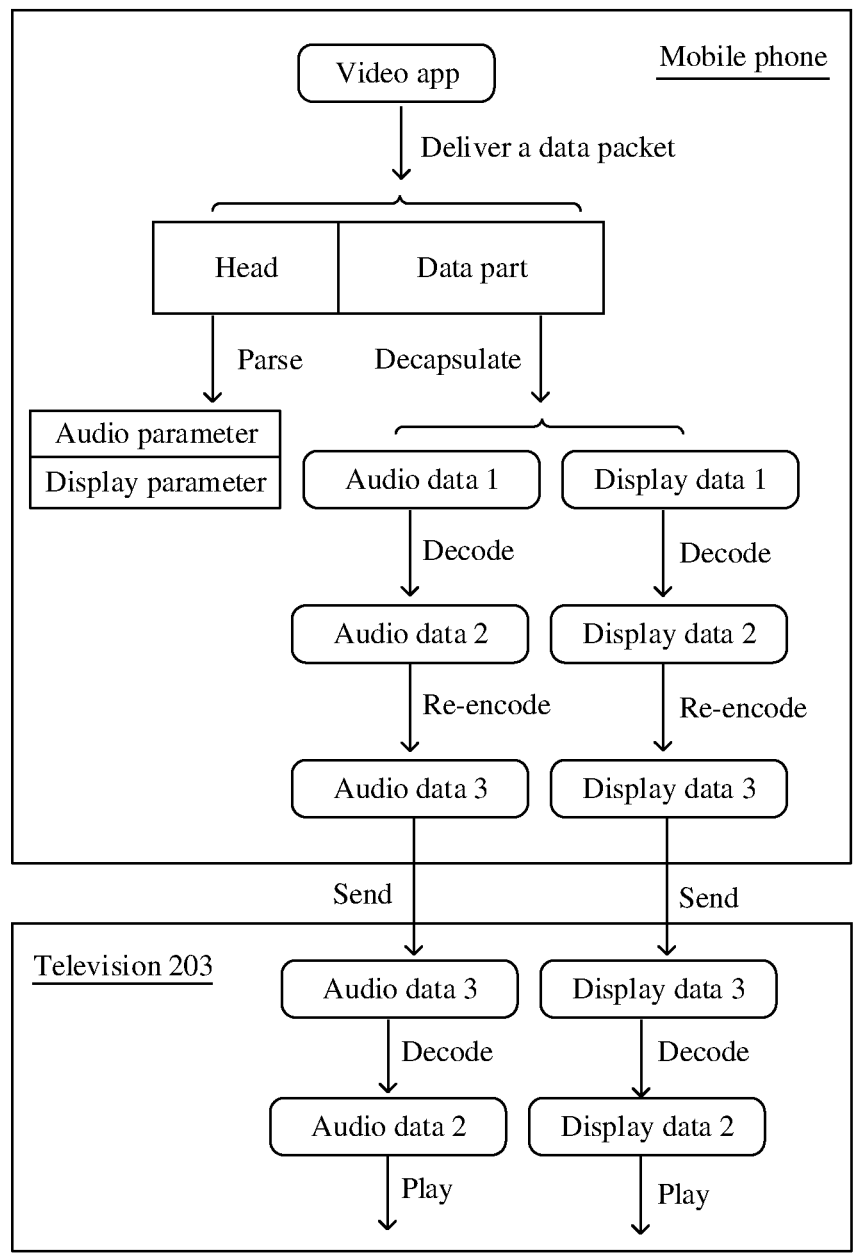
FIG. 114 is a schematic diagram 108 of an audio application scenario according to an embodiment of this application.

When Videos in the mobile phone plays the foregoing video file, as shown in FIG. 114, the mobile phone may parse a head (head) of a data packet in the video file. By parsing the head, the mobile phone may extract a corresponding audio parameter and display parameter from the head. In addition, the mobile phone may decapsulate a data (data) part in the data packet. Through decapsulation, the mobile phone may extract corresponding X (X>0) frames of audio data and Y (Y>0) frames of display data from the data part. Both the X frames of audio data and the Y frames of display data are encoded data. For example, in FIG. 114, audio data obtained after decapsulation may be referred to as audio data 1. Similarly, in FIG. 114, display data obtained after decapsulation may be referred to as display data 1.

Further, still as shown in FIG. 114, the mobile phone may decode the X frames of audio data (that is, the audio data 1) based on the audio parameter obtained through parsing. For example, if the audio parameter indicates that the audio data of the data part is encoded in an ACC format, the mobile phone may decode extracted X frames of audio data 1 in the ACC format, to obtain decoded X frames of audio data, that is, audio data 2 in FIG. 114. For example, the decoded audio data 2 may be audio data in a PCM format.

Similarly, still as shown in FIG. 114, the mobile phone may further decode the Y frames of display data (that is, the display data 1) based on the display parameter obtained through parsing. For example, if the display parameter indicates that the display data of the data part is encoded in an H.265 format, the mobile phone may decode extracted Y frames of display data 1 in the H.265 format, to obtain decoded Y frames of display data, that is, display data 2 in FIG. 4. For example, the decoded display data 2 may be display data in a YUV (Y represents brightness, and U and V represent chroma) format.

Therefore, for each data packet in the video file, the mobile phone may perform operations such as parsing, decapsulation, and decoding according to the foregoing method, and the mobile phone finally plays the display data and the audio data that are obtained after decoding. This implements a function of playing a corresponding video file in Videos in the mobile phone.

Currently, when the user projects a video in the mobile phone to a slave device (for example, the television) for play, still as shown in FIG. 114, the mobile phone may re-encode the decoded display data 2 and audio data 2 in a preset format according to a related projection protocol. For example, if the projection protocol specifies that display data exchanged between a master device and a slave device is uniformly in the H.264 format and audio data is uniformly in the ACC format, the mobile phone needs to re-encode decoded display data in the H.264 format, and re-encode decoded audio data in the ACC format. Further, the mobile phone may send re-encoded display data (that is, display data 3 in FIG. 114) and re-encoded audio data (that is, audio data 3 in FIG. 114) to the television. Correspondingly, the television may decode the received display data 3 and audio data 3 in a related format according to the specification of the projection protocol, to obtain the decoded display data 2 and audio data 2. Further, the television may play the decoded display data 2 and audio data 2, so as to implement a function of projecting a corresponding video file in Videos to the television.

It can be learned that, during projection, the master device (for example, the mobile phone) needs to perform a series of processing operations such as parsing, decapsulation, decoding, and re-encoding on a data packet in a video file. Consequently, a process in which the user triggers the master device to perform projection and then the slave device (for example, the television) starts to play display data and audio data is time-consuming, that is, a projection latency is long, and user experience is poor.

Figure 115:
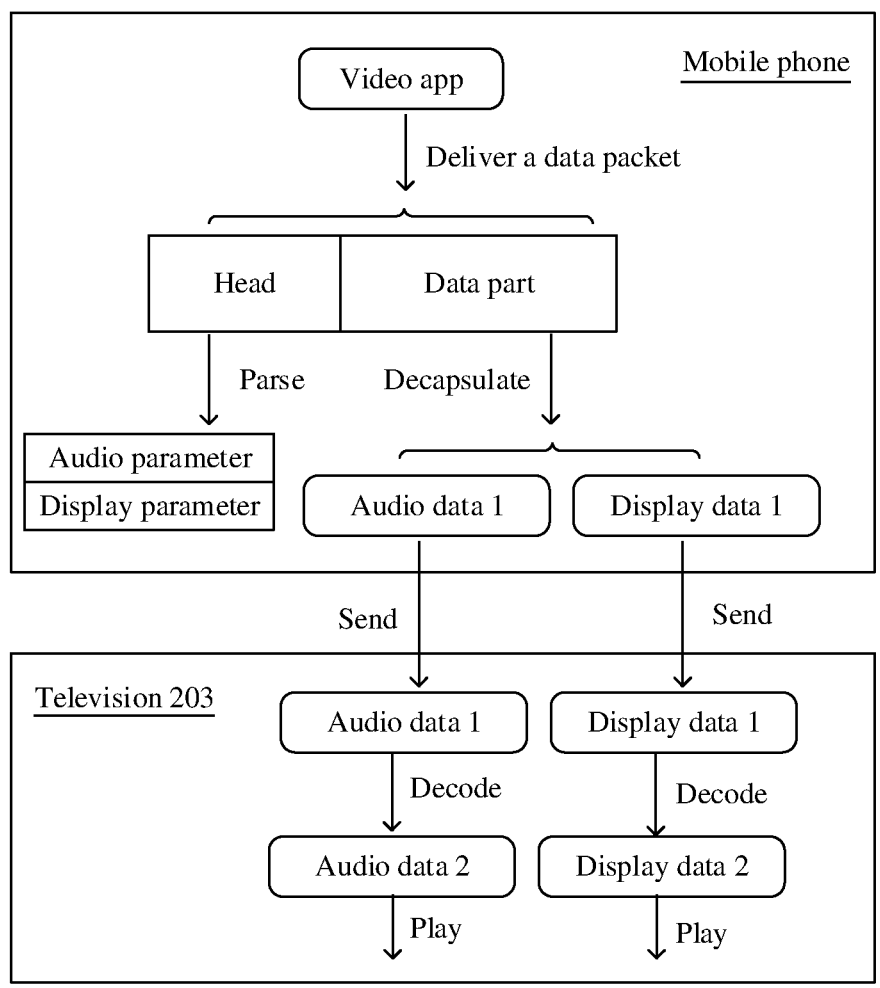
FIG. 115 is a schematic diagram 109 of an audio application scenario according to an embodiment of this application.

In this case, in this embodiment of this application, as shown in FIG. 115, during projection, the master device (for example, the mobile phone) may directly send, to the television by using a decoding capability of the slave device (for example, the television), the encoded audio data 1 and display data 1 that are extracted by the master device from the data packet. Further, the television may decode the received audio data 1 and the received display data 1 by using the decoding capability of the television, to obtain the decoded display data 2 and audio data 2. Further, the television may play the decoded audio data 2 and display data 2, so as to complete projection of the video file in Videos.

In this way, during projection, a master device does not need to perform processing such as decoding and re-encoding on encoded audio data and display data in a data packet, but directly sends the encoded audio data and display data in a video file to a slave device, and the slave device decodes the encoded audio data and display data, and then plays decoded audio data and display data. This shortens a latency of an entire projection process, and improves user experience in a projection scenario.

In addition, because the audio data and the display data that are sent by the master device to the slave device each are data that is not decoded and re-encoded in the video file, distortion caused by decoding and re-encoding of the master device does not occur in the audio data and the display data that are received by the slave device. This implements lossless transmission of the audio data and the display data between the master device and the slave device, and improves fidelity of audio and an image in the projection scenario.

Figure 116:
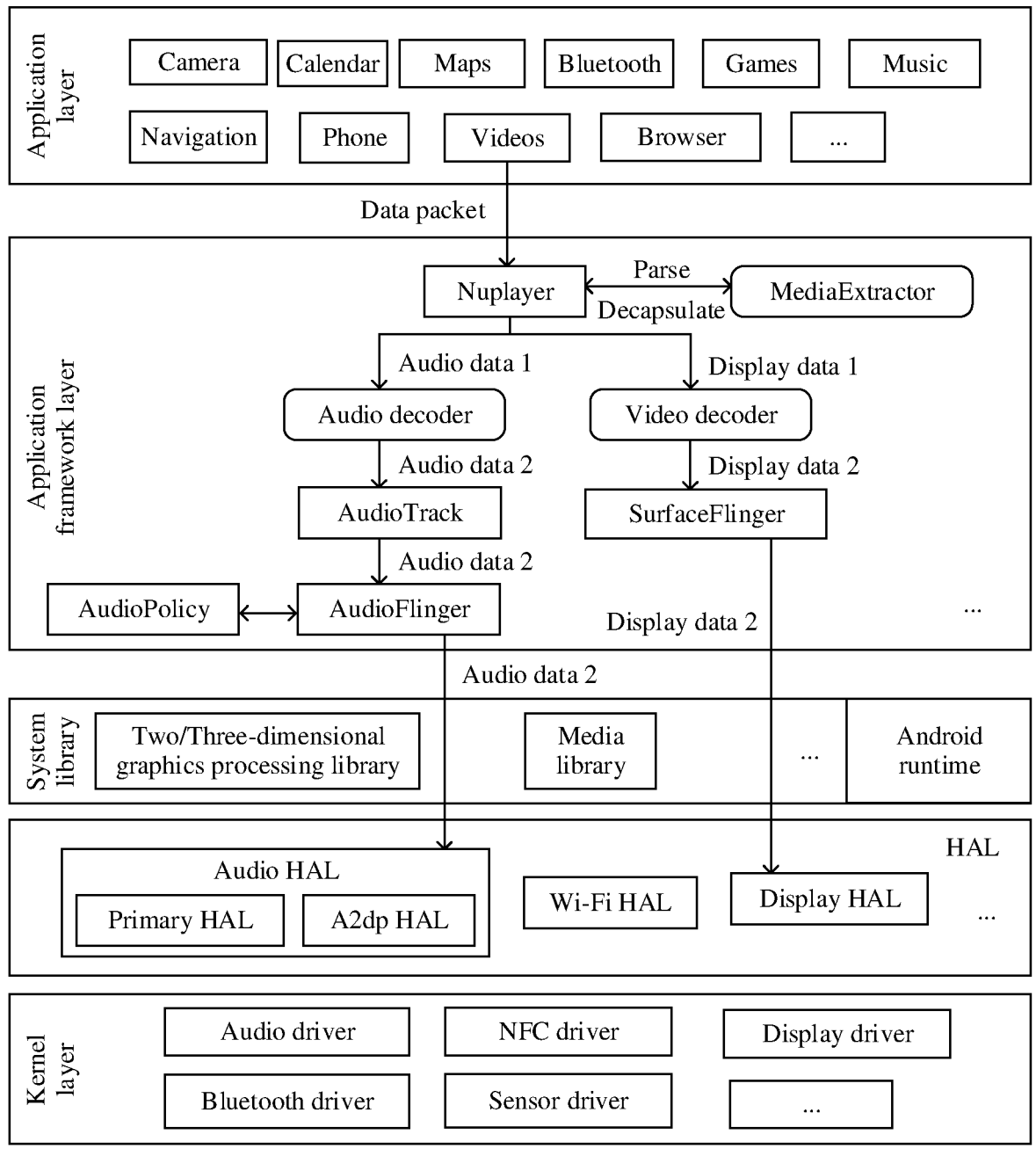
FIG. 116 is a schematic diagram 110 of an audio application scenario according to an embodiment of this application.

For example, an operating system of the mobile phone is an Android system. Currently, as shown in FIG. 116, when an app at an application layer needs to play audio or a video, a corresponding audio/video player such as Nuplayer may be created at an application framework layer. Videos is used as an example. When Videos runs, an obtained video file may be delivered to Nuplayer in real time in a form of a data packet. Nuplayer may invoke a multimedia extractor (MediaExtractor) to parse and decapsulate a received data packet. Through parsing, Nuplayer may obtain an audio parameter and a display parameter that are carried in a head of the data packet. Through decapsulation, Nuplayer may extract corresponding display data 1 and audio data 1 from a data part of the data packet. In this case, the display data 1 and the audio data 1 that are extracted after decapsulation are encoded display data and audio data in the video file.

Further, Nuplayer may invoke an audio decoder (audio decoder) to decode the decapsulated audio data 1 based on the audio parameter obtained through parsing, to obtain decoded audio data 2, for example, PCM data. In addition, Nuplayer may invoke a video decoder (video decoder) to decode the decapsulated display data 1 based on the display parameter obtained through parsing, to obtain decoded display data 2, for example, YUV data.

Further, Nuplayer may input the decoded audio data 2 into an audio manager. Still as shown in FIG. 116, the audio manager may include an audio player (AudioTrack), an audio processor (AudioFlinger), and an audio policy module (AudioPolicy). Specifically, Nuplayer may input the decoded audio data 2 into AudioTrack, and AudioTrack invokes AudioFlinger to perform processing such as mixing, re-sampling, or sound effect setting on the decoded audio data 2. When AudioFlinger processes the foregoing audio data 2, AudioPolicy may set a corresponding audio policy (for example, a mixing policy or a sampling policy) for the audio data currently processed by AudioFlinger, and AudioPolicy may send the specified audio policy to AudioFlinger, so that AudioFlinger can process the decoded audio data 2 according to the audio policy.

In addition, still as shown in FIG. 116, Nuplayer may input the decoded display data 2 into a surface module, for example, SurfaceFlinger, and SurfaceFlinger draws the decoded display data 2.

Subsequently, still as shown in FIG. 116, AudioFlinger may send output audio data (the audio data in this case is still the decoded audio data 2) to a corresponding HAL at an HAL. The HAL provides HALs corresponding to different hardware modules in the mobile phone, for example, an audio HAL, a camera HAL, a Wi-Fi HAL, and a display HAL. AudioFlinger may invoke the audio HAL to send the processed audio data to the audio HAL. The Audio HAL sends the audio data 2 to a corresponding audio output device (for example, a speaker or a headset) for play.

For example, the audio HAL may further include a primary HAL and an A2dp HAL based on different audio output devices. For example, when an audio output device of the mobile phone is the mobile phone, AudioFlinger may invoke the primary HAL to output the audio data 2 to a speaker (speaker) of the mobile phone for play. For another example, when an audio output device of the mobile phone is a Bluetooth headset, AudioFlinger may invoke the A2dp HAL to output the audio data 2 to the Bluetooth headset connected to the mobile phone for play.

Similarly, still as shown in FIG. 116, SurfaceFlinger may send, by using the display HAL, the drawn display data 2 to a display output device of the mobile phone for display. For example, SurfaceFlinger may output, by using the display HAL, the display data 2 to a display of the mobile phone for display.

According to the foregoing processing process, each data packet in a video file to be played when Videos runs may be parsed, decapsulated, and decoded according to the foregoing method and then played, so that the mobile phone can play a related video file to the user by running Videos.

Figure 117:
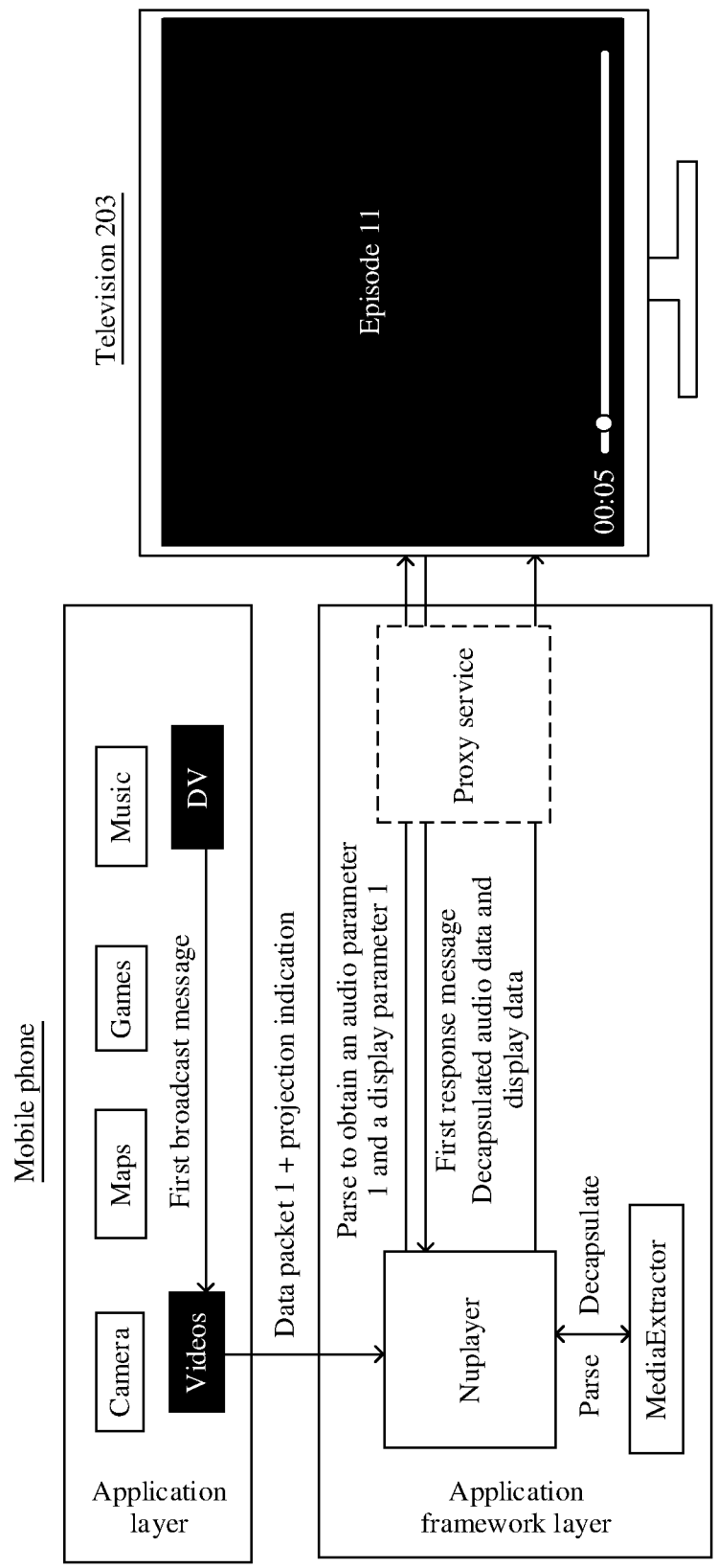

In this embodiment of this application, an example in which the mobile phone is a master device is still used. As shown in FIG. 117, when the mobile phone runs Videos to play a video file A, Nuplayer for playing the video file A may be created at the application framework layer. Further, Videos may deliver the obtained video file A to Nuplayer in real time in a form of a data packet. After a DV app in the mobile phone establishes a network connection to a television 203, the DV app may send a first broadcast message to Videos, to indicate Videos to project, to the television 203 for play, the video file A that is being played. After receiving the first broadcast message, Videos may continue to send a to-be-played data packet such as a data packet 1 in the video file A to Nuplayer.

For example, Nuplayer receives the data packet 1 delivered by Videos. After receiving the data packet 1, Nuplayer may invoke MediaExtractor to parse and decapsulate the data packet 1.

By decapsulating the data packet 1, Nuplayer may extract display data and audio data that are carried in a data part of the data packet 1. The display data and the audio data are data encoded in a specific encoding format in the video file A. In this embodiment of this application, encoding formats of the display data and the audio data in the data packet in the video file A are not limited.

By parsing the data packet 1, Nuplayer may obtain an audio parameter 1 and a display parameter 1 that are carried in a head of the data packet 1. The audio parameter 1 is a parameter used for encoding the audio data in the data packet 1.

For example, the audio parameter 1 may include an encoding format (for example, an AAC format) used for encoding the audio data. For another example, each encoding format may include various different encoding specifications or versions. For example, the AAC format further includes nine different encoding specifications such as a low delay (Low Delay, LD) specification, a scalable sampling rate (Scalable Sampling Rate, SSR) specification, a high efficiency (High Efficiency, HE) specification, and a low complexity (Low Complexity, LC) specification. Therefore, the audio parameter 1 may further include a specific encoding specification or version such as AAC-LC in the encoding format used for encoding the audio data in the data packet 1. For another example, the audio parameter 1 may further include a parameter used for encoding the audio data, for example, a sampling rate or a quantity of sound channels. This is not limited in this embodiment of this application.

The display parameter 1 is a parameter used for encoding the display data in the data packet 1. For example, the display parameter 1 may include an encoding format (for example, an H.265 format or an H.264 format) used for encoding the display data in the data packet 1. Likewise, each encoding format may include various different encoding specifications or versions. Therefore, the display parameter 1 may further include a specific encoding specification or version in the encoding format used for encoding the display data in the data packet 1, for example, version 3.1 of H.265. For another example, the display parameter 2 may further include a data display resolution used for encoding the display data in the data packet 1, for example, 1080*720.

Certainly, the head of the data packet 1 may further carry a parameter such as a name, duration, or a file format of the currently played video file A. This is not limited in this embodiment of this application.

In some embodiments, after Videos receives the first broadcast message sent by the DV app, Videos may further send a first notification message (which may also be referred to as a projection indication) to Nuplayer. After receiving the first notification message, Nuplayer may start to project, in a projection mode, display data and audio data in the received data packet to the television 203 for play. For example, if Nuplayer receives the data packet 1 after receiving the projection indication, it indicates that Nuplayer needs to project the data packet 1 to a slave device (that is, the television 203) for play.

Still as shown in FIG. 117, in the projection mode, Nuplayer may send the audio parameter 1 and the display parameter 1 that are obtained through parsing to the television 203 by using the DV app. Alternatively, the DV app may run at the application framework layer in a form of a system service (a proxy service in FIG. 117). In this case, Nuplayer may send the audio parameter 1 and the display parameter 1 that are obtained through parsing to the television 203 by using the proxy service.

After receiving the audio parameter 1 and the display parameter 1, the television 203 may query, based on the audio parameter 1 and the display parameter 1, whether the television 203 has a corresponding audio decoding capability and image decoding capability. For example, if the audio parameter 1 indicates that the encoding format used for encoding the audio data is the AAC format, the encoding specification is AAC-LC, the sampling rate is 44100 Hz, and the quantity of sound channels is 2, the television 203 may query, based on the audio parameter 1, whether the television 203 can decode the corresponding audio data. If the television 203 can decode the corresponding audio data, it indicates that the television 203 has the audio decoding capability for the audio data in the data packet 1. Similarly, if the display parameter 1 indicates that the encoding format used for encoding the display data is the H.265 format, the encoding version is version 3.1, and the resolution is 1080*720, the television 203 may query, based on the display parameter 1, whether the television 203 can decode the corresponding display data. If the television 203 can decode the corresponding display data, it indicates that the television 203 has the image decoding capability for the display data in the data packet 1.

Further, still as shown in FIG. 117, if the television 203 has the corresponding image decoding capability and audio decoding capability, the television 203 may send a first response message to the DV app (or the proxy service) in the mobile phone, to indicate that the television 203 can decode the audio data and the display data in the data packet 1. The DV app (or the proxy service) may send the first response message to Nuplayer, to trigger Nuplayer to send the decapsulated display data and audio data in the data packet 1 to the television 203.

For example, Nuplayer may send the decapsulated display data and audio data in the data packet 1 to the television 203 by using the DV app (or the proxy service) in the mobile phone. Alternatively, Nuplayer may send the decapsulated display data and audio data in the data packet 1 to the television 203 by using a Wi-Fi module in the mobile phone, or Nuplayer may send the decapsulated display data and audio data in the data packet 1 to the television 203 by using a created DMSDP audio HAL. This is not limited in this embodiment of this application.

The display data and the audio data that are received by the television 203 from the mobile phone are data decapsulated but not decoded. The television 203 may decode the received display data by using the image decoding capability of the television 203. Likewise, the television 203 may decode the received audio data by using the audio decoding capability of the television 203. Further, the television 203 may play the decoded display data and audio data, so that the video file A played by Videos in the mobile phone is projected to the television 203 for play.

In addition, during projection, the mobile phone (that is, a master device) only needs to parse and decapsulate a data packet in a video file, but does not need to decode audio data and display data in the data packet, and does not need to re-encode decoded audio data and display data in a unified format, as in the conventional technology. This simplifies a process in which the master device processes audio data and display data during projection. This also greatly shortens a time consumed for a process in which the master device performs projection to the television 203 (that is, a slave device), shortens a projection latency, and improves user experience during projection.

In addition, if the television 203 does not have the audio decoding capability for the audio data in the data packet 1, and/or does not have the image decoding capability for the display data in the data packet 1, the television 203 may send a second response message to the DV app (or the proxy service) in the mobile phone, to indicate that the television 203 cannot decode the audio data and/or the display data in the data packet 1. In this case, the DV app (or the proxy service) may send a projection failure message to Videos. After receiving the message, Videos may notify the user that this projection fails.

Alternatively, after receiving the projection failure message, Videos may indicate, in an existing projection manner, Nuplayer to decode the audio data and the display data in the data packet 1 by using a decoder. For example, Nuplayer may decode the audio data in the data packet 1 by using the audio decoder, and decode the display data in the data packet 1 by using the video decoder. Further, Nuplayer may invoke a related encoder to re-encode the decoded audio data and display data in a preset unified format, and send re-encoded audio data and display data to the television 203. The television 203 may decode the received audio data and display data in a preset unified format, and the play the decoded audio data and display data.

Figure 118:
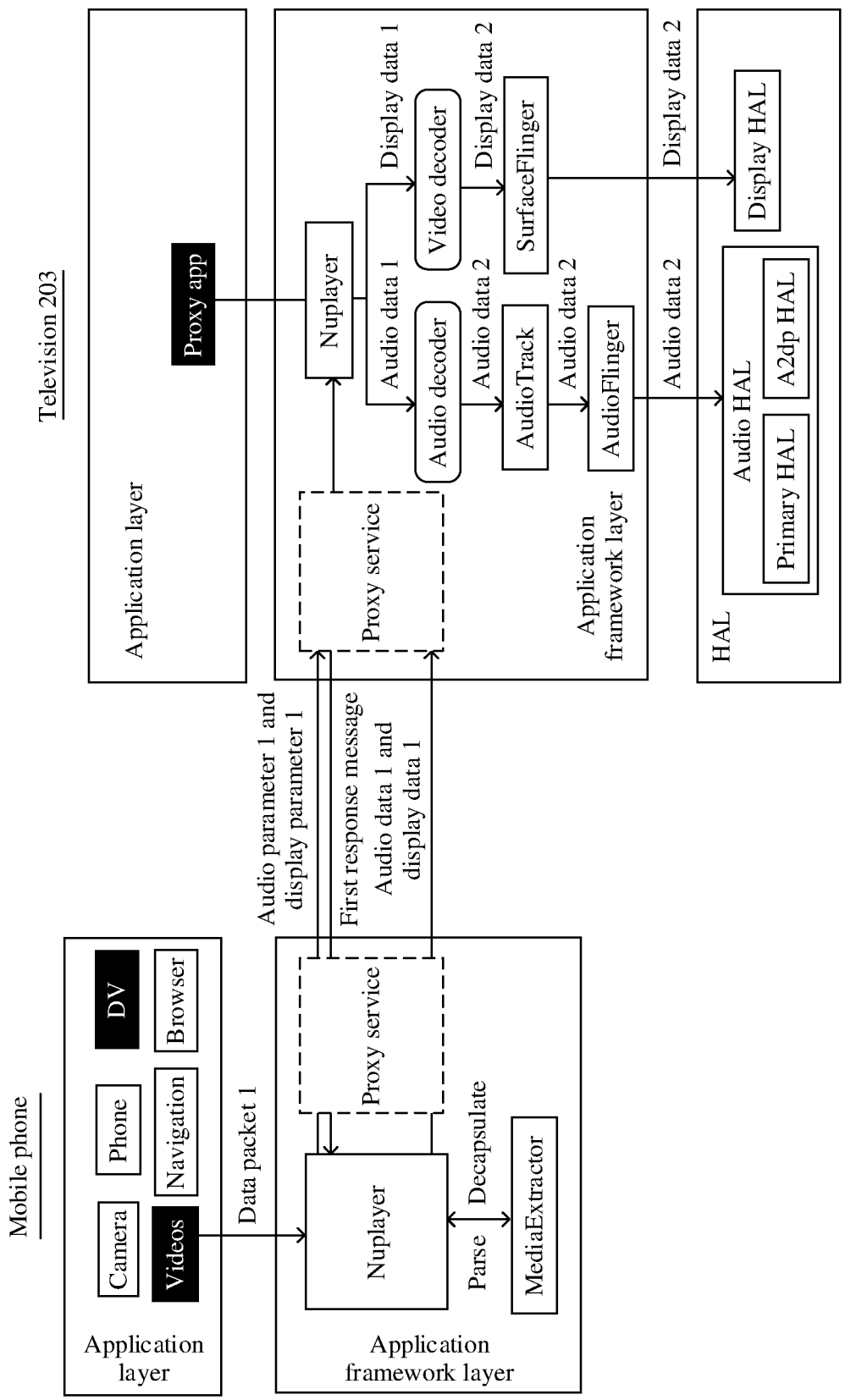

In some embodiments, an example in which a slave device used during projection of the mobile phone is the television 203 is still used. A software architecture of an operating system of the television 203 may be similar to a software architecture of the operating system of the mobile phone. As shown in FIG. 118, the television 203 may include an application layer, an application framework layer, an HAL, and the like. A system-level system application such as a proxy app may be installed at the application layer of the television 203. The proxy app may implement interaction between the mobile phone and the television 203 through interaction with the DV app in the mobile phone. For example, the proxy app may interact with the DV app to complete a process of establishing a network connection between the mobile phone and the television 203. Alternatively, the proxy app in the television 203 may run at the application framework layer in a form of a system service (a proxy service in the television 203 in FIG. 118).

For another example, still as shown in FIG. 118, during projection, Nuplayer in the mobile phone may send the audio parameter 1 and the display parameter 1 that are obtained through parsing in the data packet 1 to the proxy app (or the proxy service) in the television 203. The proxy app (or the proxy service) in the television 203 may query, based on the audio parameter 1, whether the television 203 has the corresponding audio decoding capability. Likewise, the proxy app (or the proxy service) may query, based on the display parameter 1, whether the television 203 has the corresponding image decoding capability. If the television 203 has the corresponding audio decoding capability and image decoding capability, the proxy app (or the proxy service) may send the first response message to the DV app (or the proxy service) in the mobile phone, to indicate that the television 203 can decode the audio data and the display data in the data packet 1. Correspondingly, if the television 203 does not have the corresponding audio decoding capability and/or image decoding capability, the proxy app (or the proxy service) in the television 203 may send the second response message to the DV app (or the proxy service) in the mobile phone, to indicate that the television 203 cannot decode the audio data and/or the display data in the data packet 1.

If the proxy app (or the proxy service) in the television 203 sends the first response message to the DV app (or the proxy service) in the mobile phone, Nuplayer in the mobile phone may be triggered to send the decapsulated display data and audio data in the data packet 1 to the proxy app (or the proxy service) in the television 203. For example, the decapsulated display data in the data packet 1 may be referred to as display data 1, the decapsulated audio data in the data packet 1 may be referred to as audio data 1, and both the display data 1 and the audio data 1 are encoded data in the video file A.

Still as shown in FIG. 118, the application framework layer of the television 203 also includes Nuplayer. After the proxy app (or the proxy service) in the television 203 receives the display data 1 and the audio data 1 that are sent by the mobile phone, the proxy app (or the proxy service) may send the display data 1 and the audio data 1 to Nuplayer in the television 203. Because the display data 1 and the audio data 1 in the data packet 1 that are sent by the mobile phone are encoded data in the video file A, Nuplayer may create a corresponding audio decoder and video decoder. Further, Nuplayer may send the received audio data 1 to the audio decoder for decoding, to obtain decoded audio data 2. In addition, Nuplayer may send the received display data 1 to the video decoder for decoding, to obtain decoded display data 2.

In some embodiments, when determining that the television 203 can decode the audio data 1 and the display data 1 in the data packet 1, the proxy app (or the proxy service) in the television 203 may indicate Nuplayer to create a corresponding audio decoder based on the received audio parameter 1, and may indicate Nuplayer to create a corresponding video decoder based on the received display parameter 1. In this way, when receiving the display data 1 and the audio data 1 in the data packet 1 that are sent by the mobile phone, Nuplayer may directly input the display data 1 into the video decoder for image decoding, and input the audio data 1 into the audio decoder for audio decoding. This further shortens a time consumed by the television 203 to process the audio data 1 and the display data 1 during projection, and can further shorten a projection latency.

Subsequently, still as shown in FIG. 118, the audio decoder may input the decoded audio data 2 into AudioFlinger by using AudioTrack, and AudioFlinger performs audio processing such as sound effect setting on the decoded audio data 2. The video decoder may input the decoded display data 2 into SurfaceFlinger, and SurfaceFlinger draws the decoded display data 2. Further, AudioFlinger may send, by using an audio HAL at the HAL layer, the output audio data 2 to an audio output device (for example, a speaker of the television 203) for play, and SurfaceFlinger may send, by using a display HAL at the HAL layer, the output display data 2 to a display output device (for example, a display of the television 203) for display, so that the video file A played by Videos in the mobile phone is projected to the television 203 for play.

It can be learned that the audio data and the display data in the video file A that are sent by the mobile phone to the television 203 during projection each are data that is not decoded, that is, the audio data and the display data that are received by the television 203 each are source data that is not decoded in the video file A. Therefore, distortion caused by an operation such as decoding or re-encoding of the mobile phone does not occur in the audio data and the display data. Further, the television 203 may directly decode the source data that is not decoded in the video file A, and then play decoded source data, so that fidelity of the played video is higher.

The foregoing embodiment is described by using an example in which the mobile phone projects the audio data and the display data in the data packet 1 to the television 203 during projection. It can be understood that, when Videos plays the video file A in the mobile phone, another data packet after the data packet 1 is further included. For a process of processing the another data packet during projection, refer to the process of processing the data packet 1 in the foregoing embodiment.

For example, after delivering the data packet 1 in the video file A to Nuplayer, Videos may continue to deliver a data packet 2 in the video file A to Nuplayer. Nuplayer may invoke MediaExtractor to parse and decapsulate the data packet 2. A difference from the foregoing embodiment is that audio parameters of audio data in all data packets in the video file A are generally consistent and display parameters of display data are generally consistent. For example, pieces of audio data in the data packet 1, the data packet 2, and other data packets in the audio file are uniformly encoded according to the ACC-LC encoding specification, and audio parameters such as sampling rates or quantities of sound channels used for encoding are consistent. For another example, pieces of display data in the data packet 1, the data packet 2, and the other data packets in the audio file are uniformly encoded according to version 3.1 of H.265, and display parameters such as resolutions used for encoding are consistent. Therefore, if the television 203 has a corresponding decoding capability for each of the audio data and the display data in the data packet 1, the television 203 has a corresponding decoding capability for each of the audio data and the display data in the data packet 2 and the other data packets in the audio file.

Therefore, after extracting the audio data and the display data in the data packet 2 by using MediaExtractor, Nuplayer does not need to send the corresponding audio parameter and display parameter to the television 203, but Nuplayer may directly send the extracted audio data and display data in the data packet 2 to the television 203. In this case, the audio data and the display data each are still data that is not decoded in the video file A. Subsequently, the television 203 may decode the received audio data and display data, and play decoded audio data and display data, so that the video file A played by Videos in the mobile phone is projected to the television 203 for play.

If Videos plays a new video file (for example, a video file B) during projection of the mobile phone, Videos may create Nuplayer (that is, new Nuplayer) for playing the video file B, and input a data packet in the video file B into new Nuplayer. In addition, Videos may send a second notification message to new Nuplayer. After receiving the second notification message, new Nuplayer may start to project display data and audio data in the received data packet to the television 203 for play. For example, when receiving the data packet (for example, a data packet 3) in the video file B, new Nuplayer may send an audio parameter and a display parameter in the data packet 3 that are obtained through parsing to the television 203 according to the process of processing the data packet 1 in the foregoing embodiment, to trigger the television 203 to query whether the television 203 has decoding capabilities of decoding audio data and display data in the data packet 3. If the television 203 has the corresponding decoding capabilities, the television 203 may send a first response message to the mobile phone, to indicate that the television 203 can decode the audio data and the display data in the data packet 3. Further, new Nuplayer in the mobile phone may send display data and audio data that are extracted from the data packet 3 and other subsequent data packets to the television 203, and the television 203 decodes the received display data and audio data and then plays decoded display data and audio data.

In some embodiments, the mobile phone may further change a slave device during projection. For example, in a process in which the mobile phone runs Videos and projects the video file A to the television 203 for play, if it is detected that the user enters an operation of changing a slave device from the television 203 to a laptop, the DV app in the mobile phone may disconnect the network connection to the television 203, and establish a network connection to the laptop by using the laptop as a new slave device.

Figure 119:
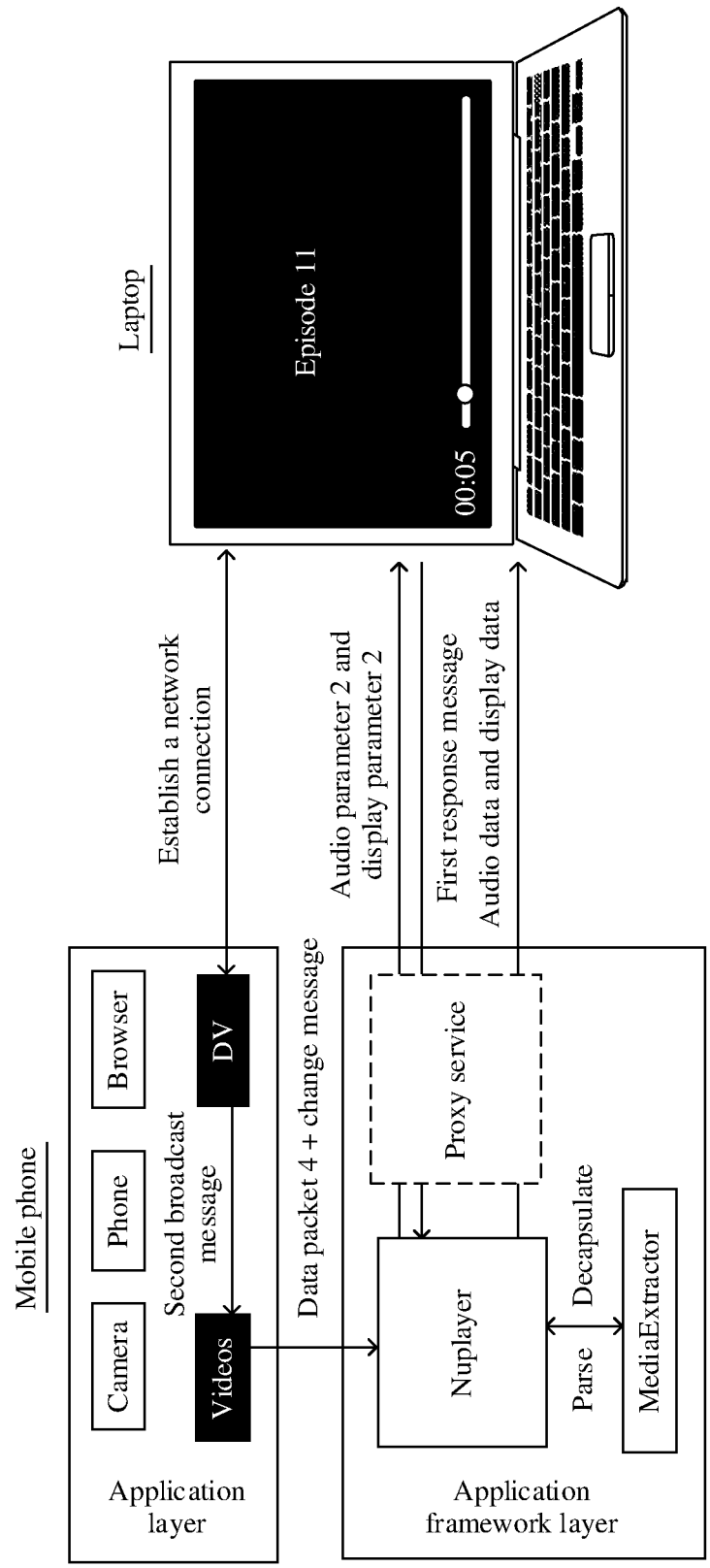

As shown in FIG. 119, after the DV app in the mobile phone establishes a network connection to the laptop, the DV app may send a second broadcast message to Videos that is playing the video file A, to indicate Videos to project, to the laptop for play, the video file A that is being played. After receiving the second broadcast message, in addition to continuing to send a to-be-played data packet (for example, a data packet 4) in the video file A to Nuplayer, Videos may further send a third notification message (which may also be referred to as a change message) to Nuplayer, where the third notification message may include an identifier of a new slave device (that is, the laptop). After receiving the third notification message, Nuplayer may determine that the slave device of the mobile phone is changed from the television 203 to the laptop.

Still as shown in FIG. 119, after receiving the third notification message, Nuplayer may start to project display data and audio data in the received data packet to the laptop for play. For example, Nuplayer may invoke MediaExtractor to parse and decapsulate the data packet 4, to obtain display data and audio data in the data packet 4, a display parameter 2 of the display data, and an audio parameter 2 of the audio data. After receiving the change message, Nuplayer further needs to obtain a decoding capability indicating whether the laptop can decode the display data and the audio data in the video file A. Still as shown in FIG. 119, Nuplayer may send the display parameter 2 and the audio parameter 2 that are obtained through parsing to the laptop, to trigger the laptop to query whether the laptop has decoding capabilities of decoding the audio data and the display data in the data packet 4.

If the laptop has the corresponding decoding capabilities, the laptop may send a first response message to the mobile phone, to indicate that the laptop can decode the audio data and the display data in the data packet 4. Further, still as shown in FIG. 119, Nuplayer in the mobile phone may send the display data and the audio data that are extracted from the data packet 4 to the laptop, and the laptop decodes the received display data and audio data and then plays decoded display data and audio data.

In addition, before Nuplayer receives a slave device change message again, Nuplayer may send display data and audio data in other data packets in the video file A after the data packet 4 to the laptop, and the laptop decodes the received display data and audio data and then plays decoded display data and audio data. In this way, when the slave device changes during projection of the mobile phone, the mobile phone may also project, to the television 203 for play, the video file A played in the video app. A process in which the laptop processes the received display data and audio data is similar to the process in which the television 203 processes the received display data and audio data in the foregoing embodiment. Therefore, details are not described herein again.

Likewise, after the slave device is switched during projection of the mobile phone (that is, a master device), if the slave device has a capability of decoding a currently played video file, the mobile phone only needs to parse and decapsulate a data packet in the video file. The mobile phone does not need to decode audio data and display data in the data packet, and does not need to re-encode decoded audio data and display data in a unified format neither, as in the conventional technology. This simplifies a process in which the master device processes audio data and display data during projection, and also shortens a time consumed by the master device to perform projection to the laptop (that is, a slave device).

In addition, the audio data and the display data that are received by the laptop each are source data that is not decoded in the video file A. Therefore, distortion caused by an operation such as decoding or re-encoding of the mobile phone does not occur in the audio data and the display data. Subsequently, the laptop may directly decode the source data that is not decoded in the video file A, and then play decoded source data, so that fidelity of the played video is higher.

Figure 120:
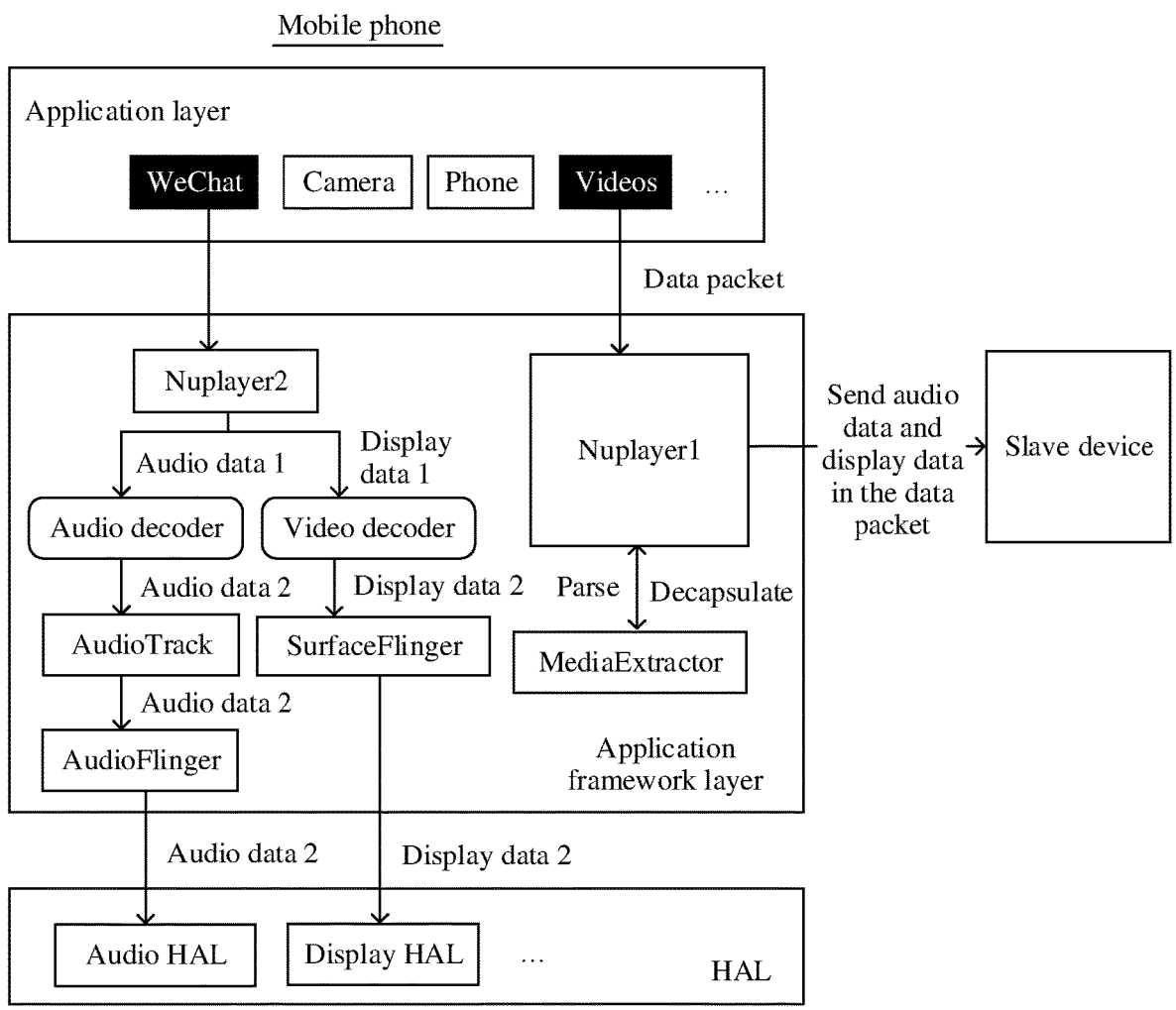

In some embodiments, in a process in which the mobile phone runs Videos and performs projection to a slave device, as shown in FIG. 120, after receiving a data packet in a video file, Nuplayer1 in the mobile phone may directly send audio data and display data that are extracted from the data packet and that are not decoded to the slave device, and the slave device decodes the received audio data and display data and then plays decoded audio data and display data.

In other words, Nuplayer1 in the mobile phone does not need to invoke a related decoder to decode the audio data and the display data in the data packet. Therefore, Nuplayer1 does not need to input, by using AudioTrack, the decoded audio data to AudioFlinger for audio processing. Likewise, Nuplayer1 does not need to input the decoded display data to SurfaceFlinger for drawing. In other words, in a process in which the mobile phone performs projection to the slave device, function modules that are configured to play audio/video data such as AudioTrack, AudioFlinger, and SurfaceFlinger in the mobile phone are not occupied by Videos, and each are in an idle state.

In this way, still as shown in FIG. 120, in a process in which the mobile phone runs Videos and performs projection, the mobile phone may further run another application, and play, by using function modules such as AudioTrack, AudioFlinger, and SurfaceFlinger, display data and/or audio data generated by the another application. For example, the user may switch Videos running in the mobile phone to the background. In this case, Nuplayer1 in the mobile phone may continue to send audio data and display data that are from Videos and that are not decoded to the slave device.

Videos is switched to the background. If the user starts WeChat in the mobile phone, still as shown in FIG. 120, WeChat may create corresponding Nuplayer2, and Nuplayer2 performs operations such as parsing and decapsulation on display data 1 and/or audio data 1 from WeChat. Further, Nuplayer2 may input the audio data 1 into the audio decoder for decoding, to obtain decoded audio data 2, and/or Nuplayer2 may input the display data 1 into the video decoder for decoding, to obtain decoded display data 2. Further, the audio decoder may input the decoded audio data 2 into AudioTrack, and AudioTrack invokes AudioFlinger to perform processing such as mixing, re-sampling, or sound effect setting on the decoded audio data 2, and/or the video decoder may input the decoded display data 2 into SurfaceFlinger, and SurfaceFlinger draws the decoded display data 2.

Subsequently, AudioFlinger in the mobile phone may invoke the audio HAL to send, to the audio HAL, the decoded audio data 2 that is output by AudioFlinger, and Audio HAL sends the audio data 2 to an audio output device such as a speaker or a headset of the mobile phone for play. Similarly, SurfaceFlinger in the mobile phone may send, by using the display HAL, the decoded display data 2 to the display of the mobile phone for display. In this way, when the mobile phone projects a video file in Videos to the slave device, the mobile phone may further run another application (for example, WeChat), and play display data and/or audio data in the another application, so that the user can use an application function provided by the another application in the mobile phone while performing projection by using the mobile phone.

Certainly, in a process in which the mobile phone runs Videos and performs projection, Nuplayer1 may also decode the audio data and the display data in the received video file according to the foregoing method, and then play the audio data and/or the display data in Videos by using the foregoing function modules such as AudioTrack, AudioFlinger, and SurfaceFlinger, so that the mobile phone can synchronously play audio data and/or display data in a related video file with the slave device during projection. This is not limited in this embodiment of this application.

The foregoing embodiment is described by using an example in which the mobile phone projects a video file in Videos to a slave device for play. In some other embodiments of this application, the mobile phone may further project an audio file in an application to a slave device for play. Likewise, one audio file may also include one or more data packets. Certainly, the audio file may further include other information such as a format, duration, and a name of the audio file. The information and the data packets of the audio file jointly constitute the video file.

Figure 121:
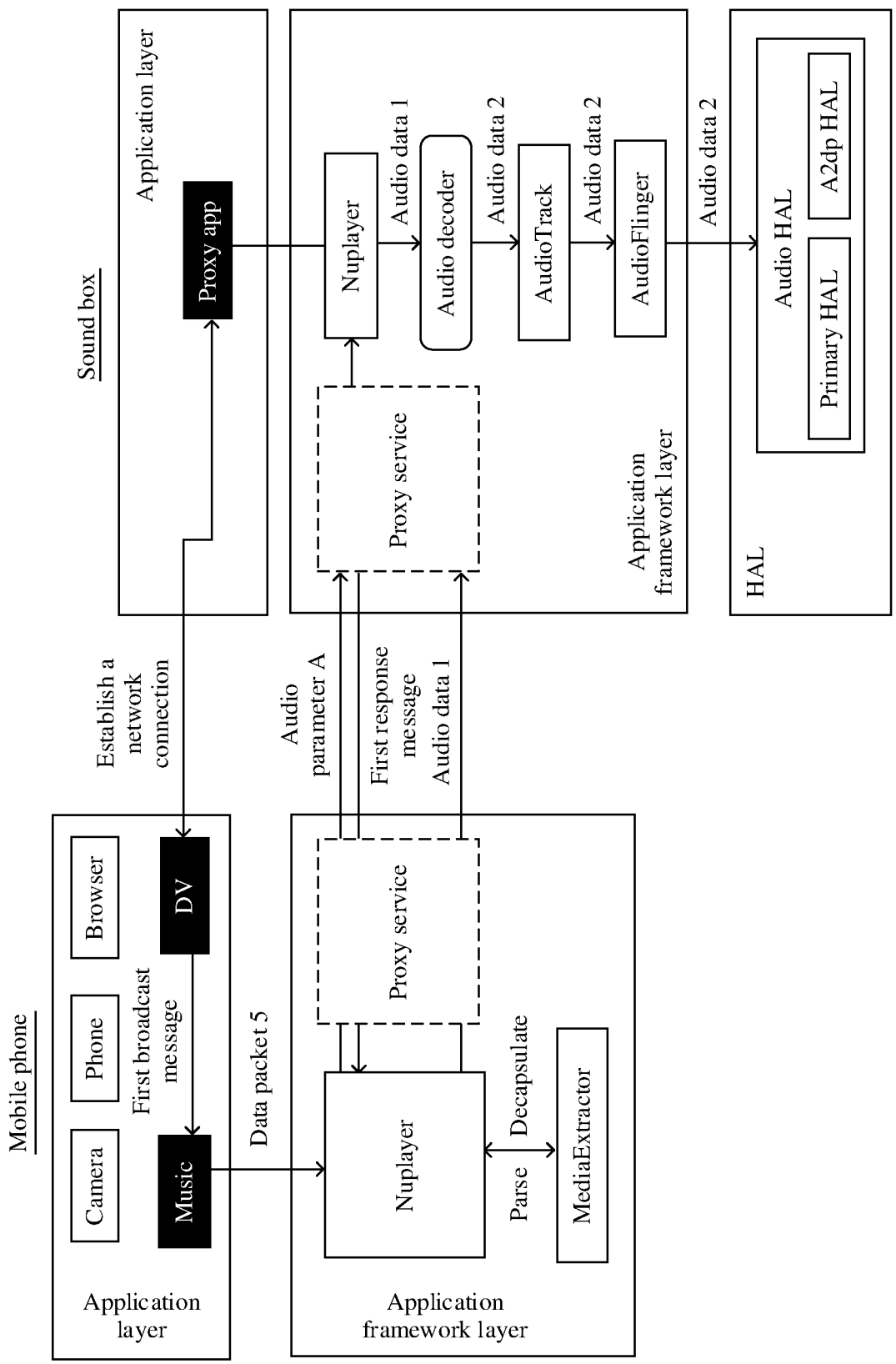

As shown in FIG. 121, similar to running Videos, when running Music and play an audio file A, the mobile phone may create, at the application framework layer, Nuplayer for playing the audio file A. In addition, Music may deliver the audio file A to Nuplayer in real time in a form of a data packet.

When the mobile phone runs Music, if the user sets a sound box as an audio output device of the mobile phone, as shown in FIG. 121, the DV app in the mobile phone may establish a network connection to the sound box by using the sound box as a slave device. Further, the DV app may send a first broadcast message to Music, to indicate Music to project, to the television 203 for play, the audio file A that is being played. After receiving the first broadcast message, Music may continue to send a to-be-played data packet such as a data packet 5 in the audio file A to Nuplayer. A difference from the foregoing video file A (or the video file B) is that a data packet in the audio file A includes corresponding audio data but does not include display data.

As shown in FIG. 121, after receiving the data packet 5 delivered by Music, Nuplayer may invoke MediaExtractor to parse and decapsulate the data packet 5, to obtain audio data 1 in the data packet 5 and an audio parameter A of the audio data 1. Likewise, the audio parameter A is a parameter used for encoding the audio data 1 in the data packet 5, for example, a parameter such as an encoding format, an encoding specification or version, a sampling rate, or a quantity of sound channels. This is not limited in this embodiment of this application.

As shown in FIG. 121, Nuplayer may send the audio parameter A to a proxy app (or a proxy service) in the sound box by using the DV app. The proxy app (or the proxy service) in the sound box may query, based on the audio parameter A, whether the sound box has a corresponding audio decoding capability. If the sound box has the corresponding decoding capability, the proxy app (or the proxy service) in the sound box may send a first response message to the DV app (or the proxy service) in the mobile phone, to indicate that the sound box can decode the audio data 1 in the data packet 5. Further, the DV app (or the proxy service) in the mobile phone sends the first response message to Nuplayer in the mobile phone, to indicate that the sound box can decode the audio data 1 in the data packet 5. In addition, after determining that the sound box has the audio decoding capability for the audio data 1 in the data packet 5, the proxy app (or the proxy service) in the sound box may further indicate Nuplayer in the sound box to create a corresponding audio decoder based on the audio parameter A.

Subsequently, still as shown in FIG. 121, Nuplayer in the mobile phone may send the audio data 1 that is extracted from the data packet 5 and that is not decoded to the proxy app (or the proxy service) in the sound box, and the proxy app (or the proxy service) in the sound box may send the audio data 1 to Nuplayer in the television 203. Nuplayer may send the received audio data 1 to the audio decoder for decoding, to obtain decoded audio data 2. Further, the audio decoder may input the decoded audio data 2 into AudioFlinger by using AudioTrack, and AudioFlinger performs audio processing such as sound effect setting on the decoded audio data 2. Finally, AudioFlinger may send, by using an audio HAL at an HAL layer, the output decoded audio data 2 to a speaker of the sound box for play.

If the audio output device of the mobile phone does not change, Nuplayer may send audio data in another data packet in the audio file A after the data packet 5 to the sound box according to the foregoing method, and the sound box decodes the received audio data by using the decoding capability of the sound box, and then plays decoded audio data, so that the audio file A played by Music in the mobile phone is projected to the sound box for play.

Similar to the process of projecting a video file, when the mobile phone projects an audio file to a slave device, if the slave device has a capability of decoding a currently played audio file, the mobile phone only needs to parse and decapsulate a data packet in the audio file, and directly sends audio data that is not decoded in the audio file to the slave device (for example, the sound box). The mobile phone does not need to decode audio data in the data packet, and does not need to re-encode decoded audio data in a unified format neither, as in the conventional technology. This simplifies a process in which the master device processes audio data during audio switching, and also shortens a time consumed by the master device to perform projection to the slave device.

In addition, the audio data received by the sound box is source data that is not decoded in the audio file A. Therefore, distortion caused by an operation such as decoding or re-encoding of the mobile phone does not occur in the audio data. Subsequently, the sound box may directly decode the source data that is not decoded in the audio file A, and then play decoded source data, so that fidelity of the played audio is higher.

It should be noted that, similar to the process of projecting a video file, when the mobile phone plays a new audio file, or an audio output device (that is, a slave device) of the mobile phone changes, the mobile phone may re-obtain a capability of the slave device to decode a currently played audio file. If the slave device can decode the currently played audio file, the mobile phone may send audio data that is not decoded in the audio file to the slave device according to the foregoing method, and the slave device decodes the received audio data and then plays decoded audio data. This shortens a latency for the master device to project audio to the slave device.

In a distributed audio scenario, the master device may switch one or more services (for example, an audio play service, a recording service, a video play service, or a camera service) related to an audio function of the master device to the slave device for execution, so as to present a distributed scenario in which a plurality of devices collaboratively work.

A service may correspond to one or more functions in an application. For example, Videos may provide a video play service used to implement a projection function. For another example, Audio may provide an audio play service used to implement an audio play function, or may provide a Karaoke service used to implement an audio recording function. In a distributed scenario, a master device may switch a service to a slave device. In this case, the master device may collaborate with the slave device to execute the service.

For example, the master device may send, to a slave device, audio data that is being played, and the slave device plays the audio data, so that an audio play service of the master device is switched to the slave device for execution. For another example, the master device may send display data in a video to one slave device for play, and send audio data in the video to another slave device for play, so that a video play service of the master device is switched to a plurality of slave devices for execution. One service may include one or more subtasks. For example, the video play service may include a display subtask related to a display function and an audio subtask related to an audio function.

For another example, the master device may collect audio data by using a microphone of a slave device, and send the collected audio data to the master device for storage or play, so that a recording service of the master device is switched to the slave device for execution. For another example, the master device may collect a photographed image by using a camera of a slave device, and send the photographed image to the master device for display, so that a camera service of the master device is switched to the slave device for execution.

However, in the foregoing distributed audio scenario, when the master device switches a service to the slave device, a service quality problem such as poor audio quality, poor display quality, audio-to-video asynchronization, or a long latency may occur due to a device performance difference or the like.

Therefore, in this embodiment of this application, the master device may predict service quality when a current service is switched to different slave devices for execution, and the master device may further recommend, to the user based on a prediction result, one or more electronic devices that execute the foregoing service. In this way, the user may select, based on the recommendation of the master device, an appropriate device to collaborate with the master device to perform a corresponding service. This improves service quality when the master device collaborates with the slave device in the distributed scenario.

Figure 122:
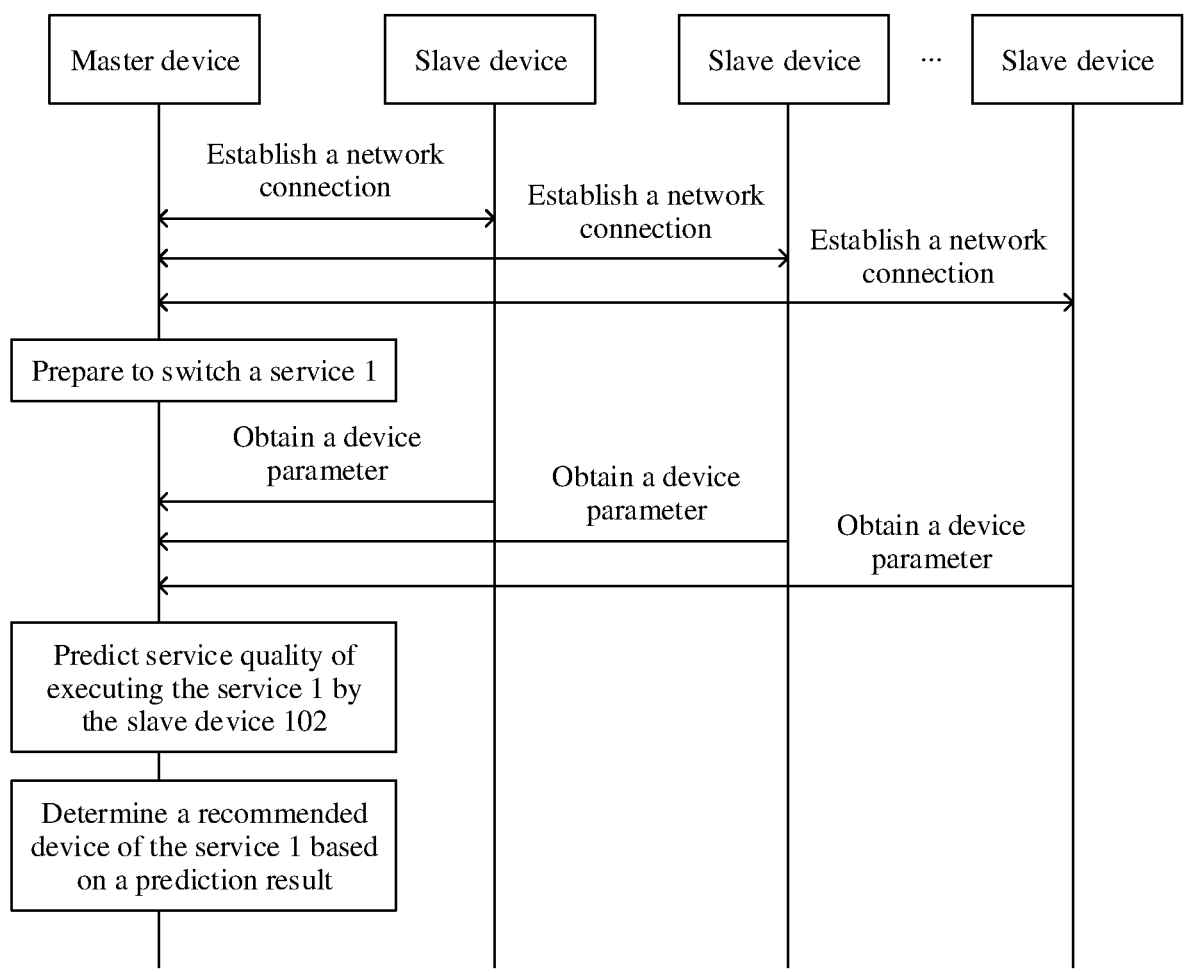

For example, as shown in FIG. 122, the master device may establish a network connection to one or more slave devices. Further, when the master device prepares to switch a service 1 to one or more slave devices for execution, the master device may obtain a device parameter associated with the service 1 from each slave device.

For example, when the service 1 is a camera service, the device parameter associated with the service 1 may include an image processing algorithm, a quantity of cameras, resolutions of the cameras, and FOVs of the cameras that are supported by the slave device.

For another example, when the service 1 is an audio play service, the device parameter associated with the service 1 may include a sound effect algorithm, a quantity of sound channels, a sampling rate, a mixing policy, and a horn model that are supported by the slave device.

For another example, when the service 1 is a recording service, the device parameter associated with the service 1 may include a voice processing algorithm, an audio data encoding/decoding algorithm, and a quantity of microphones that are supported by the slave device.

For another example, when the service 1 is a display service, the device parameter associated with the service 1 may include a resolution, a frame rate, and a display data encoding/decoding algorithm that are supported by the slave device.

Still as shown in FIG. 122, after obtaining the device parameter associated with the service 1 from each slave device, the master device may predict, based on the obtained device parameter, service quality of executing the service 1 by each slave device. Further, the master device may determine a corresponding recommended device based on the service quality of executing the service 1 by each slave device. For example, the master device may determine, as the recommended device, a slave device with highest service quality of executing the service 1. Alternatively, after the master device switches the service 1 to a slave device for execution, that is, in a process in which the master device and the slave device collaboratively execute a service, the master device may obtain a device parameter associated with the service 1 from each slave device, and determine a corresponding recommended device according to the foregoing method.

After determining the corresponding recommended device, the master device may recommend the determined recommended device to the user. For example, the master device may display a prompt message, where the prompt message may carry an identifier of the recommended device. If it is detected that the user taps the identifier of the recommended device, the master device may be triggered to switch the service 1 back to the corresponding recommended device for execution.

In this way, the user may learn of, in time by using the foregoing prompt message, a specific device that is suitable for executing the foregoing service 1 in the current distributed scenario. In addition, the user may quickly switch, by using the identifier in the prompt message, a specific device that executes the service 1. This improves service quality when a plurality of devices collaboratively work in a distributed scenario, and improves user experience.

Figure 123:
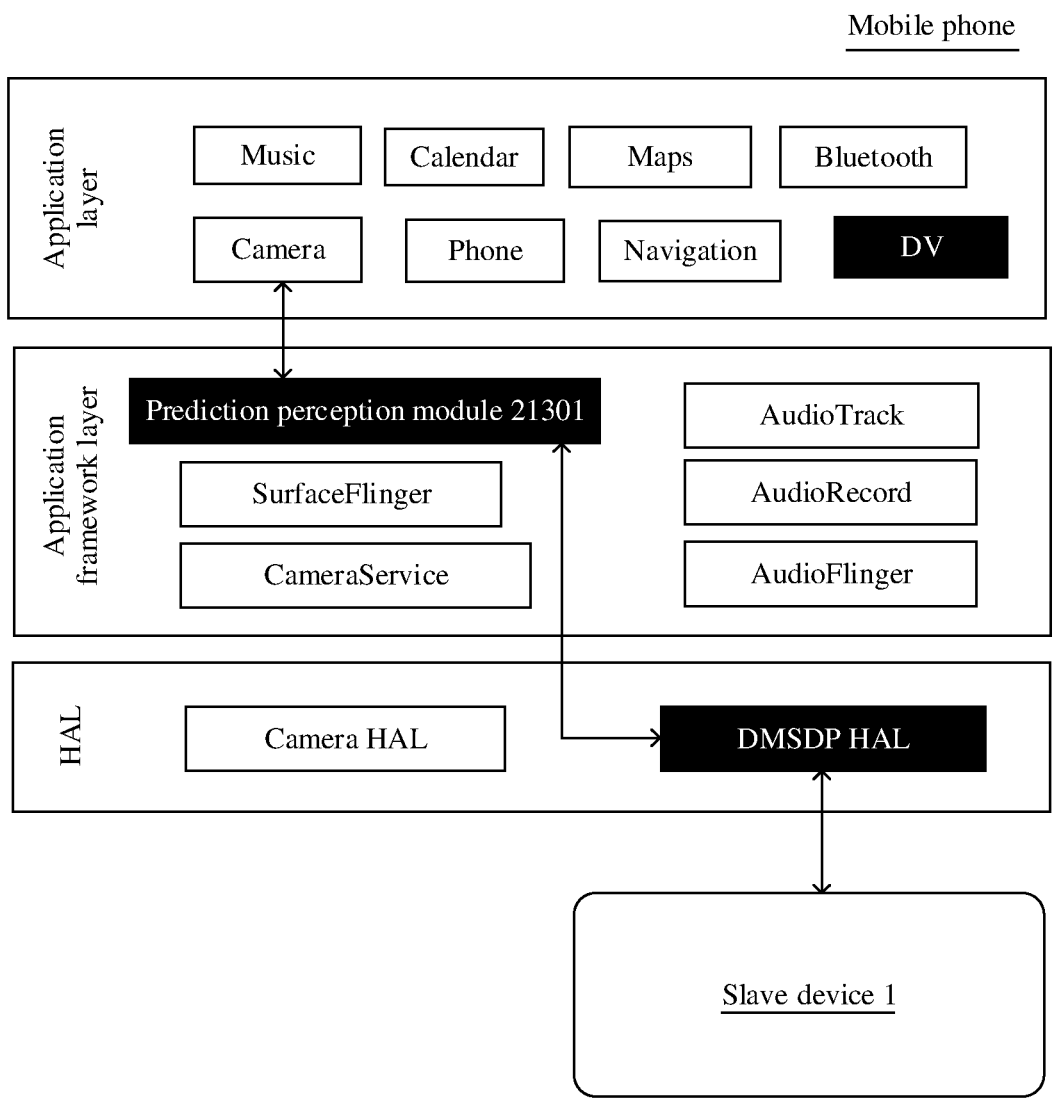

An example in which the mobile phone is the foregoing master device is still used. Based on the software architecture of the Android system shown in FIG. 6, as shown in FIG. 123, a prediction perception module 21301 may be disposed at the application framework layer of the mobile phone. After the mobile phone establishes a network connection to one or more slave devices, the prediction perception module 21301 may detect a currently running service in real time, for example, an audio play service, a video call service, a live broadcast service, or a recording service. Further, the prediction perception module 21301 may obtain, based on the currently running service, a device parameter corresponding to the service from each slave device. For example, the device parameter may include one or more parameters such as an audio parameter, a display parameter, or a camera parameter.

The audio parameter may include one or more of a sound effect algorithm, a quantity of sound channels, a sampling rate, a mixing policy, an audio data encoding/decoding algorithm, a quantity of microphones and models of the microphones, a quantity of horns and models of the horns, and the like that are supported by the slave device. The audio parameter may reflect an audio capability (for example, an audio play capability or a recording capability) of the slave device.

The display parameter may include one or more of a resolution, a frame rate, a display data encoding/decoding algorithm, and the like that are supported by the slave device. The display parameter may reflect a display capability of the slave device.

The camera parameter may include one or more of an image processing algorithm, a quantity of cameras, resolutions of the cameras, fields of view (field of view, FOV) of the cameras, and the like that are supported by the slave device. The camera parameter may reflect a photographing capability of the slave device.

For example, after determining the device parameter corresponding to the current service, the prediction perception module 21301 in the mobile phone may obtain the device parameter from a corresponding slave device by using a corresponding DMSDP HAL. For example, still as shown in FIG. 123, the prediction perception module 21301 may send an obtaining request to a slave device 1 by using a DMSDP HAL 1, the slave device 1 may send a device parameter of the slave device 1 to the DMSDP HAL 1 in the mobile phone in response to the obtaining request, and then the DMSDP HAL 1 sends the device parameter of the slave device 1 to the prediction perception module 21301. In this way, according to the foregoing method, the prediction perception module 21301 may obtain the device parameter corresponding to the current service from each slave device.

Subsequently, the prediction perception module 21301 may predict, based on the obtained device parameter, the service quality of executing the foregoing service by each slave device. For example, the prediction perception module 21301 may score, based on the device parameter of each slave device, the service quality of executing the foregoing service by the slave device. Further, the prediction perception module 21301 may recommend one or more slave devices that each have a relatively high score to the user as recommend devices. For example, the prediction perception module 21301 may report the determined recommended device to an app that is running the current service, and the app adds the recommended device to a prompt message, and displays the prompt message on a display interface.

In this way, the user may learn of a recommended device that is suitable for executing the foregoing service in a current distributed scenario, so as to switch, for execution, the current service to the recommended device determined by the prediction perception module 21301. This improves service quality when a plurality of devices collaboratively work in a distributed scenario, and improves user experience.

With reference to a specific scenario and an example, the following describes in detail a method for recommending a device to the user when the mobile phone recommends executing different services in a distributed scenario.

Figure 124:
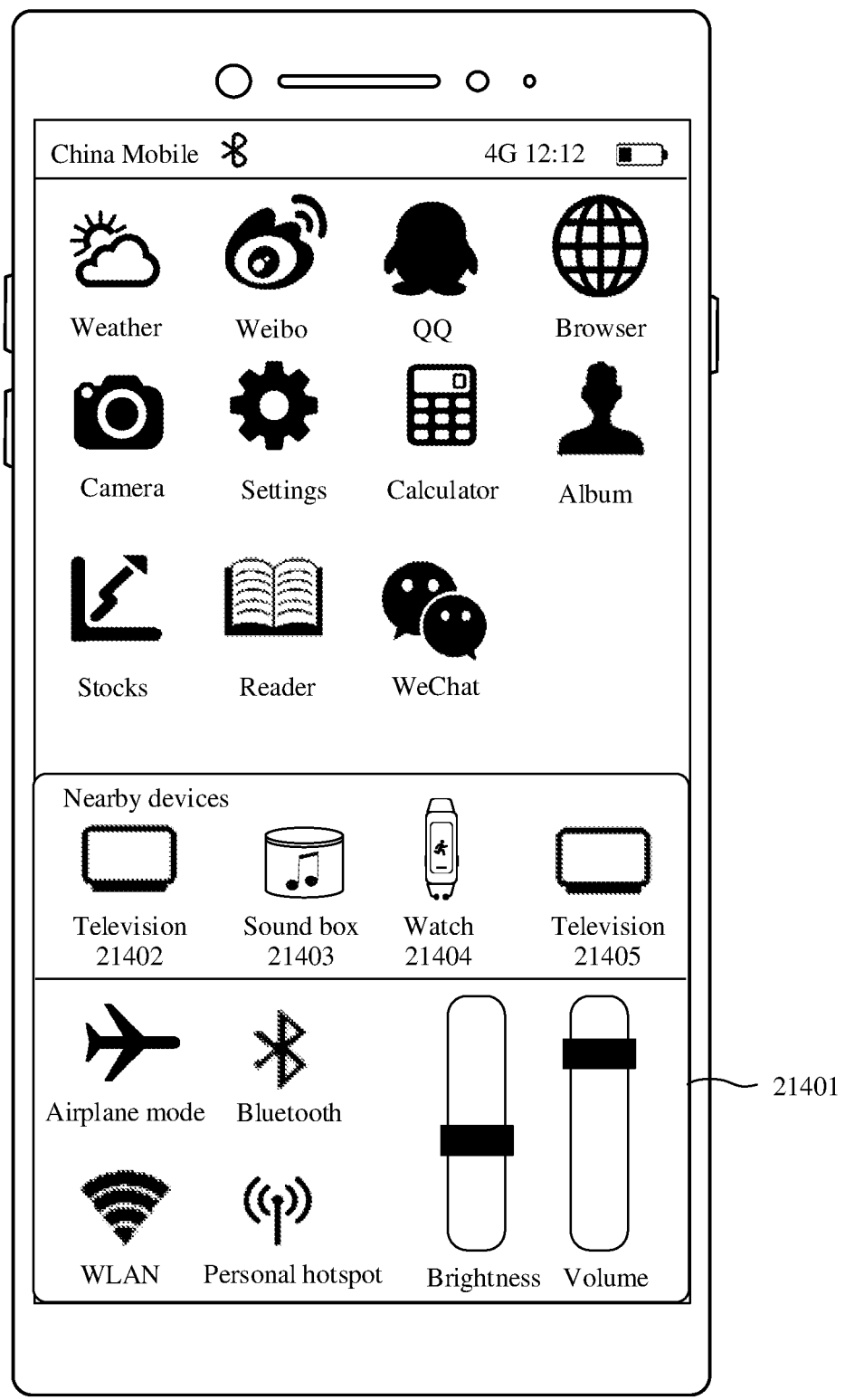

For example, the user may select one or more electronic devices from the mobile phone as slave devices of the mobile phone. For example, after detecting an operation that the user opens a control center, the mobile phone may detect an electronic device that currently accesses a same communications network as the mobile phone. For example, the mobile phone may search for one or more electronic devices that are located in a same Wi-Fi network as the mobile phone. For another example, the mobile phone may query a server for one or more electronic devices that log in to a same account (for example, a Huawei account) as the mobile phone. Further, as shown in FIG. 124, the mobile phone may display the one or more detected electronic devices in a control center 21401. In this case, the user may select one or more electronic devices in the control center 21401 as slave devices of the mobile phone.

Figure 125:
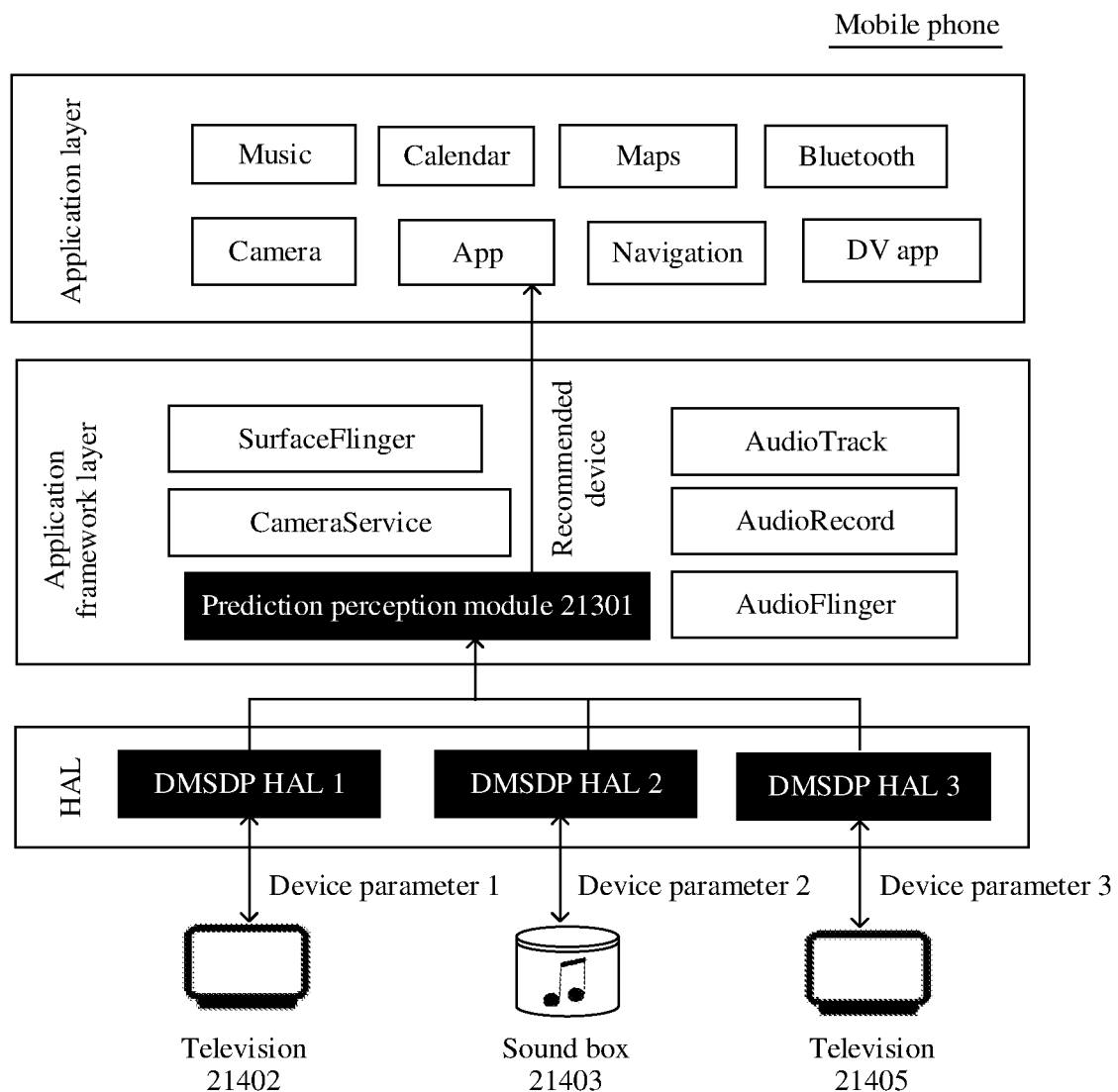

Still as shown in FIG. 124, the control center 21401 displays a television 21402, a sound box 21403, a watch 21404, and a television 21405 that are detected by the mobile phone. If it is detected that the user taps the television 21402, the DV app in the mobile phone may establish a network connection to the television 21402 by using the television 21402 as a slave device. Further, as shown in FIG. 125, the DV app in the mobile phone may obtain a capability parameter of the television 21402 from the television 21402 based on the network connection, for example, a photographing capability parameter, an audio capability parameter, and a display capability parameter of the television 21402. Subsequently, the DV app in the mobile phone may create a corresponding DMSDP HAL 1 at the HAL based on the capability parameter of the television 21402, so that the mobile phone can interact with the television 21402 by using the DMSDP HAL 1.

Similarly, if it is further detected that the user taps the sound box 21403, still as shown in FIG. 125, the mobile phone may obtain a capability parameter of the sound box 21403 according to the foregoing method, and create a corresponding DMSDP HAL 2 at the HAL based on the capability parameter of the sound box 21403. If it is further detected that the user taps the television 21405, the mobile phone may obtain a capability parameter of the television 21405 according to the foregoing method, and create a corresponding DMSDP HAL 3 at the HAL based on the capability parameter of the television 21405. In this way, the mobile phone may serve as a master device, and may interact with three slave devices, namely, the television 21402, the sound box 21403, and the television 21405, by using the corresponding DMSDP HALs, so as to implement various services in a distributed scenario.

A service executed by the mobile phone or the slave device generally relates to one or more of an audio function, a display function, or a camera function. For example, a service related to the audio function may include an audio play service, a recording service, a Karaoke service, a game service, a voice call service, or a video call service. For example, a service related to the display function may include a video play service, a video call service, or a game service. For another example, a service related to the camera function may include a photographing service, a video recording service, a live broadcast service, a code scanning service, or a video call service.

In this embodiment of this application, after the mobile phone establishes a network connection to the foregoing slave devices (for example, the television 21402, the sound box 21403, and the television 21405), the prediction perception module 21301 in the mobile phone may detect, in real time, a specific service (which may be referred to as a target service in the following embodiments) that is being executed by the mobile phone in a distributed scenario.

For example, the prediction perception module 21301 may obtain an identifier (for example, an application package name) of an application that is running on the mobile phone, and then determine, based on the identifier of the application, a target service that is being executed. For example, if the running application is Videos, the prediction perception module 21301 may determine that the target service is the video play service.

Alternatively, the prediction perception module 21301 may obtain a usage status of each component in the mobile phone, and determine, based on the usage status of the component, a target service that is being executed. For example, when the mobile phone is running WeChat, if a front-facing camera of the mobile phone is in a working state, the prediction perception module 21301 may determine that the target service is the video call service. Correspondingly, if a rear-facing camera of the mobile phone is in a working state, the prediction perception module 21301 may determine that the target service is the code scanning service.

Device parameters that affect service quality may be different for different running services. For example, for the audio play service, a quantity of horns of a device, a sound effect algorithm, and a mixing policy greatly affect service quality. For another example, for the live broadcast service, a device display resolution, a camera model, an image processing algorithm, and a latency greatly affect service quality.

Therefore, as shown in Table 21, the mobile phone may pre-store a correspondence between different services and associated device parameters. After determining the current target service, the prediction perception module 21301 in the mobile phone may determine, based on the correspondence shown in Table 21, a specific device parameter associated with the target service. Further, still as shown in FIG. 125, the prediction perception module 21301 in the mobile phone may obtain the device parameter associated with the target service from each slave device by using a corresponding DMSDP HAL.

TABLE 21

| Service | Device parameter |
| --- | --- |
| Service A | Device parameter A and device parameter B |
| Service B | Device parameter A, device parameter B, and device parameter C |
| . . . | . . . |

Figure 126:
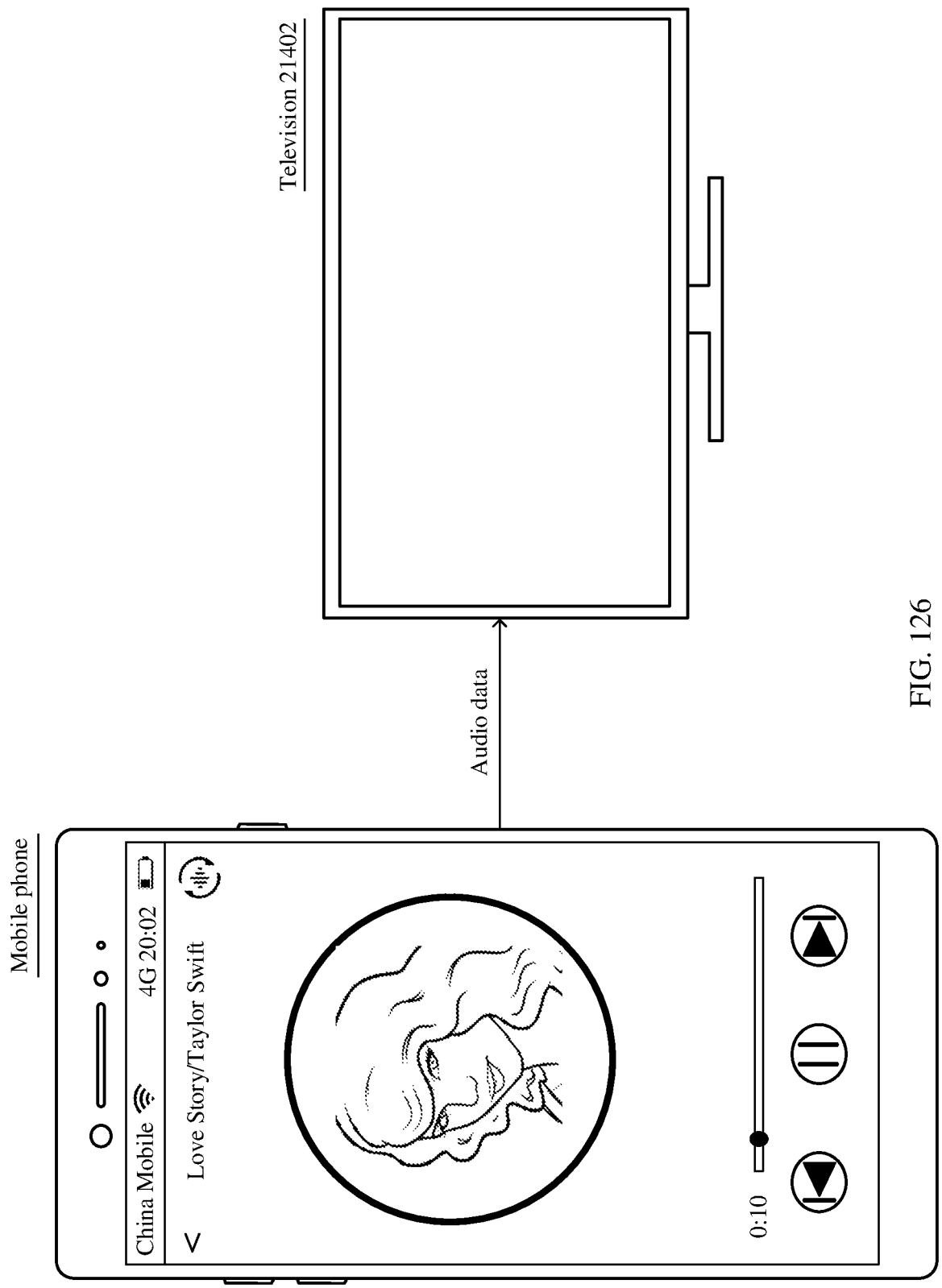

For example, the target service is the audio play service. As shown in FIG. 126, when the mobile phone runs Music and plays a song A, the user may switch, by using an audio switching function, the song A to the television 21402 for play. After identifying that the current target service is the audio play service, the prediction perception module 21301 in the mobile phone may determine, based on the correspondence shown in Table 21, that a device parameter related to the audio play service includes three audio parameters: the quantity of horns, the sound effect algorithm, and the mixing policy. Further, the prediction perception module 21301 in the mobile phone may invoke the DMSDP HAL 1 to obtain a device parameter 1 of the television 21402 from the television 21402, where the device parameter 1 includes a quantity of horns of the television 21402, a sound effect algorithm, and a mixing policy. In addition, the prediction perception module 21301 in the mobile phone may invoke the DMSDP HAL 2 to obtain a device parameter 2 of the sound box 21403 from the sound box 21403, where the device parameter 2 includes a quantity of horns of the sound box 21403, a sound effect algorithm, and a mixing policy. Likewise, the prediction perception module 21301 in the mobile phone may invoke the DMSDP HAL 3 to obtain a device parameter 3 of the television 21405 from the television 21405, where the device parameter 3 includes a quantity of horns of the television 21405, a sound effect algorithm, and a mixing policy.

Further, the prediction perception module 21301 in the mobile phone may predict, based on the obtained device parameter 1, device parameter 2, and device parameter 3, service quality of executing the audio play service by each slave device. For example, the mobile phone may pre-store a quality parameter corresponding to each device parameter in different services. For example, as shown in Table 22, for different services, a quality parameter corresponding to each device parameter associated with a service is preset, and each quality parameter may reflect a requirement of a corresponding service on a device parameter. For example, in the audio play service, two or more quality parameters corresponding to the quantity of horns may be set, which indicates that two or more horns can meet a service requirement of the audio play service. For another example, in the live broadcast service, a quality parameter corresponding to a latency may be set to be within 500 ms, which indicates that a latency within 500 ms can meet a service requirement of the live broadcast service.

TABLE 22

| Service | Quality parameter |
| --- | --- |
| Audio play service | Quantity of horns: two or more<br>Sound effect algorithm: Dolby sound effect and heavy bass sound effect<br>Audio mixing policy: policy 1 and policy 2 |
| Live broadcast service | Display resolution: resolution A and resolution B<br>Camera model: model A and model B<br>Image processing algorithm: algorithm 1, algorithm 2, and algorithm 3<br>Latency: within 500 ms |
| . . . | . . . |

Therefore, after obtaining the device parameter 1 from the television 21402, the prediction perception module 21301 in the mobile phone may predict, based on each quality parameter corresponding to the audio play service in Table 22, a service quality score 1 of executing the audio play service by the television 21402 by using the device parameter 1.

For example, the prediction perception module 21301 may score each device parameter in the device parameter 1 based on each quality parameter corresponding to the audio play service in Table 22, that is, determine a service quality score of each device parameter. For example, if the quantity of horns in the device parameter 1 is 0, a score F1 of the device parameter, namely, the quantity of horns, is 0; if the quantity of horns in the device parameter 1 is 2, the score F1 of the device parameter, namely, the quantity of horns, is 60; and if the quantity of horns in the device parameter 1 is 4, the score F1 of the device parameter, namely, the quantity of horns, is 80.

According to the foregoing scoring method, the prediction perception module 21301 may obtain the score F1 for scoring the quantity of horns in the device parameter 1, a score F2 for scoring the sound effect algorithm in the device parameter 1, and a score F3 for scoring the mixing policy in the device parameter 1. Further, the prediction perception module 21301 may calculate, based on the score F1, the score F2, and the score F3, the service quality score 1 of executing the audio play service by the television 21402 by using the device parameter 1. For example, the prediction perception module 21301 may calculate a weighted average of the score F1, the score F2, and the score F3 based on a preset weight, and use the calculated weighted average as the service quality score 1.

Similarly, after obtaining the device parameter 2 from the sound box 21403, the prediction perception module 21301 may predict, according to the foregoing method, a service quality score 2 of executing the audio play service by the sound box 21403 by using the device parameter 2. In addition, after obtaining the device parameter 3 from the television 21405, the prediction perception module 21301 may predict, according to the foregoing method, a service quality score 3 of executing the audio play service by the television 21405 by using the device parameter 3.

Figure 127:
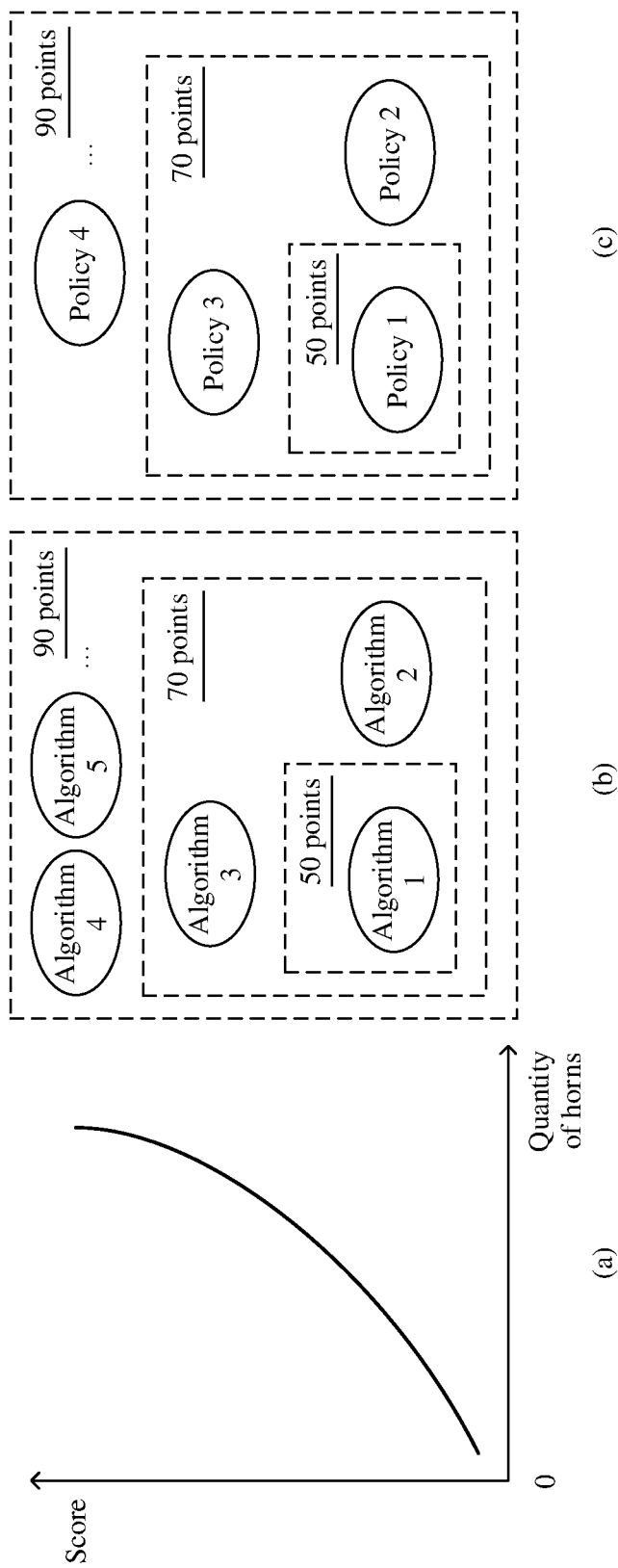

In some other embodiments, the mobile phone may alternatively pre-store a quality parameter scoring curve or scoring rule corresponding to each device parameter in different services. The audio play service is still used as an example. As shown in (a) in FIG. 127, in the audio play service, a correspondence between different quantities of horns and quality parameter scores is a curve 1. The prediction perception module 21301 may determine a score F1 of the device parameter, namely, the quantity of horns, in the device parameter 1 based on the curve 1. As shown in (b) in FIG. 127, a scoring rule 1 between different sound effect algorithms and quality parameter scores in the audio play service is presented. The prediction perception module 21301 may determine a score F2 of the device parameter, namely, the sound effect algorithm, in the device parameter 1 according to the scoring rule 1. Similarly, as shown in (c) in FIG. 127, a scoring rule 2 between different mixing policies and quality parameter scores in the audio play service is presented. The prediction perception module 21301 may determine a score F3 of the device parameter, namely, the mixing policy, in the device parameter 1 according to the scoring rule 2.

Further, the prediction perception module 21301 may calculate, based on the score F1, the score F2, and the score F3, the service quality score 1 of executing the audio play service by the television 21402 by using the device parameter 1. Certainly, the prediction perception module 21301 may further obtain, according to the foregoing method, a service quality score 2 of executing the audio play service by the sound box 21403 by using the device parameter 2 and a service quality score 3 of executing the audio play service by the television 21405 by using the device parameter 3.

After obtaining the service quality score 1, the service quality score 2, and the service quality score 3, the prediction perception module 21301 in the mobile phone may determine a recommended device corresponding to the current audio play service based on the service quality scores. For example, if the service quality score 2>the service quality score 1>the service quality score 3, it indicates that the service quality of executing the audio play service by the sound box 21403 is higher than the service quality of currently executing the audio play service by the television 21402, and therefore the prediction perception module 21301 may determine the sound box 21403 as a recommended device. In this case, still as shown in FIG. 125, the prediction perception module 21301 may report an identifier of the determined recommended device (that is, the sound box 21403) to the running app (that is, Music).

Figure 128:

Further, as shown in FIG. 128, Music may display a prompt message 21801 on a display interface 21801 based on the recommended device reported by the prediction perception module 21301. The prompt message 21801 is used to prompt the user to use the sound box 21403 with higher service quality to execute the current audio play service. For example, the prompt message 21801 may include an identifier 21802 of the sound box 21403. In this way, in a distributed scenario, the user may perceive, by using the prompt message 21801, service quality of executing a service by another slave device. Subsequently, if it is detected that the user taps the identifier 21802 of the sound box 21403, the mobile phone may switch the current audio play service to the sound box 21403 for continuing execution, and simultaneously stop continuing execution of the audio play service on the television 21402. This improves service quality of the audio play service.

In some embodiments, the prediction perception module 21301 in the mobile phone may alternatively determine a corresponding recommended device based on a service quality score of a device parameter. For example, if a score of the device parameter, namely, the mixing policy, of the sound box 21403 is higher than a score of a device parameter, namely, a mixing policy, of another slave device, and a score of the device parameter, namely, the sound effect algorithm, of the television 21402 is higher than a score of a device parameter, namely, a sound effect algorithm, of another slave device, it indicates that the sound box 21403 has a high mixing capability, and the television 21402 has a high sound effect processing capability for audio data. In this case, the prediction perception module 21301 may use the sound box 21403 as a recommended device, and notify Music that a mixing capability of the sound box 21403 is stronger than that of another slave device. Further, as shown in FIG. 129, Music may prompt, in a prompt message 21901, the user that the sound box 21403 has a stronger mixing capability in the audio play service. Certainly, Music may further prompt, in the prompt message 21901, the user that the television 21402 that currently plays audio data has a stronger sound effect processing capability.

In this way, in a distributed scenario, the user may perceive different service capabilities of different slave devices to execute a service, so as to selectively select a corresponding slave device to execute the service.

Alternatively, the prediction perception module 21301 may notify another app, for example, a system app such as a notification center app, of the determined recommended device (for example, the sound box 21403). The notification center app is used as an example. After the notification center app receives the identifier of the recommended device that is sent by the prediction perception module 21301, similar to FIG. 128 or FIG. 129, the notification center app may prompt, in a form of a notification message, the user to use the sound box 21403 with higher service quality to execute the current audio play service. This is not limited in this embodiment of this application.

Alternatively, the prediction perception module 21301 may notify the television 21402 that is executing the audio play service of the determined recommended device by using the corresponding DMSDP HAL 1. Further, as shown in FIG. 130, after obtaining the identifier of the recommended device that is sent by the mobile phone, the television 21402 may display a prompt message 22001, so as to prompt the user to use the sound box 21403 with higher service quality to execute the current audio play service. Subsequently, if the television 21402 detects that the user selects the identifier of the sound box 21403 in the prompt message 22001, the television 21402 may stop executing the audio play service. In addition, the television 21402 may send a service switching message to the mobile phone, so that the mobile phone can switch, in response to the service switching message, the current audio play service to the sound box 21403 for continuing execution. This improves service quality of the audio play service.

Certainly, if the prediction perception module 21301 determines that the television 21402 currently executing the audio play service is a device with highest service quality, the prediction perception module 21301 may notify Music that the television 21402 currently executing the audio play service is an optimal device. In this case, the mobile phone or the television 21402 may not recommend another device to the user to execute the audio play service.

In some other embodiments, in addition to the service quality score of executing the audio play service by each slave device (such as the television 21402, the sound box 21403, and the television 21405), the prediction perception module 21301 in the mobile phone may further predict a service quality score of executing the audio play service by the mobile phone.

For example, the prediction perception module 21301 in the mobile phone may further obtain a device parameter 4 associated with the current audio play service, that is, a quantity of horns in the mobile phone, a sound effect algorithm, and a mixing policy. Further, the prediction perception module 21301 may predict, according to the foregoing method, a service quality score 4 of executing the audio play service by the mobile phone by using the device parameter 4. Subsequently, the prediction perception module 21301 may determine a currently recommended device based on the service quality score 4 and the service quality score corresponding to each slave device. In other words, the master device (that is, the mobile phone) may also be used as a candidate device of the recommended device. When service quality of executing the target service (for example, the audio play service) by the master device is high, the user may also be prompted to use the master device to execute the target service.

The foregoing embodiment is described by using the audio play service as an example. It can be understood that, when the mobile phone executes another service related to the audio function in the distributed scenario, a recommended device that executes the another service with higher service quality may also be recommended to the user according to the foregoing method.

For example, as shown in FIG. 131, when the mobile phone runs Videos, in response to a projection operation of the user, the mobile phone may project a video B played in Videos to the television 21402 for play. During projection, the mobile phone may send display data of the video B to the television 21402 by using the DMSDP HAL 1, and the mobile phone may simultaneously send audio data of the video B to the television 21402 by using the DMSDP HAL 1.

In addition, during projection, the prediction perception module 21301 in the mobile phone may identify that the current target service is the video play service. Further, the prediction perception module 21301 may determine a device parameter associated with the video play service based on the correspondence shown in Table 21. For example, the device parameter associated with the video play service may include a display parameter related to the display function, such as a display resolution, and may further include an audio parameter related to the audio function, such as a quantity of microphones and a sound effect algorithm.

An example in which slave devices of the mobile phone include the television 21402, the sound box 21403, and the television 21405 is still used. After determining the device parameter associated with the video play service, the prediction perception module 21301 in the mobile phone may obtain the device parameter associated with the video play service from each slave device by using a corresponding DMSDP HAL. Further, the prediction perception module 21301 may predict, according to the method in the foregoing embodiment and based on the obtained device parameter, a service quality score of executing the video play service by each slave device, and determine a corresponding recommended device based on the service quality score of executing the video play service by each slave device.

For example, if a service quality score of executing the video play service by the television 21405 is higher than a service quality score of executing the video play service by the television 21402, and the service quality score of executing the video play service by the television 21405 is higher than a service quality score of executing the video play service by the sound box 21403, the prediction perception module 21301 may determine the television 21405 as a recommended device for currently executing the video play service.

Further, as shown in (a) in FIG. 132, the prediction perception module 21301 may notify Videos that the currently recommended device is the television 21405, so that Videos can display a prompt message 22201 on a display interface, so as to prompt the user to use the television 21405 with higher service quality to execute the current video play service. The prompt message 22201 may include an identifier of the television 21405. If it is detected that the user taps the identifier of the television 21405, the mobile phone may switch the current video play service to the television 21405 for continuing execution, and simultaneously stop continuing execution of the video play service on the television 21402. This improves service quality of the current video play service.

Alternatively, as shown in (b) in FIG. 132, the prediction perception module 21301 may notify the television 21402 that is executing the video play service of the determined recommended device by using the corresponding DMSDP HAL 1. After determining that the recommended device for currently executing the video play service is the television 21405, the television 21402 may display a prompt message 22202, so as to prompt the user to use the television 21405 with higher service quality to execute the current video play service. Similarly, if the television 21402 detects that the user selects the identifier of the television 21405 in the prompt message 22202, the television 21402 may stop executing the video play service. In addition, the television 21402 may send a service switching message to the mobile phone, so that the mobile phone can switch, in response to the service switching message, the current video play service to the television 21405 for continuing execution. This improves service quality of the audio play service.

Certainly, if the prediction perception module 21301 determines that the television 21402 currently executing the video play service is a device with highest service quality, the prediction perception module 21301 may notify Videos that the television 21402 currently executing the video play service is an optimal device. In this case, the mobile phone or the television 21402 may not recommend another device to the user to execute the video play service.

In some other embodiments, the prediction perception module 21301 in the mobile phone may alternatively determine, based on service quality scores of different device parameters in different slave devices, that a plurality of slave devices execute the current video play service (that is, the target service). In this case, the prediction perception module 21301 determines that there may be a plurality of recommended devices.

For example, the prediction perception module 21301 may obtain a device parameter 1 associated with the video play service from the television 21402. The device parameter 1 includes an audio parameter and a display parameter of the television 21402. Likewise, the prediction perception module 21301 may obtain a device parameter 2 associated with the video play service from the sound box 21403. The device parameter 2 includes an audio parameter and a display parameter of the sound box 21403. If a service quality score of the prediction perception module 21301 for the display parameter in the device parameter 1 is higher than a service quality score for the display parameter in the device parameter 2, it indicates that a display capability of the television 21402 is stronger than a display capability of the sound box 21403. If a service quality score of the prediction perception module 21301 for the audio parameter in the device parameter 2 is higher than a service quality score for the audio parameter in the device parameter 1, it indicates that an audio capability of the sound box 21403 is stronger than a display capability of the television 21402.

In this case, the prediction perception module 21301 may determine both the sound box 21403 and the television 21402 as recommended devices. The television 21402 may be configured to execute a first subtask related to the display function in the video play service, and the sound box 21403 may be configured to execute a second subtask related to the audio function in the video play service. Further, the prediction perception module 21301 may notify Videos in the mobile phone that the television 21402 is a recommended device for executing the first subtask and the sound box 21403 is a recommended device for executing the second subtask. Further, as shown in FIG. 133, Videos may display a prompt message 22301 based on the recommended device notified by the prediction perception module 21301. The prompt message 22301 may be used to prompt the user to use a device group "television 21402+sound box 21403" to collaboratively execute the video play service, so that the user can enjoy optimal video play service quality.

Subsequently, if it is detected that the user selects an "OK" button 22302 in the prompt message 22301, the mobile phone may switch, to the television 21402 for play, the display data in the video B that is being played (that is, switch the first subtask in the video play service to the television 21402), and simultaneously switch the audio data in the video B to the sound box 21403 for play (that is, switch the second subtask in the video play service to the sound box 21403), so as to improve service quality of the video play service through multi-device collaboration.

In other words, a master device (for example, the mobile phone) may divide a current target service into a plurality of subtasks, and then determine an optimal recommended device for each subtask based on a device parameter of each slave device, so that the target service is distributed to a plurality of recommended devices for execution, so as to improve service quality of the target service through multi-device collaboration.

The mobile phone may recommend a corresponding recommended device based on a device parameter of a slave device in the audio play service and the video play service. When the mobile phone executes the service related to the camera function, the mobile phone may also recommend a recommended device with higher service quality to the user according to the foregoing method.

For example, when the mobile phone runs WeChat, the user may enable a video call function of WeChat to make a video call with a contact (for example, a contact Sam). As shown in FIG. 134, in a video call process, the mobile phone may collect image data by using a camera of the television 21402, and the mobile phone may display a video call interface by using a display of the television 21402. In this case, the mobile phone may obtain, by using the DMSDP HAL 1, the image data collected by the camera of the television 21402, and the mobile phone may send, by using the DMSDP HAL 1, display data of the video call interface to the television 21402 for display.

In the video call process, the prediction perception module 21301 in the mobile phone may identify that the current target service is the video call service. Further, the prediction perception module 21301 may determine a device parameter associated with the video call service based on the correspondence shown in Table 21. For example, the device parameter associated with the video call service may include a display parameter related to the display function, such as a display resolution, may further include an audio parameter related to the audio function, such as a quantity of microphones and a sound effect algorithm, may further include a camera parameter related to the camera function, such as a quantity of cameras, and may further include a parameter such as a latency.

An example in which slave devices of the mobile phone include the television 21402, the sound box 21403, and the television 21405 is still used. After determining the device parameter associated with the video call service, the prediction perception module 21301 in the mobile phone may obtain the device parameter associated with the video call service from each slave device by using a corresponding DMSDP HAL. Further, the prediction perception module 21301 may predict, according to the method in the foregoing embodiment, a service quality score of executing the video call service by each slave device, and determine a recommended device based on the service quality score of executing the video call service by each slave device.

For example, if a service quality score of executing the video call service by the television 21405 is higher than a service quality score of executing the video call service by the television 21402, and the service quality score of executing the video call service by the television 21405 is higher than a service quality score of executing the video call service by the sound box 21403, the prediction perception module 21301 may determine the television 21405 as a recommended device for currently executing the video call service.

Further, as shown in (a) in FIG. 135, the prediction perception module 21301 may notify WeChat that the current recommended device is the television 21405, so that WeChat can display a prompt message 22501 on a display interface, so as to prompt the user to use the television 21405 with higher service quality to execute the current video call service. Alternatively, as shown in (b) in FIG. 135, the prediction perception module 21301 may notify the television 21402 that is executing the video call service of the determined recommended device by using the corresponding DMSDP HAL 1, and the television 21402 displays a prompt message 22502, so as to prompt the user to use the television 21405 with higher service quality to execute the current video call service.

In addition, for a service having a high real-time requirement, such as the video call service, the live broadcast service, or the Karaoke service, the prediction perception module 21301 in the mobile phone may alternatively predict a latency required for executing the corresponding service, and recommend a corresponding recommended device based on the predicted latency. In other words, for the service having a high real-time requirement, the latency required by each device to execute the service may be used as a criterion for determining quality of the service. For example, when calculating a service quality score of executing the service by each device, the mobile phone may set a weight value of the device parameter, namely, the latency, to 1. In this case, service quality of a current service completely depends on the device parameter, namely, the latency.

The video call service is still used as an example. After identifying that the current target service is the video call service, the prediction perception module 21301 in the mobile phone may obtain a network latency between the mobile phone and each slave device and a processing latency of executing the video call service by each slave device. In this way, in a distributed scenario, a latency of executing the video call service by each slave device is a sum of a network latency and a processing latency.

For example, the network connection between the television 21402 and the mobile phone is a Wi-Fi connection. The prediction perception module 21301 in the mobile phone may invoke Wi-Fi HAL to detect a network latency L1 between the mobile phone and the television 21402. In addition, the prediction perception module 21301 may obtain, from the television 21402 by using the DMSDP HAL 1, a processing latency L12 of executing the video call service by the television 21402. Further, the prediction perception module 21301 may calculate a latency of executing the video call service by the television 21402: L1=L11+L12. Similarly, the prediction perception module 21301 may further calculate, according to the foregoing method, a latency L2 of executing the video call service by the sound box 21403 and a latency L3 of executing the video call service by the television 21405.

For example, if a quality parameter of the latency in the video call service is set to be within 500 ms in Table 22, it indicates that the latency within 500 ms can meet a service quality requirement of the video call service. Therefore, if the prediction perception module 21301 in the mobile phone learns, through calculation, that the latency L1 of executing the video call service by the television 21402 is greater than 500 ms and the latency L3 of executing the video call service by the television 21405 is less than 500 ms, the prediction perception module 21301 may determine the television 21405 as a recommended device of the current video call service. In this case, as shown in FIG. 136, the prediction perception module 21301 may notify WeChat that the currently recommended device is the television 21405, so that WeChat displays a prompt message 22601 on a display interface based on the recommended device, so as to prompt the user to use the television 21405 with a lower latency to execute the current video call service. Certainly, the foregoing prompt message may be displayed on the television 21402 that is executing the video call service. This is not limited in this embodiment of this application.

In some embodiments, when the latency L1 of executing the video call service by the television 21402 is greater than 500 ms, the prediction perception module 21301 in the mobile phone may further analyze a specific reason that the latency L1 exceeds 500 ms. For example, if the latency L1 exceeds 500 ms because the network latency L11 between the television 21402 and the mobile phone is greater than a threshold 1, it indicates that a current network status is poor, and a latency of interaction with each slave device is long. In this case, the prediction perception module 21301 may determine the mobile phone as a recommended device for executing the current video call service. In this case, as shown in FIG. 137(a), the prediction perception module 21301 may indicate WeChat in the mobile phone (or the television 21402) to display a prompt message 22701, so as to prompt the user in the prompt message 22701 that the current network status is poor, and advise the user using the mobile phone to execute the current video call service.

Alternatively, if the latency L1 exceeds 500 ms because the processing latency L12 of executing the video call service by the television 21402 is greater than a threshold 2, the prediction perception module 21301 may simplify a processing process of executing the video call service by the television 21402. For example, the prediction perception module 21301 may determine a video call policy 1, and in the video call policy 1, the television 21402 does not need to perform sound effect processing on audio data. For another example, the prediction perception module 21301 may determine a video call policy 2, and in the video call policy 2, the television 21402 may perform encoding/decoding processing on display data by using a specified encoding/decoding algorithm. Further, as shown in FIG. 137(b), the prediction perception module 21301 may indicate WeChat in the mobile phone (or the television 21402) to display a prompt message 22702 according to the determined video call policy, so as to prompt the user in the prompt message 22702 to simplify a processing process of executing the video call service by the television 21402. This shortens a latency of executing the video call service. Subsequently, if it is detected that the user selects an "OK" button in the prompt message 22702, the prediction perception module 21301 may send the video call policy to the television 21402 by using the corresponding DMSDP HAL 1, so that the television 21402 can simplify, according to the video call policy, the processing process of executing the video call service. This shortens a latency of the entire video call service, and improves service quality of the video call service.

Certainly, after determining the video call policy for simplifying the processing process of the video call service, the prediction perception module 21301 in the mobile phone may alternatively directly send the video call policy to the television 21402, so that the television 21402 can simplify, according to the video call policy, the processing process of executing the video call service. In this case, the mobile phone (or the television 21402) may display a prompt message, so as to prompt the user that the processing process of the video call service has been simplified. This shortens a latency of the entire video call service Alternatively, if the network latency L11 between the television 21402 and the mobile phone is greater than the threshold 1, and the processing latency L12 of executing the video call service by the television 21402 is greater than the threshold 2, the prediction perception module 21301 may select, as a recommended device from other slave devices, a slave device whose latency of executing the video call service is less than 500 ms. Further, similar to FIG. 136, the prediction perception module 21301 may indicate WeChat in the mobile phone (or the television 21402) to display a corresponding prompt message, so as to prompt the user to execute the current video call service by using an electronic device with a shorter time.

The foregoing embodiment is described by using an example in which the mobile phone serves as a master device and recommends, to the user in a process of collaboratively executing a service with a slave device, a recommended device that is more suitable for executing the service. In some other embodiments, when detecting that the mobile phone serves as a master device and executes a service, the mobile phone may alternatively recommend, to the user in advance, a recommended device that is more suitable for executing the service.

An example in which slave devices of the mobile phone include the television 21402, the sound box 21403, and the television 21405 is still used. As shown in FIG. 138(a), a "Project" button 22802 may be disposed in a pull-down menu 22801 of the mobile phone. If it is detected that the user taps the "Project" button 22802, it indicates that the mobile phone enables a projection function and prepares to perform a projection service (for example, a video play service). In this case, the prediction perception module 21301 in the mobile phone may obtain a device parameter associated with the projection service from each slave device according to the method in the foregoing embodiment, predict, based on the obtained device parameter, a service quality score of executing the projection service by each slave device, and then recommend a corresponding recommended device to the user based on the predicted service quality score.

For example, when the prediction perception module 21301 predicts that a service quality score 1 of executing the projection service by the television 21405 is higher than a service quality score 2 of executing the projection service by the television 21402, and the service quality score 2 of executing the projection service by the television 21402 is higher than a service quality score 3 of executing the projection service by the sound box 21403, it indicates that service quality of executing the projection service by the three slave devices, namely, the television 21405, the television 21402, and the sound box 21403, sequentially decreases. Therefore, as shown in FIG. 138(b), in response to an operation that the user taps the "Project" button 22802, the mobile phone may display a device list 222803. In the device list 222803, the mobile phone may sort the slave devices in descending order of service quality scores of executing the projection service. The user may select, in the device list 222803, a slave device to which content in the mobile phone is to be projected for play. The foregoing sorting order may recommend the user to use a device with a high service quality score to execute the current projection service, so as to improve service quality of a subsequent projection service.

Alternatively, the prediction perception module 21301 in the mobile phone may predict, based on the obtained device parameter, specific service quality of executing the projection service by different slave devices. For example, the prediction perception module 21301 may predict, based on the device parameter of the television 21402, that audio-to-video asynchronization may occur when the television 21402 executes the projection service. For another example, the prediction perception module 21301 may predict, based on the device parameter of the sound box 21403, that display data cannot be displayed when the sound box 21403 executes the projection service. Further, as shown in FIG. 139, in response to an operation that the user taps the "Project" button 22802, the mobile phone may display a device list 222803. In the device list 222803, the mobile phone may prompt the user with specific service quality of executing the current projection service by each slave device, that is, notify the user of a specific reason that a device is recommended or not recommended executing the projection service.

In other words, in a distributed scenario, before executing a service, the mobile phone serving as a master device may predict specific service quality of executing the service when the service is switched to each slave device, so that the user is notified of a slave device with good service quality while the user selects a slave device to execute the service. In this way, the mobile phone may recommend, to the user before collaborating with a plurality of devices, a recommended device that is suitable for executing a current service, so as to help the user switch the current service to the recommended device for execution. This improves service quality during multi-device collaboration in the distributed scenario, and improves user experience.

Currently, as shown in FIG. 140, when ultrasonic positioning is performed indoors, a plurality of ultrasonic receivers 23001 need to be installed, and the ultrasonic receivers 23001 each may be connected to a controller (not shown in the figure). An electronic device 23002 transmits an ultrasonic signal after enabling a positioning function. After the ultrasonic receivers 23001 at different locations each receive the ultrasonic signal sent by the electronic device 23002, the controller may perform positioning on the electronic device 23002 based on a time of arrival (Time of Arrival, TOA) or a time difference of arrival (Time Difference Of Arrival, TDOA) of the ultrasonic signal at each of different ultrasonic receivers 23001. In this positioning scenario, a user needs to purchase and install a component such as the ultrasonic receiver 23001, so as to perform positioning on the electronic device 23002. An operation process is complex, and implementation costs are high.

In this embodiment of this application, a plurality of ultrasonic receivers may be disposed on a master device. For example, the plurality of ultrasonic receivers may be a plurality of microphones in a microphone array, and each microphone may be configured to collect an ultrasonic signal. An ultrasonic generator may be disposed on a slave device. For example, the ultrasonic generator may be a speaker, and the speaker may be configured to transmit an ultrasonic signal. The master device may be configured to perform positioning on the slave device by using an ultrasonic signal.

An example in which the mobile phone is a master device is still used. A plurality of ultrasonic receivers of the mobile phone may be disposed inside the mobile phone, or a plurality of ultrasonic receivers may be assembled outside the mobile phone. In some scenarios, the user may enter, into the mobile phone, an instruction for querying a location of a device near the mobile phone. For example, as shown in FIG. 141, a button 23102 for querying a nearby device is disposed in a control center 23101 of the mobile phone. If it is detected that the user taps the button 23102, the mobile phone may obtain an electronic device that currently accesses a same communications network as the mobile phone. For example, the mobile phone may search for one or more electronic devices that are located in a same Wi-Fi network as the mobile phone. For another example, the mobile phone may query a server for one or more electronic devices that log in to a same account (for example, a Huawei account) as the mobile phone.

For example, the mobile phone, the television, the sound box 1, and the sound box 2 are located in a same communications network. After finding the television, the sound box 1, and the sound box 2, the mobile phone may use the television, the sound box 1, and the sound box 2 as slave devices, and perform positioning on the slave devices, to determine locations of the television, the sound box 1, and the sound box 2 (that is, the slave devices) near the mobile phone.

In some embodiments, the mobile phone may separately send a positioning instruction to the television, the sound box 1, and the sound box 2. After receiving the positioning instruction, in response to the positioning instruction, the television may transmit an ultrasonic signal 1 by using an ultrasonic generator. Each of a plurality of microphones in a microphone array in the mobile phone may receive the ultrasonic signal 1. Further, the mobile phone may calculate, by using a TDOA algorithm, a positioning result 1, that is, a location of the television, based on a time at which each microphone in the microphone array receives the ultrasonic signal 1. The ultrasonic generator may be a speaker. In this way, a slave device such as the television does not need to additionally add an ultrasonic generator to adapt to an ultrasonic positioning method provided in this embodiment of this application. Likewise, an ultrasonic receiver configured to receive an ultrasonic signal in a master device such as the mobile phone may be a microphone of the mobile phone, so that the mobile phone does not need to additionally add an ultrasonic receiver neither to adapt to the ultrasonic positioning method provided in this embodiment of this application. This reduces implementation costs and difficulty of indoor positioning.

Similarly, after receiving the positioning instruction, in response to the positioning instruction, the sound box 1 may transmit an ultrasonic signal 2 by using an ultrasonic generator (for example, a speaker). Each of the plurality of microphones in the microphone array in the mobile phone may receive the ultrasonic signal 2. Further, the mobile phone may calculate, by using the TDOA algorithm, a positioning result 2, that is, a location of the sound box 1, based on a time at which each microphone in the microphone array receives the ultrasonic signal 2.

Similarly, after receiving the positioning instruction, in response to the positioning instruction, the sound box 2 may transmit an ultrasonic signal 3 by using an ultrasonic generator (for example, a speaker). Each of the plurality of microphones in the microphone array in the mobile phone may receive the ultrasonic signal 3. Further, the mobile phone may calculate, by using the TDOA algorithm, a positioning result 3, that is, a location of the sound box 2, based on a time at which each microphone in the microphone array receives the ultrasonic signal 3.

Subsequently, as shown in FIG. 142, the mobile phone may display a positioning interface 23201 based on the positioning result 1, the positioning result 2, and the positioning result 3 that are obtained through calculation. The positioning interface 23201 presents a location relationship between the mobile phone and each of the television, the sound box 1, and the sound box 2, so that the user can intuitively view a location relationship between the mobile phone and each nearby device.

In some other embodiments, an example in which the mobile phone is a master device, the television, the sound box 1, and the sound box 2 are slave devices, and the master device performs positioning on the slave device is still used. First, the mobile phone may select one slave device from the television, the sound box 1, and the sound box 2 as a collaboration device. Subsequently, the collaboration device may collaborate with the mobile phone to complete positioning on another slave device. For example, the mobile phone may use a device with a strong positioning capability in the television, the sound box 1, and the sound box 2 as a collaboration device. For example, the television is a collaboration device. The mobile phone may first perform positioning on the television, to obtain a relative location relationship between the mobile phone and the television, that is, to obtain a first positioning result. For example, the mobile phone may send a positioning instruction to the television, and in response to the positioning instruction, the television may transmit an ultrasonic signal 1 by using an ultrasonic generator such as a speaker. Each of a plurality of microphones in a microphone array in the mobile phone may receive the ultrasonic signal 1. Therefore, the mobile phone may calculate, by using a TDOA algorithm, a location relationship between the mobile phone and the television based on a time at which each microphone in the microphone array receives the ultrasonic signal 1.

Further, the mobile phone may send a positioning instruction to another slave device, and the mobile phone may indicate the television to enable a positioning function to collaborate with the mobile phone to perform positioning on the another slave device. For example, the mobile phone may send a positioning instruction to the sound box 1, and send a collaborative positioning instruction to the television. As shown in FIG. 143, in response to the positioning instruction sent by the mobile phone, the sound box 1 may transmit an ultrasonic signal 2. In response to the collaborative positioning instruction sent by the mobile phone, the television may enable a microphone array in the television, and receive the ultrasonic signal 2 by using a plurality of microphones in the microphone array in the television. In addition, the mobile phone may also receive the ultrasonic signal 2 by using the plurality of microphones in the microphone array in the mobile phone.

In an implementation, the television may send ultrasonic data (for example, the ultrasonic data may include information such as a waveform of the ultrasonic signal 2 received by each microphone and a time of arrival of the ultrasonic signal 2) detected by the television to the mobile phone. In this way, the mobile phone may obtain ultrasonic data (that is, first ultrasonic data) detected by the microphone array in the mobile phone, and may also obtain the ultrasonic data (that is, second ultrasonic data) detected by the microphone array in the television. After the mobile phone has determined the location relationship between the mobile phone and the television, the mobile phone may use the microphone array in the television as a part of the microphone array in the mobile phone. Therefore, the mobile phone may use all microphones in the mobile phone and the television as a complete microphone array, and calculate a location of the sound box 1 based on the first ultrasonic data and the second ultrasonic data.

In another implementation, after each microphone in the microphone array in the television detects the ultrasonic signal 2, the television may calculate an ultrasonic positioning result (that is, a first ultrasonic positioning result) of the sound box 1 based on a time at which the ultrasonic signal 2 arrives at each microphone. In addition, the television may also send the first ultrasonic positioning result to the mobile phone. After each microphone in the microphone array in the mobile phone detects the ultrasonic signal 2, the mobile phone may also calculate a positioning result (that is, a second ultrasonic positioning result) of the sound box 1 based on a time at which the ultrasonic signal 2 arrives at each microphone. After receiving the first ultrasonic positioning result sent by the television, the mobile phone further corrects, based on the first ultrasonic positioning result, the second ultrasonic positioning result calculated by the mobile phone, and finally determines the location of the sound box 1.

In the foregoing scenario in which the mobile phone collaborates with the television to perform positioning on the sound box 1, the ultrasonic signal 2 transmitted by the sound box 1 may be received by each microphone in the mobile phone and the television 1, so that a quantity of microphones for detecting the ultrasonic signal 2 increases. This implements higher accuracy of a positioning result calculated by the mobile phone based on a time at which the ultrasonic signal 2 arrives at each microphone. In addition, the microphones for detecting the ultrasonic signal 2 are at different locations in the mobile phone and the television, so that the mobile phone can perform positioning on the sound box 1 based on the ultrasonic signals 2 detected in a plurality of directions. This can also improve positioning accuracy of the sound box 1.

The foregoing embodiment is described by using an example in which the mobile phone collaborates with the television to perform positioning on the sound box 1. It can be understood that the mobile phone and the television may also perform positioning on the sound box 2 according to the foregoing method, to obtain a location of the sound box 2. Certainly, if the slave device of the mobile phone further includes another device, the mobile phone may further perform positioning on the another device according to the foregoing method. This is not limited in this embodiment of this application.

Finally, similar to the positioning interface 401 shown in FIG. 142, the mobile phone (that is, a master device) may present a location relationship between the mobile phone and each slave device to the user based on a positioning result of each slave device, so that the user can intuitively view a location relationship between the mobile phone and each nearby device.

It can be learned that, in this embodiment of this application, a master device may simultaneously enable, through multi-device collaboration by using an existing ultrasonic positioning capability (for example, a capability of transmitting an ultrasonic signal by a speaker or a capability of receiving an ultrasonic signal by a microphone) in an electronic device, microphones of a plurality of devices to receive ultrasonic signals sent by a slave device, so as to perform positioning on the slave device. This improves positioning accuracy of a slave device, simplifies an operation process of indoor positioning, and reduces implementation costs of indoor positioning.

An example in which the mobile phone is a master device is still used. Based on the architecture of the Android system shown in FIG. 6, as shown in FIG. 144, one or more audio function modules such as AudioRecord, AudioTrack, AudioFlinger, and an ultrasonic processing module are disposed at the application framework layer of the mobile phone.

For example, the mobile phone may have a capability of receiving an ultrasonic signal. For example, AudioRecord may obtain, from AudioFlinger, an ultrasonic signal recorded by a component such as a microphone of the mobile phone. When the mobile phone is provided with a plurality of microphones (that is, a microphone array), AudioFlinger may receive a plurality of channels of ultrasonic signals reported by the plurality of microphones. In this case, the ultrasonic processing module may combine the plurality of channels of ultrasonic signals in AudioFlinger and then send a combined signal to AudioRecord, and AudioRecord may report the recorded ultrasonic signal to an application such as a positioning application.

For example, the mobile phone may have a capability of transmitting an ultrasonic signal. For example, AudioTrack may invoke AudioFlinger in response to an instruction of an application such as a positioning application, and control, by using AudioFlinger, a component such as a speaker of the mobile phone to transmit an ultrasonic signal.

Still as shown in FIG. 144, the HAL of the mobile phone provides HALs corresponding to different hardware modules in the mobile phone, for example, an audio HAL, a camera HAL, and a Wi-Fi HAL.

The Audio HAL may correspond to an ultrasonic receiver such as a microphone through an ultrasonic driver at the kernel layer. When the mobile phone is provided with a plurality of microphones, the plurality of microphones respectively correspond to a plurality of ultrasonic drivers at the kernel layer. Each microphone may report a received ultrasonic signal to the audio HAL by using a corresponding ultrasonic driver. The Audio HAL may report the plurality of channels of received ultrasonic signals to AudioFlinger, and AudioFlinger sends the received ultrasonic signals to the ultrasonic processing module.

For example, after receiving N channels of ultrasonic signals, the ultrasonic processing module may combine the N channels of ultrasonic signals into one group of ultrasonic data. The ultrasonic data may include information such as a waveform of each channel of ultrasonic signal and a time at which each channel of ultrasonic signal arrives at a corresponding microphone. Further, the ultrasonic processing module may determine, based on the ultrasonic data by using a TOA algorithm or a TDOA algorithm, a positioning result of a device (for example, a slave device 1) that transmits the ultrasonic signal. Subsequently, the ultrasonic processing module may report the current positioning result to the positioning application by using AudioRecord.

Alternatively, after combining the N channels of ultrasonic signals into one group of ultrasonic data, the ultrasonic processing module may report the ultrasonic data to the positioning application by using AudioRecord. Further, the positioning application may determine, based on the ultrasonic data, a positioning result of a device (for example, a slave device 1) that transmits the ultrasonic signal. This is not limited in this embodiment of this application.

In this embodiment of this application, as shown in FIG. 145, the mobile phone may create a DMSDP HAL corresponding to a slave device (for example, the slave device 1) at the HAL. The DMSDP HAL corresponds to the slave device 1 currently connected to the mobile phone. The mobile phone may serve as a master device to receive data from and send data to the slave device 1 by using the DMSDP HAL, and use the slave device 1 as a virtual device of the mobile phone to collaborate with the slave device 1 to complete each service in a distributed scenario.

For example, when a location relationship between the mobile phone and the slave device 1 is fixed, if the mobile phone needs to perform positioning on another slave device (for example, a slave device 2), the mobile phone may send a positioning instruction to the slave device 2, so that the slave device 2 transmits, in response to the positioning instruction, an ultrasonic signal by using an ultrasonic generator such as a speaker. In addition, the mobile phone may send a collaborative positioning instruction to the slave device 1, so that the slave device 1 enables, in response to the collaborative positioning instruction, a microphone array in the slave device 1 to receive the ultrasonic signal.

Still as shown in FIG. 145, each of N microphones in the mobile phone may be configured to receive the ultrasonic signal transmitted by the slave device 2, that is, the mobile phone may collect N channels of ultrasonic signals (that is, first ultrasonic data). Each of the N microphones may report the collected ultrasonic signal to the audio HAL, so that the audio HAL obtains the N channels of ultrasonic signals. The Audio HAL may report the obtained N channels of ultrasonic signals to the ultrasonic processing module by using AudioFlinger.

In addition, still as shown in FIG. 145, after the slave device 1 enables a microphone array in the slave device 1, each of M microphones in the microphone array may also be configured to receive the ultrasonic signal transmitted by the slave device 2, that is, the slave device 1 may collect M channels of ultrasonic signals (that is, second ultrasonic data). Therefore, the slave device 1 may send the collected M channels of ultrasonic signals to AudioFlinger in the mobile phone by using the DMSDP HAL in the mobile phone, and then AudioFlinger reports the M channels of ultrasonic signals to the ultrasonic processing module.

In this way, the ultrasonic processing module in the mobile phone may obtain the N channels of ultrasonic signals (that is, the first ultrasonic data) collected by the microphone array in the mobile phone, and may also obtain the M channels of ultrasonic signals (that is, the second ultrasonic data) collected by the microphone array in the slave device 1. Subsequently, the ultrasonic processing module may combine the N channels of ultrasonic signals and the M channels of ultrasonic signals into one group of multichannel ultrasonic data. The multichannel ultrasonic data may include: a waveform of each of the N channels of ultrasonic signals and a time at which each channel of ultrasonic signal arrives at a corresponding microphone, and a waveform of each of the M channels of ultrasonic signals and a time at which each channel of ultrasonic signal arrives at a corresponding microphone. Further, the ultrasonic processing module may report the multichannel ultrasonic data to the positioning application, and the positioning application calculates a location of the slave device 2 based on the multichannel ultrasonic data by using a preset positioning algorithm (for example, the TOA algorithm or the TDOA algorithm).

Alternatively, the ultrasonic processing module may directly calculate a location of the slave device 2 based on the multichannel ultrasonic data by using a preset positioning algorithm, and report the location of the slave device 2 to the positioning application. This is not limited in this embodiment of this application.

It can be learned that, when performing positioning on the slave device 2, the mobile phone may simultaneously enable, through collaboration with the slave device 1 by using a positioning capability of the slave device 1, the microphones of the mobile phone and the slave device 1 to receive ultrasonic signals sent by the slave device 2. In this way, in a positioning scenario, a quantity of microphones for collecting an ultrasonic signal increases, and the microphones for collecting an ultrasonic signal are at different locations of the mobile phone and the slave device 1, so that the mobile phone can perform positioning on the slave device 2 based on more quantities of ultrasonic signals in more directions. This improves device positioning accuracy.

In addition, in the foregoing positioning process, an existing ultrasonic positioning capability (for example, a capability of transmitting an ultrasonic signal by a speaker or a capability of receiving an ultrasonic signal by a microphone) of each of the mobile phone and the slave device (for example, the slave device 1 and the slave device 2) is used, and a hardware structure of each of the mobile phone and the slave device does not need to be changed. This can simplify an operation process of performing indoor positioning by the user, and reduce implementation costs of indoor positioning.

The following still uses an example in which the mobile phone is a master device to specifically describe an ultrasonic positioning method provided in an embodiment of this application with reference to the accompanying drawings.

In some embodiments, as shown in FIG. 146, the mobile phone may set a "Project" button 23602 at a location such as a pull-down menu 23601. When the user needs to use a projection function of the mobile phone, the user may tap the "Project" button 23602. If it is detected that the user taps the "Project" button 23602, the mobile phone needs to present a nearby electronic device to the user, so that the user selects a specific projection device, and triggers the mobile phone to project content in the mobile phone to the projection device for play. In this embodiment of this application, after it is detected that the user taps the "Project" button 23602, the mobile phone may perform positioning on an electronic device near the mobile phone by using the ultrasonic positioning method provided in this embodiment of this application, and present the electronic device near the mobile phone to the user based on a positioning result, so that the user selects a corresponding projection device.

For example, after the mobile phone detects that the user taps the "Project" button 23602, the mobile phone may search for one or more electronic devices that currently access a same communications network as the mobile phone. For example, the mobile phone may query a server for one or more electronic devices that log in to a same account as the mobile phone. For example, electronic devices that currently log in to a same account as the mobile phone include a television 1, a sound box 2, a sound box 3, and an air purifier 4. Further, the mobile phone may obtain positioning capabilities of the television 1, the sound box 2, the sound box 3, and the air purifier 4. For example, the server may store the positioning capabilities of the television 1, the sound box 2, the sound box 3, and the air purifier 4. The mobile phone may learn from the server that the television 1, the sound box 2, and the sound box 3 have the positioning capabilities, but the air purifier 4 has no positioning capability. The positioning capability of the television 1 is stronger than the positioning capability of either of the sound box 2 and the sound box 3. Therefore, the mobile phone may use the television 1, the sound box 2, and the sound box 3 having the positioning capabilities as slave devices of the mobile phone for current positioning, to perform positioning on the television 1, the sound box 2, and the sound box 3.

For example, a larger quantity of microphones disposed on an electronic device may indicate a stronger positioning capability of the electronic device. Alternatively, a larger distance between microphones disposed on an electronic device may indicate a stronger positioning capability of the electronic device. Alternatively, higher performance of a hardware parameter such as a processor of an electronic device may indicate a stronger positioning capability of the electronic device. This is not limited in this embodiment of this application.

In some embodiments, the mobile phone may select the television 1 with a strongest positioning capability from the television 1, the sound box 2, and the sound box 3 as a collaboration device. After determining that the television 1 is a collaboration device, the mobile phone may first perform positioning on the television 1, and the mobile phone may further collaborate with the television 1 to complete positioning on another slave device (for example, the sound box 2 or the sound box 3).

For example, as shown in FIG. 147, an architecture of an operating system of the television 1 is similar to the architecture of the operating system of the mobile phone. A proxy application may be installed at an application layer of the television 1, and the proxy application is configured to receive data from and send data to another device (for example, the mobile phone). Audio function modules such as AudioTrack, AudioFlinger, and AudioRecord (not shown in the figure) are disposed at an application framework layer of the television 1. An Audio HAL is disposed at an HAL of the television 1, and the audio HAL corresponds to an ultrasonic driver at a kernel layer of the television 1. The ultrasonic driver in the television 1 may drive an ultrasonic generator such as a speaker at the hardware layer to transmit an ultrasonic signal. Alternatively, the ultrasonic driver in the television 1 may drive a microphone array (not shown in FIG. 147) in the television 1 to collect an ultrasonic signal.

Still as shown in FIG. 147, after the mobile phone determines the television 1 as a collaboration device, the mobile phone may send a positioning instruction 1 to the proxy application in the television 1 by using a positioning application. The positioning instruction 1 is used to trigger the television 1 to transmit an ultrasonic signal. After receiving the positioning instruction 1, the proxy application in television 1 may respond to the positioning instruction 1 to invoke AudioTrack, and AudioTrack sends an ultrasonic emission instruction to the audio HAL by using AudioFlinger. The Audio HAL may send a drive signal to the ultrasonic driver in response to the ultrasonic emission instruction, so that the ultrasonic driver can drive the speaker of the television 1 in response to the drive signal to transmit an ultrasonic signal.

Still as shown in FIG. 147, the microphone array in the mobile phone may collect an ultrasonic signal transmitted by the speaker of the television 1. For example, the microphone array in the mobile phone includes N microphones. Each of the N microphones may report a collected ultrasonic signal to the audio HAL in the mobile phone by using a corresponding ultrasonic driver. In this case, the audio HAL in the mobile phone may receive N channels of ultrasonic signals such as an ultrasonic signal 1 and an ultrasonic signal 2. The Audio HAL in the mobile phone may report the N channels of ultrasonic signals to the ultrasonic processing module in the mobile phone by using AudioFlinger. As shown in FIG. 148, because the N microphones of the mobile phone are disposed at different locations of the mobile phone, waveforms of ultrasonic signals collected by different microphones may be different, and moments at which different microphones collect ultrasonic signals may also be different. The ultrasonic processing module may combine the received N channels of ultrasonic signals into one piece of multichannel ultrasonic data, where N channels in the multichannel ultrasonic data are in a one-to-one correspondence with the N channels of ultrasonic signals, and the multichannel ultrasonic data records a time of collecting each ultrasonic signal, that is, a time at which the ultrasonic signal arrives at a corresponding microphone. Further, the ultrasonic processing module in the mobile phone may perform positioning on the television 1 based on the multichannel ultrasonic data by using a preset positioning algorithm, to obtain a positioning result 1 of the television 1.

For example, the ultrasonic processing module in the mobile phone may perform, by using a TOA algorithm or a TDOA algorithm, positioning on the television 1 based on the time at which the ultrasonic signal arrives at the corresponding microphone. Certainly, a person skilled in the art may further set the ultrasonic processing module to use another positioning algorithm to perform positioning on the television 1. This is not limited in this embodiment of this application.

For example, the positioning result 1 calculated by the ultrasonic processing module for the television 1 may be absolute location coordinates of the television 1 in a preset coordinate system, or may be a relative location relationship between the television 1 and the mobile phone. This is not limited in this embodiment of this application.

For example, the mobile phone is used as a coordinate origin O (0, 0), and the positioning result 1 may include location coordinates A1 (X1, Y1) of the television 1 in the coordinate system. In this case, the location coordinates A1 (X1, Y1) may indicate the relative location relationship between the television 1 and the mobile phone. The ultrasonic processing module in the mobile phone may report the positioning result 1 to the positioning application by using AudioRecord, so that the positioning application learns of the location coordinates of the television 1. Alternatively, the ultrasonic processing module in the mobile phone may directly report the multichannel ultrasonic data to the positioning application by using AudioRecord, and the positioning application calculates the positioning result 1 of the television 1 based on the multichannel ultrasonic data. This is not limited in this embodiment of this application.

In this case, as shown in FIG. 149, after obtaining the positioning result 1 of the television 1, the positioning application in the mobile phone may display a location relationship between the television 1 and the mobile phone in a form of a text, an animation, an icon, or the like on an interaction interface 23901 based on the positioning result 1. For example, the television 1 is located 5 meters in front of the mobile phone. Because the mobile phone has not obtained a positioning result of another slave device such as the sound box 2 or the sound box 3, the positioning application may display, on the interaction interface 23901, prompt information 23902 indicating that positioning is being performed, so as to prompt the user to wait for the mobile phone to perform positioning on the another slave device.

For example, after the positioning application in the mobile phone obtains the positioning result 1 of the television 1, the mobile phone may use the positioning capability of the television 1 to collaborate with the television 1 to complete positioning on the another slave device such as the sound box 2 or the sound box 3.

For example, the mobile phone and the television 1 collaborate to perform positioning on the sound box 2. As shown in FIG. 150, an architecture of an operating system of the sound box 2 is similar to the architecture of the operating system of the mobile phone (or the television 1). A proxy application may be installed at an application layer of the sound box 2, and the proxy application is configured to receive data from and send data to another device (for example, the mobile phone or the television 1). Audio function modules such as AudioRecord (not shown in the figure), AudioTrack, and AudioFlinger are disposed at an application framework layer of the sound box 2. An Audio HAL is disposed at an HAL of the sound box 2, and the audio HAL corresponds to an ultrasonic driver at a kernel layer of the sound box 2. The ultrasonic driver may drive an ultrasonic generator such as a speaker at the hardware layer to transmit an ultrasonic signal.

For example, still as shown in FIG. 150, after the positioning application in the mobile phone obtains the positioning result 1 of the television 1, the positioning application in the mobile phone may send a positioning instruction 2 to the proxy application in the sound box 2, where the positioning instruction 2 is used to trigger the sound box 2 to transmit an ultrasonic signal. In addition, the positioning application in the mobile phone may send a collaborative positioning instruction to the proxy application in the television 1, where the collaborative positioning instruction is used to trigger the television 1 to use M ultrasonic receivers of the television 1 to detect an ultrasonic signal transmitted by the sound box 2.

Similar to the process in which the television 1 responds to the positioning instruction 1, after receiving the positioning instruction 2, the proxy application in the sound box 2 may respond to the positioning instruction 2 to invoke AudioTrack, and AudioTrack sends an ultrasonic emission instruction to the audio HAL by using AudioFlinger. The Audio HAL may send a drive signal to the ultrasonic driver in response to the ultrasonic emission instruction, so that the ultrasonic driver can drive the speaker of the sound box 2 in response to the drive signal to transmit an ultrasonic signal.

In addition, still as shown in FIG. 150, after the proxy application in the television 1 receives the collaborative positioning instruction sent by the mobile phone, in response to the collaborative positioning instruction, the proxy application in the television 1 may enable the microphone array in the television 1 to receive an ultrasonic signal. In this case, the ultrasonic signal received by the television 1 is an ultrasonic signal transmitted by the speaker of the sound box 2. For example, the microphone array in the television 1 includes M microphones. Each of the M microphones may report a collected ultrasonic signal to the audio HAL in the television 1 by using a corresponding ultrasonic driver. In this case, the audio HAL in the television 1 may receive M channels of ultrasonic signals such as an ultrasonic signal 1 and an ultrasonic signal 2. The Audio HAL in the television 1 may report the M channels of ultrasonic signals to AudioFlinger in the television 1, and then AudioRecord in the television 1 records the M channels of ultrasonic signals from AudioFlinger, and reports the M channels of ultrasonic signals to the proxy application in the television 1. The proxy application in the television 1 may send the M channels of ultrasonic signals collected by the television 1 to the DMSDP HAL in the mobile phone, and the DMSDP HAL in the mobile phone reports the M channels of ultrasonic signals collected by the television 1 to the ultrasonic processing module in the mobile phone by using AudioFlinger. In other words, when performing ultrasonic positioning on the sound box 2, the ultrasonic processing module in the mobile phone may obtain an ultrasonic signal that is transmitted by the sound box 2 and that is collected by the collaboration device (for example, the television 1).

In addition, still as shown in FIG. 150, the microphone array in the mobile phone may also collect an ultrasonic signal transmitted by the speaker of the sound box 2. For example, after the sound box 2 transmits an ultrasonic signal, each of the N microphones of the mobile phone may report the collected ultrasonic signal to the audio HAL in the mobile phone by using a corresponding ultrasonic driver. In this case, the audio HAL in the mobile phone may receive N channels of ultrasonic signals such as an ultrasonic signal 1 and an ultrasonic signal 2. The Audio HAL in the mobile phone may report the N channels of ultrasonic signals to the ultrasonic processing module in the mobile phone by using AudioFlinger.

In this way, when the mobile phone performs ultrasonic positioning on the sound box 2, the ultrasonic processing module in the mobile phone may obtain the N channels of ultrasonic signals (that is, first ultrasonic data) collected by the microphone array in the mobile phone, and may also obtain the M channels of ultrasonic signals (that is, second ultrasonic data) collected by the microphone array in the television 1. Further, the ultrasonic processing module in the mobile phone may perform ultrasonic positioning on the sound box 2 based on the first ultrasonic data and the second ultrasonic data. For example, the ultrasonic processing module in the mobile phone may combine the N channels of ultrasonic signals and the M channels of ultrasonic signals into one group of multichannel ultrasonic data. The multichannel ultrasonic data may include: a waveform of each of the N channels of ultrasonic signals and a time at which each channel of ultrasonic signal arrives at a corresponding microphone, and a waveform of each of the M channels of ultrasonic signals and a time at which each channel of ultrasonic signal arrives at a corresponding microphone. Further, the ultrasonic processing module in the mobile phone may perform ultrasonic positioning on the sound box 2 based on the multichannel ultrasonic data.

In some embodiments, a sampling rate 1 used for collecting the N channels of ultrasonic signals by the microphone array in the mobile phone may be the same as a sampling rate used for collecting the M channels of ultrasonic signals by the microphone array in the television 1. For example, when sending the collaborative positioning instruction to the television 1, the mobile phone may add a preset sampling rate A to the collaborative positioning instruction. In this way, the television 1 may collect, at the sampling rate A carried in the collaborative positioning instruction, the M channels of ultrasonic signals by using the microphone array in the television 1, and the mobile phone may also simultaneously collect, at the sampling rate A, the N channels of ultrasonic signals by using the microphone array in the mobile phone. Therefore, the ultrasonic processing module in the mobile phone may combine the M channels of ultrasonic signals and the N channels of ultrasonic signals with the same sampling rate, to obtain corresponding multichannel ultrasonic data.

Because the mobile phone has obtained the positioning result 1 of the television 1, that is, the location relationship between the mobile phone and the television 1 is determined, the M microphones of the television 1 may also be used as microphones of the mobile phone, which is equivalent to that some microphones (for example, the foregoing N microphones) of the mobile phone are disposed on the mobile phone, and the other microphones (for example, the foregoing M microphones) of the mobile phone are disposed on the television 1. Further, the ultrasonic processing module in the mobile phone may perform, based on the positioning result 1 of the television 1 (that is, locations of the M microphones) and the time at which an ultrasonic signal in the multichannel ultrasonic data arrives at each of the M microphones and the N microphones, positioning on the sound box 2 that transmits an ultrasonic signal, to obtain a positioning result 2 of the sound box 2.

Similarly, the positioning result 2 calculated by the ultrasonic processing module for the sound box 2 may be absolute location coordinates of the sound box 2 in a preset coordinate system, or may be a relative location relationship between the sound box 2 and the mobile phone. This is not limited in this embodiment of this application.

For example, the mobile phone is still used as a coordinate origin O (0, 0), and the positioning result 2 may include location coordinates A2 (X2, Y2) of the sound box 2 in the coordinate system. In this case, the location coordinates A2 (X2, Y2) may indicate the relative location relationship between the sound box 2 and the mobile phone. The ultrasonic processing module in the mobile phone may report the positioning result 2 to the positioning application by using AudioRecord, so that the positioning application learns of the location coordinates of the sound box 2. Alternatively, the ultrasonic processing module in the mobile phone may directly report the multichannel ultrasonic data to the positioning application by using AudioRecord, and the positioning application calculates the positioning result 2 of the sound box 2 based on the multichannel ultrasonic data. This is not limited in this embodiment of this application.

In this case, as shown in FIG. 151, after obtaining the positioning result 2 of the sound box 2, the positioning application in the mobile phone may display a location relationship between the sound box 2 and a nearby device such as the mobile phone in a form of a text, an animation, an icon, or the like on an interaction interface 24101 based on the positioning result 2. For example, the sound box 2 is located on the left of the television 1, and is located on the left front of the mobile phone.

It can be learned that, when performing positioning on the sound box 2, the mobile phone may simultaneously enable, through collaboration with the television 1 by using the positioning capability of the positioned television 1, the microphones of the mobile phone and the television 1 to receive ultrasonic signals sent by the sound box 2. In this way, in a positioning scenario, a quantity of microphones for collecting an ultrasonic signal increases, and a quantity of direction angles of the microphones for collecting an ultrasonic signal also increases, so that the mobile phone can perform positioning on the sound box 2 based on more quantities of ultrasonic signals in more directions. This improves device positioning accuracy.

Similarly, the mobile phone may also collaborate with the television 1 to perform positioning on the sound box 3 according to the foregoing method, to obtain a positioning result 3 of the sound box 3. The positioning result 3 may include location coordinates A3 (X3, Y3) of the sound box 3 in the coordinate system. Further, as shown in FIG. 152, after obtaining the positioning result 3 of the sound box 3, the positioning application in the mobile phone may display a location relationship between the sound box 3 and a nearby device such as the mobile phone in a form of a text, an animation, an icon, or the like on an interaction interface 24201 based on the positioning result 3. For example, the sound box 3 is located on the right of the television 1, and is located on the right front of the mobile phone. In this case, if the slave devices of the mobile phone do not have another slave device that needs to be positioned other than the television 1, the sound box 2, and the sound box 3, the positioning application in the mobile phone may further prompt the user on the interaction interface 24201 that searching for and positioning of a nearby device are completed, and the user may select a corresponding device for projection.

Certainly, the positioning application in the mobile phone may alternatively display a location relationship between the mobile phone and each slave device on the interface after obtaining positioning results of all slave devices such as the television 1, the sound box 2, and the sound box 3. This is not limited in this embodiment of this application.

In some embodiments, the mobile phone may simultaneously perform positioning on the sound box 2 and the sound box 3 during collaboration with the television 1. For example, the mobile phone may simultaneously send a positioning instruction to the sound box 2 and the sound box 3, to trigger the sound box 2 and the sound box 3 to start to transmit ultrasonic signals. A difference is that the sound box 2 and the sound box 3 may carry respective identifiers in the transmitted ultrasonic signals. For example, the ultrasonic signal 1 sent by the sound box 2 includes the identifier of the sound box 2, and the ultrasonic signal 2 sent by the sound box 3 includes the identifier of the sound box 3. In this way, the mobile phone may identify the ultrasonic signal 1 from the sound box 2 and the ultrasonic signal 2 from the sound box 3 based on the identifiers carried in the collected ultrasonic signals.

In some other embodiments, the mobile phone may first collaborate with the television 1 to perform positioning on the sound box 2, and then collaborate with the television 1 to perform positioning on the sound box 3. Alternatively, the mobile phone may first collaborate with the television 1 to perform positioning on the sound box 3, and then collaborate with the television 1 to perform positioning on the sound box 2, until positioning results of all current slave devices are obtained.

In some other embodiments, the mobile phone may further collaborate with a plurality of slave devices to perform positioning on another slave device that is not positioned. For example, the mobile phone may obtain the positioning result 1 of the television 1 after performing positioning on the television 1 according to the foregoing method, and the mobile phone may obtain the positioning result 2 of the sound box 2 after performing positioning on the sound box 2 through collaboration with the television 1 according to the foregoing method. Further, the mobile phone may use both the television 1 and the sound box 2 as collaboration devices, to continue to perform positioning on the sound box 3.

For example, when sending a positioning instruction 3 to the sound box 3, the mobile phone may further send a collaborative positioning instruction to the television 1 and the sound box 2 (that is, two collaboration devices). Further, similar to the method in which the television 1 serves as a collaboration device and collaborates with the mobile phone to perform positioning on another slave device in the foregoing embodiment, in response to the positioning instruction 3, the sound box 3 may transmit an ultrasonic signal by using a speaker, and in response to the collaborative positioning instruction, the television 1 and the sound box 2 may enable respective microphone arrays to collect ultrasonic signals, and send the plurality of channels of collected ultrasonic signals to the mobile phone. In addition, the mobile phone may also enable the microphone array in the mobile phone to collect an ultrasonic signal.

For example, the microphone array in the mobile phone includes N microphones, the microphone array in the television 1 includes M microphones, and the microphone array in the sound box 2 includes Z microphones. When performing positioning on the sound box 3, the mobile phone may obtain N channels of ultrasonic signals (that is, first ultrasonic data) from the mobile phone, M channels of ultrasonic signals (that is, second ultrasonic data) from the television 1, and Z channels of ultrasonic signals (that is, third ultrasonic data) from the sound box 2. Further, the mobile phone may combine the N channels of ultrasonic signals, the M channels of ultrasonic signals, and the Z channels of ultrasonic signals into corresponding multichannel ultrasonic data, so that the ultrasonic processing module (or the positioning application) in the mobile phone may calculate a positioning result 3 of the sound box 3 based on the multichannel ultrasonic data.

In this way, when performing positioning on the sound box 3, the mobile phone may simultaneously enable, through multi-device collaboration by using the positioning capabilities of the two positioned collaboration devices, namely, the television 1 and the sound box 2, the microphones of the mobile phone, the television 1, and the sound box 2 to receive ultrasonic signals sent by the sound box 3. In this way, in a positioning scenario, a quantity of microphones for collecting an ultrasonic signal increases, and a quantity of direction angles of the microphones for collecting an ultrasonic signal also increases, so that the mobile phone can perform positioning on the sound box 3 based on more quantities of ultrasonic signals in more directions. This improves device positioning accuracy.

Certainly, if the slave device of the mobile phone further includes a device that is not positioned by another device, for example, a sound box 4, the mobile phone may add a new collaboration device according to the foregoing method to continue to perform positioning on another device that is not positioned. This is not limited in this embodiment of this application.

In addition, after collecting the N channels of ultrasonic signals, the mobile phone does not need to perform audio processing such as sound effect setting or mixing on the N channels of ultrasonic signals, so as to ensure that the N channels of ultrasonic signals obtained by the mobile phone are original ultrasonic signals transmitted by the slave device. This improves positioning accuracy in a subsequent positioning process. Similarly, after collecting the M channels of ultrasonic signals, the collaboration device of the mobile phone (for example, the television 1) does not need to perform audio processing such as sound effect setting or mixing on the M channels of ultrasonic signals neither, so as to ensure that the M channels of ultrasonic signals obtained by the mobile phone are original ultrasonic signals transmitted by the slave device. This improves positioning accuracy in a subsequent positioning process.

In some other embodiments, an example in which the mobile phone collaborates with the television 1 to perform positioning on the sound box 2 is still used. As shown in FIG. 153, a positioning application may also be installed at the application layer of the television 1, and an ultrasonic processing module may also be included at the application framework layer of the television 1.

When the sound box 2 is positioned, each of the N microphones of the mobile phone may report a collected ultrasonic signal to the audio HAL in the mobile phone by using a corresponding ultrasonic driver, so that the audio HAL in the mobile phone can receive N channels of ultrasonic signals such as an ultrasonic signal 1 and an ultrasonic signal 2. Further, the audio HAL in the mobile phone may report the N channels of ultrasonic signals to AudioFlinger in the mobile phone. In this case, the ultrasonic processing module in the mobile phone may obtain the N channels of ultrasonic signals from AudioFlinger, and the ultrasonic processing module in the mobile phone may further combine the N channels of ultrasonic signals into corresponding multichannel ultrasonic data 1. The multichannel ultrasonic data 1 may include: a waveform of each of the N channels of ultrasonic signals and a time at which each channel of ultrasonic signal arrives at a corresponding microphone. Further, the ultrasonic processing module or the positioning application in the mobile phone may perform positioning on the sound box 2 based on the multichannel ultrasonic data 1, to obtain a positioning result 2 of the sound box 2.

Similarly, when the sound box 2 is positioned, each of the M microphones of the television 1 may report a collected ultrasonic signal to the audio HAL in the television 1 by using a corresponding ultrasonic driver, so that the audio HAL in the television 1 can receive M channels of ultrasonic signals such as an ultrasonic signal 1 and an ultrasonic signal 2. The Audio HAL in the television 1 may report the M channels of ultrasonic signals to AudioFlinger in the television 1. In this case, the ultrasonic processing module in the television 1 may obtain the M channels of ultrasonic signals from AudioFlinger, and the ultrasonic processing module in the television 1 may further combine the M channels of ultrasonic signals into corresponding multichannel ultrasonic data 2. The multichannel ultrasonic data 2 may include: a waveform of each of the M channels of ultrasonic signals and a time at which each channel of ultrasonic signal arrives at a corresponding microphone. Therefore, the ultrasonic processing module or the positioning application in the television 1 may perform positioning on the sound box 2 based on the multichannel ultrasonic data 2. In this case, the television 1 may also obtain a positioning result 2' of the sound box 2.

Further, the positioning application in the television 1 may send the calculated positioning result 2' of the sound box 2 to the DMSDP HAL in the mobile phone, and the DMSDP HAL in the mobile phone reports the positioning result 2' to the ultrasonic processing module in the mobile phone. In this way, the ultrasonic processing module in the mobile phone may obtain the positioning result 2 calculated when the mobile phone performs positioning on the sound box 2, and may also obtain the positioning result 2' calculated when the television 1 performs positioning on the sound box 2. Further, the ultrasonic processing module in the mobile phone may correct, based on the positioning result 2', the positioning result 2 calculated by the ultrasonic processing module, to obtain a corrected positioning result 2 of the sound box 2, so as to improve positioning accuracy of the sound box 2.

For example, the positioning result 2 calculated when the mobile phone performs positioning on the sound box 2 includes location coordinates A21 of the sound box 2, and the positioning result 2' calculated when the television 1 performs positioning on the sound box 2 includes location coordinates A22 of the sound box 2. In this case, the ultrasonic processing module in the mobile phone may calculate the location coordinates A2 of the sound box 2, that is, a final positioning result of the sound box 2, based on the location coordinates A21 and the location coordinates A22 by using a preset correction algorithm. For example, the ultrasonic processing module in the mobile phone may perform weighted averaging on the location coordinates A21 and the location coordinates A22 to obtain the location coordinates A2 of the sound box 2. This is not limited in this embodiment of this application.

Certainly, the mobile phone may further continue to perform positioning on another slave device of the mobile phone (for example, the sound box 3) according to the foregoing method. This is not limited in this embodiment of this application.

An example in which slave devices of the mobile phone include the television 1, the sound box 2, and the sound box 3 is still used. As shown in FIG. 154, after the mobile phone displays the location relationship between the mobile phone and each of the television 1, the sound box 2, and the sound box 3 on the interface 24201, the user may conveniently and quickly complete cross-device content projection based on the location relationship with each slave device that is displayed on the interface 24201.

For example, if it is detected that the user drags an identifier 24401 of the mobile phone on the interface 24201 to move to a location of the positioned television 1, it indicates that the user needs to project content played by the mobile phone to the television 1 for play. In this case, the mobile phone may start to perform projection to the television 1. For example, the mobile phone may start to perform projection to the television 1 by using the Miracast protocol or the digital living network alliance (DIGITAL LIVING NETWORK ALLIANCE, DLNA) protocol. This is not limited in this embodiment of this application.

For another example, if it is detected that the user drags the identifier 24401 of the mobile phone on the interface 24201 to move to a location of the positioned sound box 3, it indicates that the user needs to project audio content in the mobile phone to the sound box 3 for play. In this case, the mobile phone may project, by using a Bluetooth protocol, the audio content played by the mobile phone to the sound box 3 for play.

The foregoing embodiment is described by using an example in which the user triggers the mobile phone to perform positioning on a slave device in a scenario such as a projection scenario or a music projection scenario. It can be understood that a person skilled in the art may further set another application scenario of using the ultrasonic positioning method. This is not limited in this embodiment of this application.

For example, after the user projects a video played by the mobile phone to the television 1 for play, the mobile phone may automatically start to perform positioning on a found slave device according to the ultrasonic positioning method provided in the foregoing embodiment. As shown in FIG. 155, if the mobile phone detects that sound boxes such as the sound box 2 and the sound box 3 are respectively disposed on the left and right of the television 1, the mobile phone may prompt the user on an interface 24501 to set a dual-channel stereo effect. For example, if it is detected that the user taps an "OK" button 24502 on the interface 24501, the mobile phone may send, to the sound box 2 for play, left-channel audio data projected to the television 1, and send, to the sound box 3 for play, right-channel audio data projected to the television 1, so as to present a dual-channel stereo audio play effect to the user during projection.

In some other embodiments, an electronic device is positioned by using an ultrasonic signal according to the positioning method in the foregoing embodiment, and the positioning method in the foregoing embodiment is also applicable to another sound wave signal, for example, a sound signal of 20 Hz to 20000 Hz that can be recognized by the human ears.

For example, in a conference scenario, an electronic device having the foregoing positioning function may be disposed at a location of each participant user. As shown in FIG. 156, when a participant user speaks, each electronic device may enable a microphone array to collect a sound signal sent by the participant user when the participant user speaks, so as to determine a location relationship between the participant user who speaks and another participant user according to the foregoing positioning method. In this case, the electronic device may also display the location relationship between the participant user who speaks currently and another participant user on an interface, so as to prompt the participant user with the location of the user who is speaking in the current conference.

It should be noted that the foregoing embodiment is described by using an example in which the mobile phone is a master device in a positioning scenario. It can be understood that the master device in the positioning scenario may alternatively be an electronic device having the foregoing positioning function, such as a tablet or a television. This is not limited in this embodiment of this application.

It should be noted that the foregoing embodiment is described by using an example in which the mobile phone is a master device in a distributed audio scenario. It can be understood that the master device in the distributed audio scenario may alternatively be an electronic device having an audio function, such as a tablet or a television. This is not limited in this embodiment of this application.

In addition, in the foregoing embodiment, the Android system is used as an example to describe a specific method for implementing audio control between function modules. It can be understood that corresponding function modules may also be set in another operating system to implement the foregoing audio control method. All devices and function modules with functions similar to those in embodiments of this application fall within the scope of the claims of this application and equivalent technologies of this application.

As shown in FIG. 157, an embodiment of this application discloses an electronic device. The electronic device may be the foregoing master device (for example, a mobile phone). The electronic device may specifically include: a touchscreen 24701, where the touchscreen 24701 includes a touch sensor 24706 and a display 24707; one or more processors 24702; a memory 24703; a communications module 24708; one or more applications (not shown); and one or more computer programs 24704. The foregoing components may be connected through one or more communications buses 24705. The one or more computer programs 24704 are stored in the memory 24703 and are configured to be executed by the one or more processors 24702. The one or more computer programs 24704 include instructions. The instructions may be used to perform the related steps performed by the master device in the foregoing embodiments.

As shown in FIG. 158, an embodiment of this application discloses an electronic device. The electronic device may be the foregoing slave device (for example, a sound box or a television). The electronic device may specifically include: one or more processors 24802; a memory 24803; a communications module 24806; one or more applications (not shown); and one or more computer programs 24804. The foregoing components may be connected through one or more communications buses 24805. Certainly, a component such as a touchscreen may also be disposed in the slave device. This is not limited in this embodiment of this application. The one or more computer programs 24804 are stored in the memory 24803 and are configured to be executed by the one or more processors 24802. The one or more computer programs 24804 include instructions. The instructions may be used to perform the related steps performed by the slave device in the foregoing embodiments.

The foregoing descriptions about implementations allow a person skilled in the art to understand that, for the purpose of convenient and brief description, division of the foregoing function modules is used as an example for illustration. During actual application, the foregoing functions can be allocated to different function modules and implemented as required, that is, an inner structure of an apparatus is divided into different function modules to implement all or some of the functions described above. For a detailed working process of the foregoing system, apparatus, and unit, refer to corresponding processes in the foregoing method embodiments. Details are not described herein again.

Function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the method described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:
1. An audio control method, comprising:
displaying, by a first device, in response to a first operation entered by a user, a candidate device list, wherein the candidate device list comprises at least one candidate device having an audio output function;
obtaining, by the first device, in response to the user selecting a second device from the candidate device list, an audio capability parameter of the second device, wherein the audio capability parameter indicates a hardware capability of the second device for playing audio and a software capability of the second device for playing audio, and wherein the second device is at least one of a sound box, a television, or a mobile phone;
determining, by the first device, a first audio play policy based on the audio capability parameter of the second device;
obtaining second audio data by the first device by performing first processing on first audio data from a first audio application according to the first audio play policy; and
sending, by the first device, the second audio data to the second device, the sending the second audio data causing the second device to perform at least one of playing the second audio data or processing the second audio data and playing the processed second audio data.

2. The method according to claim 1, wherein a first preset application is installed at an application layer of the first device; and wherein obtaining, by the first device, the audio capability parameter of the second device comprises:

obtaining, by the first device, the audio capability parameter of the second device from the second device by running the first preset application.

3. The method according to claim 2, further comprising performing, after obtaining the audio capability parameter of the second device:

creating, by the first preset application, a corresponding hardware abstraction module at a hardware abstraction layer (HAL) based on the audio capability parameter of the second device; and wherein sending, by the first device, the second audio data to the second device comprises:

invoking, by the first device, the hardware abstraction module to send the second audio data to the second device.

4. The method according to claim 3, wherein an application framework layer of the first device comprises an audio policy module; and wherein determining, by the first device, the first audio play policy based on the audio capability parameter of the second device comprises:

sending, by the first preset application, the audio capability parameter of the second device to the audio policy module, the sending the audio capability parameter of the second device to the audio policy module causing the audio policy module to determine the first audio play policy based on the audio capability parameter of the second device.

5. The method according to claim 4, wherein the application framework layer of the first device comprises an audio processor; and wherein performing, by the first device, the first processing on the first audio data from the first audio application according to the first audio play policy comprises:

receiving, by the audio processor, the first audio data from the first audio application; and outputting the second audio data by performing, by the audio processor, the first processing on the first audio data according to the first audio play policy that is output by the audio policy module.

6. The method according to claim 5, further comprising:

obtaining, by the first preset application, in response to the audio capability parameter of the second device being updated, an updated audio capability parameter of the second device;

sending, by the first preset application, the updated audio capability parameter to the audio policy module, the sending the updated audio capability parameter to the audio policy module causing the audio policy module to update the first audio play policy to a second audio play policy based on the updated audio capability parameter; and outputting, by the audio policy module, the second audio play policy to the audio processor, the outputting the second audio play policy to the audio processor causing the audio processor to perform second processing on received audio data according to the second audio play policy.

7. The method according to claim 6, further comprising performing after obtaining the updated audio capability parameter of the second device:

updating, by the first preset application, the hardware abstraction module based on the updated audio capability parameter, the updating the hardware abstraction module causing an updated hardware abstraction module to send audio data obtained after the second processing to the second device.

8. The method according to claim 5, further comprising performing, after sending the second audio data to the second device:

receiving, by the first device, a second operation that the user sets volume;

obtaining a third audio play policy by setting, by the audio policy module, in response to the second operation, a volume level in the first audio play policy; and outputting, by the audio policy module, the third audio play policy to the audio processor, the outputting the third audio play policy causing the audio processor to modify a gain of received audio data based on the volume level that is set in the third audio play policy.

9. The method according to claim 5, wherein a second audio application is installed at the application layer of the first device; and wherein the method further comprises performing, after sending the second audio data to the second device:

receiving, by the audio processor, audio data from the second audio application;

updating, by the audio policy module, in response to the audio data of the second audio application and audio data of the first audio application being of different types, the first audio play policy to a fourth audio play policy;

outputting, by the audio policy module, the fourth audio play policy to the audio processor, the outputting the fourth audio play policy causing the audio processor to perform third processing on the received audio data according to the fourth audio play policy; and sending, by the audio processor, audio data obtained after the third processing to the second device using the hardware abstraction module.

10. The method according to claim 5, further comprising performing, after sending the second audio data to the second device:

receiving, by the first device, a third operation that the user selects for a third device to play audio, wherein the third device is different from the second device;

obtaining, by the first preset application, in response to the third operation, an audio capability parameter of the third device from the third device;

sending, by the first preset application, the audio capability parameter of the third device to the audio policy module, the sending the audio capability parameter of the third device to the audio policy module causing the audio policy module to update the first audio play policy to a fifth audio play policy based on the audio capability parameter of the third device; and outputting, by the audio policy module, the fifth audio play policy to the audio processor, the outputting the fifth audio play policy causing the audio processor to perform fourth processing on received audio data according to the fifth audio play policy.

11. The method according to claim 10, further comprising performing, after obtaining the audio capability parameter of the third device from the third device updating, by the first preset application, the hardware abstraction module based on the audio capability parameter of the third device, the updating the hardware abstraction module based on the audio capability parameter of the third device causing an updated hardware abstraction module to send audio data obtained after the fourth processing to the third device.

12. The method according to claim 1, wherein a second preset application is installed at an application layer of the first device, and the second preset application is the same as or different from a first preset application; and wherein sending, by the first device, the second audio data to the second device comprises:

sending, by the first device, the second audio data to the second preset application, the sending the second audio data to the second preset application causing the second preset application to send the second audio data to the second device.

13. The method according to claim 1, further comprising performing before displaying the candidate device list:

displaying, by the first device, an application interface of the first audio application, wherein an audio switching button is disposed on the application interface, wherein the first operation is an operation that the user taps the audio switching button.

14. The method according to claim 1, further comprising performing, before displaying the candidate device list:

displaying, by the first device, a control center, wherein an audio switching button is disposed in the control center, wherein the first operation is an operation that the user taps the audio switching button.

15. An audio control method, comprising:

displaying, by a first device, in response to a first operation entered by a user, a candidate device list, wherein the candidate device list comprises at least one candidate device having an audio output function;

separately obtaining, by the first device, in response to an operation of the user selecting a second device and a third device from the candidate device list, an audio capability parameter of the second device and an audio capability parameter of the third device, wherein the audio capability parameter of the second device indicates a hardware capability of the second device for playing audio and a software capability of the second device for playing audio, and wherein the audio capability parameter of the third device indicates a hardware capability of the third device for playing audio and a software capability of the third device for playing audio;

determining, by the first device, a multi-device audio play policy based on the audio capability parameter of the second device and the audio capability parameter of the third device;

obtaining second audio data corresponding to the second device and third audio data corresponding to the third device by performing, by the first device, first processing on first audio data from a first audio application according to the multi-device audio play policy; and sending, by the first device, the second audio data to the second device for play, and sending the third audio data to the third device for play.

16. The method according to claim 15, wherein the audio capability parameter of the second device is different from the audio capability parameter of the third device, and wherein the multi-device audio play policy comprises a first policy and a second policy; and wherein obtaining the second audio data by performing the first processing comprises:

obtaining first data and second data by replicating, by the first device, the first audio data wherein the first data is the same as the first audio data, and wherein the second data is the same as the first audio data;

obtaining the second audio data by processing, by the first device, the first data according to the first policy; and obtaining the third audio data by processing, by the first device, the second data according to the second policy.

17. The method according to claim 16, wherein a first preset application is installed at an application layer of the first device; and wherein the method further comprises performing, after separately obtaining the audio capability parameter of the second device and the audio capability parameter of the third device:

creating, by the first preset application, a first hardware abstraction module at a hardware abstraction layer (HAL) based on the audio capability parameter of the second device; and creating, by the first preset application, a second hardware abstraction module at the HAL based on the audio capability parameter of the third device; and wherein sending the second audio data to the second device, and sending the third audio data to the third device comprises:

sending, by the first device, the second audio data to the second device using the first hardware abstraction module; and sending, by the first device, the third audio data to the third device using the second hardware abstraction module.

18. The method according to claim 15, wherein the audio capability parameter of the second device is the same as the audio capability parameter of the third device; and wherein obtaining the second audio data corresponding to the second device and the third audio data corresponding to the third device by performing the first processing on the first audio data comprises:

obtaining the second audio data by performing, by the first device, the first processing on the first audio data according to the multi-device audio play policy; and obtaining the third audio data by replicating, by the first device, the second audio data.

19. The method according to claim 18, wherein a first preset application is installed at an application layer of the first device; and wherein the method further comprises performing, after separately obtaining the audio capability parameter of the second device and the audio capability parameter of the third device:

creating, by the first preset application, a hardware abstraction module at a hardware abstraction layer (HAL) based on at least one of the audio capability parameter of the second device or the audio capability parameter of the third device; and wherein sending, by the first device, the second audio data to the second device, and sending the third audio data to the third device comprises:

sending, by the first device, the second audio data to the second device using the hardware abstraction module; and sending, by the first device, the third audio data to the third device using the hardware abstraction module.

20. An electronic device, wherein the electronic device is a first device, and the first device comprises:
a display;
one or more processors;
a non-transitory memory storing one or more programs for execution by the one or more processors, the one or more programs comprising instructions for:
displaying a candidate device list in response to a first operation entered by a user, wherein the candidate device list comprises at least one candidate device having an audio output function;
obtaining an audio capability parameter of a second device in response to an operation of the user selecting the second device from the candidate device list, wherein the audio capability parameter indicates a hardware capability of the second device for playing audio and a software capability of the second device for playing audio, and wherein the second device is at least one of a sound box, a television, or a mobile phone;
determining a first audio play policy based on the audio capability parameter of the second device;
obtaining second audio data by performing first processing on first audio data from a first audio application according to the first audio play policy; and
sending the second audio data to the second device, the sending the second audio data to the second device causing the second device to at least one of process the second audio data and then play processed second audio data, or play the second audio data.

* * * * *